Nov. 17, 1959 B. E. PHELPS ET AL 2,913,171

SORTER-COLLATOR FOR TAPE RECORDED DATA

Filed Dec. 9, 1954 132 Sheets-Sheet 1

INVENTORS
BYRON E. PHELPS
JOSEPH J. SOCHOR
ARTHUR A. KUSNICK
BY [signature]
ATTORNEY INVENTORS
BYRON E. PHELPS
JOSEPH J. SOCHOR
ARTHUR A. KUSNICK
BY [signature]
ATTORNEY Nov. 17, 1959 B. E. PHELPS ET AL 2,913,171

SORTER-COLLATOR FOR TAPE RECORDED DATA

Filed Dec. 9, 1954 132 Sheets-Sheet 3

SORTER-COLLATOR EXCESS THREE CODE

| C BA 8421 | | | C BA 8421 | | | C BA 8421 | | | C BA 8421 | | |
|---|---|---|---|---|---|---|---|---|---|---|---|
| | | | 0 10 0000 | + | (RECORD MARK) | 0 01 0000 | ǂ | (TAPE MARK) | 1 00 0000 | b | (BLANK) |
| | | | | | | | | | | | |
| 0 11 0010 | - | (HYPHEN) | | | | | | | | | |
| 1 11 0011 | & | (AMPERSAND) | 0 10 0011 | - | (MINUS FIELD MARK) | 0 01 0011 | + | (PLUS FIELD MARK) | 1 00 0011 | 0 | |
| 0 11 0100 | A | | 1 10 0100 | J | | 1 01 0100 | / | | 0 00 0100 | 1 | |
| 1 11 0101 | B | | 0 10 0101 | K | | 0 01 0101 | S | | 1 00 0101 | 2 | |
| 1 11 0110 | C | | 0 10 0110 | L | | 0 01 0110 | T | | 1 00 0110 | 3 | |
| 0 11 0111 | D | | 1 10 0111 | M | | 1 01 0111 | U | | 0 00 0111 | 4 | |
| 0 11 1000 | E | | 1 10 1000 | N | | 1 01 1000 | V | | 0 00 1000 | 5 | |
| 1 11 1000 | F | | 0 10 1001 | O | | 0 01 1001 | W | | 1 00 1001 | 6 | |
| 1 11 1010 | G | | 0 10 1010 | P | | 0 01 1010 | X | | 1 00 1010 | 7 | |
| 0 11 1011 | H | | 1 10 1011 | Q | | 1 01 1011 | Y | | 0 00 1011 | 8 | |
| 1 11 1100 | I | | 0 10 1100 | R | | 0 01 1100 | Z | | 1 00 1000 | 9 | |
| 0 11 1101 | · | | 1 10 1101 | $ | | 1 01 1101 | , | | 0 00 1101 | # | |
| 0 11 1110 | ☆ | | 1 10 1110 | * | | 1 01 1110 | % | | 0 00 1110 | @ | |
| | | | | | | | | | | | |

LOW SORTING SEQUENCE HIGH b · ☆ $ * , % # @ - & A B C D E F G H I ‡ J K L M N O P Q R ǂ / S T U V W X Y Z 0 1 2 3 4 5 6 7 8 9

FIG. 4

Nov. 17, 1959 B. E. PHELPS ET AL 2,913,171

SORTER-COLLATOR FOR TAPE RECORDED DATA

Filed Dec. 9, 1954 132 Sheets-Sheet 6

Nov. 17, 1959 B. E. PHELPS ET AL 2,913,171

SORTER-COLLATOR FOR TAPE RECORDED DATA

Filed Dec. 9, 1954 132 Sheets-Sheet 8

Nov. 17, 1959 B. E. PHELPS ET AL 2,913,171

SORTER-COLLATOR FOR TAPE RECORDED DATA

Filed Dec. 9, 1954 132 Sheets-Sheet 9

Nov. 17, 1959 B. E. PHELPS ET AL 2,913,171

SORTER-COLLATOR FOR TAPE RECORDED DATA

Filed Dec. 9, 1954 132 Sheets-Sheet 10

Nov. 17, 1959 B. E. PHELPS ET AL 2,913,171

SORTER-COLLATOR FOR TAPE RECORDED DATA

Filed Dec. 9, 1954 132 Sheets-Sheet 11

Nov. 17, 1959 B. E. PHELPS ET AL 2,913,171

SORTER-COLLATOR FOR TAPE RECORDED DATA

Filed Dec. 9, 1954 132 Sheets-Sheet 12

Nov. 17, 1959 B. E. PHELPS ET AL 2,913,171

SORTER-COLLATOR FOR TAPE RECORDED DATA

Filed Dec. 9, 1954 132 Sheets-Sheet 16

Nov. 17, 1959 B. E. PHELPS ET AL 2,913,171

SORTER-COLLATOR FOR TAPE RECORDED DATA

Filed Dec. 9, 1954 132 Sheets-Sheet 18

Nov. 17, 1959 B. E. PHELPS ET AL 2,913,171

SORTER-COLLATOR FOR TAPE RECORDED DATA

Filed Dec. 9, 1954 132 Sheets-Sheet 19

SORTER-COLLATOR FOR TAPE RECORDED DATA

Filed Dec. 9, 1954 132 Sheets-Sheet 20

Nov. 17, 1959 B. E. PHELPS ET AL 2,913,171

SORTER-COLLATOR FOR TAPE RECORDED DATA

Filed Dec. 9, 1954 132 Sheets-Sheet 25

Nov. 17, 1959 B. E. PHELPS ET AL 2,913,171

SORTER-COLLATOR FOR TAPE RECORDED DATA

Filed Dec. 9, 1954 132 Sheets-Sheet 27

Nov. 17, 1959 B. E. PHELPS ET AL 2,913,171

SORTER-COLLATOR FOR TAPE RECORDED DATA

Filed Dec. 9, 1954 132 Sheets-Sheet 29

Nov. 17, 1959 B. E. PHELPS ET AL 2,913,171

SORTER-COLLATOR FOR TAPE RECORDED DATA

Filed Dec. 9, 1954 132 Sheets-Sheet 31

Nov. 17, 1959 B. E. PHELPS ET AL 2,913,171
SORTER-COLLATOR FOR TAPE RECORDED DATA
Filed Dec. 9, 1954 132 Sheets-Sheet 34

SORTER-COLLATOR FOR TAPE RECORDED DATA

Nov. 17, 1959 B. E. PHELPS ET AL 2,913,171

SORTER-COLLATOR FOR TAPE RECORDED DATA

Filed Dec. 9, 1954 132 Sheets-Sheet 45

Nov. 17, 1959 B. E. PHELPS ET AL 2,913,171

SORTER-COLLATOR FOR TAPE RECORDED DATA

Filed Dec. 9, 1954 132 Sheets-Sheet 49

SORTER-COLLATOR FOR TAPE RECORDED DATA

-AND
(CF)

Nov. 17, 1959 B. E. PHELPS ET AL 2,913,171

SORTER-COLLATOR FOR TAPE RECORDED DATA

Filed Dec. 9, 1954 132 Sheets-Sheet 55

SORTER-COLLATOR FOR TAPE RECORDED DATA

Filed Dec. 9, 1954 132 Sheets-Sheet 59

SORTER-COLLATOR FOR TAPE RECORDED DATA

Nov. 17, 1959 B. E. PHELPS ET AL 2,913,171

SORTER-COLLATOR FOR TAPE RECORDED DATA

Filed Dec. 9, 1954 132 Sheets-Sheet 61

Nov. 17, 1959 B. E. PHELPS ET AL 2,913,171

SORTER-COLLATOR FOR TAPE RECORDED DATA

Filed Dec. 9, 1954 132 Sheets-Sheet 64

Nov. 17, 1959 B. E. PHELPS ET AL 2,913,171

SORTER-COLLATOR FOR TAPE RECORDED DATA

Filed Dec. 9, 1954 132 Sheets-Sheet 66

SORTER-COLLATOR FOR TAPE RECORDED DATA

Nov. 17, 1959 B. E. PHELPS ET AL 2,913,171

SORTER-COLLATOR FOR TAPE RECORDED DATA

Filed Dec. 9, 1954 132 Sheets-Sheet 73

Nov. 17, 1959 B. E. PHELPS ET AL 2,913,171

SORTER-COLLATOR FOR TAPE RECORDED DATA

Filed Dec. 9, 1954 132 Sheets-Sheet 76

Nov. 17, 1959 B. E. PHELPS ET AL 2,913,171

SORTER-COLLATOR FOR TAPE RECORDED DATA

Filed Dec. 9, 1954 132 Sheets-Sheet 77

Nov. 17, 1959 B. E. PHELPS ET AL 2,913,171

SORTER-COLLATOR FOR TAPE RECORDED DATA

Filed Dec. 9, 1954 132 Sheets-Sheet 80

Nov. 17, 1959 B. E. PHELPS ET AL 2,913,171

SORTER-COLLATOR FOR TAPE RECORDED DATA

Filed Dec. 9, 1954 132 Sheets-Sheet 81

Nov. 17, 1959 B. E. PHELPS ET AL 2,913,171

SORTER-COLLATOR FOR TAPE RECORDED DATA

Filed Dec. 9, 1954 132 Sheets-Sheet 83

Nov. 17, 1959 B. E. PHELPS ET AL 2,913,171

SORTER-COLLATOR FOR TAPE RECORDED DATA

Filed Dec. 9, 1954 132 Sheets-Sheet 84

Nov. 17, 1959 B. E. PHELPS ET AL 2,913,171

SORTER-COLLATOR FOR TAPE RECORDED DATA

Filed Dec. 9, 1954 132 Sheets-Sheet 86

SORTER-COLLATOR FOR TAPE RECORDED DATA

Nov. 17, 1959 B. E. PHELPS ET AL 2,913,171

SORTER-COLLATOR FOR TAPE RECORDED DATA

Filed Dec. 9, 1954 132 Sheets-Sheet 89

Nov. 17, 1959 B. E. PHELPS ET AL 2,913,171

SORTER-COLLATOR FOR TAPE RECORDED DATA

Filed Dec. 9, 1954 132 Sheets-Sheet 90

Nov. 17, 1959 B. E. PHELPS ET AL 2,913,171

SORTER-COLLATOR FOR TAPE RECORDED DATA

Filed Dec. 9, 1954 132 Sheets-Sheet 91

SORTER-COLLATOR FOR TAPE RECORDED DATA

Nov. 17, 1959 B. E. PHELPS ET AL 2,913,171

SORTER-COLLATOR FOR TAPE RECORDED DATA

Filed Dec. 9, 1954 132 Sheets-Sheet 96

Nov. 17, 1959 B. E. PHELPS ET AL 2,913,171

SORTER-COLLATOR FOR TAPE RECORDED DATA

Filed Dec. 9, 1954 132 Sheets-Sheet 100

Nov. 17, 1959 B. E. PHELPS ET AL 2,913,171

SORTER-COLLATOR FOR TAPE RECORDED DATA

Filed Dec. 9, 1954 132 Sheets-Sheet 102

Nov. 17, 1959 B. E. PHELPS ET AL 2,913,171

SORTER-COLLATOR FOR TAPE RECORDED DATA

Filed Dec. 9, 1954 132 Sheets-Sheet 103

Nov. 17, 1959 B. E. PHELPS ET AL 2,913,171

SORTER-COLLATOR FOR TAPE RECORDED DATA

Filed Dec. 9, 1954 132 Sheets-Sheet 104

Nov. 17, 1959 B. E. PHELPS ET AL 2,913,171

SORTER-COLLATOR FOR TAPE RECORDED DATA

Filed Dec. 9, 1954 132 Sheets-Sheet 105

Nov. 17, 1959 B. E. PHELPS ET AL 2,913,171

SORTER-COLLATOR FOR TAPE RECORDED DATA

Filed Dec. 9, 1954 132 Sheets-Sheet 108

Nov. 17, 1959 B. E. PHELPS ET AL 2,913,171

SORTER-COLLATOR FOR TAPE RECORDED DATA

Filed Dec. 9, 1954 132 Sheets-Sheet 114

Nov. 17, 1959 B. E. PHELPS ET AL 2,913,171

SORTER-COLLATOR FOR TAPE RECORDED DATA

Filed Dec. 9, 1954 132 Sheets-Sheet 115

Nov. 17, 1959 B. E. PHELPS ET AL 2,913,171

SORTER-COLLATOR FOR TAPE RECORDED DATA

Filed Dec. 9, 1954 132 Sheets-Sheet 119

Nov. 17, 1959 B. E. PHELPS ET AL 2,913,171

SORTER-COLLATOR FOR TAPE RECORDED DATA

Filed Dec. 9, 1954 132 Sheets-Sheet 121

Nov. 17, 1959 B. E. PHELPS ET AL 2,913,171

SORTER-COLLATOR FOR TAPE RECORDED DATA

Filed Dec. 9, 1954 132 Sheets-Sheet 123

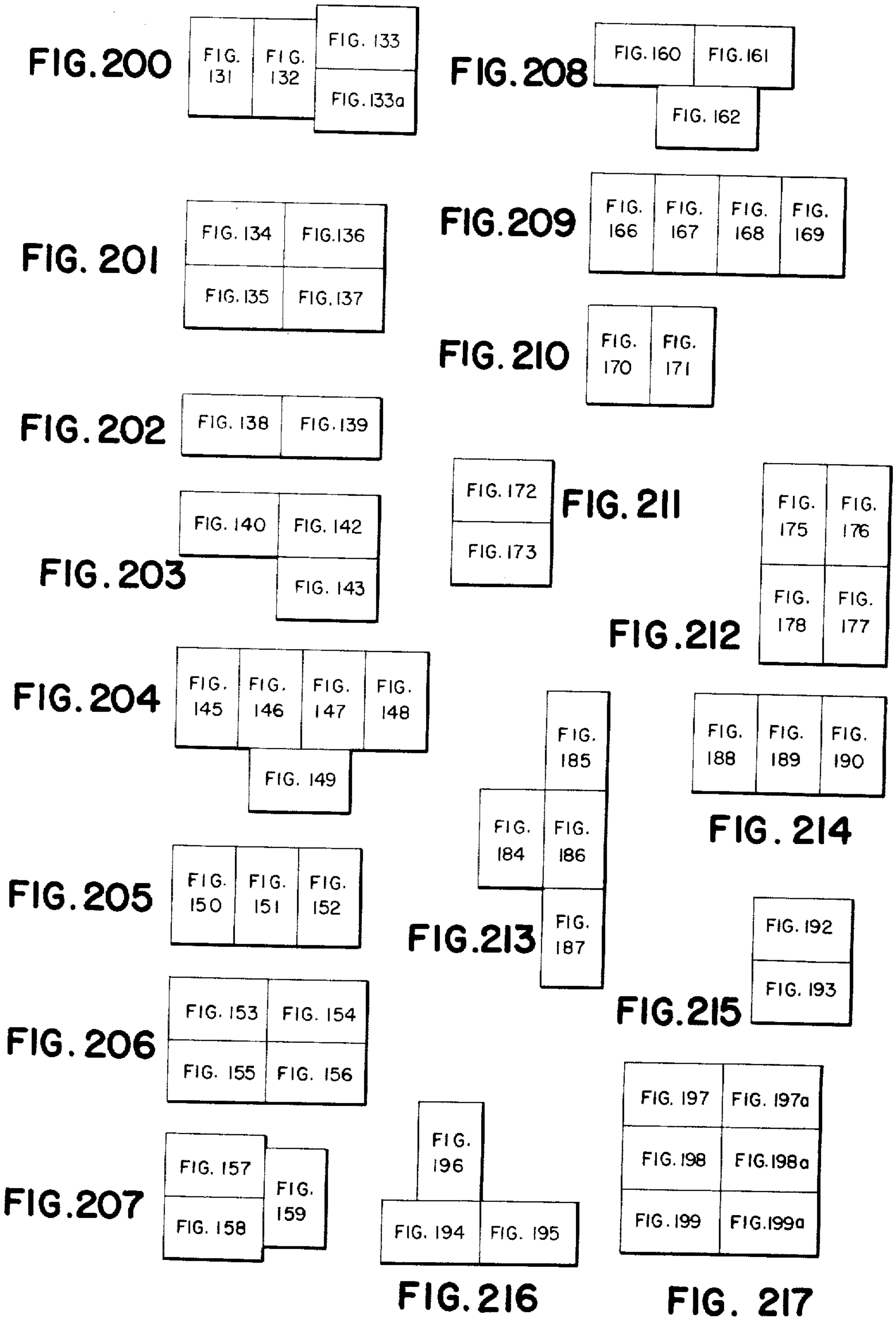
FIG. 200, FIG. 201, FIG. 202, FIG. 203, FIG. 204, FIG. 205, FIG. 206, FIG. 207, FIG. 208, FIG. 209, FIG. 210, FIG. 211, FIG. 212, FIG. 213, FIG. 214, FIG. 215, FIG. 216, FIG. 217

United States Patent Office 2,913,171

Patented Nov. 17, 1959

2,913,171

SORTER-COLLATOR FOR TAPE RECORDED DATA

Byron E. Phelps and Joseph J. Sochor, Poughkeepsie, and Arthur A. Kusnick, Wappingers Falls, N.Y., assignors to International Business Machines Corporation, New York, N.Y., a corporation of New York Application December 9, 1954, Serial No. 474,115

46 Claims. (Cl. 235—61.7)

This invention relates to means for processing data recorded on a continuous record media such as tapes, drums or discs. More particularly, the invention relates to an electronic system for processing data that has been recorded on such media.

The invention was developed in connection with the processing of data magnetically recorded on tape. The illustrative embodiment of the invention to be described herein will, therefore, be of a system for processing data magnetically recorded on tape.

The invention is embodied in an electronic system comprising a plurality of record input and output devices in which records may be read from input files and written on output files, a pair of data registers, an electrostatic data storage memory, and data comparators in which input data may be compared with output data, input data with remainder data and output data with remainder data. Herein the comparison operations to which the system is adapted impart thereto the functional qualities of a data sorter-collator, by which name the system herein may be designated in the interest of brevity.

A sorting operation is one in which a file of random records is rearranged into sequence or into groups according to a control character, while a collating operation is one in which the sequentially arranged records of two files are merged into a single file in which the records are arranged in sequence. Both of these operations are based on a comparison of record items being processed.

The sorter-collator herein is designed to perform any function dependent on the comparison of pairs of records. The variety of these functions is limited only by the skill of the operator, since all of the control signals generated within the system are rendered available to the operator at a control panel where the wiring performed by the operator determines the nature of the operation to be performed by the system.

The various useful applications of the invention can be classified generally according to one of the following groups of functions.

The system can be used to file two sets of records together. This operation is referred to as merging, that is, two sets of records are filed or merged together according to a control field. For example, in a payroll application, at the end of a pay period, the daily payroll records must be in sequence by employee number. A peak load sorting operation can be eliminated by a daily filing operation. At the end of each day, therefore, the daily payroll records can be sorted and then filed by employee number behind the records of a preceding day.

To the basic merging operation can be added the selection of particular records. When filing master rate records, for example, in front of detail records by employee number, there may be inactive rate records (rate records for which there are no detail records), or missing rate records (detail records for which there are no rate records). These extra rate and detail records can herein be selected from the files during a merging operation. At the time the filing or merging operation is performed, the system herein is adapted to check the sequence of the records being processed.

Another function of the system is the matching of two sets of records according to a control field. For example, master name records and payroll summary records can be matched by employee number to be sure there is a name record for each employee who has a payroll record, and likewise payroll records for each corresponding name record.

A further classification of the functions of the system herein includes a variety of operations based for the most part on multiple column selection. A file of records, the records of which are not in any particular sequence, can be searched for a specific control number such as an employee number, or for records of or under a specific control number, such as the records of hours worked exceeding 40, for example. It is also possible herein to set up two limits for a control field, an upper and lower, and to select or substitute all records between these two limits.

In addition to the sorting of random files of records and the collation of files of records, the system herein is also capable of functions as will in part appear as the description develops, and as will be apparent to those skilled in the control and use of systems of this general type. For example, the system can be employed for the duplication of an input file of records on one or more output files, without reference to the comparison of the records so duplicated.

It is, therefore, a principal object of the invention to provide a machine comprising means for reading magnetically recorded records from one or a pair of input records, means for storing records so read, means for comparing records during the course of the processing thereof, and means for magnetically reinscribing processed records on the selected one of several output files.

It is a further object of the invention to provide a system in which record sorting, collating and attendant operations are performed in an entirely automatic manner.

It is a further object of the invention to provide a machine capable of checking the sequence of records read from either one or a pair of input files to insure that no record is out of order in either file.

Another object of the invention resides in the provision of a machine for processing magnetically recorded records in such manner that selected records may be written on an output file following the writing thereon of a preceding control record.

It is a still further object of the invention to provide a machine able to merge the sequentially arranged records of a pair of input files into a single output file containing all the records in a single sequence.

It is frequently necessary to select records from a file during a record merging operation. For example, if payroll earning records are to be merged behind name records preparatory to the running of payroll checks or the preparation of a payroll register, it is necessary that for each name record there be a payroll record, and for each payroll record there be a corresponding name record. Thus, it may be desirable to segregate all records which have no complement. It is, therefore, a further object of the invention to provide a machine capable of selecting and either ignoring or reading out to a reject file any record normally comprising one of a pair of records that is without its complement.

It is a further object of the invention to provide a system for matching control fields of input records, write upon one output file the records that are matched, and write upon a second output file the unmatched records.

It is a further object of the invention to provide a record processing machine which is capable of identifying and selecting particular records from a file of records, whether such records are in sequence or not, on the basis of any identifying character within the records so processed. A file of records can be searched herein for a particular control character. For example, a master name file, in sequence by employee numbers, can be searched for one specific social security number. Such operation may be performed by placing a control number in one of the comparators and comparing those of the employee records of a file with the control number until the desired number is located.

It is also desirable sometimes to select all records which have a control field between two limits, i.e. records greater than the lower limit, but less than the upper limit. It is, therefore, another object of the invention to provide a record processing machine which can select all records within a predetermined range and reinscribe such selected records on a selected output file.

It is a further object of the invention to provide a machine which will not only check the sequence of records, but which will also select any non-sequential records and stop the processing operation and/or write such non-sequential records on a selected output file.

A still further object of the invention consists in the provision of a machine capable of reproducing the records of a single input file on a plurality of output files.

Further, it is an object of the invention to provide a machine capable of eliminating data within a specified control field of an input record during the process of reinscribing such data to an output file, or to substitute new data in a record from which certain data has been eliminated.

It is another object of the invention to provide a system for processing data, whereby a long record on an input file may be sub-divided into two or more shorter records, thereby rendering such sub-divided records compatible with punched record card conversion operations.

It is a still further purpose of the invention to provide a record processing system wherein data, either source data or correction data, may be manually entered into the process and written upon an output file or files.

It is a specific object of the invention to provide a system, such as indicated, in which the data to be processed is read from an input tape or tapes upon which the data is magnetically recorded, and from which the processed data is magnetically transcribed to an output tape or tapes.

Additional important objectives of the invention will be stated as the description thereof proceeds, and others will be apparent to those skilled in the art upon reading the detailed specification in light of the drawings forming a part of this application. In the drawings, like reference numerals indicate like parts, and Fig. 1 is a front elevational view of the machine showing a pair of input tape drives at the left, a main control frame at the center and a pair of output tape drives at the right;

Fig. 1*a* shows the lay-out of the control buttons and indicator lights of the tape drive control panel;

Fig. 1*b* shows the lay-out of the control buttons and the indicator lights of the main frame control panel;

Fig. 2 is a functional diagram of the tape drives and the main frame constituting the invention, indicating the flow of data throughout the system. The figure diagrammatically illustrates a pair of input tape drives, a pair of output tape drives, the main frame which has therein a pair of electrostatic storage memories, input/output, input/remainder and output/remainder comparators, and a character register between each set of tape drives and the main frame;

Fig. 4 is a table showing the sorter-collator modified binary code known as the "excess 3" code and the interpreted meaning of the various code combinations;

Figure 10:
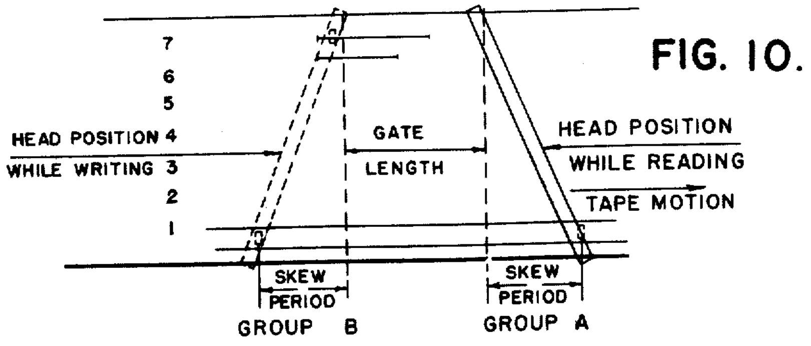
Fig. 10 is a diagrammatic representation of the factors entering into the calculation for determining the proper length of a skew gate to avoid the condition of Fig. 9.
Figure 10A:
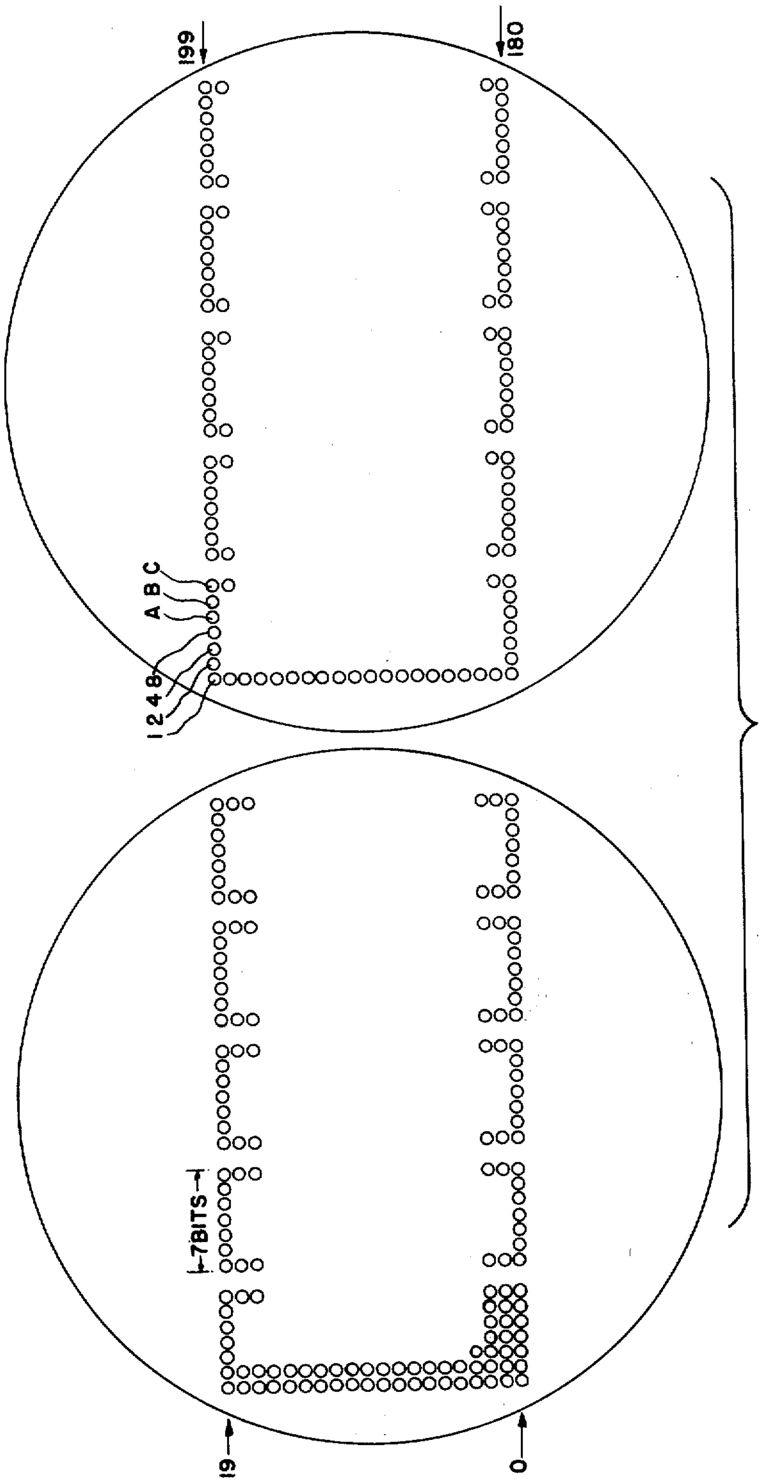
Figures 16, 17:
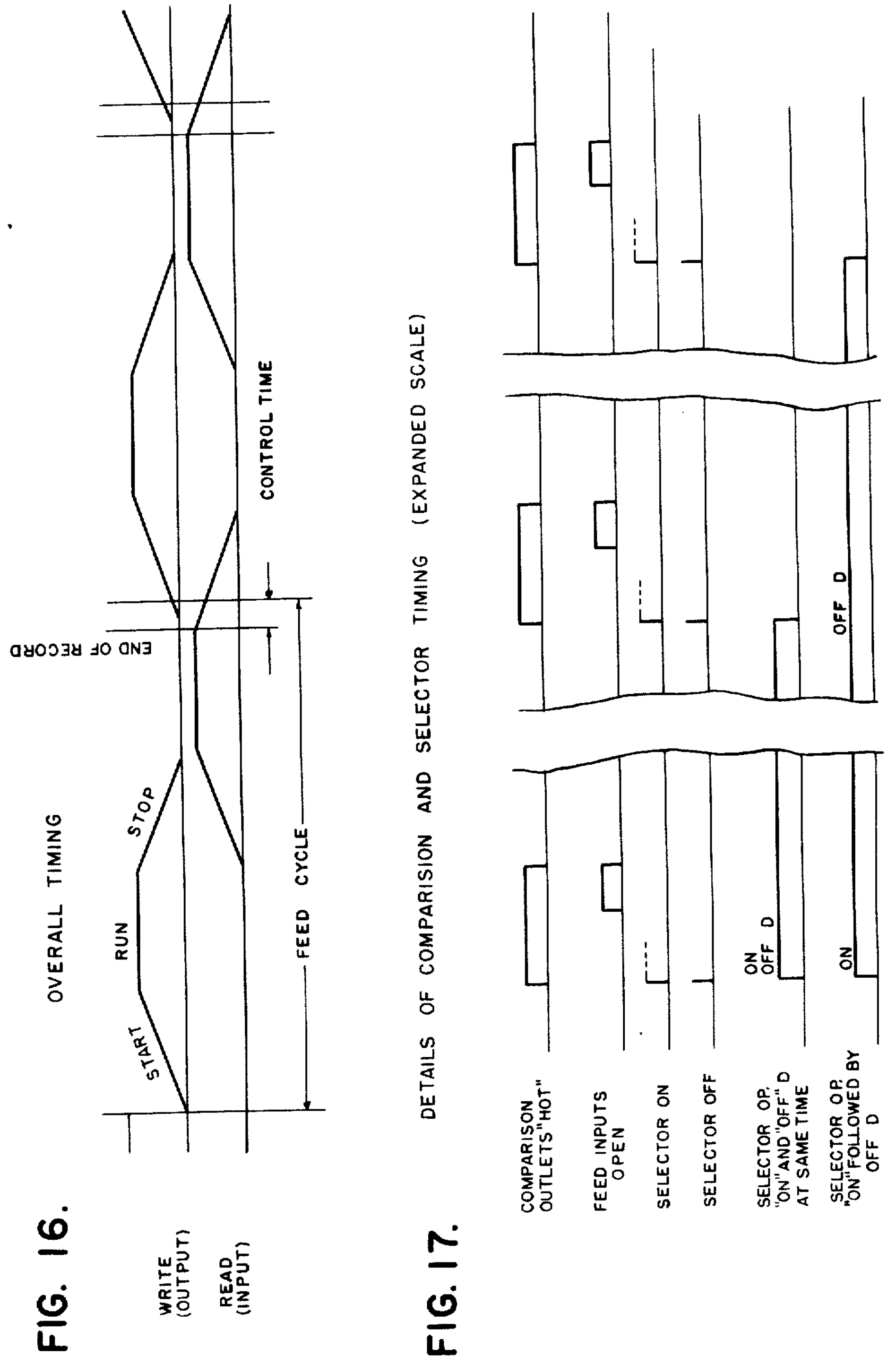
Figure 18:
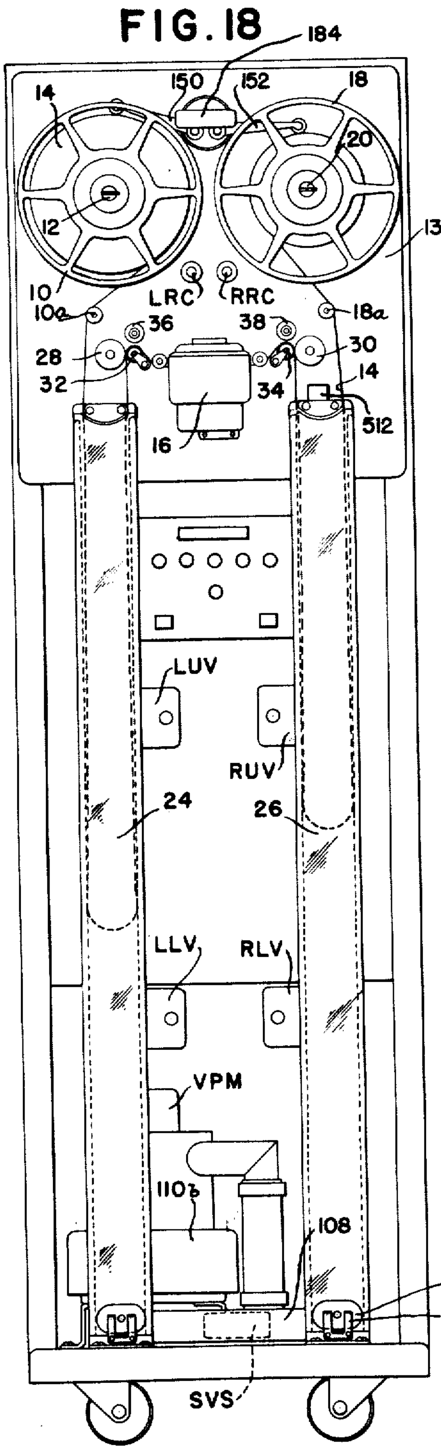
Figure 19:
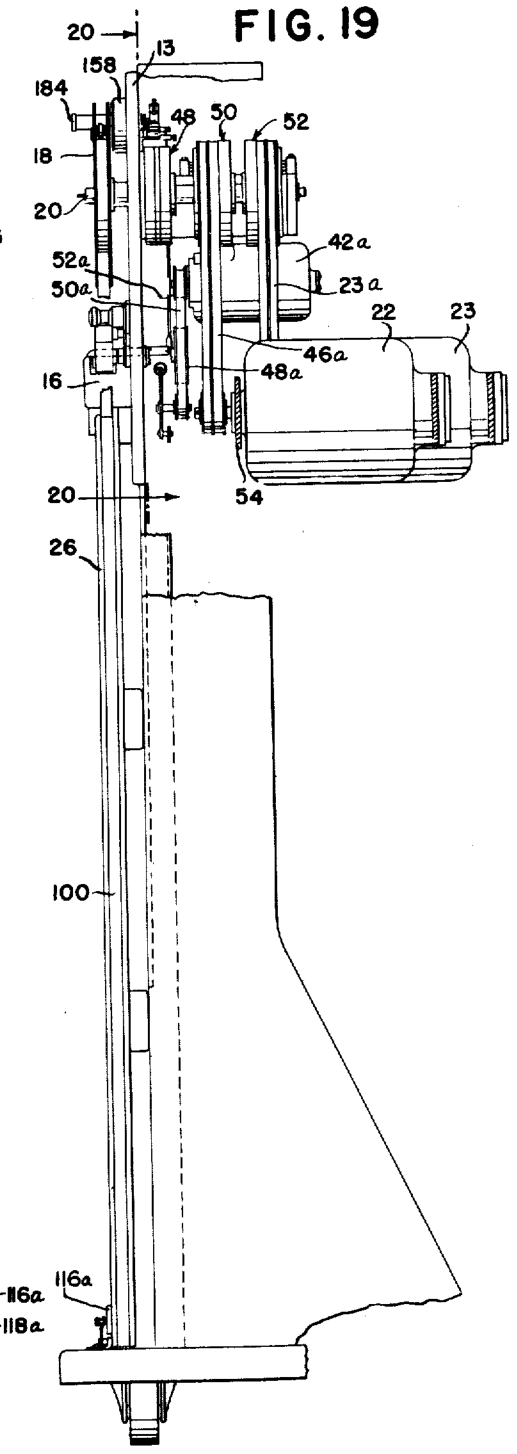
Figure 20:
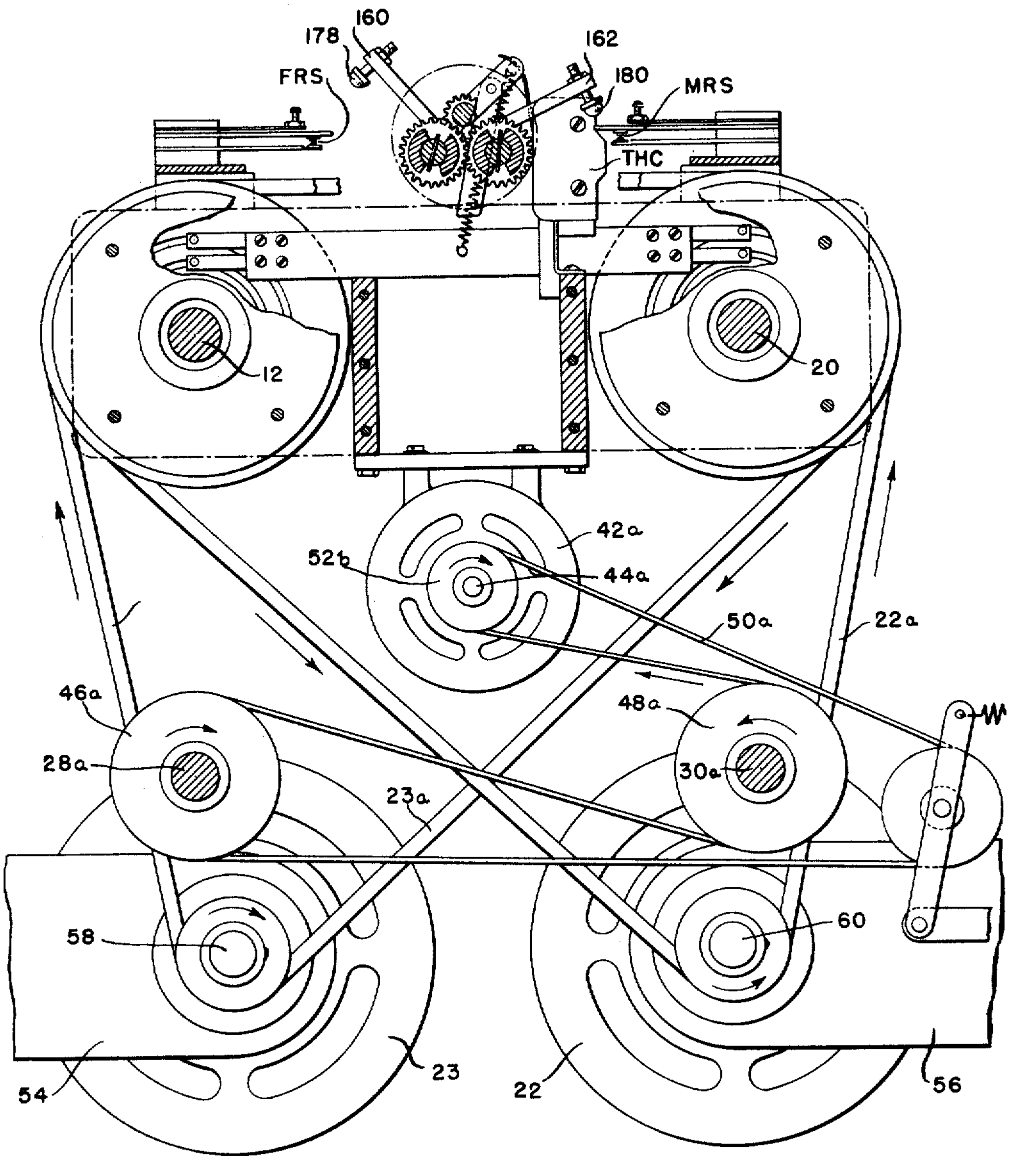
Figures 21, 22:
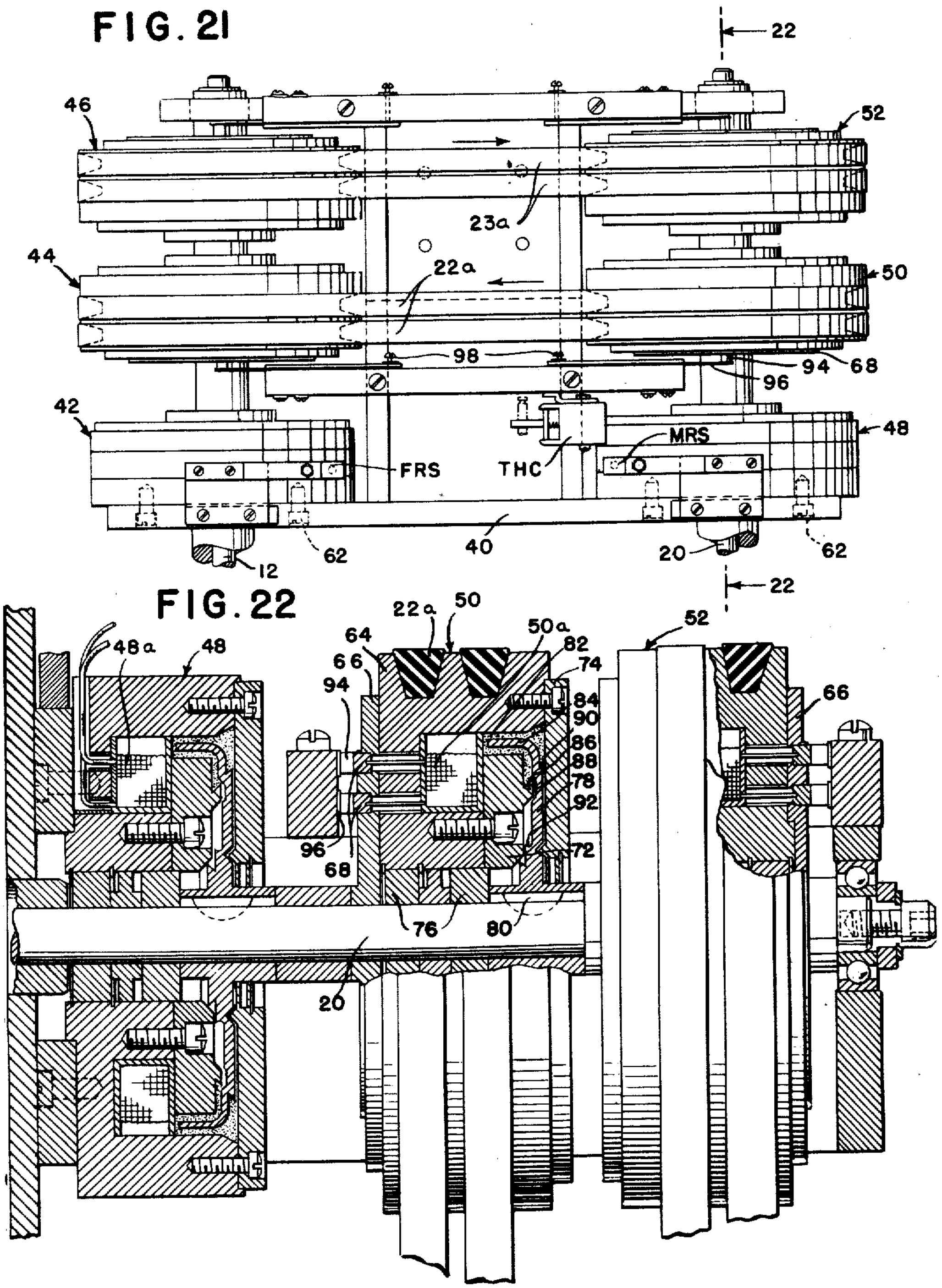
Figures 23, 24, 25, 26:
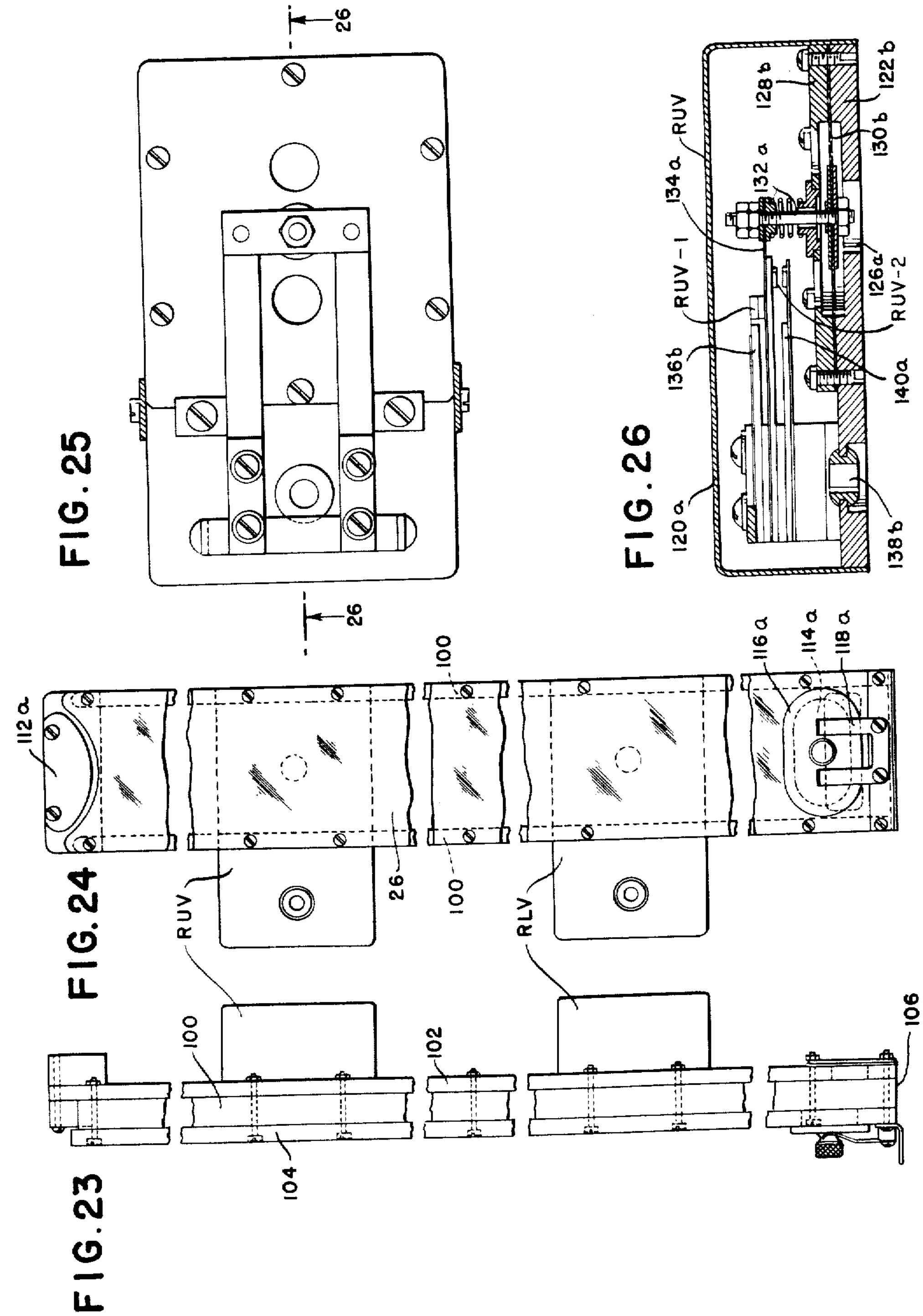
Figure 27:
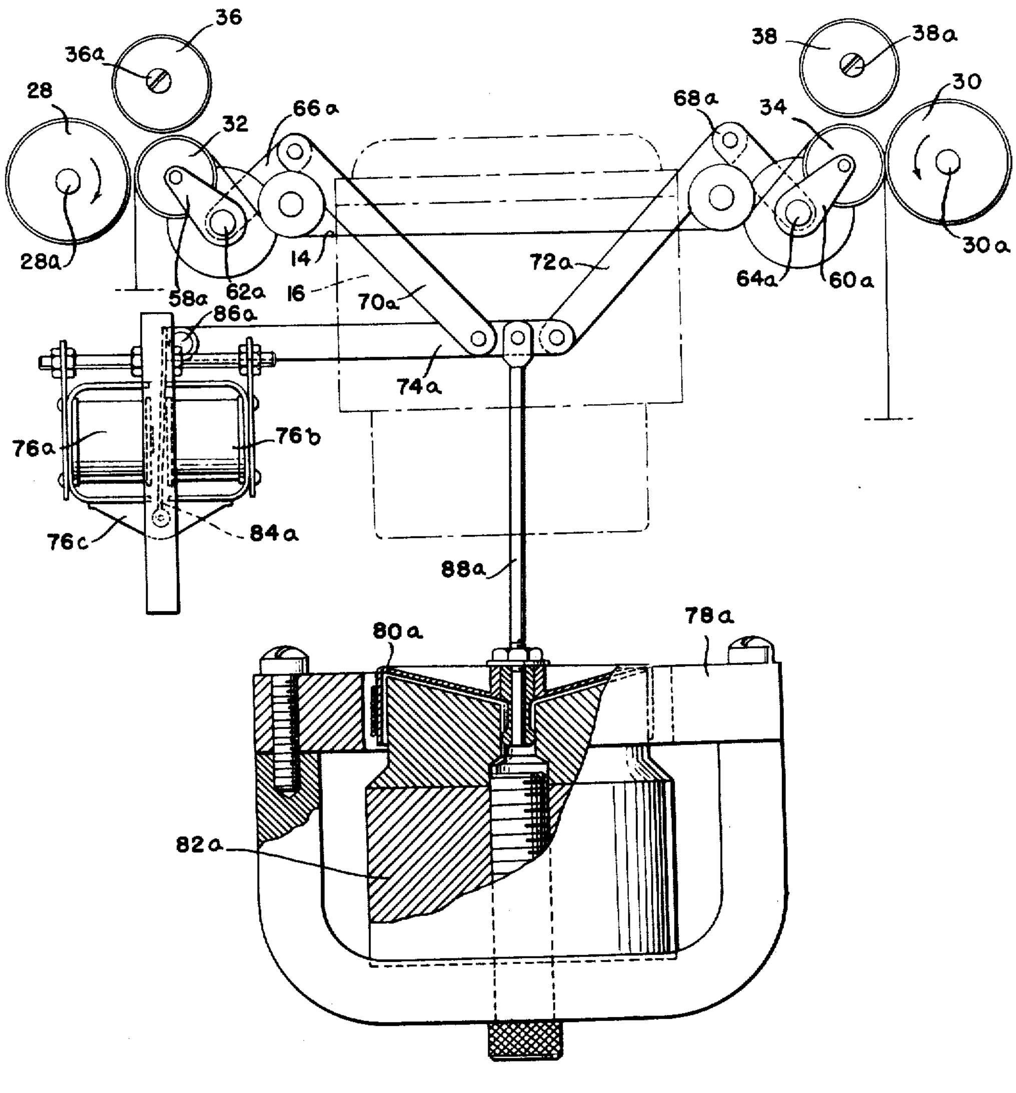
Figures 28, 29:
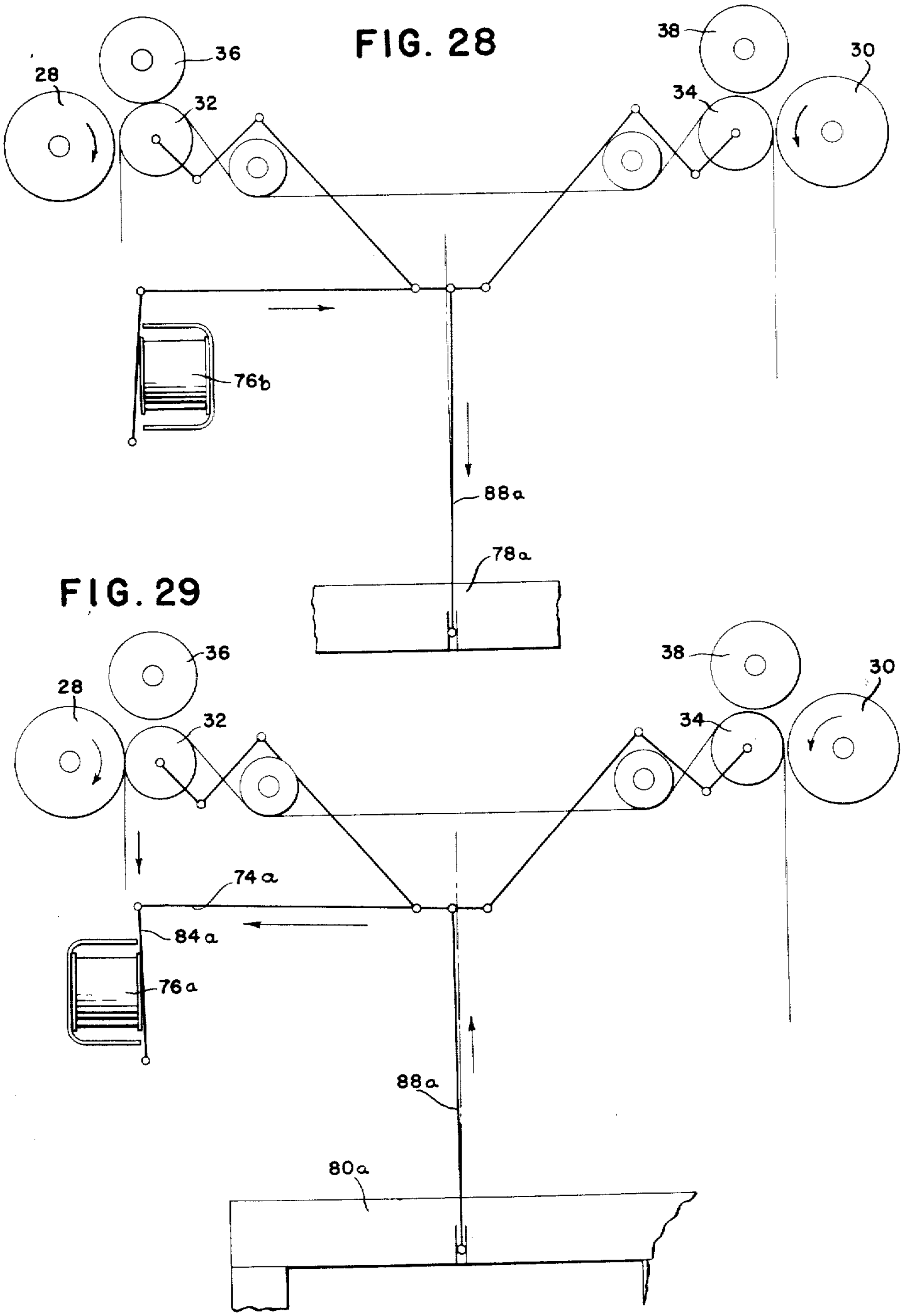
Figure 30:
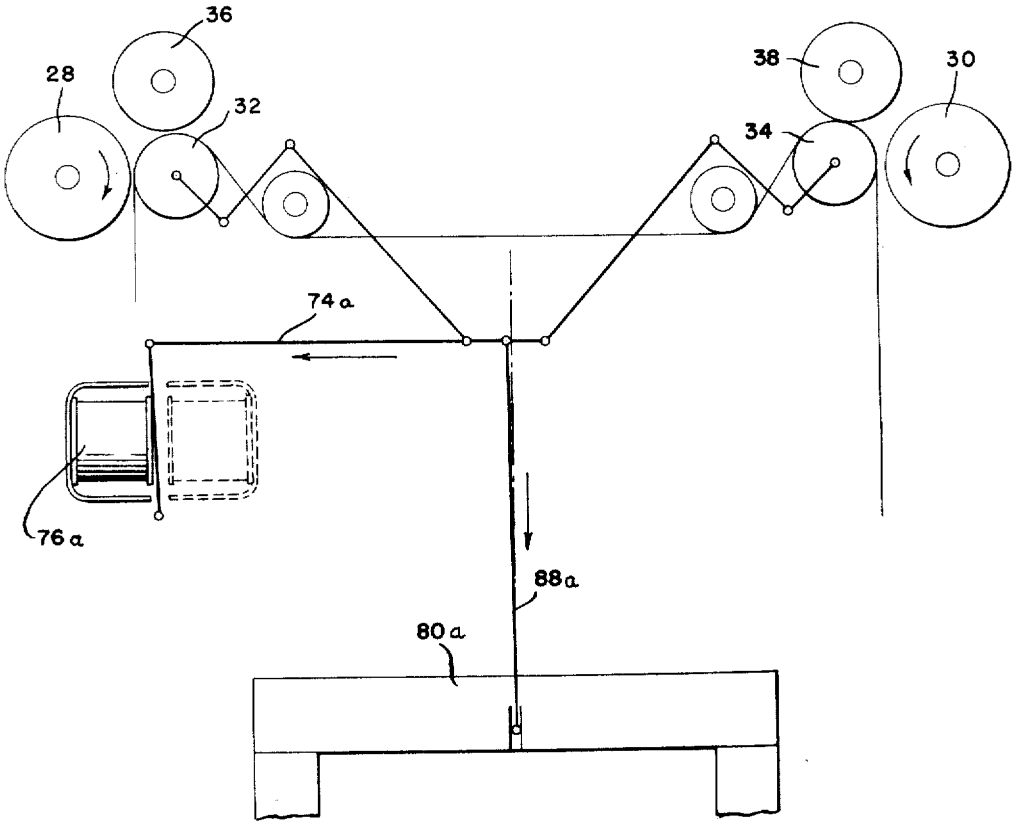
Figures 31, 32:
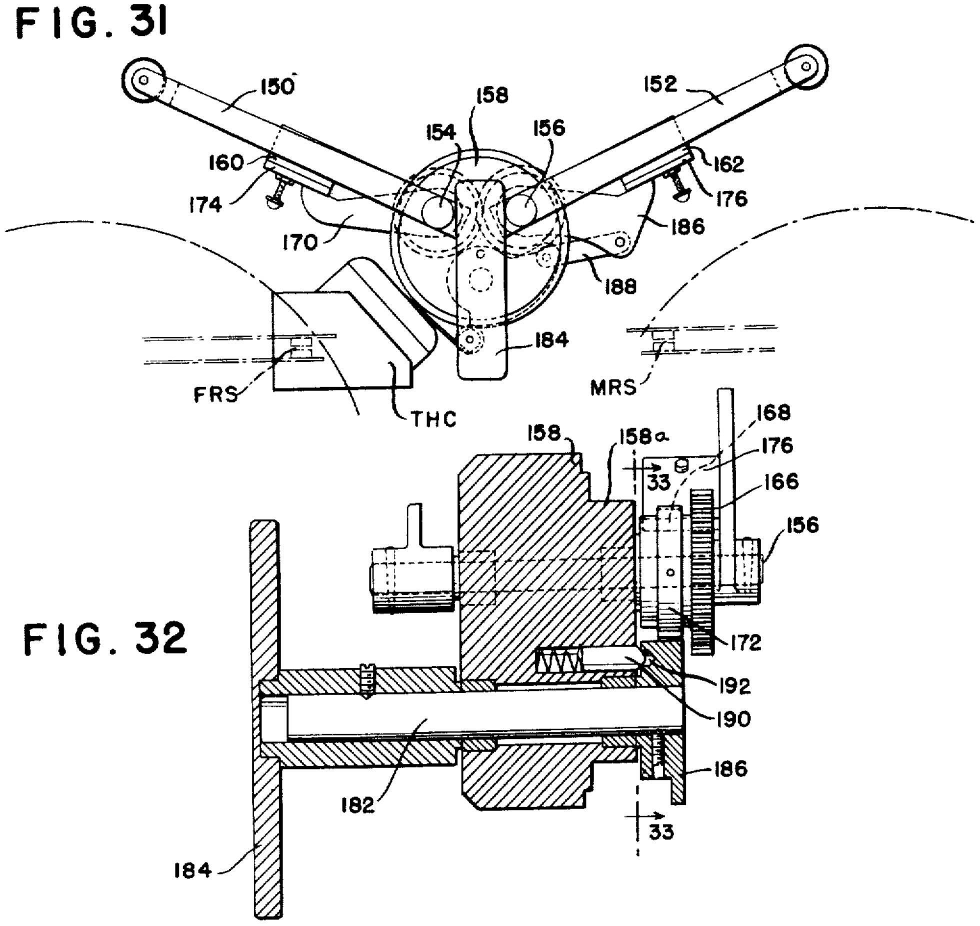
Figure 33:
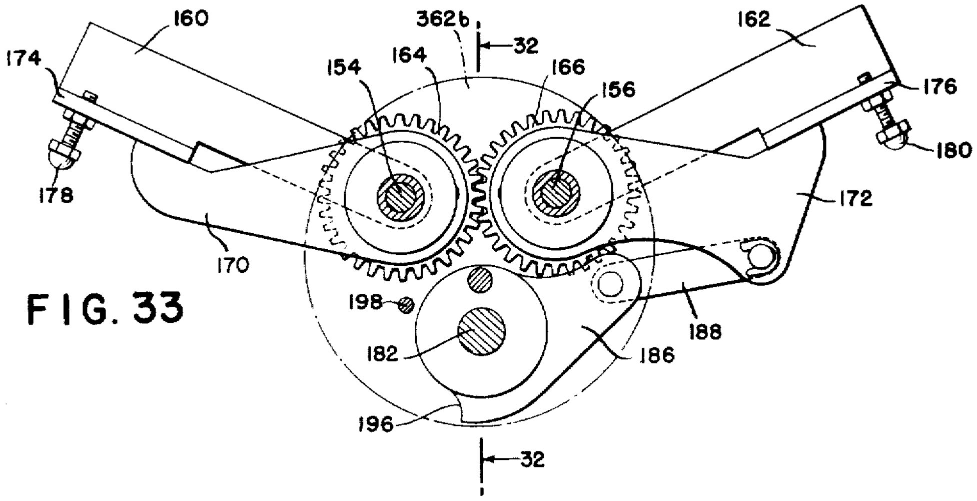
Figures 34, 35, 36:
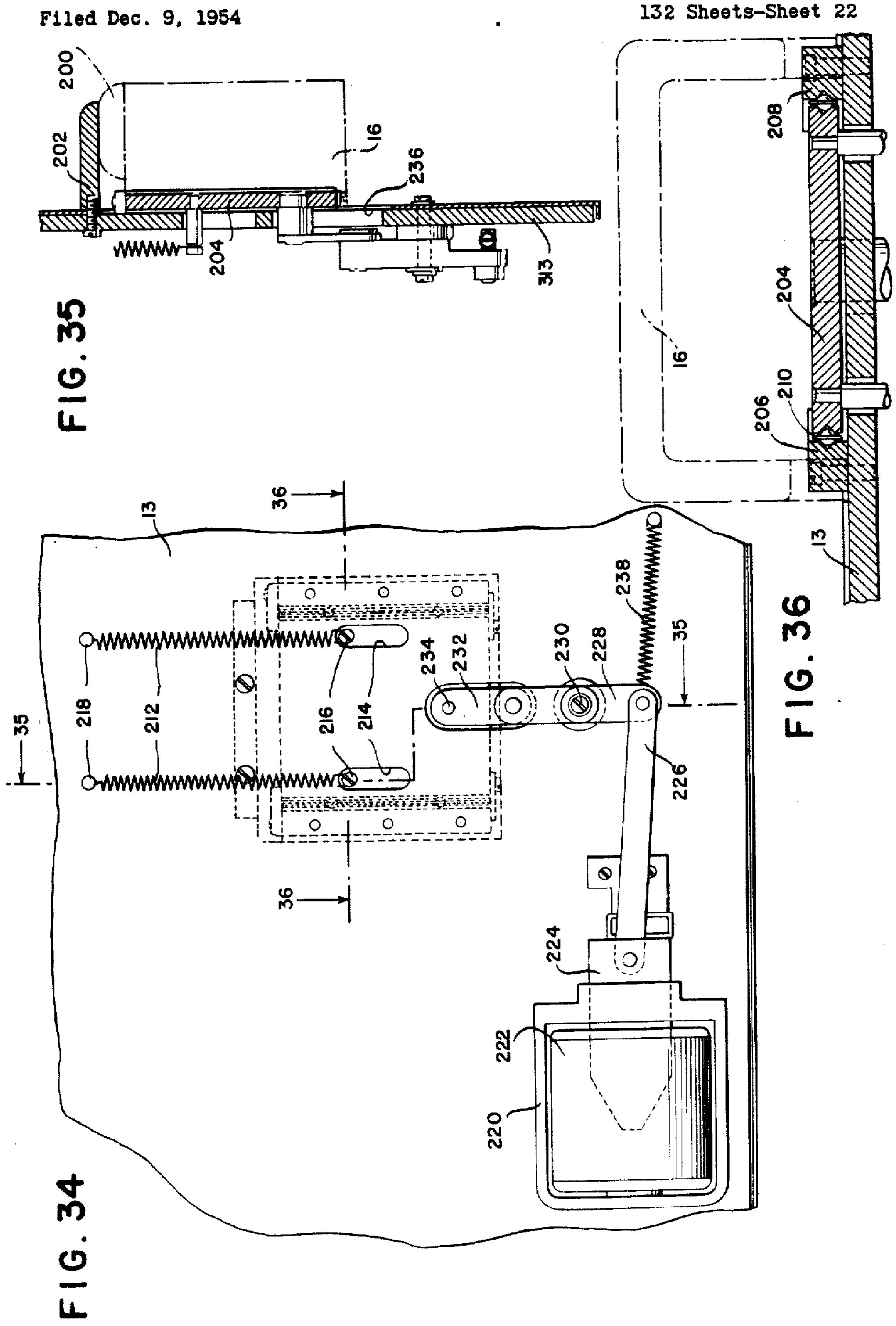
Figure 37:
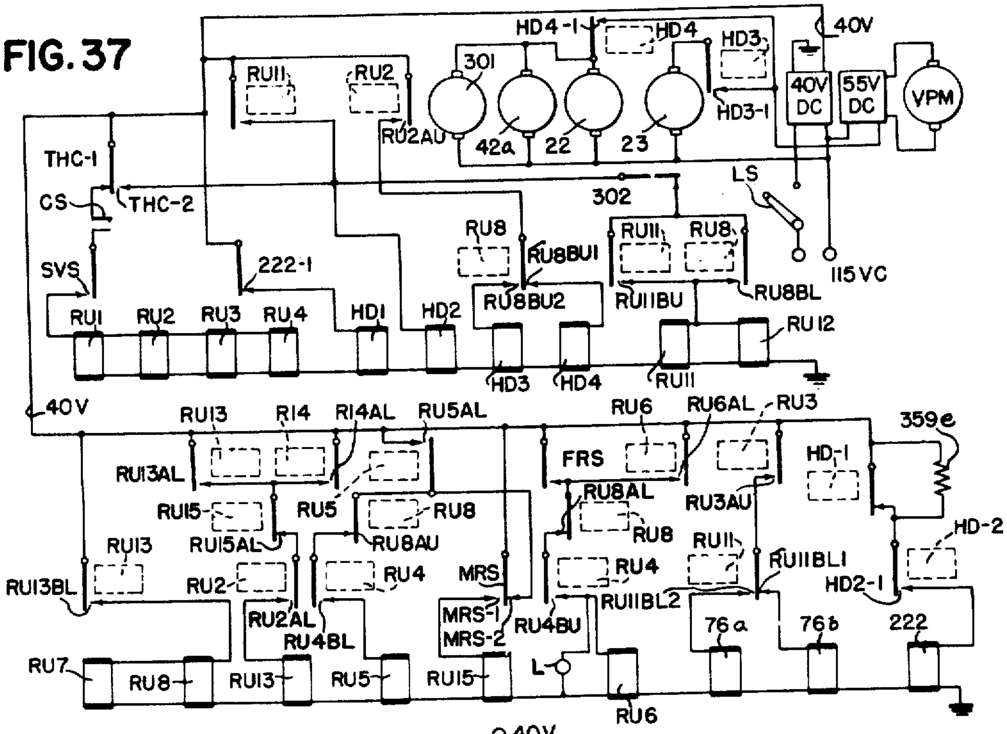
Figure 38:
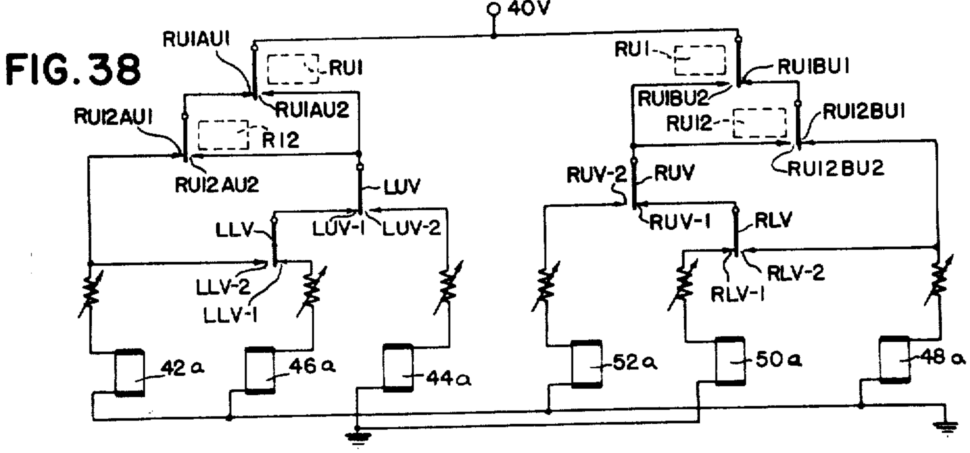
Figures 39, 40, 41:
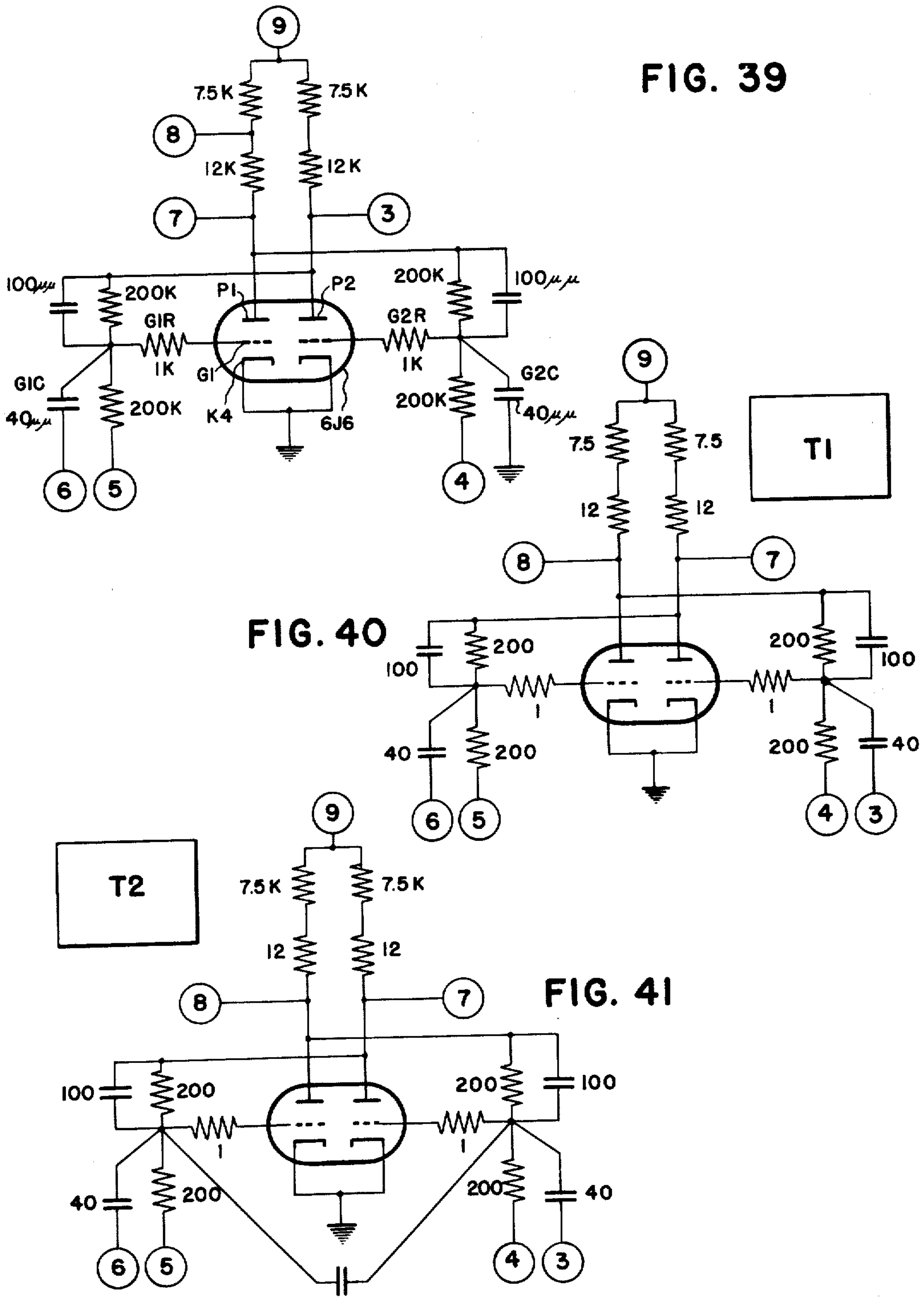
Figures 42, 43, 44:
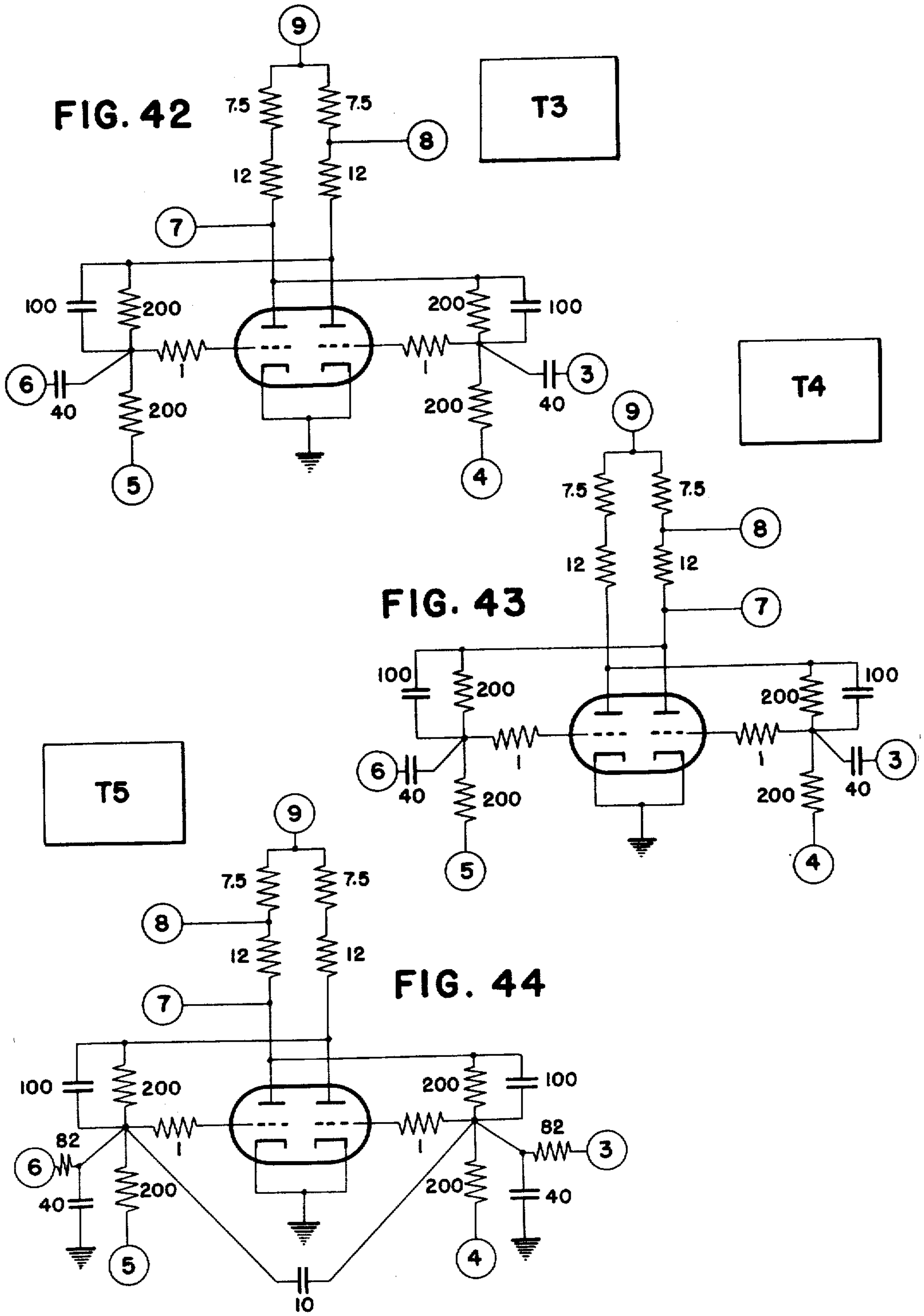
Figures 45, 46, 47:
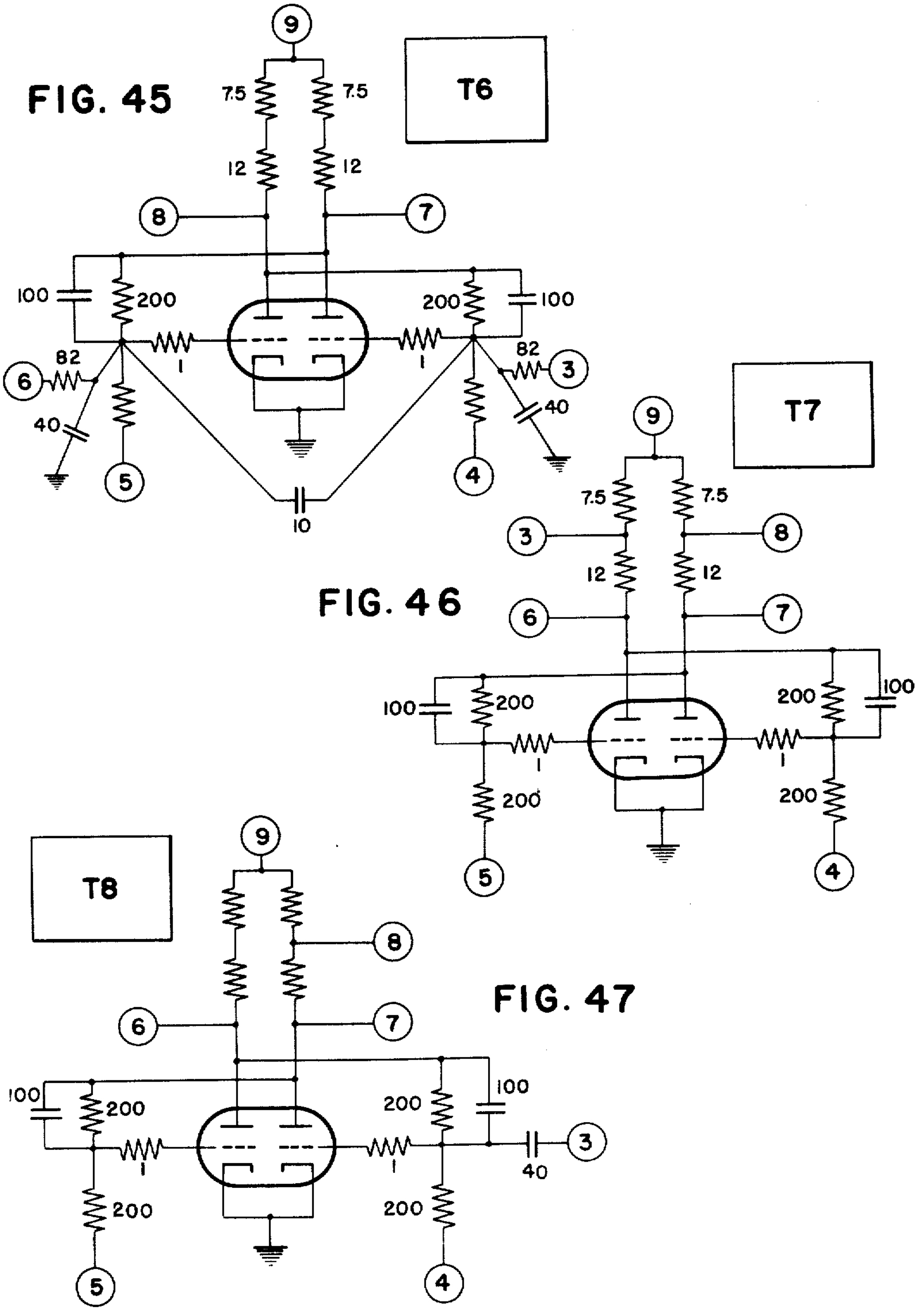
Figure 48:
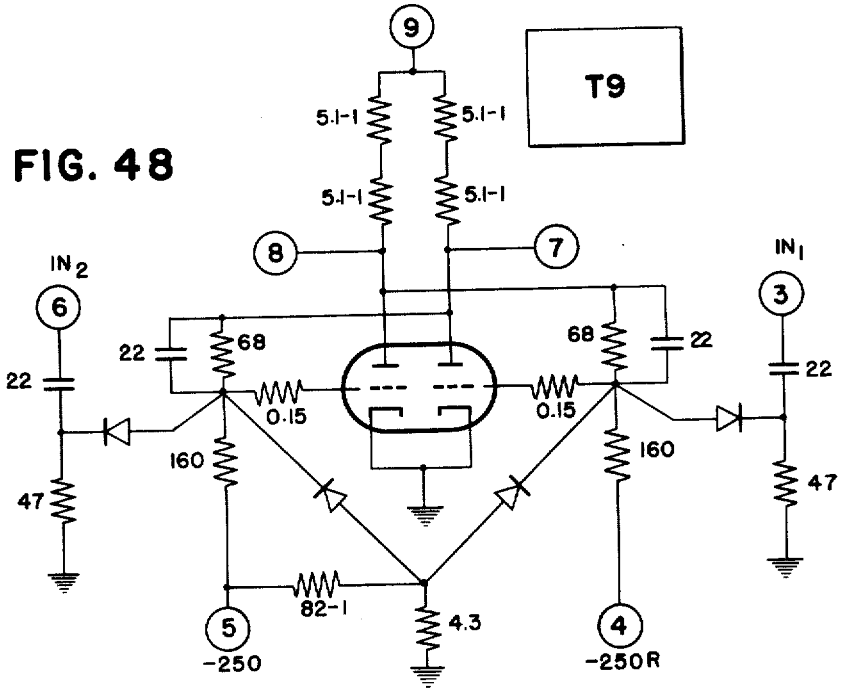
Figure 49:
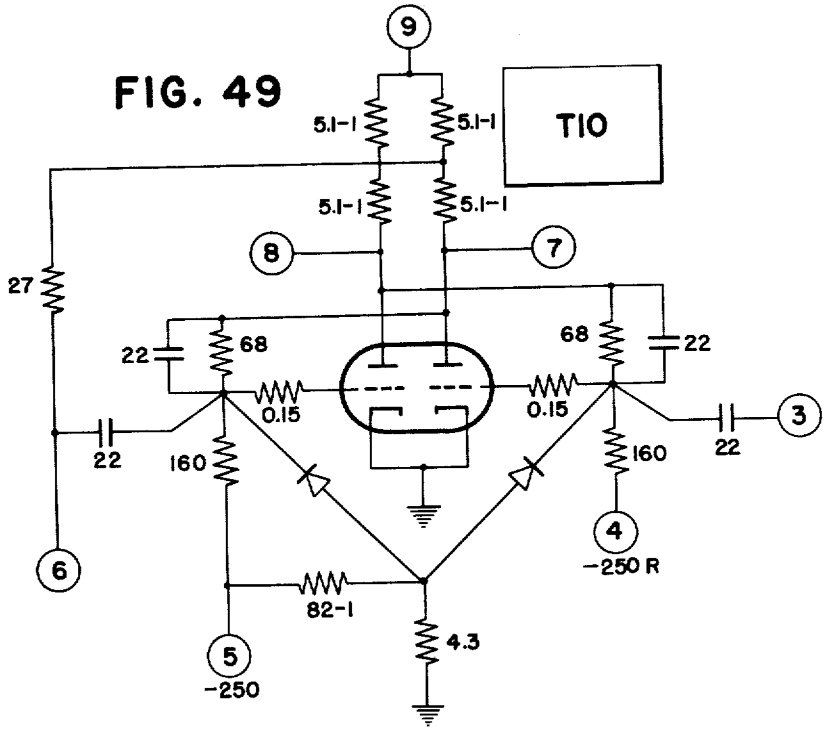
Figure 50:
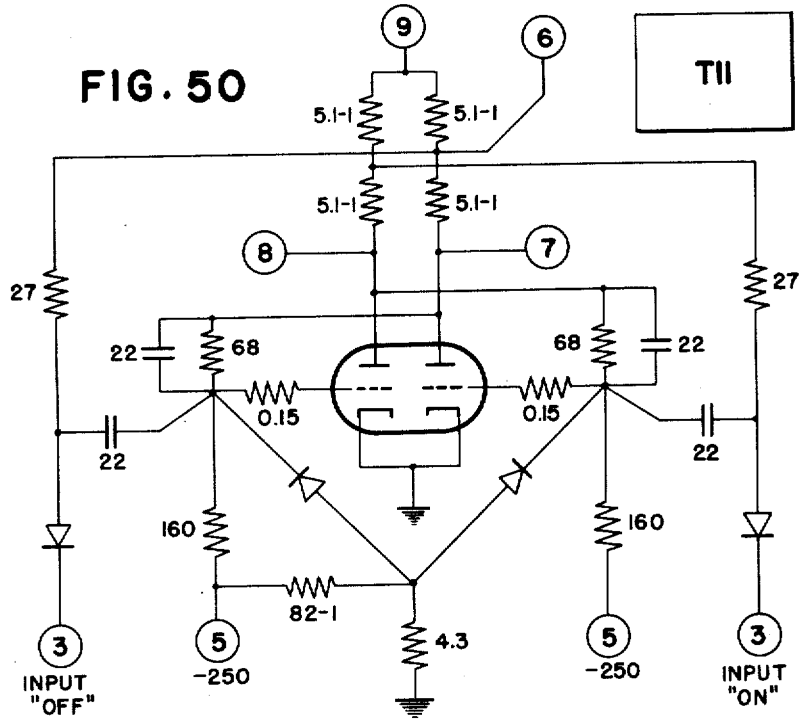
Figure 51:
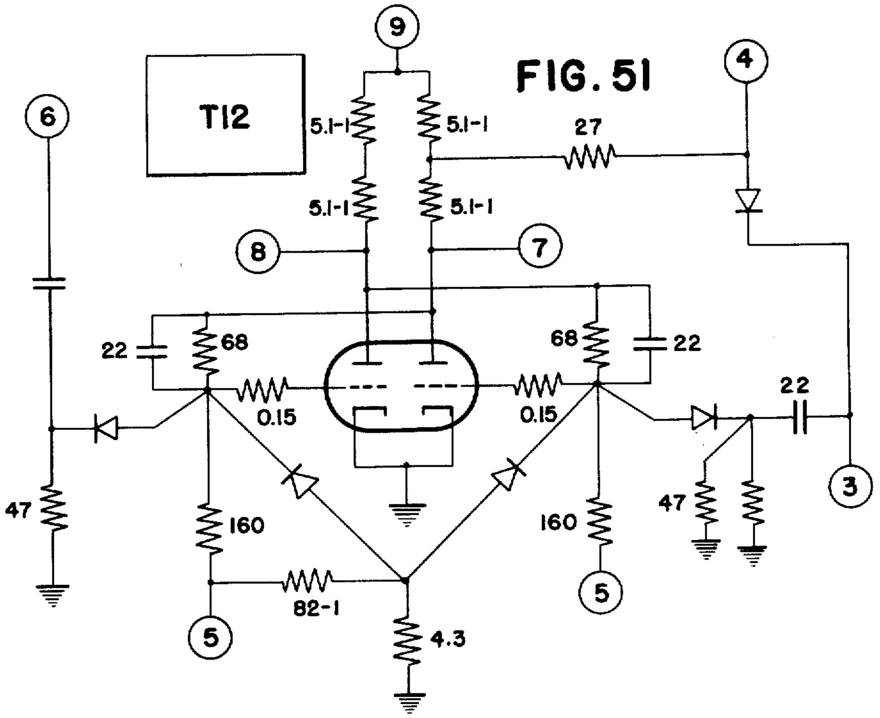
Figure 52:
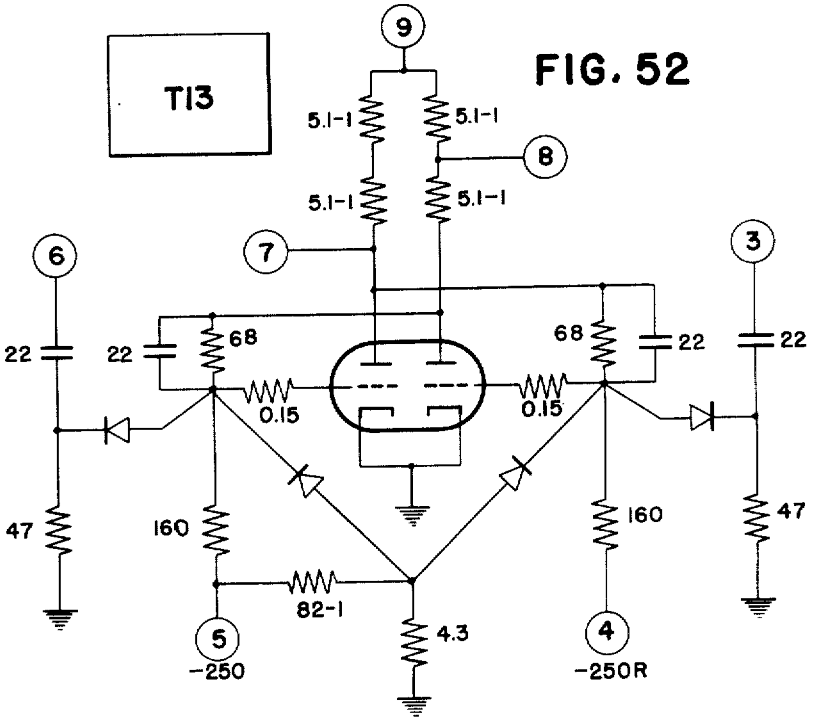
Figure 53:
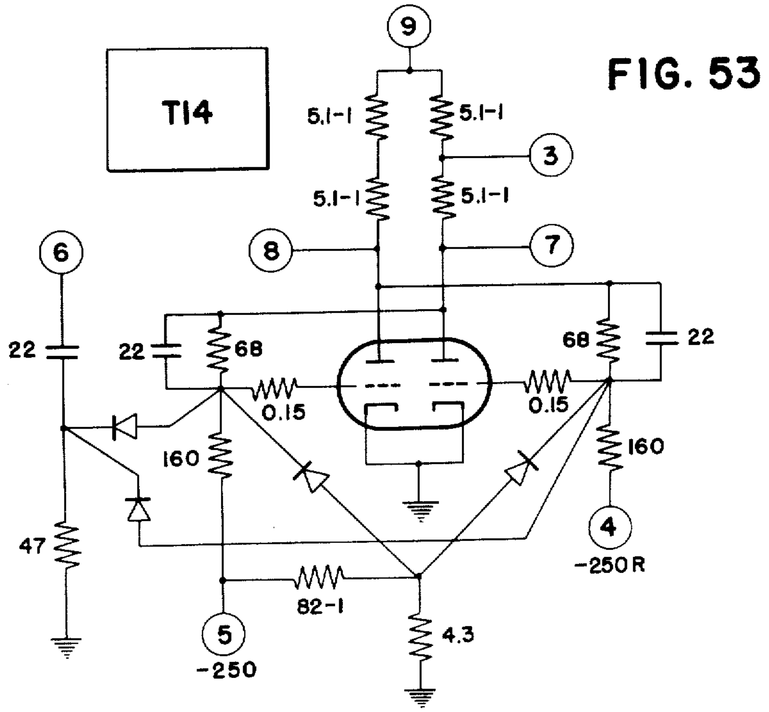
Figures 54, 55, 56:
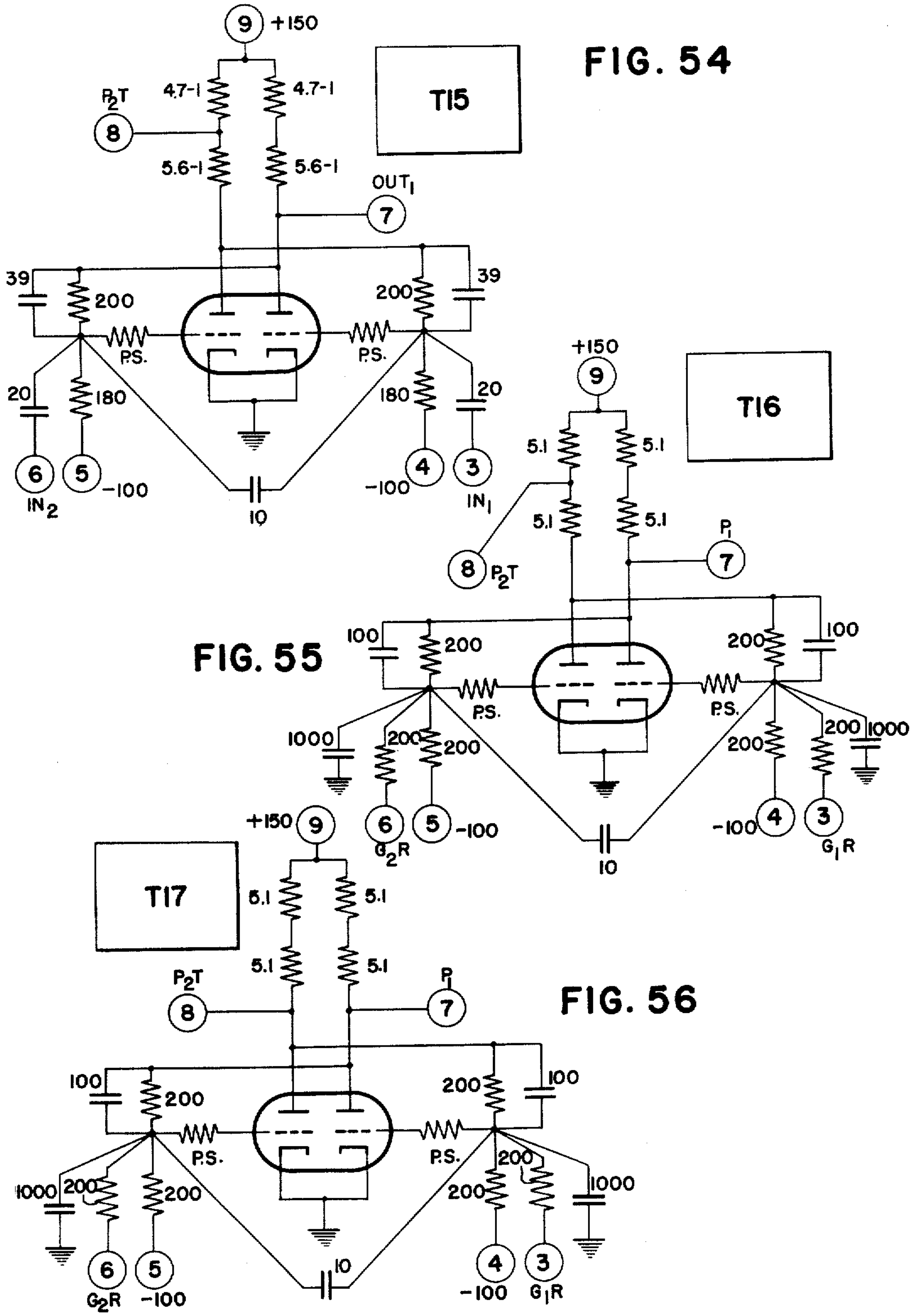
Figure 57:
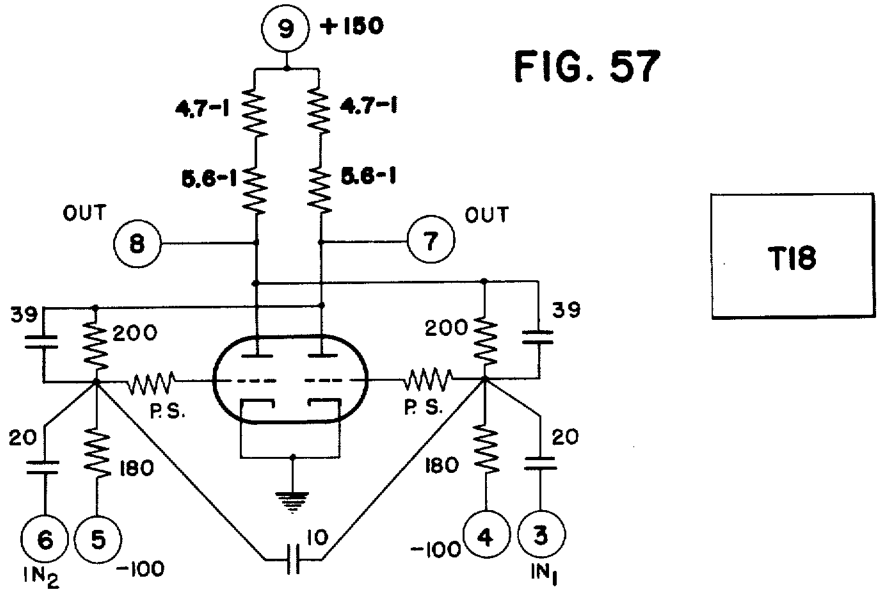
Figures 58, 59:
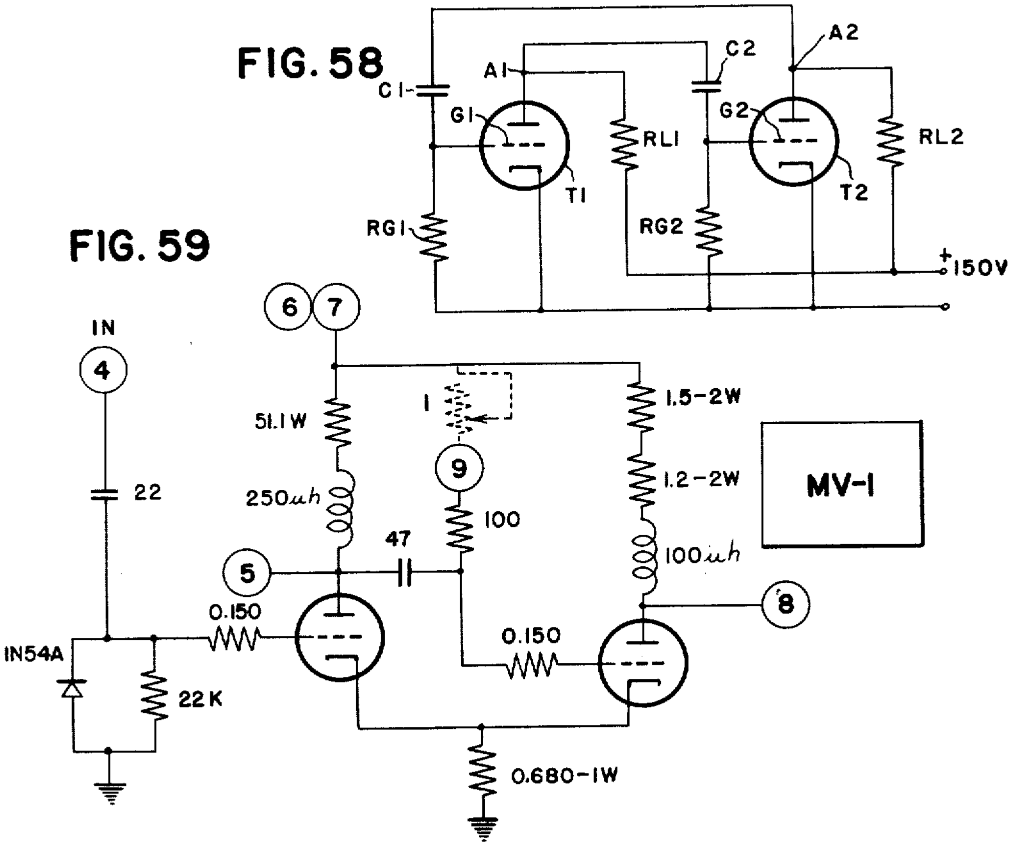
Figures 60, 61, 62:
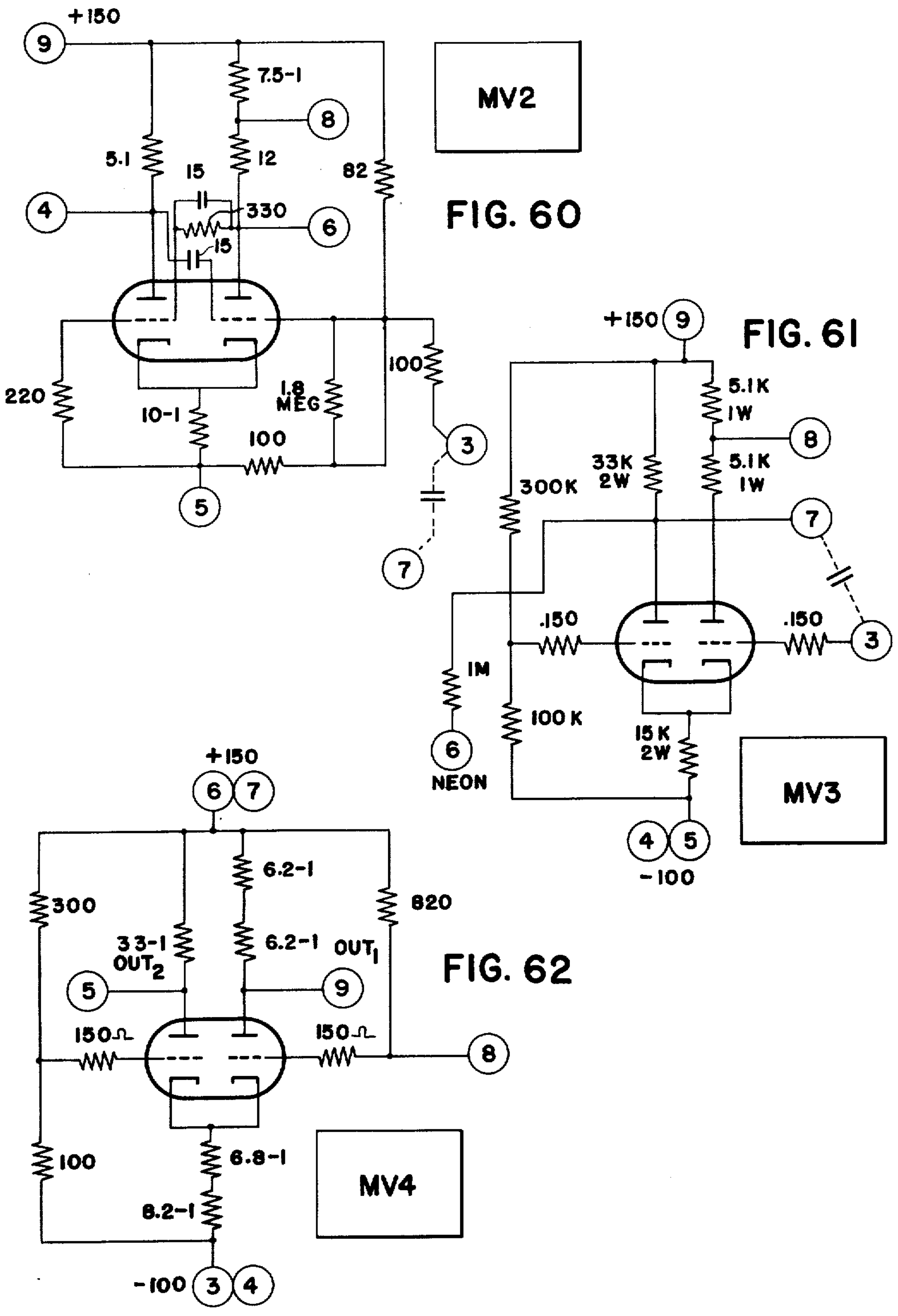
Figures 63, 64, 65:
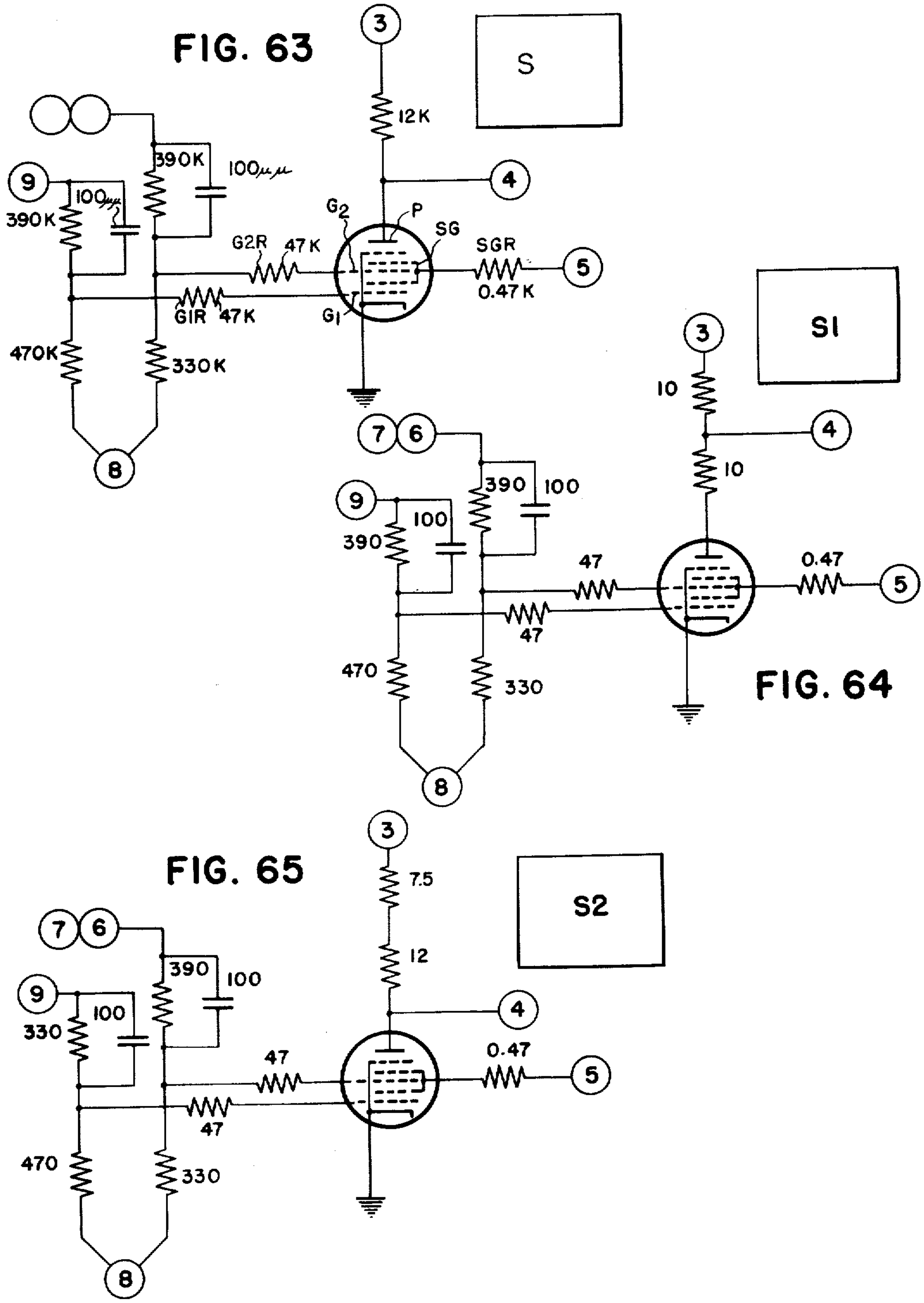
Figures 66, 67, 68:
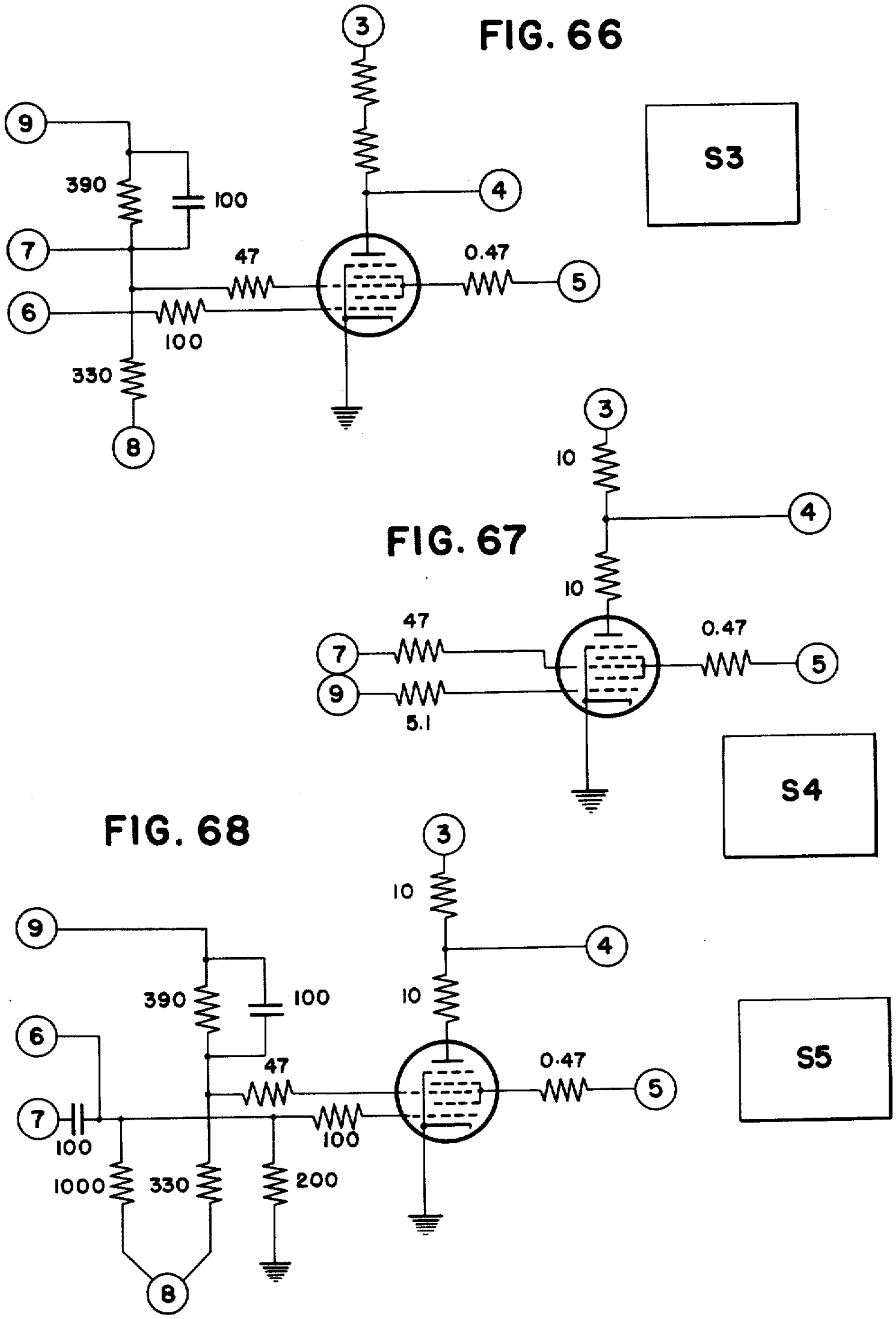
Figure 69:
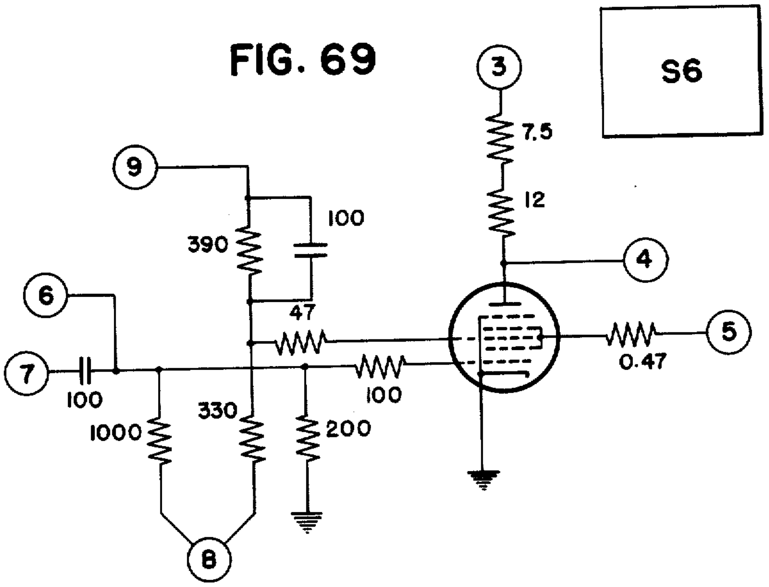
Figure 70:
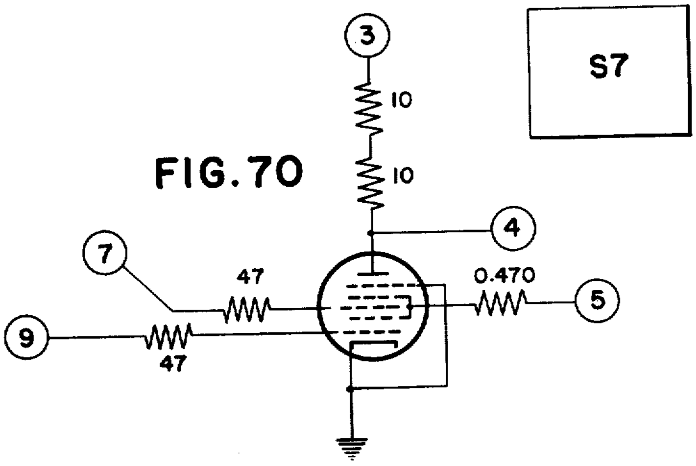
Figure 71:
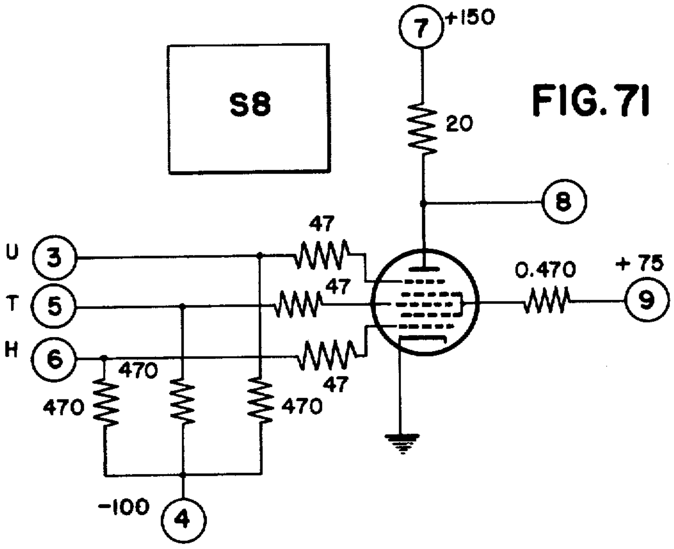
Figure 72:
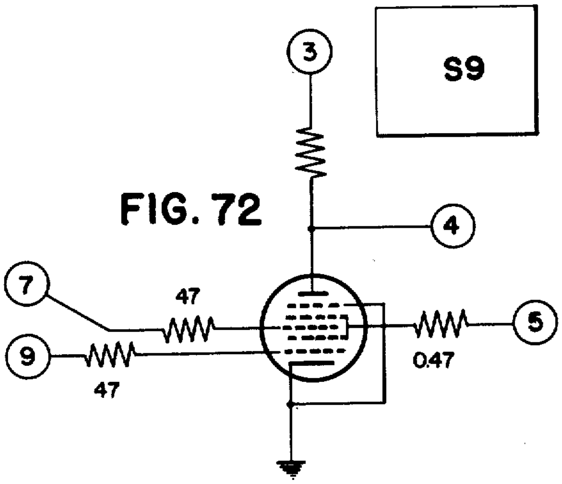
Figure 73:
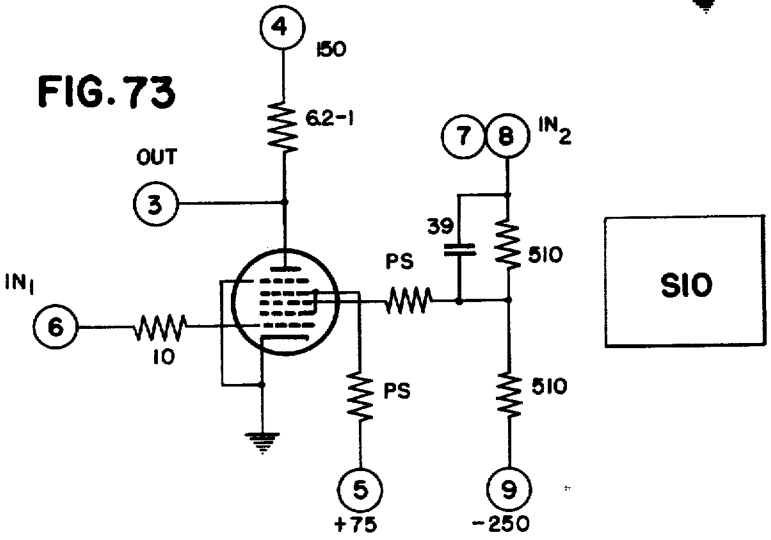
Figure 74:
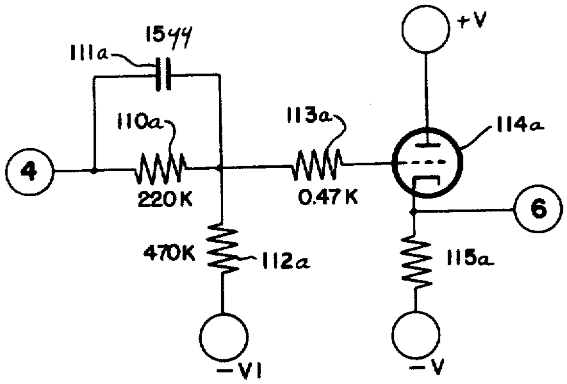
Figures 75, 76:
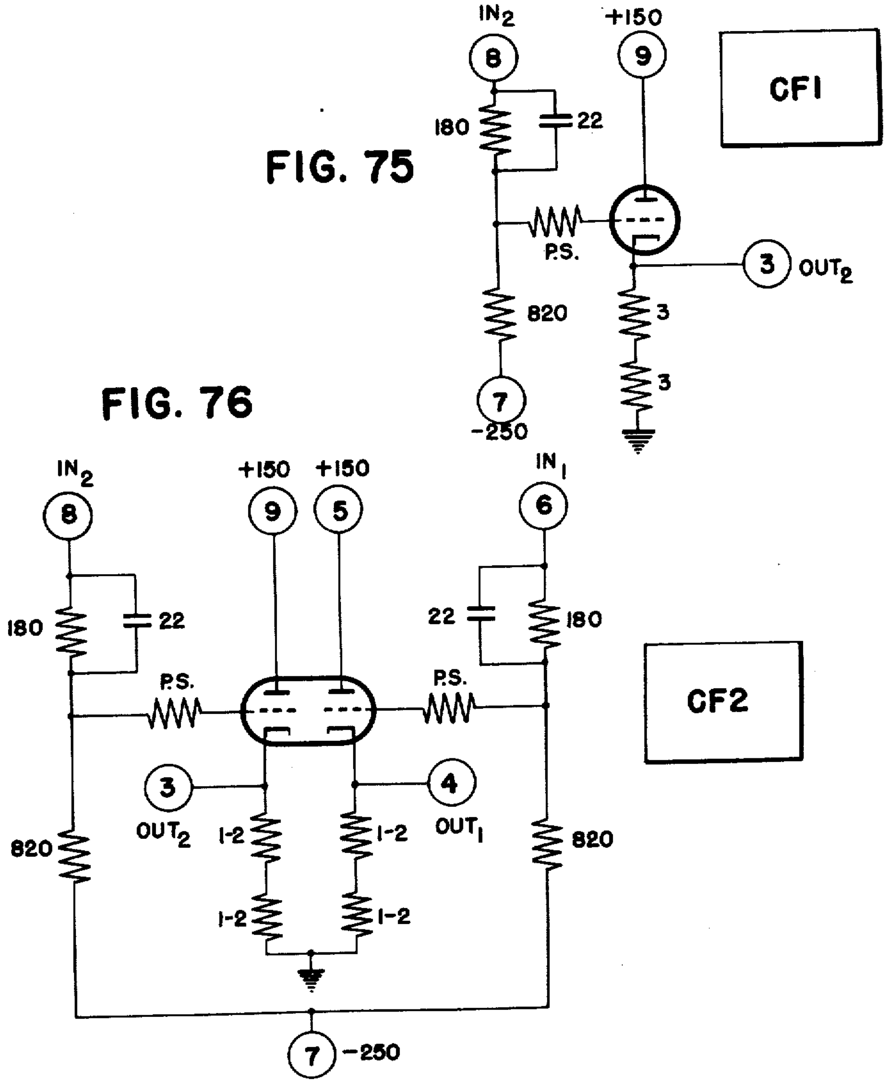
Figure 77:
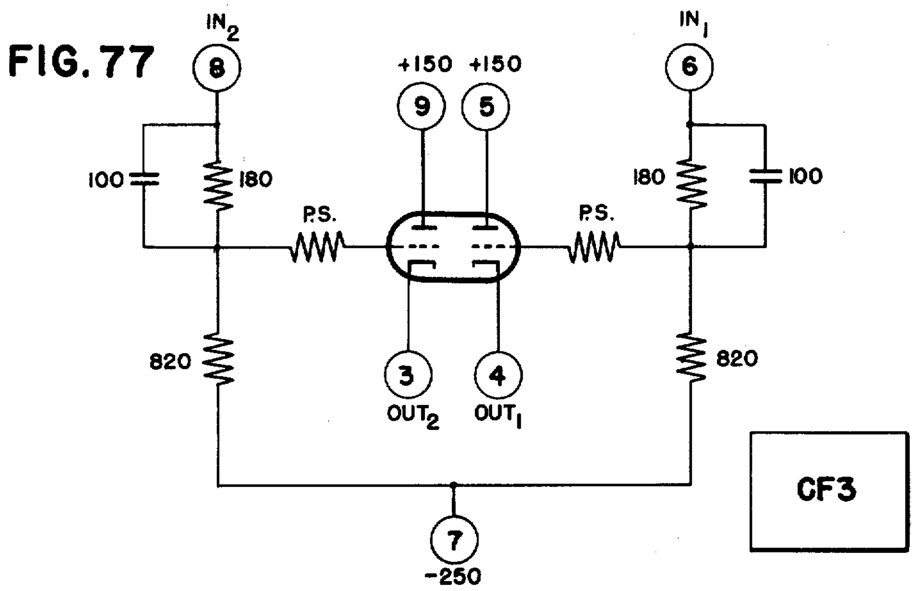
Figure 78:
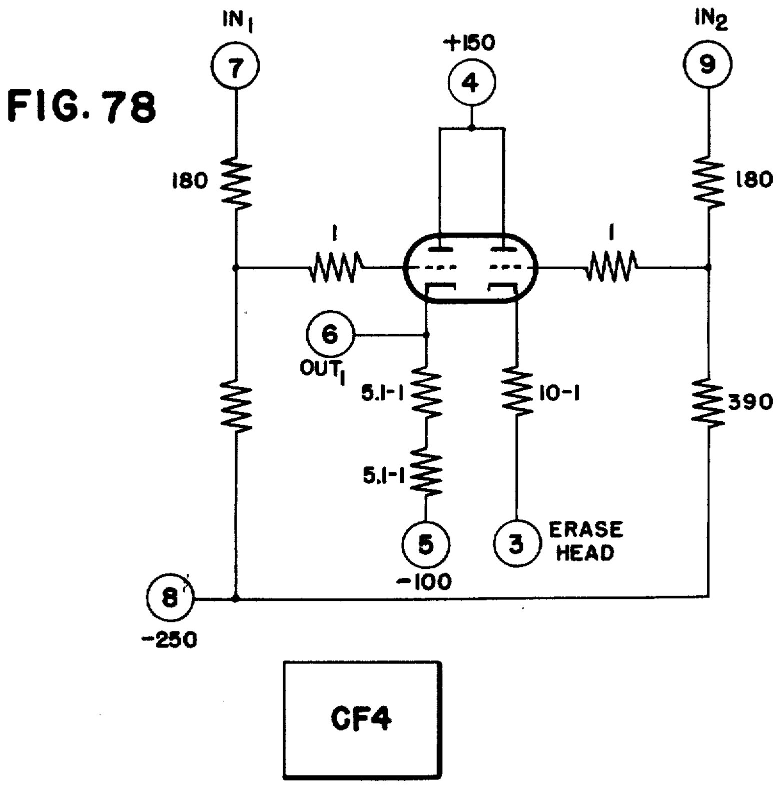
Figures 79, 80:
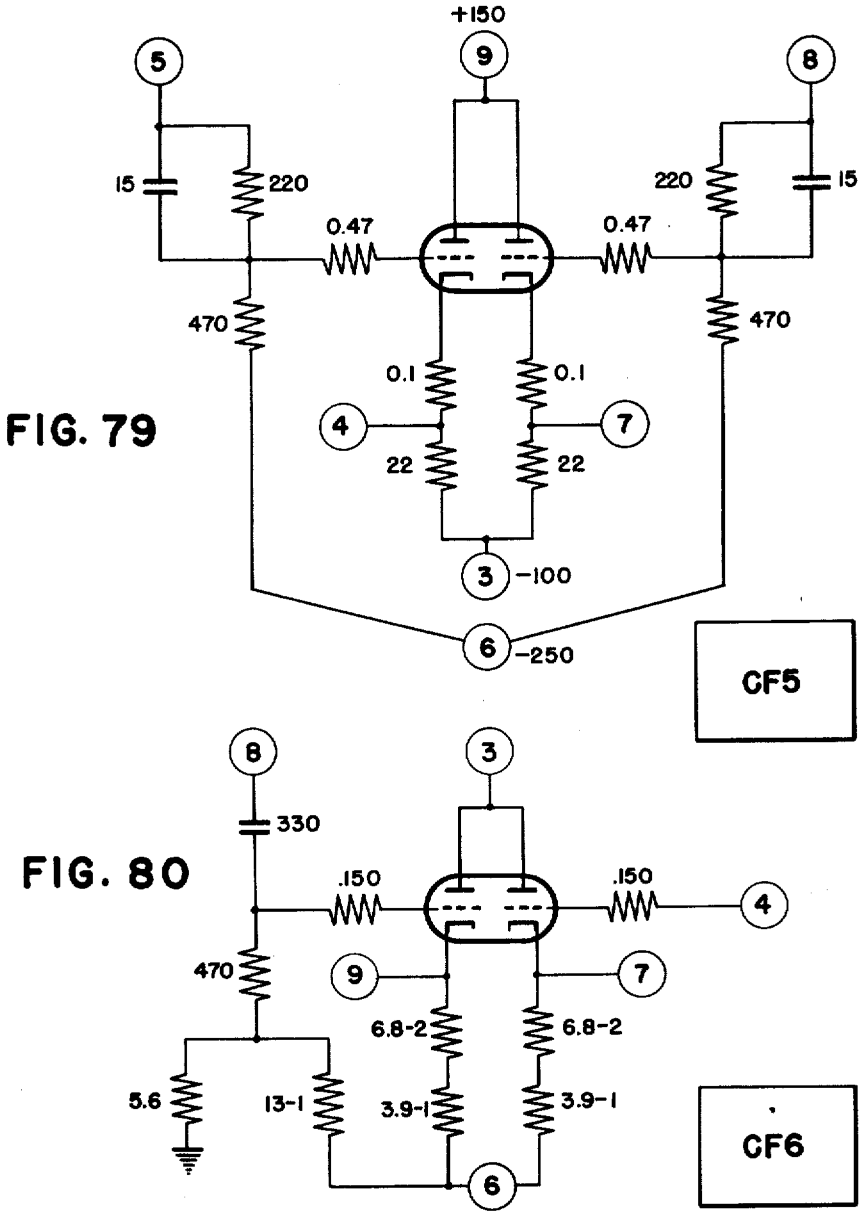
Figures 81, 82:
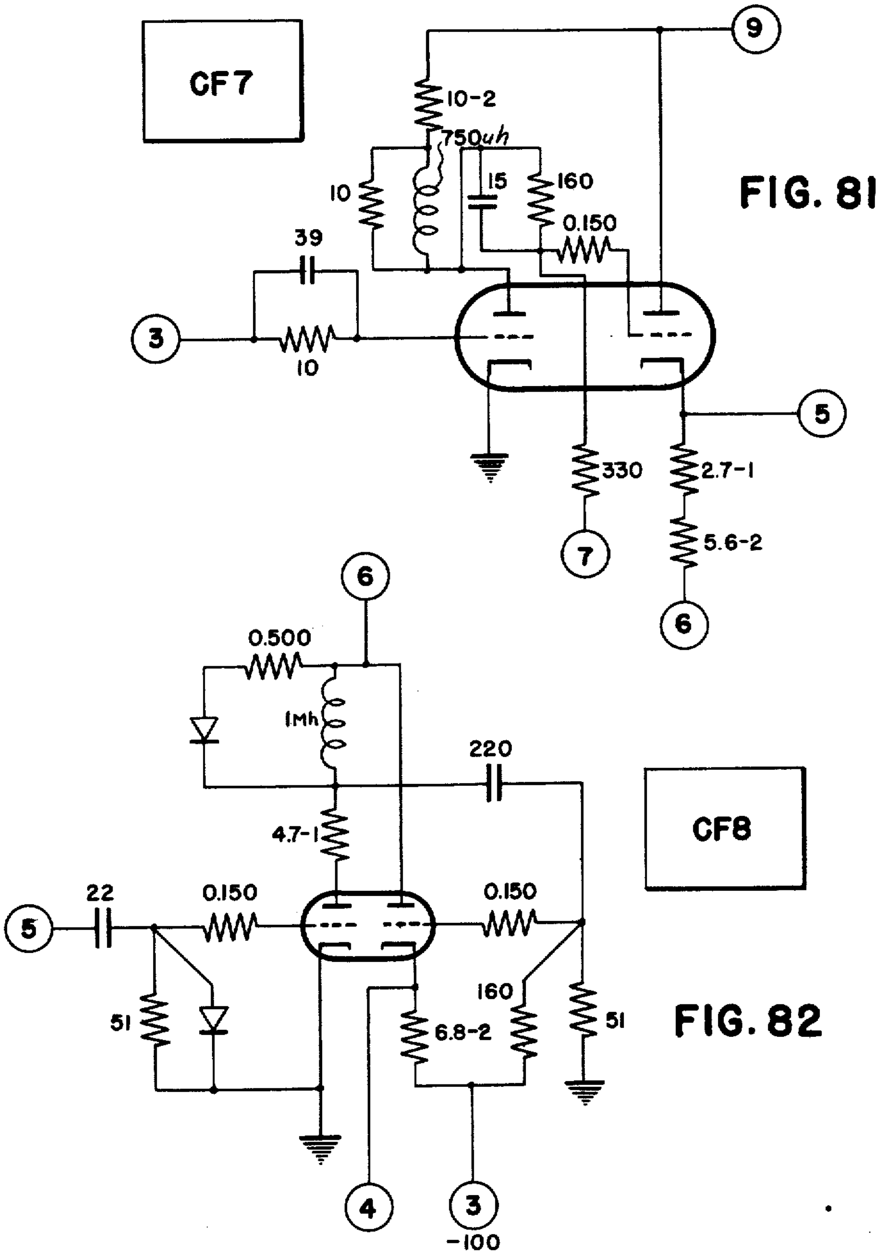
Figures 83, 84, 85:
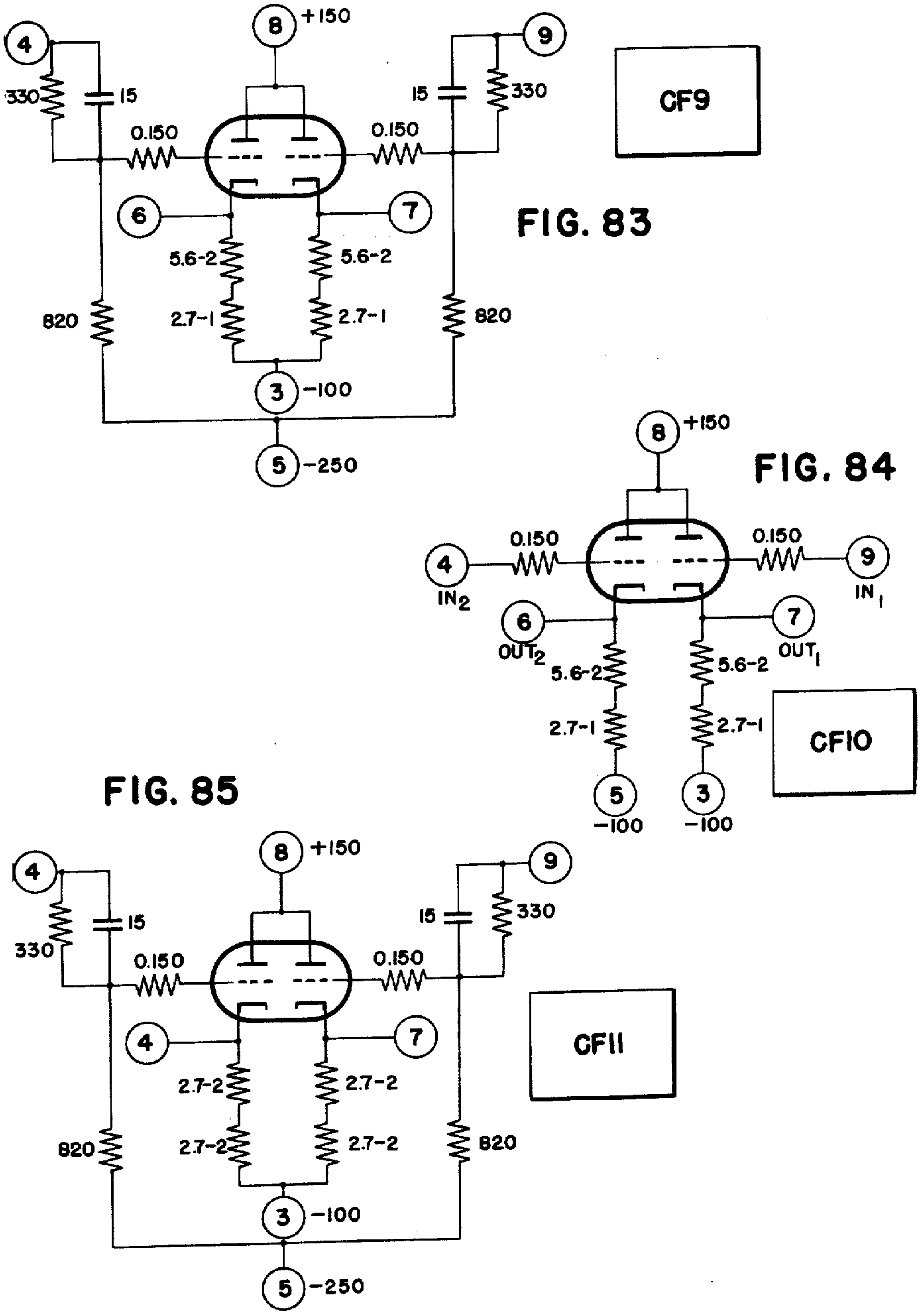
Figure 86:
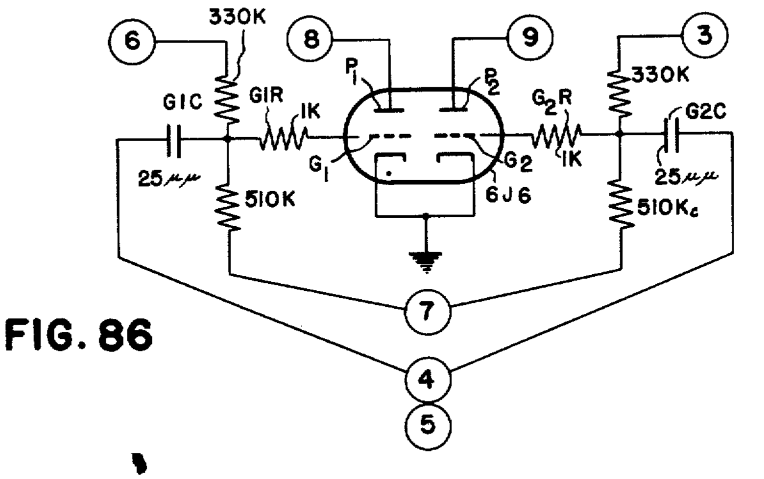
Figure 87:
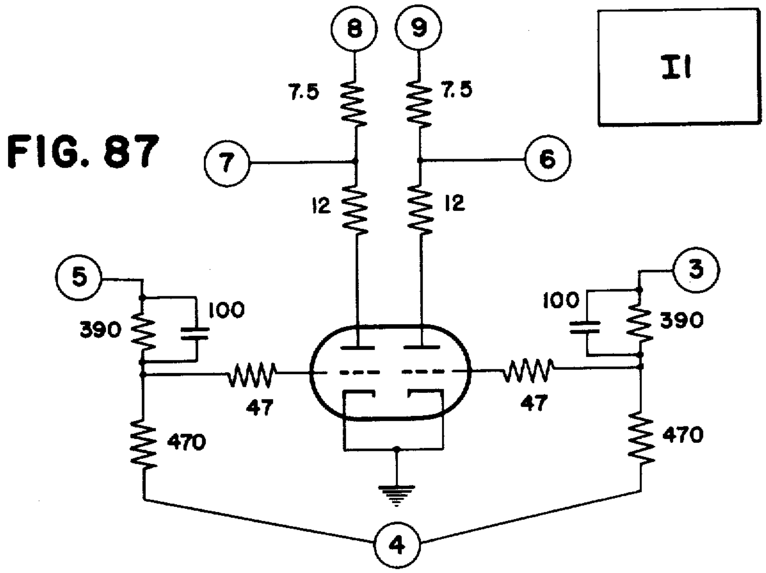
Figures 88, 89, 90:
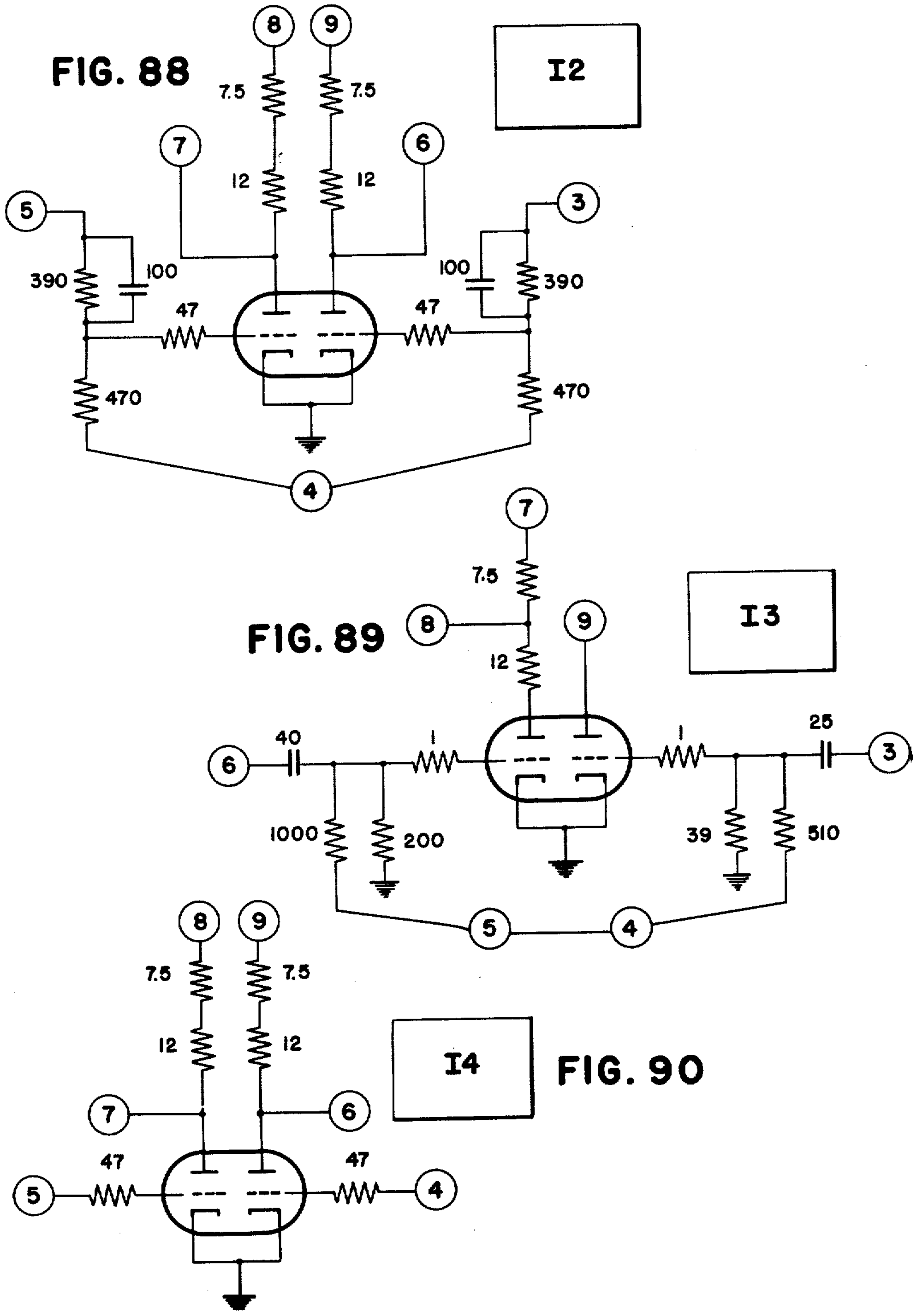
Figure 91:
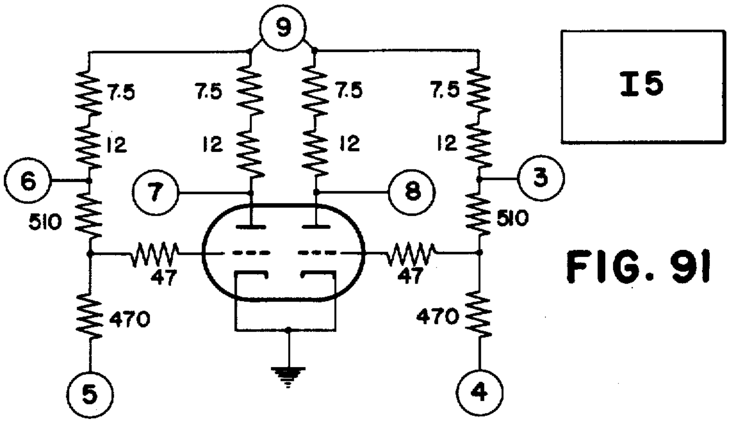
Figure 92:
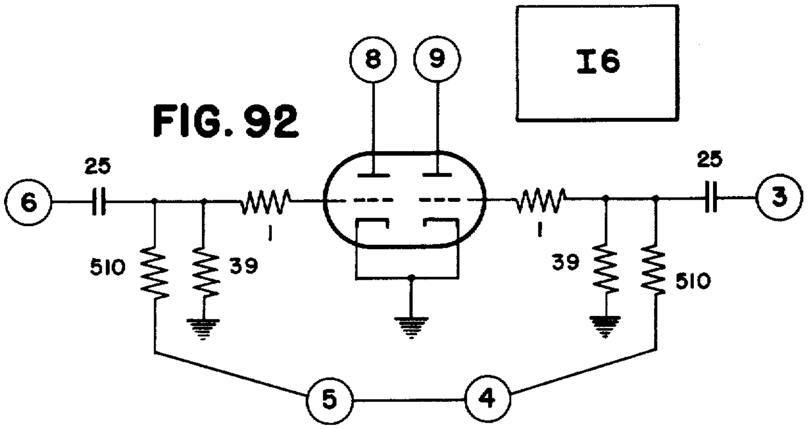
Figure 93:
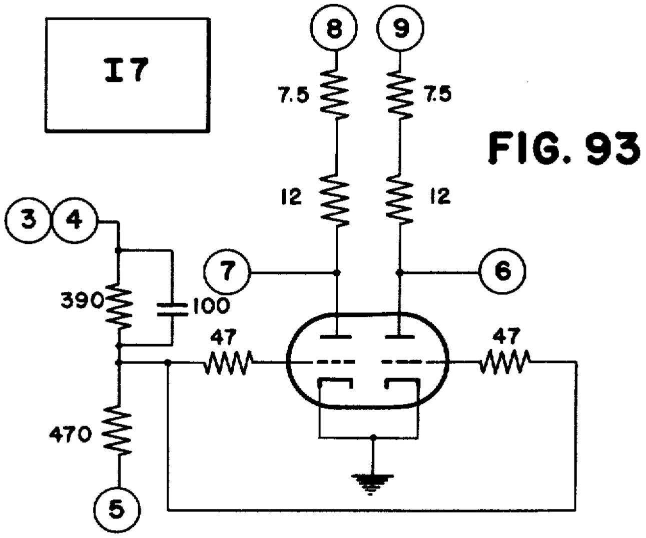
Figures 94, 95, 96:
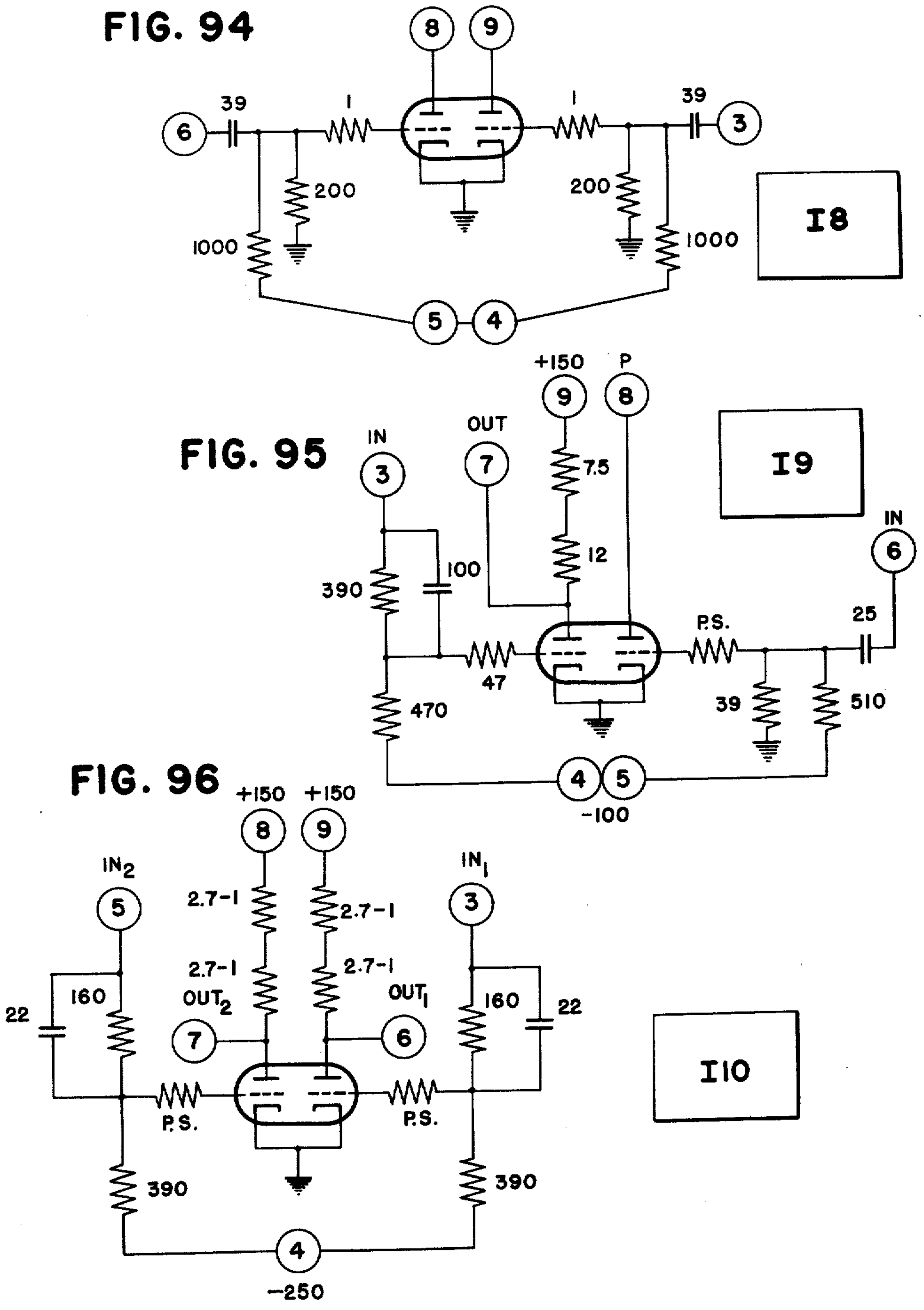
Figure 97:
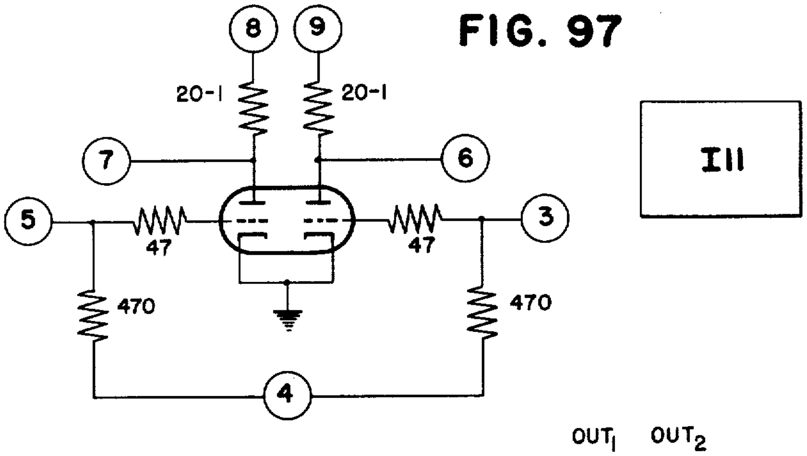
Figures 98, 99:
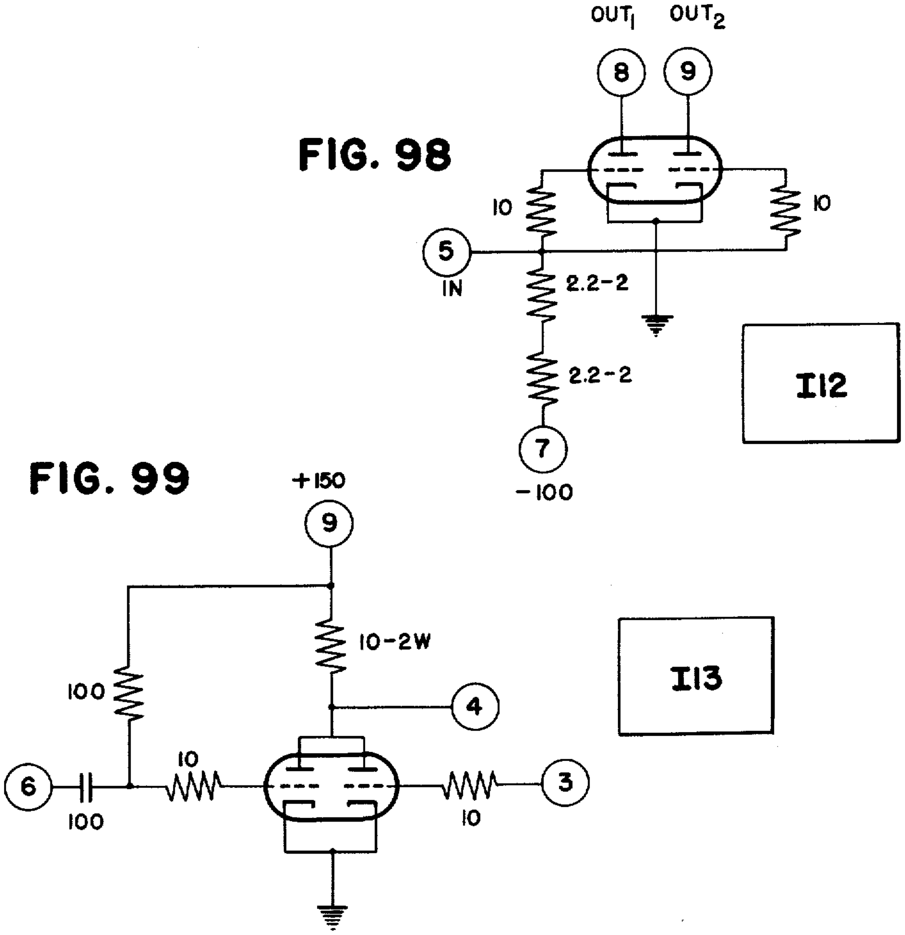
Figures 100, 101, 102:
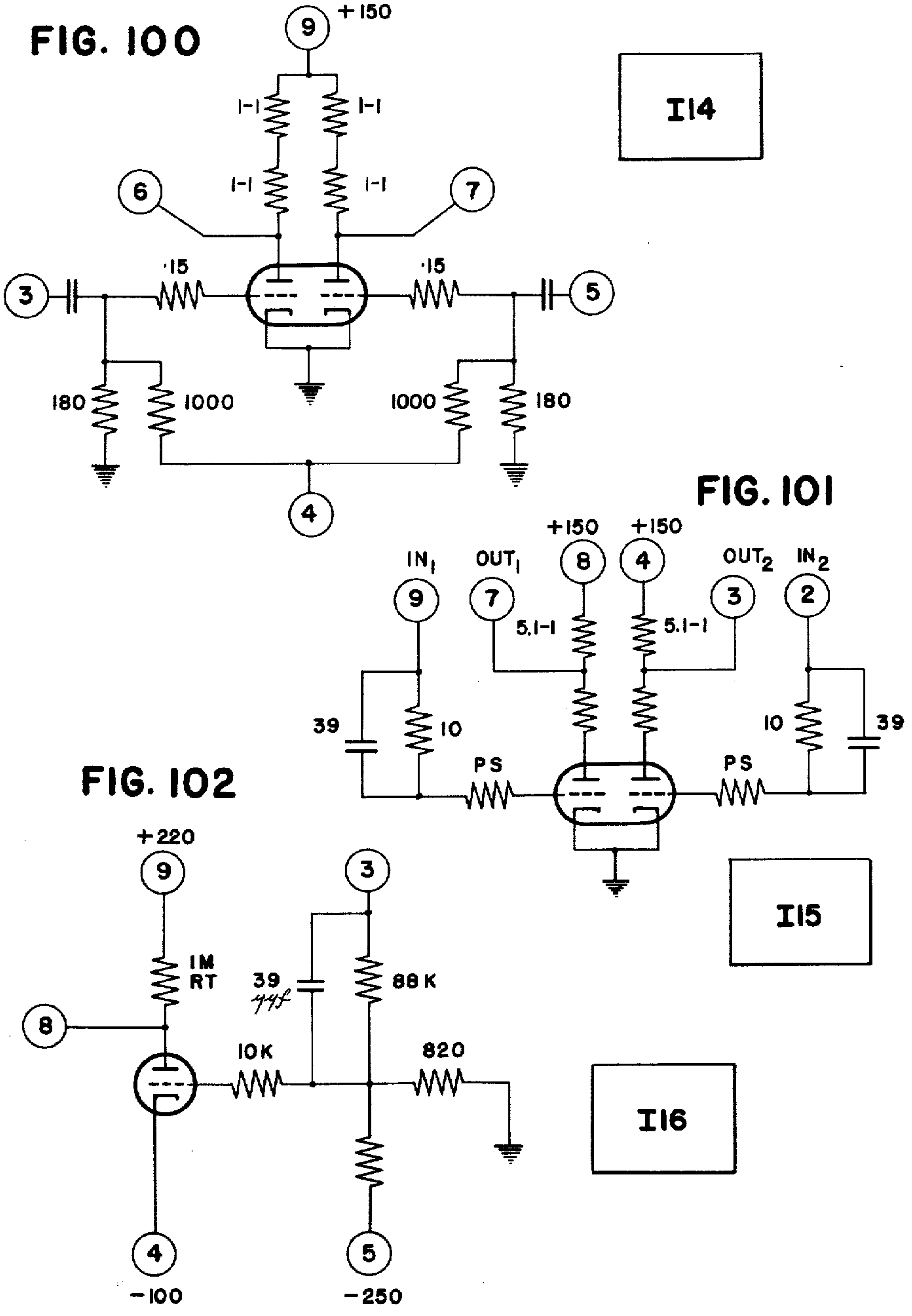
Figure 103:
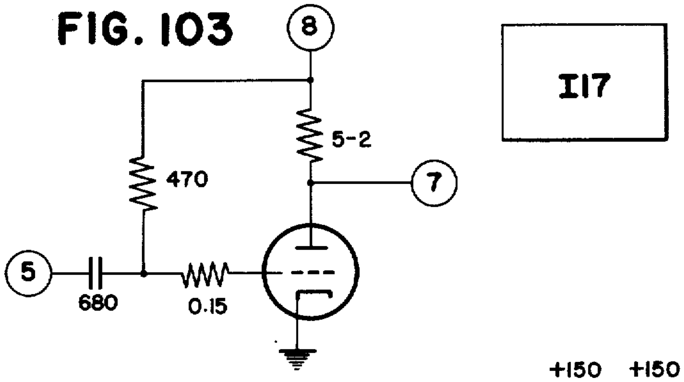
Figure 104:
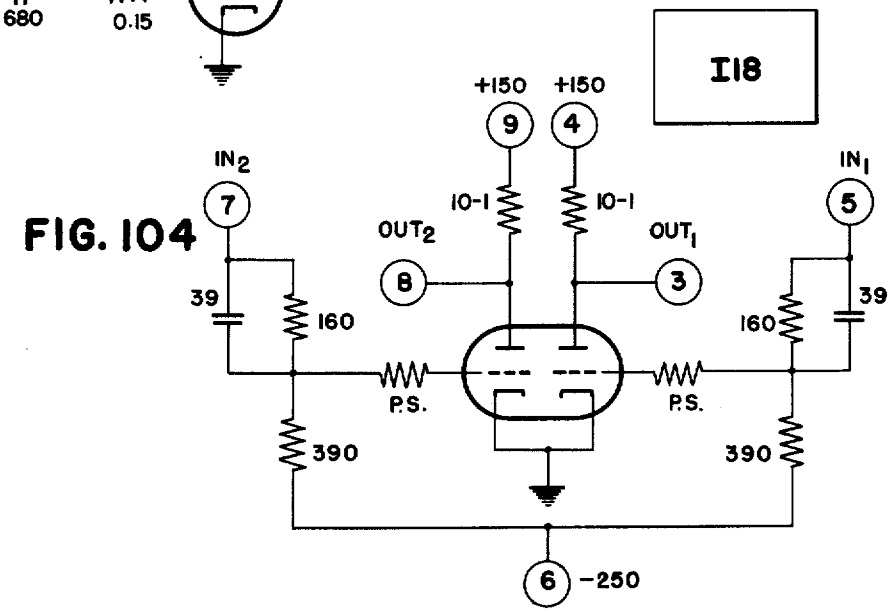
Figure 105:
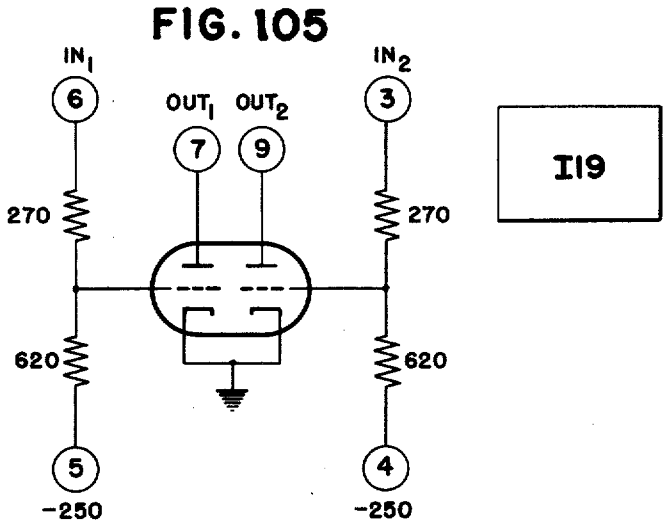
Figures 106, 107, 108:
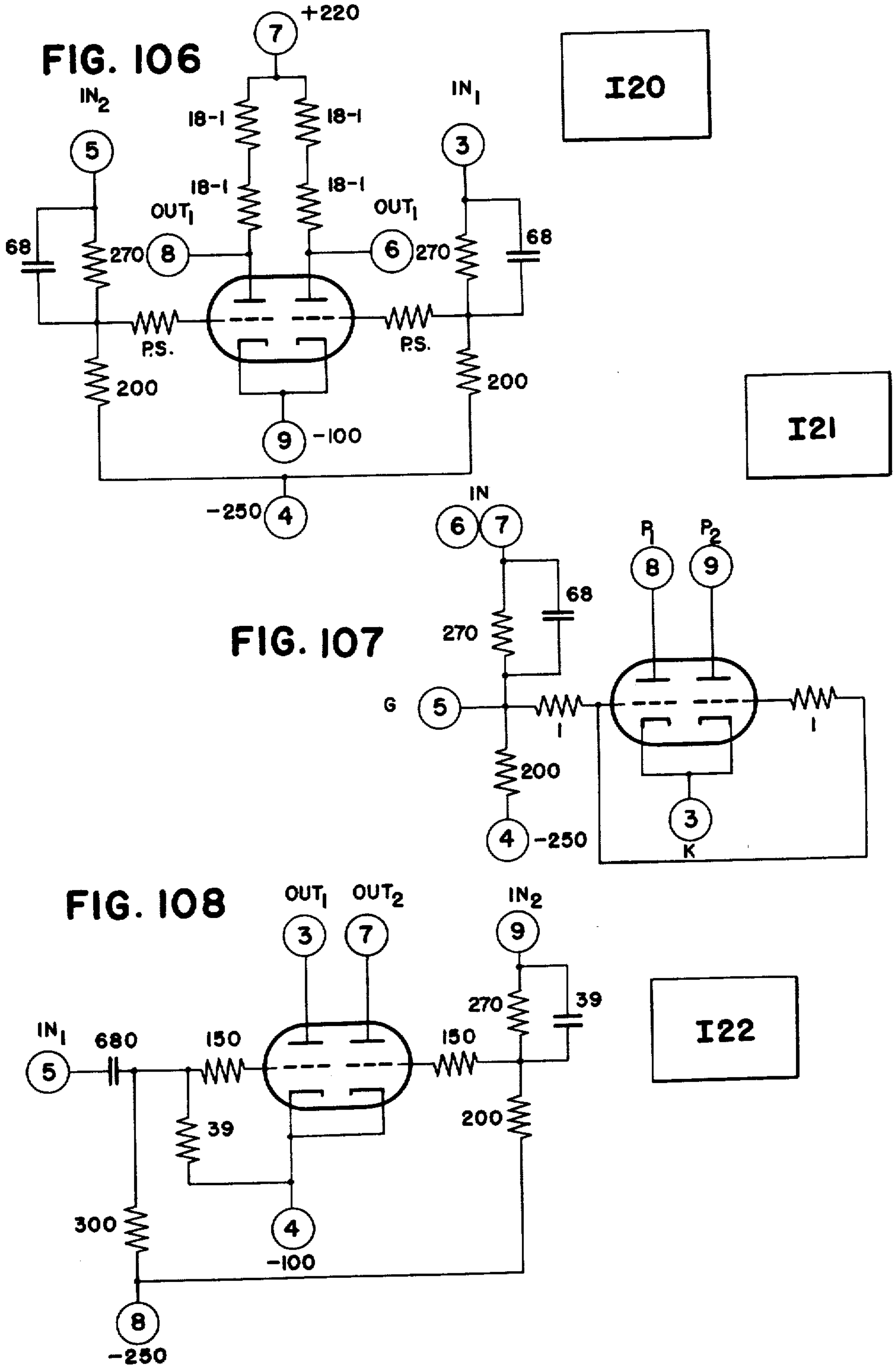
Figures 109, 110, 111:
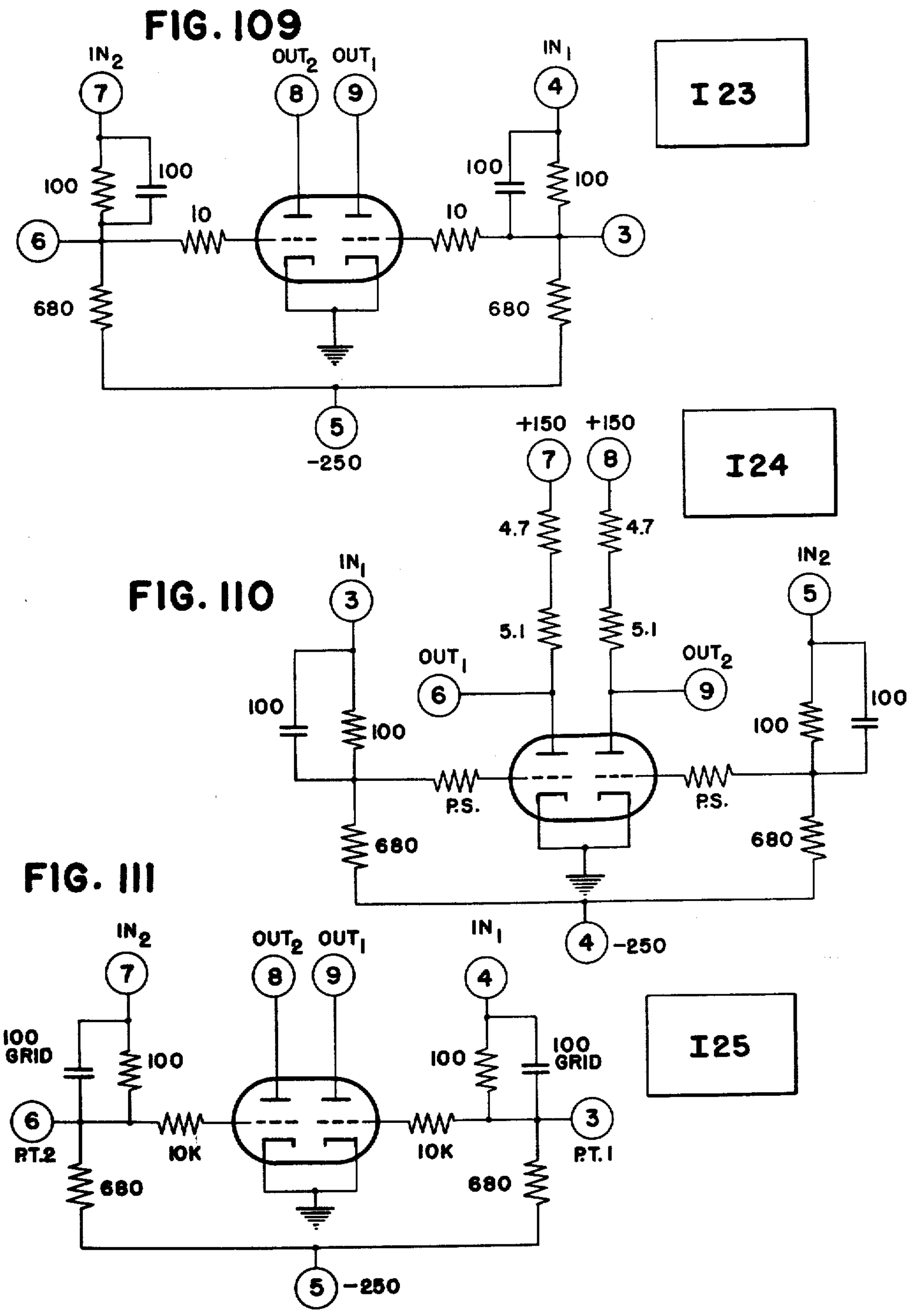
Figure 111A:
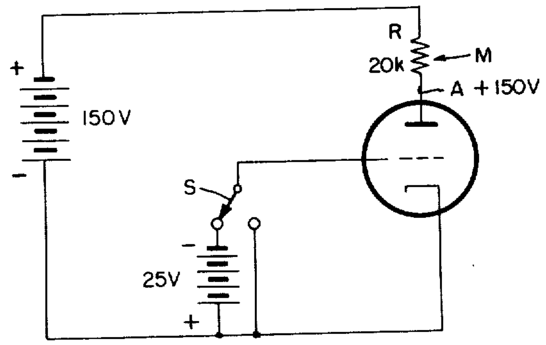
Figure 111B:
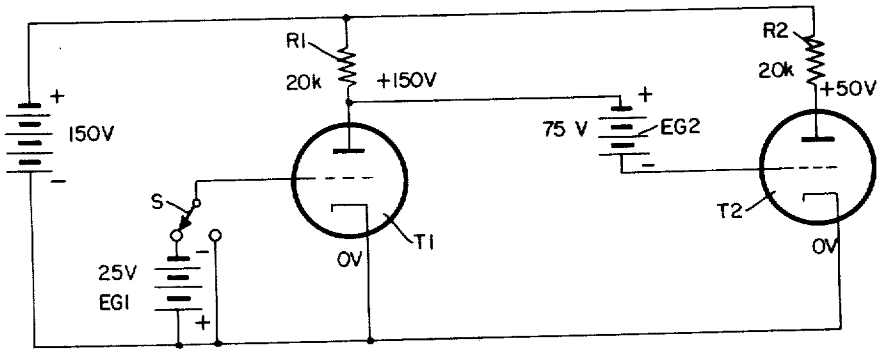
Figure 111C:
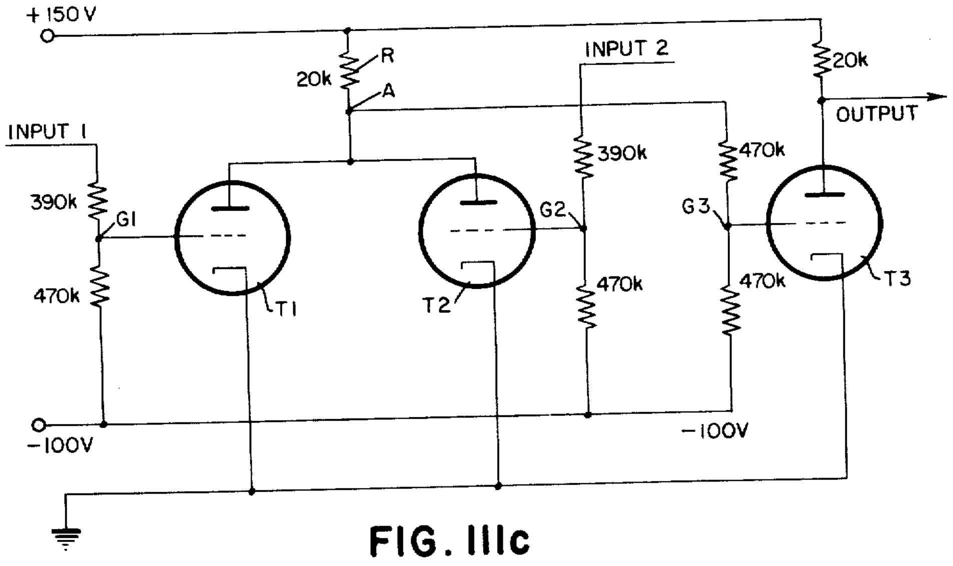
Figures 112, 113, 114:
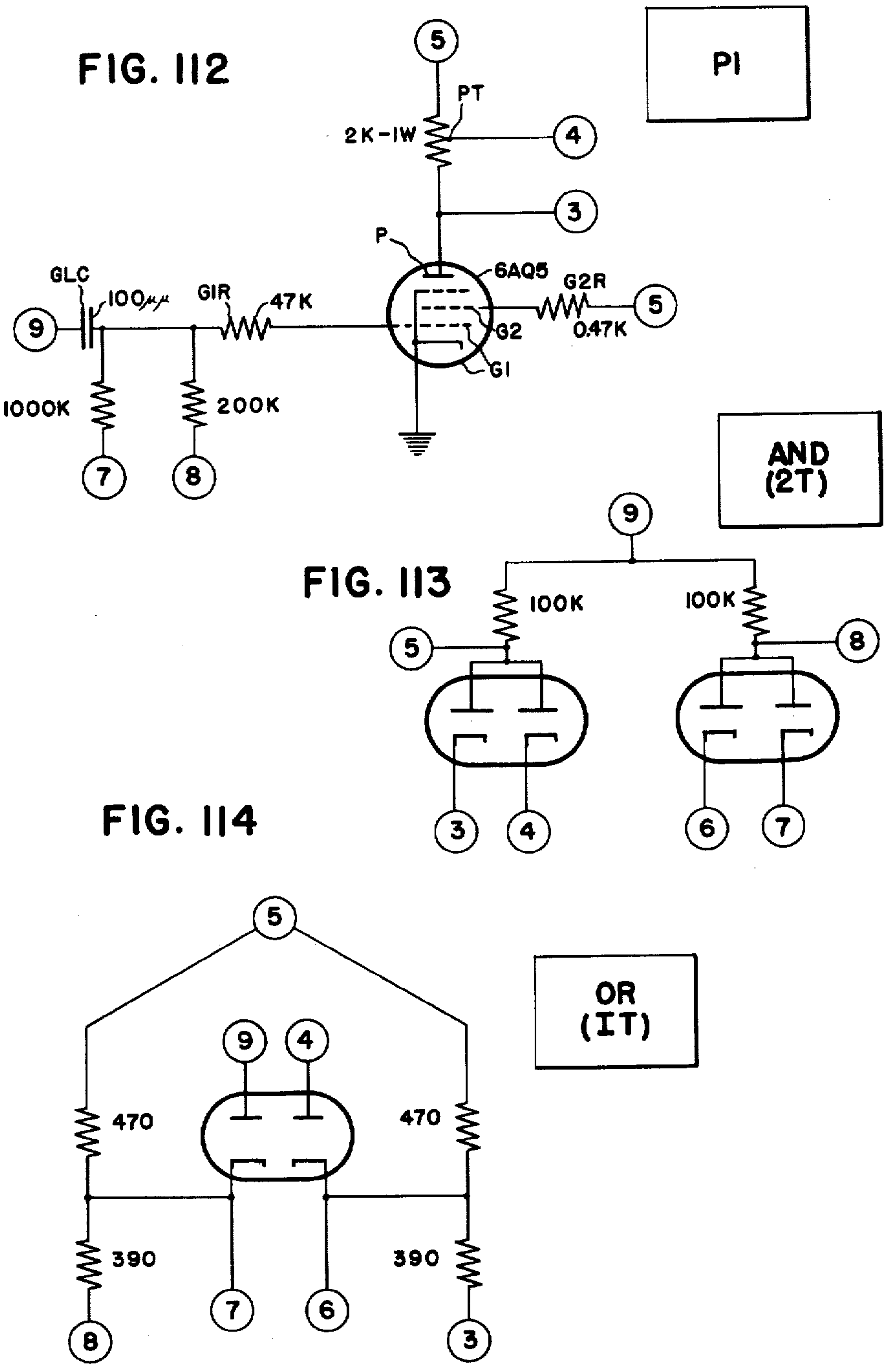
Figure 115:
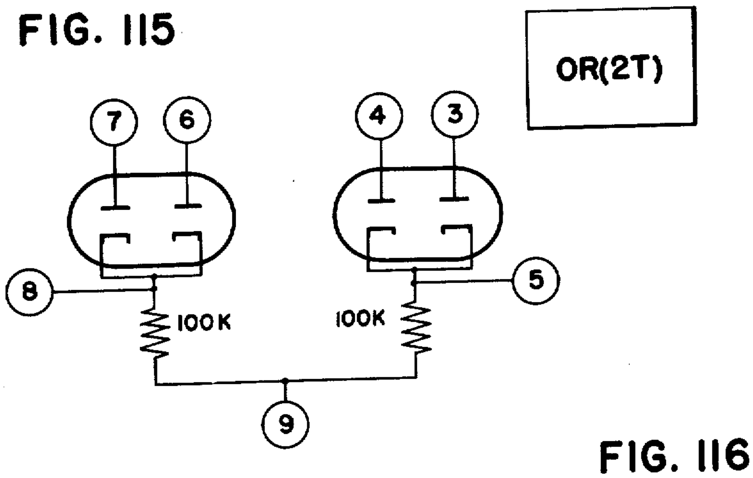
Figure 116:
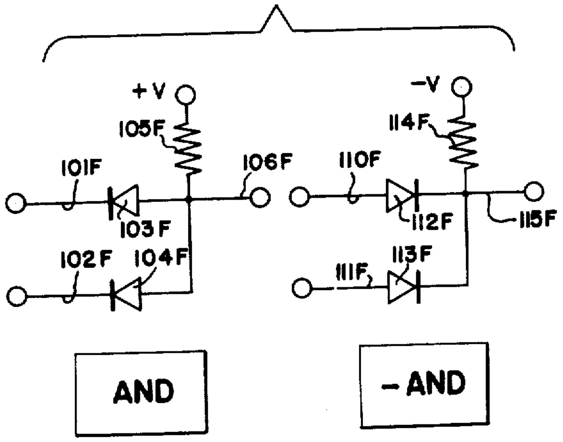
Figure 117:
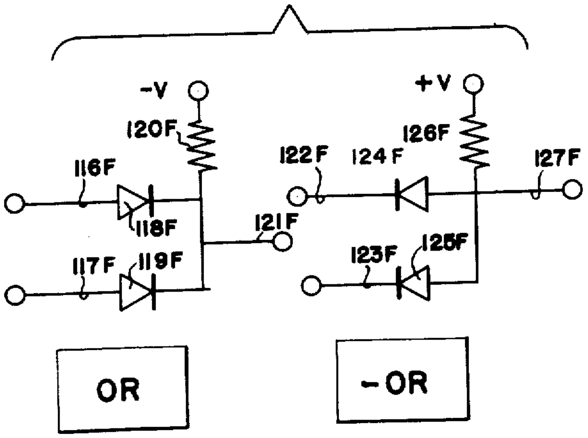
Figure 118:
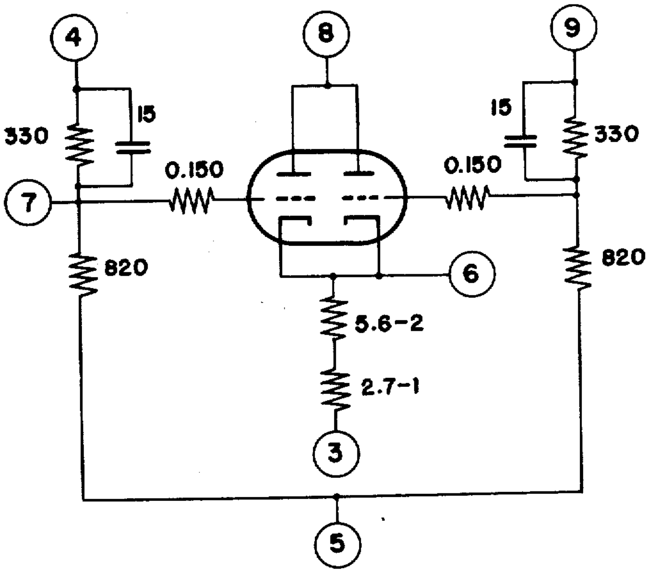
Figure 119:
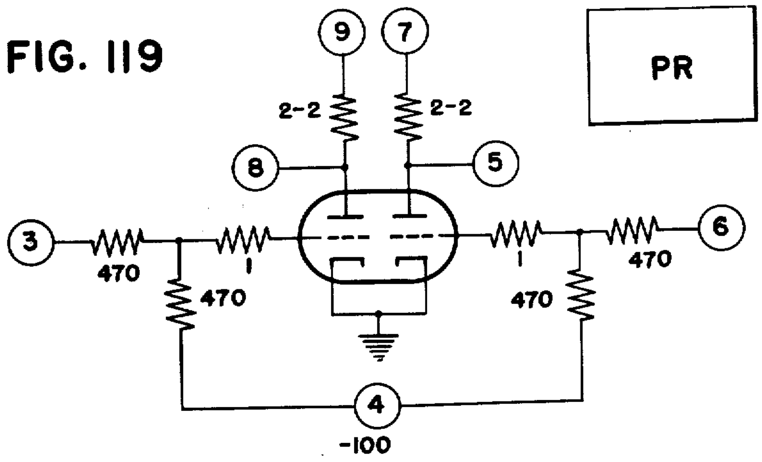
Figure 127:
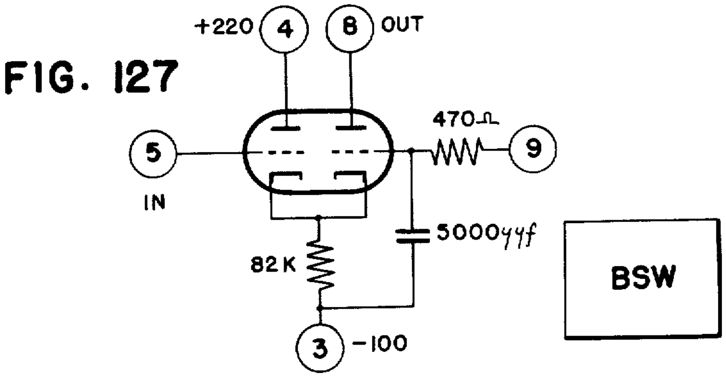
Figure 128:
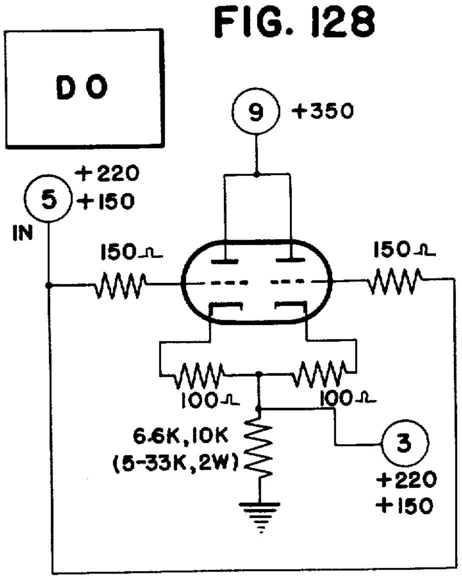
Figure 129:
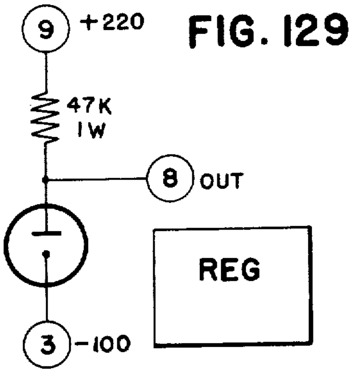
Figure 130:
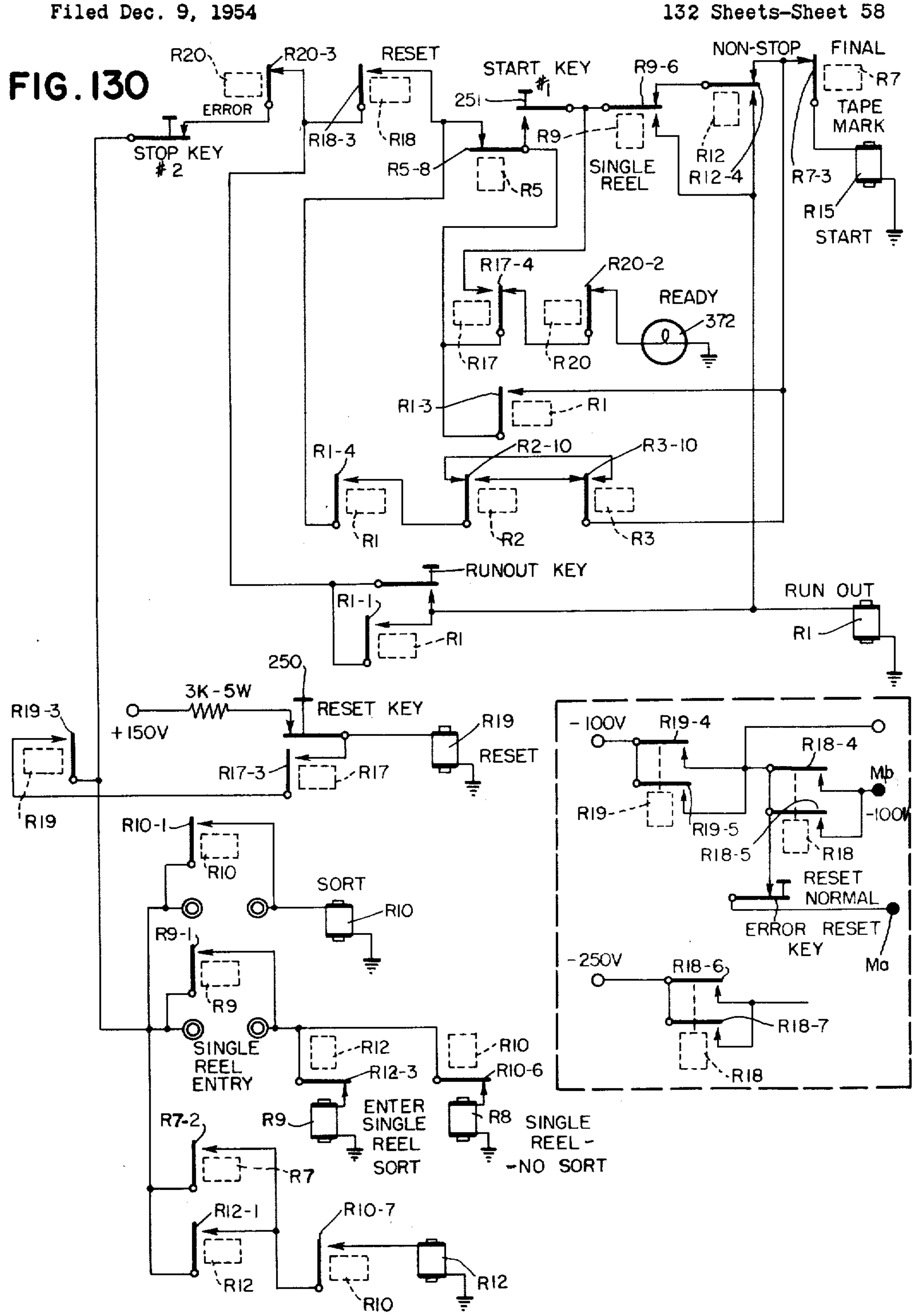
Figure 138:
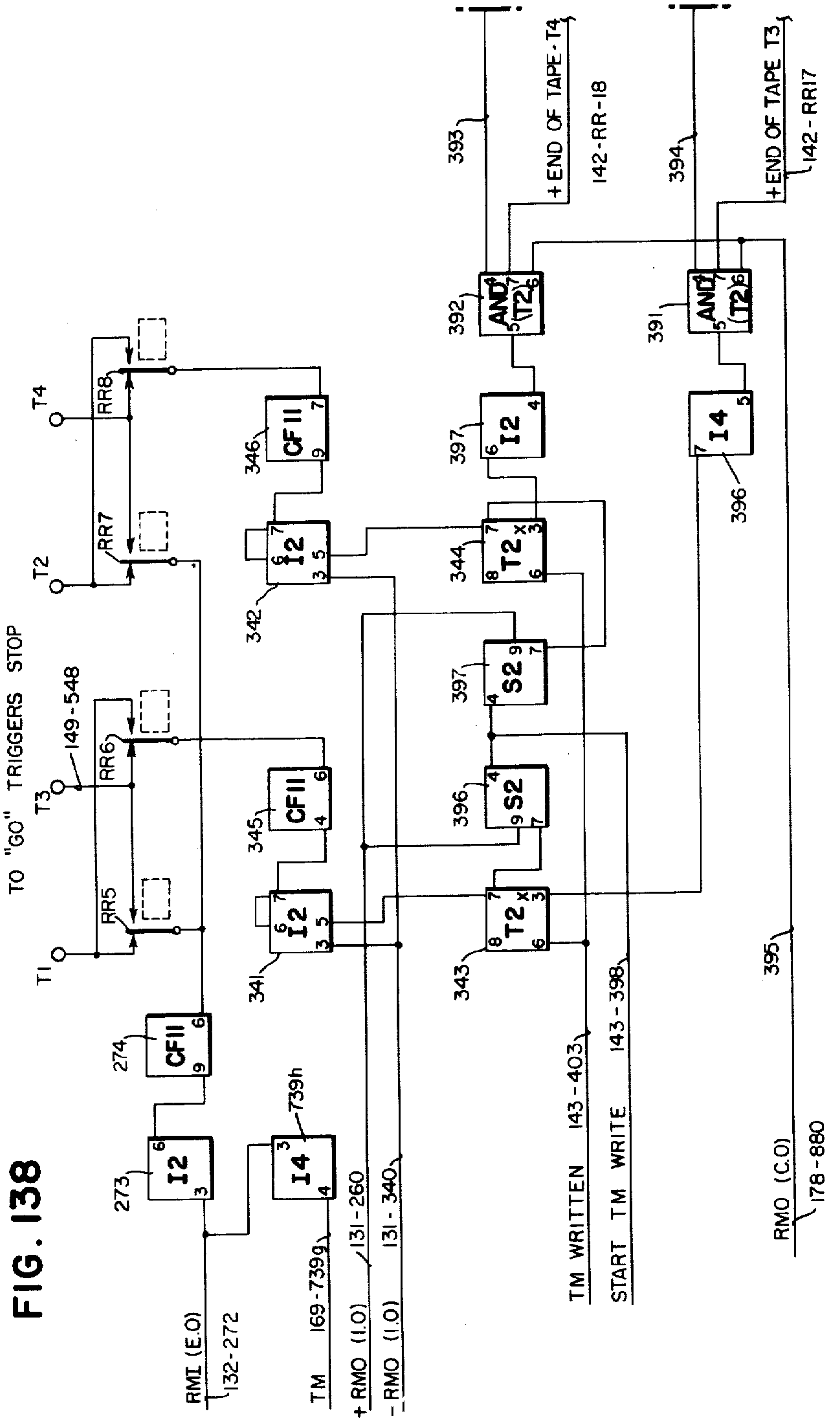
Figure 139:
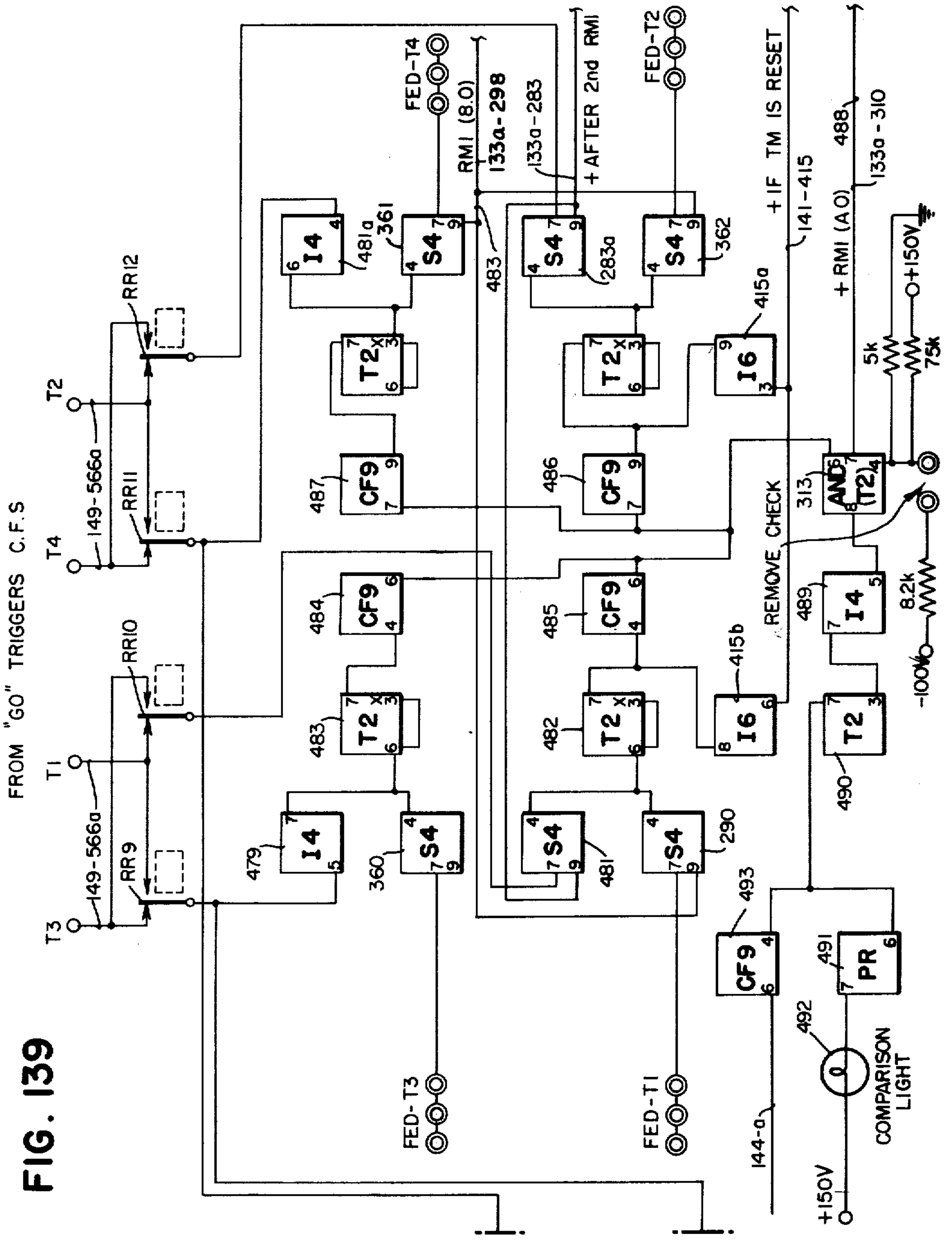
Figure 140:
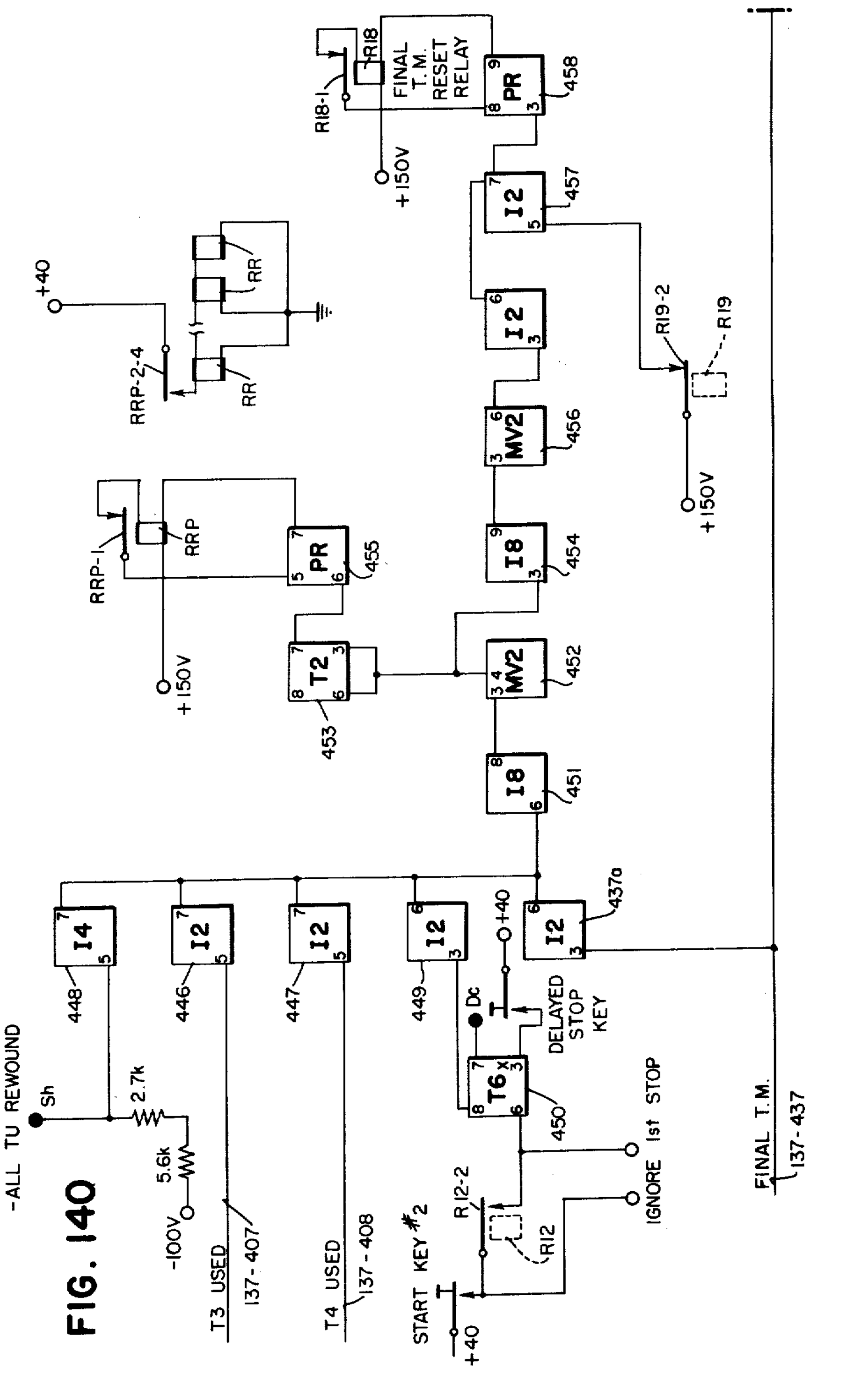
Figure 141:
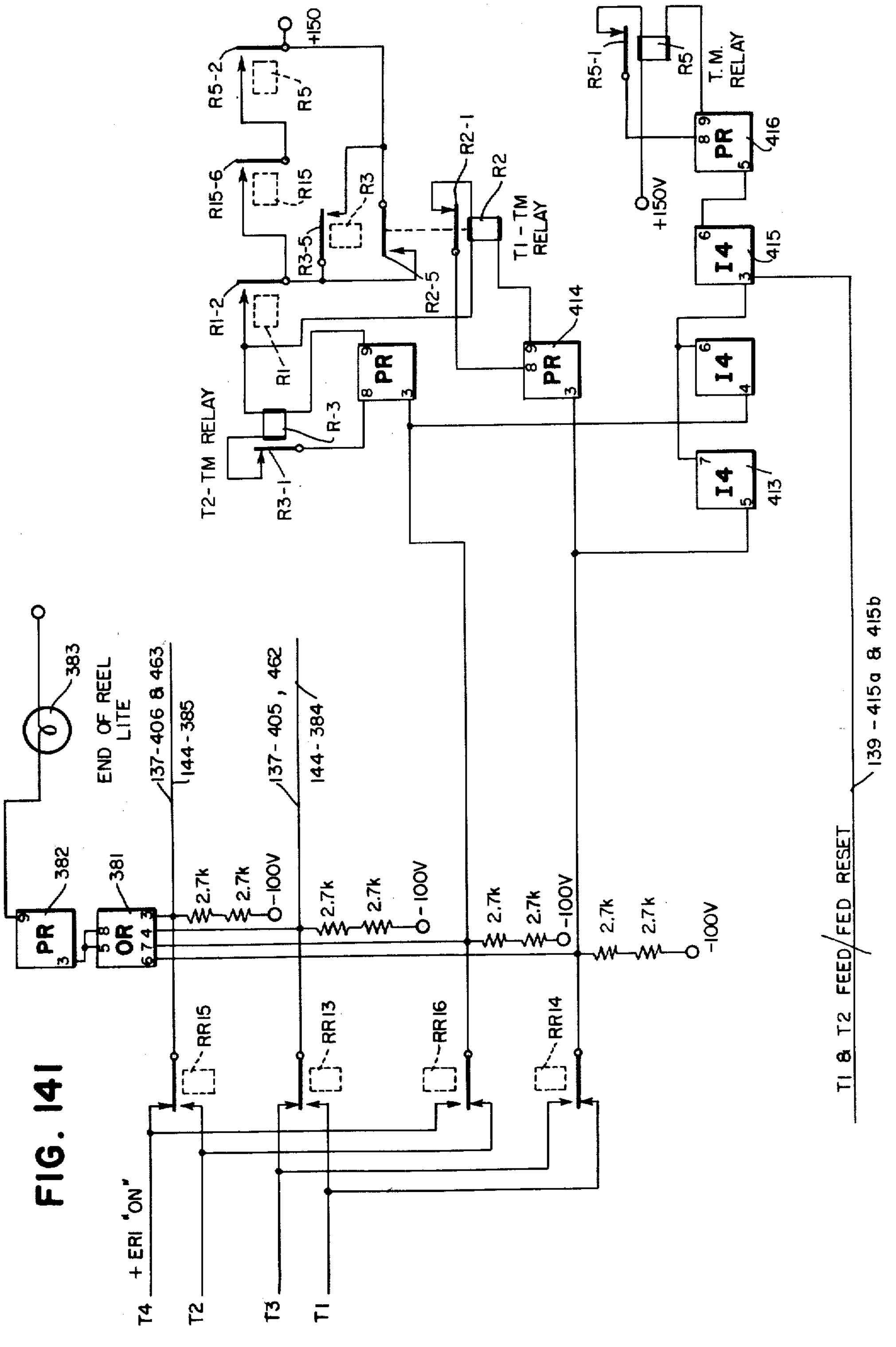
Figure 142:
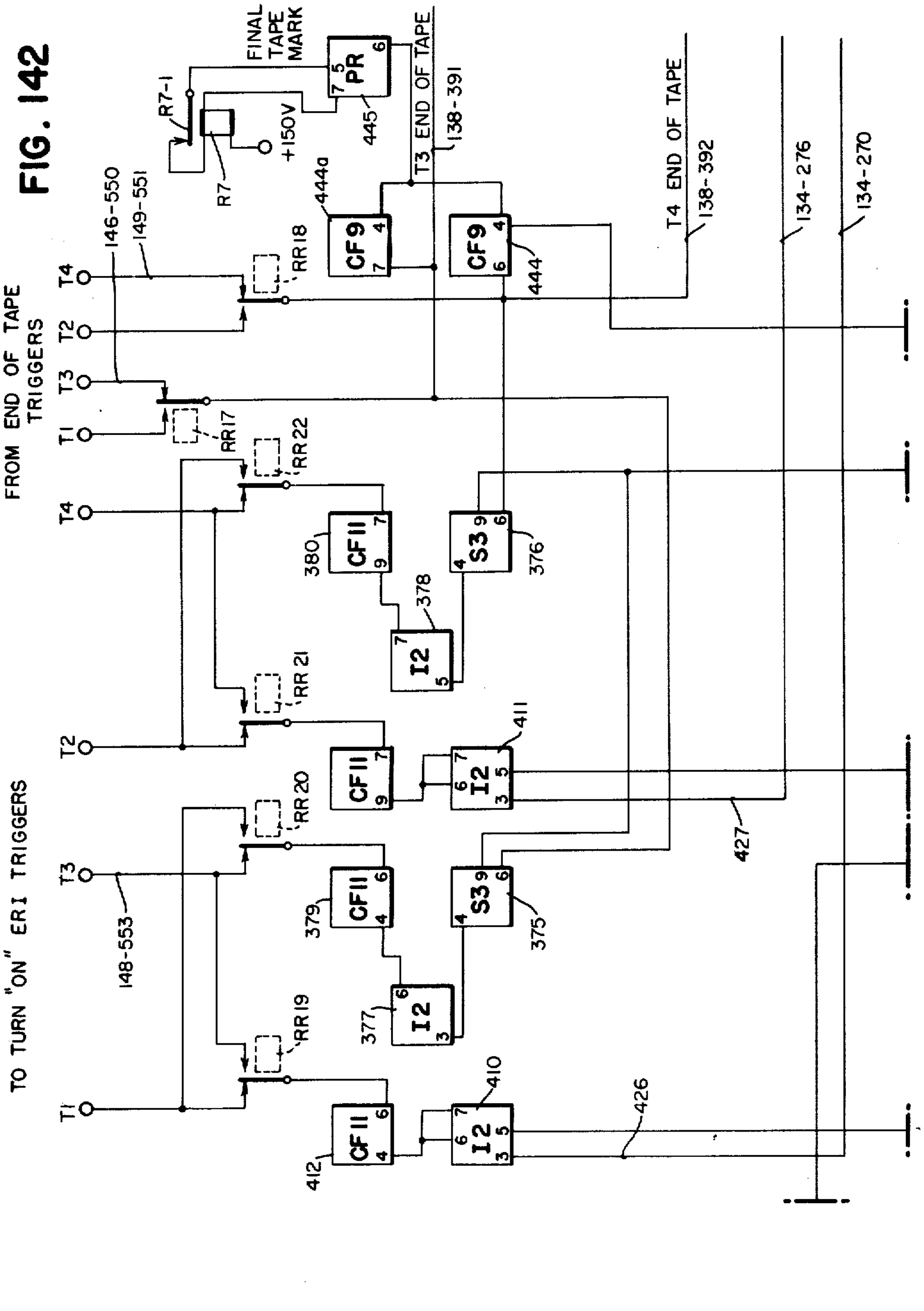
Figure 143:
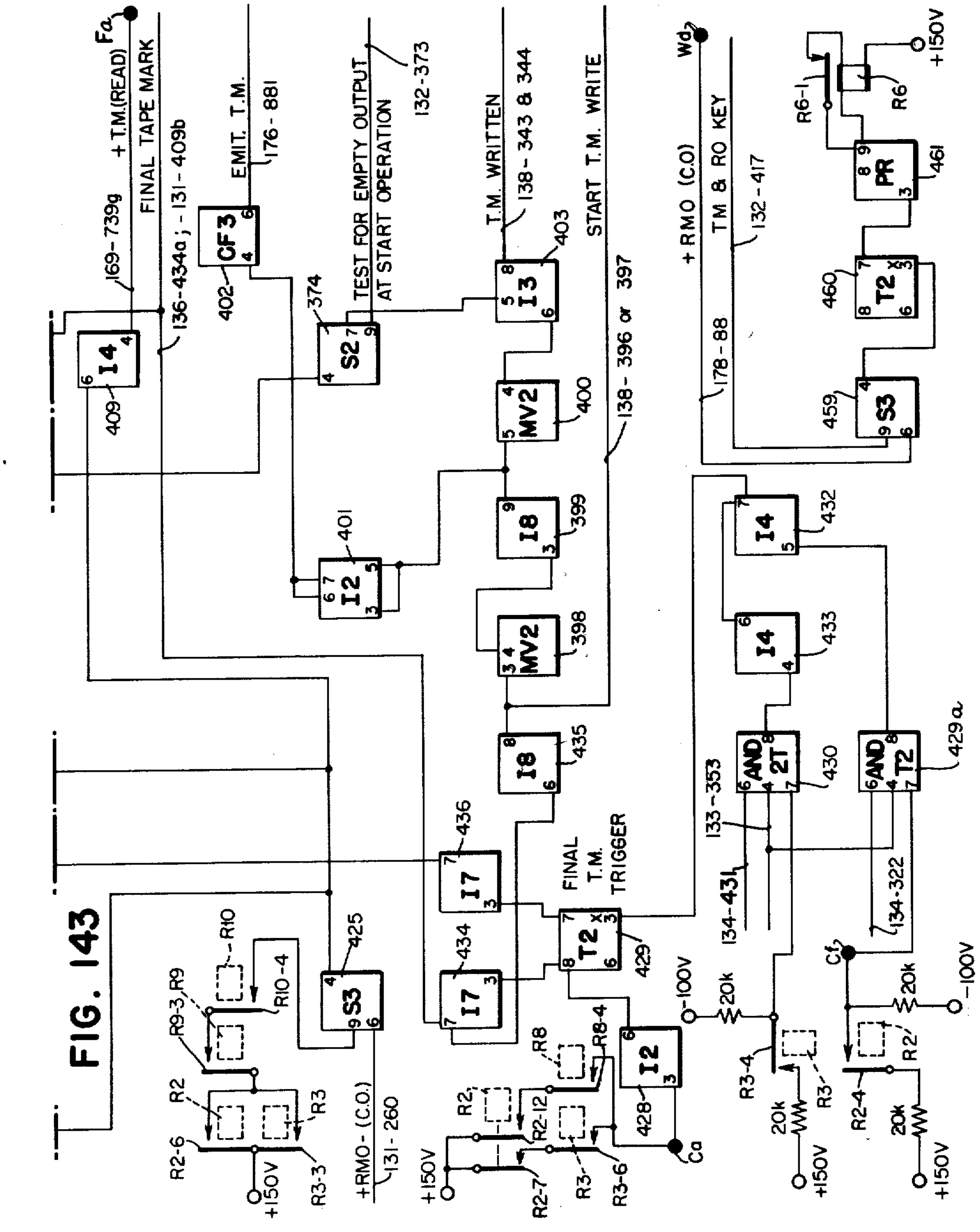
Figure 144:
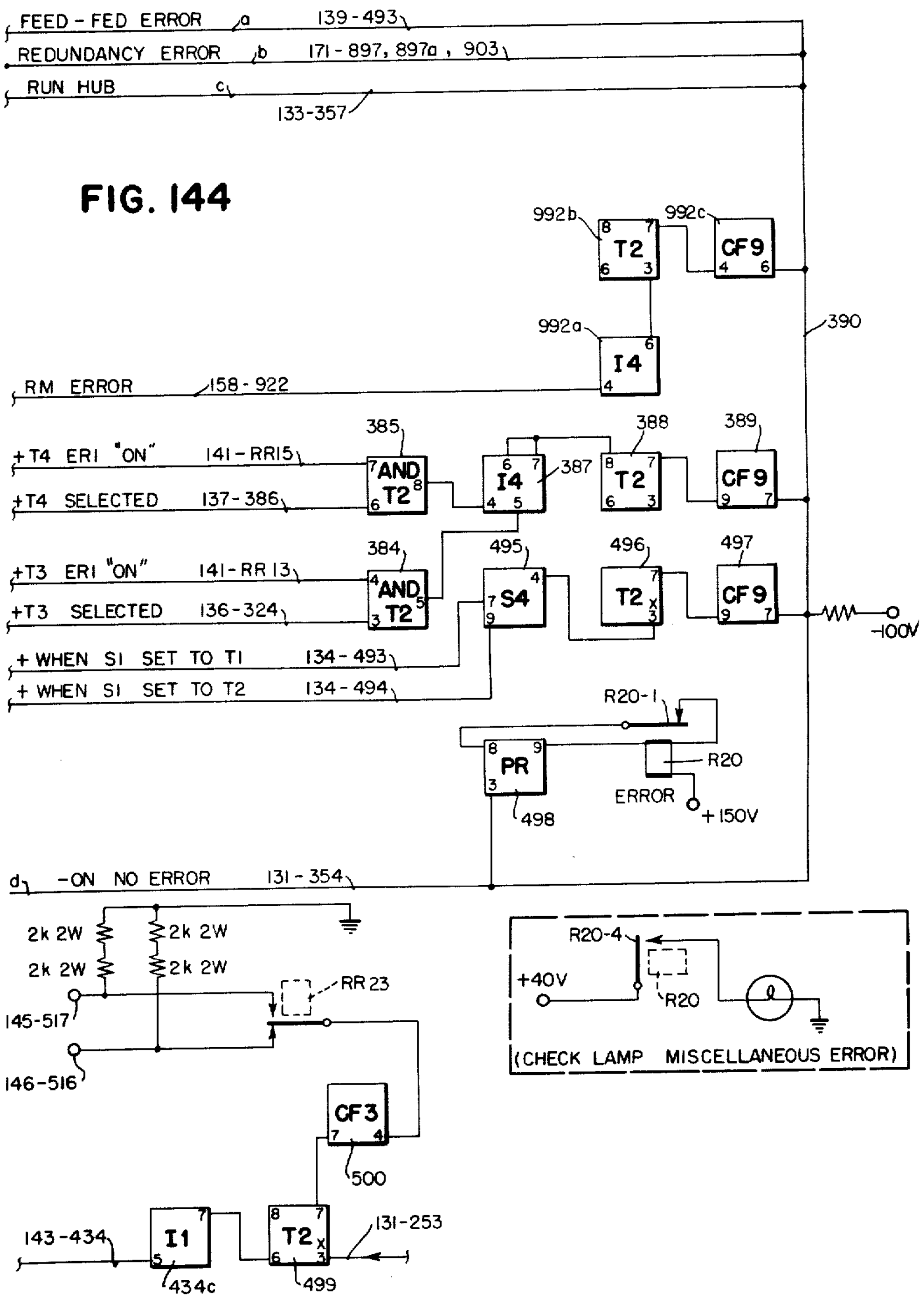
Figure 150:
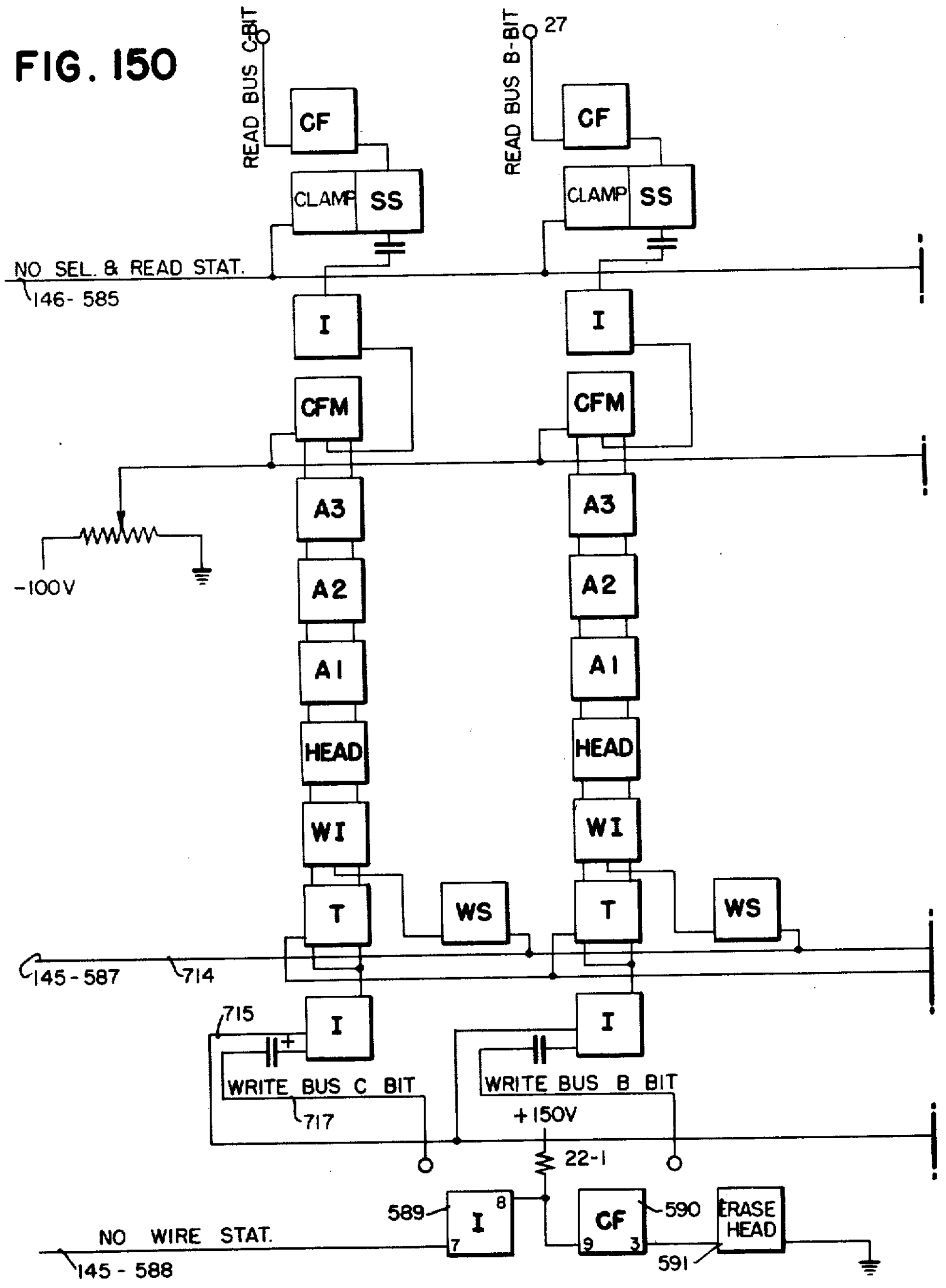
Figure 151:
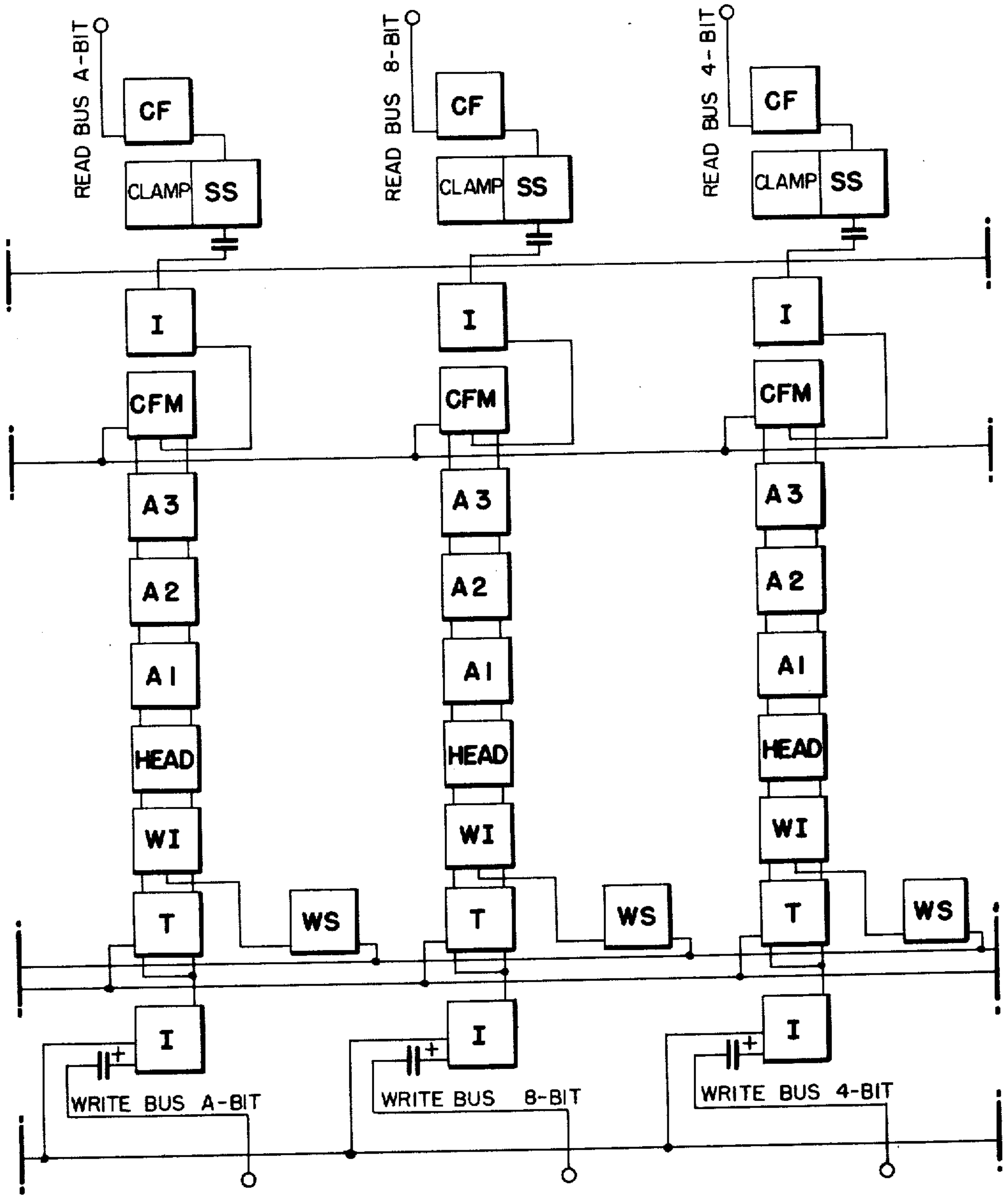
Figure 152:
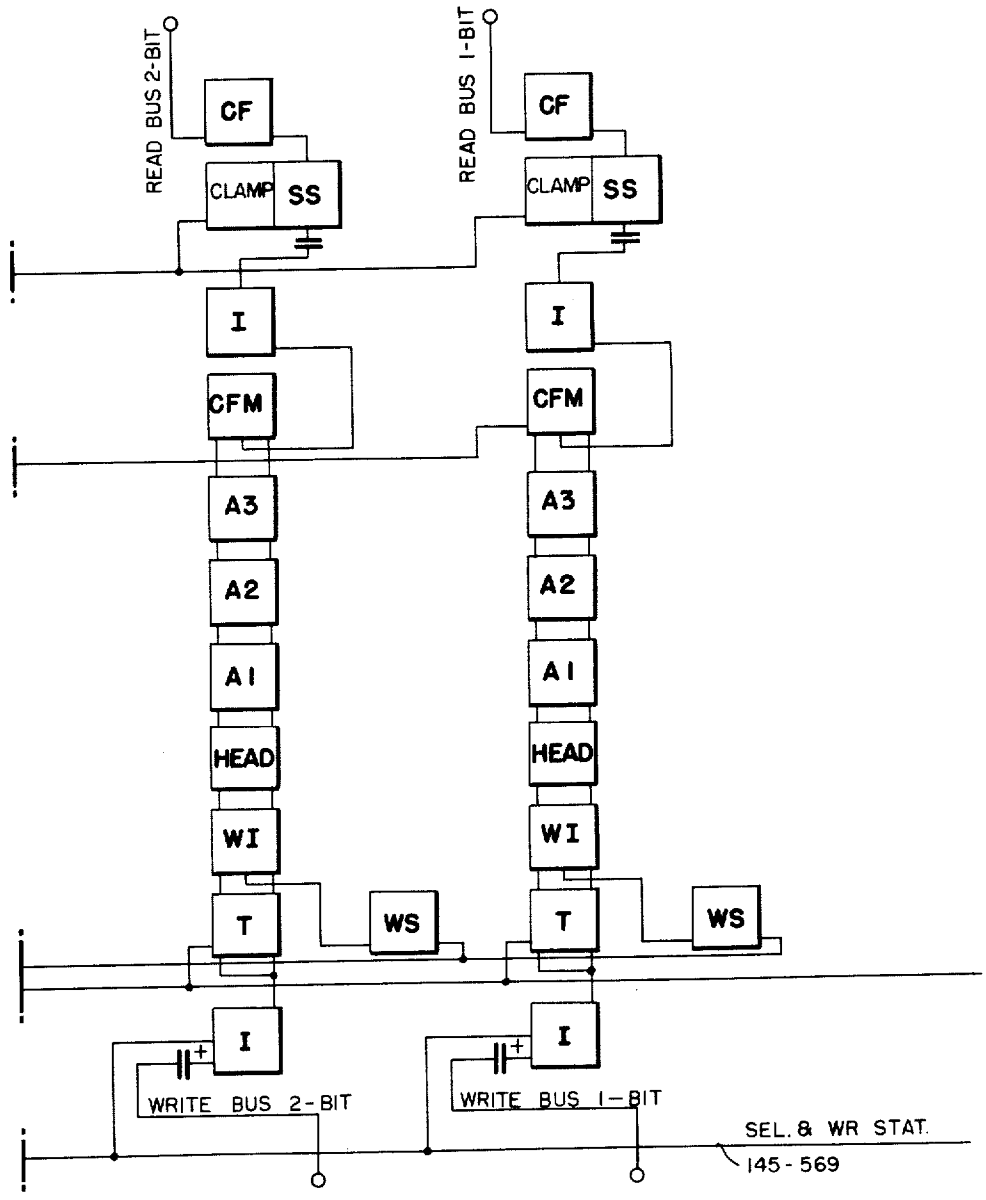
Figure 151A:
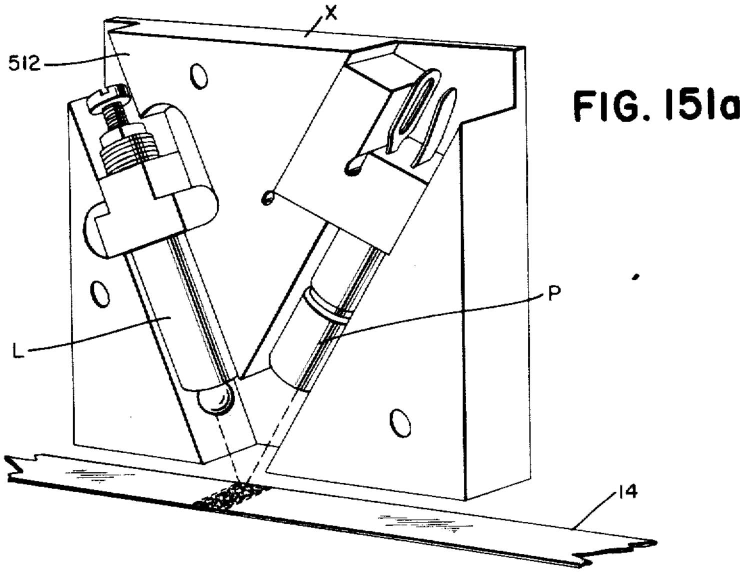
Figure 151B:
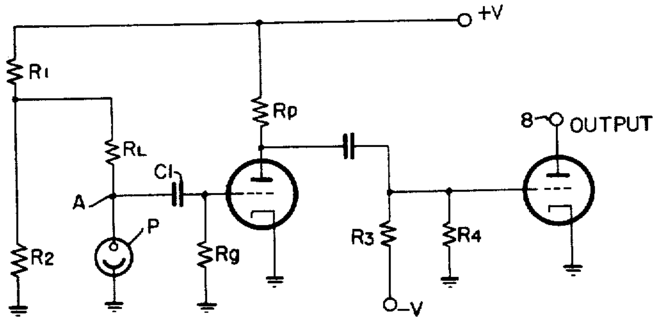
Figure 152A:
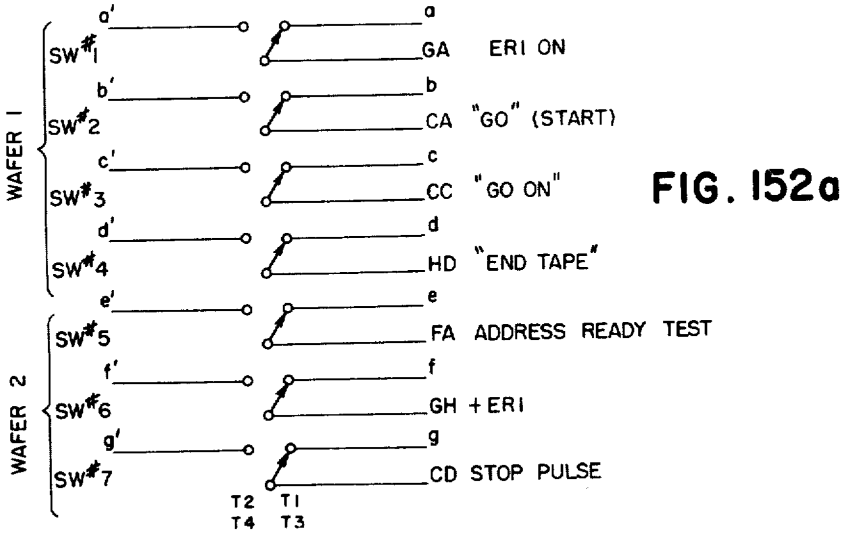
Figure 157:
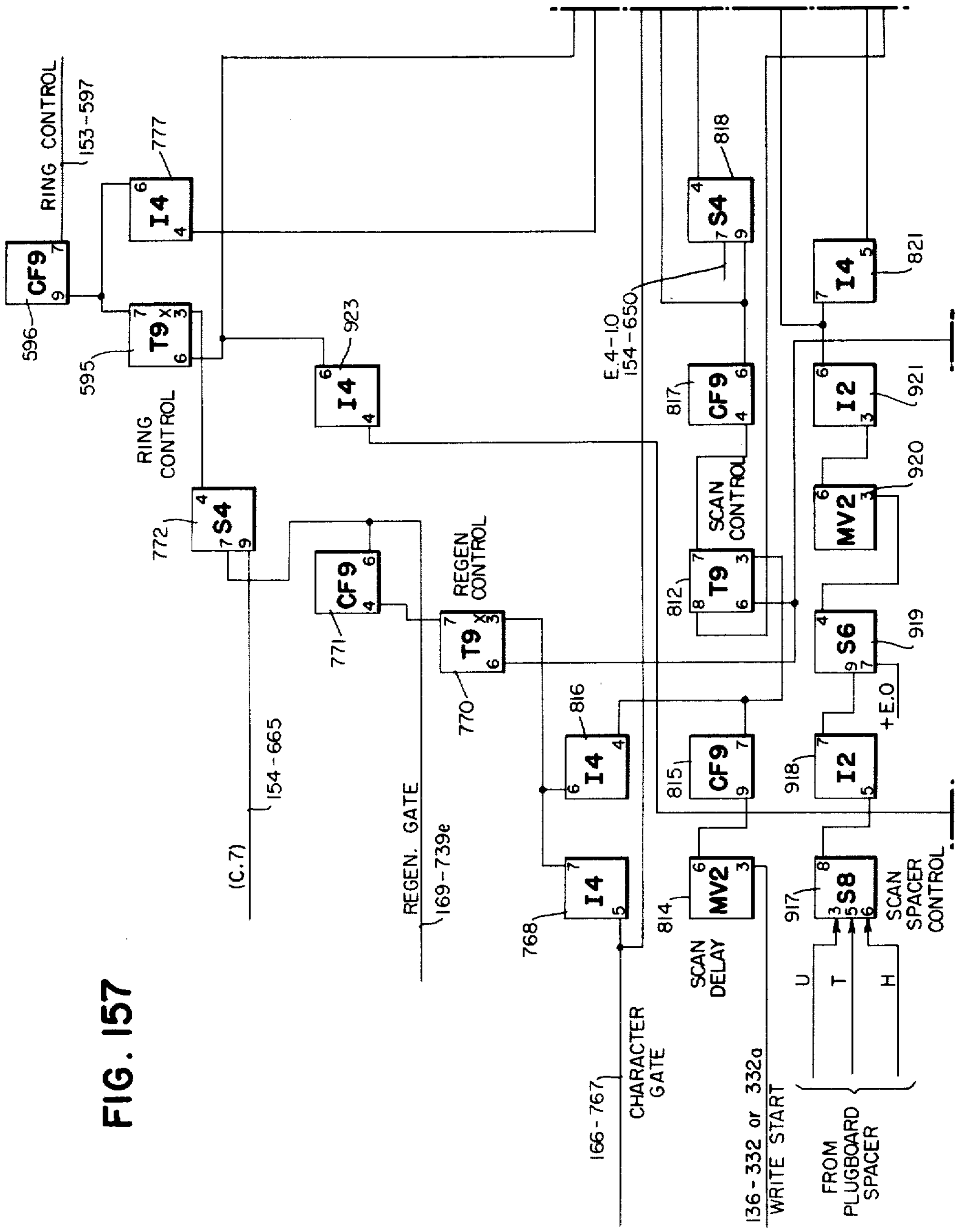
Figure 158:
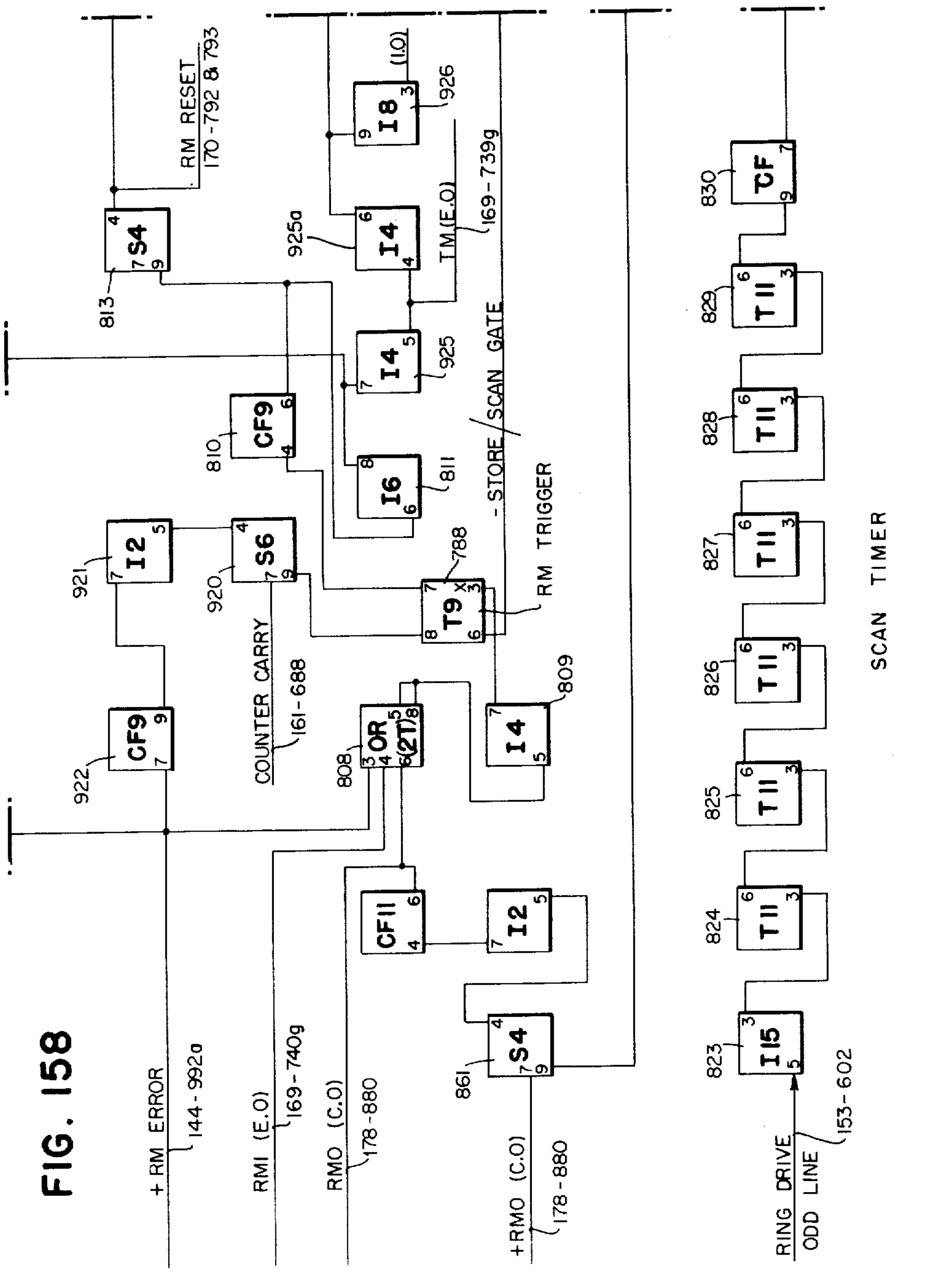
Figure 159:
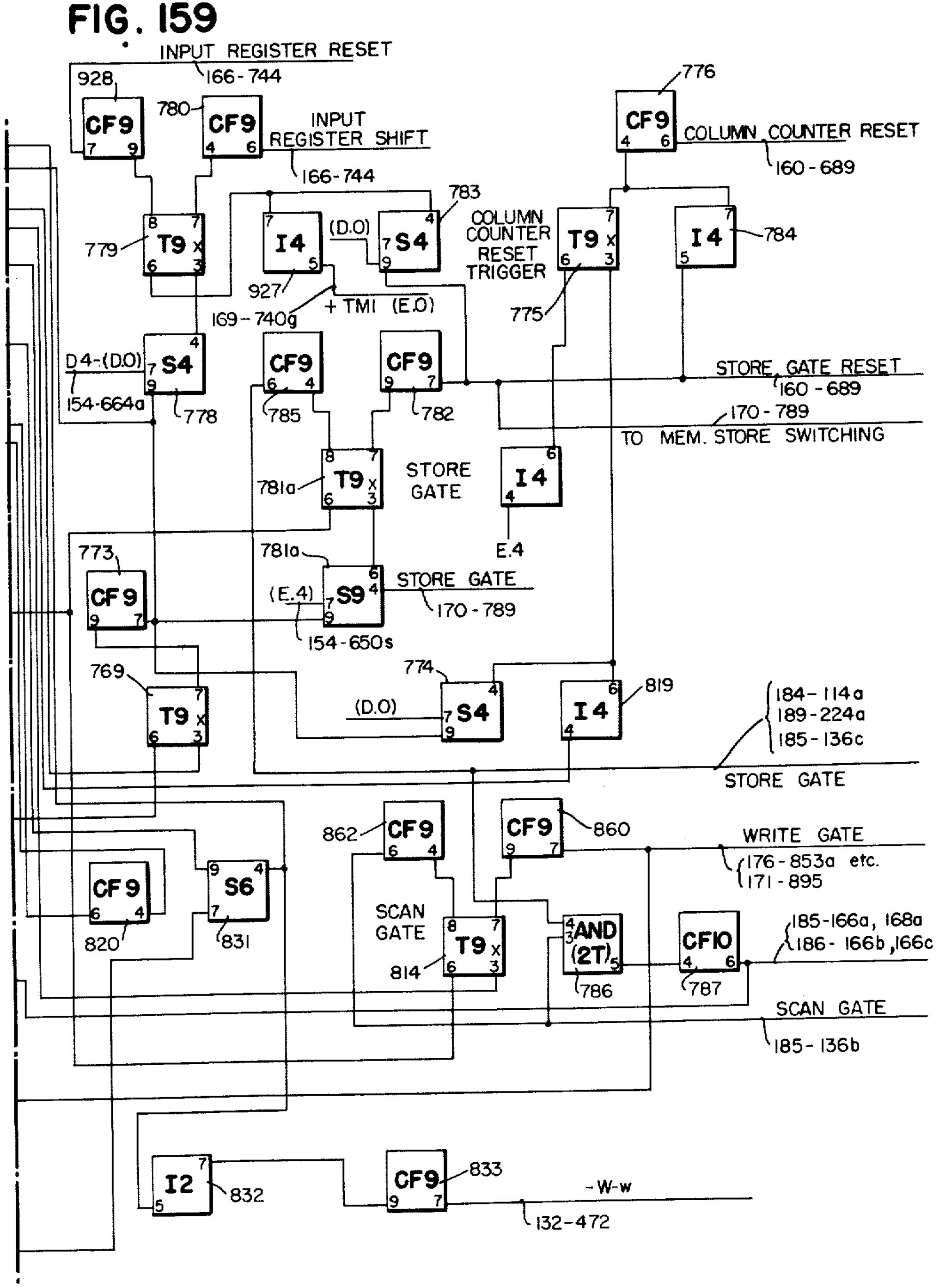
Figure 160:
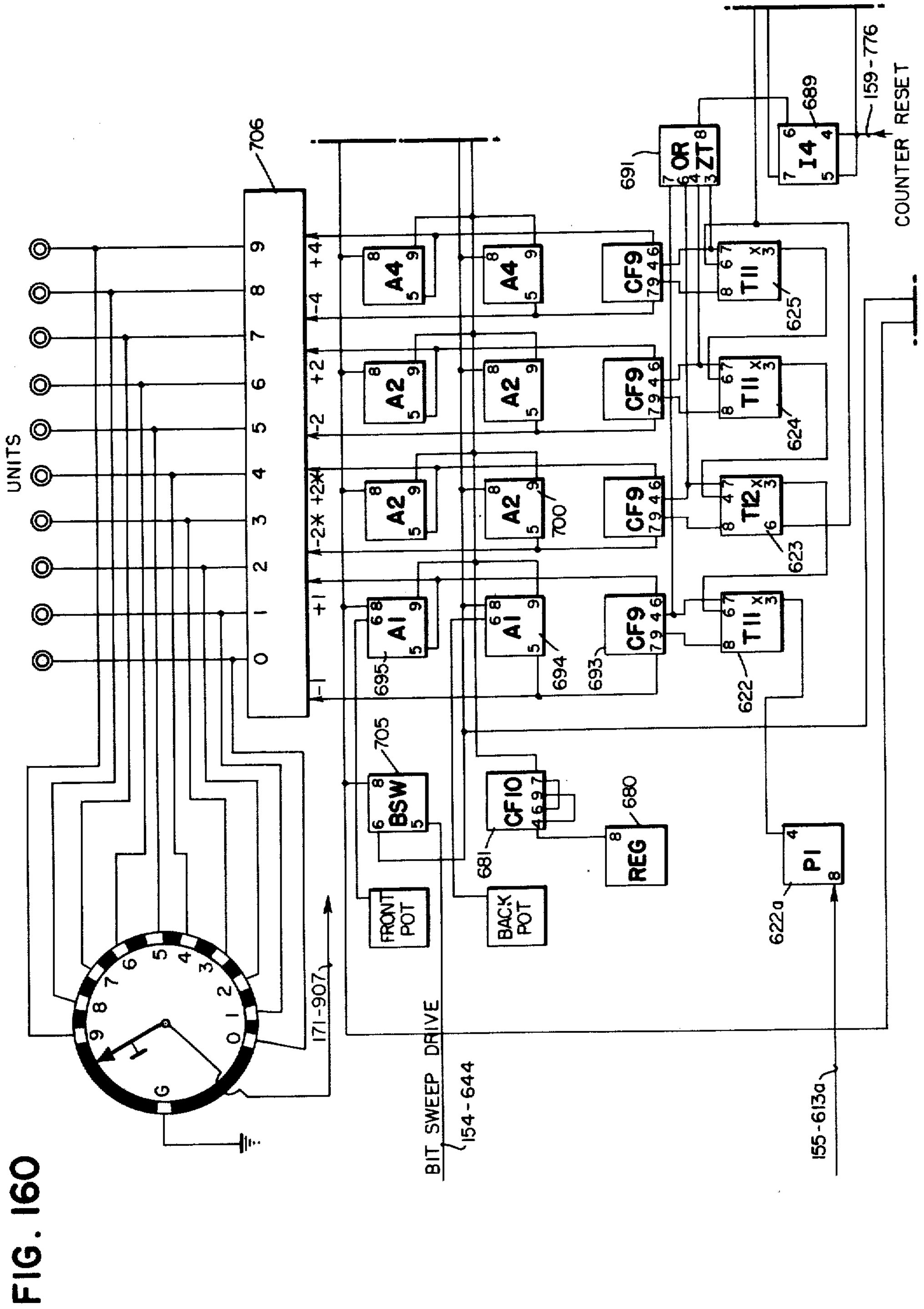
Figure 161:
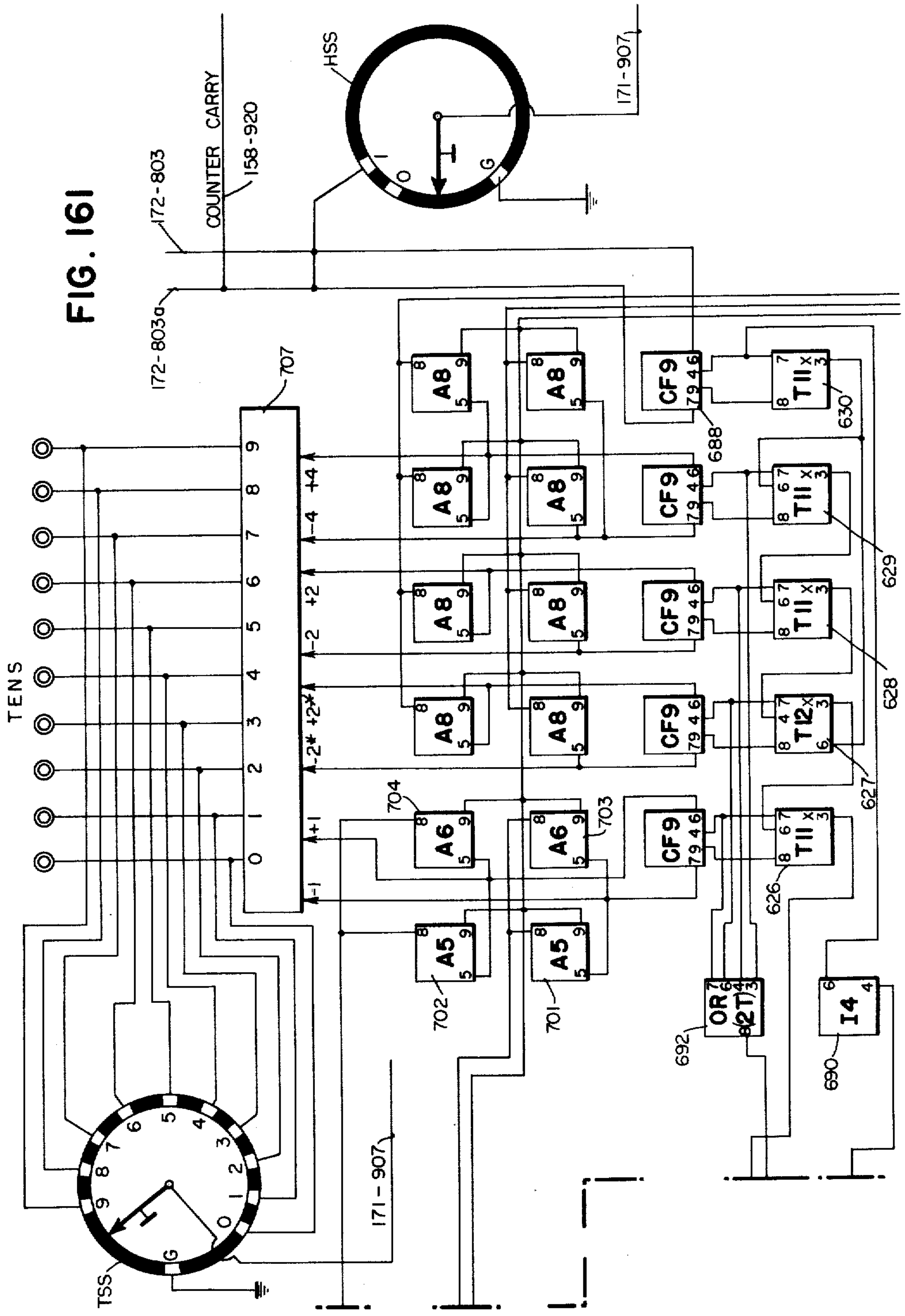
Figure 162:
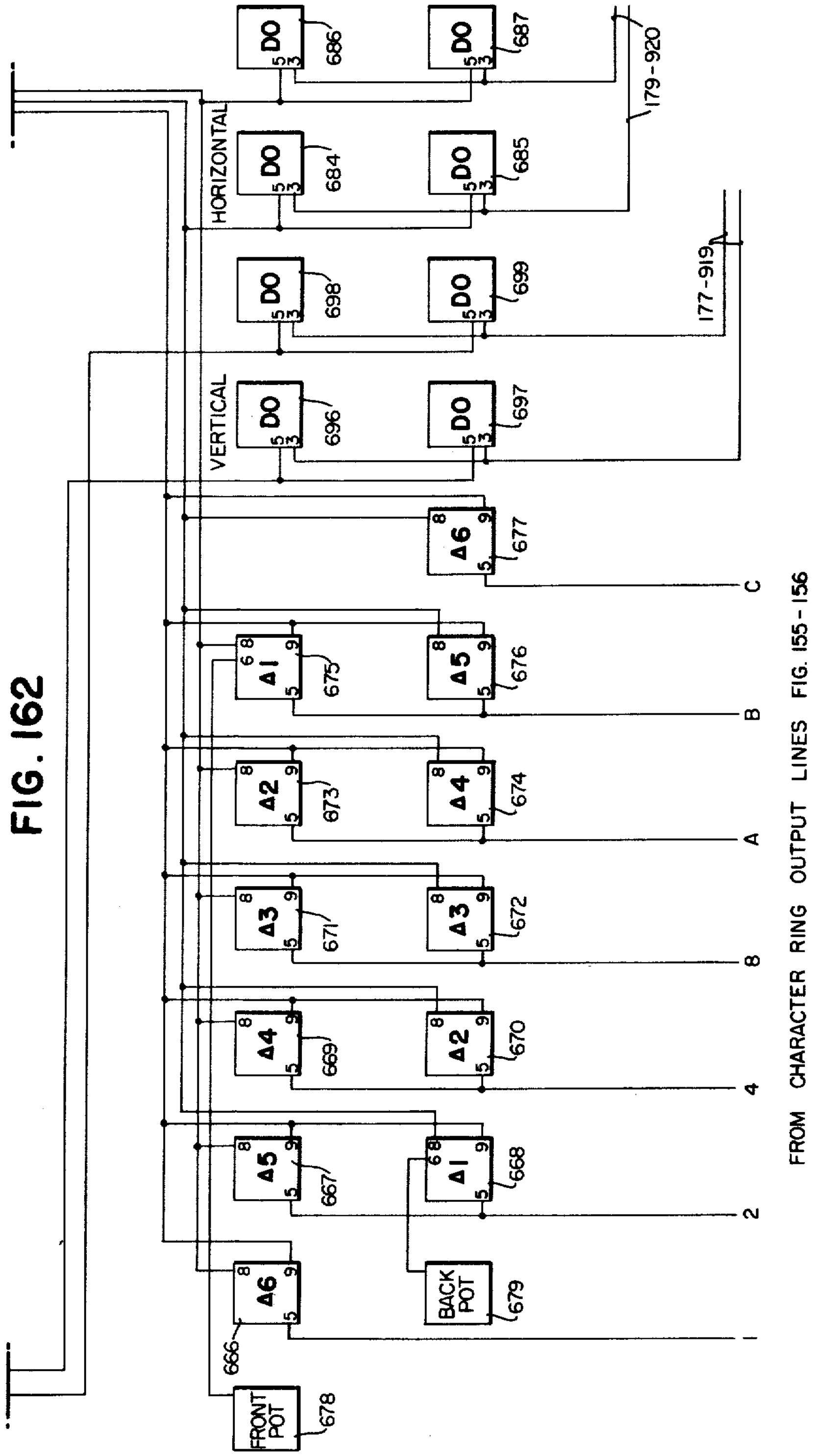
Figure 163:
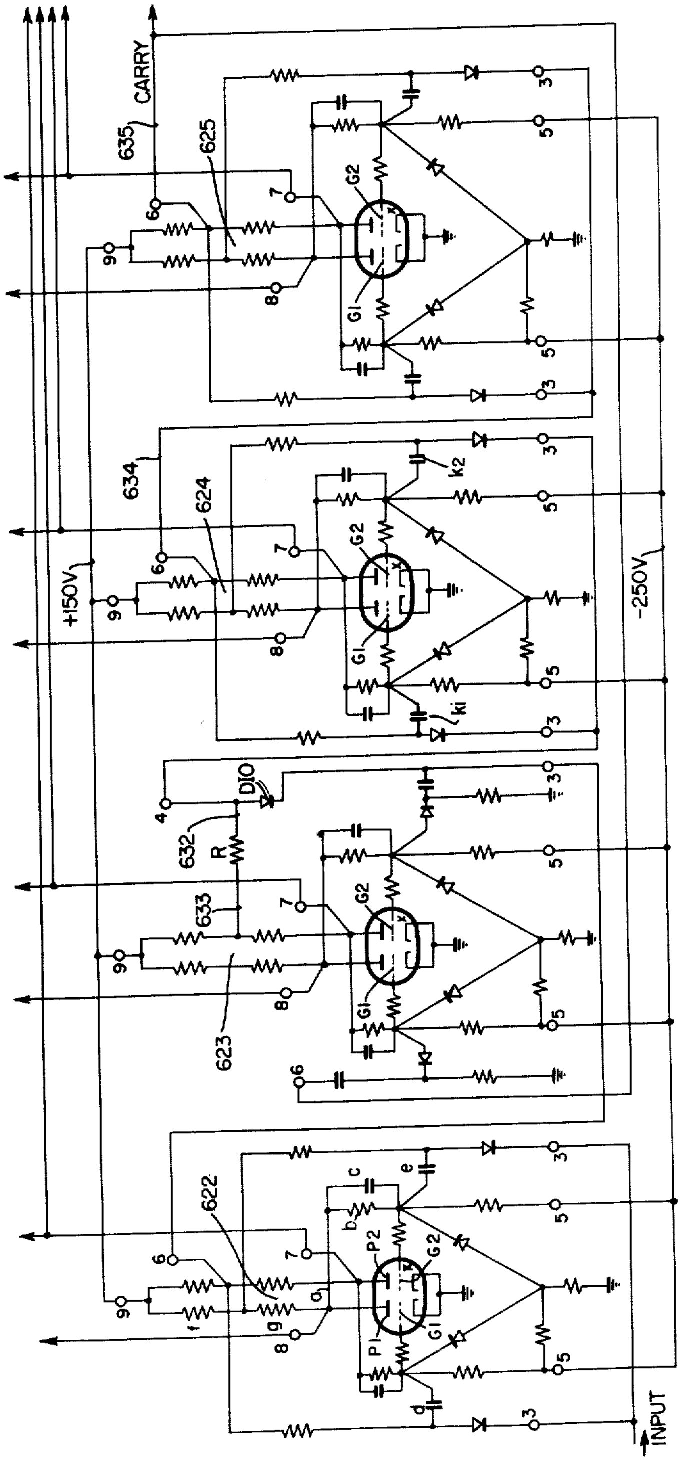
Figure 164:
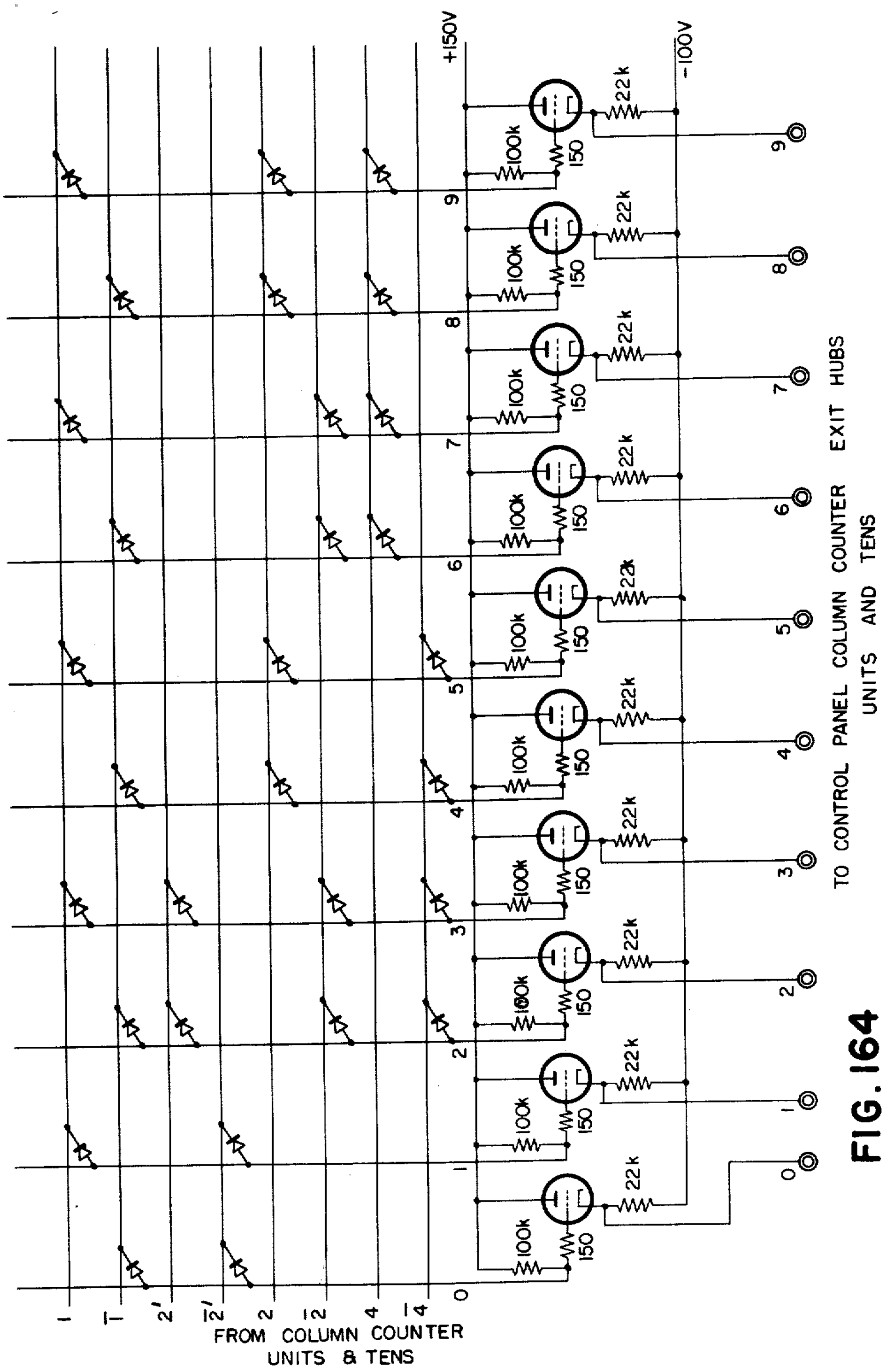
Figure 165:
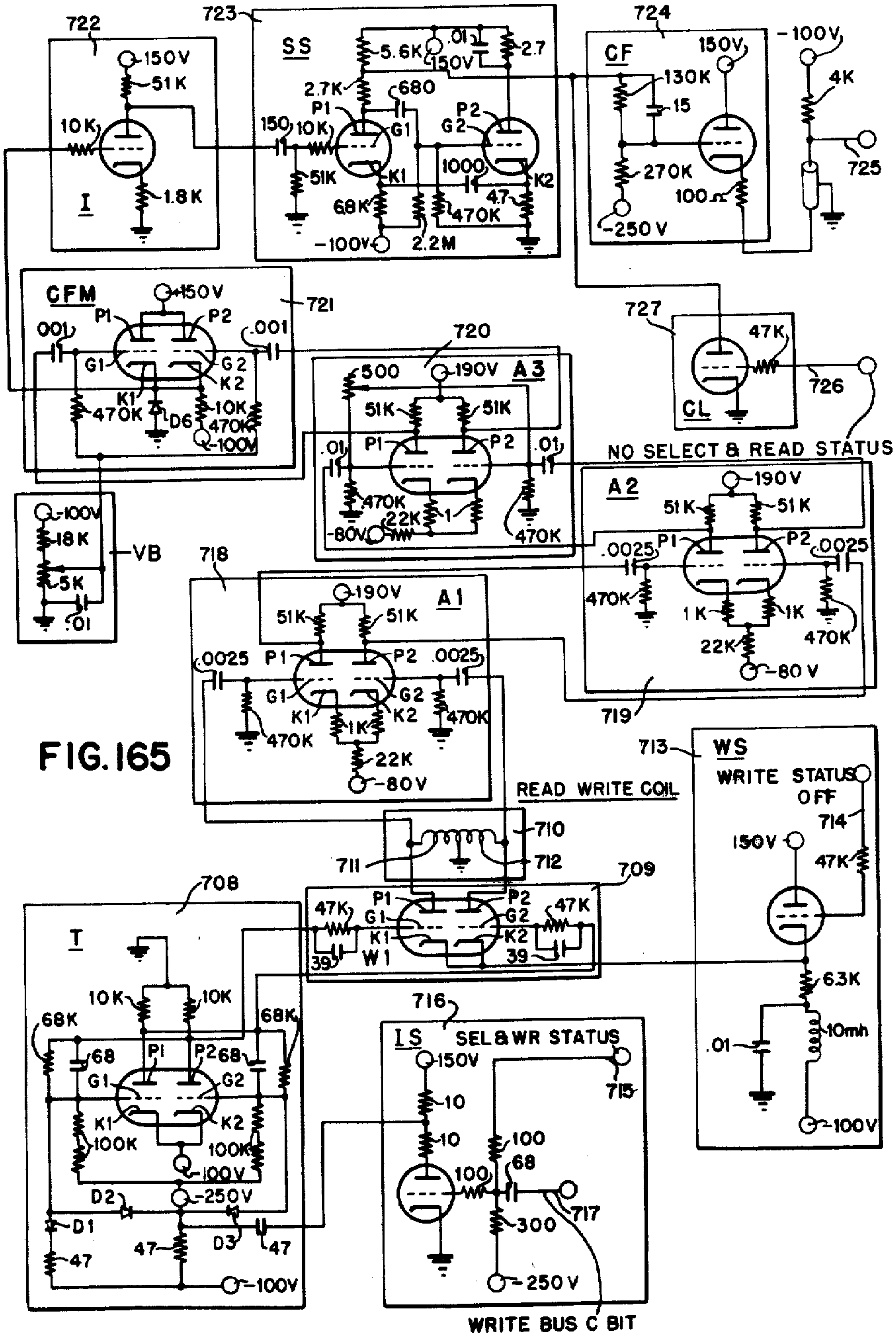
Figure 170:
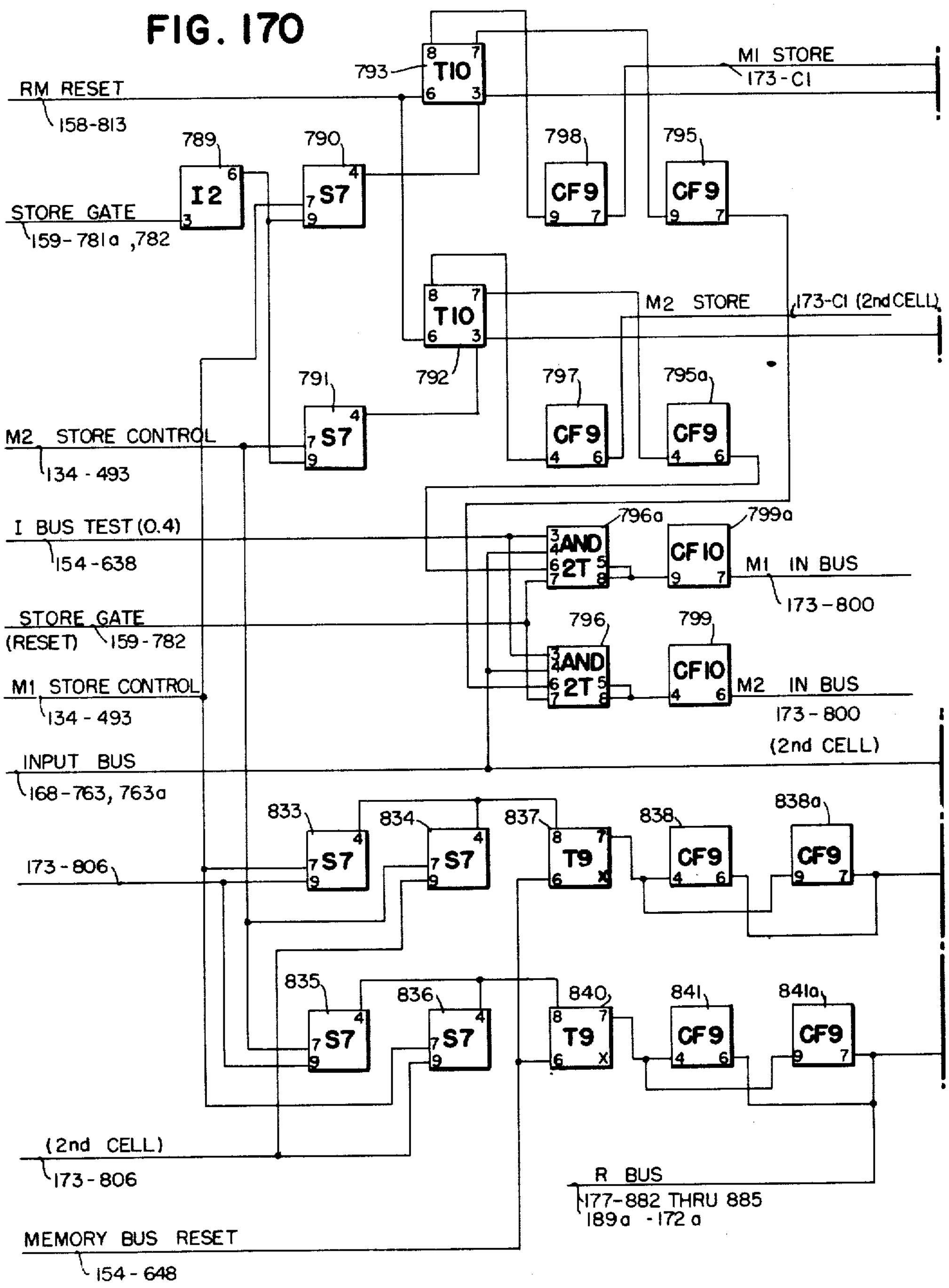
Figure 171:
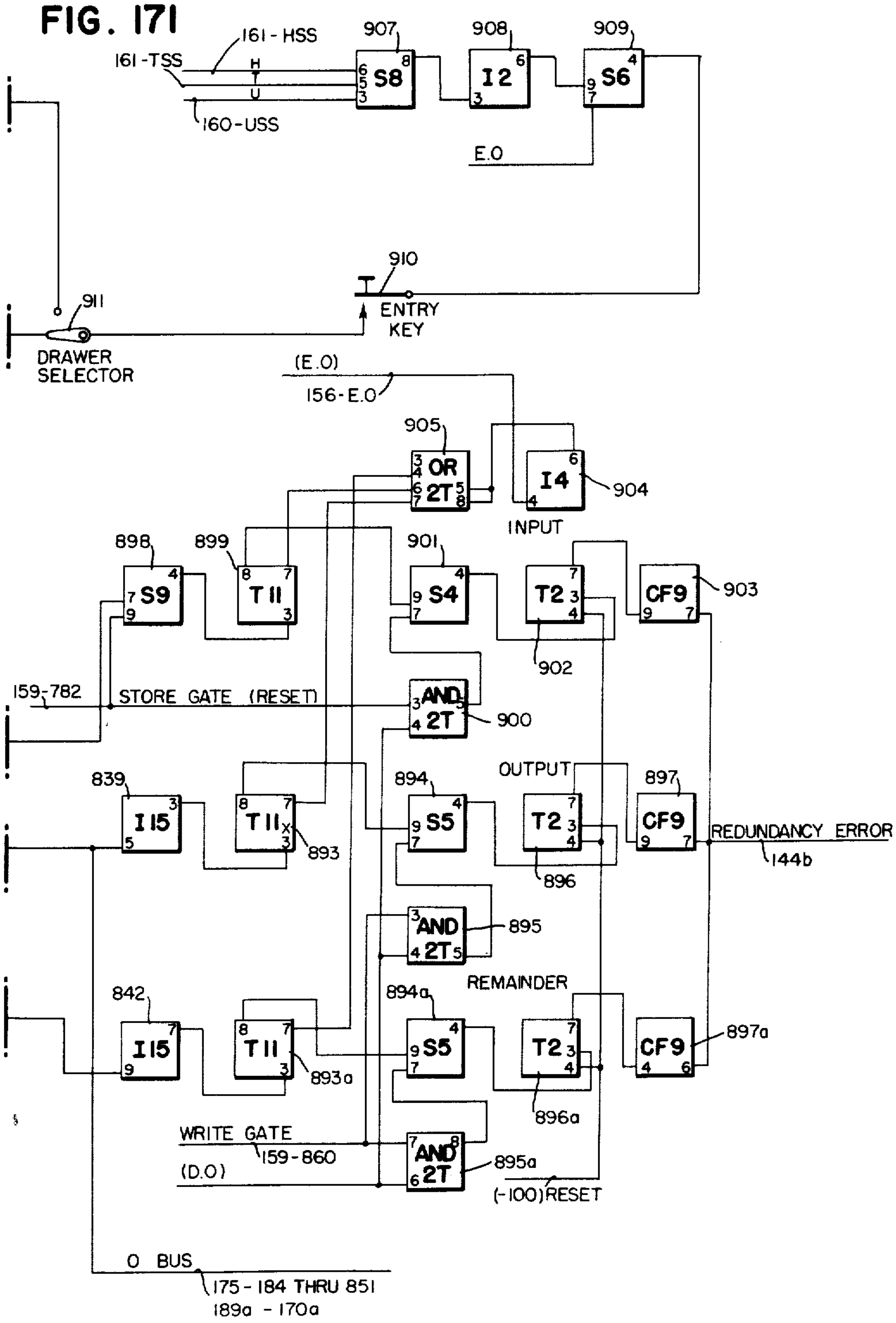
Figure 172:
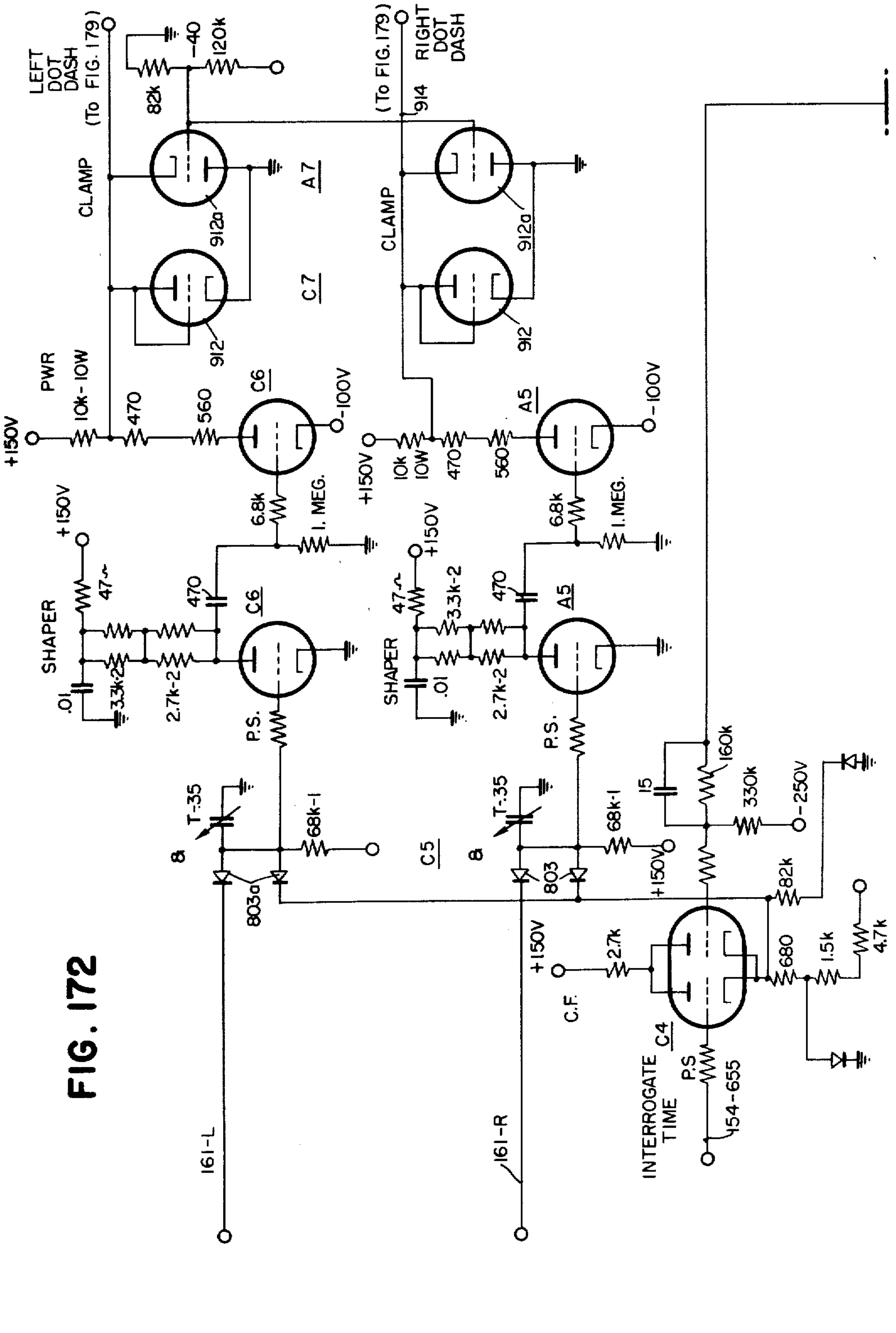
Figure 173:
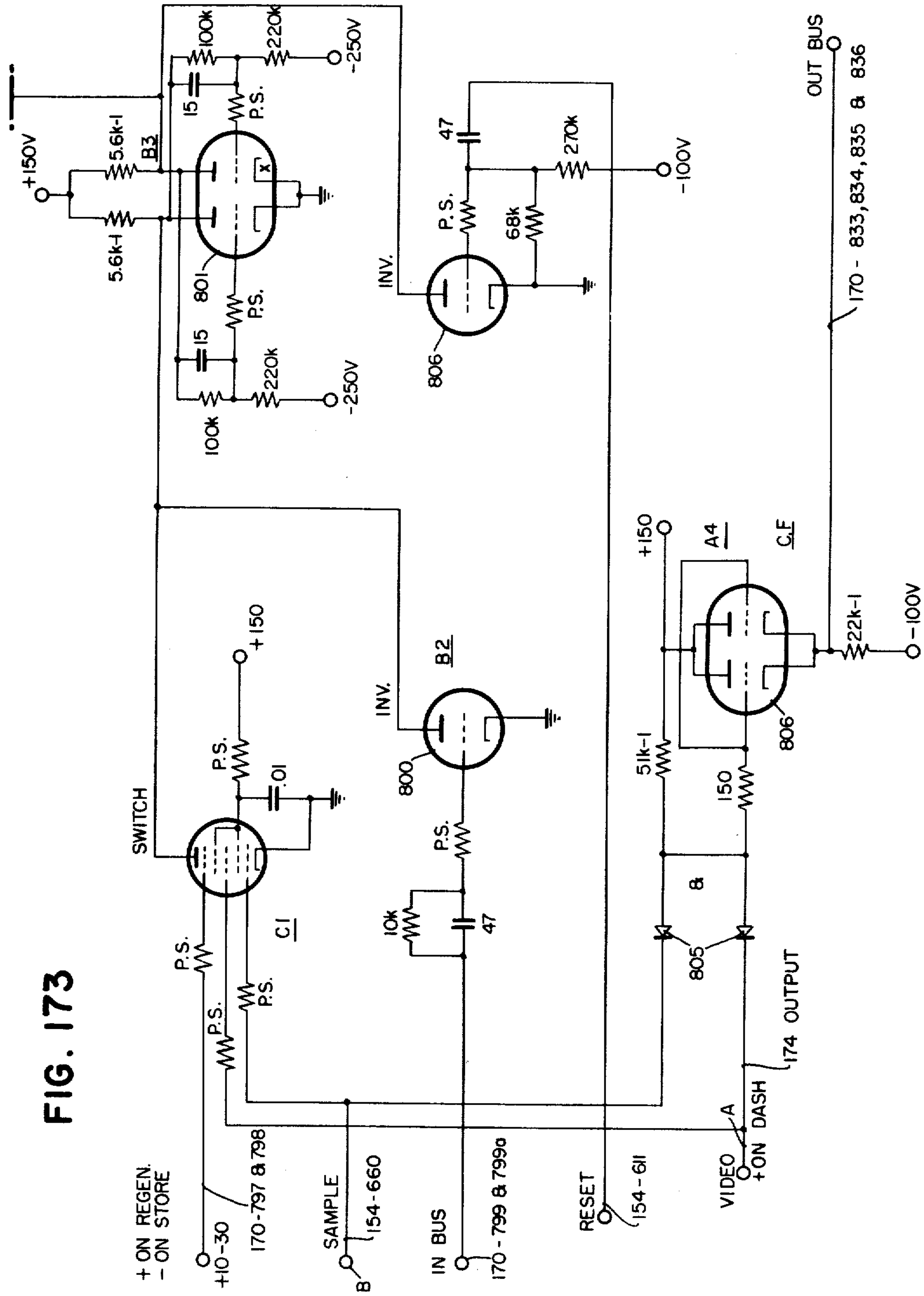
Figure 174:
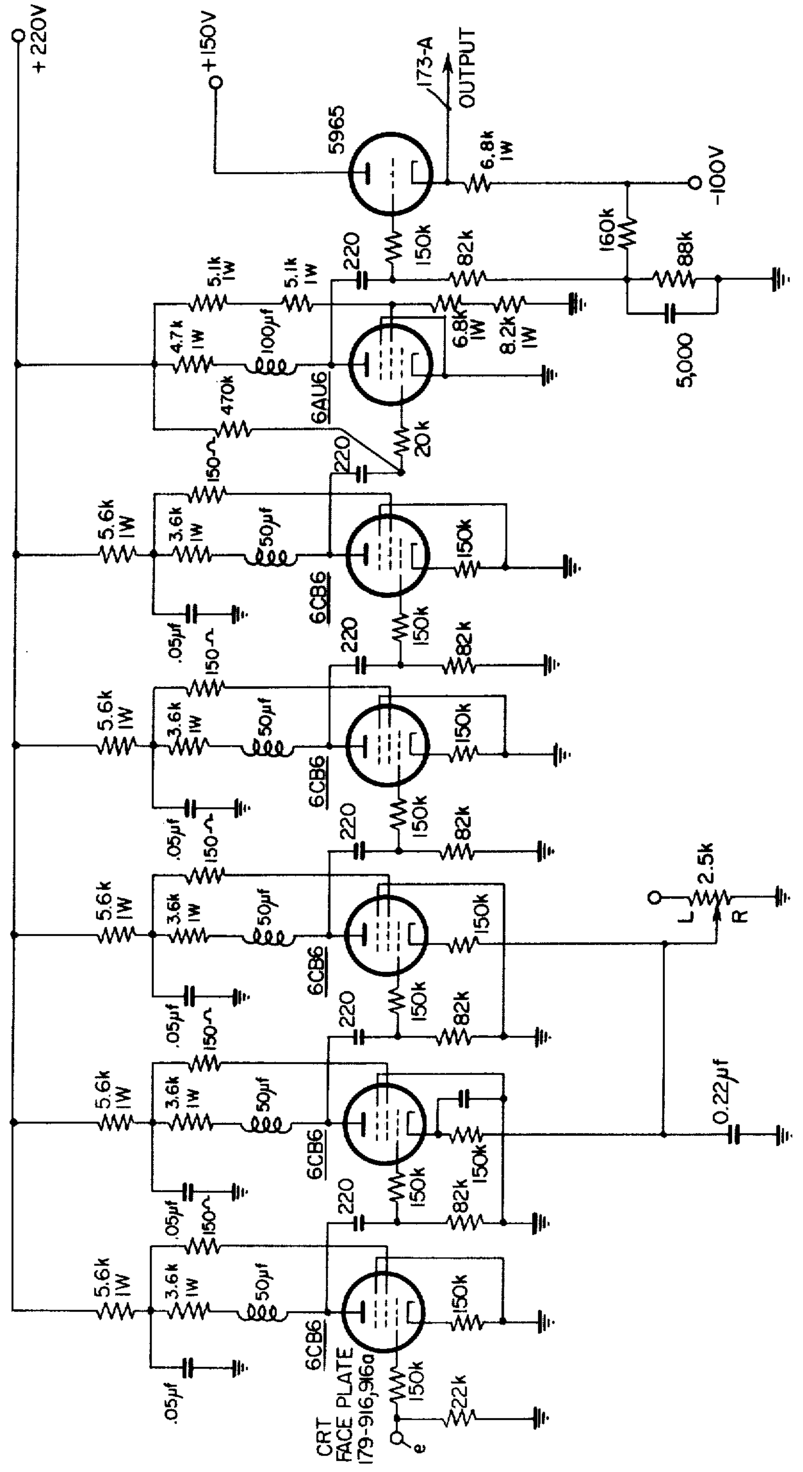
Figure 179:
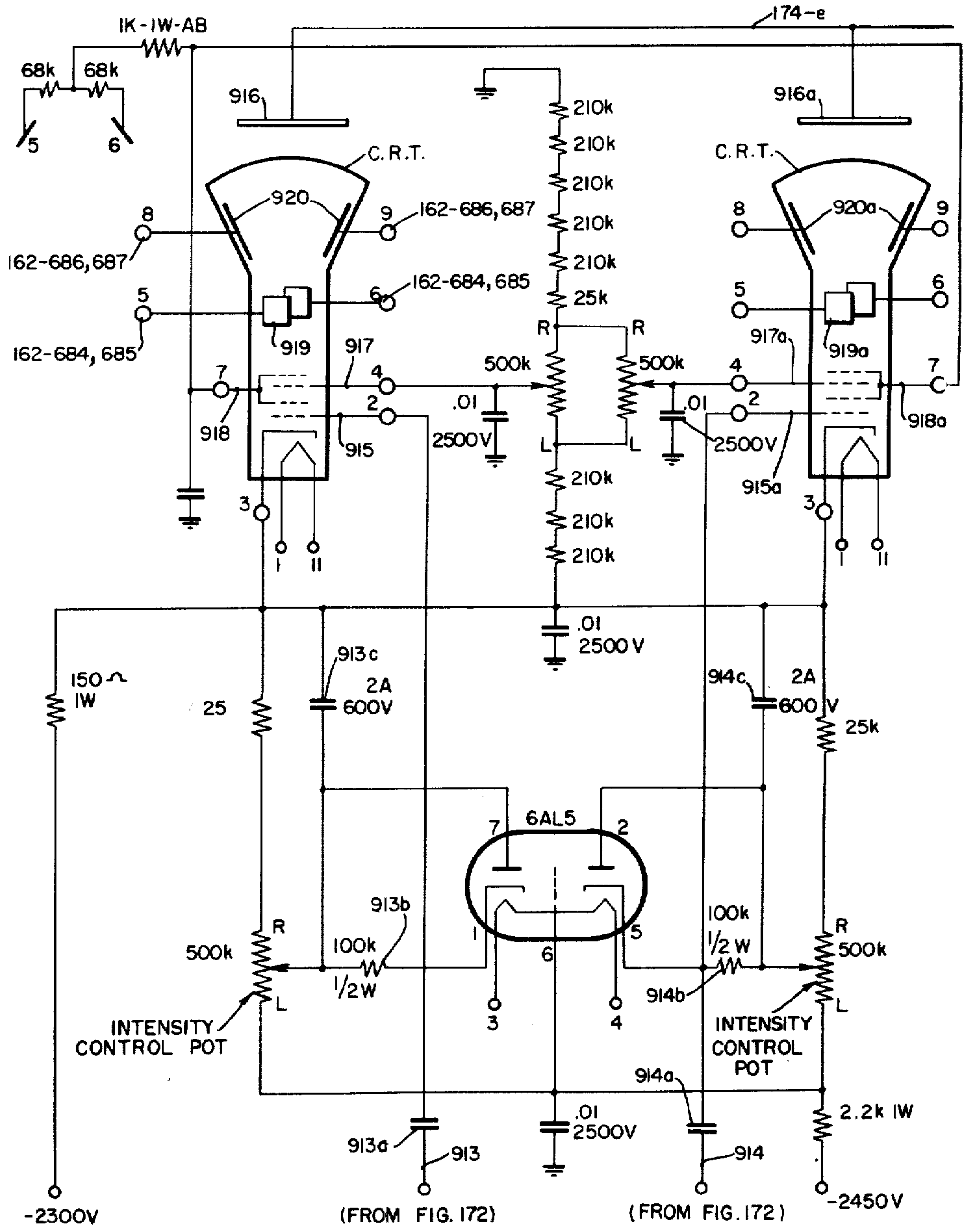
Figure 180:
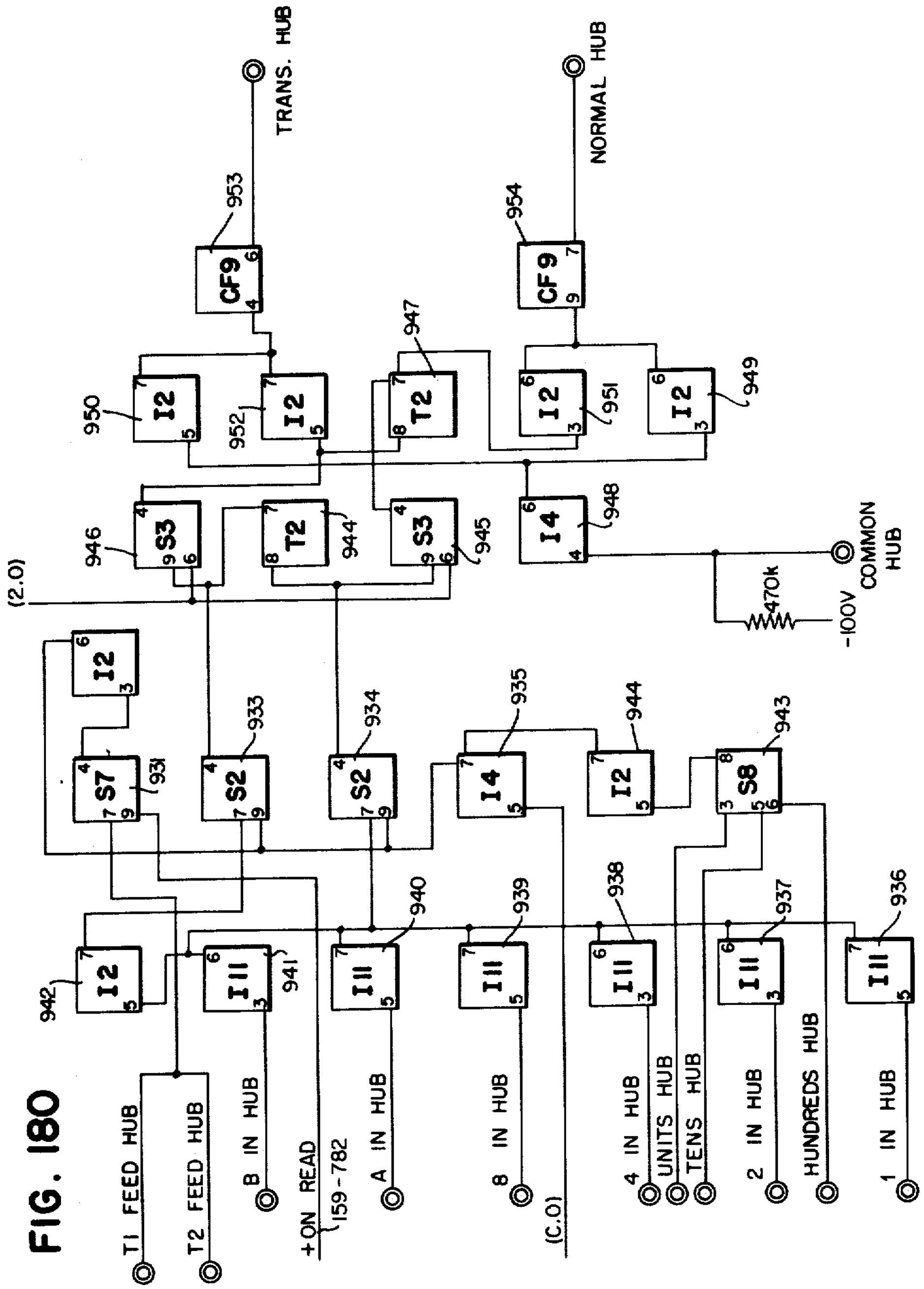
Figure 182:
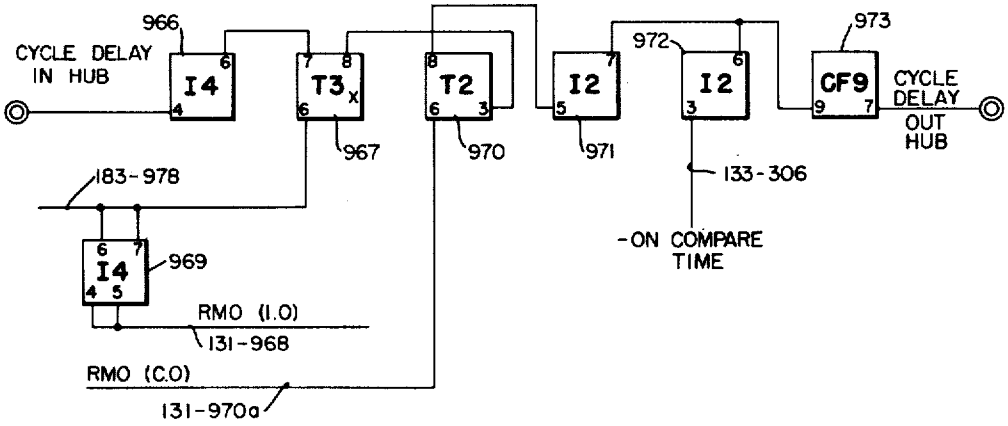
Figure 181:
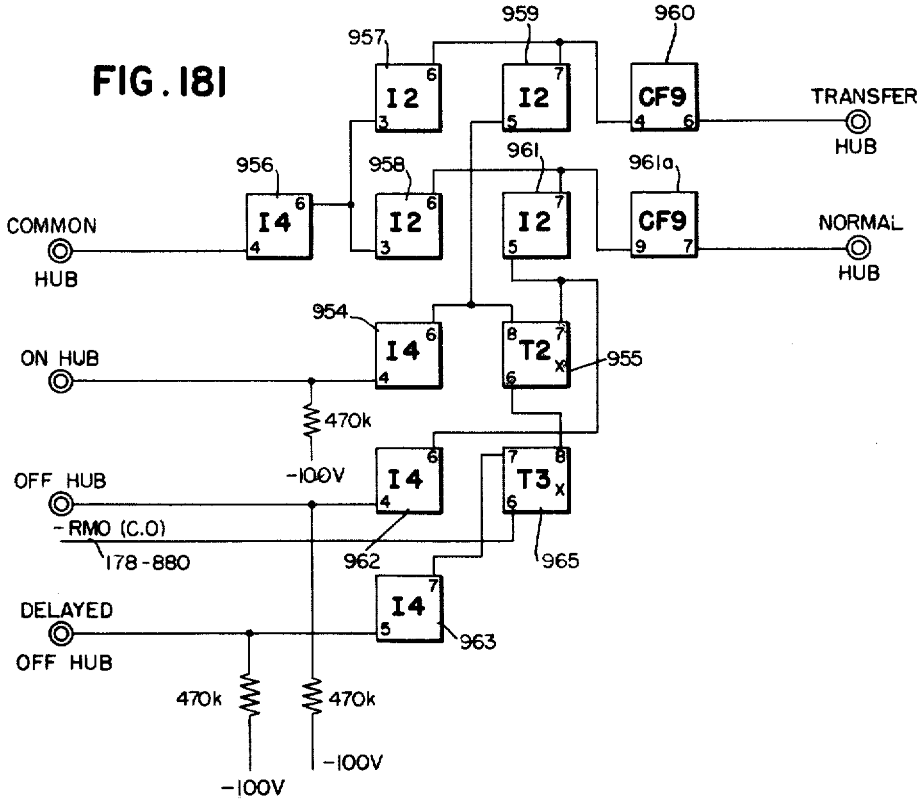
Figure 183:
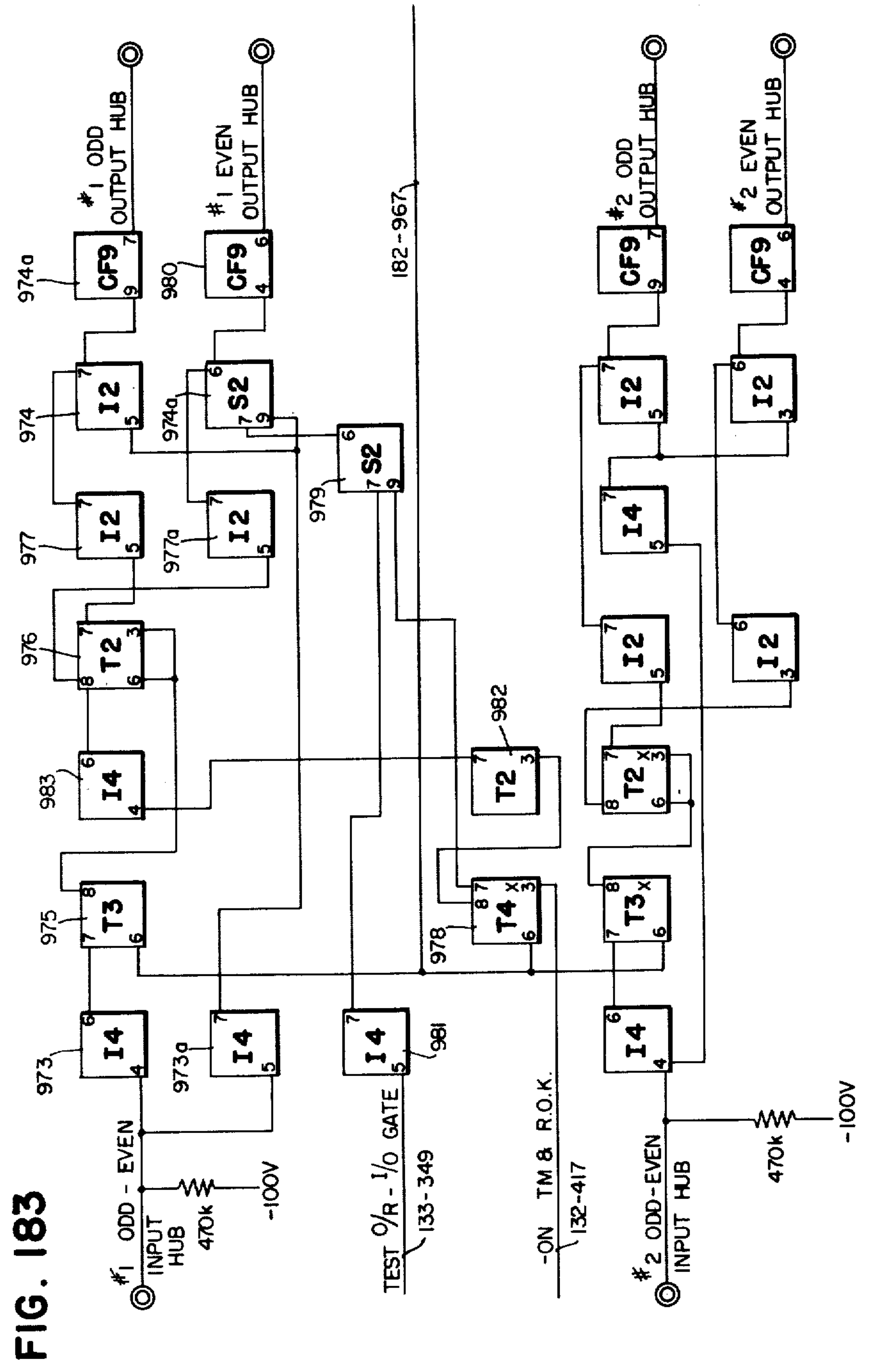
Figure 188:
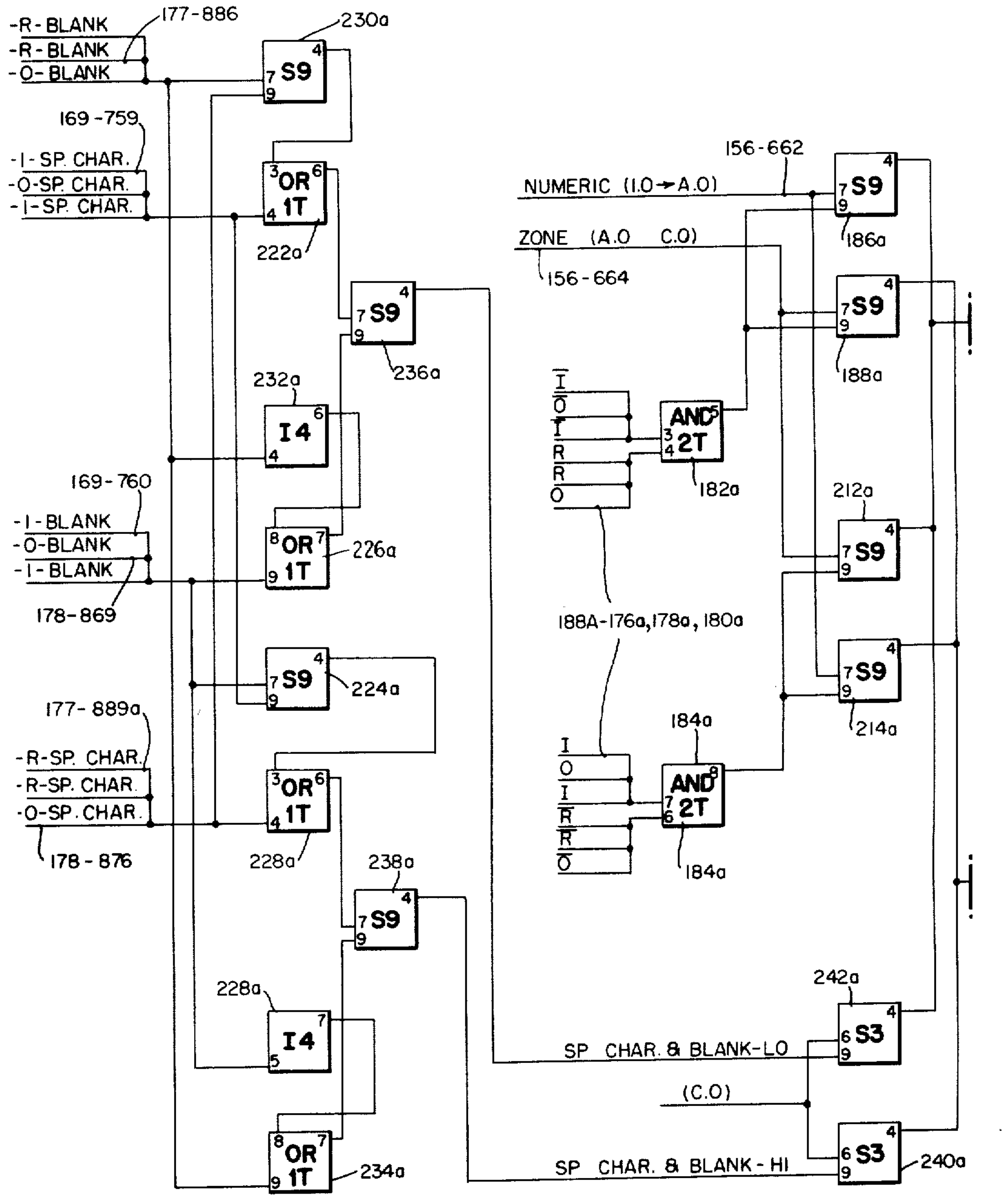
Figures 189, 189A:
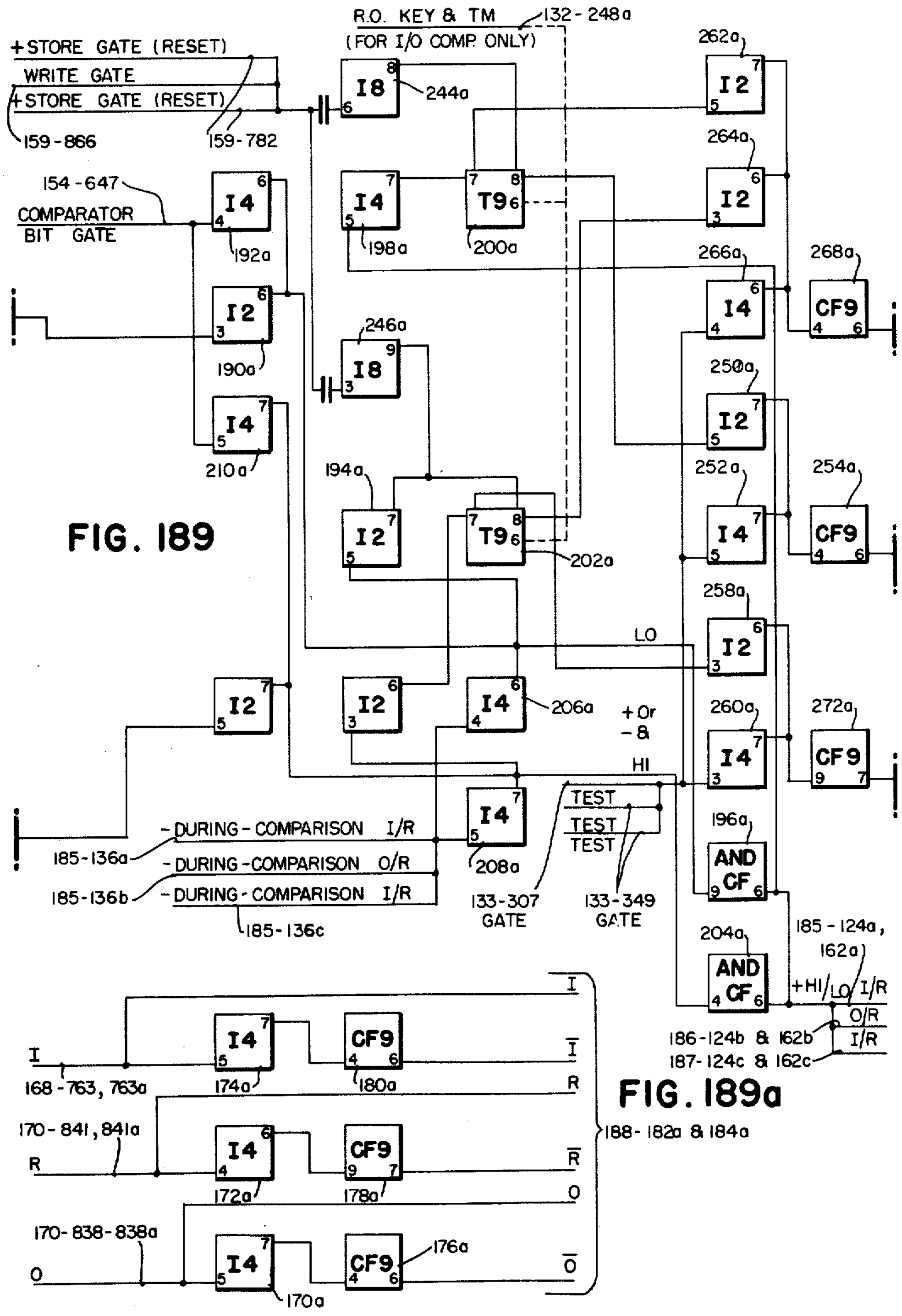
Figure 190:
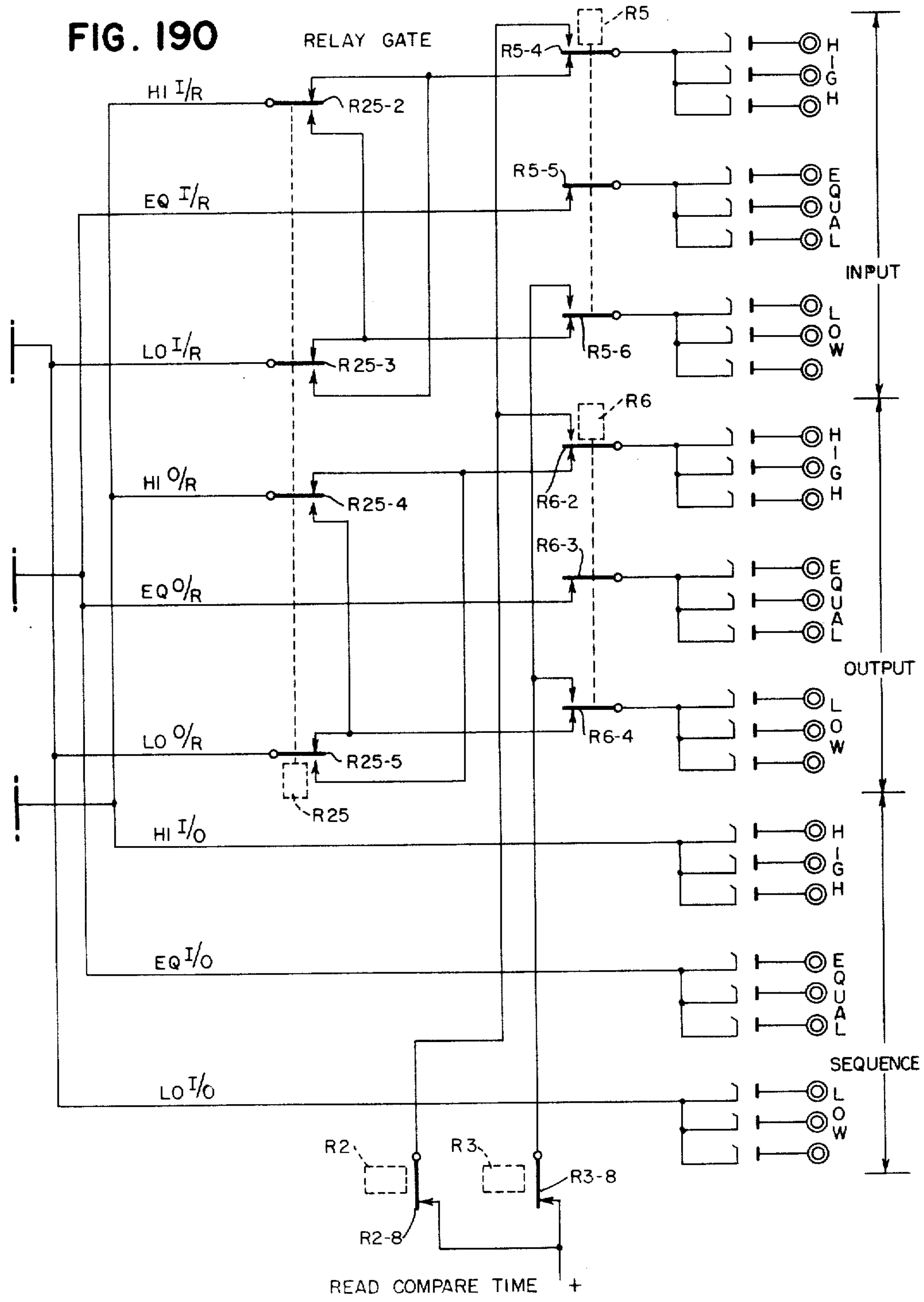
Figure 191:
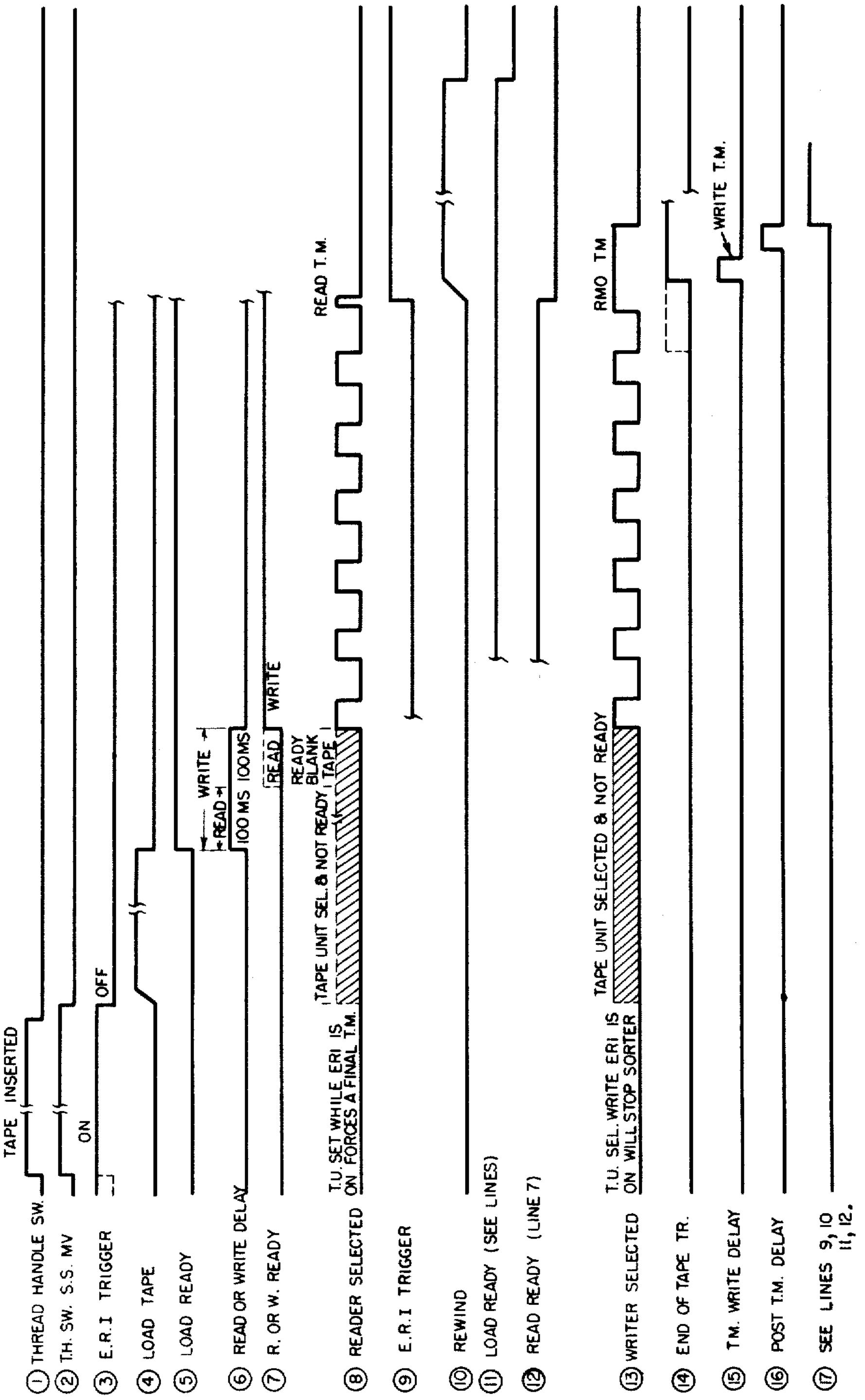
Figure 192:
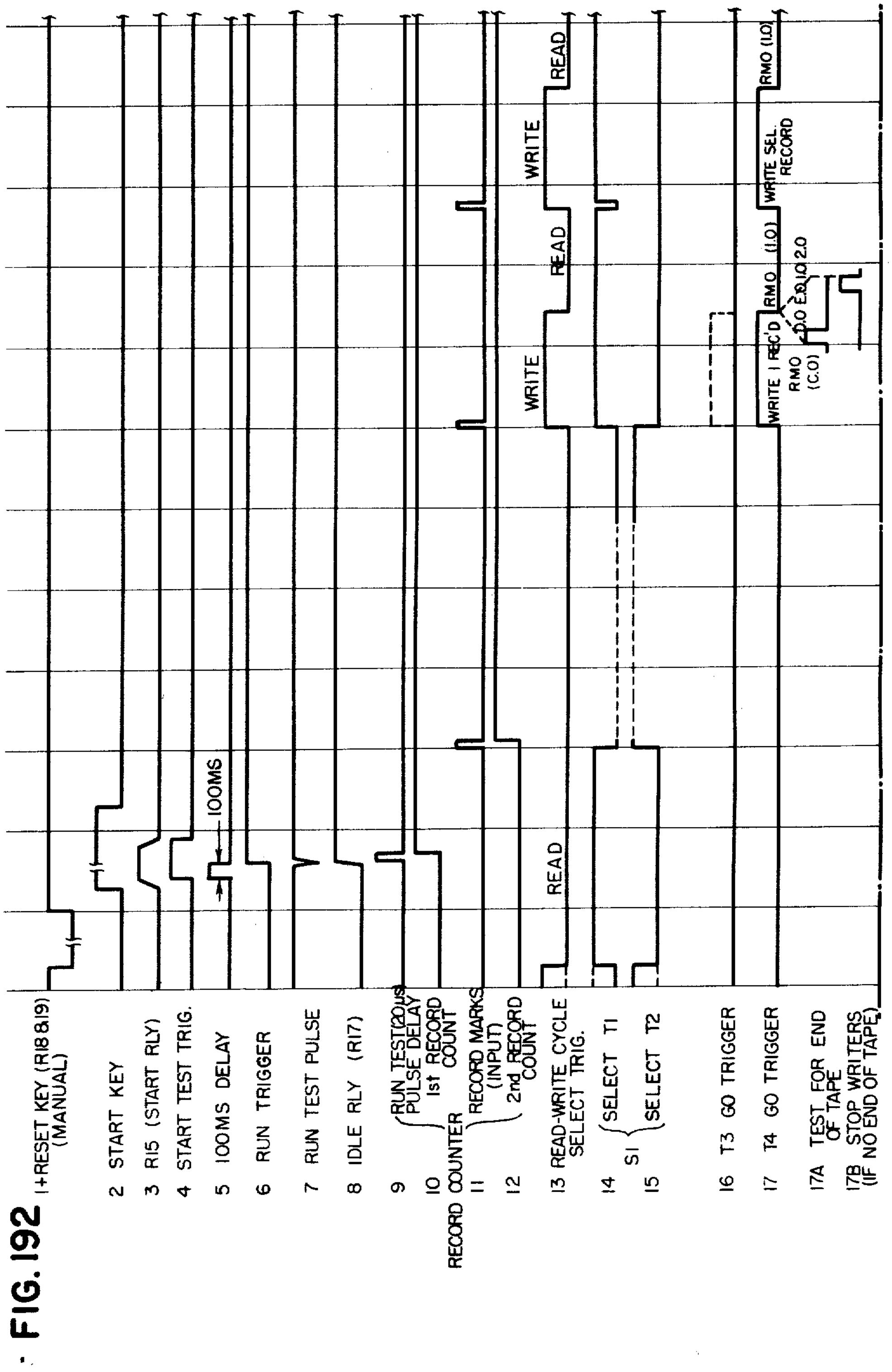
Figure 193:
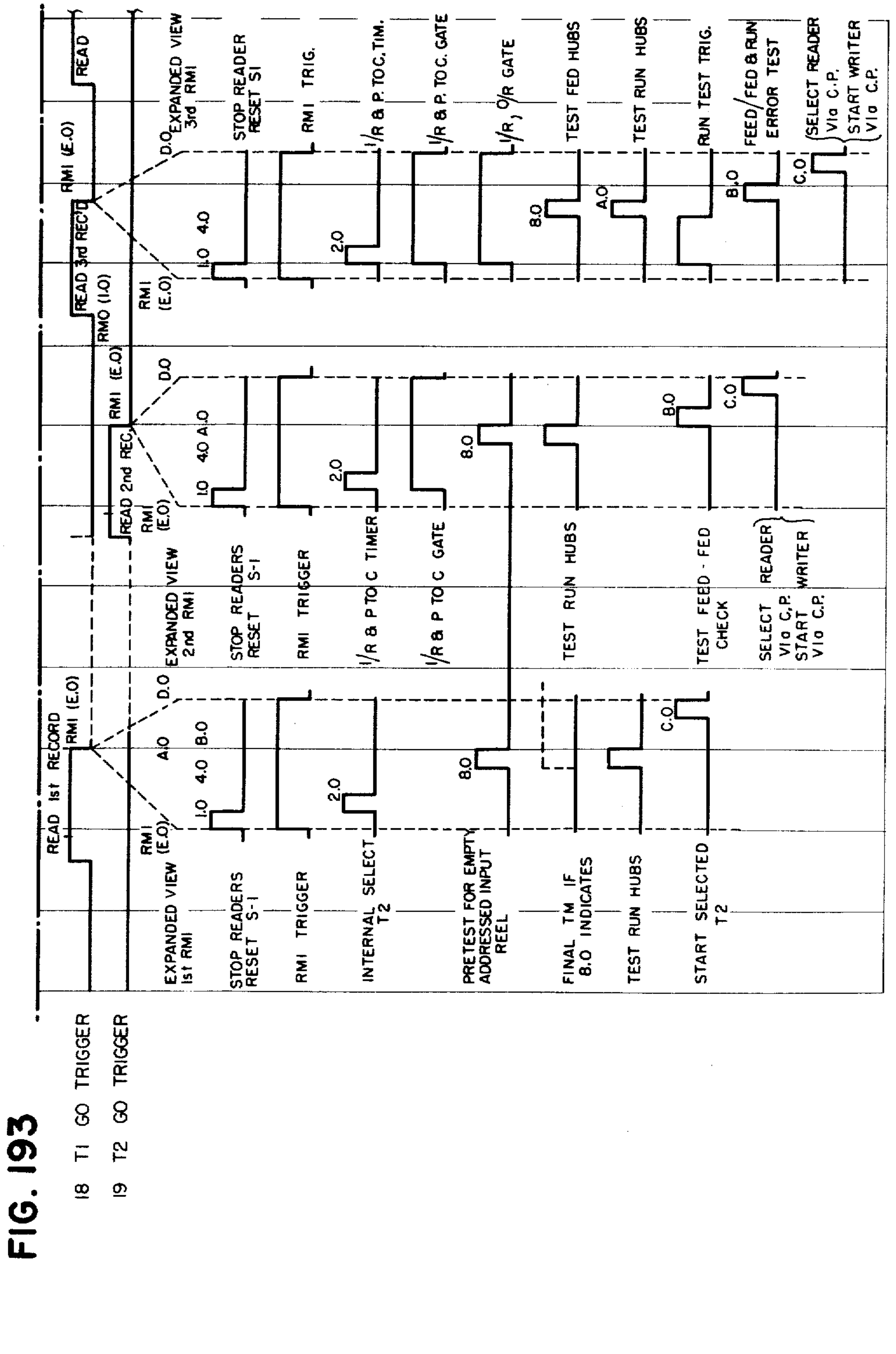
Figure 194:
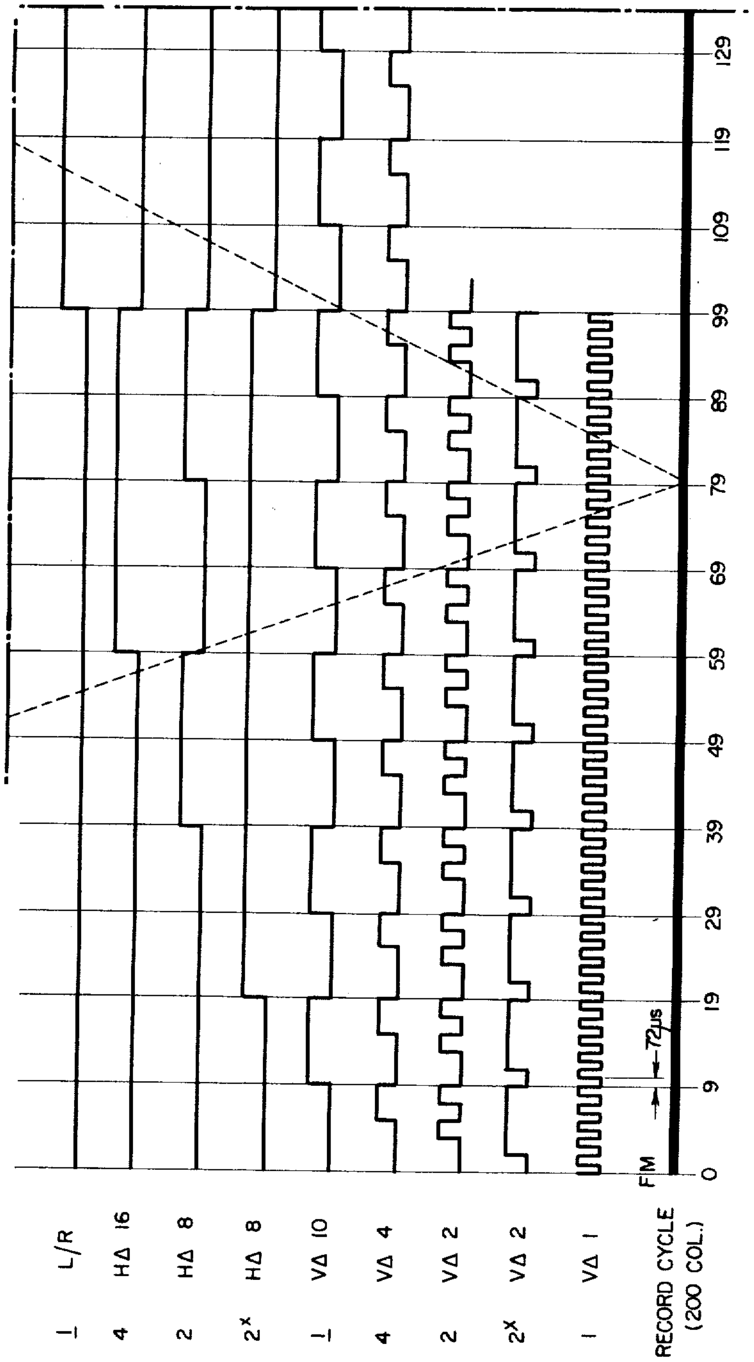
Figure 195:
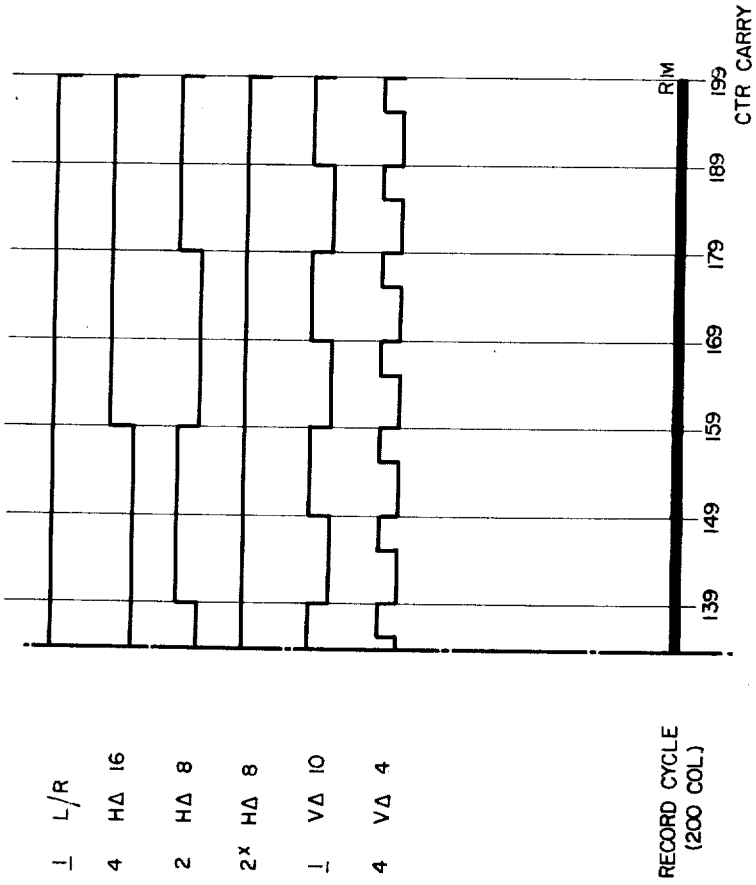
Figure 196:
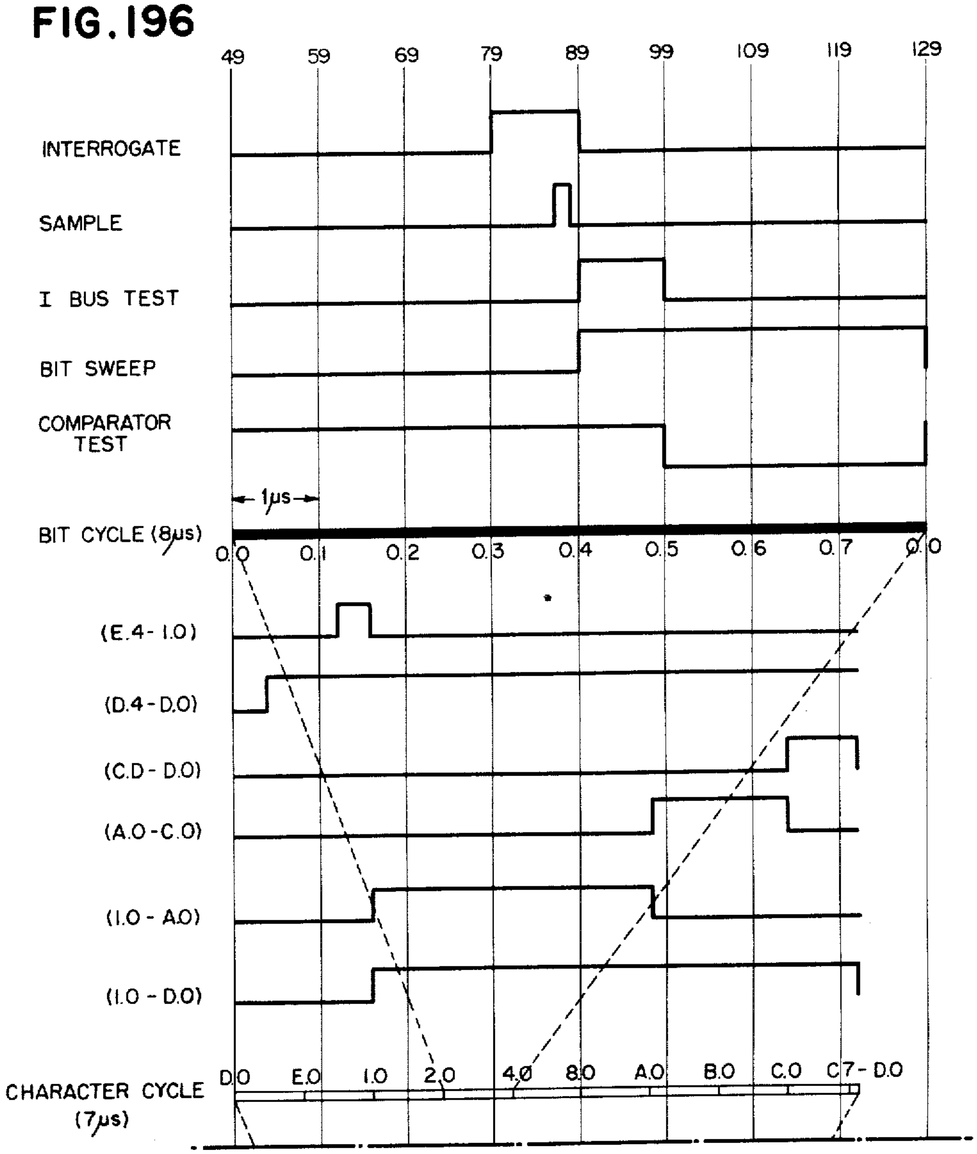
Figure 197:
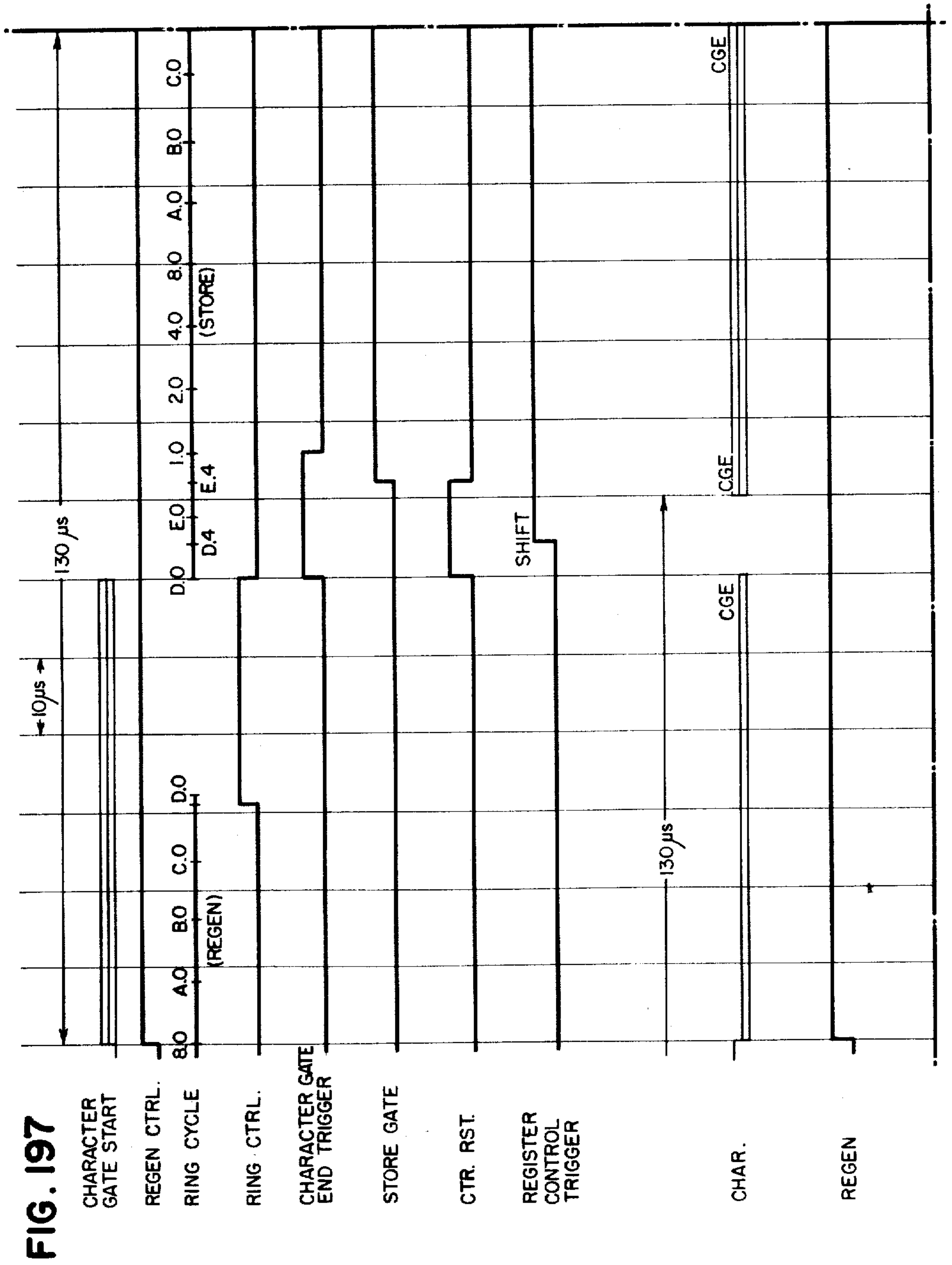
Figure 197A:
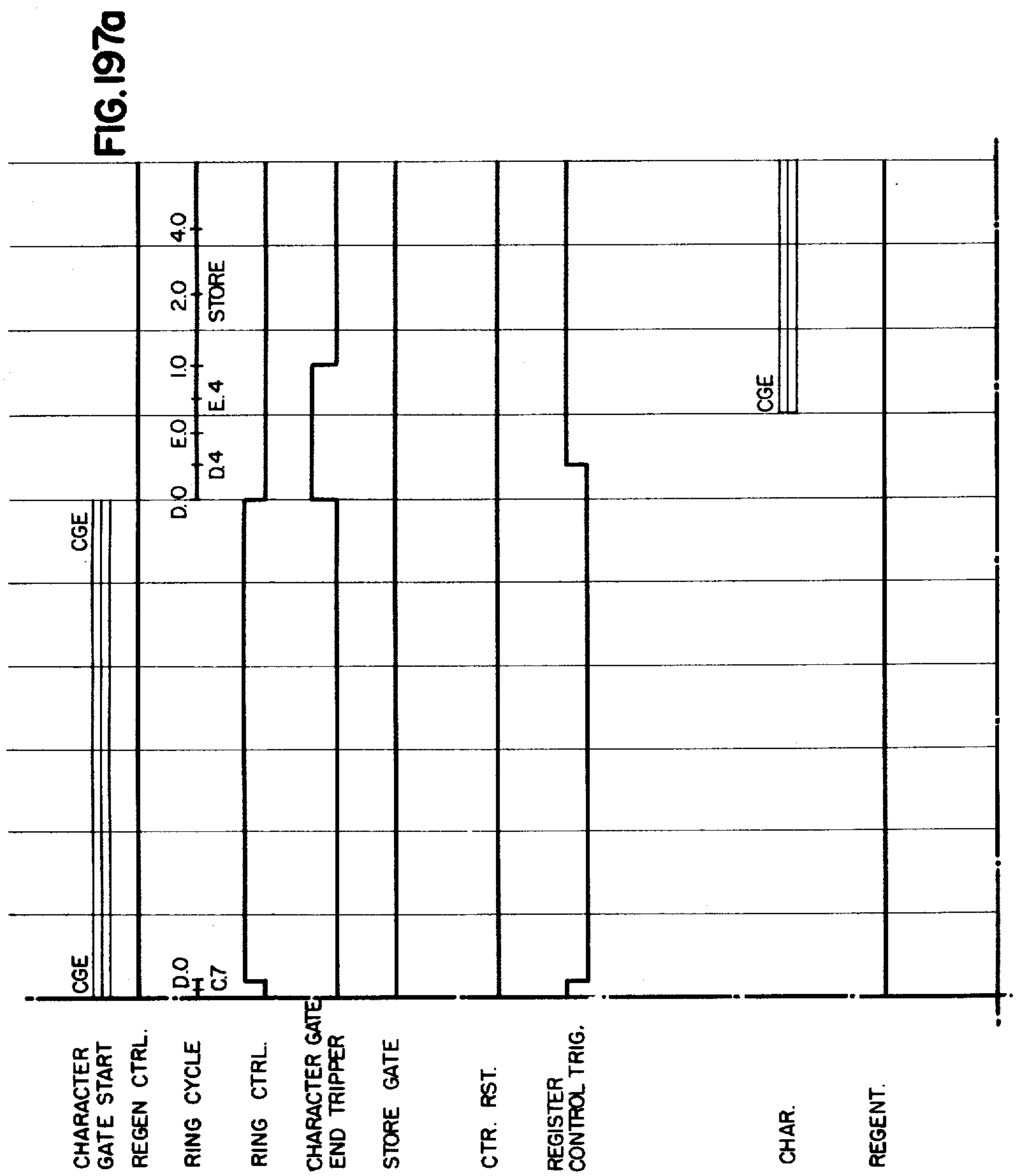
Figure 198:
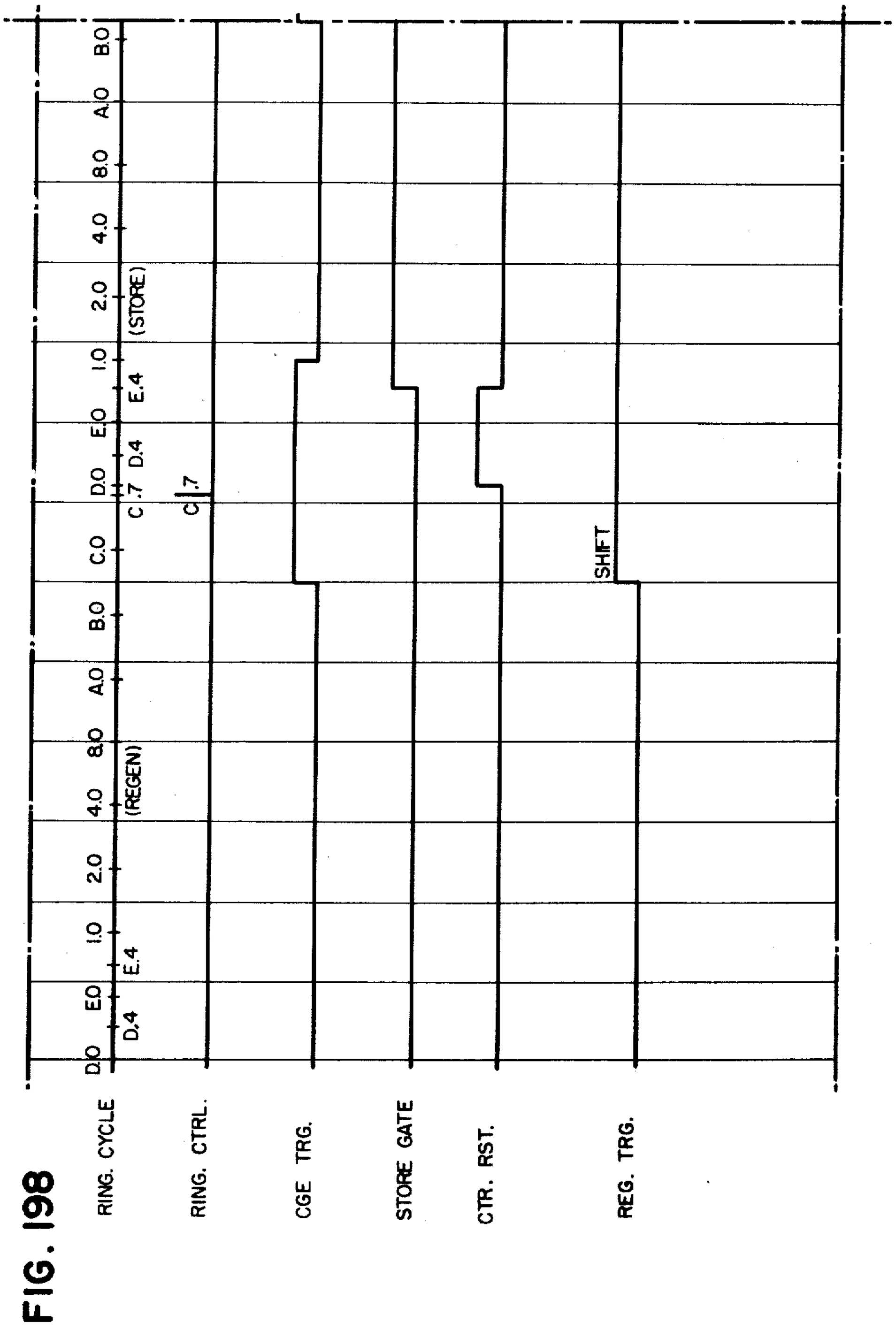
Figure 198A:
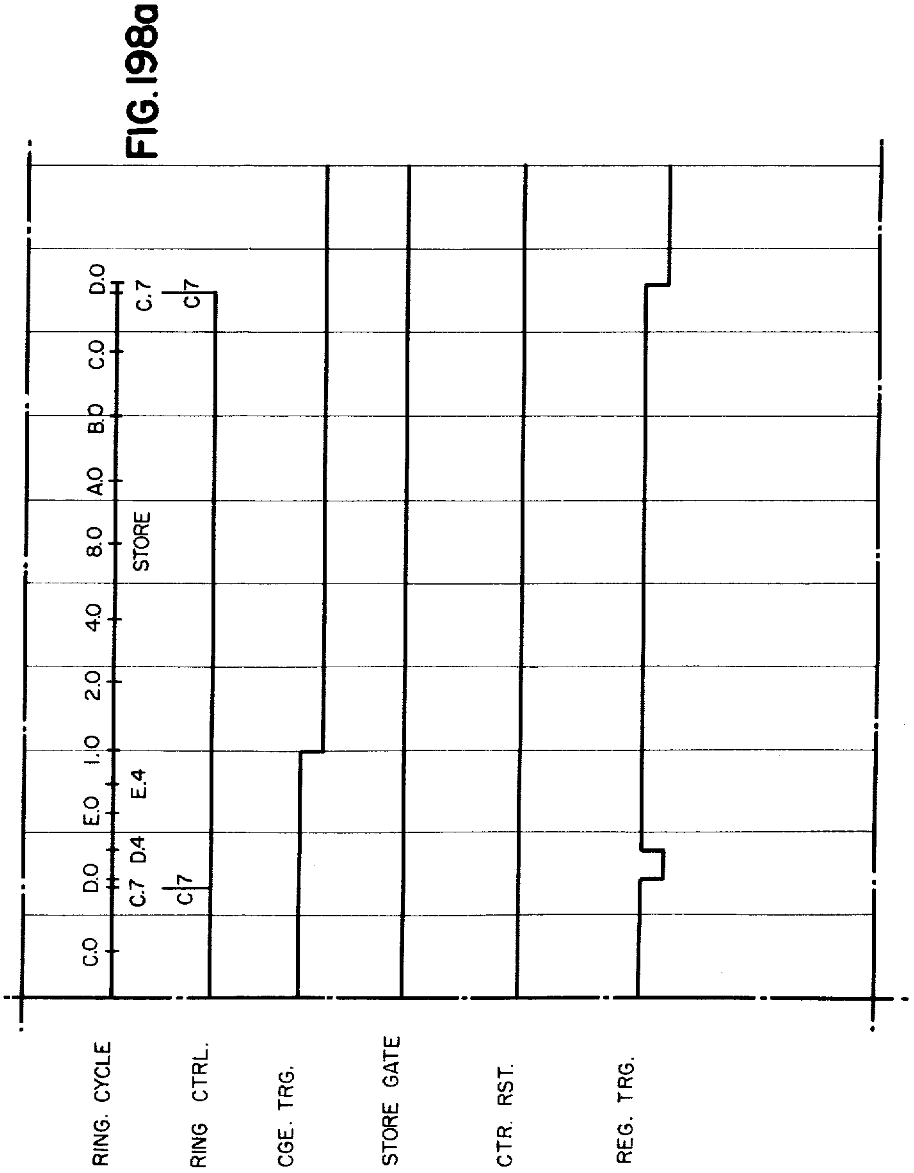
Figure 199:
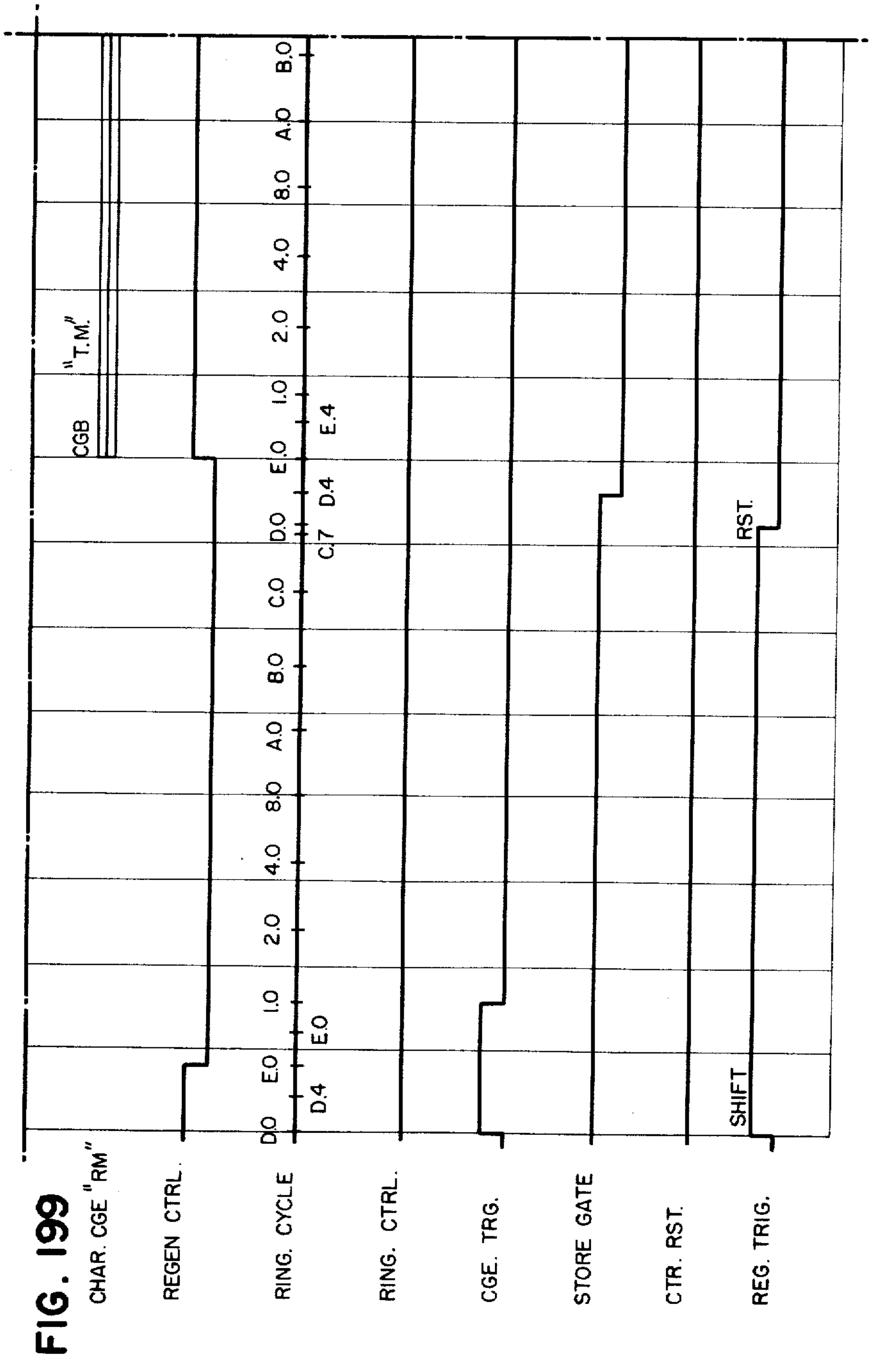
Figure 199A:
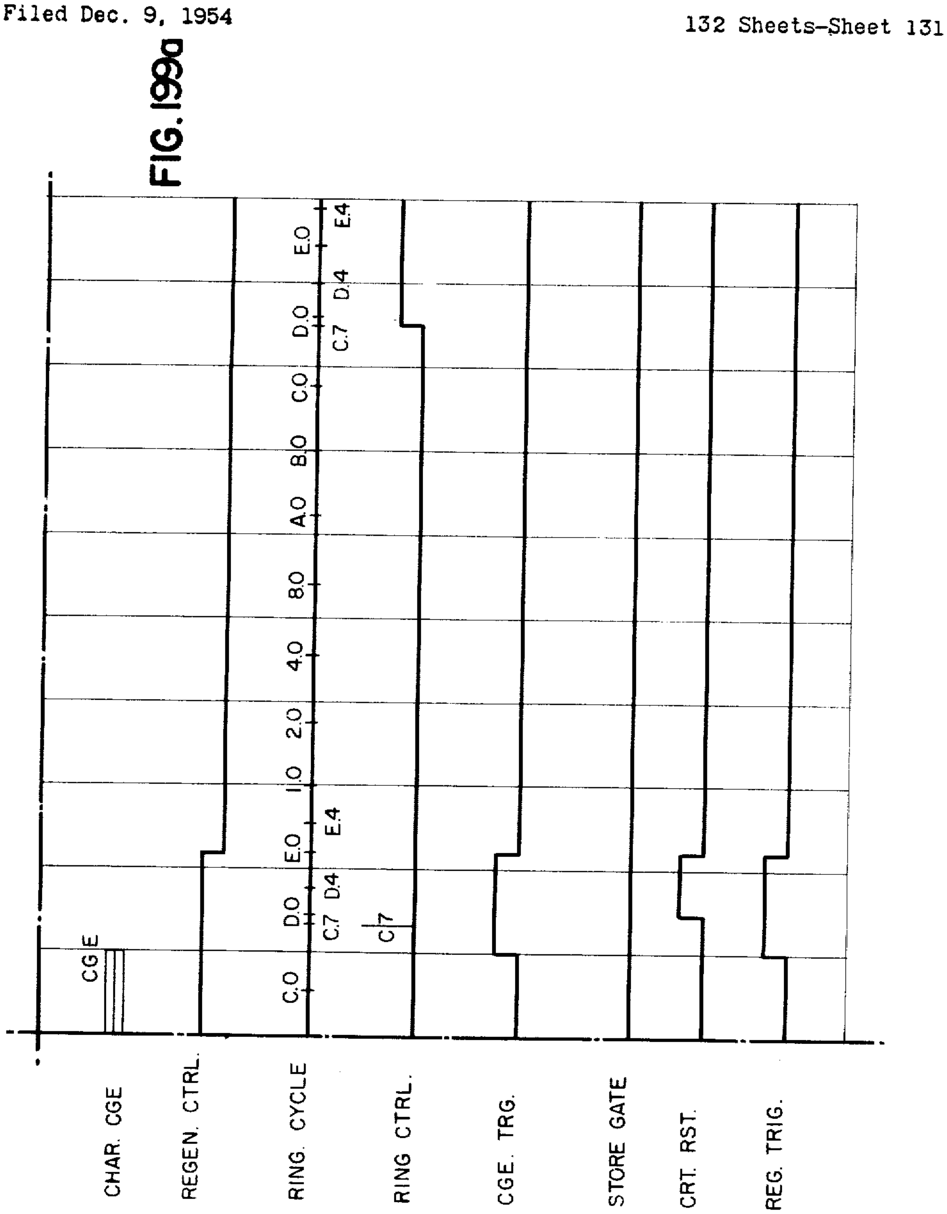

Fig. 10*a* is a diagrammatic representation of the raster patterns on a pair of cathode ray tubes used in the electrostatic storage system herein;

Figs. 11 through 15 illustrate exemplary control panel wiring arrangements to effectively control typical machine functions;

Fig. 16 is an overall timing diagram;

Fig. 17 is a timing diagram, on an expanded scale, showing details of comparison and selector timing;

Fig. 18 is a front elevational view of one of the tape feeding mechanisms referred to throughout the specification as tape drives T1, T2, T3 and T4;

Fig. 19 is a side elevational view of a tape feeding mechanism with the upper portion of the outer casing broken away to show underlying mechanism;

Fig. 20 is a view on line 20—20 of Fig. 19 illustrating the tape driving mechanism and certain adjuncts thereof;

Fig. 21 is a plan view of the tape reel driving mechanism comprising electromagnetic clutches and brakes;

Fig. 22 is a view on line 22—22 of Fig. 21 showing parts in cross section and other parts in full line;

Fig. 23 is a side elevational view of a vacuum column, of which a pair is provided in each tape drive and which provides for tape loop control;

Fig. 24 is a front elevational view of the vacuum column of Fig. 23;

Fig. 25 is a plan view of a vacuum operated switch used in connection with the vacuum columns of Figs. 23 and 24;

Fig. 26 is a cross-sectional view on line 26—26 of Fig. 25;

Fig. 27 illustrates the tape driving mechanism and the means for biasing the mechanism into tape driving position, the view showing the parts biased into position for driving the tape in a forward direction;

Fig. 28 is a diagrammatic view of the mechanism shown in Fig. 27 with the parts thereof biased into position to stop tape movement following feeding of tape in a forward direction;

Fig. 29 is a diagrammatic view such as that in Fig. 28, and shows the mechanism biased into position to effect reverse feeding of the tape;

Fig. 30 is a diagrammatic view such as those in Figs. 28 and 29 with the parts, however, biased into position to halt tape feeding following reverse feed of the tape;

Fig. 31 is a front elevational view of certain tape coil sensing mechanism;

Fig. 32 is a cross-sectional view of the tape coil sensing mechanism of Fig. 31, however, on line 32—32 of Fig. 33;

Fig. 33 is a view taken on line 33—33 of Fig. 32;

Fig. 34 is an elevational view taken from the back of the device illustrating mechanism for causing relative separation between a tape reading head and its cover;

Fig. 35 is a cross-sectional view on line 35—35 of Fig. 34;

Fig. 36 is a cross-sectional view on line 36—36 of Fig. 34;

Fig. 37 is a diagram of the tape drive electrical control system showing the various drive motors and control relays;

Fig. 38 is a diagram of the vacuum switch control system for regulating the movement of the tape reels;

Fig. 39 illustrates a typical electronic trigger circuit of the kind used herein;

Fig. 40 illustrates both the block symbol and the detailed wiring diagram of a slow speed electronic trigger with two full plate outputs;

Fig. 41 illustrates both the block symbol and the detailed wiring diagram of an electronic trigger substantially similar to the trigger of Fig. 40, with the exception that its outputs are internally compensated to provide slightly higher operating speed;

Fig. 42 illustrates both the block symbol and the detailed wiring diagram of an electronic trigger substantially like that shown in Fig. 41 with the exception that one of its outputs is tapped instead of being a full plate output;

Fig. 43 illustrates both the block symbol and the detailed wiring diagram of an electronic trigger generally like the trigger shown in Fig. 40 with the exception that the outputs furnished include a full and a tapped output from one plate only;

Fig. 44 illustrates both the block symbol and the detailed wiring diagram of an electronic trigger having a full plate output and also a tapped plate output, this trigger being designed for operation in connection with relays and the like;

Fig. 45 illustrates both the block symbol and the detailed wiring diagram of an electronic trigger substantially the same as that of Fig. 44 except that a full output is provided from each plate thereof;

Fig. 46 illustrates both the block symbol and the detailed wiring diagram of a medium speed electronic trigger adapted for operation by plate pull-over;

Fig. 47 illustrates both the block symbol and the detailed wiring diagram of an electronic trigger having an input to one grid only;

Fig. 48 illustrates both the block symbol and the detailed wiring diagram of a high speed electronic trigger with two full plate outputs, one from each plate;

Fig. 49 illustrates both the block symbol and the detailed wiring diagram of a medium speed electronic trigger used on the character ring herein;

Fig. 50 illustrates both the block symbol and the detailed wiring diagram of a very high speed trigger having fast recovery characteristics, which finds its principal use in the column counter herein;

Fig. 51 illustrates both the block symbol and the detailed wiring diagram of a high speed trigger that may either be pulled over by a pulse to its plate or may be triggered by an impulse to either grid;

Fig. 52 illustrates both the block symbol and the detailed wiring diagram of a high speed electronic trigger having one full plate output and one tapped plate output;

Fig. 53 illustrates both the block symbol and the detailed wiring diagram of a high speed electronic trigger having a binary input;

Fig. 54 illustrates both the block symbol and the detailed wiring diagram of an electronic trigger employed in the execution timer circuits;

Figs. 55, 56 and 57 illustrate both the block symools and the detailed wiring diagrams of electronic triggers adapted for operation from manual key contacts, cam contacts or relay contacts;

Fig. 58 is a detailed wiring diagram of a single shot multivibrator illustrative of the circuit employed in such multivibrators throughout the system;

Figs. 59 through 62 illustrate both the block symbols and the detailed wiring diagrams of the several single shot multivibrators employed throughout the system;

Fig. 63 illustrates the detailed wiring diagram of an electronic switch which is representative of the electronic switch units used throughout the system;

Fig. 64 illustrates both the block symbol and the detailed wiring diagram of an electronic switch having two control elements;

Fig. 65 illustrates both the block symbol and the detailed wiring diagram of an electronic switch which is identical to the switch of Fig. 64 except that the output of the former is a full plate output;

Fig. 66 illustrates both the block symbol and the detailed wiring diagram of a two control element switch with one high level input grid and one low level input grid;

Fig. 67 illustrates both the block symbol and the detailed wiring diagram of a two control element electronic switch, both input grids being adapted to low level pulses;

Fig. 68 illustrates both the block symbol and the detailed wiring diagram of an electronic switch having a pair of control grids, the input to one of which is a high level input and the other of which is condenser-coupled;

Fig. 69 illustrates both the block symbol and the detailed wiring diagram of an electronic switch which is identical to that of Fig. 68 except that the former has a full plate output;

Fig. 70 illustrates both the block symbol and the detailed wiring diagram of an electronic switch which is identical to that of Fig. 67 except that the former has a full plate output and the parasitic condenser associated with the first control grid has been increased in size;

Fig. 71 illustrates both the block symbol and the detailed wiring diagram of an electronic switch provided with three input control grids and a full plate output;

Fig. 72 illustrates both the block symbol and the detailed wiring diagram of an electronic switch which has a dual control grid with a full plate output and with low level inputs;

Fig. 73 illustrates both the block symbol and the detailed wiring diagram of an electronic switch having relatively low inputs and relatively high outputs;

Fig. 74 is the detailed wiring diagram of a cathode follower circuit representative of the cathode follower circuits used throughout the system;

Fig. 75 illustrates both the block symbol and the detailed wiring diagram of a cathode follower adapted to convert a +70 volt to +130 volt input to a +20 volt to +60 volt output;

Fig. 76 illustrates both the block symbol and the detailed wiring diagram of a cathode follower adapted to receive inputs of +70 volts to +130 volts and to produce an output voltage of +20 volts to +60 volts;

Fig. 77 illustrates both the block symbol and the detailed wiring diagram of a cathode follower similar to that shown in Fig. 76 with the exception that the cathode resistors are omitted;

Fig. 78 illustrates both the block symbol and the detailed wiring diagram of a cathode follower used in the read/write circuits;

Fig. 79 illustrates both the block symbol and the detailed wiring diagram of a cathode follower which has two inputs and two outputs;

Fig. 80 illustrates both the block symbol and the detailed wiring diagram of a cathode follower which will convert a +50 volt input pulse at any potential to an output signal of +10 to −30 volts;

Fig. 81 illustrates both the block symbol and the detailed wiring diagram of a cathode follower used to shape and power the interrogate signals sent from the machine frame to the memory units;

Fig. 82 illustrates both the block symbol and the detailed wiring diagram of a cathode follower similar to that shown in Fig. 81 except that it operates at higher speeds;

Fig. 83 illustrates both the block symbol and the detailed wiring diagram of a cathode follower which is of medium power capable of accepting high voltages and converting them to +10 to −30 volt levels;

Fig. 84 illustrates both the block symbol and the detailed wiring diagram of a cathode follower which is capable of powering low level lines so that they may drive a large number of circuits;

Fig. 85 illustrates both the block symbol and the detailed wiring diagram of a cathode follower having high level input and low level output used generally where high power is required to drive a plurality of lines;

Fig. 86 illustrates the detailed wiring diagram of an inverter which is typical of the inverters used throughout the system;

Fig. 87 illustrates both the block symbol and the detailed wiring diagram of an inverter having high level input and two tapped plate outputs;

Fig. 88 illustrates both the block symbol and the detailed wiring diagram of an inverter which is identical to that of Fig. 87 with the exception that it has two full plate outputs;

Fig. 89 illustrates both the block symbol and the detailed wiring diagram of an inverter comprising a dual triode whose inputs are condenser-coupled and in which there is provided one tapped output and one plate pull-over type output;

Fig. 90 illustrates both the block symbol and the detailed wiring diagram of an inverter comprising a dual triode having two low level inputs and two full plate outputs;

Fig. 91 illustrates both the block symbol and the detailed wiring diagram of an inverter capable of receiving a negative signal and producing positive signals from the two full plate outputs;

Fig. 92 illustrates both the block symbol and the detailed wiring diagram of a dual triode inverter with condenser-coupled inputs and two plate pull-over type outputs;

Fig. 93 illustrates both the block symbol and the detailed wiring diagram of an inverter which is a semi-power unit with one high level input and two full plate outputs;

Fig. 94 illustrates both the block symbol and the detailed wiring diagram of an inverter with both inputs coupled and with plate pull-over type outputs;

Fig. 95 illustrates both the block symbol and the detailed wiring diagram of an inverter which is in effect one-half of the inverter of Fig. 92 and one-half of the inverter of Fig. 88;

Fig. 96 illustrates both the block symbol and the detailed wiring diagram of an inverter having a high level input and having full plate outputs;

Fig. 97 illustrates both the block symbol and the detailed wiring diagram of an inverter of medium power with two low level inputs and a pair of full plate outputs;

Fig. 98 illustrates both the block symbol and the detailed wiring diagram of an inverter which can receive a high level input signal and which has two pull-over type outputs;

Fig. 99 illustrates both the block symbol and the detailed wiring diagram of an inverter which has a condenser-coupled input, a low level input and a full plate output;

Fig. 100 illustrates both the block symbol and the detailed wiring diagram of an inverter wherein both inputs are condenser-coupled and wherein there are provided two full plate outputs;

Fig. 101 illustrates both the block symbol and the detailed wiring diagram of an inverter having two low level inputs and two tapped plate outputs;

Fig. 102 illustrates both the block symbol and the detailed wiring diagram of an inverter having a high level input and a high level output;

Fig. 103 illustrates both the block symbol and the detailed wiring diagram of an inverter which has a condenser-coupled input with a full plate output;

Fig. 104 illustrates both the block symbol and the detailed wiring diagram of an inverter capable of accepting a high level input and providing an 85–150 volt output;

Fig. 105 illustrates both the block symbol and the detailed wiring diagram of an inverter wherein each half is adapted to drive a relay coil;

Fig. 106 illustrates both the block symbol and the detailed wiring diagram of an inverter capable of providing a high output necessary in the moving clutch coil drive circuit;

Fig. 107 illustrates both the block symbol and the detailed wiring diagram of an inverter used in the moving coil circuit;

Fig. 108 illustrates both the block symbol and the detailed wiring diagram of a tape delay driving inverter adapted to control the tape delay single shot multivibrator;

Fig. 109 illustrates both the block symbol and the detailed wiring diagram of an inverter provided for the acceptance of low input in the range of +50 to +25 volts;

Figs. 110 to 111 are special inverters designed to accept two low level positive inputs;

Figs. 111*a*, 111*b* and 111*c* are three triode circuits used to illustrate the manner in which one triode is controlled by another in certain of the circuits herein;

Fig. 112 illustrates both the block symbol and the detailed wiring diagram of a power unit;

Fig. 113 illustrates both the block symbol and the detailed wiring diagram of a diode tube coincidence circuit having four inputs and a single output;

Fig. 114 illustrates both the block symbol and the detailed wiring diagram of a diode tube Or circuit;

Fig. 115 illustrates both the block symbol and the detailed wiring diagram of a diode tube Or circuit having four inputs and a single output;

Fig. 116 illustrates both the block symbols and the detailed wiring diagrams of a pair of crystal diode And circuits, the one on the left being a positive And circuit and the one on the right being a negative And circuit;

Fig. 117 illustrates both the block symbols and the detailed wiring diagrams of a pair of crystal diode coincidence circuits, the circuit on the left being a positive Or circuit and that on the right being a negative Or circuit;

Fig. 118 illustrates both the block symbol and the detailed wiring diagram of a cathode follower —And circuit;

Fig. 119 illustrates both the block symbol and the detailed wiring diagram of a dual triode with low level inputs and having outputs capable of picking up relays;

Figs. 120 through 126 illustrate both the block diagram symbols and the detailed wiring of deflection increment units which are substantially alike in construction except for the size of their respective cathode resistors, the units D1, D2, D3, D4, D5, D6, D8 producing 1, 2, 3, 4, 5, 6 and 8 increments of deflection, respectively;

Fig. 127 illustrates both the block diagram symbol and the detailed wiring of the vertical bit sweep unit in the deflection control circuits;

Fig. 128 illustrates both the block diagram symbol and the detailed wiring of the vertical and horizontal deflection cathode follower output circuit;

Fig. 129 illustrates both the block diagram symbol and the detailed wiring of a deflection stabilizer unit;

Fig. 130 is a schematic wiring diagram of the relay circuits;

Figs. 131, 132, 133 and 133*a*, when arranged as shown in Fig. 200, constitute the block diagram of the start control circuits;

Figs. 134, 135, 136 and 137, when arranged as shown in Fig. 201, constitute the diagram, principally in block form, of the tape drive start circuits;

Figs. 138 and 139, when arranged as shown in Fig. 202, constitute, principally in block form, the stop and feed circuits;

Figs. 140, 142 and 143, when arranged as shown in Fig. 203, constitute, principally in block form, the tape mark control circuits;

Fig. 141 illustrates, principally in block form, the end of reel indication circuits;

Fig. 144 illustrates, principally in block form, the stop —Or circuits;

Figs. 145, 146, 147, 148 and 149, when arranged as shown in Fig. 204 illustrate, principally in block form, the tape motion control circuits;

Figs. 150, 151 and 152 when arranged as shown in Fig. 205, illustrate in block form the tape read/write circuits;

Fig. 151*a* is a block (with cover removed) containing a photocell and a light used to detect a reflective spot on tape;

Fig. 151*b* is a schematic drawing of the amplifier circuit for the photocell unit of Fig. 151*a*;

Fig. 152*a* is a schematic illustration of a switch arrangement disposed in the cable between the several tape drive units;

Figs. 153, 154, 155 and 156, when arranged as indicated in Fig. 206, constitute the block diagram of the bit ring and character ring circuits;

Figs. 157, 158 and 159, when arranged as shown in Fig. 207, comprise the block diagram of the store/scan control circuits;

Figs. 160, 161 and 162, when arranged as indicated in Fig. 208, comprise the block diagram of the column counter and electrostatic memory deflection circuits;

Fig. 163 is a schematic diagram of four interconnected electronic triggers comprising one of two such counters used in the column counter circuit of Figs. 160 and 161;

Fig. 164 is the schematically illustrated circuit of one of two column counter matrices used in connection with the column counter of Figs. 160 and 161;

Fig. 165 is the schematic illustration of one channel of the read/write circuits of Figs. 150–152;

Figs. 166, 167, 168 and 169, when arranged as suggested in Fig. 209, comprise the block diagram of the tape input register;

Figs. 170 and 171, when arranged as shown in Fig. 210, comprise in block diagram form the memory switching and redundancy check circuits;

Figs. 172 and 173, when arranged as shown in Fig. 211, comprise the schematic illustration of the dot-dash control circuits from which the cathode ray tubes of the electrostatic memory are fed;

Fig. 174 is the schematic diagram of the video amplifier and clipper circuits employed in the cathode ray tube read-out arrangement;

Figs. 175, 176, 177 and 178, when arranged as shown in Fig. 212, illustrate in block form the output register adapted to receive data from electrostatic storage and transmit the same to tape writing output buses;

Fig. 179 is a schematic illustration of a pair of cathode ray tubes and their high voltage inputs, constituting one of two memory sections herein;

Fig. 180 is a block diagram illustration of a digit selector;

Fig. 181 is the block diagram of one of four selector circuits herein;

Fig. 182 is the block diagram illustration of a cycle delay circuit;

Fig. 183 is the block diagram illustration of an odd-even input counter circuit;

Figs. 184, 185, 186 and 187, when arranged as suggested in Fig. 213, comprise the block diagram of the input/remainder, output/remainder and input/output comparison control circuits;

Figs. 188, 189 and 190, when arranged as shown in Fig. 214, illustrate principally in block form the input/remainder comparing circuits. But for the relay gate shown in Fig. 190, the circuits of Figs. 188 and 189 are reproduced in the system as output/remainder comparators and as input/output comparators;

Fig. 189*a* is the block diagram illustration of an input, remainder and output inversion circuit;

Fig. 191 is a timing chart of the tape drive controls;

Fig. 192 is a timing chart of the machine start and run controls;

Fig. 193 is a timing chart showing, on an enlarged scale, certain functions indicated in the timing chart of Fig. 192. When the timing charts of Figs. 192 and 193 are arranged in juxtaposition as suggested in Fig. 215, the relationship of the two will appear clear;

Figs. 194 and 195 when placed end to end constitute a timing chart of the column counter, character ring and bit ring timing;

Fig. 196 is a timing chart, taken on an enlarged scale, of certain cycles of the timing chart of Fig. 194. When Figs. 194, 195 and 196 are arranged as shown in Fig. 216, the relationship of the two will become evident;

Figs. 197 and 197*a* are charts showing the timing of character storage under normal conditions;

Figs. 198 and 198*a* are the character storing timing charts showing the worst possible conditions of data flow from tape to storage;

Figs. 199 and 199*a* are timing charts of the tape mark cycle;

Fig. 200 is a diagram indicating the arrangement of Figs. 131, 132, 133 and 133*a*, comprising the start control circuits;

Fig. 201 is a diagram indicating the arrangement of Figs. 134, 135, 136 and 137, comprising the tape drive start circuits:

Fig. 202 indicates the arrangement of Figs. 138 and 139 comprising the tape stop and fed circuits;

Fig. 203 indicates the arrangement of Figs. 140, 142 and 143, comprising the tape mark control circuits;

Fig. 204 indicates the arrangement of Figs. 145, 146, 147, 148 and 149, comprising the tape control circuits;

Fig. 205 indicates the arrangement of Figs. 150, 151 and 152 comprising the tape read/write circuits;

Fig. 206 indicates the arrangement of Figs. 153, 154, 155 and 156 comprising the bit ring and character ring circuits;

Fig. 207 indicates the arrangement of Figs. 157, 158 and 159 comprising the store-scan control circuits;

Fig. 208 indicates the arrangement of Figs. 160, 161 and 162 comprising the column counter and memory deflection circuits;

Fig. 209 indicates the arrangement of Figs. 166, 167, 168 and 169 comprising the tape input register circuits;

Fig. 210 indicates the arrangement of Figs. 170 and 171 comprising the memory switch and redundancy check circuits;

Fig. 211 indicates the arrangement of Figs. 172 and 173 comprising the dot-dash control circuits;

Fig. 212 indicates the arrangement of Figs. 175, 176, 177 and 178 comprising the output register circuits;

Fig. 213 indicates the arrangement of Figs. 184, 185, 186 and 187 comprising the input/remainder, output/remainder and input/output comparison control circuits;

Fig. 214 indicates the arrangement of Figs. 188, 189 and 190 comprising the input/remainder comparator circuits;

Fig. 215 indicates the arrangement of Figs. 192 and 193 showing the machine start and run control circuit timing, together with an enlargement of certain points thereof;

Fig. 216 indicates the arrangement of Figs. 194, 195 and 196 comprising the column counter, character ring, and bit ring timing charts with portions thereof on an enlarged scale; and Fig. 217 indicates the arrangement of Figs. 197, 197*a*, 198, 198*a*, 199 and 199*a* comprising timing charts to form an integrated chart of the indicated functions.

The following specification will deal with the several features of the system in the following order:

| | Column |
|---|---|
| Brief functional description of sorter-collator | 11 |
| Control panel functions | 28 |
| Comparison controls | 28 |
| Tape drives | 30 |
| Selectors | 30 |
| Full reel | 31 |
| Digit selector | 31 |
| Field programming | 32 |
| Field interchanger | 33 |
| Odd-even circuits | 33 |
| Spacing | 34 |
| Tape drive mechanism and circuits | 35 |
| Pluggable unit component circuits | 49 |
| Electronic triggers | 49 |
| Single shot multivibrator | 51 |
| Electronic switches | 52 |
| Cathode followers | 53 |
| Inverters | 54 |
| Power units | 57 |
| Coincidence circuits | 58 |
| Detail circuit description | 61 |
| Machine cycle | 61 |
| Reproducing tape record | 74 |
| End of output tape control | 75 |
| End of input tape control | 77 |
| Last record run-out | 78 |
| Synthetic tape mark | 79 |
| Final tape mark indication | 79 |
| Full reel T3 and T4 | 84 |
| Output memory selection (field interchange) | 84 |
| Tape selection check | 86 |
| Tape drive selection and reversal | 88 |
| Load point control | 89 |
| Output tape control circuits | 90 |
| Writing delay and "go" | 92 |
| Input tape control circuits | 95 |
| Electrostatic storage | 98 |
| Bit ring, character ring and column counter | 99 |
| Deflection circuits | 105 |
| Column counter | 107 |
| Bit sweep circuits | 112 |
| Read/write circuits | 113 |
| Input registers | 118 |
| Special character recognition | 119 |
| Character storage | 121 |
| Input register and character storage controls | 122 |
| Write-out | 127 |
| Character recognition in output register | 130 |
| Output checking | 132 |
| Manual character insertion and error correction | 133 |
| Dot-dash circuits | 134 |
| Output record grouping | 137 |
| Record mark check | 137 |
| Digit selection | 138 |
| Selectors | 141 |
| Cycle delay | 142 |
| Odd-even hubs | 142 |
| Comparison sequence and control | 144 |

BRIEF FUNCTIONAL DESCRIPTION OF SORTER-COLLATOR

Figure 1:
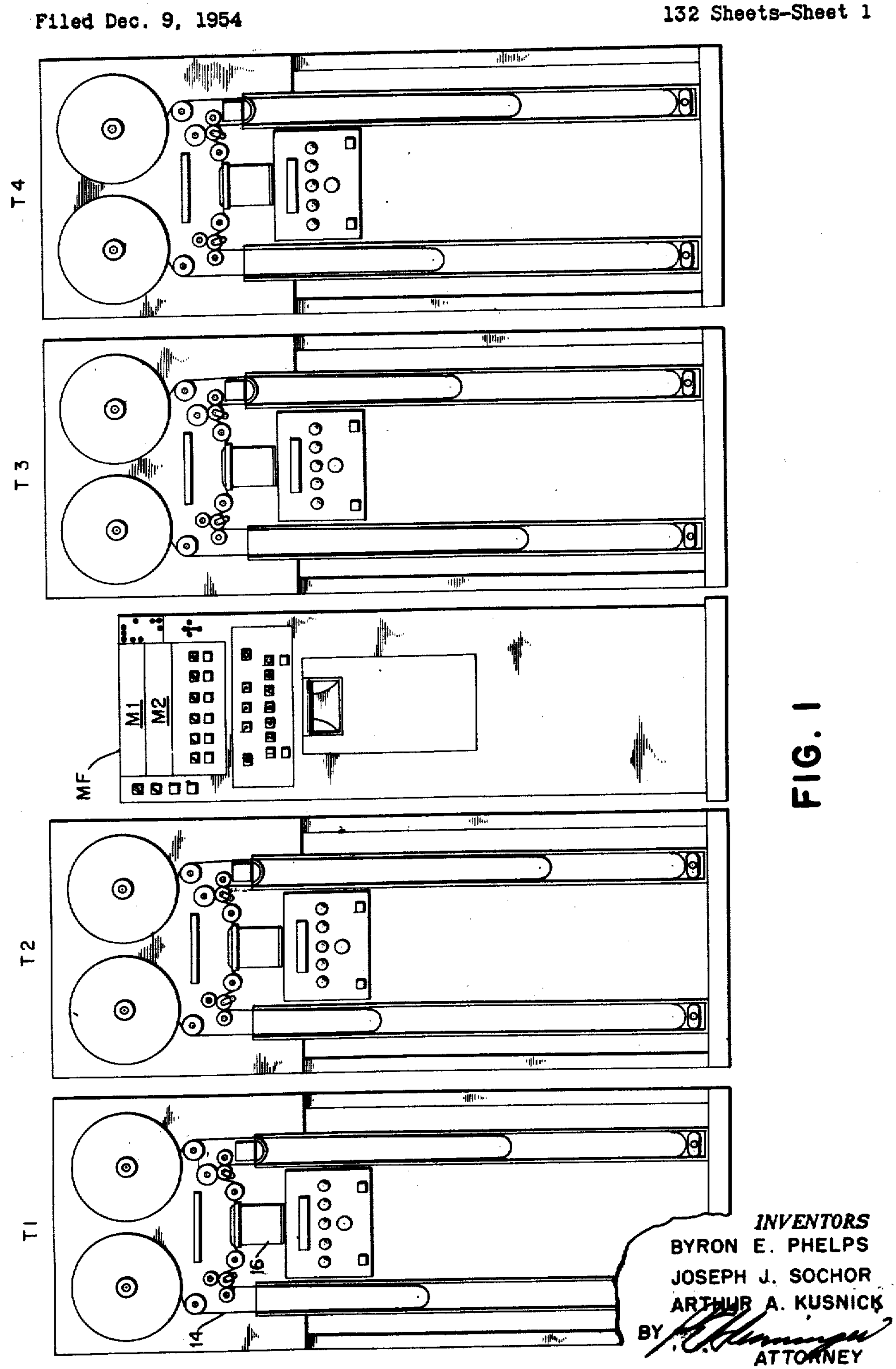
Figure 1B:
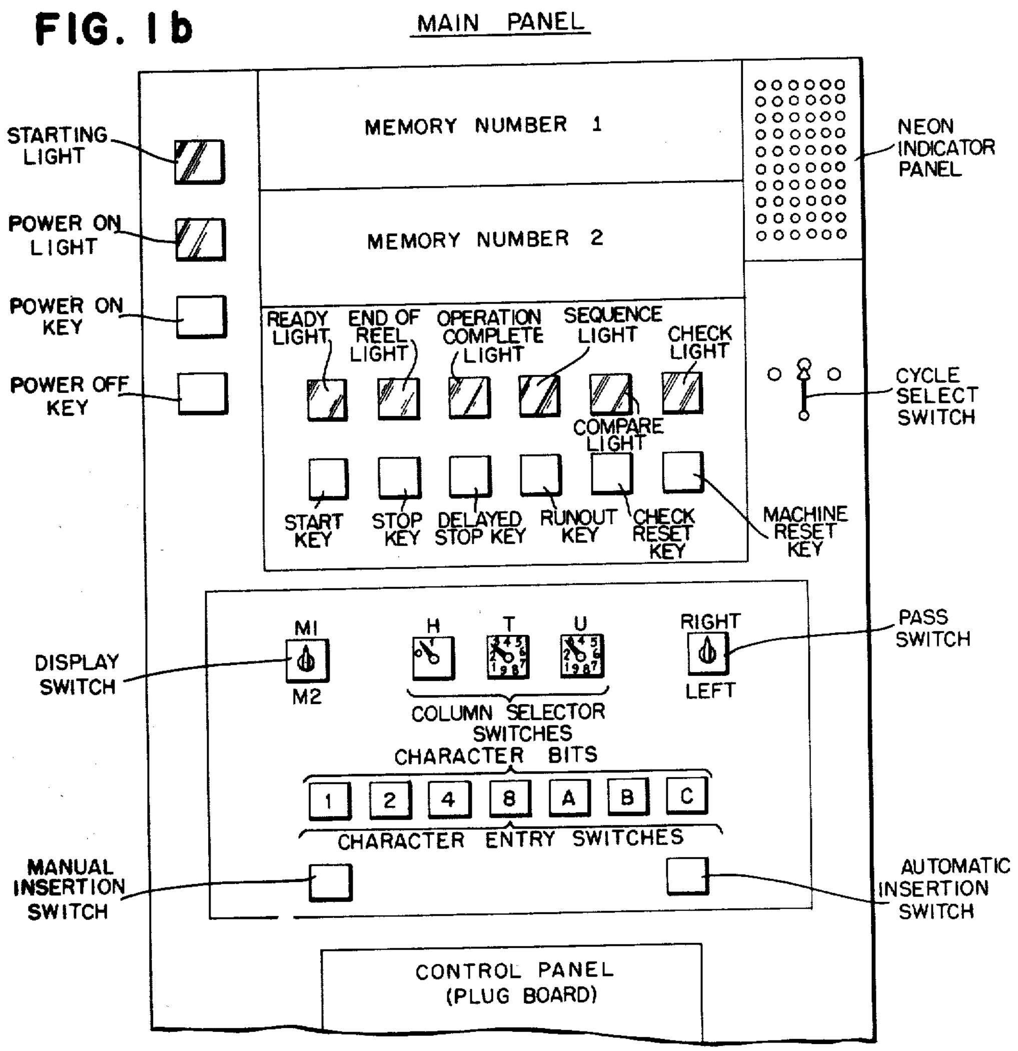
Figure 1A:
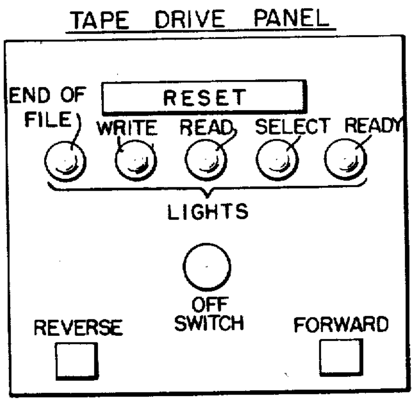
Figure 2:
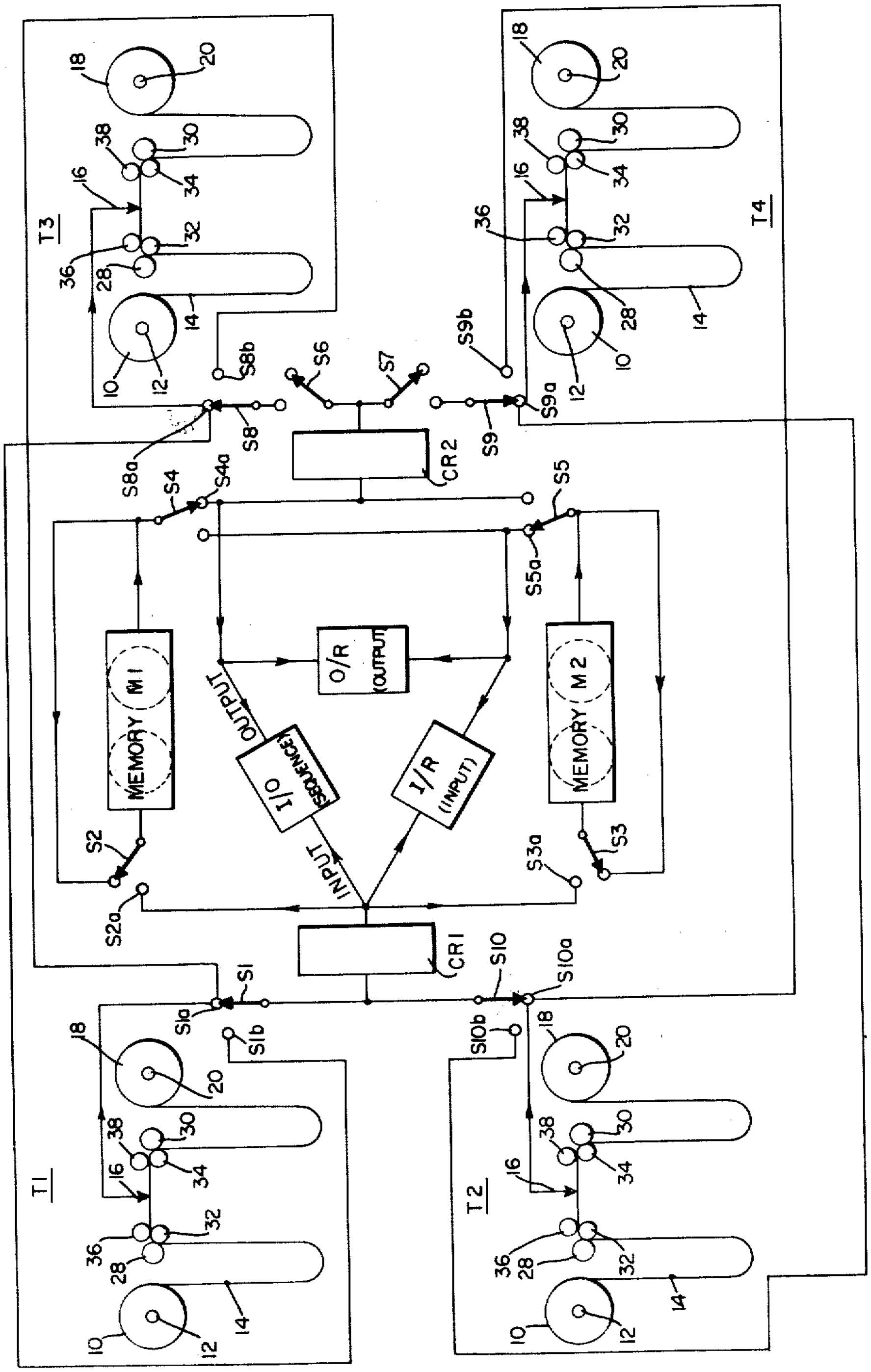

A general understanding of the various functions of the sorter-collator may be obtained by reference to Figs. 1 and 2 in conjunction with the description which is to follow.

Fig. 1 is a general view of the system illustrating the manner in which a plurality of tape drives may be arranged with a main sorter-collator frame to comprise the sorter-collator system which is to be described herein in detail at a point following this brief functional description.

In Fig. 1 the main frame MF is shown to include a memory M1 and a secondary memory M2, each consisting of a pair of cathode ray tubes utilized for the storage of data being processed in the system. The main frame also includes a pair of character registers, an input/output comparator, an input/remainder comparator, an output/remainder comparator and the necessary interconnecting circuits to render these several devices operative. Also shown in Fig. 1 are four magnetic tape drives T1, T2, T3 and T4. For the purpose of this description the tape drives T1–T4 may be considered as structural duplicates. Each of the tape drives is adapted to drive a magnetic tape 14 through a read/write head 16. The specific nature of the tape drives will also become apparent in a part of this description following the functional description of the sorter-collator.

Fig. 2 of the drawings is a symbolic diagram showing the major components of the system and their interconnections. This figure also indicates the flow of data through the system. In Fig. 2 the elements marked T1, T2, T3 and T4 are the tape drives referred to in connection with Fig. 1. T1 and T2 are generally the input tape drives, and the drives T3 and T4 are generally the output tape drives. The one exception to this functional characterization is that which occurs during a sorting operation when T1 and T2, on the one hand, and T3 and T4, on the other hand, alternately serve as input and output tape drives.

In Fig. 2 the tape drives have been embellished with sufficient detail to render clear the broad function thereof. The four tape drives are identical and like reference numerals have been used to indicate like parts throughout. In this figure of the drawings a tape reel 10, which may comprise a file reel having thereon a tape 14 on which data has been magnetically recorder, is mounted on a file reel spindle 12. The tape from the reel 10 is adapted for passage through a magnetic read/write head 16 from which it eventually passes to a machine reel 18 mounted on a spindle 20. The spindles 12 and 20 are independently driven to provide a pair of tape loops such as indicated in Fig. 2 upon which the mechanism which drives the tape through the read/write head 16 may call when it is commanded to move the tape during a reading or writing operation.

In Fig. 2 it will be noted that the tape 14 is supported at opposite sides of the read/write head 16 by a pair of tape moving idler pulleys 32 and 34. These pulleys are respectively located adjacent a pair of drive capstans 28 and 30. The drive capstan 30 is rotated in a direction to move the tape forward; that is to say, the capstan 30 is rotated in a counterclockwise direction while the capstan 28 is rotated in a clockwise direction. Each of the tape moving idler pulleys 32 and 34 is also associated with stop capstans 36 and 38, respectively. Since the capstan 36 is adapted to stop forward movement of tape, it may be characterized as the forward stop capstan. By the same token, since the stop capstan 38 is adapted to stop movement of tape when moving backward, it may be characterized as the backward stop capstan.

From the foregoing brief description it can be seen that if the tape moving idler pulleys 32 and 34 are manipulated synchronously so as to move the one into contact with its related drive capstan while the other is being moved out of contact with its related stop capstan, a driving force will be applied to the tape 14 so that it is driven through the read/write head 16 in either of two selected directions.

The magnetic tape employed in the system may be a one-half inch wide oxide coated non-metallic tape on which data is recorded at a density of 100 bits per inch. Information is recorded on the tape in six channels that run parallel to the length of the tape. The data is recorded in the form of a modified binary code which will be described directly. A bit of information is represented by a magnetized spot in a channel which is produced in accordance with a magnetic recording system referred to as NRZI (non-return to zero—IBM). A set of six bits recorded in a line perpendicular to the six channels is sufficient to represent numeric and alphabetic characters and such special signs as may be required.

A seventh channel on the tape serves to check the reading and writing in the other six channels by the so-called redundancy check principle; that is, either a –0– or –1– is recorded in the seventh channel so that across the seven channels there is an odd number of –1– bits in each set of seven bits. When the tape is read, the number of –1– bits is automatically checked. If the number is even, the system stops and a check light on the operator's panel is turned on. If the number of –1– bits is odd (as it should be when correct), the machine continues the reading and/or writing process.

Figure 3:
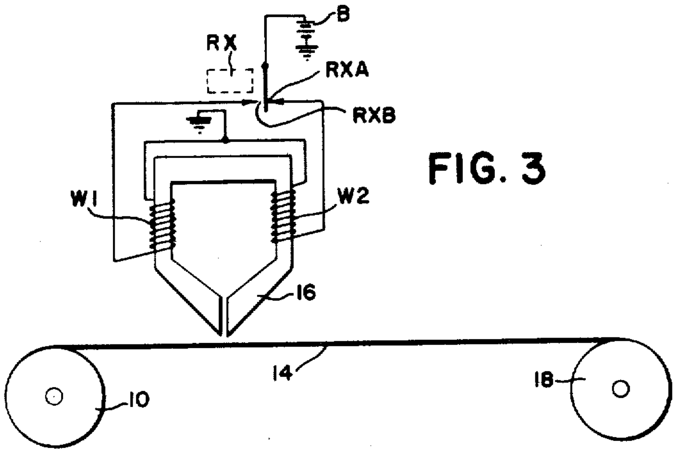
Fig. 3 is a diagrammatic illustration of a magnetic tape recording head, a record tape in relation thereto, and the coil circuits required for recording on tape with magnetic flux of opposite polarities.

As mentioned hereinbefore, the recording is according to the NRZI system. Fig. 3 illustrates the read/write head 16. In this figure the magnetic head is shown as being provided with a pair of windings W1 and W2. The head 16 may be of any conventional type, having an air gap in close proximity to the tape 14. The tape is moved past the read/write head from the file reel 10 to the machine reel 18. The windings W1 and W2 are arranged to be connected in common to ground, the other connection of the winding W1 being from point RXB, while the second connection to the winding W2 is from point RXA. The points RXA and RXB of a relay RX, in combination with the battery B, are used to simulate, for the purpose of explanation only, the action of the electronic circuits controlling the read/write heads. These circuits will, of course, be described in detail at a later point.

When the writing current flows through the winding W1, a magnetic flux of one direction flows across the air gap of the head 16, but when the writing current flows through the coil W2, a magnetic flux is generated across the air gap of the head 16 in the opposite direction. Current flows through the coil W1 to generate flux in one direction when the relay RX closes the point RXB, a circuit then being established from the battery B through the point RXB and the coil W1 to ground. Flux is generated in the opposite direction when the relay RX closes the point RXA, as shown, a circuit then being established from the battery B through the point RXA and the coil W2 to ground.

While only one head 16 is shown in Fig. 3, it is understood that there are six other identical heads adjacent each other in a line extending perpendicular to the line of tape movement. These seven heads act independently of one another, and it is the combination of the information recorded upon the tape by these seven heads which, according to the code used, represents certain characters.

The code herein employed is a binary code modified by excess 3's. The code is represented in Fig. 4 of the drawings. By reference to Fig. 4 of the drawings, it will be seen that the seven bits of the code employed are identified as –1–, –2–, –4–, –8–, –A–, –B– and –C–. The position –1–, –2–, –4– and –8– correspond to the normal binary positions, but for the purpose of machine operation only, these positions are interpreted as though a 3 had been added to each thereof. In other words, whereas in the binary code the first position represents –1–, the second position represents –2–, the third position represents –4–, and the fourth position represents –8–, in the binary code modified by excess 3's a –1– is recorded in the fourth track, a –2– is represented by bits in the 1 and 4 tracks, a –3– is represented by a bit in the 2 and 4 tracks, and so on. In other words, if the recording in the excess 3 code were interpreted according to the standard binary code, the sum represented would appear as greater by 3 than the absolute representation.

The positions designated as –A– and –B– are the additional code bits required for the representation of alphabetic and sign information. The position –C– is the check bit position wherein a –1– bit is recorded in each instance wherein the sum of –1– bits recorded in the positions –1–, –2–, –4–, –8–, –A– and –B– is even in number.

By perusing the code represented in Fig. 4, it will be seen that provision has been made for a record mark which is indicated on the tape by a –1– bit recorded in track –B– and that provision has also been made for a tape mark which is indicated by a –1– bit recorded in the –A– track, both of these records having –0– bits recorded in all other positions. The tape mark is recorded at the beginning and at the end of a useful file of information on tape. The record mark is used to separate individual records which may be of any desired length within the capacity of the system. At the bottom of Fig. 4 is a notation of the sorting sequence of special characters, alphabetic characters and numeric characters.

Figure 5:
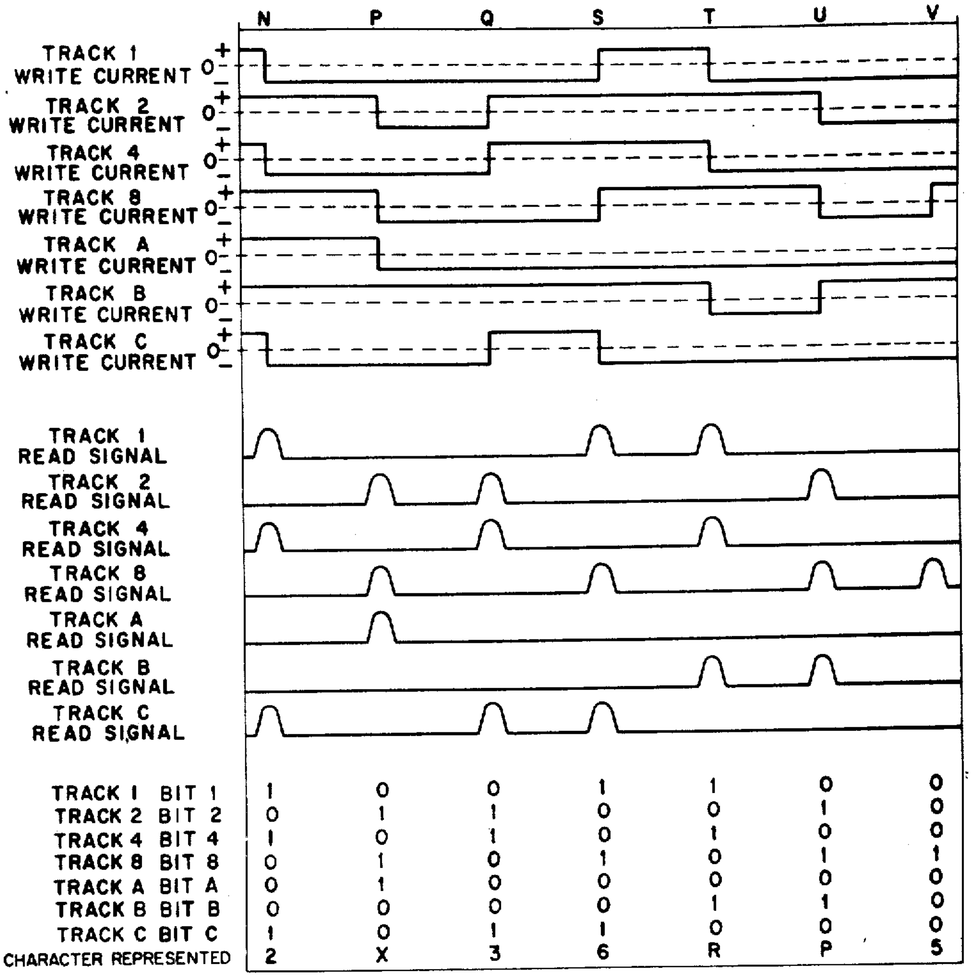
Fig. 5 is a diagrammatic indication of the nature of a magnetic record on tape.

It has been stated hereinbefore that a record is written on tape by a recording system which has become known as non-return to zero. This system may be understood by reference to Fig. 5 of the drawings. In Fig. 5, and with particular reference to the upper curves thereof which are identified as "write current" in respect to the tape tracks 1 through 4 and A through C, there is represented the writing pattern upon one section of the tape. The recording on tape is done at the intervals N, P, Q, S, T, U, V. Let it be assumed that current flowing through a coil for the head at track 1 is in a direction causing a positive flux in the tape. At the interval N it is desired to record a binary –1– in track 1 of the tape. Circuits, to be described below, cause a change to be produced in the direction of the flux so that the flux in the head at track 1 of the tape is now in a negative direction. After the reversal of magnetic flux occurs, the tape continues to be magnetized in the new direction, i.e. in this particular instance in the negative direction, through the intervals P and Q, for example, until another point arrives at which a binary –1– is to be recorded. The fact that there is no flux change in track 1 at intervals P and Q will be interpreted by the system as indicating the presence of binary –0– bits in these positions. At the intervals S and T there are further reversals of flux in track 1 indicating binary –1's recorded at both of these positions. After the reversal of flux at interval T, there is no flux change in track 1 of the tape at the remaining intervals U and V; hence binary –0's will be read at these points. Similar records are effected by the write current in tracks 2, 4, 8, A, B and C.

The curves at the center of Fig. 5, which are indicated as the read signals from tracks 1 through 8 and A through C, are representations of the pulses induced in the magnetic read heads by the tape record explained above. Through circuits, to be described below, positive signals are obtained at each flux reversal, regardless of the direction of the flux change. It should be noted that track 1 thus produces positive signals at intervals N, S and T, while at the intervals P, Q, U and V of track 1 there are no positive signals, since there is no change in the direction of the record flux. Therefore, as to track 1, binary –1– bits are represented at locations N, S and T and binary –0– bits are represented at locations P, Q, U and V.

Immediately below the section of Fig. 5 just referred to is a table of the 7-bit, excess 3 code, reading the –1–, –2–, –4–, –8–, –A–, –B– and –C– bits from top to bottom, as indicated. Reading this code column-by-column in reference to the code shown in Fig. 4 of the drawings indicates that the record produced in the six significant tracks of the tape at the top of the figure contains the following binary bits 1010001 which, as noted in Fig. 4, represent a two.

At interval P of the record there are flux changes noted in tracks 2, 8 and A and -0- bits in all the other tracks. Thus the code representation is 0101100 which again, by reference to Fig. 4, will show that an X is recorded at tape position P. In like manner the remaining manifestations at positions Q, S, T, U and V may be interpreted as 3, 6, R, P and 5, respectively.

It should be emphasized that it is a change in flux at any recording interval that results in the recording of a binary -1- bit, while it is the absence of a change of flux at any interval that is interpreted as a binary -0- bit. Further, each character, because of the particular code used, contains at least one binary -1- bit. It follows then that there is a change in flux in at least one track of the tape at each interval or recording position.

Assume that data to be processed is recorded on a tape in tape drive T1 of Fig. 2. The tape drive T1 is started and eventually the first character of a record is read and transmitted along the line in the direction indicated by the arrow. The character as read, is transmitted through the switch S1, which is in the position shown, to a character register CR1. The character register is adapted to receive the bits read from the tape. Although the bits are written on tape in a line perpendicular to the longitudinal axis of the tape, these bits might align themselves in reference to the reading head coils in somewhat serial order due to misalignment or skew.

Figure 6:
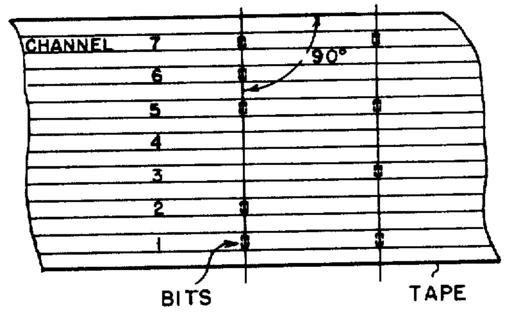
Fig. 6 is a diagrammatic illustration of a section of magnetic tape showing an ideal spatial relationship of recorded bits thereon.

The problem presented by skew is best understood by reference to Figs. 6 through 10. The maximum bit density, which is 100 bits per inch, as stated, is a function of skew (to take an oblique course or directions). Fig. 6 represents the ideal spacial relationship between certain chosen bits of information on tape in respect to the reading heads. The tape read/write heads are accurately assembled to write a group of magnetic pulses perpendicularly with respect to the longitudinal axis of the tape under ideal conditions. It is possible, however, for the tapes to go through their respective guides and over the heads at an angle, due to the necessary tolerances of the mechanical system.

Figure 7:
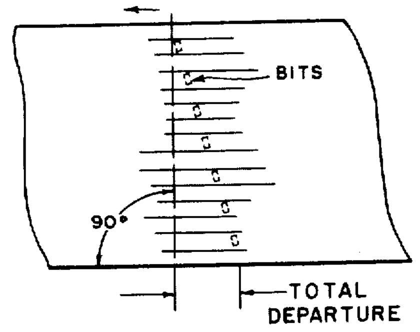
Fig. 7 is a diagrammatic illustration of a section of tape showing a departure from the ideal alignment of recorded bits thereon, due to skew.
Figure 8:
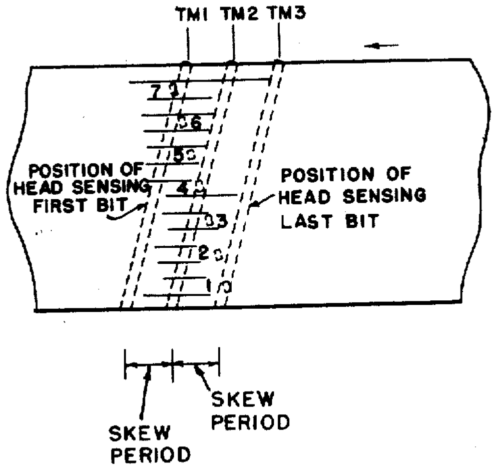
Fig. 8 is a diagrammatic illustration of a section of magnetic tape illustration an aggravated condition of combined skew, due to the presence of skew while writing on tape and also while reading from tape.

A general idea of skew may be obtained from a study of Fig. 7 in which the total departure from the perpendicular is a measure of skew which occurred while writing, and may be referred to as an angle of skew while the skew period is illustrated in Fig. 8. The misalignment illustrated in Fig. 7 is not the worst possible case of a given skew of bits on tape. It is possible while reading that the relationship of the head and the bits may be reversed from that which occurred during writing, as shown in Fig. 8.

The reading circuits, because they read, in a parallel fashion, seven bits at a time, upon receipt of a bit of information from any track in a group, will assume that all information that the other six heads sense belongs to that particular group if they arrive within a specified time after the sensing of the first bit. In a case such as shown in Fig. 8, the time required (or gate length) to get all the bits of one group read must be at least equal to two skew periods, plus any desired safety factor.

With the reading heads placed in relationship to the tape, as shown in Fig. 8, and with the tape moving from right to left, track 7 will be sensed first at time TM1. The reading coil, which will later read the bit in the first track, is effective one skew period behind the reading coil that is sensing the bit in track 7 at time TM1. Thus at time TM2 the reading coil in track 1 will be effective at a point along the tape previously assumed by the reading coil of track 7 at the time TM1. One skew period later the reading coil at track 1 is over the bit in track 1 to be sensed at time TM3. An absolute minimum gate length would be two skew periods to receive all the information in one group.

Figure 9:
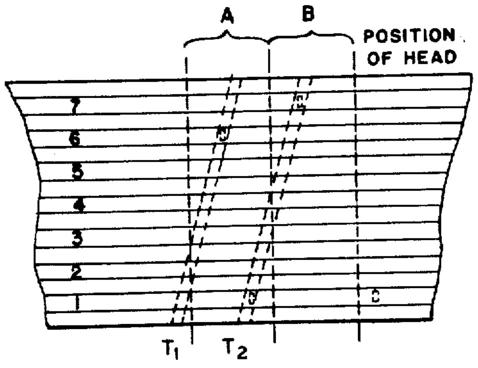
Fig. 9 is a diagrammatic illustration of a section of magnetic tape showing the undesired reading of bits in successive groups of bits by the same reading head in one reading period which could be produced by skew when the respective groups are insufficiently spaced from each other.

Consider now the special arrangement of bits as shown in Fig. 9. In this figure are two groups of bits on the tape (group A and group B), groups A and B comprising all the bits within the area as indicated, and the relationship between the head and bits being such that maximum permissible skew exists. As the tape moves past the heads from righ to left, the bit in track 6 initiates the gate for a specified time, so that information may be transmitted to the tape register CR1. The tape continues to sweep past the reading heads and, as shown, in order to read the bit in track 1 of group A, it would (under the conditions specified) also read the bit in track 7 of group B (as shown by the head position indicated). If group B were placed too close to the group which is presently being sensed, the tape circuits would thus sense the bit in track 7, which is in the next group, as a bit belonging to group A. Thus it would misinterpret the information written on the tape. To avoid this, the groups, as written upon tape, must be placed far enough apart to prevent overlapping in the sensing of bits of different groups. This distance of separation is a function of the permissible skew period of the tape system. The minimum length of space between bits on the same track is determined from the following consideration of two sequential groups of one binary -1- bit each.

Fig. 10 diagrammatically illustrates the minimum permissible distance between bits. If a bit associated with group A is in track 1 (written with the head position as shown by the dotted line) and the tape is moving from left to right, and if the heads while reading are as shown in solid line, the worst possible skew conditions exist. It is important, therefore, to determine the distance that a bit in track 1, group B, must be placed from a bit in track 1, group A, to permit proper reading. When the head senses a bit in track 1, group A, the timing gate is generated (gate length equal to two skew periods) to allow all the other bits to enter the register CR1.

The length, parallel to the tape edge projected by the heads (Fig. 10) is called the skew period, as has been previously explained, and to this length must be added the gate length. Allowing for the possibility of having a bit in track 7 of group B with its skew, as shown in Fig. 10, it is also necessary to add this skew period of group B in order to locate the gate in track 1 of group B. The simple addition of three distances, i.e. two skew periods and one gate length, parallel to the edge of the tape, provides a total of four skew periods as the minimum distance between two consecutive bits on the same track. For example, the skew period in reference to the time domain, may be 31 microseconds. Therefore, 124 microseconds must be the minimum time between groups. If these are the minimum requirements, in actual practice, provision would be made for a 132 microsecond time separation between groups to provide a safety factor.

Theoretically it is possible to perform a series of reinscribing operations on tape such as would occur, for example, during the sorting of information recorded at random on an input file and without intermediate storage of the data. However, efforts to perform such operations involving the reading and the direct transcription of the read information throughout a plurality of tape passes have encountered the difficulty of uneven intercharacter spacing, uneven inter-record spacing and bit misalignment. These difficulties have, in a large measure, been the outgrowth of random speed variations between an input tape and an output tape, tape slippage and stretch while being driven through the read/write heads, and tape skew while being fed through the read/write heads. All of these difficulties are overcome in the present system by the conjoint use of the tape registers such as CR1 and the data storage system such as the electrostatic memory.

The information in the character register CR1 (Fig. 2) is available, after a time interval, to the line to the right of the character register and may enter the I/O sequence comparator and the I/R input comparator. This information is also available at the S2*a* and S3*a* points, respectively, of the switches S2 and S3.

It may be stated at this time that the switch S2 will be closed to its point S2*a* at any time the tape drive T1 is addressed, and that the switch S3 will be closed to its point S3*a* at any time the tape drive T2 is addressed. Therefore, the information in the character register CR1 may be read into memory M1 or memory M2 when the switches S2 and S3 are so conditioned.

Memories M1 and M2 each comprise a pair of cathode ray storage tubes which are diagrammatically represented in Fig. 10*a*. The electrostatic storage system is so arranged that a binary –1– is stored on the face of one of the cathode ray tubes in either memory M1 or memory M2 in the form of a vertical dash. Thus, when the cathode ray tubes are interrogated during the read-out of information stored therein, the read-out system will distinguish between a dot and a dash and will interpret the dash as a binary –1– and the dot as binary –0–.

Fig. 10*a* is a diagrammatic representation of the tube rasters in two tubes constituting either memory M1 or memory M2. Each tube is adapted to have stored therein five vertical columns of data. Each column is adapted to receive 20 groups of 7 bits each, each group representing a character and being disposed in a horizontal line extending across a column. Thus the first cathode ray tube of either memory will receive therein the first 20 characters or binary bit groups in the first column, the second 20 groups or characters in the second column, and so forth until the groups 80 through 99 are stored in the fifth column of storage. The second cathode ray tube of either memory system has a similar raster pattern, wherein groups 100 through 119 are stored in the first column and wherein each succeeding column is adapted to receive 20 groups of bits until the final storage capacity of 200 groups of bits is filled.

It may be gathered from this brief reference to the manner in which the bits are stored that the cathode ray beam deflection system will at the outset be positioned in the first column and at the bottom thereof until a group of bits has been stored. Thereafter the beam will be caused to sweep the next higher row, and so on until the 19th row has been stored in the first column of storage, at which time the beam is deflected to the bottom of the second storage column, whereafter the successive upward deflection takes place as before, and so on until the entire raster pattern is developed.

As a character is stored in memory M1, the character which it replaces from the previous record is emitted from memory M1 at the right thereof, through the switch S4 closed to its S4*a* point, as shown, and to the right side of the I/O sequence comparator and also to one side of the O/R output comparator. Simultaneously the comparable column of the record in memory M2 is regenerated and is available from the right of memory M2 to the switch S5 closed to its S5*a* point, as shown, and to the I/R input comparator and the O/R output comparator.

Thus, at this time there are three bits of information available for comparison: the input bit from the character register CR1, the output bit from the memory M1, and the remainder bit from the memory M2. If comparison is called for at this time under control of the operator's panel (to be described later), the comparison of these bits will be the basis for rendering a decision as to their sequence, i.e. a determination of which is high, which is low, or whether they are equal.

The comparison of a character is done sequentially in bit-by-bit order, since the storage elements of the system are serial in nature. Thus upon the storage of one bit of a character from the tape in tape drive T1 into memory M1, one bit of the corresponding column of the output record from M1 and one bit of the remainder record in M2 will be available at this time for comparison.

The comparison procedure may be illuminated by way of example. Let it be assumed in a sorting operation that a file of records is to be sorted on the basis of a given control field. The records may, for example, be those of a personnel department used for computing payrolls. In such case, each record may include an employee's name, for example, in the first 15 columns. The next two columns of each record (for example, columns 16 and 17) may designate the plant number in which the employee is located. The next 4 columns, i.e. columns 18 through 21, may, for example, contain a serial number assigned to the employee. Succeeding columns of the record may contain the number of hours employed during each of the working days of the payroll period or perhaps the hourly or weekly pay rate, and the final column will contain a record mark.

Let it be assumed that a payroll is to be prepared for the employees of a company operating a plurality of plants in separate locations, and that the payroll is to be prepared on the basis of individual plants. For this purpose the sorting control field comprising, for example, columns 16 and 17, will be selected as the basis for the sorting operation. This field will contain the plant numbers in which the employees are employed. Let it be further assumed that an input record, a remainder record and an output record have been made available in the system herein and that these three records, respectively, are those of employees at plants 12, 14 and 19.

If the input record is that of an employee at plant 12, the fact will be indicated by a significant –4– bit in the 16th column and significant –1– and –4– bits in the 17th column. If the remainder record is that of an employee at plant 14, the fact will be indicated by a significant –4– bit in the 16th column and significant –1–, –2– and –4– bits in the 17th column. If the output record is that relating to an employee at plant 19, the fact will be indicated by a significant –4– in the 16th column and significant –4– and –8– bits in the 17th column.

In the comparison procedure, the characters that are available for comparison are compared, as stated, in bit-by-bit order beginning with the –1– bit and continuing through the –8– bit, if the character being sorted is numeric. Thus, the –1– bits are first compared with each other, and the –2– bits, the –4– bits and then the –8– bits follow through the comparison cycle in the order named.

In the example assumed, when the –1– bit in the input record (column 17) is compared with the –1– bit in the remainder record (column 17), it will be found that they are equal. When the –1– bit in the input record is compared with the –1– bit in the output record, it will be found that the input record is high. This follows from the fact that the input record has a significant –1– bit recorded therein, while the output record has no such bit recorded therein. When the –1– bit of the output record is compared with the –1– bit of the remainder record, it will be found that the remainder record is high for the reason that the remainder record has a significant –1– bit recorded therein, whereas the output record has no significant record in the –1– bit location. The comparison of the –1– bit of the input record against the remainder record, the input record against the output record, and the output record against the remainder record is not a conclusive basis for sorting. This basis for sorting is only tentative, since further comparison between the respective –2–, –4– and –8– bits may change the results of the comparison obtained on the basis of the respective –1– bits alone.

Proceeding, therefore, to a comparison of the –2– bits of the respective records, it will be noted that the input record and the output record have no significant –2– bit record, but that the remainder record has, Therefore, when the –2– bit of the input record is compared with the –2– bit of the remainder record, it will be found that the remainder record is now high. Therefore, a change in the previous tentative determination occurring during the comparison of the –1– bits has taken place.

Comparison of the –2– bit in the input record with the –2– bit in the output record shows these records to be equal (neither record having a significant bit recorded in the –2– bit position). As a consequence of this comparison, it may be said that the input record as compared to the output record is still high and that no change has taken place in respect to the previous tentative decision. When the –2– bit of the output record is compared with the –2– bit of the remainder record, it will be found that the remainder record is high, since the remainder record has a significant –2– bit recorded therein, whereas the output record has none. Therefore the remainder record is still high and no change from the previous tentative comparison decision is noted.

After the –2– bits have been compared, as noted above, the comparison operation proceeds to the respective –4– bits of the records. Thus the –4– bit of the input record is compared with the –4– bit of the remainder record and is found to be equal. This follows from the fact that there is a –4– bit recorded in each of these records; since the remainder record was previously high, it remains high and no change from the previous tentative comparison decision is noted. When the –4– bit of the input record is compared with the –4– bit of the output record, it will be seen that these records are equal, for the reason that each has a significant –4– bit therein. Since the input record previously compared with the output record was high, such input record is still high and no change in the tentative comparison decision is noted. When the –4– bit of the output record is compared with the –4– bit of the remainder record, it will be seen that they are equal for the reason that each has a significant –4– bit therein. However, since the last tentative comparison decision indicated that the remainder record is higher than the output record, it follows that upon comparison of the –4– bits in the output/remainder records (since these are equal), the remainder record should still be indicated to be high and that no change in the previous tentative comparison has taken place.

Finally, the comparison process will proceed to the –8– bit, which is the final bit of any numeric notation, and the –8– bit of the input record is compared with the –8– bit of the remainder record with the result that they are found to be equal, i.e. neither of these records having a significant –8– bit recorded therein. However, since in the previous input/remainder comparison it was found that the remainder was high, the remainder is therefore still high and no change in the tentative comparison decision reached in the prior stages of the operation is noted.

When the –8– bit of the input record is compared with the –8– bit of the output record, it will be found that the output record is high. This follows from the fact that the output record has therefore an –8– bit while the input record has none. The fact that the output record is now designated as the high record indicates a change in the previous tentative comparison decision, this change now designating the output record as being high. Finally when the –8– bit of the output record is compared with the –8– bit of the remainder record, it is found that the output record is high. This again follows from the fact that the output record has an –8– bit therein, whereas the remainder record does not. This comparison does not change the last tentative comparison decision, since the output record is still indicated as high. Thus the last tentative comparison decision now becomes the final comparison decision to the effect that the output record is high. This is as it should be because the output record was said to represent the record of an employee at plant No. 19, as compared with the other records which dealt with employees at plants 12 and 14.

The foregoing description may be summarized by way of a tabulation such as the following:

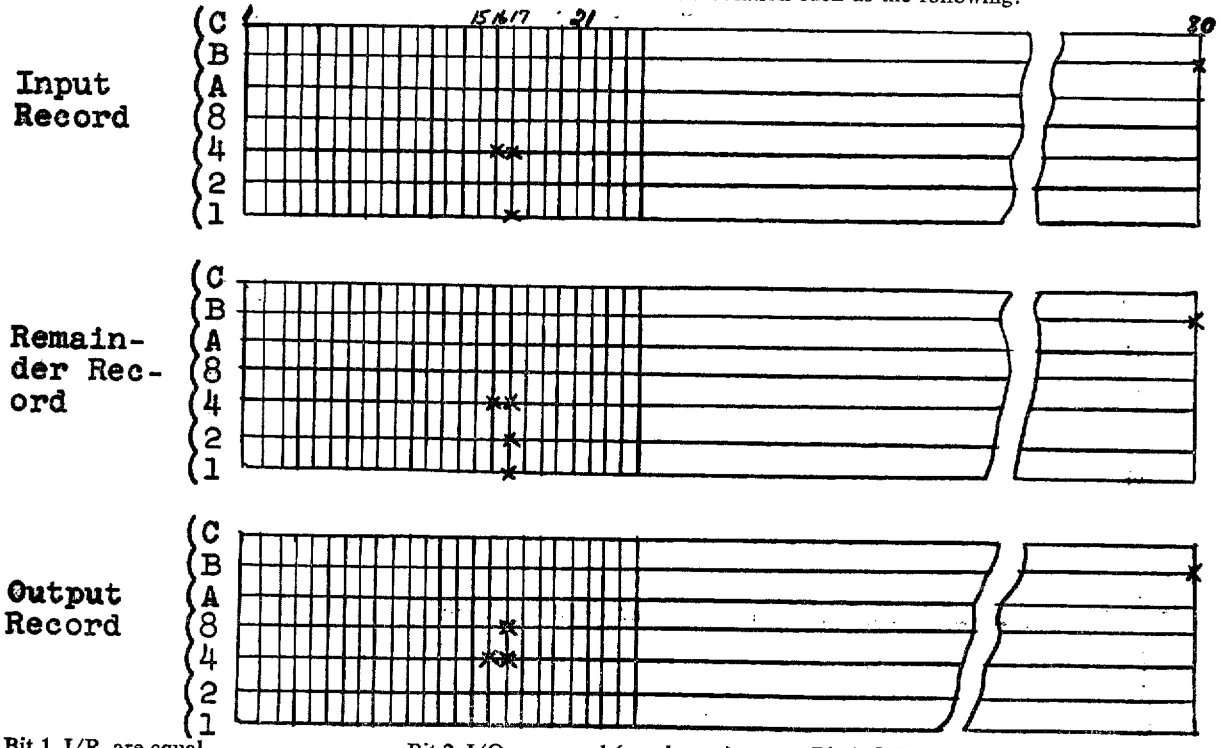

Bit 1, I/R, are equal.
Bit 1, I/O, I is high.
Bit 1, O/R, R is high.
Bit 2, I/R, R is high (a change).
Bit 2, I/O, are equal (no change).
Bit 2, O/R, R is high (no change).
Bit 4, I/R, are equal (no change).
Bit 4, I/O, are equal (no change).
Bit 4, O/R, are equal (no change).
Bit 8, I/R, are equal (no change).
Bit 8, I/O, O is high (a change).
Bit 8, O/R, O is high (no change).

The output record is, therefore, high.

Comparison is performed, as called for, on the control panel on 6 of the 7 bits of any character (providing alphabetic data is being processed). Since the purpose of the 7th bit of a character is checking by the redundancy bit check method, as stated, this 7th bit has no function in the comparing circuits.

When a character is completely stored in memory M1 from the character register CR1, the register CR1 is reset and will remain reset until a second character is read from the tape in tape drive T1. When a second character is stored in the character register, the previously described operation of comparison will be repeated. This operation continues until eventually the last character of a given record is read from the tape. This character is recognized by the recognition circuits of the system as a record mark, and is used to stop the tape drive now running, in this case tape drive T1, and to initiate an internal program to render effective the comparison decisions and to emit the pulses represented therein on the control panel where they are conditioned to control further operations, i.e. the selection of the input and output tape drives.

Thus far a complete record has been read from a tape in tape drive T1, and this record has been stored in memory M1. Based on a decision of the comparators and the particular wiring on the operator's control panel, an output tape (T3 or T4, for example) will be selected to receive one of the records stored in the memories. A decision will be made as to which input tape will next operate, but since this is not a simultaneous read/write machine, this decision will be remembered in the control circuits within the system. The output tape drive selected on the control panel will be put into operation, and after a timed interval, the record in memory M1 or memory M2, as selected, will be emitted to the selected output tape and transcribed thereon. The path of transmission of the output record will be from the selected memory cell, through either of the switches S4 or S5 to a second character register CR2.

At regularly timed intervals the character register CR2 will be reset and pulses generated by the resetting of the triggers will be transmitted to the tape drive that is running and the retranscribing operations will take place at that point. It will be noted at this point that the tape registers CR1 and CR2, but for an exception to be noted, are identical in structure and function.

The switches S6 and S7 in Fig. 2 are a symbolic representation of the output tape drive selection. The switches S8 and S9 will remain in the position shown during any collating operation and during the odd number of passes of a sorting operation. Thus the information flow will be from the character register CR2 through the closed points of switches S6 or S7, to either or both of the switches S8 and S9 (depending on whether these switches are closed to their S8*a* and S9*a* points, respectively), and thence to the tape drives T3, T4, or either of them.

If a complete record has been transmitted from a memory via the circuit just described, the record mark at the end of the record will be sensed in the character register CR2, and after the record mark is written it will cause the stopping of the output tape drives and the starting of the previously selected input tape drive or drives. The starting of an input tape drive will result in the eventual sensing of the first character of a record, and the hereinbefore described procedure will be repeated in its entirety.

The system is so conditioned that during the initial loading of a record thereinto, a sub-routine is called into operation which causes tape drive T1 to read its first complete record into memory M1, and upon completion of the reading of this first record, the sub-routine will call on the tape drive T2 to read a complete record into memory M2. When the first record is stored into memory M1, no comparison is performed, since there is no other input data on which to make a comparison. The internal sub-routine referred to will automatically cause tape drive T2 to read a record into memory M2, at which time an input comparison is performed. The result of this initial comparison is the basis for emitting one of the two records to an output tape. After this first read-in and comparison program, all comparisons will be performed on all succeeding records.

When one of the two input tape drives T1 or T2 emits a character which is sensed as a tape mark in the character register CR1, the system will recognize the manifestation as a tape mark and as the last valuable information on the tape being read and will cause the machine to stop, whereupon the exhausted tape in the input tape drive will be directed to rewind. At this point the operator may intervene. If additional information is to be processed from the tape drive in which the exhausted reel is located, this reel may be removed and a second reel tape inserted.

Upon depression of the machine start key, a new reel of data bearing tape in the input tape drive will be called upon for its first record. Beyond this point the operation of the machine is identical with that noted above. However, if no further information is to be processed from the tape drive which has indicated an end of the useful record therein by the emission of a tape mark, the operator will depress the machine run-out key to cause the alternate input tape drive to start up and run its remaining information through the machine and to the output tapes in the output tape drives under control of the operator's panel.

When the last bit of valuable information is transmitted from the tape in the second input tape drive, a tape mark will be sensed in the character register CR2. This tape mark will cause its associated tape drive to rewind, and it will also force the internal generation of a tape mark to be written on all output tapes, after which the output tapes are also rewound. An indicating light at the operator's console will show that the operation is complete. At this point the reels on the machine may be removed, the control panel may be removed and a new one inserted, and a new process may then be started.

The tape drives in no way disturb information on the input reels, so that a reel containing master information may be run through the drives any practical number of times without destruction of the record on the tape.

The switches S1, S8, S9 and S10 in Fig. 2 are altered during sorting operations. In any operation, except a sorting operation, these switches remain closed to their S1*a*, S8*a*, S9*a* and S10*a* points, respectively, as shown in Fig. 2. Since a sorting operation consists of a series of passes of information from one set of tapes to another, it will be apparent that it is necessary to reverse the functions of the two sets of tape drives alternately with each tape pass. Thus during the first pass of tape during a sorting operation, tape drives T1 and T2 will be the input tape drives, and tape drives T3 and T4 will be the output drives. On the second pass of the same sort this relationship, however, will be reversed, i.e. tape drives T3 and T4 will be the input drives, whereas tape drives T1 and T2 will be the output drives.

Thus on the first pass of a sorting operation, whether single or double reel, the information originates from tape drives T1 and T2, passes through the machine and is recorded on taped rives T3 and T4 through the switches S1, S8, S9 and S10 as they are shown in Fig. 2. After all the information has been read from the tapes in the tape drives T1 and T2 and this information has been recorded on the tapes in the drives T3 and T4, the tapes in drives T3 and T4 will rewind. During the rewinding of the tapes, the switches S1, S8, S9 and S10 are caused to move from their respective S1*a*, S8*a*, S9*a* and S10*a* points to their S1*b*, S8*b*, S9*b* and S10*b* points. It can be seen now that when the tape drives T3 and T4 are addressed as readers, they will transmit information from the tape drives to the S8*a* and S9*a* points of the switches S8 and S9, respectively, from these points to the S1*b* and S10*b* points of the respective switches S1 and S10 associated with the tape drives T1 and T2, and through these switches to the character register CR1.

Conversely, when information is to be written from the machine to the output units, the information is stored into the character register CR2, is emitted through the switches S6 and/or S7, now closed, to the switches S8 and/or S9, respectively, associated with the tape drives T3 and T4, which are now transferred to their S8*b* and S9*b* points. These points of the switches S8 and S9 are now connected to the S1*a* and S10*a* points of the switches S1 and S10, respectively, associated with the tape drives T1 and T2, so that the information will now be recorded on tapes in the tape drives T1 and T2. Thus the switches S1, S8, S9 and S10 are transferred on every alternate sorting pass, i.e. during pass No. 1 the switches S1, S8, S9 and S10 will be as shown, and during pass No. 2 the switches S1, S8, S9 and S10 will be transferred, etc. By this means it is possible to cause two sets of tape drives to alternate in their function as tape readers and tape writers, obviating the necessity of the operator manually removing tapes from the output drives and reinserting them into the input drives. This function is performed automatically through the switches S1, S8, S9 and S10, and thereby permits the machine to operate automatically until a sorting operation is completed.

The control panel is so wired that when a comparison decision is reached, internal circuits are set up to select the memory associated with each drive, choosing this memory as the memory to next transfer its data to tape. By this means the record to be written on tape is selected at the same time that the next input tape is selected. Thus if the decision is such, for example, that calls for selection of tape drive T1 as the next input tape to operate, the switches S4 and S5 will be set in the position shown in Fig. 2. When a write cycle is completed, the record stored in member M1 will be interrogated and regenerated, but will also pass through the switch S4 to the character register CR2, and from thence to the selected output tape. Memory M2 conversely is selected as the remainder record, and the setting of its switch S5 will allow the characters in memory M2, as they are being regenerated, to flow through the switch S5, closed to its S5*a* point, and from there to the input and output comparators. Depending on which input drive is selected through control panel wiring, the switches S4 and S5 then assign to the memories their status as to whether their records are output or remainder records.

The sorting operation is based on the sorting of sequences. Two unit records are read into the system, one from each of the tapes in tape drives T1 and T2, and are placed in memory. The lower of the two records (or either one, if they are equal) is written on the tape in tape drive T3. It is replaced by reading another unit record from the same tape it came from. If both records and memory are now higher than, or equal to, the one last written, then the lower of the two records in memory is again written on tape in tape drive T3 and replaced by another record from its own input tape.

This process continues until one of the records (input or remainder) is lower than the last one written. When one of the records being compared is lower than the last one written, the circuits recognize a condition which may be characterized as a sequence step-down, and such lower record is retained in memory and the higher record is written on the tape in tape drive T3 and is replaced in memory from its own input tape. This process continues until both records are lower than the last one written, and when this condition occurs the circuits recognize the same as a double sequence step-down.

When a double sequence step-down occurs, the tape in tape drive T4 is addressed as the output tape. The two records (input and remainder) are again compared, and the lower one is written out on the tape in tape drive T4 and is replaced as before. This process continues until there is again a step-down on both tapes. When a step-down on both tapes occurs, the tape in tape drive T3 is again addressed as the output tape, and so on. The same process is used on each pass of the tape, except that the functions of tape drives T1, T2 and T3, T4 are interchanged after each pass, as noted above. If a sorting operation is followed, it will be noted that the number of step-downs after each pass decreases due to the fact that the sequences increase in length after each pass.

The detailed process of sorting may be clarified by reference to an example. For the sake of simplicity, let it be assumed that a plurality of one digit serial numbers are substantially evenly divided on a pair of input tapes and that these serial numbers are in random order. Thus, assume that a tape in tape drive T1 has thereon the serial numbers 4, 6, 1, 8 and 3 and that a tape in tape drive T2 has thereon the serial numbers 2, 6, 3, 0, 9 and 5. It will be noted that these numbers are in random sequence, and it is desired to sort them into ascending sequence on a single tape. The 4 will be read from tape in tape drive T1 into memory M1 and the 2 will be read from tape in tape drive T2 into memory M2. The 2 will be compared with the 4, and the lower one, i.e. the 2, will be written on tape in tape drive T3. Since the 2 must be replaced in memory by the next number from the tape from which the 2 originated, the 6 will be read into memory, and both the 4 and the 6 will now be compared with the 2, which was the output record, and since both are higher than the 2, the 4, since it is lower than 6, will be read out to tape in tape drive T3. The 4 is now replaced from its own input tape with the next record thereon, i.e. the 6. The 6's under observation are compared with the 4, which was the last output record, and since they are higher than the 4, either one of them (since they are equal) is read out to tape in tape drive T3. Assume that the 6 originating from tape in tape drive T1 is read out to tape in tape drive T3, its replacement from the same input record will be the 1.

A condition has now been reached where one of the records, as between the input and remainder records, is lower than the last output record, thereby producing a step-down. It has been stated that under these conditions the lower of the two records will be retained and the higher will be read out to the tape in tape drive T3. Thus the 6 originating from tape in tape drive T2 will be written out and will be replaced by the 3 from tape in tape drive T2. A comparison of the input and remainder record shows both of these to be lower than the last output record, i.e. the 6, thus creating a double step-down which necessitates the address of tape in tape drive T4 as the next output tape. Upon comparison of the input and remainder record the 1, since it is the lower of the two, will be written on tape in tape drive T4, and it will be replaced by the 8 from its own input tape in tape drive T1. The tape in tape drive T4 will now be addressed as the output tape until such time as a succeeding double step-down occurs. Otherwise the comparison and output operation is the same as previously described. Thus a comparison of the input and remainder record with the last output record shows them both to be greater than the output record, and a comparison of the input with the remainder record shows the 3 to be the lesser, thereby dictating its transcription to tape in tape drive T4 as an output record.

The 3 written on tape in tape drive T4 will now be replaced by the 0, whereupon a comparison of the remainder and input record with the last output record will indicate the occurrence of a step-down. This, as noted above, necessitates the transcription of the higher of the two records, as between the input and remainder records, to the output tape. Consequently the 8 will be transcribed as the output tape in tape drive T4, and it will be replaced by the 3 from tape in tape drive T1. When the 0 and the 3 are compared with the last output record, a double step-down will be noted, since both of these records are now lower than the last output record. This condition dictates that the tape in tape drive T3 be now selected as the output tape. Comparison of the 3 and the 0 shows the 0 to be the lesser of the two, and consequently it will be transcribed as an output record on tape in tape drive T3 and will be replaced from its input tape in tape drive T2 by the next record, which is the 9. Since the 3, which is the remainder record, and the 9, which is the input record, are both higher than the last output record, the lower of the two will be written on tape in tape drive T3. Thus the 3 will be transferred to tape in tape drive T3 as the output record.

Since the tape in tape drive T1 is now exhausted of useful records, the 9 from the tape in tape drive T2 will be compared to infinity, and since both are higher than the last output record, and since 9 is less than infinity, the 9 will become the output record and will be transcribed to tape in tape drive T3. So long as records remain on one of the tapes, relays are picked such that the comparison hubs will emit a suitable signal to keep the tape with useful records selected as the input unit until it is exhausted of records. The 5 is now read from tape in tape drive T2 and compared to infinity, and both the 5 and infinity will be compared to the 9, which was the last output record, with the result that a double step-down is again sensed, and with the result that the tape in tape drive T4 must now be addressed as the output tape. Since 5 is less than infinity, the 5 will be transcribed to T4 as the output record.

The tape in tape drive T3 will now have written thereon 2, 4, 6, 6, 0, 3, 9 in the order named, and the tape in tape drive T4 will have written thereon 1, 3, 8 and 5 in the order named. At this point the switches S1, S8, S9 and S10 will be transferred to their respective **S1*b*, S8*b*, S9*b* and S10*b* points, so that the tapes in tape drives T3 and T4 now become the input tapes and the tapes in tape drives T1 and T2 now become the output tapes. Thus, data read from tape in tape drive T3, for example, will pass to the S1*b* point of switch S1 associated with tape drive T1, and since the switch S1 is now transferred to its S1*b* point, the data read from tape in tape drive T3 will enter the character register CR1 and pass through the system in normal course for eventual discharge from the character register CR2 to point S8*b* of the switch S8 associated with the tape drive T3, and since this switch is now transferred to its S8*b* point, the data on the line will pass to the read/write head of tape drive T1 via point S1*a***.

As before, the first records of tapes in tape drives T3 and T4 are read into memory, and a comparison thereof is effected in the system. The 2 from tape in tape drive T3 is compared with the 1 from tape in tape drive T4, and since the 1 is lower than 2, it will be written out on tape in tape drive T1, and will be replaced by the 3 from its own tape in tape drive T4. A comparison of the input record 3 and the remainder record 2 against the output record 1 indicates the 2 and 3 to be higher than the 1. A comparison of the 2 and 3 results in the selection of the 2 as the output record, which is therefore transcribed to tape in tape drive T1. The 2 is replaced by the 4 from its own tape in tape drive T3, and both the 3 and the 4 are compared with the last output record and against themselves with the result that the 3 is selected as the output record to be written on tape in tape drive T1. The 3 is now replaced by the 8 from its own input tape, and the 8 and the 4, comprising the input and the remainder records, are compared to the output record and found to be higher.

A comparison of the 4 with the 8 results in the transcription of the 4 as the output record to tape in tape drive T1. The 4 is now replaced by the 6 from its own input tape in tape drive T3, and the input and remainder records are again compared with the last output record. A comparison of the 6 and the 8 with each other shows the 6 to be lower, with the result that it is written out on tape in tape drive T1 and replaced from its own input tape by the 6. The input 6 and the remainder 8 are compared with the output 6 and found to be higher (or equal, as in this case). When the 6 is compared with the 8 and found to be lower, it is written out to tape in tape drive T1 as the output record. The 0 from tape in tape drive T3 now replaces the 6 as the input record.

When the 0 and the 8 are compared with the last output record, which is 6, a single step-down will be noted, with the result that the lower of the two records, as between the input and the remainder, is now held in memory and the higher is read out to tape in tape drive T1. This results in the transcription of the 8 upon tape in tape drive T1 as the output record. The 8 is now replaced by the 5 from tape in tape drive T4, and when the 5 from tape in tape drive T4 and the remainder record 0 are compared with the last output record, it will be observed that both are lower than the 8, which was the last output record, with the result that a double step-down is sensed.

This, it will be remembered, necessitates the selection of tape in tape drive T2 as the next output tape to receive an output record. Consequently, when the 0 and the 5 are compared with each other, and the 0 is found to be the lower, it will be written out on tape in tape drive T2 and replaced from tape in tape drive T3 by the 3. The input record and the remainder record, i.e. 3 and 5, are both higher than the last output record 0. When the 3 and the 5 are now compared, the 3, being the lower of the two, will be written out on tape in tape drive T2 and will be replaced by the 9 from tape in tape drive T3. The 9 and the 5, constituting the input and remainder records, are compared with the last output record, and they are found to be higher. The inter-comparison of the 5 and the 9 shows the 5 to be lower, with the result that it is written out on tape in tape drive T2. The 9 from tape in tape drive T3 is now compared to infinity and, being lower, is written out on tape in tape drive T2.

At this point the tape in tape drive T1 has recorded thereon 1, 2, 3, 4, 6, 6 and 8 in the order named, and the tape in tape drive T2 has written thereon 0, 3, 5 and 9 in the order named. The switches S1, S8, S9 and S10 are again reversed so that they occupy the position shown in Fig. 2, thereby once again constituting the tapes in tape drives T1 and T2, the input tapes, and the tapes in tape drives T3 and T4 the output tapes.

As before, the first records on tapes in tape drives T1 and T2 are read into their respective memories, and a comparison will be made to determine which of the two is lower. This results in the 0 being written out on tape in tape drive T3. The 0 is replaced by the 3 from tape in tape drive T2, and a comparison is made between the 3 and the 1, which is the remainder record, with the result that the lower of the two, i.e. the 1, will be written out on tape in tape drive T3. The 1 will be replaced by the 2 from tape in tape drive T1, and a comparison will again be made to determine whether the 2 is lower than the remainder record 3. This being the case, the 2 will be transcribed to tape in tape drive T3 as the output record and will be replaced by the 3 from tape in tape drive T1. Since the input record and the remainder record are equal, either may be written out on tape in tape drive T3. Let it be assumed, therefore, that the 3 from the tape in tape drive T1 is written out and is replaced by the 4 from the tape in tape drive T1. When the 4 is compared with the remainder record 3, it will result in the 3 being written out on the tape in tape drive T3, since 3 is lower than 4. The output record 3 is now replaced by the 5 from its own input tape in tape drive T2, and a comparison is made between the 5 and the remainder record 4, with the result that the 4, being the lower, will be written out on tape in tape drive T3. The 4 is now replaced by the 6 from tape in tape drive T1 and compared with the remainder record 5, with the result that 5, being the lower, is written out on tape in tape drive T3. The 5 is now replaced by the 9 from tape in tape drive T2 and compared with the remainder record 6. The remainder record 6, being the lower of the two, will be written out on tape in tape drive T3 and will be replaced by the 6 from its input tape in tape drive T1. Again a comparison between the 6 and the remainder record 9 shows the 6 to be lower, with the result that it is written out on tape in tape drive T3. The 6 is now replaced by the 8 from tape in tape drive T1 and compared with the remainder record 9, with the result that the 8 is written out on tape in tape drive T3, since it is lower. The remainder record 9 is now compared with infinity, and since it is the lower, it will be written out on tape in tape drive T3.

The sorting operation is now complete, since all of the records which were originally in random order on the tapes in tape drives T1 and T2 are on a single tape and arranged in ascending order, thus 0, 1, 2, 3, 3, 4, 5, 6, 6, 8, 9.

The total number of passes required for any sorting operation is independent of the number of columns, and the configuration of the columns to be sorted, i.e. whether the columns be numeric or alphabetic. In any random record the average number of sequencies is two records.

The number of passes required to perform a sorting operation is that power of the base 2 which is next greater than, or equal to, the number of sequencies in the record. If a file of records is in reverse sequence, the base 2 number is the number of passes required to effect sorting. This extreme condition is unusual in that most record files are either in a fairly well known sequence, as in the case where there may be only a few sequence errors, or where the records are in a purely random order.

Where only a few sequence breaks occur in any given record, regardless of the number of records involved, the number of passes to effect sorting is the power of 2 next greater than the number of sequence breaks in the record. If the record is in random order, the average sequence length of two records may be assumed, and therefore the number of passes required will be the power of 2 next greater than the total number of records divided by two. For example, if there are 1000 records on a tape to be sorted, the field being of no consequence, if these records are in reverse sequence, then on the first pass of the tape the record sequence length will become 2, on the second pass 4, on the third pass 8, and on the ninth pass all records will be in sequence.

If these 1000 records are on tape in a completely random order, then the assumption may be that there are approximately 500 sequences on the tape. Therefore, on the first pass of a sorting operation, the total number of sequences will be cut in half, on the succeeding pass the number will be cut in half again, and so continuously until the eighth pass, at which time the records will be arranged in sequence. If it is known that the file contains only four sequence breaks, for example, such as might be caused by recording on a single tape four previously sorted records, then to sort this file into sequence will require only two passes.

In the sorting of punched cards it is necessary to sort each column of the control field. Thus if the field is normally ten columns long, the cards must be passed through the card sorter ten times to perform a numeric sort, twenty times to perform an alphabetic sort, and as many as thirty times to perform a sort on special characters. Moreover, in card sorting no advantage is obtained from any sequences that may exist in the card file at the beginning of the sorting operation. Furthermore, in the sorting of punched record cards it is necessary to maintain an operator at each sorter, except in the case of a very experienced operator who may be capable of running two sorters at the same time. Therefore, constant human intervention is required in the sorting of punched record cards, thus increasing the possibility of human error.

CONTROL PANEL FUNCTIONS

All of the control pulses generated within the system are routed through a control panel where they may be utilized at the discretion of the operator by appropriate plugging. This routing of the control pulses renders the machine extremely flexible and permits a great variety of different operations and modifications of such operations limited only by the ingenuity and skill of the operator. The theory of operation and the functioning of the control panel are perhaps best understood by reference to the various functions brought out to the control panel. It is impractical to try to described or even to catalogue all of the many possible control panel plugging combinations which would result in useful data processing operations. However, a sufficient reference will be made to this feature of the invention to indicate the broad functions and to point to the versatile nature of the system.

*Comparison controls.*—All three possible comparisons, i.e. the input/output (sequence) comparisons, the input/remainder (input) comparisons, and the output/remainder (output) comparisons are brought out to the control panel through high, equal or low output hubs. While the comparison circuits basically compare input versus remainder or output versus remainder, etc., it is possible to interpret these comparison results in regard to which ever input feed happens to be running at a particular time. Thus, it is possible to relate the actual outputs in regard to a given tape feed. (This is not true of the sequence comparison as to be pointed out hereinbelow.)

Figure 11:
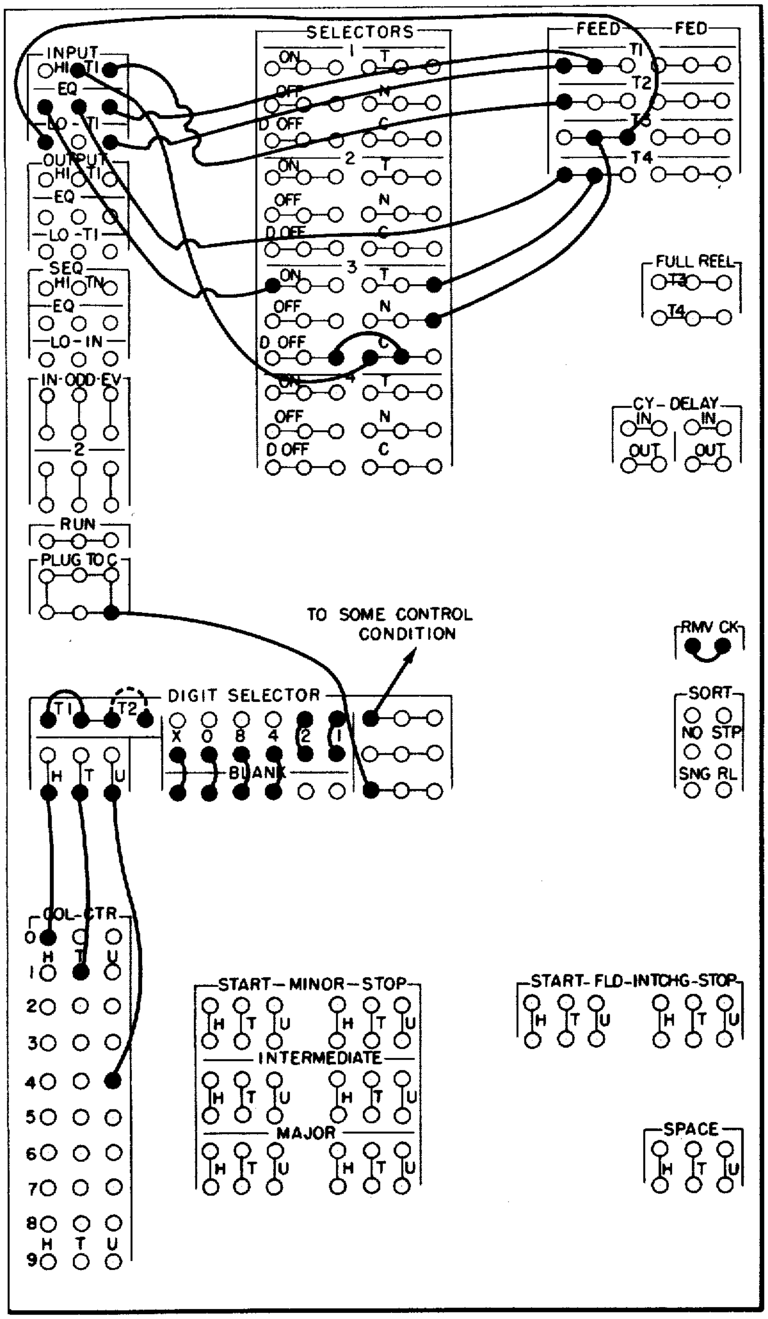

The input comparison hubs which give the interpreted output of the input/remainder comparisons, as noted in Fig. 11, are generally used to operate tape drive feed hubs directly or through selectors that may be used to operate selectors to control later comparison outputs or other functions. Figs. 11 through 15 are drawings of the control panel and each of these figures is differently wired to produce different functions within the system.

The input/remainder comparison output on the control panel is wired as indicated above. Based on a comparison of input versus remainder, one of the two input tape drives, T1 or T2, will be selected to cause a new record to be fed into the machine. Based also on the comparison result of these two records, all records, except those that are equal between two files, will be written on tape in tape drive T3. Those records which are equal will be written on the tape in tape drive T4. Thus, by wiring the high T1 hubs to tape drive T2 feed hubs, the tape in tape drive T2 will be fed when the record associated with memory M2 is low. This in turn means that the record in memory M2 will be written on tape in tape drive T3 unless it was previously found to be equal to a record in memory M1.

If the input comparator determines that the record in memory M1 is equal or low, tape drive T1 will be selected to feed a new record. The record already in memory M1 must now be written out on tape before a new record is substituted therefor. Tape drive T3 is selected at all times that data in memory M1 is higher than the data in memory M2. If the comparison shows the factors to be equal, the equal hubs (Fig. 11) may be wired to tape drive T4. Thus an equal record will be written out on a tape in tape drive T4. After this record has been written, and a new record is read into memory in its place, a new determination will be made as a result of the comparison of the new input record. If the records are in their proper sequence, this new determination will be that the record in memory M1 is either equal or high. If it is equal, the record will once again be written out on tape in tape drive T4. If, however, as is probable, the record in M2 will be written out, this record is high, then tape drive T2 will be addressed to feed its next record into memory M2 which, now while being low as compared to the record in memory M1, had previously been equal to another record that had been in memory M1.

Notation of the equal condition is maintained by means of a selector. Thus, when the equal condition was sensed in the example described, selector 3 was energized. No pulse succeeded in passing through selector 3 up to this time, since the only pulse previously has been an equal signal. After storing the record from tape in tape drive T1 following the equal signal, this record, being in proper sequence, will in all probability be a high record. Therefore, the decision of the control panel will be that the input record from tape in tape drive T1 is high. This signal is wired to the common point of selector 3, and through its transfer points marked T in Fig. 11 it may be wired to select tape drive T4. Thus when this record is transcribed on an output tape, it will select tape drive T4 as the second equal record.

The given example is that of an operation wherein one file of records, a master file associated with tape drive T1, may be a multiplicity of equal records to be selected, while in tape drive T2 there is no possibility of having multiple equals. Thus, since tape drive T1 feeds continuously when an equal condition is sensed, all equals from tape in tape drive T1 will be selected for output to tape in tape drive T4, whereas memory of only one equal record in tape drive T2 must be maintained, since there is no possibility of multiple equal signals in a file so constituted.

Selector 3 is signalled to drop out to its normal condition through the delay off hubs associated with it at the same time that the selected signal is routed therethrough. Thus for any equal impulse or series of consecutive equal impulses, only one selected impulse will be transferred through the normally open points of this particular selector. If a decision to the effect that data from tape in tape drive T1 is arrived at without the detection of a previous equal condition, the selector will be in its normal position so that all high T1 signals will go through its normally closed points from beginning to end and cause tape drive T3 to be selected. On completion of an operation such as the foregoing, tape drive T3 will contain all records from both input files except those that are equal.

Figure 12:
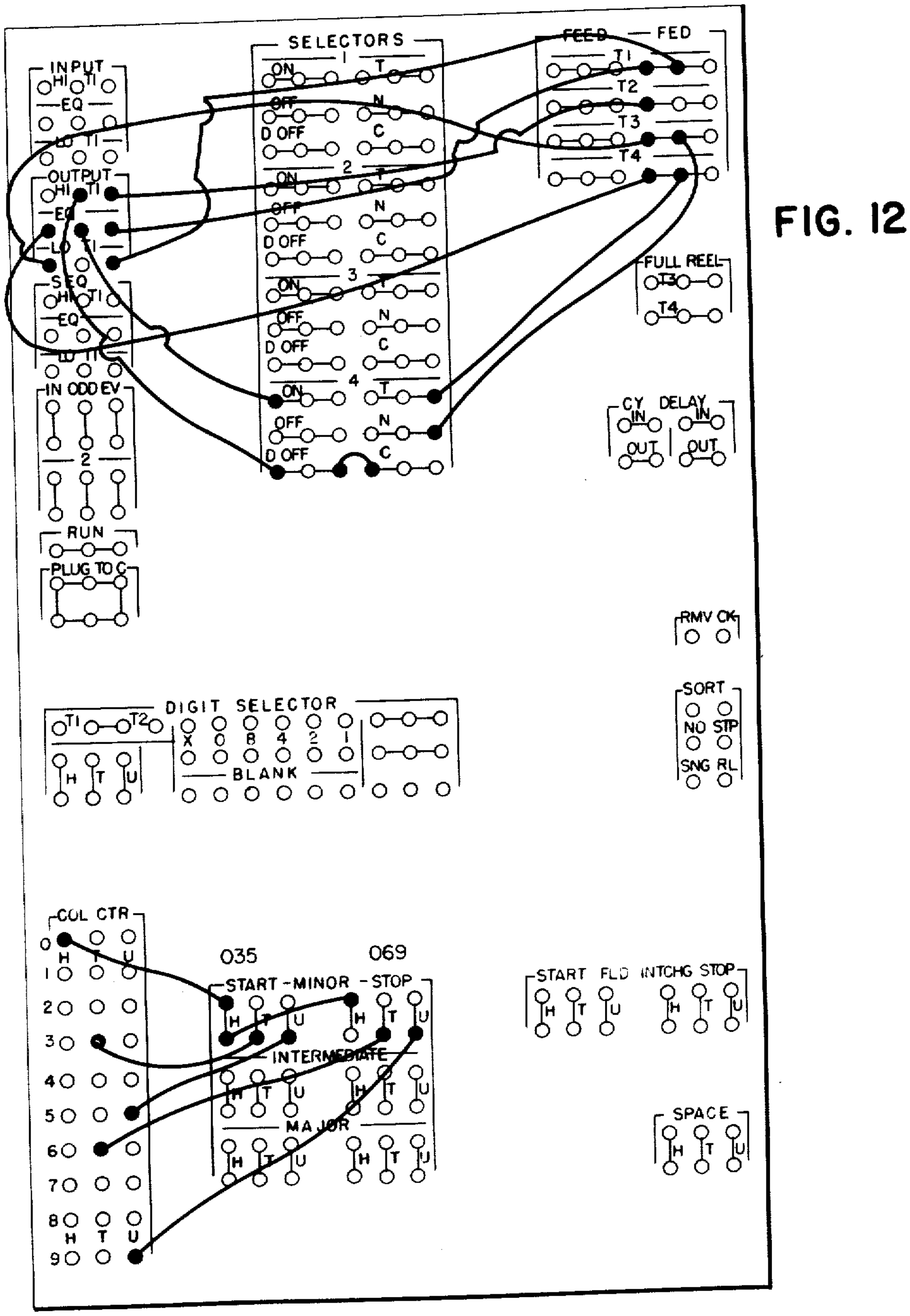

The output comparison hubs produce an interpreted output from the output/remainder comparison circuits, and since it should produce the same results as the input comparison, but on the following cycle, it is generally used to check decisions made from the input comparison. A typical example of control panel wiring involving the output comparison hubs is shown at the top of Fig. 12. Upon study of Fig. 12 it will be seen that the control panel wiring for the two operations, i.e. input comparison and output comparison, is identical except that different selectors are used and the fed hubs are impulsed instead of the feed hubs. This is generally true. If an operation is to be checked, the wiring that is required to execute the operation will be duplicated, using the output hubs and different selectors to feed the fed hubs. Internally the machine will collate the signals fed into the feed and into the fed hubs, and on the basis of their relationship it will decide whether the machine operated correctly or not.

Figure 13:
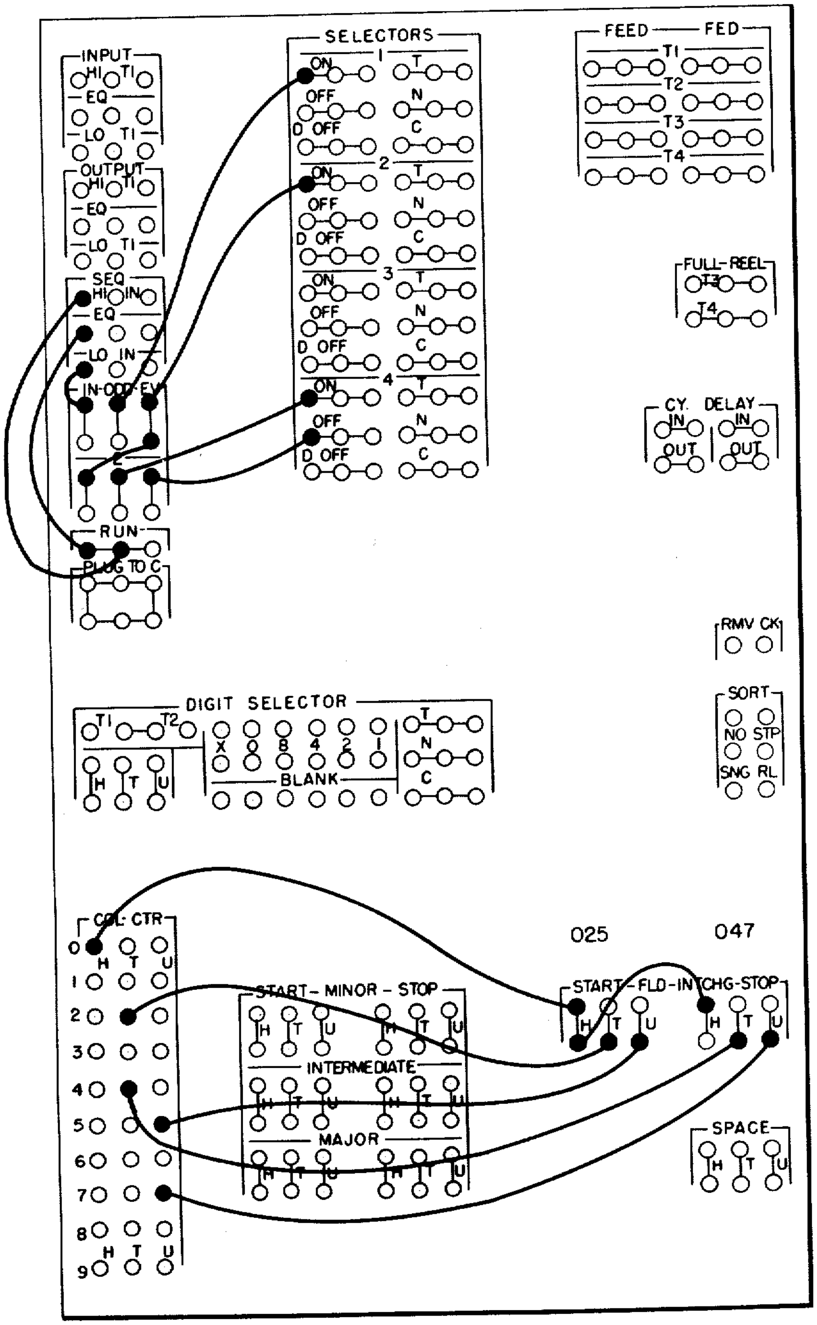

The sequence comparison hubs are provided primarily for sequence checking and for sorting. They are not related to an input feed but give only a comparison in regard to the particular feed running in any given feed cycle. The control panel wiring shown at the top of Fig. 13 is an example of the wiring required for a sequence checking operation. In general, this operation is performed in conjunction with a separate operation. As shown in Fig. 13, the high and equal sequence exit hubs are wired on the control panel. As the records in a file are passed through the system (for anything except a sorting operation) these records should generally be in an ascending order. In case a signal is emitted from the low sequence exit hub, no signal will be available at the high or equal exit hub, and as a consequence no signal will reach the run hubs. Lack of a signal at the run hubs will cause the machine to stop and to indicate a sequence error. In a sorting operation the low sequence exit hub is wired to the input hub of the odd-even unit No. 1. The odd and even exits of this unit are normally wired to control two different selectors as well as to the input hubs of the second odd-even unit. The exits of the second odd-even unit control a selector. The selectors in turn control the selection of input and output tape drives.

*Tape drives.*—It may be noted on the control panel that two sets of control hubs are brought out for each tape drive. The feed hubs (upper right of the control panel) accept signals from the comparison circuits to operate the associated tape drive on the following cycle. One, and only one, input unit must receive an impulse to start a feed cycle. None or one, or more, output units may receive feed pulses at the same time. Thus the outgoing record may be eliminated if none of the feed hubs are wired, thereby deleting a record. The outgoing record may be sent to one output unit or to several or all of the output tape units simultaneously. In the latter case multiple copies of the same record may be produced. Unless the removed check hubs (right center of control panel) are plugged, any fed hubs must receive an impulse at the end of a feed cycle during which its associated tape drive operated, or the machine will stop and indicate an error. These hubs permit the checking of all comparison selections.

Both feed and fed hubs are receptive to signals only during the latter part of the time the comparison hubs are energized. Thus selectors which are plugged to switch comparison outlets may be energized by signals from those same comparison outlets and before any signal is accepted to operate the tape feeds.

Figure 14:
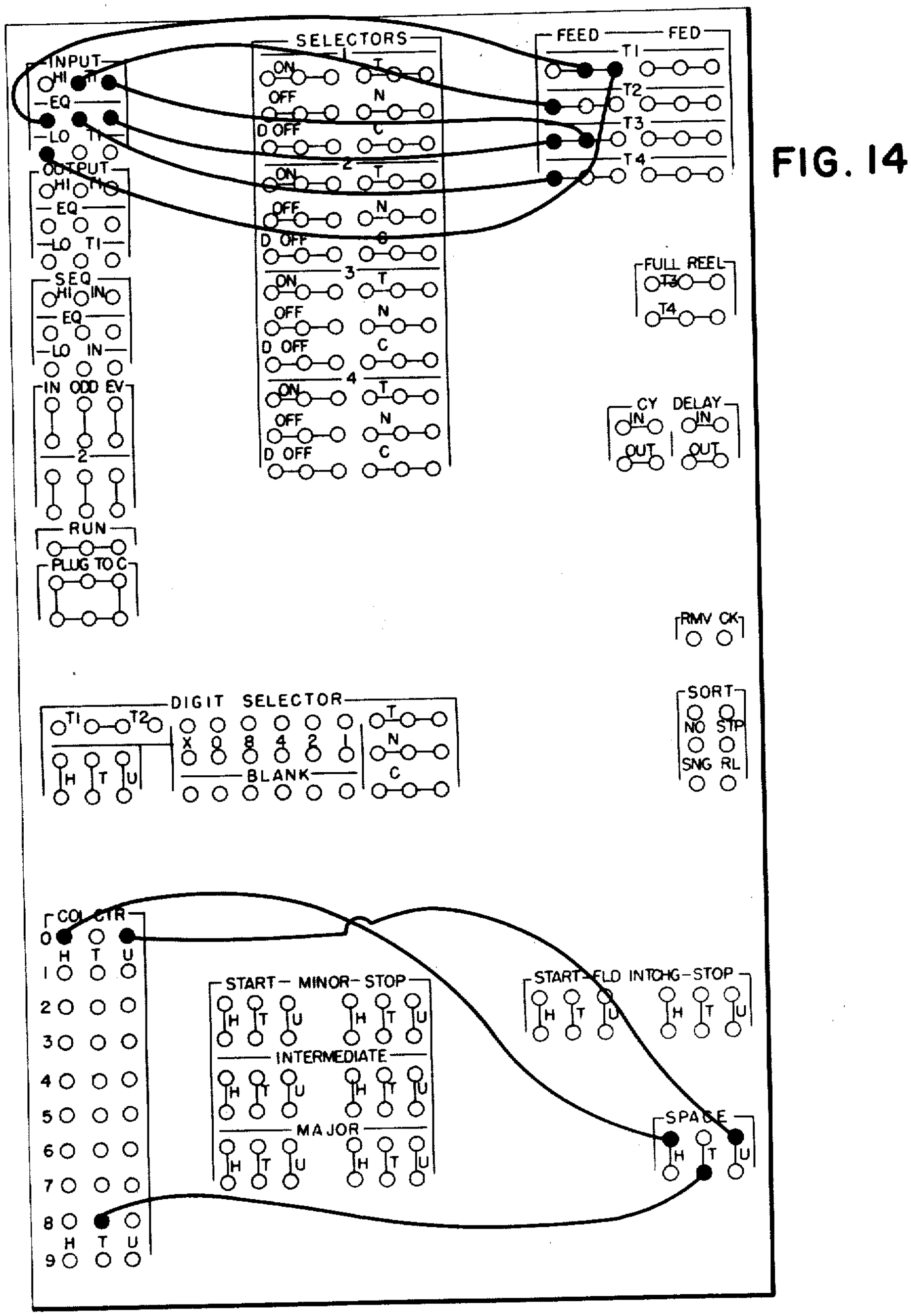

Fig. 14 shows control panel wiring in the top portion thereof which indicates the feasibility of selecting output drives in any combination desired. Thus in the case of wiring such as in Fig. 14, if the records being compared are equal, the same record will be written out on tapes in both tape drives T3 and T4. If the record from tape in tape drive T1 is indicated as high, that record would be written out on tape in tape drive T3, and if the comparison indicates the record tape from tape in tape drive T1 to be low, such record would not be written out at all. Thus in this particular example there are combined most of the features of the tape drives in the case of an address to either tape drive, or to both tape drives, or to none of the tape drives, thereby causing the deletion of information.

*Selectors.*—Figs. 11, 12 and 13 show typical ways in which selectors (upper center of the control panel) may be wired. Since these selectors are controllable elements, their particular wiring is entirely within the discretion of the operator.

The selectors are essentially transfer switches which may be turned on or off by a signal to the proper input hub. These selectors may be operated by signals from any of the comparison circuit output hubs or by a full reel output hub (upper right of control panel). The selectors are not designed to be operated from the field programming circuits which are to be described later. They are provided with instantaneous on and off inputs and with a delayed-off input hub. The instantaneous hubs will turn the selector on or off immediately and before the tape drive hubs become receptive. The delayed-off hubs operate to turn off the selector at the end of the next following feed cycle. Instantaneous operation on and off of the delayed-off hubs will cause a selector to pick up and remain up until the end of the next following feed cycle (simultaneous operation of the on and off hubs is not desirable, since it will cause an indeterminate result).

The output of the selectors may be used to control signals between comparison circuits, full reel indications, etc. to the various tape drive input hubs. They may also be used to control circuits from the column counter to the field interchanger (column counter, low left, and field interchanger, lower right of control panel).

*Full reel.*—The full reel hubs produce a signal (during comparison output time) when a given output tape drive first signals the machine that it is full and is unable to accept more deta. If during the latter portion of this comparison output time, or at any time thereafter, a signal is fed to the feed hubs for the given tape unit, the machine will stop. However, if the full reel signal is used to operate a selector which in turn directs the feed signals to a different output tape drive, the machine will not stop but will select the alternate tape output drive to receive the data after the first output reel is full.

Figure 15:
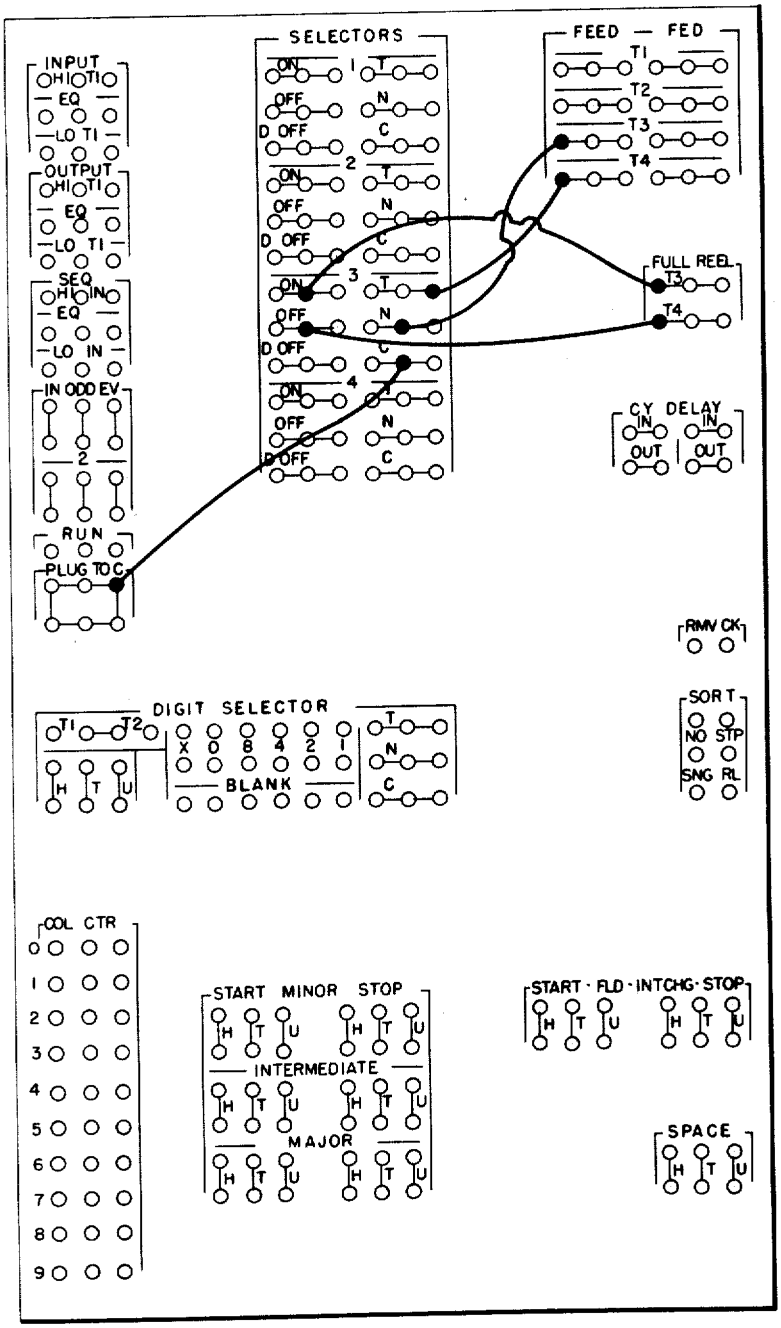

Fig. 15 is an example of typical wiring involving the full reel hubs. There may be, for example, two or more input reels, the data of which is being merged into a single output reel. Since there are two or more input reels, the output reel will be filled at least twice as often as the input reels are emptied, thus causing the machine to stop more often than necessary. In this type of operation it is possible to wire the full reel hubs as shown in Fig. 15.

If under control of the input comparators, T1 and T2 are selected in normal fashion, the records that are selected as the low records are written out on tape in tape drive T3 by the signal originating from the plug to C hubs to the common input of selector 3, to the normally closed point of selector 3 to effect the address of tape drive T3. When the tape in tape drive T3 is full, the full reel hub will emit a signal causing selector 3 to be turned on. Hereafter, the signals from the plug to C hubs will enter the common end and will be emitted from the transfer points of selector 3 to cause address of tape drive T4. Thus the machine will not stop when the tape in tape drive T3 is full, but will continue running, transcribing records on the tape in tape drive T4 while the reel of tape in tape drive T3 is both being rewound and eventually removed from the system. Thus optimum use is made of machine time.

The run hubs (left center of control panel) are provided as a fail-safe sequence checking outlet in preference to a set of stop hubs. If sequence checking is not used, it is necessary to plug the run hubs to the plug to C hubs in order to make the machine operate. Normally when sequence checking is used, high and equal sequence hubs are plugged to the run hubs; thus, if the input becomes less than the output, a signal is not transmitted to the run hubs, and the machine will stop. A typical wiring for this situation on the control panel is shown in Fig. 13.

The plug to C hubs (left center of control panel) produces a pulse timed identically with the output of a comparison circuit and may, if desired, be used in a similar manner. A typical wiring for an application of this kind is shown in Fig. 15.

The removed check hubs (right center of control panel), if plugged, make the normal comparison checking circuits inoperative. They must be plugged if output comparison signals are not fed to the tape drive fed hubs. The wiring is shown in Fig. 11.

*Digit selector.*—The digit selector (right center and right bottom of control panel) is capable of sensing any one digit of a record. The H, T and U hubs are plugged to the column counter hubs, representing the desired column, and the selected hubs are plugged to the 0 or 1 position as dictated by the code representing the desired character. One or the other (or both) of the T1 or T2 hubs must be plugged to tell the digit selector which input tape it is to observe for the desired digit. When the desired digit is detected coming from the designated input tape, the selector hubs will transfer at the end of the feed cycle in progress and remain transferred until the end of the next feed cycle in which the indicated input tape unit feeds and the desired character is not found. (During continual feeding of one input tape, it will thus operate for one cycle following the sensing of the desired character.)

Typical writing for the digit selector is shown in Fig. 11. In most digit selection operations the job will require that the specific digit in a specific column in possibly one file of records is to be looked for and used for some control purpose. In the example wired in Fig. 11 the system is conditioned to scan for the numeric 0 in column 14 of a record on tape in tape drive T1 only. This is, of course, only a single example. In practice, any character that may be written on tape may be set up in a digit selector and may be looked for in any column of any record up to the maximum capacity of the system's memory.

Moreover, search for a particular digit need not be limited to one input tape. It may be wired from either T1 or T2 or from both. When a designated digit (dictated by the control panel wiring) is found to exist in a record, the selector points associated with the digit selector will transfer. Thus, as shown in the example, if a plug to C hub is wired to the common point of the digit selector, an impulse on transfer of the point will be available from the transferred hubs only after a record containing the control digit is detected. If the control digit is not present in a record being scanned, the digit selector points will remain in their normal position, and the signal will be emitted from the normal hubs which are not wired in the example shown in Fig. 11.

*Field programming.*—The field programming circuits are used during sorting and collating to determine which field or fields are to control the sorting or collating operation. Provisions are included for comparing three different fields of any length. The fields may be chosen from any position on the record, but they must be the same fields in all records being subjected to comparison.

Because of the size of the records which may be ultimately handled in the system and the nature of the internal circuits, there is used herein a multiple hub representation of the columnar positions in the record as shown in the representation of the column counter (lower left corner of control panel).

To pick out any given columnar position in a record, it is necessary to plug all three columns, units, tens and hundreds. The three field inputs therefor must have three input positions, one for each of the three columns. The inputs are also made double in order to duplicate the column counter outputs as required.

To set up a field for sorting, the start hubs are plugged to the position of the column counter where the desired field begins and the stop hubs are plugged to the position of the column counter representative of the end of the field. The sorting comparison will be made throughout the field so indicated (this may include more than one field on a record if so desired), except that intervening field marks must be of the same sign or their sort taken into account. To sort on the field beginning with column 27, for example, and ending with column 32, for example, three start hubs must be plugged to positions 0—2—7 of the column counter, and the stop hubs must be plugged to positions 0—3—2 of the column counter (actually the 0 plugging is from the dual connection in the start hubs). The three fields are internally arranged so that the usual sequence order will be assigned regardless of the order in which the three fields appear in the record.

At the bottom of Fig. 12 is shown some typical wiring for minor field programming. In the example of Fig. 12, the control field will be recognized when the column counter emits the number 0—3—5, which is wired to the minor field start hubs. The end of the program field will be recognized when the column counter emits signals indicative of column 0—6—9, i.e. when the hubs 0—6—9 of the column counter emit impulses. Thus the length of the field is defined as that embraced between column 35 and column 69. The wiring for intermediate and major field programming is identical in every respect, except that the operator may define the start and stop positions of these two fields to be in different columns from those noted in the example.

*Field interchanger.*—The field interchanger is an independent control designed to permit its operation during the writing of a record. It permits a portion of a supplemental record to be fed out and written on tape in place of an equivalent portion of a master record. A field interchanger operation may be used in manner analogous to a gang-punching operation in punched card technique to continually insert a portion of a record from memory M2 into all records read out of a tape in tape drive T1, for example.

The field interchanger may also be placed under control of one or more selectors to permit insertion of a selected field under various comparison control conditions. For example, it may be used to replace a given portion of those records in the master file which are matched with records in the detail file but to have no effect on master records which have no matching detail records, etc.

Fig. 13 is a typical example of wiring required for one selected field interchange where the field to be interchanged is defined as beginning at the 25th column of the record and ending at the 47th column of the record.

The sort hubs (right center of control panel) are the main sorting controls which, when plugged, set up the additional internal circuits which are required to carry out the complete sorting functions. These circuits provide for the special operation of switches S1, S8, S9 and S10 (Fig. 2), as described, the interchange of input and output tape units, and the continuous operation of the machine until the correct sequence of records has been achieved (the general sorting instructions are set up by control panel wiring).

The single reel hubs (SNG–RL, right center of control panel) provide for the entry of a file or a portion thereof contained on a single reel. Circuitwise this control locks switches S4 and S5 in their S4*a* and S5*a* positions (Fig. 2) during the first pass, permitting the operation of these switches and the comparison circuits as if data were flowing from both tapes. This in effect eliminates one tape pass which would otherwise be required if the input data were merely divided between the two output tapes. (During non-sorting operation, this control may be used to permit the use of a single reel entry, as in straight reproduction, its only function being to prevent the machine from trying to feed an initial record from tape in tape drive T2 and thus indicating an error which would cause the machine to stop.)

The no-stop hubs (NO–STP, right center of control panel) are used when there is no need for preservation of the data on an original input reel. On single reel operation it provides for completely automatic operation from the time the start key is first depressed until the sorting operation is completed. On multiple reel entry, the operation becomes automatic as soon as the run-out key is operated.

*Odd-event circuits.*—By the addition of two odd-even circuits, it is possible to use the selectors and comparison outlets on the control panel to effect sorting. A typical wiring employing the odd-even steps appears at the top of Fig. 13. The internal circuits are so arranged that the first input to an odd-even circuit is emitted from the odd hubs, the next input signal will be emitted from the even hubs, the next (third) input signal will be emitted from the odd hubs, etc.

In sorting, the first odd-even circuit is used to control the input tapes, and its even-ordered output is fed to the second odd-even circuit which is used to control the output tapes. This sequence must be followed since internal circuits are provided to control unusual conditions which may occur when one input tape is exhausted. As soon as this happens, the first odd-even circuit is held in the even position so that all further inputs directly operate the second odd-even circuit.

In addition, if the machine should be in the middle of a step-down operation when one of the input reels is exhausted of valuable information, a signal must be produced at the even-ordered output hubs to turn off the selectors and reverse the output tapes, since the next record must be fed from the other tape, and thus a new sequence will be started.

The cycle delay hubs (CY-Delay, upper right of control panel) delay a pulse fed to the input hubs until the following comparison cycle, during which the pulse appears at the output hubs.

*Spacing.*—The space hubs (lower right of control panel) are provided to produce spaced data records on an output tape equivalent in length to that acceptable for punching into standard record cards. The record on tape may be of any given length, but if such record is to be prepared for punching into record cards, it must be broken down into lengths which correspond in columns to the number of available card columns. Thus the wiring at the bottom of Fig. 14 is typical for the use of the space hubs. With the wiring shown, a record of 160 columns or less, for example, may be split into two sections when recorded on tape. This makes it possible for the tape recorded information to be processed and reproduced in tape-to-card converters or in a printer.

Fig. 16 is a timing chart indicating the machine system of operation. In can be seen from Fig. 16 that the normal machine operation is to start a write or output tape drive, to allow it sufficient time to get up to speed, and then to write a record during the time indicated as the run time, at the end of which time the tape drive will be stopped. When the stop pulse is received by the input unit, the same impulse is used to start the previously selected output tape unit or units.

Eventually the input unit will sense a record, store it in memory, perform its normal comparisons, and at the end of the record reading operation will allow a small amount of control time, at the end of which the input tape drive is stopped and a new selection is made, and an output tape unit is set into operation. During the control time, the machine will scan the error circuits to check that no errors have occurred in the previous machine cycle. If an error is detected, the machine will stop at this time. If no error is detected, the machine will continue through a new operation.

Fig. 17 is a timing chart which shows some of the details of the comparison and selector timing operations on an expanded scale. A study of Fig. 17 indicates that the input feeds will not accept signals from any source until late in the control portion of the cycle. This delay is provided to allow various selectors that may have been picked up or dropped out to stabilize, as well as to allow time for a final check of the error circuits to determine that no errors have occurred. The details of the selector pick-up and drop-out timing are also shown in Fig. 17.

The most obvious machine functions, which have been cited by way of example only, may be enumerated as follows:

(1) The system will check the sequence of a pair of input files as indicated in Fig. 13.

(2) The system will insert records behind special control groups.

(3) The system will merge data recorded on separate input files.

(4) The system will perform a merging operation in conjunction with a selecting operation. The types of selection that may be performed have wide limits and are largely at the discretion of the operator. Figs. 11 and 14 show two different types of merging with selection.

(5) The system will perform matching operations which are analogous to the selection operations. A matching operation is indicated in Fig. 11.

(6) The system may identify records by some identifying characters within a record.

(7) The system may make digital selections, of which a typical example is wired in Fig. 11.

(8) The system is capable of selecting records with particular control characters.

(9) The system is capable of selecting zero balance records.

(10) The system is capable of selecting all records between two specified numbers by repeated passes of tape.

(11) The system is capable of not only checking sequences but selecting those records that are out of sequence.

(12) The system is capable of doing any of the above mentioned operations on either alphabetic, numeric or special character fields, and the control field may consist of any combination of numeric, alphabetic or special characters.

(13) The system is capable of reproducing the input file on a plurality of output tapes.

(14) The system is capable of performing an operation analogous to gang-punching in punched record card techniques. By this means new information may be substituted for old information in a given field of either specified or a general class of records. An example of wiring to accomplish this function is found in Fig. 13.

(15) The system is capable of sorting a large file of records into sequence on any control field or control fields specified by the operator.

TAPE DRIVE MECHANISM AND CIRCUITS

Each tape unit includes a tape feeding mechanism capable of feeding magnetic tape through a reading and recording head at speeds up to 200 feet per second, with an acceleration and deceleration time of not more than five milliseconds, and with the ability to reverse direction of tape feed in ten milliseconds or less.

Such a mechanism is disclosed in United States Patent No. 2,792,217, issued to James A. Weidenhammer et al. on May 14, 1957 for Tape Feed Mechanism and includes a tape feeding mechanism having a pair of tape reels which may be independently rotated for either reeling or unreeling tape thereon. It is contemplated that each tape reel be power driven through a clutch mechanism which is adapted to selectively drive the reel in either direction.

The clutch mechanisms of said application are controlled in accordance with positions assumed by a loop in the tape, and the control system is so designed as to maintain these loops substantially constant in length. These loops provide a tape source upon which a tape feeding mechanism may call as a source of tape to be fed through a record reading or recording head in either direction.

The mechanism for feeding the tape through the record reading and recording head is also power driven, but is independent of the power drive for the tape reels. The tape may be reeled or unreeled and fed through a record reading or reproducing head at high speed and without substantial torque or tension on the tape.

A general understanding of the tape drive and its function may be attained by reference to Figs. 18 and 19 of the drawings. In these figures a pair of tape reels are shown, which are adapted to hold a coil of record tape, these reels being intermittently driven and controlled in such manner so as to provide a pair of tape loops as a source of tape to be fed through the tape sensing head. A tape reel 10 (Fig. 18), which may be designated as a file reel, is mounted on a drive spindle 12. As shown, the reel 10 contains a coil of tape 14 on which data has been recorded. The tape is to be fed from this reel to form a U-shaped loop, as shown in Fig. 18, and thence through a tape reading and recording head 16. In its forward feed direction, the tape will pass through the tape reading head 16 from left to right and after forming another U-shaped loop it will be coiled on a second reel 18, which may be designated herein as a machine reel. The machine reel 18 is mounted on a drive spindle 20.

The file reel drive spindle 12 and the machine reel drive spindle 20 are selectively rotated in either direction by a pair of motors 22 and 23. The motors 22 and 23 normally impart constant drive to a pair of electromagnetic clutch mechanisms mounted respectively on the drive spindles 12 and 20. An electromagnetic brake is mounted on each of the drive spindles so that the spindles 12 and 20 may be locked against rotation. The nature of the electromagnetic clutches and the electromagnetic brake will be developed in greater detail later.

Upon selective clutching of the electromagnetic clutch mechanisms in drive relation to the drive spindles 12 and 20, these spindles and, consequently, the tape reels attached thereto may be caused to reel or unreel tape from the respective coils thereon.

Since the mechanism is designated for high speed feed of tape through the tape head 16, it is important that a supply of tape be provided with little load or tension thereon, and to this end the driving mechanism for the reels 10 and 18 provides a pair of tape loops disposed in a pair of tape control columns 24 and 26. Each of the columns 24 and 26 is provided with means responsive to the position of the respective tape loops for maintaining those loops in proper position within the columns. The loop sensitive means within the columns 24 and 26 control the reel drive mechanism in such manner that the loops, so to speak, are self-compensating. The tape reel drive mechanism for each reel is not only independently operative, as will be seen by the description below, but also both reels are driven independently of the tape drive mechanism for feeding the tape through the tape head 16.

Tape, from the loop supply in columns 24 and 26, is driven through the tape head 16 by means of a pair of rotatable drive capstans. In Fig. 18 a tape drive capstan 28 may be deemed to be constantly rotated in a clockwise direction so that the tape is fed from right to left through the tape head. This may be designated as the reverse drive, and capstan 28 as the reverse drive capstan. Another rotating capstan 30 may be deemed to be constantly driven in a counterclockwise direction so that the tape is fed from left to right through the head, and this may be designated as the forward drive and capstan 30 as the forward drive capstan.

In connection with the drive capstans 28 and 30, there are provided idler pulleys 32 and 34, respectively. The pulley 32 moves a tape, trained thereabout as shown in Fig. 18, into driving contact with the reverse drive capstan 28, while the pulley 34 moves the tape into driving contact with the forward drive capstan 30. As will be pointed out more fully later, these idler pulleys 32 and 34 are mounted on a common linkage system which imparts the proper related movement to the pulleys for selectively driving a tape either forward or in reverse through the tape head 16.

A non-rotary stop capstan 36 is associated with idler pulley 32, so that this pulley may be moved into contact with its stop capstan to hold the tape stationary and, in like manner, idler pulley 34 has associated therewith its stop capstan 38.

The operation of the mechanism for driving the tape reels 10 and 18 may now be described in connection with Figs. 20, 21 and 22. The file reel drive spindle 12 and the machine reel drive spindle 20 are mounted for rotation in a frame member 40 (Fig. 21). The spindle 12 has mounted thereon a file reel brake 42 (Fig. 21), an electromagnetic unreeling clutch 44 and an electromagnetic reeling clutch 46.

The machine reel spindle 20 has mounted thereon an electromagnetic machine reel brake 48, an electromagnetic reeling clutch 50 and an electromagnetic unreeling clutch 52.

The drive rings of the clutch elements 44, 46, 50 and 52 are continuously rotated under the influence of the drive motors 22 and 23 (Fig. 20). By reference to this figure it will be seen that the drive motors 23 and 22 are mounted on supporting structures 54 and 56, respectively, in such position that the motor shafts 58 and 60 respectively extend forwardly into substantially vertical alignment (Fig. 21) with their related magnetic clutch structures.

By reference to Fig. 21 of the drawings, it will be seen that the first pair of clutches 44 and 50 are in substantial, transverse alignment on their respective shafts and that the second pair of clutches 46 and 52 are also substantially aligned. The clutches 44 and 50 are driven clockwise by the motor 22 through a drive belt 22*a*, while the clutches 46 and 52 are driven counterclockwise by the motor 23 through a drive belt 23*a*, the motor shaft 58 having a normal counterclockwise rotation and the motor shaft 60 having a normal clockwise rotation.

By reference to Fig. 18, it may be seen that the file reel 10 will reel tape thereon when driven counterclockwise, while the machine reel 18 will reel tape thereon when driven clockwise. In light of this arrangement, the clutch 46 (Fig. 21) operates as a reeling clutch for the file reel 10, while the clutch 52 operates as an unreeling clutch for the machine reel 18. By the same token, the clutch 44 operates as an unreeling clutch for the file reel 10, while the clutch 50 operates as a reeling clutch for the machine reel 18.

The file reel brake 42 and the machine reel brake 48 have their respective outer shells fixed to the frame member 40 by means of machine screws 62, thereby providing an anchor for these shells, when either brake is energized to lock its respective shaft against rotation.

Fig. 22 of the drawings illustrates the specific nature of the brake and clutch units. These units are identical and a description of one will, therefore, suffice as a description of all. The driving member 64 is mounted for free rotation on the shaft 20. The driving member includes an end plate 66 in which is mounted a pair of commutator rings 68 which provide a current path for an electromagnetic coil 50*a*, mounted within an annular recess in the driven member 64 and held therein by an annular plate 72. The opposite face of the driving member has fixed thereto a closure plate 74. Suitable hub rings 76 support the driving member for rotation on the shaft 20.

A driven member 78 mounted within the driving member 64 is spaced from and disposed between the annular plate 72 of the driving member and its closure plate 74. This driven member 78 is keyed to the shaft 20 by means of a suitable keying structure 80.

It will now be apparent that the shaft 20 will be driven when the driving member 64 and the driven member 78 are caused to rotate in unison. The drive coupling between the two members is achieved through the use of iron powder 82 disposed between the members. The circumference of the annular plate 72 is such that its periphery is spaced from the inner wall of the recess formed in the driving member 64. This forms an annular channel adapted to receive an inturned flange 84 of the driven member 78. The inturned flange 84 is so positioned as to provide a substantially equal space on opposite faces thereof with reference to the oppositely disposed walls of the annular channel. The iron powder 82 is in an amount to substantially fill the remaining space of the channel. A current is applied to the coil 50*a* so as to "freeze" the iron powder and thereby clutch the inturned flange 84 of the driven member 78 to the driving member 64 whenever the coil is energized to thus magnetize the powder.

Centrifugal force, acting on the iron powder, ordinarily maintains the powder adjacent the inside of the inturned end 84 of the driven member 78 but, to avoid the possibility of leakage of the powder into the bearing structure of that assembly, the annular plate 72 is provided with an annular rib 86 which extends into an annular groove 88 on the inner face of the driven member 78. The annular rib 86 is outwardly slanted to provide a trough for powder that may find its way inwardly along the clutch structure. A similar rib and trough 88—90 is formed on the outer face of the driven member 78 for preventing passage of powder inwardly along the outer face of the driven member. Any residual particles of powder will be caught in a groove 92 formed in the inner face of the driven member near the axial portion thereof.

The commutator rings 68 are in contact with a brush 94 carried on the end of a resilient contact strip 96 which is connected into the control circuit by means of terminal screws 98 (Fig. 21).

The clutches at the rear end of the spindles 12 and 20 are of the same construction as just described and their mounting on their respective shafts is the same except that they are reversed so that the end plate 66 is oppositely disposed to place the commutator rings in a more accessible position.

The brake assemblies 42 and 48 are also constructed exactly like the clutch assembly, just described, and the manner of mounting these on their respective shafts is also the same with the exception that the end plate 66, which rotates in the clutch assemblies, is held stationary in the brake assemblies.

It will now be clear that the energization of the coils in the several clutch assemblies will result in the corresponding forward or reverse drive of the respective spindles 12 and 20. By the same token, these spindles will be held against rotation whenever the coil in the brake assembly associated therewith is energized. Since the plates 66 of the brakes 42 and 48 are fixed, the leads for energizing the electromagnetic coils therein may be taken through the end wall of the brake assemblies. As will be seen later, the control circuit is such that drive, through either of the clutches on a drive spindle, will take place only upon deenergization of the associated brake assembly coil, and that ordinarily the coil in the brake assembly will be energized to hold its associated spindle against rotation.

As stated above, the position of the tape loops in control columns 24 and 26 is utilized to control the rotary movement of the tape reels. For this purpose, there is illustrated a vacuum switch control system. The control columns 24 and 26 are of the same construction, and their detailed construction is seen in Figs. 23 and 24 which illustrate that control column indicated as 26 in Fig. 18. Column 24 of Fig. 18 is identical in construction. The column 26 (Fig. 24) comprises a pair of side walls 100 (Figs. 23 and 24), a back panel 102, a transparent face panel 104 and a bottom wall 106, all hermetically sealed together.

At the base of the two columns 24 and 26 is a header 108 (Fig. 18) with which the columns communicate. The header 108 is connected with a vacuum pump 110*b* adapted to be driven by a suitable motor VPM so that the control columns 24 and 26 may be evacuated, provided the columns are closed against the atmosphere by the position of the tape loop, as described below.

At the upper end of each control column is a guide plate 112*a* (Fig. 24) whose arcuate lower face is slightly spaced from a corresponding arcuate upper edge of the transparent face panel 104. The lateral extremities of plate 112*a*, as shown in Fig. 24, serve to support the opposite bights of a tape loop within the control column, while the arcuate slot formed between the lower arcuate face of the guide plate and the upper edge of the face panel constitutes a guide through which a tape loop may be threaded for insertion into a control column. The face plate 104 has formed, at the bottom thereof, a hand opening 114*a* (Fig. 24) normally closed by an air-tight closure 116*a*, held in position by a spring clip 118*a*. This hand opening constitutes a clean-out passage.

The width of the side walls 100 within the vacuum columns 24 and 26 is substantially equal to the width of the tape 14 (Fig. 18). When a tape loop is formed, therefore, in either of the vacuum columns 24 or 26, the oppositely disposed marginal edges of the loop will, respectively, be in substantial contact with the base plate 102 and the face plate 104 of the respective vacuum columns. The back of the tape in the tape loop is spaced from the side walls of the vacuum columns throughout substantially the entire length of the loop, but, as described presently, the closed end of the U-shaped loops are in substantial contact with the side walls. The structure of the tape guide 112*a* ensures this disposition of the tape, as will be apparent from the description which follows.

As the tape comes from the file reel 10, it passes over a guide idler 10*a* (Fig. 18). As the tape is fed to and from the machine reel 18, it passes over a guide idler 18*a*. The horizontal distance between the outer periphery of the guide idler 10*a* and the drive capstan 28 is somewhat less than the spacing of the inner faces of the column side walls 100. The same is true of the horizontal spacing of the guide idler 18*a* and the drive capstan 30 at the right of the structure.

The particular horizontal spacing of the guide idlers and their associated drive capstans assures that the inner face of the tape is in contact with the oppositely disposed ends of the guide plate 112*a* located at the top of the vacuum columns 24 and 26. These guide plates, therefore, determine the spacing of the tape bights at the entrance to the columns. Since the distance between the ends of the guide plate 112*a* is somewhat less than the internal width of the vacuum columns, the back of the tape will be spaced slightly from the column side walls through the major portion of the tape loops, the loops, however, widening out at the closed or lower end of the U-shaped loops to thus contact the side walls of the columns, thereby forming an air seal between the lower portion of the tape loop and the column walls.

Spaced along the length of each of the control columns 24 and 26 are two vacuum operated switches LUV and LLV, for example, the details of which are shown in Figs. 25 and 26. In Fig. 18 the vacuum switch LUV is the left upper vacuum switch, while the switch LLV is the left lower vacuum switch in column 24. In similar fashion the control column 26 has a right upper vacuum switch RUV and a right lower vacuum switch RLV.

The vacuum switches have a normally closed contact point and a normally open contact point. The switches communicate with the interior of their respective control columns through an aperture in the back plate 102 thereof. By reference to Fig. 26, it is seen that the switch structure is encased in a shell 120*a* which fits tightly against a base plate 122*b*, the base plate being attached to the back panel 102 (Fig. 23) of the control column so that an aperture 124*a* of the back panel (Fig. 24) registers with a passage 126*a* (Fig. 26) in the base 122*b* of the switch structure. Within a cavity formed between this base plate 122*b* and an overlying block 128*b* is a pressure responsive diaphragm 130*b* to which a contact operating shaft 132*a* is attached, this connection between the diaphragm and the shaft 132*a* being air-tight. Adjustably secured to the opposite end of the contact operating shaft 132*a* is a spring contact finger 134*a* having contact points thereon adapted to contact corresponding points, on fixed contact fingers 136*b* and 140*a*. Downward deflection of the diaphragm 130*b* (Fig. 26), under the influence of atmospheric pressure when its associated control column is evacuated will cause the points on the contact fingers 134*a* and 140*a* to engage.

For the sake of uniformity herein, it may be assumed that the contact carried on the finger 136*b* is a normally closed contact while the contact on the finger 140*a* is a normally open contact. Furthermore, the contact on the arm 136*b* in Fig. 26 may be designated as the RUV–1 contact, whereas the contact on the arm 140*a* may be designated as the RUV–2 contact. A similar system of numbering will be applied to the other vacuum switches.

Under the foregoing conditions, any time that the diaphragm 130*b* is subjected (on its under side in Fig. 26) to vacuum within the vacuum columns, atmospheric pressure on the opposite side of the diaphragm will cause transfer of the switch points, i.e. the points RUV–1 of Fig. 26, for example, will open, while the points RUV–2 will close.

Electrical connections with the switch blades are made by wires (not shown) leading through a bushing 138*b* at one end of the base plate 122*b*.

During normal operation of the machine, the tape loops in columns 24 and 26 will be disposed between the vacuum switches RUV and RLV in the right hand column (Fig. 18) and between the switches LUV and LLV of the left hand column. Under this condition, the switches LUV and RUV are subject to atmospheric pressure only, whereas switches LLV and RLV are influenced by the vacuum in the columns 24 and 26, the lower or closed end of the U-shaped tape loops touching the side walls, as described above, and thus constituting a column air seal above the switches LLV and RLV.

The device is so designed that the closed end of the U-shaped tape loops in the control columns 24 and 26 are maintained between the respective upper and lower vacuum switches. To this end the vacuum switch LUV is in the control circuit of the magnetic coil in the unreeling clutch 44 of reel 10 so that, as viewed in Fig. 18, when LUV is subjected to vacuum tape will be fed from reel 10 to the vacuum column 24, while the vacuum switch LLV is in the control circuit for the magnetic coil of the reeling clutch 46 of reel 10, so that when LLV is subjected to atmosphere, as described below, tape will be reeled out of vacuum column 24. In like manner the vacuum switch RUV is in the control circuit of the unreeling clutch 52 of reel 18, while the vacuum switch RLV is in the control circuit for its reeling clutch 50.

Should either tape loop drop below its lower vacuum switch, such switch will be subject to atmospheric pressure on both sides of its diaphragm 130*b* (Fig. 26) causing the contact points thereof to transfer. Consequently, under such conditions the switch LLV will call into action the reeling clutch 46 of the file reel 10, while the switch RLV will call into operation the reeling clutch 50 of the machine reel 18.

Such tape loops will be taken up by the reeling action of the respective reels, or either thereof, until the closed end of the U-shaped loop is above the lower control column switch, whereupon the switch will again transfer its contact points under influence of vacuum within the column and the reeling action will close.

In like fashion, the upper vacuum switches LUV and RUV, which are subjected to atmospheric pressure on both sides, during the desired operation of the machine, will transfer their contact points, when the closed end of the U-shaped tape loop rises above these switches so that the upper switch is subjected to the vacuum within its respective control column. The low pressure on the bottom side of the diaphragm 130*b* (Fig. 26) will thereupon permit atmospheric pressure on the upper side to transfer the contact points of the upper switch structure. Upon such transfer the switch LUV will serve to energize the coil in the unreeling clutch 44, and the switch RUV will call into action the unreeling clutch 52, whereby the file reel 10 and machine reel 18, respectively, or either one of them, will be rotated to unreel tape therefrom and thereby lengthen the loop in the control columns 24 and 26, respectively, until the closed end of the U-shaped loop once more drops below the upper switches LUV and RUV.

From the foregoing it will be seen that the operation of the tape reels 10 and 18 is in effect a self-compensating operation whereby the tape loops in the control columns 24 and 26 are maintained in an optimum position. Furthermore, it is apparent that the controls for the reels 10 and 18 are independently actuated.

The second contact point of each vacuum switch is used to provide a circuit for their respective brake coils. When the control circuit is described below, it will become clear that a circuit is established through closed points of switches LUV and LLV to energize the coil of the file reel brake 42 and that a circuit is provided through closed points of switches RUV and RLV to energize the coil in the machine reel brake 48. It is intended that the brake coils be energized whenever the reeling and unreeling clutches are deenergized.

The mechanism for driving the tape through the tape head 16 (Fig. 18) in a forward direction is shown in Fig. 27 of the drawings, while Figs. 28 through 30 illustrate, diagrammatically only, the other drive and stop positions.

The drive capstan 30 (Figs. 18 and 27) is constantly driven in a counterclockwise direction by means of a motor **42*a* (Fig. 20) whose shaft 44*a* rotates in a counterclockwise direction. The drive capstan 28 (Figs. 18 and 27) is constantly driven in a clockwise direction by means of a motor 23 whose shaft 58 rotates in a counterclockwise direction. The drive capstans 28 and 30 are journalled for rotation in the face panel 13 (Fig. 18) of the machine, and their respective shafts 28*a* and 30*a* (Fig. 20) extend to the rear of the panel 13 where they have affixed thereto belt pulleys 46*a* and 48*a*, respectively. A drive belt 50*a* is trained about the pulley 48*a* and about a motor shaft pulley 52*b* of motor 42*a*, so that upon counterclockwise rotation of the motor shaft 44*a* the capstan shaft 30*a* will also be rotated in a counterclockwise direction. A drive belt 23*a* is trained about a pulley mounted on motor shaft 58 (Fig. 20), the pulley 46*a* and the drive pulleys of the clutches 46 and 52, so that upon counterclockwise rotation of the motor shaft 58 the capstan shaft 28*a* driven by pulley 48*a*** will be rotated in a clockwise direction, as shown in Fig. 20.

By reference to Fig. 27 of the drawings is will be seen that the tape idler pulleys 32 and 34 are mounted for rotation at the free end of levers **58*a* and 60*a*, respectively. The inner ends of the levers 58*a* and 60*a* are fixed to pivot shafts 62*a* and 64*a*, respectively, journalled for rocking movement in the face panel 13, and each of these shafts has attached thereto a short, upwardly extending link 66*a* and 68*a*, respectively. The upper ends of the links 66*a* and 68*a* have pivoted thereto levers 70*a* and 72*a*, respectively, which have their opposite ends pivoted to a common operating lever 74*a***.

With the foregoing structure the tape idler pulleys 32 and 34 may be selectively engaged with their related drive capstan or their stop capstan. Thus, the tape idler pulley 32 may be brought into contact with the reverse drive capstan 28 or with the forward stop capstan 36. The tape idler pulley 34 may be selectively engaged with the forward drive capstan 30 or with the reverse stop capstan 38. The stop capstans 36 and 38 are eccentrically mounted in the face panel 13 by means of screws **36*a* and 38*a*** (Fig. 27) about which the capstans may be adjusted to vary their braking effect.

In order to impart controlled movement to the tape idler pulleys 32 and 34, there has been provided herein a forward-reverse actuator **76*c*, comprising a pair of aligned, high speed relay magnets 76*a* and 76*b* (Fig. 27) and a stop or drive actuator 78*a* which consists of a coil 80*a* in a field of high flux density caused by a permanent magnet 82*a***.

The high speed relay coils **76*a* and 76*b* are mounted on a supporting yoke in axial relation to each other and with the provision of a space between the magnets to accommodate a pivoted armature 84*a* to the free end of which the operating lever 74*a* is attached by means of a pivot stud 86*a***.

The coil **80*a* of the stop-drive actuator has affixed thereto a rod 88*a* which is connected to the operating lever 74*a* midway between the connections of the levers 70*a* and 72*a***.

When the relay magnet **76*b* is energized, the armature 84*a* will be attracted thereto and the operating lever 74*a* will be biased to the right in Fig. 27. This elevates the tape idler 32 a half-gap width above the tape idler 34. When the stop-drive actuator 78*a* is energized to repel the coil 80*a* thereof, an upward thrust will be delivered to the rod 88*a*. This will further move the drive linkage to force the tape idler pulleys downwardly and outwardly until the tape idler pulley 34*a* is engaged with the forward drive capstan 30. This will cause the tape 14 to be driven downwardly into the control column 26 (Fig. 18) and will also pull the tape through the head 16** from left to right.

The foregoing describes one of four stable positions into which the tape idler pulleys may be biased. The three other positions are illustrated in Figs. 28, 29 and 30.

Fig. 28 shows the position of the tape idler pulleys for stopping tape feed, following forward feed of the tape. At this point it may be appropriate to mention that the tape is always pulled through the tape head 16 from one side thereof and is stopped by braking the tape at a position on the other side thereof. This will insure sufficient tape tension at the tape head 16 at all times.

Reverting to Fig. 28, it will be seen that the tape 14, after being driven forward, as described above, is stopped by engaging the tape between the forward stop capstan 36 and the tape idler pulley 32. To achieve this function, the magnet **76*b* must remain energized, but the flow of current through the stop drive actuator 78*a* is reversed whereby the coil 80*a* (Fig. 27) is attracted to the permanent magnet 82*a*. This results in a downward pull on the rod 88*a*. Such pull on the linkage system will tend to raise both tape idler pulleys 32 and 34, but since the tape idler pulley 32, in the forward drive position, was higher than the pulley 34, the idler pulley 32 engages the forward stop capstan 36 to brake tape movement. Engagement between the tape idler pulley 32 and its forward stop capstan 36 results from the upward bias given to the tape idler pulley 32 under the influence of the magnet 76*b***.

In Fig. 29, the tape 14 is shown as moving in a reverse direction from that in Fig. 27, as indicated by the arrow. To bias the tape idler pulley 32 into contact with the reverse drive capstan 28 to produce this movement, it is necessary to energize the magnet **76*a*. This attracts the armature 84*a* and pulls the operating lever 74*a* to the left. This will serve to drop the tape idler pulley 32 one-half gap below the idler pulley 34 and condition the tape idler pulley 32 for engagement with the reverse drive capstan 28 when the moving coil 80*a* is energized to cause an upward movement of the rod 88*a*. Such movement will serve to project the tape idler pulley 32 into engagement with the reverse drive capstan 28, whereby the tape 14 is driven in a reverse direction, i.e. from right to left through the head 16** in Fig. 18.

The reverse stop position of the tape drive mechanism is shown in Fig. 30, wherein the tape idler pulley 34 is brought into engagement with the reverse stop capstan 38. To achieve this engagement, the magnet **76*a* must remain energized but the current in the moving coil 80*a*** is reversed, whereby the coil is pulled downwardly so that the rod 88*a* exerts a downward pull on the operating lever 74*a* with a consequent upward movement of the tape moving idler pulley 34 into contact with the reverse stop capstan 38.

In Fig. 18 is shown a pair of tape contact arms 150 and 152. These arms are mounted for pivoting movement so that the ends thereof may ride freely in contact with the tape coils on the respective reels 10 and 18. Through this medium is provided a control mechanism to prevent the complete run-out of tape from reels. Figs. 31 through 33 illustrate the particular details of the tape arm mechanism. The tape contact arms 150 and 152 are secured to the front end of a pair of shafts 154 and 156, respectively, and mounted for rocking movement in a mounting block 158 which has a flange 158*a* (Fig. 32) by which the block may be mounted in the face panel 13 of the machine. Attached to the rear end of the shafts 154 and 156 (Fig. 33) are a pair of circuit making and breaking fingers 160 and 162, respectively. Mounted for free rotation on the shafts 154 and 156 are a pair of gears 164 and 166, respectively. Those gears have elongated hubs 168 (Fig. 32). Affixed to the elongated hub portion of the gears for rotation therewith are a pair of fingers 170 and 172. Each of the circuit making and breaking fingers 160 and 162 has an outwardly turned flange portion 174 and 176, respectively, which overlies the outer extremities of the fingers 170 and 172, respectively.

As a consequence of this relationship, whenever the fingers 170 and 172 are elevated, their extremities may engage their related flanges 174 and 176, respectively, and thereby elevate the circuit making and breaking fingers 160 and 162. This motion results in the rocking of shafts 154 and 156 with the result that the tape contact arms 150 and 152 (Fig. 31) are also elevated. The circuit making and breaking fingers 160 and 162 have at their extremities adjustable studs 178 and 180, respectively, which are adapted to contact and close a normally open file reel switch FRS (Fig. 31) and transfer the contacts of a reel switch MRS, respectively, when these fingers are in their lower position. Thereby, the reel switch FRS will be closed whenever the coil of tape on the file reel becomes dangerously depleted, while the machine reel switch MRS will be transferred whenever the coil of tape on the machine reel becomes dangerously depleted.

In order to manually raise and lower the tape sensing arms 150 and 152 and their related circuit making and breaking fingers 170 and 172, an operating shaft 182 is journalled for rocking motion in the block 158. An operating handle 184 (Fig. 32) is fixed to the forward end of the shaft 182. The rear end of the shaft 182 has attached hereto a cam plate 186 (Fig. 32) to which is pivoted one end of a link 188. The other end of the link 188 is pivoted to the finger 172, so that rocking movement of the shaft 182 will be imparted to the fingers 172 and thereby to the gear 166. The gears 164 and 166 being in mesh with each other will thereby transmit operating torque to the other finger 170.

It will be seen from the foregoing description, with particular reference to Fig. 33 of the drawings, that a mechanism has been provided wherein manual rotation of the handle 184 (Fig. 32) will cause rotation of the gears 164 and 166 with the consequent rocking movement of the fingers 170 and 172. When the handle 184 is rocked to a vertical position and if the tape sensing arms 150, 152 and the circuit making and breaking fingers 160 and 162, or either of them, are in a lower position, such movement of the handle will be effective to rotate the shafts 154 and 156, and thereby elevate the tape sensing arms 150 and 152 and the circuit making and breaking fingers 160 and 162. A spring-pressed detent 190 (Fig. 32) is adapted to engage a recess 192 in a hub 194 fixed to the shaft 182, thereby imparting stability to the assembly in its open position.

The cam plate 186 (Fig. 33) operates both as an effective stop and as an operator for a thread handle contact THC (Fig. 31). The thread handle contact THC is so positioned that the edge of the cam plate 186 that is adjacent its junction with the link 188 comes into contact with the thread handle contact THC to transfer its points. The cam plate 186 has a shoulder portion 196 which limits the rocking movement of the shaft 182 in one direction by engagement with a stop pin 198 (Fig. 33) which project from the rear face of the mounting block 158. Rocking movement of shaft 182, in the opposite direction, is limited by engagement between the upper edge of the cam plate 186 and the hub portion of the finger 172.

It is contemplated to use a tape sensing assembly with a tape head which is bodily slidable in a vertical path in the face plate of the machine, and which is under the control of a solenoid which may be impulsed in any suitable fashion whenever it is desirable to drop the tape reading head from its normal tape reading position.

Figs. 34, 35 and 36 illustrate the structure of a read/write head mounting arrangement. Herein the tape head 16 has a cover 200 (Fig. 35) supported from a plate 202 which projects forwardly from the face panel 13 of the machine. It is contemplated in this structure that the tape head 16 will be dropped away from its cover 200 whenever the read/write coils are to be separated from the cover 200, as during the threading of a tape through the tape drive mechanism and the associated read/write head.

To secure this function, the tape head 16 is secured to a base plate 204 (Fig. 36) which is mounted for sliding movement on the face panel 13 of the machine between a pair of guides 206 and 208, the base plate 204 being mounted in the guides 206 and 208 by means of anti-friction bearings 210.

The base plate 204, and consequently the tape head 16, is held in its upper or operative position by means of a pair of coil springs 212 (Fig. 34). It may be noted that extending rearwardly from the base plate 204 and through a pair of slots 214, in the face panel of the machine, are a pair of studs 216 to which one end of the coil springs 212 are attached, the other ends of the coil springs 212 being fixed to studs 218 projecting rearwardly from the face panel of the machine. It will be seen, therefore, that while the base plate 204 is adapted for movement in a vertical path within the guides 206 and 208, it is normally held in its upper position by means of springs 212 where it is in juxtaposition with the cover 200.

Whenever it becomes necessary to drop the tape head 16 away from its cover as may be the case when tapes are changed or when the tape is rewound at a high speed, there has been provided an operating solenoid 220 comprising a coil 222 and a core 224. The outer end of the core 224 has pivoted thereto a link 226 which at its other end is pivoted to a rocking lever 228. The rocking lever is mounted midway between its ends on a pivot stud 230 so that whenever the coil 222 of the solenoid is energized and its core is pulled into the coil, the upper end of the rocking lever 228 will swing in an arc. This motion is utilized to pull down the base plate 204 against the tension of the springs 212 by a connection between the upper end of the rocking lever 228 and a link 232 which is pivoted to a stud shaft 234 fixed to the base plate 204 and extending rearwardly therefrom through a slot 236 in the face panel of the machine.

It follows from what has been said in connection with the structure shown in Figs. 34, 35 and 36 that whenever the coil 222 (Fig. 34) of the solenoid is energized, its core 224 will be attracted and the linkage system will operate to pull the base plate 204 and its associated tape head 16 downwardly where it will be held as long as the solenoid coil 222 remains energized. Upon deenergization, the coil springs 212 with the aid of a spring 238 will return the base plate 204 and its associated tape head 16 to its upper or operative position.

In order to place the tape drive mechanism in operation, a line switch LS (Fig. 37) is closed, which supplies 115 volt alternating current to 40 volt and 55 volt D.C. power supplies (only diagrammatically indicated). Most of the relays, such as those shown in Figs. 37 and 38 are connected across the 40 volt power supply, while the 55 volt supply provides power for the vacuum pump motor VPM (see also Fig. 18).

As soon as voltage appears on the +40 volt line, the run relays RU1, RU2, RU3 and RU4 (Fig. 37) are energized through points THC1 of the thread handle contact THC (see also Fig. 31) and the safety vacuum switch contact SVS. If there is a tape loop in the control columns 24 and 26 (Fig. 18), thus forming an air seal between the upper and lower vacuum switches, and if the vacuum motor VPM is operating, the safety vacuum switch SVS in the header 108 (Fig. 18) will be closed by the vacuum built up in the header 108 by the vacuum pump. If the tape sensing arms 150 and 152 (Fig. 31) are in a horizontal or lowered position, the thread handle contact THC will be in the position shown, i.e. a circuit is made through the point THC1.

The points of the run relays RU1, RU2, RU3 and RU4, as the relays are energized, control various circuits such as resetting certain trigger circuits, etc. Their operation will be best described and understood as explanation of the associated circuits progresses.

To the right of the run relays (Fig. 37) are the heavy duty relays HD1, HD2, HD3 and HD4. The relays HD1 and HD2 control the head solenoid coil 222 (see Fig. 34) which raises and lowers the magnetic head. The relay HD2 is energized when the tape sensing arms are in a position away from the tape reels, the thread handle contact point THC then being in a transferred position from that shown. A circuit is then closed from the 40 volt supply through the thread handle contact points THC2 to the relay HD2, energizing the latter. The relay HD2 is also energized during rewind operations, a circuit being then closed from a 40 volt power supply through relay points RU11AU. As the relay HD2 is energized, a circuit is closed from the 40 volt power supply through the points HD1–1 (lower right Fig. 37) and the points HD2–1 to the head solenoid coil 222.

The solenoid coil 222 being energized, causes the head to be lowered as explained above (Fig. 34), and also causes the points 222–1 to open and thereby break the circuit to the relay HD1. As the relay HD1 is deenergized, the points HD1–1 open and a circuit to the head solenoid coil 222 is now made through a resistor 359*e* and the points HD2–1. Therefore, the head solenoid coil 222, when first energized to drop the head, receives a large surge of current, but once it is energized it is held energized by current flow which is limited by the resistor 359*e*. Thus the tape head is in a lowered position when the thread handles are away from the tape reels (for threading tape into the mechanism) and also during rewind operations.

Power is supplied to the various drive motors as follows: When the relay RU2 is energized, its point RU2AU closes, and a circuit is made through the latter points and the non-transferred points RU8BU–1 to energize the relay HD4. Closing of the points HD4–1 applies power to the capstan motor 42*a*, the forward reel motor 22, and a timing motor 301*f*. The timing motor 301*f*, as explained below, is used to provide a time delay when the mechanism is shifting from a rewind operation to a forward operation.

During rewinding operations, the relay RU8 is energized and its point RU8BU is transferred, and still assuming the run relay points RU2AU are closed, a circuit is made through the now closed points RU8BU–2 to energize the relay HD3. Therefore, during rewinding operations, the points HD4–1 open to remove power from the forward reel motor 22, the capstan motor 42*a* and the timing motor 301*f*, while points HD3–1 close to energize the reverse reel motor 23.

The forward-reverse actuator magnets 76*a* and 76*b* (Figs. 27 and 37) are normally energized, so that the idlers are positioned for feed in a forward direction.

The circuit to the magnet 76*b* may be traced from the 40 volt supply through the run relay points RU3AU and the normally closed points RU11BL–1. When the feed unit is in a rewind status, as described below, the points RU11BL are transferred and a circuit is made through the points RU11BL–2 to energize the backward magnet 76*a*.

At the forward end of the tape, exclusive of the tape leader, is a reflective spot on the tape which is recognized by the machine and is known as the load point. The machine reel switch MRS (Fig. 37) is in the position shown when this tape load point or any point thereafter of the tape is at the magnetic head but is in a transferred position from that shown, when sections of the tape preceding the load point are at the magnetic head. When the tape is loaded in the machine but has not progressed to the load point, or if the load point is passed on a rewind operation, the machine reel switch MRS transfers, the points MRS–1 close and the tape begin relay RU15 is energized. The relay points RU15AL are utilized, as explained below, to break the circuit to the rewind relay RU13.

As explained below, if a tape operation is called for when the tape is at a position forward of the load point, the tape drive is energized, and the tape progresses to the load point. As the load point is reached, the machine reel switch MRS assumes the position shown and a circuit is closed through the points MRS–2, the normally closed points RU8AU and the now closed run relay points RU4BL to the load point relay RU5. As the relay RU5 is energized, the points RU5AL close, shorting the points MRS–2 to provide a hold circuit, thereby preventing the energizing and deenergizing of the relay RU5 by possible bouncing of the machine reel contact arm 152 (Fig. 31) and consequent closing and opening of the machine reel switch points MHS–2. The other points of the relay RU5, when it is energized, provide an indication to electronic control circuits, to be explained later, that the tape is at or beyond the load point.

The file reel switch FRS upon closing completes a circuit via the normally closed relay points RU8AL and the now closed run relay points RU4BU to the tape end relay RU6. The relay points RU6AL, once closed, short the file reel switch FRS to prevent chattering of the relay RU6 because of bouncing of the file reel contact arm 150. Besides providing its own holding circuit, the relay RU6 closes points which, as explained below, sets an electronic trigger to indicate that the end of the tape has been reached.

The load point relay RU5 and the tape end relay RU6 are deenergized, respectively, by opening of the points RU8AU and RU8AL, the relay RU8 being energized, as explained below, when a rewind operation is called for.

For purpose of summary, to this point, assume that the tape is loaded into the tape feed mechanism and that the tape sensing arms are in a lowered position. The run relays are then energized via the thread handle contact points THC–1 (Fig. 37). The head relay 222 is not energized so the head is in closed position. Power is provided to the timing motor 301*f*, the capstan motor 42*a* and the forward reel motor 22. The mechanical bias is set for forward feed since the magnet 76*b* is energized. If the tape is at the load point or beyond the load point, relay RU5 is energized, but if it is at a point before the load point, electronic circuits explained below, cause a start signal to be given and the tape is fed until the load point is reached. Thereafter the tape is fed, for reading or writing operations, under control of the electronic system circuits program, until either the end of the tape is reached or a rewinding operation is called for. Actually, if the tape end is reached before the program calls for a rewinding operation, the fact that the tape end is reached, as indicated by energization of tape end relay RU6, causes, as described below, a rewinding signal to be given.

Whenever the system calls for a rewinding operation, a rewind relay RU13 is energized and a circuit is thereby completed from the 40 volt supply through the points RU14AL, the points RU15AL (closed unless the tape is forward of the load point) and the run relay points RU2AL to the rewind relay RU13. As the relay RU13 is energized, the points RU13AL short the points of RU14AL and provide a circuit to hold the rewind relay RU13 energized as the rewind signal terminates and the relay RU14 is deenergized. The contacts RU13BL close to energize the backward status relays RU7 and RU8.

The points of relay RU7 are used in the reel clutch circuits, Fig. 38, which are explained below.

As the backward status relay RU8 is energized, the points RU8AU open to break the circuit to the load point relay RU5, the points RU8AL open to break the circuit to the tape end relay RU6 (deenergizing the latter if it had been energized as the trailing end of the tape is reached), the contact RU8BU transfers from point RU8BU–1 to RU8BU–2 to remove power from the relay HD4 and apply power to the relay HD3, and the points RU8BL close to energize the end of rewind delay relays RU11 and RU12. As stated above, the opening of the points HD4–1 removes power from the timing motor **301*f*, the capstan motor 42*a* and the forward reel motor 22, while the closing of points HD3–1 applies power to the reverse reel motor 23**.

Whenever the relay RU11 is energized, the points RU11BU close and thereby provide a temporary holding circuit for both relays RU11 and RU12 when, as explained below, the relay RU8 is deenergized and points RU8BL open at the end of a rewinding operation. The contact RU11BL transfers from RU11BL–1 to RU11BL–2 as mentioned above to energize the backward mechanical bias relay **76*a*, and other points RU11 close to give a start signal. As explained below, the start signal energizes the coil 80*a* of the stop-drive actuator so that tape is fed through the head in a direction as determined by the forward-reverse actuator 76*c*** (Fig. 27).

It should be noted that the reverse reel motor 23 and the backward mechanical bias relay **76*a*** are simultaneously energized along with the giving of a start signal. Therefore, as the rewind signal is given, the tape immediately begins rewinding.

The rewinding of tape continues until most of the tape is transferred from the machine reel to the file reel and the load point is reached, i.e. the load point is at or near the head. At that point, or near it, the contact of machine reel switch MRS (Fig. 37) transfers to point MRS–1 to energize the relay RU15.

The normally closed RU15AL points are opened as the relay RU15 is energized and thereby breaks the circuit to the rewind relay RU13. As the relay RU13 becomes deenergized, points RU13BL are opened and break the circuit to the backwards status relays RU7 and RU8. The deenergizing of the relay RU8 allows the points RU8AU to close and thereby condition the circuit leading to the load point relay RU5. At this time the machine reel switch MRS is in a transferred position, so the load point relay RU5 will not be energized until the tape again feeds forward to the load point and the machine reel switch MRS transfers to contact the point MRS–2. The points RU8AL also close, but the file reel switch FRS is now open and the tape end relay RU6 is not energized. The points RU8BL in the energizing circuit of the end rewind delay relays RU11 and RU12 also open but have no effect since the hold circuit is maintained through the relay points RU11BU. The contact RU8BU transfers to the normal position RU8BU–1, thereby removing power from the heavy duty relay HD3 and applying power to the heavy duty relay HD4. As explained above, this removes power from the reverse reel motor 23 and applies power to the forward reel motor 22, the capstan motor **42*a* and the timing motor 301*f*. At this point the reverse reel motor 23 is coasting to a stop, while the forward reel motor 22 and the capstan motor 42*a* are picking up speed. The timing motor commences to turn and causes the delay points 302*f*** to open after a period of 1½ seconds. The use of this time delay is justified as follows.

If the relays RU11 and RU12 were deenergized by the opening of the points RU8BL as the tape approached or reached the load point during the rewinding operation, the contact RU11BL would transfer back to the normal position RU11BL–1 and energize the forward mechanical bias relay **76*b*. This action could result in having both moving capstans 32 and 34 against their respective drive capstans 28 and 30 at the same time, thus tending to drive the tape backward with the backward drive capstan 28, which is coasting to a stop, and forward with the forward drive capstan 30**, which is now picking up speed. Such action would result in a broken tape.

The timing motor **301*f* is provided to make sure that the deenergization of the relays RU11 and RU12 is delayed 1½ seconds, or until such a time that the reverse reel motor 23 has had a chance to come to a full stop. At the end of the 1½ second period, the relays RU11 and RU12 are deenergized and power is transferred from the backward mechanical bias relay 76*a* to the forward mechanical bias relay 76*b***. As relays RU11 and RU12 are deenergized, the rewind operation is effectively completed and the tape, under control of circuits to be described below, feeds in a forward direction until the load point is again reached.

During the time that the tape 14 is actually being fed through the tape head 16, it is under the control of the vacuum switches LUV, LLV, RUV and RLV (Figs. 18, 26 and 38). As explained heretofore, these switches are sensitive to the vacuum within the columns 24 and 26, and control the brake and clutch mechanism shown in Figs. 21 and 22 of the drawings.

Whenever the tape reels 10 or 18 are at rest, they are under control of their respective brakes 42 and 48. These brake circuits are energized as soon as power appears on the 40 volt power line and even before the run relay RU1 is energized. In such case, the brake magnet **42*a* (Fig. 38) is energized from the +40 volt line through the normally closed points RU1AU–1 and RU12AU–1. The brake magnet 48*a*** is energized by a circuit from the +40 volt supply line through the normally closed points RU1BU–1 and RU12BU–1.

When the run relay RU1 is energized, the contacts RU1AU and RU1BU transfer to points RU1AU–2 and RU1BU–2, respectively. Thereafter, the energizing circuit for the brake magnets **42*a* and 48*a* is through the respective vacuum switch structures. Let it be assumed that the tape loops now occupy a normal, relatively stable position between the vacuum switches LUV and LLV in column 24 and RUV and RLV in column 26 (Fig. 18). Under these conditions, the brake magnet 42*a* will be energized by current from the +40 volt supply line, through the now closed RU1AU–2 point (Fig. 38), the normally closed point LUV–1 of the upper vacuum switch LUV, and the transferred point LLV–2 of the left lower vacuum switch LLV (which is now subject to the rarified atmosphere within the vacuum column 24**).

Energization of the brake magnet **48*a* under these same conditions is effected from the 40 volt power line, through the now closed points RU1BU–2, the normally closed RUV–1 contact of the right upper vacuum switch RUV and the transferred point RLV–2 of the right lower vacuum switch RLV (the vacuum switch RLV now being subject to the rarified atmosphere in the vacuum column 26**).

Should the tape loop in the vacuum column 24 rise above the left upper vacuum switch LUV, that switch will be subjected to the rarified atmosphere in the vacuum column 24 with the result that its LUV–1 point will be opened and its LUV–2 point will be closed. The energizing circuit to the brake coil 42a is broken when the LUV–1 point opens and the circuit to the unreeling clutch coil 44a is closed. The magnet 44a will be energized from the 40 volt power line, through the transferred RU1AU–2 point, and the now closed LUV–2 point of the left upper vacuum switch LUV.

When the tape loop in the vacuum column 24 drops below the left lower vacuum which LLV, that switch will be subject to atmospheric pressure on both sides thereof, with the result that the circuit to its contact LLV–2 opens and to its contact LLV–1 closes. The first effect of this operation is to break the circuit for the brake coil 42a which is made through the LLV–2 point of the switch. Thereafter, upon closure of the LLV–1 point of the left lower vacuum switch, a circuit is provided for the reeling clutch coil 46a, this circuit being from the positive side of the line through the point RU1AU–2, the normally closed LUV–1 point of the left upper vacuum switch LUV, through the now closed point LLV–1 of the left lower vacuum switch LLV.

The function of the vacuum switches RUV and RLV in the vacuum column 26 is precisely the same as that described in connection with the switches in the vacuum 24. It is believed that the description thereof need not be labored in this specification, since an understanding of the operation should be clear from the specific description given in connection with the vacuum switches in the vacuum column 24. It is sufficient to state that as the tape loops in the respective columns rise, the upper vacuum switches LUV and RUV will be subject to rarified atmosphere in the column which will cause atmospheric pressure to transfer the points thereof, whereby the unreeling clutch relays 44a and 50a are energized to supply tape to the vacuum columns. By the same token, when the tape loops drop below the lower vacuum switches LLV and RLV, these switches which have been subjected to vacuum within the respective columns 24 and 26 will transfer their points to establish an energizing circuit for the reeling clutch relays 46a and 52a. At such times that the reeling or unreeling clutch coils are deenergized, the circuit is such as pointed out hereinbefore that the brake magnets 42a and 48a are energized to lock the reels 10 and 18, respectively, against rotation.

PLUGGABLE UNIT COMPONENT CIRCUITS

*Electronic triggers.*—Throughout the block diagrams are a plurality of generally standard component circuits which appear with repetitious regularity. These circuits are generally classifiable as triggers, single shot multivibrators, inverters, switches, power units, cathode followers, deflection increment units and coincidence circuits. In order to avoid a detailed description of the component circuits during the detailed operational description, which will follow on the basis of the overall block diagrams, it is appropriate to consider the component circuits at this time so that their nature and function in the system may be understood.

Fig. 39 represents a typical trigger circuit of which the pluggable units identified by the block symbols T1 through T18 are variations.

Fig. 39 comprises an electronic trigger which is commonly referred to in the art as an Eccles-Jordan trigger. Such an electronic trigger comprises, for example, two cross-coupled triodes (shown in Fig. 39 as being included in one envelope and as comprising a 6J6 type tube) in which the plate P1 is cross-coupled through a 200K ohm resistor in series with a 1K ohm resistor to the grid G2. Likewise, the plate P2 is cross-coupled to the grid G1 by a 200K ohm resistor in series with a 1K ohm resistor. Each of the 200K ohm resistors is shunted by a 100 micromicrofarad condenser.

The left side of the tube may be rendered conductive by voltage applied via the terminal 5 and the 200K ohm resistor in series with the 1K ohm resistor G1R or by a minus voltage which may be applied to the terminal 7 directly to the plate P1, in order to "pull-over" the plate. Under either of these two conditions, either of which may occur in the operation of a trigger, the left side of the tube is rendered conductive, lowering the voltage at plate P1, which, through the cross-coupling previously described, maintains the grid G2 relatively negative, so that the right side of the tube is blocked while the left side conducts, thus making plates P1 negative and P2 positive. This is one state of stability of the trigger.

In a similar manner, the right side of the tube may be rendered conductive, whereupon the reduction in voltage at the plate P2 is applied by the cross-coupling connection, previously described, to the grid G1 to block the left side of the tube, whereupon the plate P1 now becomes positive. When the left side of the trigger is conducting, the trigger may be considered as being "on." When the right side is conducting, the trigger is described as being "off." Thus, with plate P1 positive, the trigger is Off and with plate P2 positive, the trigger is On.

If, for example, the left side of the tube is conducting and minus voltages are applied simultaneously to the grids G1 and G2, the trigger will change its conducting state, the left side being blocked and the right side being rendered conductive. In order to properly operate the trigger in this fashion, with simultaneous negative potentials applied to both the grids G1 and G2, such negative potentials are usually applied to the grids by way of individual capacity couplings. A trigger, the conducting state of which is changed by the simultaneous application of pulses to its control grids, is commonly referred to as a binary trigger.

If the left side of the trigger is conducting, and a negative voltage is applied to the terminal 6, this negative voltage will be differentiated by the condenser G1C to a negative pulse which will be applied through the 1K ohm resistor to the grid G1, blocking the left side of the tube, and thereby turning the trigger Off. If a sufficient positive pulse is applied to the terminal 6, this positive pulse will likewise be differentiated by the condenser G1C and applied through the 1K ohm resistor to the grid G1 as a plus pulse. If at the same time of the application of such plus pulse, the left side of the tube is blocked so that the plate P1 is positive, the pulse will trip the trigger On, thereby rendering the plate P1 negative.

As it has been noted, trigger elements of this type are more sensitive to negative pulses than to positive pulses. A positive pulse of a given value which, when applied to the terminal 5 and thus applied to the grid G1 will flip it On, will not be of sufficient strength to operate the trigger when applied to the terminal 6 and when differentiated by the condenser G1C. By proper choice of values, however, this sluggishness can be overcome. While various means of tripping the trigger have been described, these are not intended to be exhaustive, but are merely indicative of the most common way triggers are flipped during operation of the system.

In Fig. 39 a 40 micromicrofarad condenser is connected between the junction of the two 200K ohm resistors on the right side and ground. The plate P1 is supplied with two resistors in series, one of 12K ohms adjacent the plate and the other of 7.5K ohms, while the plate P2 is also supplied with two similar resistors, also in series. The terminal 8 provides a tap in the plate resistance of the plate P1. The terminal 9 is usually connected to a source of +150 volts.

The specific tube types and values of the resistors and condensers employed in the trigger circuit of Fig. 39 are merely indicative of values which have been successfully employed, and it is to be specifically understood that these values may be varied by those skilled in the art.

The trigger bearing the block diagram symbol T1 (Fig.

40) is a slow speed trigger with two full plate outputs. The trigger bearing the block symbol diagram T2 (Fig. 41) is a trigger substantially similar to the trigger bearing the block diagram symbol T1 with the exception that its inputs are internally compensated to provide a slightly higher operating speed. The trigger bearing the block diagram symbol T3 (Fig. 42) is also substantially like that identified by the symbol T2 with the exception that one of its outputs is tapped instead of being a full plate output. The trigger bearing the block diagram symbol T4 (Fig. 43) is generally like the trigger identified by the symbol T1 with the exception that the outputs furnished include a full and a tapped output from one plate only. The trigger identified by the symbol T5 (Fig. 44) is a trigger having a full plate output and also a tapped plate output, and this trigger is particularly designed for operation in connection with relays. The trigger identified by the symbol T6 (Fig. 45) is substantially the same as that bearing the symbol T5, except that a full output is provided from each plate thereof. The trigger identified by the symbol T7 (Fig. 46) is a medium speed trigger adapted for operation by plate pull-over and it has no inputs to the control grids except the inputs from the cross-coupling.

The trigger bearing the identifying symbol T8 (Fig. 47) is a trigger with an input to one grid only, and it is adapted to pull-over operation for reset control, and it has one tapped and one full plate output. The trigger identified by the character T9 (Fig. 48) is a high speed trigger with two full plate outputs, one from each plate. The trigger bearing the symbol T10 (Fig. 49) is a medium speed trigger used in the character ring. The trigger identified by the symbol T11 (Fig. 50) is a very high-speed trigger having fast recovery characteristics, and finds its principal use in the column counter. The trigger bearing the identifying symbol T12 (Fig. 51) is a high-speed trigger that may either be pulled over by a pulse to its plate or may be triggered by an impulse to either grid. Its principal application is in the column counter herein. The trigger identified by the symbol T13 (Fig. 52) is a high-speed trigger with one full plate output and one tapped plate output.

The trigger identified by the character T14 (Fig. 53) is a high-speed trigger having a binary input, i.e. a common input to both control grids, whereby each pulse applied will cause the trigger to change its conductive state. The trigger identified by the block diagram symbol T15 is a trigger employed in the execution timer circuits. The triggers bearing the symbols T16, T17 and T18 are key triggers (Figs. 55, 56 and 57, respectively), adapted for operation from manual key contacts, cam contacts or relay points.

The triggers T9 through T14 have been constructed with type 5965 tubes, and the remaining triggers with type 6J6 tubes.

*Single shot multivibrator.*—The single shot multivibrators used in the system bear the block diagram symbols MV1, MV2, MV3 and MV4, shown respectively in Figs. 59 through 62. Fig. 58 illustrates, by way of example, a typical single shot multivibrator circuit. It has been pointed out hereinbefore that the electronic trigger is nothing more than two retroactively resistance-coupled triodes. If two triodes with normally conducting grids are retroactively capacity-coupled, the resulting circuit will oscillate and is known as a multivibrator. This arrangement is shown in Fig. 58. In this system single shot multivibrators are used for generating timing pulses having a variety of pulse durations.

When power is first turned on, assume that tube T1 (Fig. 58) starts conducting first, the resulting drop in voltage at the point A1 is transmitted to the grid G2 and keeps the tube T2 cut-off. As soon as the condenser C2 is fully charged, the voltage charge at point A1 is no longer transmitted to the grid G2, and the grid G2 rises to cathode potential. The tube T2 now starts conducting and the point A2 drops in voltage. The negative shift at the point A2 is transmitted to the grid G1 and cuts off the tube T1. When the voltage across the condenser C1 reaches a steady state value, the grid G1 again rises to cathode potential and the tube T1 starts conducting. The cycle is then repeated at timed intervals which are determined by the values of C and RG. The single shot multivibrator resembles a trigger circuit in that it may be flipped into a certain state, but it then returns to its previous state after a predetermined time without being pulsed from an external source. Its normal state will be called its stable state, and its abnormal state will be called its quasi-stable state, for it will remain stable in this latter state until the predetermined time has elapsed.

The multivibrator MV1 may employ a type 5687 tube. The multivibrators MV2 through MV4 have been constructed with type 12AV7 tubes.

*Electronic switches.*—Another element which is employed throughout the circuit of the system is an electronic switch, of which a typical example is shown in Fig. 63. This switch comprises a pentagrid converter which may be tube type 1680, with its cathode grounded and its suppressor grid directly connected to the cathode. Switches of this general category bear the block diagram identifying characters S1 through S10, the details of which are shown in Figs. 64 through 73, respectively.

In Fig. 63 the grid G1 is shown as connected by way of a 47K ohm resistor and a 470K ohm resistor to the terminal 8, and also connected by the same 47K ohm resistor and a 390K ohm resistor, in series therewith, to the terminal 9, said 390K ohm resistor being shunted by a 100 micromicrofarad condenser. Grid G2 is connected by a 47K ohm resistor and a 330K ohm resistor, in series therewith, to terminal 8, while the grid G2 is also connected through the same 47K ohm resistor and a 390K ohm resistor to the terminals 6 and 7, the 390K ohm resistor being shunted by a 100 micromicrofarad condenser. The screen grid SG is connected by a 0.47K ohm resistor to the terminal 5, the plate is connected directly to the terminal 4 and is also connected by way of a 12K ohm resistor to the terminal 3.

If a positive input is applied to the terminal 6, this switch is conditioned so that a positive pulse then applied to the input terminal 9 causes conduction in the pentagrid and, therefore, causes a negative output to be emitted from the plate P to the output terminal 4. If, however, a negative signal is applied to the input terminal 6, the pentagrid will be held at cut-off, even though a positive signal is applied to the input terminal 9. Thus, only when the switch is conditioned by a positive input pulse applied to the terminal 6 will a pulse applied to the terminal 9 be passed through the circuit. In this respect the pentagrid switch circuit constitutes a coincidence circuit, whereby the coincidence of predetermined pulses must be present on the grids of the switch before one of such applied pulses can be gated through the circuit.

The switch S1 (Fig. 64) is a two-control element switch, both inputs of which are high level voltages, and it provides a tapped plate output. The switch bearing the identifying symbol S2 (Fig. 65) is identical to the switch bearing the symbol S1, except that the output of the former is a full plate output. The switch identified by the block diagram symbol S3 (Fig. 66) is a two-control element switch with one high level input grid and one low level input grid, the switch being provided with a full plate output. The switch identified by the block diagram symbol S4 (Fig. 67) is a two-control element unit, both input grids being adapted to low level pulses. The switch is provided with a single tapped plate output.

The switch bearing the identifying symbol S5 (Fig. 68) has a pair of control grids, the input to one of which is a high level input and the other of which is condenser-coupled. The output from this switch is a tapped plate output. The unit bearing the identifying symbol S6 (Fig.

69) is identical to that identified by the block diagram symbol S5, except that the former has a full plate output. The switch identified by the character S7 (Fig. 70) is identical to that identified by the block symbol S4 except that the former has a full plate output and the parasitic resistor associated with the first control grid has been increased in size. The switch bearing the block diagram symbol S8 (Fig. 71) is provided with three input control grids and a full plate output. A switch of this type may be used as a three-way coincidence unit and in the system it is generally associated with the units, tens and hundreds hubs to start and stop various controls on the control panel. The switch bearing the identifying symbol S9 (Fig. 72) is a dual control grid switch tube with a full plate output and with low level inputs used primarily in converting parallel characters in registers from serial inputs to memory and vice versa.

The switches S1 through S6 may employ a type 6B tube, the switches S7, S9 and S10 a type 1680 tube, and the switch S8 a type 5727 tube.

*Cathode followers.*—The system employs numerous cathode follower circuits, a typical one of which is shown in Fig. 74. Cathode followers have many characteristics that promote their wide use in a system. They are primarily power amplifiers and, therefore, are used for supplying a suitable voltage level for driving resistive loads such as And circuits and Or circuits or capacitance loads such as wiring capacitance. Their high input impedance and relatively low output impedance makes them useful for impedance matching and isolation.

A cathode follower has the characteristic of regulating itself, i.e. it will not allow an appreciable change in voltage from grid to cathode. If the current increases, the tube tends to cut itself off as the cathode voltage tends to rise. This cut-off action tends to decrease the current. Conversely, if the current tends to decrease, the cathode voltage will tend to drop and thus cause the tube to draw more current.

In Fig. 74 the cathode follower comprises a single triode 114*a*, whose plate is connected directly to a positive voltage supply +V. The cathode is connected to an output terminal 6 and via a resistor 115*a* to a negative power supply −V. The grid is connected through a resistor 113*a* and a resistor 112*a* to a negative power supply −V1 and through the same resistor 113*a* and a resistor 110*a*, shunted by a condenser 111*a*, to the input terminal 4. A positive input to the terminal 4 produces conduction in the triode 114*a* and a positive output at the cathode output terminal 6.

In the component shown in Fig. 74 the resistance values are exemplary and may therefore be changed as dictated by the circumstances and within the knowledge of the technician in the art. The resistance 110*a* may, for example, be 220K ohms, the resistance 112*a* may, for example, be 470K ohms and the resistance 113*a* may, for example, be 0.47K ohm. With the circuit parameters indicated, the condenser 111*a* may be, for example, 15 micromicrofarads.

Throughout, the circuit employs various cathode followers differing from that shown in Fig. 74 in detail such as, for example, the values of the resistance and capacitance, and these differences may be recognized by an examination of the drawings in which the several cathode follower circuits are illustrated. Thus, the system employs cathode followers identified in the drawings by the block symbol identifying characters CF1 through CF11 (Figs. 75 through 85).

The cathode follower circuit identified by the block diagram symbol CF1 (Fig. 75) is adapted to convert a +75 volt to +130 volt input to a +20 volt to +60 volt output. This circuit may embody a type 12AV7 tube. The cathode follower circuit bearing the block diagram symbol CF2 (Fig. 76) is adapted to receive input of +75 volts to +130 volts and to produce an output voltage of +20 volts to +60 volts. The cathode follower circuit identified by the block diagram symbol CF3 (Fig. 77) is similar to that identified by the characters CF2, with the exception that the cathode resistors are omitted. Both the CF2 and the CF3 may embody a type 5687 tube.

The cathode follower bearing the identification symbol CF4 (Fig. 78) is a special cathode follower used in the read/write circuits and may comprise a type 12AV7 tube. The circuit identified by the block symbol characters CF5 (Fig. 79) has two inputs and two outputs, this unit being used in the drive hub circuits of the control panel. The unit may comprise a type 5965 tube. The circuit identified by the block symbol identifying character CF6 (Fig. 80) will convert a +50 volt input pulse at any potential to an output signal of +10 to −30 volts. The unit may conveniently employ a type 12AV7 tube. In this unit the second triode serves as a power unit whose output may be used to drive a plurality of lines or to power a long line.

The unit identified by the character CF7 (Fig. 81) is used to shape and power the interrogate signal sent from the machine frame to the memory units. It may employ a type 5965 tube. The unit CF8 (Fig. 82) is similar to the unit identified by the character CF7 except that it operates at higher speed and it shapes and powers the sample pulse sent from the main frame to the memory cells. The unit may comprise a type 5687 tube.

The cathode follower circuit identified by the block diagram identifying symbol CF9 (Fig. 83) is a generally used cathode follower of medium power capable of accepting high voltages and converting them to +10 to −30 volt levels. The tube may be a type 5965.

The circuit identified by the block diagram symbol CF10 (Fig. 84) is capable of powering low level (+10 v. to −30 v.) lines so that they may drive a large number of circuits. It thus constitutes a circuit having low level inputs and low level outputs. The circuit may comprise a type 5965 tube.

The unit identified by the identifying symbol CF11 (Fig. 85) throughout the block diagrams is a general purpose cathode follower used where high power is required to drive many lines. It comprises a high level input circuit and a low level output circuit which may include a type 5687 tube.

*Inverters.*—The system uses a great number of inverters, which is a circuit that produces a negative shift at its plate when a positive pulse is applied to its grid, and a positive shift at its plate when a negative pulse is applied to its grid. This property renders these circuits very useful in inverting logical conditions, and it also enables the system to change binary ones to binary zeros and binary zeros to binary ones. An inverter circuit will also amplify the signal and thus assist in setting signal levels.

A typical inverter circuit is shown in Fig. 86. The circuit of Fig. 86 employs a tube of the type designated as a 6J6. This comprises a double triode, in one envelope, with both of the triodes grounded at a common point. The grid G1 is connected by way of a 1K ohm resistor and a 510K ohm resistor to the terminal 7, and the grid G2 is likewise connected through a 1K ohm resistor and a 510K ohm resistor to the terminal 7. Also the grid G1 is connected by means of its 1K ohm resistor and a 25 micromicrofarad condenser G1C to the terminals 4 and 5, while the grid G2 is also connected by its 1K ohm resistor G2R and the 25 micromicrofarad condenser G2C to the terminals 4 and 5. The grid G1 is also connected by means of its 1K ohm resistor G1R and a 330K ohm resistor to the terminal 6, while the grid G2 is connected likewise through its 1K ohm resistor G2R and a 330K ohm resistor to the terminal 3. The plate P1 is connected to the terminal 8, while the plate P2 is connected to the terminal 9.

Various other inverters I1 through I25 are illustrated in Figs. 87 through 111, respectively. These inverters may be understood from a description of the inverter of Fig. 86, since they differ from each other in detail of construction mainly in the value of the individual circuit components. Certain of the inverters will be seen as consisting of a pair of triodes, whereas others comprise only a single triode.

The inverter bearing the identifying symbol I1 (Fig. 87) is a dual triode inverter of high level input and two tapped plate outputs. The inverter circuit identified by the block diagram symbol I2 (Fig. 88) is identical to that of I1 with the exception that it has two full plate outputs. The inverter I3 (Fig. 89) wherever it appears throughout the block diagram comprises a dual triode unit whose inputs are condenser-coupled and in which there is provided one tapped output and one trigger pull-over type of output. The circuit identified by the character I4 (Fig. 90) comprises a dual triode having two low level inputs and two full plate outputs.

The inverter circuit identified by the character I5 (Fig. 91) is a dual triode capable of receiving a negative signal and producing positive signals from the two full plate outputs. The unit identified by the character I6 (Fig. 92) is a dual triode with condenser-coupled inputs and two plate pull-over type outputs.

The circuit identified by the character I7 (Fig. 93) is a semi-power unit with one high level input and two full plate outputs. The unit I8 (Fig. 94) is one with both inputs coupled and with plate pull-over type outputs. This circuit is identical to that identified by the reference characters I6 except for a change in certain of the resistor values. The circuit identified by the character I9 (Fig. 95) is the same as half of the I6 type and half of the I2 type in a single envelope. The inverter identified by the character I10 (Fig. 96) has a high level input with full plate outputs. This inverter comprises a particularly high-speed unit. All of the inverters I1 through I10 may embody a 6J6 type tube.

The circuit identified by the block diagram symbol I11 (Fig. 97) is a dual triode of medium power with two low level inputs and a pair of full plate outputs. The tube may be a type 5844. The circuit identified by the character I12 (Fig. 98) is a special inverter which can receive a high level input signal and has two pull-over type outputs. The circuit may employ a type 5844 tube. The inverter identified by the characters I13 (Fig. 99) contains a condenser-coupled input and a low level input with a full plate output. A negative signal through the condenser input will allow a positive signal to be emitted from its plate. The component may include a type 5687 tube.

The unit identified by the character I14 (Fig. 100) is a dual triode with both inputs condenser-coupled and providing therein also two full plate outputs, comprising a type 5687 type tube. The unit I15 (Fig. 101) is a dual triode with two low level inputs and two tapped plate outputs, the inputs accepting −30 to +10 volts, the outputs providing +150 to +100 volts. The tube employed may be a type 5965. The unit identified by the block diagram symbol 116 (Fig. 102) is a high level input, high level output unit that embodies a type 12AV7 tube. The inverter I17 (Fig. 103) is a condenser-coupled input circuit with a full plate output based on a type 5965 tube.

The inverter unit identified by the symbol I18 (Fig. 104) accepts a high level input of 150–85 volts and provides an output of 85–150 volts. This circuit may employ a type 12AV7 tube. The inverter identified by the symbol I19 (Fig. 105) may employ a type 5687 tube and wherein each half of the tube is adapted to drive a relay coil. The inputs are relatively high, i.e. +80 to +140 volts. The inverter I20 (Fig. 106) may comprise a type 12AV7 tube. This inverter provides a high output assist in the moving clutch coil drive circuit. Unit I21 (Fig. 107) is a moving coil drive inverter which may include a type 5687 tube. The inverter circuit I22 (Fig. 108), which embodies a 12AV7 tube, is the tape delay driver which is adapted to control the tape delay single shot multivibrator. The unit I23 (Fig. 109) is provided for the acceptance of low inputs in the range of +50 to +25 volts. It employs a type 5687 tube.

The inverters shown in Figs. 110 and 111 comprise 12AV7 type tubes. Both of these inverters are adapted to receive two low level, positive inputs of +50 volts to +25 volts, and they are used to drive other inverters or cathode followers. The principal difference between the circuits is the absence of the plate resistors in Fig. 111. When the unit is constituted as shown in Fig. 111, the plate resistors such as shown in Fig. 110 are associated with the unit fed by the inverter of Fig. 111.

The inverter component in the circuitry is by far the most numerous component employed, and this follows from the fact that the inverter is used not only for the inversion of signals but also for the control of other triodes and in the nature of inverter switches. In order that the use of the inverters may be fully understood, it may be appropriate at this time to point out how one inverter may be controlled by another and how inverters may be employed as switching units.

In Fig. 111*a* it is assumed that the triode will be cut-off at −10 volts. The grid is at −25 volts, and therefore no current flows in the anode circuit. With no current through the load resistor R, there will be no voltage drop across the resistor R, and point A will be at the same voltage as the positive terminal of the 150 volt battery, i.e. at +150 volts. If the switch S is now transferred to the cathode circuit, thus raising the grid voltage to zero, conduction will start through the tube and through the resistor R. Assuming a tube current of 5 milliamperes and a 20,000 ohm load resistor R, the voltage drop across the resistor R will be 100 volts. With a 100 volt drop across the resistor R, the voltage drop across the diode will be $ET=Ea-IR=150-100=50$ volts. Thus, the voltage point at A, with the tube conducting, will be +50 volts.

If it is assumed that the switch S can be transferred instantaneously, the voltage changes in the tube circuit from a non-conducting status to a conducting status cause the voltage at the grid to be suddenly changed from −25 volts to zero, thus causing the voltage at the anode to change suddenly from +150 volts to +50 volts. The voltage change at the grid is in a positive direction, whereas the voltage change at the anode is in a negative direction. This is the basis for calling the triode circuit shown an inverter.

By definition, a voltage pulse is a shift in voltage. The pulse is a positive pulse if the voltage shift is in a positive direction, regardless of the original and final voltage values. Likewise, a negative pulse represents a voltage shift in a negative direction, regardless of the original and final voltage values. The voltage change is the amplitude of the pulse. Thus, if in Fig. 111*a* the switch S is transferred, it can be said that a 25 volt positive pulse on the grid causes a 100 volt negative pulse at the anode.

Assuming the switch S in Fig. 111*a* to be in the position shown, the voltage at the midpoint M of the resistor R is +150 volts, inasmuch as there is no current flow through the resistor R. With the switch S transferred, the voltage drop across the resistor R can be considered as two 50 volt drops across the two halves of the resistor R. Then the voltage at the midpoint M is +150 volts −50 volts, or +100 volts. Thus, the voltage at point M drops from +150 volts to +100 volts when the grid rises from −25 volts to zero. In other words, a +25 volt pulse at the grid produces a −50 volt pulse at the midpoint of the resistor R.

It is important to note that if a negative pulse is applied to the grid of a triode which is already cut-off, no change results in the anode circuits. Likewise, if a positive pulse is applied to the grid of a triode which is already conducting, no change results in the anode circuit. The latter is true because the circuits are designed so that the voltage at the grid cannot rise above zero.

The change in voltage at the anode of a tube when conduction takes place can be utilized to control another tube by connecting the grid of the second tube to the anode of the first tube, as shown in Fig. 111*b*.

The grid battery EG2 is necessary to reduce the voltage on the grid of the triode T2 to the desired negative bias. The voltage of this battery must be the voltage at point A when the triode T1 is conducting, plus the desired negative bias for the triode T2. Assuming the same tube as shown in Fig. 111*a*, the voltage at point A in Fig. 111*b* when the triode T1 is conducting is +50 volts. It is desired to bias the triode T2 at —25 volts; hence, the source of current EG2 must be 75 volts. As long as the triode T1 is conducting, the grid of the triode T2 is at —25 volts and the triode T2 cannot conduct. However, when the switch S is transferred to the —25 volt tap, the triode T1 is cut-off, and no current flows through the resistor R1. With no IR drop across the resistor R1, the voltage at point A is the same as the 150 volt battery potential at the plus terminal, i.e. +150 volts. This means that the grid of the triode T2 will now be at +75 volts (150 volts—75 volts), and conduction will take place through the triode T2. Therefore, the triode T2 can conduct only if the triode T1 is not conducting. In this manner the triode T2 can be controlled by controlling the triode T1.

The foregoing arrangement, as illustrated in Fig. 111*b*, therefore, illustrates how one tube may be controlled by another. Sometimes it is desirable to block the action of the controlling tube under certain conditions. This can be done by connecting two controlling tubes in parallel with a common load resistor and providing separate grid controls as shown in Fig. 111*c*. The value of the load resistor R is chosen so that the tubes are operated on that portion of their characteristic curve where most of the voltage drop is across the load resistor, and where changes in voltage at the anode are very slight with a change in anode current. This implies that the voltage at point A in Fig. 111*c* is essentially the same whether one tube is conducting or whether both tubes are conducting. Hence, with either triode T1 or triode T2 conducting, the point A is essentially at +50 volts, and the point G3 is at —25 volts, since the grid resistors between the +50 volts and the —100 volts are equal. This means that as long as the triodes T1 and T2 are both conducting, the triode T3 is cut-off. Only when neither triode T1 nor triode T2 is conducting does the point G3 go positive and allow the triode T3 to conduct. When neither triode T1 nor triode T2 is conducting, point A rises to +150 volts, and the grid of the triode T3 tends to rise to +25 volts. Thus, the triode T2 can nullify the action of the triode T2 and vice versa. As indicated in Fig. 111*c*, the triodes T1 and T2 have separate grid controls in the form of other inputs which are indicated as input 1 and input 2; these inputs may be fed by other tubes which are not shown in Fig. 111*c*.

The above combination of two triodes in parallel may be referred to as an inverter switch, inasmuch as it is a switching arrangement. However, the inverter switch of Fig. 111*c* can be used in an entirely different manner. The switch can be used as a double input inverter, i.e. a means of pulsing triode T3 from two independent pulses appearing on input 1 and input 2. In this instance, the triodes T1 and T2 are both normally cut-off, and the triode T3 is conducting. Then if either triode T1 or triode T2 conducts, triode T3 will be cut-off.

*Power units.*—The power unit used in the system is identified throughout the block diagrams of the system by the identifying character P1. This unit is disclosed in its details in Fig. 112. In Fig. 112 there is shown a power tube which may be a type 6AQ5. This comprises a pentode whose cathode is grounded and whose suppressor grid is directly connected to the cathode. The grid G1 is connected by a 47K ohm resistor G1R, in series with a 200K ohm resistor to the terminal 8, and also through the same 47K ohm resistor G1R and a 1000K ohm resistor to the terminal 7, and also through the same 47K ohm resistor G1R and a 100 micromicrofarad condenser G1C to the terminal 9. The grid G2 is connected through a 47K ohm resistor G2R to the terminal 5. The plate is directly connected to the terminal 3 and is also connected through a 2K ohm 10 watt resistor to the terminal 5. The terminal 4 is connected to the tap PT in the 2K ohm resistor. This power tube is employed throughout the system whenever power is required.

*Coincidence circuits.*—There has been described hereinbefore a type of electronic switching unit used in the system. These switches may be regarded as coincidence units of a type and, in addition thereto, the circuit employs further coincidence units either of the diode tube type or of the crystal diode type. The circuits about to be described are referred to generally as And, —And, Or and —Or circuits. These are illustrated in Figs. 113 through 118.

The And and Or circuits are used throughout the system for gating and isolation purposes. These circuits may have two or more inputs each, but only one output. The +And circuit has the logical property that all input lines must be positive to produce a positive output signal, that is, the first input and the second input and all other inputs to the circuit must be positive to obtain a positive output. A +Or circuit has the logical property that if one or another or any number of input lines is positive, the output line will be positive. These circuits are called +And and +Or circuits, because they pass positive signals when acting as switches. The system also employs diode circuits which pass negative signals when acting as switches. These circuits are called —And circuits or —Or circuits. A —And circuit has the logical property that all input lines must be negative for the circuit to have a negative output. The —Or circuit has the logical property that a negative output will be produced if any one or more of the inputs is negative. Throughout this description the plus sign will be omitted in reference to +And and +Or circuits. The distinction between the plus and minus coincidence circuits will be indicated by the use of the minus sign to designate a —And or a —Or circuit.

The crystal diode coincidence circuits may employ, for example, General Ceramics 1N52 germanium diodes. The characteristics of crystal diodes used in diode switching circuits is that rectification action is obtained because of their high ratio of back resistance to forward resistance. For example, one class of diodes may have a forward resistance less than 200 ohms and a back resistance greater than 400K ohms. A second class of diodes may have a forward resistance of less than 200 ohms but a back resistance value between 200K and 400K ohms. Both types of diodes have a maximum normal shunt capacitance of one micromicrofarad.

A further type of coincidence circuit is that shown in Fig. 118, wherein it is represented as a —And circuit (the functional equivalent of a +Or circuit), and being comprised of a pair of cathode follower triodes in a single envelope. A cathode follower —And circuit such as shown in Fig. 118 has the plates of the triodes tied together to a common power source and the cathodes tied together through a common resistor to a negative power source. The output of this type of unit comes from the cathode. In Fig. 118 the pin 6 provides the output connection. The inputs to this circuit are pins 4 and 9. Pin 7 may used in lieu of pin 4 as an input. The operation of the unit is such that if the signal entering either pin 4 or pin 9 is positive, the grid of the triode associated with the input will become positive, and as a consequence this triode will conduct, allowing the cathode of the unit to rise to the potential of the grid. Thus, the output pin 6 will become positive. The alternate input, pins 4 and 9, will be positive or negative at this time, and will have no effect on the output or pin 6. If both inputs, pins 4 and 9, are negative, then both grids of the two triodes will also be negative and the cathodes of these triodes will seek a level approximately that of the grids, causing the output pin 6 to become negative. This condition produces a —And circuit. Thus if both inputs are positive, the output pin will be negative. As indicated above, the designation +Or is another way of saying a —And, since it indicates that if either input becomes positive, the output pin 6 will become positive.

Fig. 116 discloses both a positive and a negative crystal diode And circuit. The positive And circuit is shown at the left and requires a coincidence of positive inputs on line **101*f* and 102*f* feeding the diodes 103*f* and 104*f*, respectively, to cause the line 106*f* to go positive. If the input on line 101*f* is negative, current flows from the power supply +V, through the resistor 105*f* and through the diode 103*f* to line 101*f*. This causes the line 106*f* to be at a relatively negative potential. If the line 102*f* is negative, current flow then occurs from the supply +V, through the resistor 105*f* and the diode 104*f* to the line 102*f*. Consequently, line 106*f*** is negative.

The —And circuit shown on the right of Fig. 116 is provided with two diodes **112*f* and 113*f*, resistor 114*f* and the negative power source —V. A negative And circuit, as stated, requires two negative inputs on the line 110*f* and 111*f* to cause the output line 115*f* to be negative. If either line 110*f* or 111*f* is positive, the output on line 115*f* will be positive. Assuming that line 110*f* is positive, current flows through the diode 112*f* and the resistor 114*f* to the negative power supply —V. Under these conditions, line 115*f* is positive. The same is true if the potential on the line 111*f* is positive, causing current flow through the diode 113*f* and the resistor 114*f* to the negative power supply —V. Thus it is seen that unless the potentials of lines 110*f* and 111*f* are simultaneously negative, the output line 115*f*** will be positive.

Any number of inputs can be provided in circuits such as shown in Fig. 116, the requirements being one diode for each input.

Fig. 117 illustrates a pair of coincidence circuits, one of which is a +Or circuit and the other of which is a —Or circuit. The +Or circuit at the left of the figure consists of diodes **118*f* and 119*f* and a resistor 120*f* which is connected between the diodes and a negative power source —V. This +Or circuit is identical in circuitry to the —And circuit of Fig. 116 described above, in that if a positive input is applied to either of the input terminals 116*f* or 117*f*, the output line 121*f*** will be positive. While this circuit is identical to the —And circuit of Fig. 116, as stated, it will aid in understanding the circuits of the system to be described below to have a representation of a +Or circuit as well as one of a —And circuit.

A —Or circuit is shown at the right in Fig. 117. This circuit comprises diodes **123*f* and 124*f* and 125*f*, and a resistor 126*f* connecting them to a positive voltage source +V. This —Or circuit is identical in circuitry to the +And circuit of Fig. 116, and if a negative input occurs on line 122*f* or line 123*f*, then the output 127*f*** will be negative. As in the case of the And circuits, any number of inputs may be provided to an Or circuit, one diode being required for each input.

When a coincidence circuit is formed by using one or more diode tubes, such circuit will be constituted as shown in Figs. 113, 114 and 115, each of which employs 6AL5 type tubes. The And circuit of Fig. 113 is composed of two complete 6AL5 diodes, each having two inputs thereby constituting the unit a 4-way coincidence circuit. The unit of Fig. 114 employs a singular type 6AL5 tube and, as shown in that figure, constitutes a diode Or circuit having a pair of inputs. Fig. 115 constitutes an Or circuit having two type 6AL5 tubes, thereby providing four separate inputs.

The unit identified by the characters PR (Fig. 119) is a dual triode with low level inputs, and outputs capable of picking up relays.

Another unit which finds repetitious use throughout the system is the deflection increment unit, of which a series is used, providing different deflection increments. These units are designated throughout the block diagram as D1, D2, D3, D4, D5, D6 and D8, shown in Figs. 120 through 126, respectively. These units, taken in various combinations with each other, provide the deflection voltages which are applied to the deflection plates of the cathode ray tube storage memories for deflecting the cathode ray beam from one position to another within the storage tubes.

Figure 120:
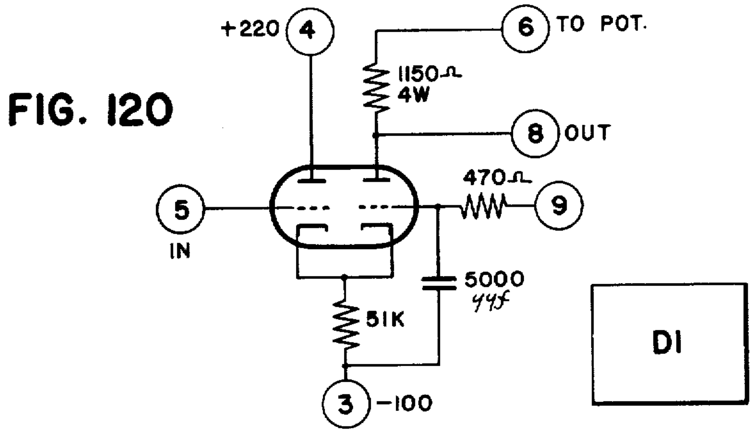
Figure 121:
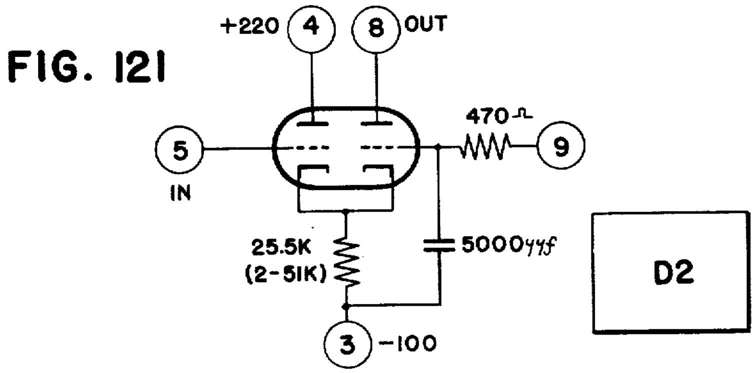
Figure 122:
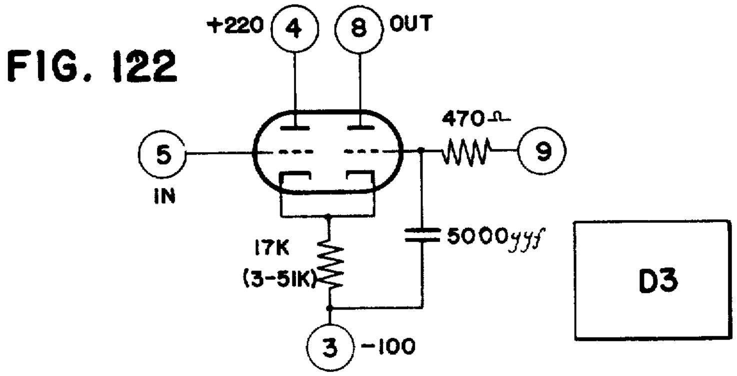
Figure 123:
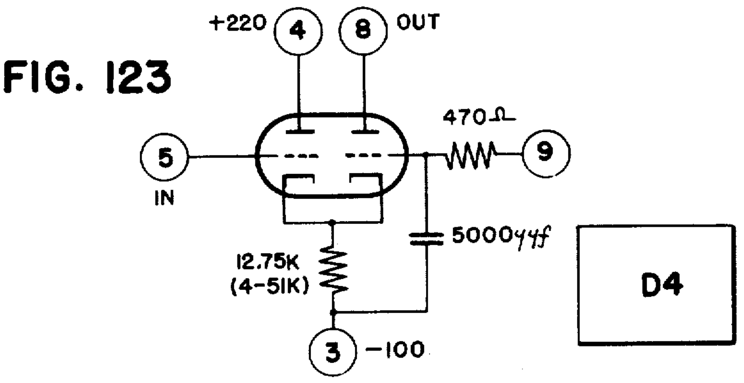
Figure 124:
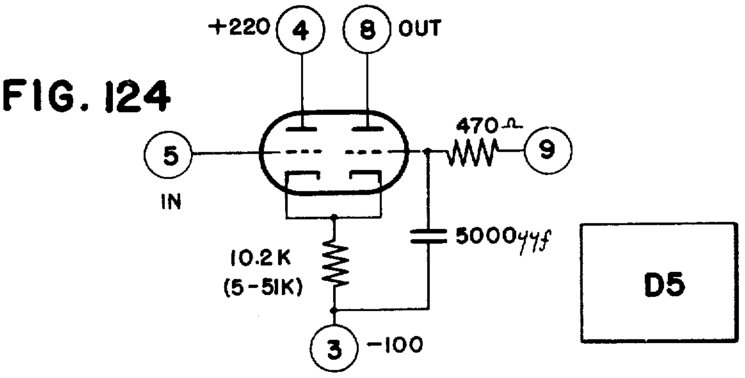
Figure 125:
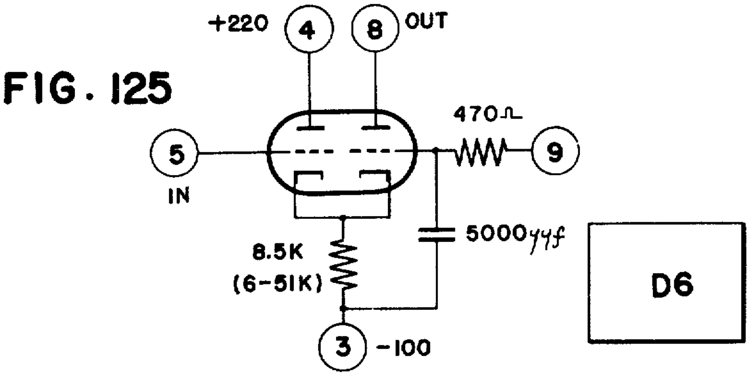
Figure 126:
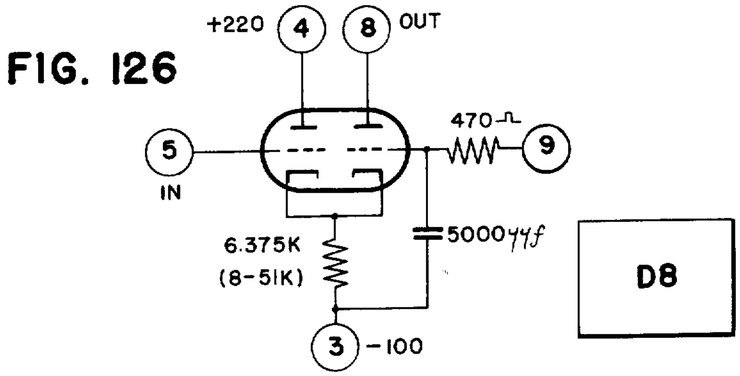

An understanding of all of the deflection increment units may be obtained by reference to the unit D1 (Fig. 120). In this unit the input pin 9 is connected to a common, very highly regulated power source. When the input pin 5 of this unit contains a positive voltage, current will flow from the voltage source at pin 3, through the cathode resistor, through the triode control by the input pin 5 and to the power source connected to pin 4. The cathode resistor in the deflection increment units is varied throughout the several units to obtain the required deflection voltage. All of these cathode resistors are therefore selected on the basis of close tolerances. It may be assumed that the unit D1 (Fig. 120) will provide a single increment of deflection, that the unit D2 will provide two increments of deflection, that the unit D3 will provide three increments of deflection, that the unit D4 will provide four increments of deflection, that the unit D5 will provide five increments of deflection, that the unit D6 will provide six increments of deflection, and that the unit D8 will provide eight increments of deflection.

When flow of current is established through the increment deflection units such as unit D1, for example, the cathodes common to the two triodes rise in voltage sufficiently so that the cathode becomes positive in respect to the control grid controlled by the regulated power source applied to pin 9 and, therefore, cuts off that triode. Thus during the time that the input pin 5 of any of the deflection increment units is positive, no current flows through the right half of the unit, and no deflection spot is selected. When the input pin 5 receives a negative pulse, the current flowing through the left half of the increment unit will be cut off, allowing the cathode to drop to a more negative voltage until such time as it drops to approximately the same voltage as that of the highly regulated source entering pin 9 of the unit, and will at this time allow current to pass through the cathode resistor, through the right-hand triode by way of the plate of the tube to the output pin 8. In respect to the deflection increment unit D1 (Fig. 120), there is a further output at pin 6 (not present in the units D2 through D8), which is filtered through a plate resistor when the right side of the triode conducts.

In the unit D3 (Fig. 122), for example, the input resistor in the grid lines of the right triode may be 470 ohms, the cathode resistor may be 17K ohms, while the condenser may having a capacity of 5000 micromicrofarads.

The output pins 8 of all of the increment deflection units associated with the horizontal deflection of the cathode ray beam are tied together and are used to drive deflection resistors associated with the deflection drivers. The increment units associated with the vertical deflection control likewise are in common with the deflection resistors associated with the vertical deflection units. The particular application of the increment deflection units in combination with their summing resistors will be pointed out as the description of the system's circuit proceeds.

The only difference between the several deflection increment units, as stated (with the exception of the second plate resistor and output in the unit D1), is in the size of the resistor that is in the cathode circuit of these units. It is these differences in the cathode resistance which determine the amount of power that may pass through the right side of the triodes, which in turn determines the deflection voltages generated by any of these tubes through the deflection resistors and through the deflection drive units, which in turn cause the cathode ray beam in the memory cells to be driven in any given direction, either through the process of effecting electrostatic storage or of reading out of memory any data stored in the cathode ray tubes at any given time.

Also included in the deflection control circuits are the units identified by the block diagram identifying symbols BSW, D0 and REG (Figs. 127 through 129, respectively). The unit identified by the block diagram identifying symbol BSW is the vertical bit sweep in the deflection control circuits. The unit D0 (Fig. 128) represents the vertical and horizontal deflection cathode follower output circuit, and the unit REG (Fig. 129) is the circuit for the deflection stabilizer.

All of the deflection circuits D1, etc., discussed hereinabove, including the units BSW and D0, may include a 12AV7 type tube. The unit REG is composed of a type 5651 diode.

DETAIL CIRCUIT DESCRIPTION

The description that is to follow is for the most part in reference to the block diagrams constituting the representation of the system circuitry. In these figures of the drawings, incompletely connected leads are identified by a compound reference numeral which indicates the figure number and the element in such figure to which the lead is connected. Thus: the signal RMI(A.0) is generated in the And circuit 310 of Fig. 133*a*, and is transmitted to the And circuit 313 in Fig. 139. Consequently, the lead from the And circuit 310 (Fig. 133*a*) is labeled "139—313" and the lead into the And circuit 313 (Fig. 139) is labeled "**133*a*—310.**" The first component of these compound reference numerals may, therefore, be interpreted as the number of the figure to which the lead is directed, and the second component identifies the unit in such figure to which the lead is connected.

*Machine cycle.*—When the machine is to be started up for an operation, the power-on key is first depressed which turns on line voltage to the power supply. After a time delay, during which various voltages stabilize and filaments of electronic tubes become hot, a power-on light will indicate that the machine is ready for operation. At this point the tape drive motors will all be energized in their normal fashion. The stop clutches for these drives will all be energized so that none of the tape reels can turn.

The operator depresses the machine reset key 250 (Fig. 130) as the first step at the outset of any given operation. Closure of the reset key 250 results in the resetting of all internal memory devices to their neutral position. This is done by disrupting the circuit normally used to energize the reset relay R19 (Fig. 130). When the reset relay R19 is deenergized, it will break the hold circuit for all relays within the machine and will also disrupt certain bias voltages, causing all trigger elements to return to their neutral position.

The relay points utilized in the resetting operation also shown in Fig. 130, connect the voltage source, through relay points R19–4 and R19–5, to terminal M*b* and M*a* which feed the elements to be reset. Upon release of the reset key, reset relay R19 is once again energized, and its points closed to complete a circuit from the voltage sources to internal circuits.

At this time the operator may insert a reel of input information onto tape drives T1 and T2. After the master reels have been inserted into the input drives, the output drives are scanned by the operator to ascertain that the proper tapes are in these drives. Ordinarily the tapes in the output drives will be any tapes that do not contain valuable data.

The operator will now insert the control panel into the machine, the panel having been previously wired to perform the operation to be accomplished. The machine is now ready to start the operation dictated by the control panel wiring. The operator will depress the start key 251 (Fig. 130). Upon depression of the start key 251, a circuit from a voltage source, through a series of relay points and keys, will allow energization of the start relay R15 (Fig. 130). In case an error condition exists in the circuits, or the reset key is depressed when the start key is depressed, the machine will not be able to complete the circuit.

There are a number of alternate ways in which the start relay R15 may be energized. If the single reel or non-stop hubs have been wired on the control panel, the relay points associated with these functions will be transferred and will cause the energization of a run-out relay R1 (Fig. 130). Upon energization of the run-out relay R1, a circuit will then be completed through the points R1–1 of the run-out relay R1, and from there to energize the start relay R15. The run-out relay R1 is energized before the start relay R15 by reason of the transfer of the R9–6 points of the enter single reel sort relay R9 when the start key is depressed. The start relay R15 is then picked up through the R1–1 points of the run-out relay R1.

Fig. 130 includes a number of other relays and their controls which may be considered at this point. The sort relay R10, which is energized through the sort hubs on the control panel is energized if a sorting operation has been wired on the control panel. Also shown in Fig. 130 are the single reel entry hubs. These hubs, if wired, will cause the energization of either a single reel-no sort relay R8, or an enter single reel sort relay R9. The single reel-no sort relay R8 is energized any time a single reel operation, such as a straight reproducing operation, is performed. If the sort hubs previously mentioned are wired on the control panel, the single reel-no sort relay R8 will not be energized. Also controlled via the single reel entry hubs is the enter single reel sort relay R9. The circuit for the enter single reel sort relay R9 is maintained through the R12–3 points, which allow energization of the enter single reel sort relay R9 during the first tape pass of a sorting operation only. This is necessary since after the first tape pass of a sort, if the records are not in proper sequence there will be two input reels on the second pass (T3 and T4). Therefore, a single reel sort is no longer a prevailing condition, with the result that the enter single reel sort relay R9 must be deenergized.

The circuitry for relay R12 is shown at the bottom of Fig. 130. It can be seen that relay R12 will pick up when the R7–2 points of a final tape mark relay R7 are closed and when the points R10–7 of the sort relay R10 are also closed. The points R10–7, associated with the sort relay R10, will be closed whenever the sort hubs are wired.

The final tape mark relay R7 will be energized upon full transfer of all information from the original input tapes to the output. The controls for the final tape mark relay R7 will be discussed at a later time.

When the start relay R15 (Fig. 130) is energized, it will close its R15–2 points (Fig. 131), thereby causing a start test trigger 252 (Fig. 131) to turn on. When the start test trigger is turned on, it transmits an impulse to a 100 microsecond single shot multivibrator 253. After its time delay, the single shot multivibrator 253 transmits an impulse to a run trigger 254.

Let it be assumed for the purpose of this discussion that the operation to be performed is to involve two input reels. When the run trigger 254 is impulsed, the potential from its output will be transmitted to inverter 255. The inverter 255 transmits a signal to a power unit 256 which energizes an idle relay R17. The idle relay R17 transfers and provides a hold circuit for the start relay R15, shown in Fig. 130. Further, the signal from the inverter 255 (Fig. 131) is transmitted to two switches 257 and 258 (Fig. 132).

A read/write cycle select trigger 259 (Fig. 132) is in its normal position (right side conducting as shown by the X), put there by depression of the machine reset key at the start of the operation. With the read/write cycle select trigger 259 in its normal position, its output pin 7 is at a low potential, and as a consequence no signal may get through the switch 258 (Fig. 132). However, the output pin 8 of the read/write cycle select trigger 259 is at high potential, so that the signal may get through the switch 257, from the switch to an inverter 260 (Fig. 131), and from there as the RMO(1.0) signal to stop any tape units that may be writing on tape at this time.

Figure 131:
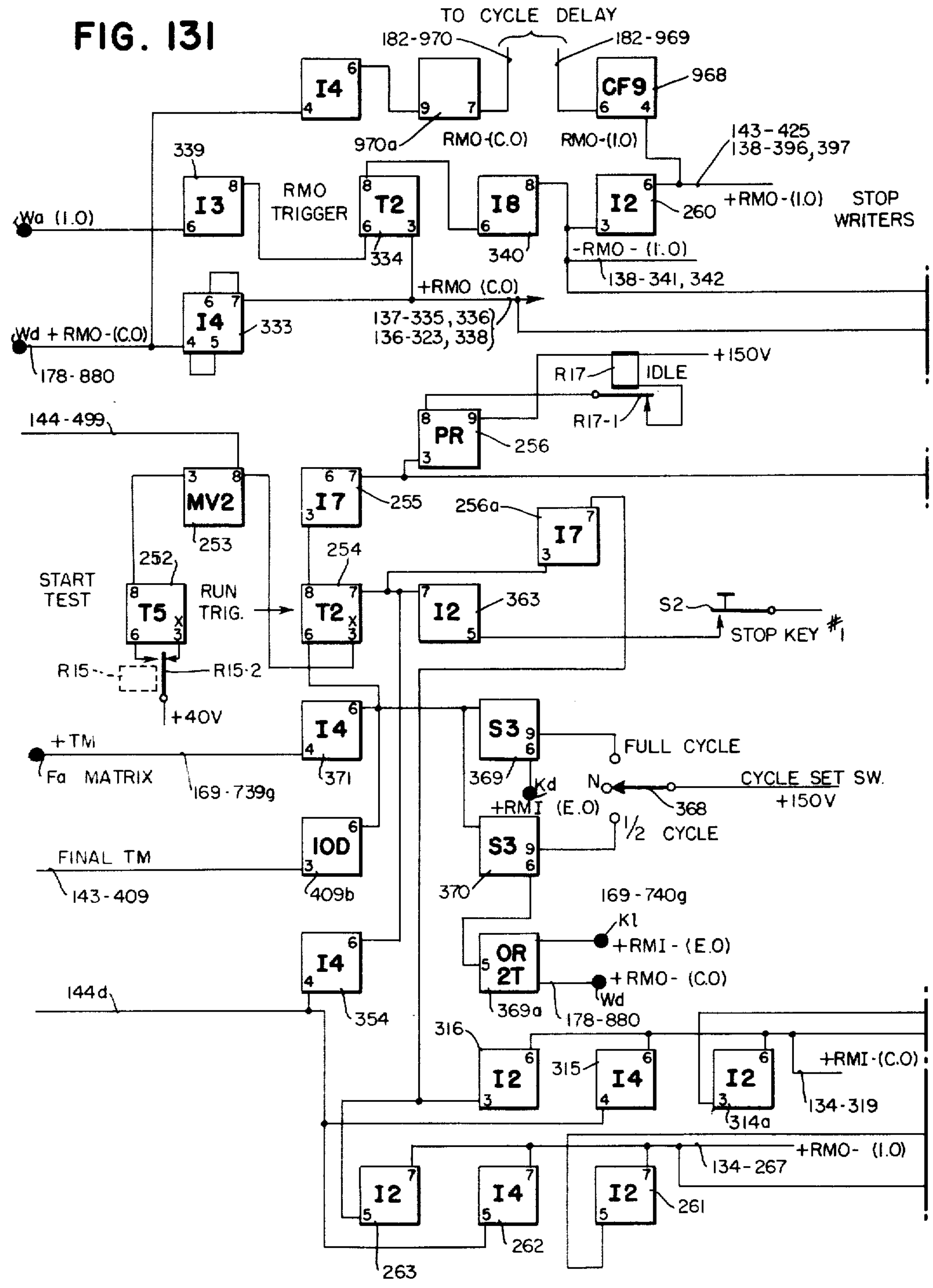

No tape units are writing on tape at this particular time, but this signal is nevertheless transmitted to the stop circuits. The signal from the switch 257 is also transmitted to an inverter 261 (Fig. 131). The operation of the inverters 261, 262 and 263 is such that no signal will be available at their common tie points until none of the three units is conducting. The inverter 263 had previously been deenergized when the run trigger 254 (Fig. 131) was turned on, via output pin 7 of the trigger and the inverter **256*a* (Fig. 131). The output of the inverter 256*a* in turn deenergized the inverter 263. The inverter 262 is connected to the error stop circuits, and since there is no error existing at the present time this unit is deconditioned. Thus, when the signal from the switch 257 reaches the inverter 261**, this signal is immediately available at the common tie points to drive further circuits.

Figure 132:
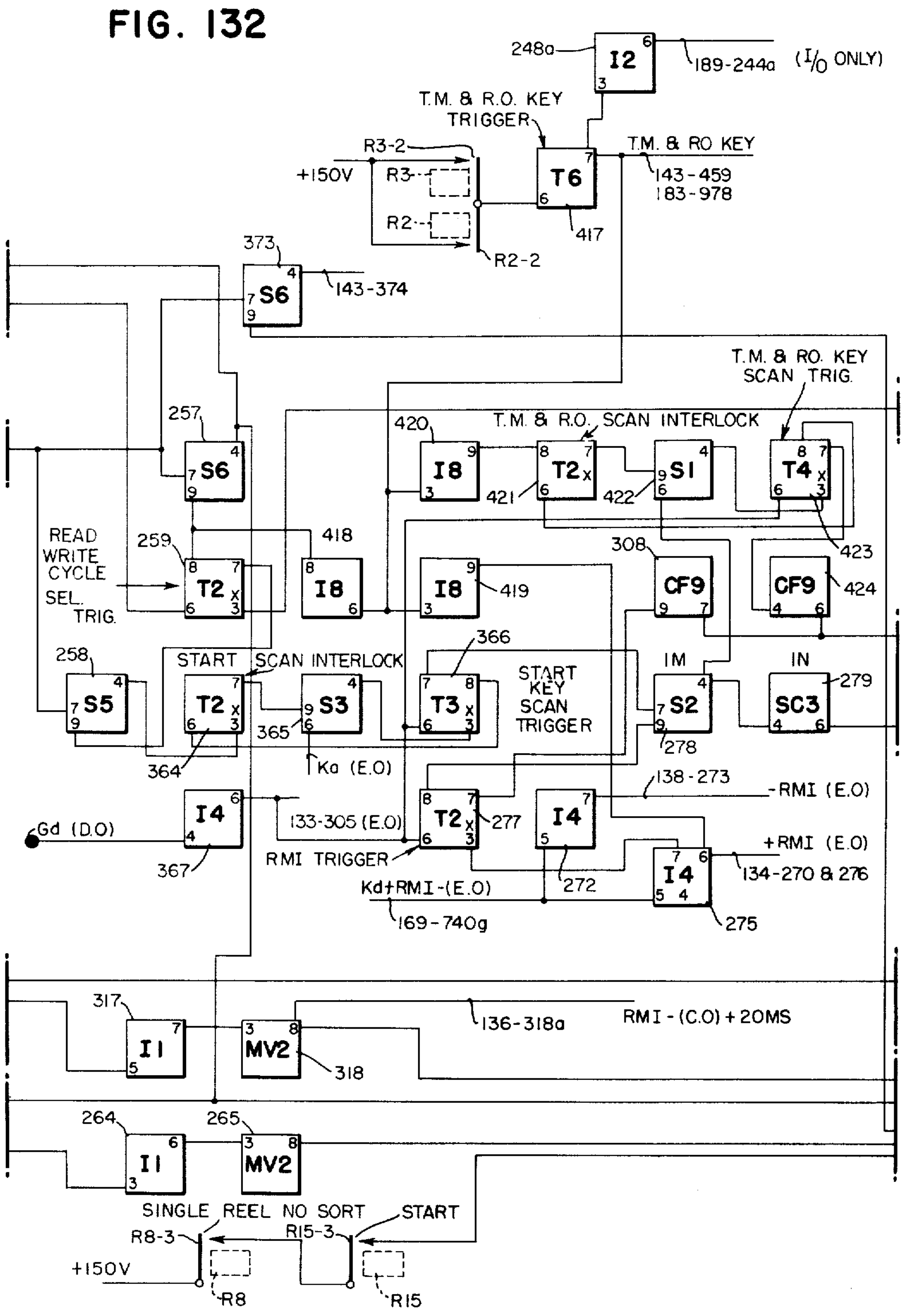
Figure 133:
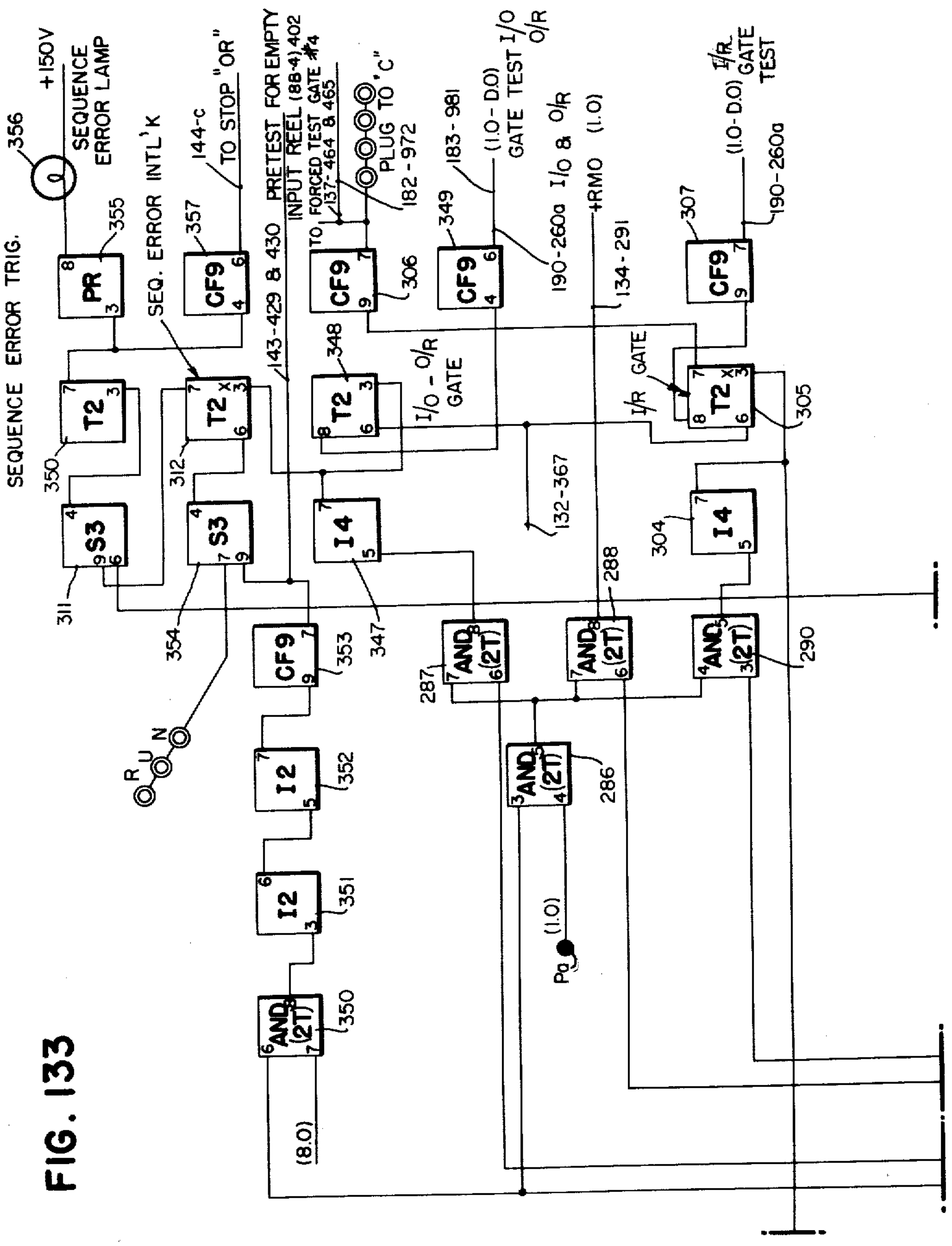
Figure 133A:
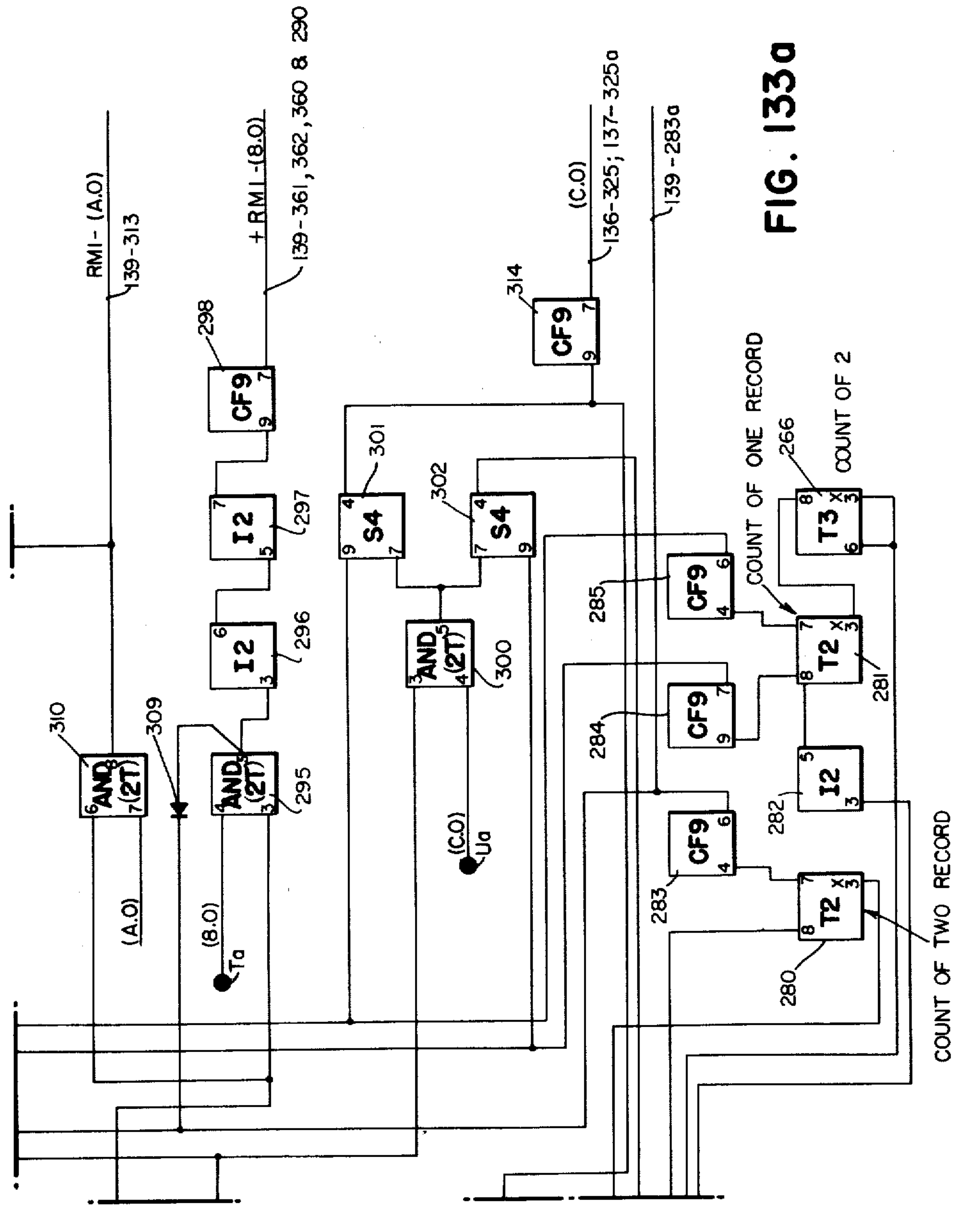

The inverter 261 pulses an inverter 264 (Fig. 132) and a single shot timing device 265 (Fig. 132). The timing device 265 operates a count of two binary trigger 266 (Fig. 133*a*). The pulse to the count of two trigger 266 (Fig. 133*a*) produces a count of –1–. The signal from the common tie points of the inverters 261, 262 and 263 (Fig. 131) is also transmitted to an inverter 267, Fig. 134, as the +RMO(1.0) signal, and from this unit to inverters 268 and 269.

When the reset button is depressed, a select T1 trigger 270 (Fig. 134) is reset "on" in such way that input tape drive T1 is the selected tape drive. The output of the select T1 trigger 270, pin 8, produces a signal which affects the inverter 268 (Fig. 134) to allow the +RMO(1.0) signal from the inverter 267 to pass through the inverter 268 to a power cathode follower 271, and from the cathode follower 271 to an edge terminal on the panel, from the edge terminal to the reversal relay point RR–1, through the normally closed points and out to the tape drive via external cable.

Let it be assumed at this time that tape drive T1 will receive this signal and start to run. Tape drive T1 will continue running until a record mark (RM) is sensed on tape at the end of the record and has been recognized and stored. When the record mark is recognized, a +RMI(E.0) pulse is delivered to terminal K1 (Fig. 131) and the terminal K*d* (Fig. 132). The manner in which the tape mark is recognized and how its signal is generated and utilized will be described in greater detail at a later time.

The +RMI(E.0) signal enters the inverter 272 (Fig. 132) and is emitted from its output pin 7 as the –RMI(E.0) signal which is transmitted to an inverter 273 in Fig. 138. The RMI(E.0) pulse passes through the inverter 273, through a cathode follower 274, to the points RR–5 and RR–7 of the reversal relay RR, through their normally closed points to tape drives T1 and T2. This signal causes the tape drive currently running to stop. The details of tape drive control will be described at a later time.

At this time one record has been loaded into memory M1 from tape drive T1. The information handling circuits used to perform the storage and comparison functions for this record will be described in a subsequent portion of this specification. At present it will be sufficient to consider the circuits for starting the machine and for keeping the tape drives in operation.

The +RMI(E.0) pulse that is transmitted through the inverter 275 (Fig. 132), is delivered to two places. From the output pin 6 of the inverter 275 the signal will be transmitted to the select T1 trigger 270 (Fig. 134), causing the setting of the select T1 trigger which was operated previously to select tape drive T1 as the input unit. The signal also goes to the select T2 trigger 276 (Fig. 134), but since this trigger has not yet been turned on, the pulse has no effect thereon.

It is necessary at this point to cause the selection of tape drive T2 in order to load a record from the tape therein into its associated memory M2. It is also necessary to disrupt the normal read/write cycle of the machine at this time, since the memory units have not yet been loaded, and as a consequence no record is available to be written on output tapes. This process will be described. The +RMI(E.0) signal emitted from the inverter 275 (Fig. 132) causes an RMI trigger 277 (Fig. 132) to be turned on. When the RMI trigger 277 is turned on, the signal from its output pin 8 is transmitted to a switch 278, through this switch to a cathode follower 279 and from there to a commutator shown in Fig. 133.

It may be helpful to describe at this time, but in general terms, the operation of a bit ring utilized in the storage of characters from tape. The bit ring referred to has a cycle time of eight microseconds. The bit ring (Fig. 153) is associated directly with memory functions. The carry pulse of the eight microsecond bit ring operates a character ring (Figs. 155 and 156), which has nine stages, namely, stages D, E, 1, 2, 4, 8, A, B and C. For every character stored, the nine stage character ring is normally homed to the D position, and is started off by control pulses from the character to be stored. Thus, when a record mark is sensed in the input character registers (to be described later), this character will be recognized and stored. To store this character, the bit ring must proceed from D to E and so on through to C, and from C back to D, where once again the ring is stopped. Let it be sufficient to say at this time that it is possible to derive nine timed pulses from the bit ring. The exact operation of the bit ring and the character ring will be described when the memory controls are discussed. The nine pulses emitted from the character ring are used in the commutator (Fig. 133) to cause various functions of the machine to take place in a timed sequence.

Figure 156:
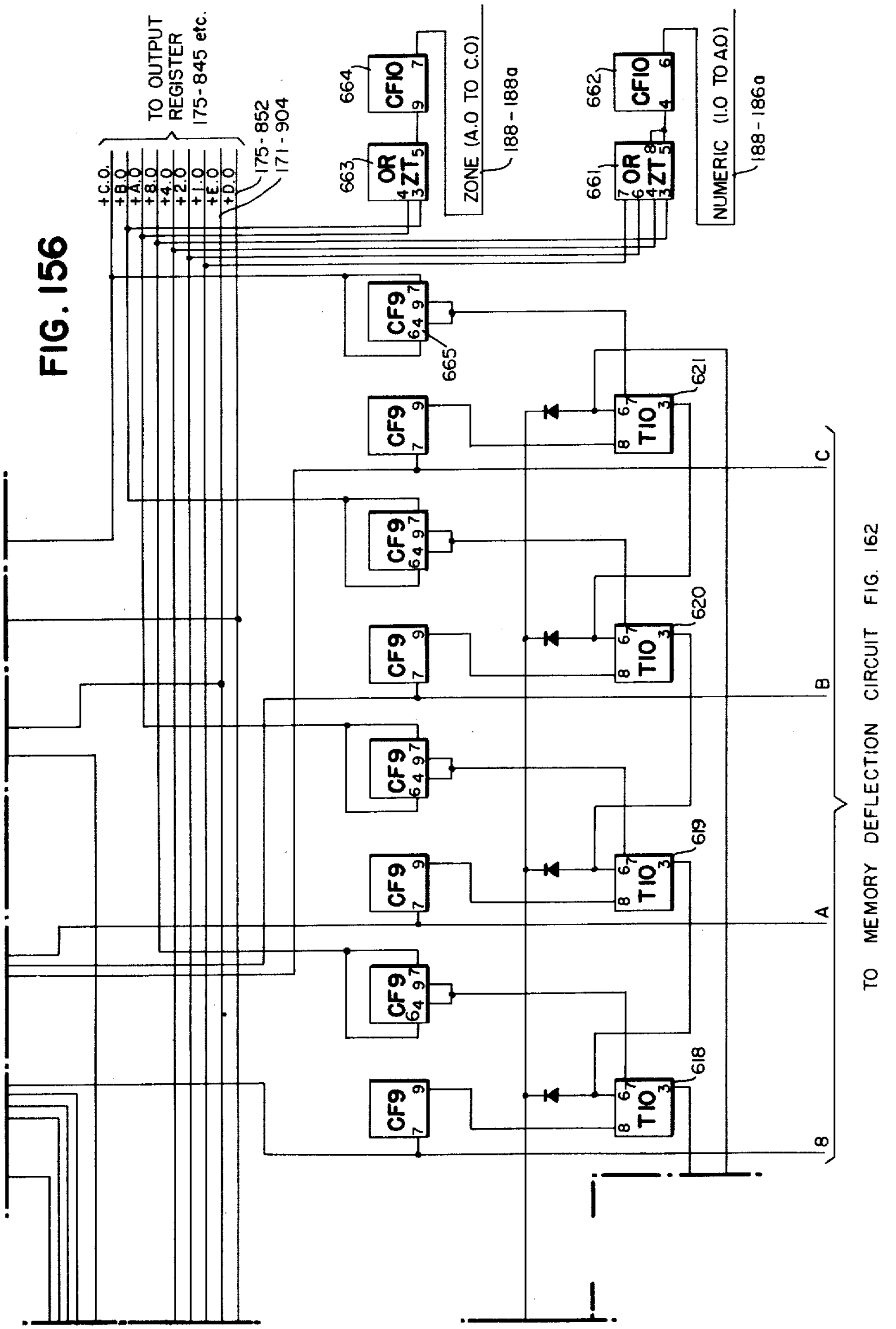

The nine character ring pulses are identified as the C.0, B.0, A.0, 8.0, 4.0, 2.0, 1.0, E.0 and D.0 pulses, respectively, as noted on the output lines of the character ring in Fig. 156.

The record mark in the character register is recognized at E.0 time, so that the commutating control from the cathode follower 279 (Fig. 132) starts at approximately E.0 time, leaving for commutating action all the pulses from 1.0 through C.0.

In order to disrupt the normal read/write routine of the machine, there is provided in Fig. 133*a* a series of elements comprising the count of two record trigger 280 and the count of one record trigger 281, inverter 282 and cathode followers 283, 284 and 285. The setting of these elements determines that a certain commutating action will take place. The count of two record trigger 280 and the count of one record trigger 281 are reset to their normal position at the start of the machine operation and are, therefore, now in their reset position, since they have not yet been impulsed from any external source. Thus, the 1.0 signal present at the edge terminal P*a* (Fig. 133) will enter the coincidence And circuit 286 and pass through this coincidence unit to the coincidence units 287, 288 and 290. This signal cannot be transmitted through the unit 287, since the conditioning pulse at pin 6 has not been provided by the cathode follower 283 (Fig. 133*a*), the cathode follower 283 in turn being controlled by the count of two record trigger 280 (Fig. 133*a*). This trigger, as just previously mentioned, was reset at the start of the operation and has not yet been operated.

The signal from And circuit 286 (Fig. 133) cannot get through the coincidence unit in 290, because the input pin 3 likewise has no pulse from the cathode follower 285 (Fig. 133*a*), the cathode follower 285 in turn being controlled by the count of one trigger 281 (Fig. 133*a*). The count of one record trigger 281 was also reset at the start of the operation and has not yet been operated. Thus, the signal from the And circuit 286 (Fig. 133), pin 5, can be transmitted only through the coincidence circuit 288, via pin 7 and output pin 8 as the signal +RMI(1.0) to go through the inverter 291 (Fig. 134), and through a switch 292, to cause the select T2 trigger 276 (Fig. 134) to be turned on as well as its associated trigger 294. Thus, the select T2 trigger 276 (Fig. 134) conditions the inverter switch circuit 269 via its output pin 8.

As the bit ring progresses from 1.0 time to 2.0 time to 4.0 time and then to 8.0 time, other coincidence circuits in Fig. 133*a* will be conditioned to conduct. A coincidence circuit 295 (Fig. 133) will now allow an 8.0 pulse to pass through it, through the inverters 296 and 297 to the cathode follower 298, and from thence to the switch 290 (Fig. 139) as the signal RMI(8.0). At this time no pulse will be available at the fed hubs on the control panel, and as a consequence the RMI(8.0) signal cannot get through to operate the trigger 482.

As the bit ring progresses from 8.0 time to A.0 time, no further action will take place. The bit ring progresses from A.0 time to B.0 time and thence to C.0 time. At C.0 time the coincidence And circuit 300 (Fig. 133*a*) will allow the C.0 pulse to pass from the edge terminal U*a* to the switches 301 and 302. As previously mentioned, the count of one record trigger 281 has not yet been operated, so that its output pin 7 does not transmit a pulse through the cathode follower 285. The switch 301 is, therefore, not conditioned and will thus prevent the C.0 pulse from passing therethrough. The count of one record trigger 281 emits a pulse from its output pin 8 which passes through the cathode follower 284, input pin 9 and via output pin 7, to the switch 302. Thus, the C.0 pulse when emitted from the coincidence unit 300 may pass through the switch 302 and to the inverter 261 (Fig. 131).

The circuits associated with the inverters 261, 262 and 263 have been previously described. It is sufficient to say that the C.0 pulse may get through this unit and once again operate two circuits, the one shown in Fig. 132, comprising the inverter 264, the timing device 265, and the binary count of two trigger 266 (Fig. 133*a*). The count of two trigger 266 previously received one impulse. Since the trigger is a binary element, the second pulse sensed thereby will cause it to return to its original condition, producing a count of two impulse which is transmitted from its output pin 8 to the input pin of the count of one record trigger 281, turning this trigger on.

The pulse emitted from the inverters 261—263 (Fig. 131) also goes to the inverter 267 (Fig. 134), and is transmitted therethrough to the inverter switch 269. The inverter switch 269 has been previously conditioned by the turn-on of the select T2 trigger 276. Thus, this pulse may be emitted from the inverter switch 269, through the cathode follower 303, through the RR–3 points of the reversal relay RR, normally closed, to the R9–2 points of the enter single reel sort relay R9, and through the normally closed points, to operate the tape drive T2 start circuit. If a single reel operation is not wired on the control panel, the enter single reel sort relay R9 will be deenergized to allow completion of this circuit. If a single reel operation has been wired on the control panel in conjunction with a sorting operation, then the R9–2 points of the enter single reel sort relay R9 will have transferred, so that the circuit to tape drive T2 will be disrupted and a circuit completed through the normally open R9–2 points of the enter single reel sort relay R9, through the R10–2 points of the sort relay R10, and through this point back to a common tie point of the RR–1 points of the reversal relay RR, and from thence to cause tape drive T1 to once again feed. In either case the record that will be read after this start signal will be stored in memory M2. The circuitry required for storage will be described at a much later point.

The record mark trigger 277 (Fig. 132), which was turned on by the RMI(E.0) pulse will be turned off at D.0 time of the character ring. Once again an input drive, presumably tape drive T2, will be running and will sence a record, character by character, eventially sensing a record mark at the end of the record. Once again the record mark will be recognized at E.0 time, and the signal +RMI(E.0) will be transmitted to terminal K*d* (Fig. 132) at E.0 time.

A circuit will now be completed through the inverter 272 (Fig. 132) to cause the input tape drives to stop as previously described. Once again the select T1 and select T2 triggers will also be reset (triggers 270 and 276, Fig. 134). The record mark trigger 277 (Fig. 132) will once again be turned on. The record mark trigger 277 will transmit a pulse from its output pin 8, through the switch 278, and via the cathode follower 279 to the commutator ring (Fig. 133), where once again the timing pulses scan the operation to be performed.

The procedure during this operation will be somewhat different than that followed in the first operation, since the count of one record trigger 281 (Fig. 133*a*) has been turned on prior to this time. Therefore, the circuits that had been conditioned by the output of the cathode follower 284, via its output pin 7, will now be deconditioned, and those units controlled by the output of the cathode follower 285, via its output pin 6, will now be conditioned to conduct. Thus, the procedure will change.

Figure 134:
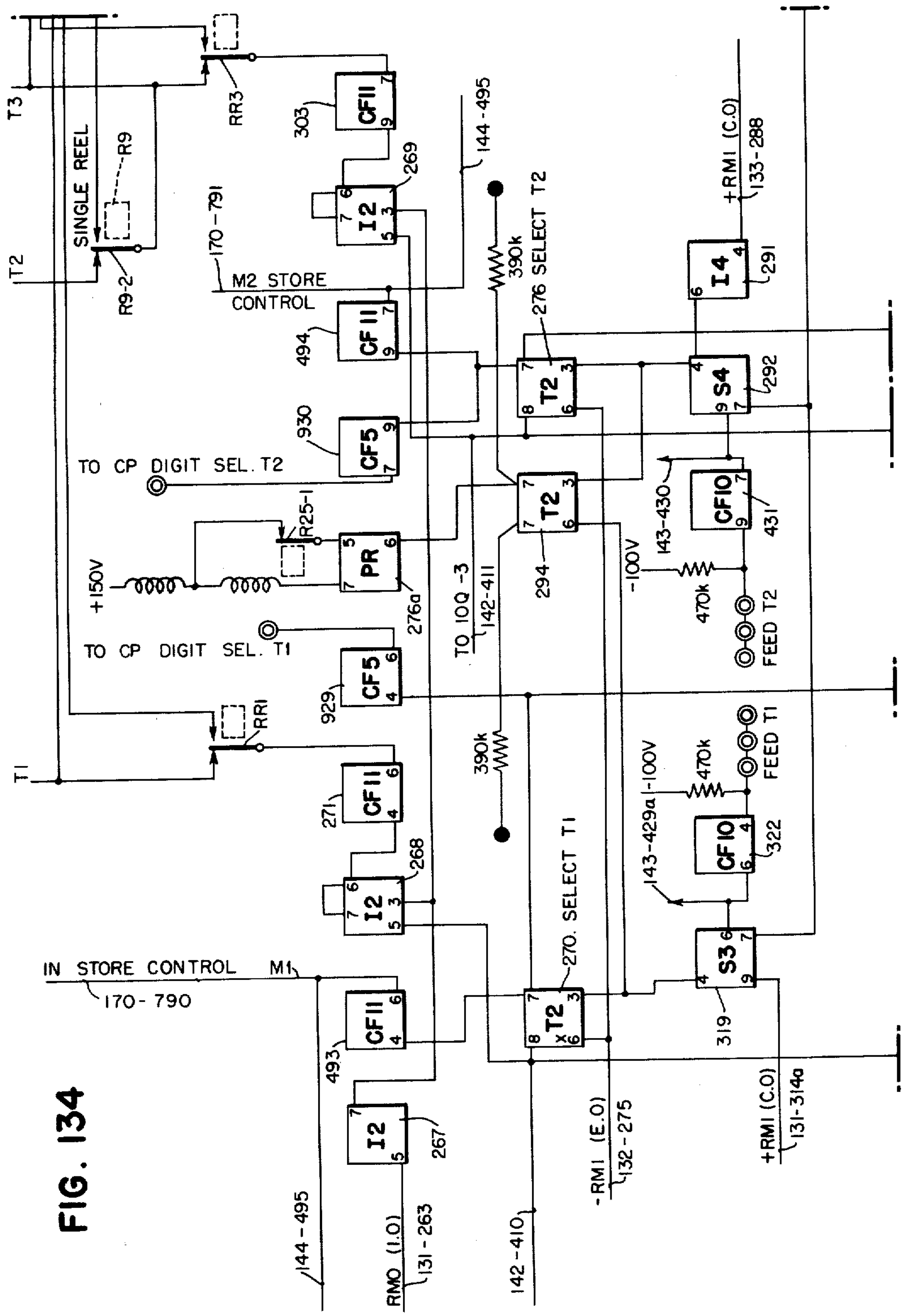

The record mark trigger 277 (Fig. 132) is turned on at E.0 time of the character cycle. At 1.0 time of the cycle, the signal available at edge connector P*a* (Fig. 133) will be transmitted through the coincidence circuit 286, output pin 5, and will be transmitted to the coincidence circuit 288, pin 7, to the coincidence circuit 290, pin 4 and to the coincidence circuit 287, pin 7. Previously a signal had been allowed to pass into the coincidence circuit 288, pin 7, and therefrom at output pin 8, to allow setting of the select T2 trigger 276 (Fig. 134).

On this cycle, however, the coincidence unit 288 cannot conduct, since its input pin 6 has been deconditioned by the count of one record trigger 281. The coincidence unit 287, input pin 6, is still not conditioned to conduct since the count of two record trigger 280 has not been operated. The coincidence unit 290, pins 3 and 4, however, may now pass the 1.0 signal, since its pin 3 has now been conditioned by the pulse from the count of one record trigger 281 (Fig. 133*a*). Thus, the signal leaves the switch 290, through its output pin 5, to the inverter 304, and from thence to a trigger 305 which will now be turned on. The output pulse from inverter 304 will also operate the read/write cycle select trigger 259 (Fig. 132). The read/write cycle select triggers serves no purpose at this time, since it acts only as a memory of whether a reading or a writing cycle should be executed upon the resumption of operation after an interruption of operation for any reason.

From the trigger 305 (Fig. 133), output pin 7, the pulse is transmitted to a cathode follower 306, and the output pin 7 of the cathode follower 306 transmits its pulse to the plug to C hubs on the control panel. The signal is also transmitted from the output pin 8 of the trigger 305 to a cathode follower 307, and from thence to the comparator circuits to interrogate the decisions of the comparators, as to be described in detail at a later point herein. It is sufficient at this point to mention that this pulse is emitted from the trigger 305, and is transmitted to these outlying units to provide comparison indications at the control panel. It is also sufficient to say that at this time the control panel will emit a pulse from the input comparators, indicating which of the two records now in memory is the higher or lower. This pulse is wired on the control panel either directly or through selectors to control selected output drives and to select a new input drive.

The character ring (Figs. 155–156) will progress from 1.0 time to 8.0 time. The circuits initiated from the coincidence unit 295 (Fig. 133*a*) will still be inoperative because the run hubs (Fig. 133) have not yet received a run signal. At 8.0 time the coincidence unit 295, with the input pin 3 now conditioned by the record mark trigger 277 (Fig. 132), output pin 7, via the cathode follower 308, will not allow the 8.0 pulse to pass therethrough because of the diode connection 309 from the output pin 5 to the line from the cathode follower 283 controlled by the count of two record trigger 280. The count of two record trigger 280 has not yet been turned on, and as a consequence inactivates the coincidence circuit 295.

The character ring advances from 8.0 time to A.0 time, and at this time a coincidence is set up through the unit 310 (Fig. 133*a*), since pin 6 has been conditioned by the cathode follower 308 (Fig. 132) and the RMI trigger 277, to allow this pulse to pass through the coincidence circuit 310 (Fig. 133*a*), to a switch 311. This pulse will not pass through switch 311 (Fig. 133), since a sequence error interlock trigger 312 has not yet been turned to its On position.

The pulse from the And circuit 310 (Fig. 133*a*) will also pass into an And circuit 313 located in Fig. 139 as the +RMI(A.0) signal. The unit 313 is a coincidence circuit adapted to sense a discrepancy between feed and fed hub signals.

Up until this time the circuits associated with the feed-fed check presumably have been operating correctly, thus not allowing a pulse to pass the And circuit 313 which would stop the machine and indicate an error. If the machine had not operated correctly, the +RMI(A.0) signal would pass through the And circuit 313, would stop the machine and indicate an error. A full description of the circuitry for the feed-to-fed check function will be given at a later time.

The character ring advances from A.0 time to C.0 time. At this time the coincidence unit 300 (Fig. 133*a*) will allow this signal to pass therethrough and via its output pin 5 to the switches 301 and 302. The count of one record trigger 281 has been operated previously. Therefore, the cathode follower 284 via its output pin 7 has deconditioned the switch 302 so this pulse from the coincidence unit cannot pass through it. The cathode follower 285 via its output pin 6, however, conditions the switch 301 to allow the pulse from the coincidence unit 300 to pass through output pin 4 to a cathode follower 314 and to the inverter **314*a* (Fig. 131). At this time, therefore, the inverter 314*a* has its input pin 3 conditioned. Presumably no error has occurred in the machine, and as a consequence an inverter 315 (Fig. 131) has been conditioned to allow the pulse from the inverter 314 to pass through. The machine, still in running condition, conditions an inverter 316, input pin 3, to likewise allow this pulse to pass through. Thus, the +RMI(C.0**) pulse passes through these inverters and goes to two different circuits.

One circuit to which the +RMI(C.0) signal is delivered includes an inverter 317 (Fig. 132), pin 5, the single shot timing device 318, and the count of two record trigger 280 (Fig. 133*a*), which is turned on thereby. The alternate circuit from the outputs of the inverters 314, 315 and 316, pins 6, includes the switch 319 (Fig. 134) to which the RMI(C.0) signal is transmitted. The RMI(C.0) signal will test the switches 319 and 292 (Fig. 134) and 320 and 321 (Fig. 137), passing through only those switches which are conditioned to conduct by control panel wiring of the input comparator output to select the tape drives. The character ring advances from C.0 to D.0 time, at which time the RMI trigger 277 (Fig. 132) is turned off.

Figure 136:
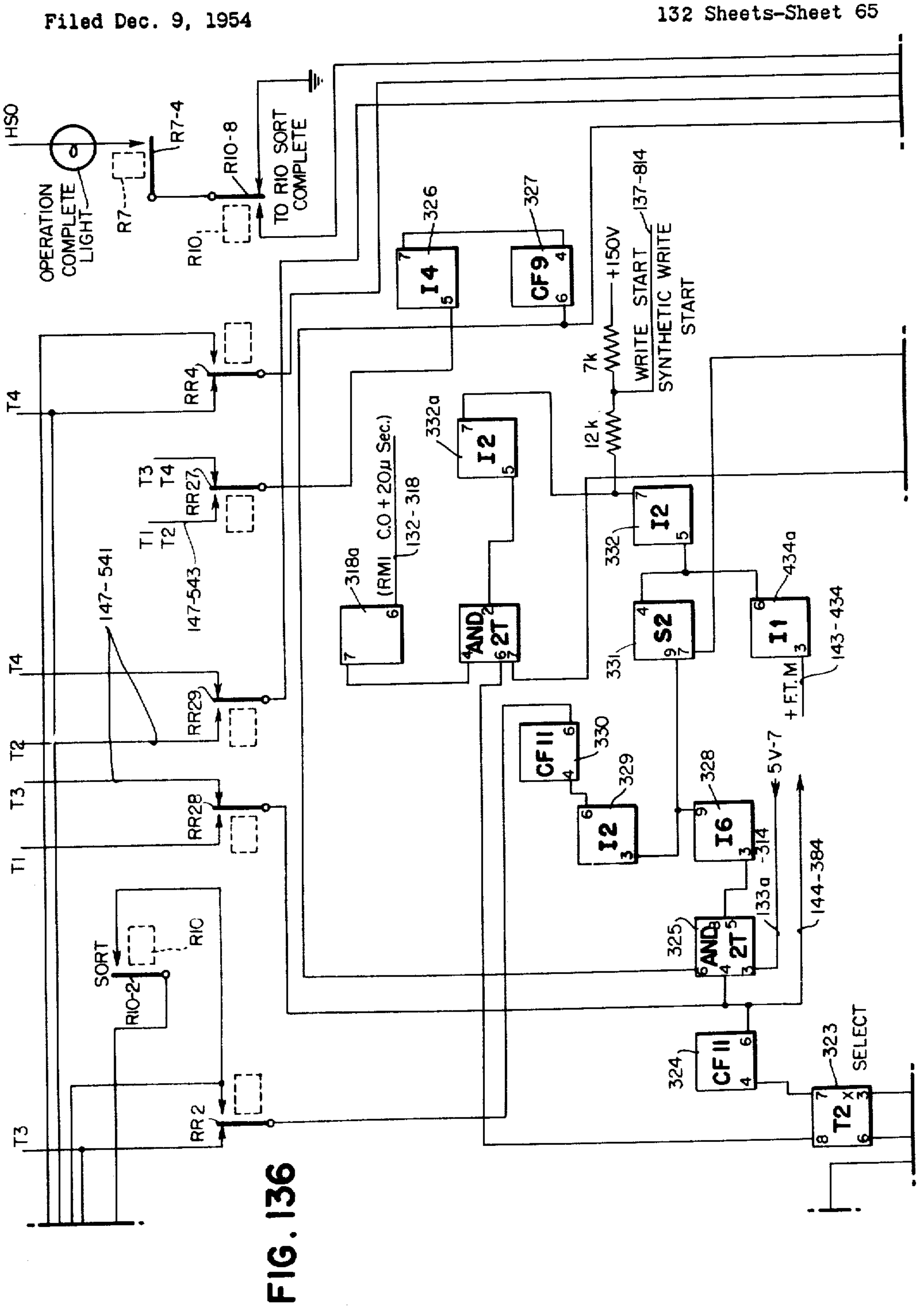

Let it be assumed that the results emitted from the input comparator have been control panel wired directly through selectors to cause selection of input tape drives. For purpose of this discussion, tape drives T1 and T3 alone will be considered. The circuitry associated with tape drive T2 is in all respects identical with that of tape drive T1, while the circuitry associated with tape drive T4 is identical with that associated with tape drive T3. Thus, the feed T1 hubs (Fig. 134) will be energized and will pass a pulse through a cathode follower 322 to one input of the switch 319. The RMI(C.0) signal, just previously generated, enters pin 9 of the switch 319 and is allowed to pass therethrough to turn on the select T1 trigger 270. The output pin 8 of the select T1 trigger conditions pin 5 of the inverter 268 to allow the RMO(1.0) pulse to pass through it when this signal is available at a later time. The RMI(C.0) pulse enters switch 319 at pin 9 and is emitted therefrom at pin 7, and from there it is transmitted to the switch tube 292, where it cannot pass since the feed T2 hubs have not been energized. But the signal will pass to the switch 320 (Fig. 137) which had been energized, since tape T3 is the selected unit. Tape T4 not having been selected, there will be no gating pulse to allow the +RMI(C.0) signal to pass through switch 321. The signal passing through the switch 320 operates the select trigger 323 (Fig. 136).

The signal from the output pin 7 of the select trigger 323 is transmitted through a cathode follower 324, and from thence to two locations, one being input pin 4 of a coincidence unit 325. The second circuit effected by the pulse includes the RR–28 points of the reversal relay RR, normally closed, and those of the tape drive T3 via external cable. This signal functions to test the tape drive to insure that it is in condition to record a record. The description at a later point will deal with the control circuitry within the tape drives. For the present, let it be assumed that the tape drive is in condition to run and as a consequence a signal is returned via external cable, through the RR–27 points (Fig. 136) of the reversal relay RR, to the inverter 326, and via cathode follower 327 and from there to pin 6 of the coincidence unit **325*a***.

The third input to the coincidence unit **325*a*, pin 3, comes from the cathode follower 314** (Fig. 133*a*), and acts as an interlock to allow the test signal from the cathode follower 324 (Fig. 136) to go to the tape drive and to be returned via the described circuit to pin 6 of coincidence unit **325*a*. Thus, if the tape drives are ready to record a record, the pulse from the cathode follower 324 will be transmitted through the coincidence unit 325*a***.

If for any reason tape drive T3 is not ready to record a record, the failure of a ready signal at pin 6 of the coincidence circuit 325 will not allow the signal to pass therethrough. When the coincidence circuit 325 is properly conditioned, a pulse will be emitted therefrom to an inverter 328 and therefrom through an inverter 329, through a cathode follower 330, through the reversal relay point RR–2, normally closed, and from there through external cables to start tape drive T3. The instruction to start the tape drive is also transmitted from the output of the inverter 328, pin 9 (Fig. 136), to a switch 331, through this switch, through the inverter 332, and through the resistor network associated therewith, to generate a Write Start and Synthetic Write Start signal which is transmitted to other circuits associated with the memory system to cause the writing circuits to be organized. A more detailed description of these circuits will be included in a following discussion of memory switching.

Let it be assumed that this tape drive is ready and that a record is being written thereon via the writing circuits. The writing process will continue until the record mark associated with the end of the record being written is sensed in the output registers. The record mark will be recognized and the RMO(C.0) recognition signal will be transmitted via the edge connector W*d*, Fig. 131, to an inverter 333. The RMO(C.0) signal passes through the inverter 333 to operate a multiplicity of circuits. It will turn on the RMO trigger 334. It will also operate the read/write cycle select trigger 259 (Fig. 132). It will also pass to Figs. 137 and 136 where it is applied to triggers 335, 336 and 338 (Fig. 137) and trigger 323 (Fig. 136). Since the triggers 335 and 336 (Fig. 137) have not yet been operated, the RMO(C.0) signal has no effect thereon. The trigger 323 (Fig. 136) which was previously turned on by the selection of tape T3 as an output unit, will now be turned off.

When the character ring emits a 1.0 time signal, it will be sensed at the edge connector W*a* (Fig. 131), will pass through an inverter 339, and will cause the RMO (record mark output) trigger 334 to be turned off. When the RMO trigger is turned off, a pulse is emitted from its output pin 8 which, passing through an inverter 340, is transmitted to several circuits. The RMO(1.0) signal is passed through the inverter unit 260 (Fig. 131), and also to the inverters 341 and 342 (Fig. 138). Since triggers 343 and 344 (Fig. 138) have never been operated, the RMO(1.0) signal will pass through the inverters 341 and 342, through the cathode followers 345 and 346, and from there through the RR–6 and RR–8 points of the reversal relay RR, normally closed, and via these points through the external cables to stop both tape drives T3 and T4. Since the tape drive T4 has not been running, this signal will have no effect thereon. However, tape drive T3 which has been running will be stopped.

In Fig. 131 the RMO(1.0) signal from the inverter 340 also passes to the inverter 261 (Fig. 131), input pin 5. Once again a coincidence of three pulses is required to pass this pulse through the unit. Let it be assumed that no machine error exists at this time so that the inverter 262, pin 5, will be properly conditioned. If it is also assumed that the machine is still in running condition, i.e. the stop key has not been depressed, the inverter 263, input pin 5, will also be properly conditioned to allow the RMO(1.0) signal to pass through this coincidence circuit. Once again the signal will pass through the inverter 264 (Fig. 132) and the multivibrator 265, to operate the count of two trigger 266 (Fig. 133*a*). Hereafter, all RMO(1.0) signals will pass through this circuit and will have no further effect on the machine operation.

From the coincidence unit 263, output pin 7 (Fig. 131), the RMO(1.0) signal is also transmitted to the inverter 267 (Fig. 134), passing through the inverter 267 to the inverters 268 and 269.

The control panel is wired to select tape drive T1 as an input unit, and as a consequence the select T1 trigger 270 (Fig. 134) has been turned on, conditioning its output pin 8 to allow the RMO(1.0) signal to pass through the inverter 268, through the cathode follower 271, through the normally closed points RR–1 of the reversal relay, and via external cables to cause tape drive T1 to run.

From this point the description of the machine cycle will be representative of every machine cycle hereafter encountered until the completion of the data processing operation being performed. It is to be noted that the count of two record trigger 280 and the count of one record trigger 281 (Fig. 133*a*) have now both been turned on. Tape drive T1, being started up as the input unit, will read the record from its tape. The record will be stored in memory, and eventually a record mark will be sensed from tape, indicating the end of the record being read. The RMI(E.0) pulse generated upon reading of a record mark, as previously described, will enter terminal K*d* (Fig. 132) and will enter the inverter 272, passing through it to the inverter 273 (Fig. 138), passing through the inverter 273, through the cathode follower 274, and through the RR–5 or the RR–7 point of reversal relay RR, normally closed, to stop the input drive.

The RMI(E.0) signal will also pass from the K*d* terminal (Fig. 132) through the inverter 275, from thence to the select T1 trigger 270 (Fig. 134), and to the select T2 trigger 276, resetting these triggers to their Off position. From the inverter 275 (Fig. 132), the RMI(E.0) signal at output pin 7 will also turn on the RMI trigger 277.

In recapitulation, therefore, it may be noted that the following has occurred (although not fully described) in the immediate past. The operator has loaded two reels of tape containing input information into the input drives, has reset the machine, and has depressed the start key. The machine has started to operate, forced tape drive T1 to read a record into its associated memory M1, tape drive T1 has been caused to stop and tape drive T2 to start, reading a record from tape drive T2 into its associated memory M2. In response to the comparison indication of these two records, one of the two records has already been written on an output tape (tape T4). Upon completion of this writing operation, tape drive T1 was selected as an input tape via control panel wiring. Tape drive T1 has read its record into memory M1, and during the time that this record was being stored in memory M1, the normal comparison procedure has taken place. The comparison process at this point, for the first time, has compared the input record with a previous record which has been transcribed to an output tape, the input record has been compared with a record remaining in one of the memories, and the transcribed record has been compared with the record remaining in memory, thus forming three different comparisons. The comparison circuits have not been described. Let it be sufficient to say that the results of the three mentioned comparisons are stored in triggers associated with each of the comparators and can now be made available at the control panel.

Moreover, all the check circuits are now activated, since the machine will now enter its normal routine where every cycle will be identical with any other cycle in all respects, except as to the tape drives which are selected. Routine operation will now proceed until a tape mark is sensed from one of the input drives, or until the machine is stopped for any reason.

In Fig. 132, the RMI trigger 277 has just been turned on. The RMI trigger will transmit an impulse to pin 9 of the switch 278, and the switch will transmit the pulse through the cathode follower 279 which delivers the pulse to the commutator circuit of Figs. 133 and 133*a*. Once again at 1.0 time of the character ring the coincidence unit 286 (Fig. 133), with the input pins 3 and 4 conditioned, will allow the 1.0 pulse to pass through its output pin 5 to the coincidence units 287, 288 and 290 attached to it. Prior to this time these signals had been allowed to pass through the coincidence units 287 and 288 with the input pins 6 and 7 thereof conditioned after the first record was loaded from T1.

At this time the pulse emitted from the output pin 5 of the And circuit 286 will be passed through the coincidence unit 287, since the count of two record trigger 280 and the count of one record trigger 281 have been operated. Thus, the 1.0 pulse will pass through the coincidence unit 287, output pin 8, to an inverter 347, and from the inverter 347 to operate the sequence error interlock trigger 312 and the I/O–O/R gate trigger. The I/O–O/R gate trigger 348 emits a signal from its output pin 8 to the cathode follower 349, through its output pin 6, to the edge terminals from where it is transmitted to test the decision of the I/O and O/R comparators, making these signals available at the control panel. These circuits will be discussed at a later time.

The sequence error interlock trigger 312 is provided for the purpose of noting any error that may have occurred in the sequence of records on tape. From the coincidence unit 286, output pin 5, the signal is also transferred through the coincidence unit 290, output pin 5, and through the inverter 304 to the I/R gate trigger 305. The I/R gate trigger 305 in turn emits a (1.0–D.0) I/R Gate Test signal from its output pin 8, through the cathode follower 307, to the edge connectors, from where it is transmitted to test the decision of the I/R comparators. A signal is also transmitted from the I/R gate trigger 305, output pin 7, to the cathode follower 306, through its output pin 7, via its edge connectors to the control panel plug to C hubs. Thus, at 1.0 time the I/O–O/R gate trigger 348 and the I/R gate trigger 305 are turned on and establish gate signals which are transmitted through internal circuitry and provide a relatively long time signal at the comparator exits which may be used either through selectors or directly to control further operations of the tape drives (to be described).

As the character ring advances from 1.0 to 8.0 time, a checking sequence is inaugurated. A coincidence unit 350 (Fig. 133) transmits the 8.0 pulse, via its output pin 8, through the inverters 351 and 352, and via the cathode follower 353 to the input pin 9 of a switch 354. At this time there must be a signal available at the run hubs to indicate that the sequence of incoming records is correct. The signal generally comes from either the sequence comparator or from the plug to C hubs. If this signal is available at the run hubs, the 8.0 pulse transmitted from the cathode follower 353 will pass through the switch 354 and cause the sequence error interlock trigger 312 to be turned off. If there is no run signal available, the sequence error interlock trigger 312, previously turned on, will allow the A.0 signal, which comes at a later time through the coincidence unit 310 (Fig. 133*a*), output pin 8, to be transmitted through the switch 311 (Fig. 133), and will cause sequence error trigger 350 to be turned on. This trigger transmits a signal in turn from its output pin 7 to a power unit 355 to cause a sequence error lamp 356 to indicate a sequence error.

Moreover, a signal will be transmitted from the output pin 7 of the sequence error trigger 350 and through a cathode follower 357 to cause the error circuits to stop further operations. This is done by emitting a signal from cathode follower 357, output pin 6, to the inverter 262 (Fig. 131), pin 5, as well as to the inverters 315, pin 4, and 354, pin 4. The run trigger 254 (Fig. 131) will be turned off by the pulse from the inverter 354, output pin 6.

An alternate circuit is established from the output of the cathode follower 353 (Fig. 133), pin 7, to And circuits 429 and 430, pins 4 (Fig. 143). This circuit (Fig. 143) is designed to indicate that an operation is complete. The operation of this circuit and its associated circuitry will be discussed at length at a later point herein.

At 8.0 time of the commutator ring, a coincidence of pulses will be established in the coincidence unit 295 (Fig. 133*a*), allowing the RMI(8.0) signal to pass through the inverters 296 and 297, the cathode follower 298, and to the switches 290, 360, 361 and 362 (Fig. 139). The circuit of Fig. 139 comprises that required for the feed-fed check provided on the control panel, all to be described at greater length later.

The character ring advances from 8.0 to A.0 at which time the output pulse of coincidence unit 310 (Fig. 133*a*), output pin 8, will test the switch 311 (Fig. 133), as previously described, and the pulse will also be emitted to the And circuit 313 (Fig. 139), to test the final setting of the feed-fed check circuit. If the feed-fed check circuits indicate an error, this impulse will cause the machine to stop. If no error is indicated, the machine will continue in operation.

The character ring advances from A.0 to C.0 at which time a coincidence is established in the And circuit 300 (Fig. 133*a*), and a pulse will be emitted from its output pin 5 which is transmitted to the switch 301. The switch 301 having been conditioned by the count of one record trigger 281, passes the pulse through its output pin 4 to the cathode follower 314, and to the unit **314*a* (Fig. 131), input pin 3. Once again this signal may pass through the units 317 and 318 (Fig. 132) to the count of two record trigger 280** (Fig. 133*a*), but will have no effect on this trigger since it has previously been turned on.

The alternate circuit from the inverter **314*a* (Fig. 131), output pin 6, goes to the switch 319** (Fig. 134), to test the settings of the switches associated with the feed hubs on the control panel. The procedure hereafter will be the same as that previously described to operate both the writing tape drives and their controls, and later the reading tape drives and their controls. Thus, a complete machine cycle has been executed. Hereafter, unless there is some form of manual intervention, or unless a machine error is indicated, the machine will continue through this type of operation.

Assume that the operation has been stopped by the actuation of the machine stop key. If such is the case, the start relay R15 (Fig. 130) will be deenergized. A second contact S2 associated with the stop key (Fig. 131) will operate an inverter 363, permitting the stop pulse to pass through its output pin 7 to turn off the run trigger 254. The output pulse from pin 7 of the run trigger, which results when this trigger is turned off, is transmitted through the inverter 256, thence to the coincidence unit 316 which will be deconditioned, so that no further start pulses may be received by the tape drives, thus effectively stopping the machine.

In due time the machine may be restarted by operation of the start key (Fig. 130). When the start relay R15 is energized, its R15–2 point (Fig. 131) will once again operate the start test trigger 252 and the timing device 253 to turn on the run trigger 254. At this time it will be necessary to generate a test pulse to start both the proper cycle (read or write), and also the properly selected tape drives.

At this time the read/write cycle select trigger 259 (Fig. 132), which has been previously operated, comes into use. The read/write cycle select trigger acts as a memory for the read or write cycle, indicating which operation previously has been performed, and therefore which cycle must be performed after the start key is depressed. Of the switches 258 and 257 associated with the two output pins 7 and 8 of the read/write cycle select trigger 259, one will be responsive to the signal generated from the run trigger 254 (Fig. 131), transmitted through the inverter 255, to both of the switches 257 and 258 (Fig. 132). In the one case, if the trigger is turned off, pin 8 will condition the switch 257 to allow the start pulse to pass therethrough via its output pin 4, to the inverter 261 (Fig. 131), input pin 5. The coincidence circuit comprised of the units 261, 262 and 263, input pins 5, now conditioned properly, will allow this pulse to get through to the inverter 267, Fig. 134. The signal will pass through the inverter 267 to the inverter switches 268 and 269 (Fig. 134). When the machine stop key was previously depressed, a selection of input drives was previously made, so that the signal from the select T2 trigger 267 (Fig. 134) may now pass through the selected inverter switch and out to start the selected tape drive T1 or T2. Thus, in the case where a read cycle is to be the next normal operation, a signal will be generated by the start key effectively to cause the selected input unit to be started. If, however, upon depression of the stop key the last cycle performed had been a reading operation, then the read/write cycle select trigger 259 (Fig. 132) would be conditioned so that the switch 258 would allow the start pulse from the unit 255 (Fig. 131) to pass through its output pin 7, to turn on the start scan interlock trigger 364 (Fig. 132).

The start scan interlock trigger 364 (Fig. 132) is used to interlock the start key with the regular internal timing devices. Thus, the output pin 7 of the start scan interlock trigger 364 will allow the next E.0 pulse available at terminal K*a* to pass through a switch 365 to operate a start key scan trigger 366. The start key scan trigger 366 transmits an impulse from its output pin 7 to the switch 278, through the switch 278 to the cathode follower 279, and out to the commutator (Figs. 133 and 133*a*). At this time a perfectly normal scan of the commutator is executed during which time the comparator indication pulses will be available at the control panel. A selection of output and input tape drives will be made on the basis of the comparator indication pulses.

The only difference between the start scan trigger 366 and the RMI trigger 277 (both in Fig. 132) is the fact that the RMI trigger 277 permits the testing of the feed-fed error circuit. The start key scan trigger will not allow this test since this test was made at the last record mark read from tape.

The nexa D.0 pulse available from the character ring at the edge terminal G*d* (Fig. 132) passes through the inverter 367, and the start key scan trigger 366 will be reset. The output from pin 8 of the start key scan trigger is taken back and causes reset of the start scan interlock trigger 364, thus returning this circuit to its normal off position. Thus, a selection of output and input tape drives will be made, and the machine will return to normal high speed operation.

The cycle selector switch 368 (Fig. 131) located on the neon indicator panel is used primarily for testing purposes. This switch has three settings, normal at which time depression of the start key will start the machine into high speed operation from which it may be stopped by the stop key, detection of error, and possibly end of reel indications. A second setting of the switch 368 is marked full cycle. A full cycle is deemed to be a writing and then a reading operation. Thus, if the switch 368 (Fig. 131) is set to full cycle, depression of the start key will cause the machine to run via its normal circuits, but upon reception of the first RMI(E.0) pulse at terminal K*d*, the signal will transfer through a switch 369 and will cause the run trigger 254 to be turned off. Thus, the machine will be allowed to go through one full cycle of operation.

If the cycle selector switch is set to half cycle, then at the reception of either an RMI(E.0) pulse at terminal K*d*, or an RMO(C.0) pulse at terminal W*d*, either of these pulses will pass through the Or circuit **369*a* to the switch 370, through this switch to once again turn off the run trigger 254. Thus, upon each depression of the start key, the run trigger 254** will be turned on in normal fashion but will be turned off after the next read or write operation.

The final bit of information on any given reel of tape is invariably a tape mark (TM). This character is sensed at the input registers, and the tape mark recognition signal is transmitted to the edge terminal F*a* (Fig. 131), from there the signal is sent to an inverter 371 and from its output pin 6 to cause the run trigger 254 to be turned off. Thus, it may be seen that when an input tape senses the end of a tape file by means of the tape mark, the run trigger 254 will be turned off and will cause the machine to either stop or to hesitate, depending on the condition of related control circuits to be described below.

If the run-out key at the operator's station (Fig. 130) is not depressed, or if single reel or non-stop is wired on the control panel, the run-out relay R1 will be in a deenergized state. Run-out relay R1 being in a deenergized state will allow the machine to stop upon reception of a tape mark. If the run-out relay R1 is energized by depression of the run-out key, a circuit will be established from the power source, through the relay R1–4 points of the run-out relay R1, through the R2–10 points of the T1–TM relay R2 and the R3–10 points of the T2–TM relay R3, one of which will at this time be energized, and thence to energize the start relay R15. The start relay R15 being reenergized will cause a normal restarting of the machine automatically via its R15–2 points (Fig. 131). The energization of either the T1–TM relay R2 or the T2–TM relay R3 will be described shortly.

When the run trigger 254 (Fig. 131) is turned on, its output pin 8 passing a pulse through the inverter 255 to the input of the power unit 256 causes the idle relay R17 to be energized. When the idle relay R17 is energized, its R17–4 points (Fig. 130) transfer and break the circuit normally used to establish the circuit to a ready light 372 and establish a hold circuit for the start relay R15. Thus, when the machine is running, the ready light 372 will be off. When this light is on, it is a visual indication to an operator that the machine is not operating.

It is not always necessary to have tapes in all the output drives, since they may not all be used. As a protective measure, however, a circuit has been installed to test those drives which for one reason or another do not contain tape and to turn on end of reel indicators associated with each tape drive. In case the operator has wired these not ready units, the machine will stop and so indicate. Thus, when the run trigger 254 (Fig. 131) is first turned on, its output pin 8 will transmit a signal through the inverter 255, to a switch 373, which is conditioned at the start of an operation, to allow this pulse to pass through output pin 4 of the switch 373 to a switch 374 (Fig. 143). This test pulse will pass through the switch 374, output pin 4, to two switches 375 and 376 (Fig. 142), input pin 9. Let it be sufficient to say that if no tape is in either output unit, a signal will be available via the external cables from the tape drives to the reversal relay points RR–17 and RR–18, normally closed, to the second controlling element of the switches 375 and 376. If either or both of the output units contain no tape, a signal will pass through their respective switches, through the inverters 377 or 378, respectively, through the cathode followers 379 or 380, respectively, through the reversal relay points RR–20 or RR–22, respectively, normally closed, back through the external cable to the tape drives and turn on the end of reel indication triggers. These end of reel indication triggers in turn transmit a signal via the external cables, through the reversal relay points RR–13 and RR–15 (Fig. 141), through the normally closed points, to an Or circuit 381 (Fig. 141). The signals from the reversal relay points go through the Or circuit 381 to a power unit 382, to light an end of reel light 383 at the operator's station.

These two possible signals are also transmitted to And circuits 384 and 385, pins 4 and 7, respectively (Fig. 144), and are maintained at that point. If during an operation a tape drive with no tape therein is selected in Fig. 137, the signal will be emitted from the cathode follower 386, pin 7 (or cathode follower 324, pin 6), to the pins 3 or 6 in the And circuits 384 or 385 (Fig. 144), respectively, depending on the circuit selected, and through these And circuits to an inverter 387, through the inverter 387 to turn on a trigger 388. The trigger 388 in turn produces an output pulse which is transmitted to a cathode follower 389, the cathode follower 389 being connected to an error line 390 used to turn off the run trigger 254 (Fig. 131), as previously described.

*Reproducing tape record.*—Provision is made for the reproduction of one tape file onto a selected number of output tapes. This calls for the transmission of all information on one input tape through the machine, and for the recording of the same information on a selected number of output tapes. Hereinabove has been described the procedure followed for loading a record from each of the two input tapes and from the two memories which is normally done for all operations but that of reproduction, now to be described.

For this one operation a special circuit is provided to allow the machine to load only one record from an input tape into one memory, and then allow normal machine operation, eliminating the loading of the second memory. In Fig. 132 the points R8–3 of the single reel-no sort relay, in series with points R15–3 of the start relay, are connected to the inverter 282 (Fig. 133*a*) to turn on the count of one record trigger 281 when the circuit is completed. The single reel-no sort relay R8 is transferred when the control panel is inserted into the machine and has wired on it the single reel hubs but not the sort hubs.

When the start key is depressed, the start relay R15 is transferred. Thus, a circuit is immediately available from the power source through the R8–3 and R15–3 relay points (Fig. 132), through the inverter 282 (Fig. 133*a*), to turn on the count of one record trigger 281. This affects the commutator (Fig. 133) in such fashion as to eliminate the loading of the second memory. This is done by breaking the coincidence at the And circuit 288 (Fig. 133) by deconditioning its input pin 6 so that the signal that normally is emitted from its pin 5 may not pass through it to cause tape drive T2 to be selected. It also allows the signals that normally pass through switch 302 (Fig. 133*a*) in a loading operation now to go through the switch 301 to initiate a writing operation. Thus, a single record is read from tape T1 into memory M1, and is then written out of memory to the selected output tapes, after which a new record is called for from the tape in tape drive T1.

*End of output tape control.*—There are two different methods of recognizing the end of a tape. When a tape mark is sensed in the input registers, it is an indication that there is no valuable data beyond this point on tape. The end of tape indication on the output (writers) side is derived by sensing, through electromechanical means, the fact that the end of tape on an output reel is approaching. Since the tape drive controls will be described in great detail at a later time, let it be assumed for the present that the end of tape indications are transmitted via external cable and are sensed at the reversal relay points RR–17 and RR–18 (Fig. 142). For clarity, let it be remembered that the end of tape indication comes from the output tape drives and constitutes a warning that the physical end of tape is approaching. The end of tape indications show that any tape drive from which this indication is sensed has been completely processed and is being or has been completely rewound. This indication is a static condition in the machine, and is used to prevent further selection of any exhausted tape unless some provision is made by the operator to remove this indication, i.e. substitute reels.

Consider first the processing of the end of tape indication originating from the output tape drives. Since it is known that the input drives must have a tape mark at the end of tape to indicate the end of valuable data, no use is made of the end of tape indication from these drives. The output tape drives via external cable and the reversal relay points RR–17 and RR–18 (Fig. 142) are connected through these normally closed points to their respective switches 375 and 376. When this indication is sensed upon the completion of any data transcribing operation, a sub-routine will be called for via signals from the reversal relay points RR–17 and RR–18, to And circuits 391 and 392 (Fig. 138). In connection with Fig. 138 it has been described how the RMO(1.0) signal, acting through the inverters 341 and 342, which have been properly conditioned, will allow stop pulses to stop any output tape drive that may have been running. The triggers 343 and 344 up until this time have been in their normal reset condition, thereby allowing the foregoing operation to occur.

The signals from reversal relay points RR–17 and RR–18 are transmitted to their respective coincidence units 392 and 391, and at this point a test is made. The lines 393 and 394 are connected between the pins 4 of the And circuits 391 and 392, and the reversal relay points RR–9 and RR–11, respectively (Fig. 139), which in turn are connected to the respective tape drives and will emit signals only if the associated tape drive is running. Thus, if an end of reel signal is sensed from a tape drive and that tape drive is running when the end of the writing operation is sensed by means of the RMO(C.0) signal on line 395 (Fig. 138), the coincidence units 391 and/or 392 will allow this signal to pass through to the inverters 396 and/or 397, respectively, and cause the triggers 343 and 344 to be turned on. Thus, the trigger 343 or 344 will be turned on if the selected output units sense an end of tape during the writing operation. Since the RMO(C.0) signal is earlier in time than the RMO(1.0) signal, the RMO(1.0) signal will not be able to pass through the inverter 341 or 342 if the selected output unit has sensed end of reel. Therefore, upon completion of the writing operation, the tapes indicating end of tape will continue running.

A signal is transmitted from the triggers 343 and 344, output pin 7, to switch tubes 396 and/or 397 (Fig. 138). When the RMO(1.0) signal becomes available, it will test the switches 396 and 397, and if neither is conditioned to allow the test pulse to pass, their output pins 4 will transmit a signal to pin 3 of a 15 micro-second single shot multivibrator 398, Fig. 143. This signal sets off the single shot multivibrator 398 which allows a period of time to pass, during which tape continues to be driven on the tape drive indicating end of tape. At the end of this timed interval, the single shot 398 transmits a signal to an inverter 399, and through this unit to start a second timing device, a 10 microsecond single shot multivibrator 400. This signal will also be transmitted through an inverter 401, through a cathode follower 402, which will transmit a signal to a tape mark generator which will cause a tape mark to be written on any output tapes currently running. Thus, a tape mark is written on any output tape indicating end of tape. When the timing device 400 finally emits a signal, this signal will be transmitted from an inverter 403 to a switch 374, which will now test the switches 375 and 376 (Fig. 142).

The switches 375 and 376 (Fig. 142) have been previously conditioned from the end of tape indicators in the tape drives. Thus, those tapes that sensed the end of tape indication and have now had a tape mark written thereon will now receive the signal from the switches 375 or 376, through the inverter 377 or 378, through the cathode follower 379 or 380, through the reversal relay points RR–20 and/or RR–22, normally closed, as the case may be, and via external cable to cause the end of reel indication triggers within the tape drives to be turned on. At this time these tape drives will automatically rewind.

In order to clear the triggers 343 and 344 (Fig. 138) for further tape operations, the inverter 403 (Fig. 143) will also transmit a TM Written signal to these triggers 343 and 344 (Fig. 138) to reset them to their normal position. At this time then, via external cable, the output tape drives that have been exhausted will emit an end of reel indication signal to reversal relay points RR–13 and RR–15 (Fig. 141), through their normally closed points and through the Or circuit 381 and the power unit 382, to cause the end of reel light 383 at the operator's station to be turned on.

Figure 137:
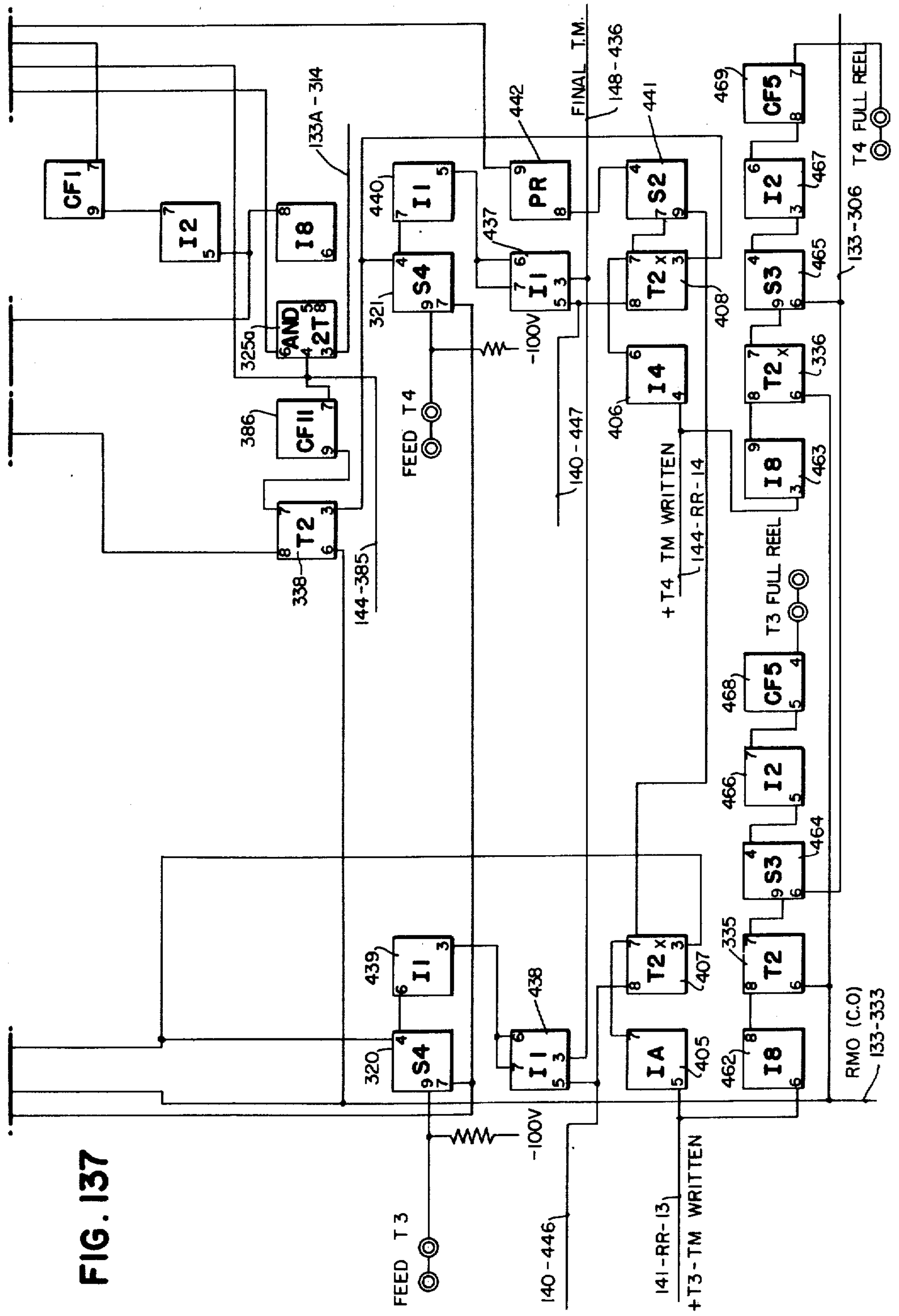

These signals will also be transmitted to the inverters 405 and 406 (Fig. 137). Pulses from the inverters 405 and 406 will turn off triggers 407 and 408, respectively. The function of triggers 407 and 408 will be discussed shortly. The previous description then shows how the end of reel indication on the output tape drives may be handled. There is an alternate way of generating end of reel indication pulses which will be discussed shortly.

*End of input tape control.*—Consider now the input tape drives. As long as an input tape drive when addressed reads complete records into the machine, there can be no end of reel indication from these drives. When the time comes that a tape mark is read from a tape in a selected input drive, an indication must be given to the machine that the tape from which the tape mark was read has been completely processed. It will be necessary at this time to cause the end of reel indication signal TM (Read) to be generated for this tape drive. Depending on the operation to be performed, the end of reel indication signal TM (Read) may or may not be destroyed by the operator. Thus, if additional data from tape is to be passed through the machine from this tape drive, the insertion of a new reel of information into the indicating drive will cause a reset of the end of reel signal. If no further information is to be processed, this indication will remain on.

The following is a description of the method used to utilize the end of reel indication signal TM (Read) from a given input drive. Let it be assumed that tape drive T1 has been selected as the input unit. The tape drive is started and eventually a character is transmitted to the input registers where it is recognized as a tape mark. The tape mark recognition signal TM (Read) is transmitted from the input register recognition circuits to the edge terminal F*a* (Fig. 143). From this terminal the signal is transmitted through an inverter 409 to inverter switches 410 and 411 (Fig. 142). If, as indicated, tape T1 had been selected as the input unit, then the select T1 trigger 270 (Fig. 134) will produce a signal at its output pin 8 which will be transmitted to the other half of the inverter switch 410 (Fig. 142). Thus the tape mark signal TM (Read) may pass through the inverter switch 410, through a cathode follower 412, to the reversal relay point RR–19, and via the external cable to set the end of reel indication in the tape drive on. At this time, via circuits previously described, the machine will stop.

The tape drive, in this case T1, will transmit a signal via the external cable to reversal relay point RR–14 (Fig. 141), through its normally closed points, to the inverter 413, pin 5, to the power unit 414, pin 3, and to the Or circuit, pin 6. The signal will pass through the Or circuit 381 and the power unit 382 to turn on the end of reel indicator light 383 on the operator's panel. The signal will also pass through the inverter 413, output pin 7, to an inverter 415, pin 3, and through the power unit in 416, to cause the tape mark relay R–5 to be energized.

The signal fed into the inverter 415, pin 3, is also transmitted to the feed-fed checking circuits, where it is used to reset these circuits in a manner and for reasons to be described later.

At this point the machine will be stopped and will indicate an end of reel on one of the tape drives. At the operator's discretion, the end of reel indication may be reset by the insertion of a new reel of input information. If there is such a reel, then the circuit just described will be deenergized and the tape mark relay R5 will also be deenergized. At this point the machine may be restarted in normal fashion. If, however, there is no further tape to be inserted into this input tape drive, then the run-out key must be depressed.

Until this time the run-out relay R1 (Fig. 130) has not been energized. As a consequence, the power unit 414, Fig. 141, while conditioned to conduct, will not allow the energization of the T1–TM relay R2, since its circuit to the power source is incomplete. Depression of the run-out key (Fig. 130) will energize the run-out relay R1. This, then, will complete the power circuit for the power unit 414 (Fig. 141) and will allow the energization of the T1–TM relay R2 through the R2–1 points of the run-out relay, via the R15–6 points of the run-out relay, and through a tape mark relay point R5–2, to the power source. Thus, the T1–TM relay R2 will now be energized, and will form a hold circuit for itself through its R2–5 point. It is by this means that the T1–TM relay R2 or the T2–TM relay R3 may be energized, thus completing a path (Fig. 130), for the energization of the start relay R15 via the R1–4 points of the run-out relay, through either the R2–10 points of the T1–TM relay or the R3–10 points of the T2–TM relay.

*Last record run-out.*—Depression of the run-out key (Fig. 130) indicates to the machine that the end of an operation is approaching. There are a number of different ways that the end of an operation may be sensed. Thus, in a two input tape operation, both reels must sense tape marks before the end of operations is indicated. In a single reel operation only one tape mark is available, and consequently other provision must be made. In a single reel sorting operation, still another method must be provided to allow run-out of the last record remaining in memory prior to rewinding both output reels.

In the example just previously described, if during the first pass of a single reel sorting operation, the tape mark is sensed, tape drive T1 will have had its end of reel indication turned on and will have energized either the T2–TM relay R3 or the T1–TM relay R2. At this time there is still one record in memory that has not yet been transcribed to the output tape. Thus, before the end of the complete pass may be indicated, this record must be transferred from memory to the ouput tape and recorded there.

When the run-out key is depressed, the run-out relay R1 will be energized which then in turn allows the energization of either the T1–TM relay R2 or the T2–TM relay R3. In Fig. 132 the R2–2 and R3–2 relay points are shown parallel and connected from the power source to a TM and R.0 key trigger 417. Thus, when either end of reel indication relay is energized, the TM and R.0 key trigger 417 emits a signal from its output pin 7 which is transmitted to inverters 418 and 419. The signal will travel through the inverter 418 and from its output pin 8 to cause the read/write cycle select trigger 259 to indicate a writing cycle as the next step in the operation. The signal from the TM and R.0 key trigger 417 will also be transmitted through the inverter 419, and from its pin 9 (via inverter 275) to the select T1 trigger 270 and the select T2 trigger 276 (Fig. 134), causing them to be reset.

During the time that these operations have been in progress, the start relay R15 (Fig. 130) may have been energized, transferred its R15–2 points (Fig. 131), and the timing device 253 may have been started. This timing device will not emit a signal for a long enough period of time (100 microseconds), so that the operations just previously described will be completed before this time delay is over.

The TM and R.0 Key signal at output pin 7 of the TM and R.0 key trigger 417 (Fig. 132) is also transmitted to a unit 420 and from its output pin 9, and its pulse will turn on a TM and R.0 scan interlock trigger 421. The TM and R.0 scan interlock trigger 421 produces an output at its pin 7 to control a switch 422. At this point the machine circuits will remain stabilized until the timing device 253 (Fig. 131) completes its time delay, at the end of which time normal start circuits are energized. Thus, the start key scan trigger 366 (Fig. 132) will be turned on as previously described and will cause a scan of the commutator ring.

When the switch 278 is energized by the trigger 366, it will also activate the switch 422 which had been previously conditioned by the TM and R.0 scan interlock trigger 421. The switch 422 produces an output at pin 4 to turn on a TM and R.0 scan key trigger 423. This trigger being activated will produce a signal from its output pin 7 to a cathode follower 424 which, from its output pin 6, will cause the feed-fed check circuits to be operative.

The TM and R.0 scan key trigger 423 is reset off again at the next available D.0 pulse as it enters at terminal G*d* (Fig. 132). When the TM and R.0 scan key trigger 423 is reset off, its pin 8 will produce a signal to turn off the TM and R.0 scan interlock trigger 421. Thus, a scan of the commutator ring will assure that the record remaining in memory at this time will be written on tape, and its associated tape drive will be selected as the next input unit.

*Synthetic tape mark.*—Since in a single reel sorting operation there is only one input unit and it has already been completely read, it is necessary by some means to generate a synthetic tape mark pulse as a substitute for that initiated by the second tape mark available when using two input tapes. This is accomplished by the circuitry in Fig. 143. The R2–6 points of the T1–TM relay R2, and the R3–3 points of the T2–TM relay R3 are shown in parallel and in series with the R9–3 points of the enter single reel sort relay R9. These points constitute a circuit via the R10–4 points of the sort relay R10 to a switch 425. Thus, either the R3–3 points of the T2–TM relay R3, or the R2–6 points of the T1–TM relay R2 will be energized, since a tape mark has been sensed; the R9–3 points of the enter single reel sort relay R9 will be closed since a single reel sort is wired on the control panel, and the R10–4 points of the sort relay R10 will be closed since this is a sorting operation. Thus, one of the control elements in the switch tube 425 is conditioned to allow any pulse from the second control to pass through.

It has been described how the machine is conditioned by the recognition of an end of reel to next perform a writing operation. A writing drive will have been selected, started and tape therein will have been written on. When the record mark associated with this record is sensed in the output registers, it is transmitted through the switch 425, out of its output pin 4 to the inverter switches 410 and 411 (Fig. 142). At this time either tape drive T1 or tape drive T2 may have been selected as the input unit, and as a consequence either the unit 270 or the unit 276 (Fig. 134) will have provided a signal to the other half of its associated inverter switches 410 and 411, via lines 426 and 427, respectively. This pulse from the switch 425 (Fig. 143) will proceed through the selected inverter switch, through the cathode follower associated with it, to the reversal relay points RR–19 or RR–21, thence via external cable to turn on the end of reel indication for the selected second unit.

Prior to this point either tape drive T1 or tape drive T2 has been forced to indicate that an end of reel condition exists in the machine. At this time the other units will be forced to indicate an end of reel indication which will come through a duplicate circuit to that associated with the alternate drive to pick up the end of reel relay associated with that tape drive. Thus, at this point, both T1–TM relay R2 and T2–TM relay R3 will have been energized.

*Final tape mark indication.*—In Fig. 143 is shown a relay network connected from a power source through the R2–7 points of the T1–TM relay, the R3–6 points of the T2–TM relay, both of which have just been transferred, to an edge terminal C*a*, to an inverter 428, and from its output pin 6 to cause a final tape mark trigger 429 to be turned on. The final tape mark trigger 429 indicates that all operations associated with a pass of tape are completed. In any operation except a sorting operation, when the final tape mark trigger 429 is turned on, the entire processing operation is over. In sorting it is merely used to indicate that the pass just completed is over, but not that the entire sorting operation is necessarily finished.

A second way of turning on the final tape mark trigger 429 to indicate the end of an operation is to have single reel wired on the control panel but not in conjunction with the sorting hubs. Thus, if a single reel-no sort operation is wired, the single reel-no sort relay R8 will be energized (Fig. 130) as has previously been described. In this operation all information is read from one tape drive and transferred, via memory M1, to the selected output tape units. When the tape mark at the end of the input reel is sensed, it is an indication that the operation is complete. Thus, a circuit will be complete from the power source, through the R2–12 relay points (Fig. 143), to the R8–4 relay points, to the edge terminal C*a*, to the unit 428, through its output pin 6 to turn on the final tape mark trigger 429.

Still another way is provided to turn on the final tape mark trigger 429. When the T1–TM relay R2 or the T2–TM relay R3 is transferred, their associated points R2–4 and R3–4, respectively (Fig. 143), will also transfer, thus completing a circuit from the power source, through a resistor network, through the R2–4 and R3–4 points associated with these relays, and thence to pin 7 of the And circuits **429*a* and 430**, each unit being associated with a relay point and therefore with a tape drive.

When the input select T1 or select T2 feed selection triggers 270 and 276, respectively (Fig. 134), are impulsed, a signal is passed through the cathode followers 322 or 431 and from output pins 6 or 7, respectively of either of them (depending on the drive selected), and to their corresponding inputs in the And circuits **429*a* and 430 (Fig. 143). Thus, there are provided two of the three pulses necessary to establish a coincidence in these circuits. If an input tape drive which is emitting an end of reel indication is selected, then the RMI(8.0) pulse may pass through either unit 429*a* or 430, through their associated inverters 432 and 433, respectively, and from there to turn on the final tape mark trigger 429**.

This circuit provides for an indication of the end of the operation when a single reel operation has been performed but the single reel hubs are not wired, and thereby allow a single record to be read into memory M2 from tape T2. Tape T2 has one record read into memory in the normal loading routine at the start of the operation. It may have never been addressed on the control panel. Thus, without this circuit, after the input drive containing master information has been passed through the machine, the machine will stop at this point and will have no indication of a final tape mark to indicate the end of the operation.

In any case, when the final tape mark trigger 429 (Fig. 143) is turned on, it is necessary to write a tape mark on all tapes that have been written on in any of the output drives and that have not previously been tape marked. Thus, when the final tape mark trigger 429 (Fig. 143) is turned on, it will transmit a signal from its output pin 8, to an inverter 434, through the inverter from its output pin 7, and to an inverter 435, input pin 6. A pulse from the output pin 8 of the inverter 435 will activate a 15 microsecond single shot multivibrator 398.

A Final Tape Mark signal is also transmitted from the output pin 7 of the final TM trigger 429 through an inverter 436, output pin 7, to an inverter **437*a* (Fig. 140), and also to the inverters 437 and 438, pins 3 (Fig. 137). The inverters 437 and 438 are two input coincidence circuits. The Final Tape Mark signal entering pin 3** of these units, then, will be allowed to pass through these inverters only when the other half of each unit is conditioned to provide a gate.

The purpose of the controls to be described now is to determine whether an output tape has been previously written on, and if so, whether it has been marked with a tape mark. If a tape has already been tape marked, no further tape marks will be written. If the output tapes have not been so marked, then their drives must be started, allowed to run for a period of time and then have a tape mark written on the tapes therein. It can be determined whether a tape in any tape drive has ever been written on by pulses from the switches 320 and 321

(Fig. 137). Thus, if the T3-T4 feed hubs have ever been impulsed during the operation, a signal will have been emitted from the output pins 4 of the switches 320 and/or 321, and brought back down to operate either or both triggers 407 and 408. If during the operation either one of the tapes had been filled and a tape mark written thereon, an end of file indication would be transmitted to the inverter 405, pin 5, or inverter 406, pin 4. This impulse would have been transferred through these units from their output pins 7 and 6, respectively, and would have turned off and held off the associated triggers 407 and 408, respectively.

When final tape mark procedure is begun, the triggers 407 and 408 will act as memory as to whether the tape in the drives associated with these two triggers have or have not already been marked. The triggers 407 and 408 are associated by their output pins 8 with the inverters 438 and 437, respectively (input pins 5 of each), which have previously been described as two-way coincidence circuits. If the Final Tape Mark signal is entered into the pin 3 of the units 437 and 438 and their corresponding triggers 408 and 407 are off, the tape mark signal will be emitted through these coincidence circuits, through the inverters 439 or 440, or both of them, to cause the respective tape drive select triggers 323 and 338 (Fig. 136) to be turned on.

From this point the tape drives will be started in normal fashion as previously described. It can be seen upon a study of the circuit that if a tape has been previously marked with a tape mark, the Final Tape Mark signal can not proceed through the coincidence units (437 or 438, Fig. 137) associated with its drive, and as a consequence this tape drive will not start.

It may be mentioned at this time that in sorting the triggers 407 and 408 (Fig. 137) act as memory as to whether both output tape drives have been written on during any given sorting pass. The end of a sorting operation is reached when all records are written on a single output tape. Thus, the triggers 407 and 408 produce a signal at their output pins 7 which is directed to a switch 441 (Fig. 137), which, if both units have been written on, will conduct through its output pin 4 to a power unit in 442, from its output pin 9 to the R10–8 relay points (Fig. 136) which are transferred because this is a sorting operation, to the R7–4 relay points which are picked up but have not yet been described, through an operation complete lamp 443, to a power source, thus lighting a lamp on the operator's panel indicating that the operation is completed.

Relay R7 (Fig. 142) is the final tape mark relay and it is transferred when the final tape mark trigger 429 (Fig. 143) emits a signal from its output pin 8, through the inverter 434, output pin 7, to a cathode follower 444, input pins 4 and 9, and to a power unit 445, input pin 6. At this time the final tape mark relay R7 will be energized, and will have therefore transferred its R7–4 points (Fig. 136) for the operation complete indication.

Let it be assumed that the output tapes have not yet been tape marked, that their drives are running, and also that the timing device 398 (Fig. 143) has been impulsed. When this timing device emits its signal, the signal is transmitted through the inverter 399, output pin 9, to the single slot multivibrator 400, and to the inverter 401. The inverter 401 transmits a signal through the cathode follower 402 to cause the tape mark generator to write a tape mark on all output tapes now in motion.

The cathode followers 444 and 444*a* (Fig. 142) have been energized, as described, with the energization of the final tape mark relay R7, so that the output pins 6 and 7 will now activate one control element in the switches 376 and 375, respectively. When the single shot multivibrator 400 (Fig. 143) finally emits its signal, the signal passes through the inverter 403, is emitted from its output pin 5, and passes through the switch 374 to the second control element in the two switches 375 and 376, and via previously described circuits, to the tape drive to turn On the end of reel indication for tape drives that are now in motion.

As previously mentioned, sorting may be defined as a multiplicity of collating passes. The end of a sorting operation is reached when one continuous sequence of records are transcribed to a single output tape. The triggers 407 and 408 (Fig. 137), it will be recalled, act as the memories of which output tapes have been written on. When a sorting operation has been completed, by definition, both output tape drives must have been written on and therefore both triggers in these locations must so indicate. From the output pins 8 of the triggers 407 and 408, a circuit is established to a pair of inverters 446 and 447, respectively (Fig. 140). The inverters 446, 447 and an inverter 448 form a coincidence circuit which is inspected at the end of every sorting pass and is used to determine whether a new pass of information is to be started. Thus, if a sorting operation is not completed, this coincidence unit will so indicate and cause a new pass operation to be initiated. An inverter 449 and the inverter 437 (Fig. 140) will be conditioned then to advise the coincidence circuit that the sort is not completed. In addition to these controls, a final tape mark must be indicated by the final tape mark trigger 429 (Fig. 143) which transmits the Final Tape Mark signal via the inverter 436 to the inverter 437 (Fig. 140), input pin 3. An additional condition is that the delay stop key (Fig. 140) must not have been depressed by the operator.

If the master reels inserted into the machine at the start of a sorting operation are to be protected or preserved, the ignore first stop hubs on the control panel will not be wired. Since, as previously described, relay R12 will not be energized until the start of the second sorting pass, a trigger 450 (Fig. 140) will not allow coincidence of the inverters 146, 147 and 148 and the machine will stop but will not indicate that the operation is complete. At this point the operator may intervene to remove, for preservation purposes, the input master files and replace them with clear tape. If the ignore first stop hubs are wired, the machine will not stop at this time but the operation will continue automatically.

After replacement of the input reels when the start key is depressed, relay R12 will transfer, completing a circuit to activate the trigger 450 (Fig. 140) which from its output pin 8 will now condition the inverter 449, input pin 3. Presumably, but not necessarily, by this time all tape units will have rewound the tapes therein and a signal indicating the fact will be transmitted via external cables, via terminal S*h* (Fig. 140), and a resistor network, to the input pin 5 of the inverter 448. When this happens, the inverters 446, 447 and 448 will all be in coincidence, and a signal will be transmitted to an inverter 451. The inverter 451 will emit a signal from its output pin 8 to a single shot multivibrator 452. The output pin 4 of the single shot is connected to a binary trigger 453, and also to an inverter 454. The trigger 453, being a binary trigger, will transfer back or forth for each pulse received at its binary input. A pulse from the output pin 7 of the trigger 453 will operate a power unit 455 to pick up the reversal relay peak RRP. A circuit will now be completed from the power source through a number of paralleled relay points in the reversal relay peak relay to allow energization of the reversal relay RR. These relays are three twelve-position wire contact type relays, the points of which, many of them heretofore referred to, are distributed throughout various parts of the system.

The inverter 454 transfers the pulse eventually received from the single shot multivibrator 452 to start a single shot multivibrator 456. This single shot device allows the reversal relays sufficient time to operate and to stabilize. When it emits a signal from its output pin 6, a signal will be transmitted to cut off the circuit through the power unit 458, and thus cause the final tape mark reset relay R18 to be deenergized. The final tape mark reset relay R18 will cause reset of most of the machine circuits with the notable exceptions of the reversal relay control, the single reel relay controls, the sort relay controls and remembrance of first pass controls (relay R12). It may be noted at this time that when the machine reset key shown in Fig. 130 is depressed, the reset relay R19 will be deenergized. When the reset relay R19 is deenergized, its R19–2 point (Fig. 140) will be closed and will establish a circuit from the power source, through itself to the input pin 5 of inverter 457. The result of this is to open the circuit through the power unit 458 and thus cause the final tape mark reset relay R18 to be deenergized.

Thus, the reset relay R19 may operate by itself to reset only selected portions of the machine, whereas the machine reset key will cause reset of the entire machine. After the timing device 456 has gone through its timing period, the final tape mark reset relay R18 will once again be reenergized. At this time the machine will restart automatically.

It will be seen on examination of Fig. 130 that the run-out relay R1 is energized through the run-out key and is held via the error and the stop key; since neither the stop key was depressed nor the error circuits energized, either one will maintain the relay R1 in its energized position. When the final tape mark relay R18 is once again reenergized, a circuit must be completed through its R18–3 relay points, through the R5–8 relay points, through the R1–3 relay points, to the R7–3 relay points, to energize the start relay R15. Thus, the second pass of the operation will be restarted automatically if the ignore first stop hubs (Fig. 140) are wired. If they are not wired, the machine will stop. All remaining passes of a sorts will be completely automatic due to the circuits just described.

The reversal relays indicate to the machine which of the two sets of tape drives are the input drives and which of the two sets are the output drives. Thus, during the first pass of a sorting operation, the reversal relays are in their deenergized position. The reversal relay points will be in the position shown in all figures, and a set of two drives will be selected as inputs, the second set will be selected as outputs. When the first pass is completed, the trigger 453 (Fig. 140) will be impulsed and will cause these relays to be energized. Energization of the reversal relays causes a reversal of the functions of the two sets of tape drives, i.e. the readers will become writers and the writers will become readers. Upon the start of the third pass of a sorting operation, the trigger 453 will once again be impulsed, so that it returns to its original position and thus will allow the reversal relays once again to deenergize. It can be established from this that the reversal relays will be energized during all the even numbered passes and that during the odd numbered passes they will be deenergized.

It has been previously established that the TM and R.0 key trigger 417 (Fig. 132) will be operated at any time that an input tape supply is exhausted, and the run-out key is depressed. When this trigger is operated, its output signal TM and R.0 Key at pin 7 is transmitted to a switch 459 (Fig. 143), input pin 9. This signal is a static condition. The machine will at this point be restarted under operation of the run-out key and a record will be read from memory to an output tape.

Upon completion of the recording of the record on the output tape, an RMO(C.0) pulse (Fig. 143) will be generated and will be taken from the edge connector *Wd* and placed into the second control element in the switch 459. The RMO(C.0) pulse will be passed from the output pin 4 of the switch 459 and cause a trigger 460 to operate. Thus, it can be seen that the trigger 460 will be turned on half of one machine cycle after the run-out key is depressed and a tape mark is sensed. The output pin 7 of the trigger 460 energizes a power unit 461 and allows the pick-up of the relay R6. The relay R6 is, therefore, energized one-half of one machine cycle after a coincidence of the tape mark and the run-out key pulses. The relay points associated with the relay R6 will be described in more detail under the section relating to the comparator. As previously mentioned, the tape mark relay R5 (Fig. 141) is energized whenever either input tape unit emits an end of reel indication. The function of some of the points of the tape mark relay has been stated. The function of the remaining points will be discussed later in connection with the comparators. It is to be noted, however, that the relay R5 will transfer immediately upon reception of an end of reel indication.

*Full reel T3 and T4*.—Among the control panel hubs are two sets of hubs marked full reel T3 and T4. These hubs are arranged to emit a single impulse whenever the tapes in the tape drive associated with these hubs are filled. At this time no further records may be written on such tape or tapes. The pulse that is emitted is essentially under control of the end of reel indications associated with tape drives T3 and T4. When either drive produces an end of tape indication, it is transmitted via external cable through the reversal relay points RR–13 or RR–15 (Fig. 141), through their normally closed points to inverters 462 and 463 (Fig. 137), input pins 6 and 3, respectively. When this signal is sensed by the inverters 462 and 463, the output pulse at pins 8 and 9, respectively, will operate the triggers 335 and/or 336. These triggers produce an output from their pins 7 to the switch units 464 and 465, respectively.

The next time that the commutator (Figs. 133 and 133*a*) is scanned during a normal operation, the I/R gate trigger 305 (Fig. 133) will emit a signal via the cathode follower 306 to the second input of the switches 464 and 465 (Fig. 137). If either trigger 335 or 336 indicates an end of reel, the signal will pass through its associated switch tube output pin 4, through associated inverters 446 and 467, input pins 5 and 3, respectively, through the cathode followers 468 and 469, respectively, and from the cathode followers to the T3 full reel and T4 full reel hubs on the control panel. During the cycle following the scanning of the commutator, a record will be written on a selected output drive and will eventually generate an RMO(C.0) signal. This signal comes from the inverter unit 333 (Fig. 131) and is used to reset the triggers 335 and 336 (Fig. 137). The circuitry feeding the inverter 333 has been previously described.

*Output memory selection* (*field interchange*).—Via circuitry to be considered at a later time, the selection of memory M1 or memory M2 as the output record memory is controlled by the select T1 and select T2 triggers 270 and 276, respectively (Fig. 134). Thus, while the select T1 trigger 270 is in the On state, the record in memory M1 will be emitted out to tape. If between characters of a record the select T1 trigger 270 is turned off and the select T2 trigger 276 is turned on, then further writing on tape will take place out of memory M2. Thus, it is possible by switching the setting of the select T1 and the select T2 triggers to cause a portion of a record to be written from one memory, and a portion of a record in the alternate memory to be written out on tape, and then once again by resetting the select T1 and select T2 triggers 270 and 276 cause the remainder of the original record in M1 to be written on the same tape. This is the field interchange operation to which reference has been made heretofore.

Figure 135:
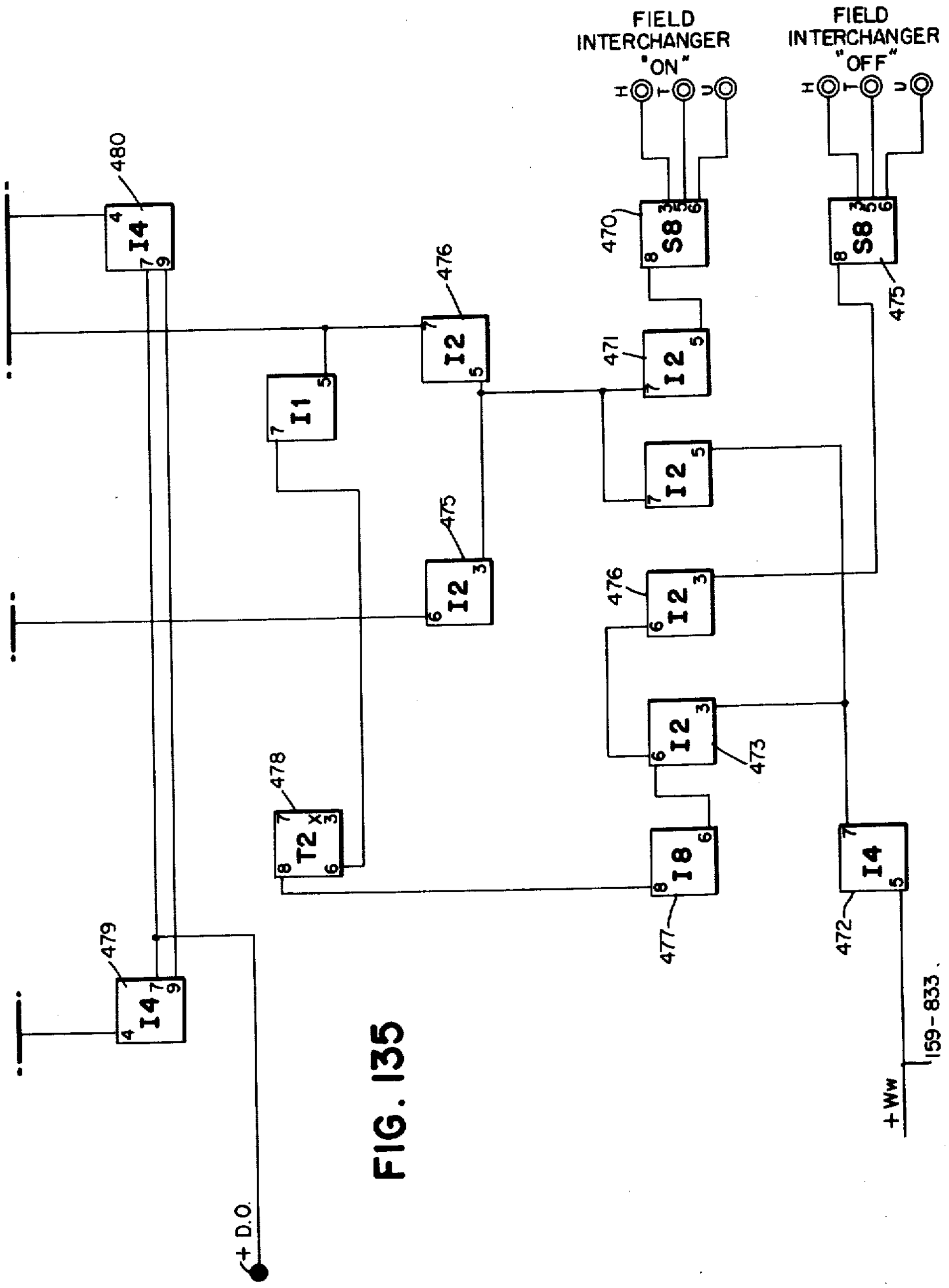

On the control panel and also shown in Fig. 135 are a set of six hubs, three of them being marked field interchanger on and three of them being marked field interchanger off. The system is so arranged that all records in which a substitution is to be effected will flow through memory M1, while the data to be substituted in the master records will flow through memory M2. Thus, it is possible to correlate the field interchanger function with a definite operation of the select T1 and select T2 triggers 270 and 276 (Fig. 134).

Let is be assumed that a record in memory M1 is being written on tape and that therefore the select T1 trigger 270 is in the On condition. Let it further be assumed that three columns from the column counter exit hubs have been wired through three hubs marked field interchanger on. These three hubs are connected to a coincidence unit 470 (Fig. 135). When a pulse is emitted by the column counter which corresponds to that which is wired into these three entry hubs, the switch 470 will emit a signal from its output pin 8 to condition the input pin 5 of an inverter 471.

The repetition rate of writing information on output tapes, once the tape drives are in condition to write, is 138 microseconds. The 138 microsecond pulse, provided by a pulse generator to be described, may be referred to as the W*w* pulse. The W*w* pulse is made available at an edge terminal B*d* (Fig. 135) and is transmitted through an inverter 472, out its output pin 7 to the input pins 3 and 5 of inverters 473 and 474, respectively. The input 5 of the inverter 471 has been previously conditioned, so that the W*w* pulse now arriving at pin 5 of the inverter 474 is able to pass therethrough, and via its output pin 7 to inverters 475 and 476, inputs 3 and 5, respectively. The output pin 6 of the inverter 475 is wired to pin 7 of the select T1 trigger 270 (Fig. 134) and will cause this trigger to turn off. The output pin 7 of the inverter 476 (Fig. 135) is wired to the pin 8 of the select T2 trigger 276 (Fig. 134) and will cause it to turn on.

Thus, as previously mentioned in the general statement, memory M2 will now be selected as the output memory. The column in memory corresponding to that wired on the control panel as the start of the interchange field will now be emitted to tape from memory. Memory M2 will remain the selected memory until a stop signal is received by the field interchanger off hubs. This is accomplished once again by wiring from the column counter exits to the three hubs associated with the field interchanger off controls. When the column at which the interchange is stopped is arrived at, a coincidence will be set up in a switch 475 (Fig. 135), and this unit will emit a signal from its output pin 8 to the input pin 3 of an inverter 476. The W*w* pulse, as previously stated, will pass through the inverter 472 to the input pin 3 of the inverter 473. This pulse may now pass through this tube to an inverter unit 477, input pin 6, and will cause a trigger 478 to be turned on.

Since the column indicated on the control panel as the end of the field interchange operation is the last column to be interchanged, the action of the field interchanger off controls must be delayed one character operation. Thus, the trigger 478 will acts as memory of the fact that the field interchanger off hubs had been impulsed. The character in memory corresponding to this column will be emitted to the output character register in normal fashion, and at the end of its transfer the D.0 pulse generated at the end of its transfer will now test two switches 479 and 480. These switches have now been conditioned by the output pin 7 of the trigger 478, so that the D.0 pulse may pass through both of these switches. The switch 479, output pin 4, will cause the select T1 trigger 270 (Fig. 134) to be turned back on again, and the output pin 4 of the switch 480 will cause select T2 trigger 276 (Fig. 134) to be turned off. At this point the writing operation will revert to memory M1. Thus, by means of the circuitry just described, a portion of a record may be written out of memory M1, a later portion of a record may be transcribed from memory M2 and then finally the remaining portion of the record in memory M1 may be read out and written on tape. There may, therefore, be an effective substitution in a master record, of data read from designated columns of memory M2.

*Tape selection check.*—In a normal machine cycle at least one output tape drive is selected to receive a record and one input tape drive is selected to read a record. When a tape drive is started up by means of the circuitry previously described, the tape drive echoes back to the main controls the fact that it is running. When this tape drive stops, the echo of the fact that it is running disappears. The echo pulse can be taken and stored in a binary element so that a check pulse can be fed to the same element to determine that this particular drive should have run. The binary element on completion of any given operation must be set to its normal off position. Failure of the echo pulse to be applied to the binary element will leave it in the on position. It is possible, therefore, to determine that the tape drive operated when it was addressed and only when it was addressed by inspecting the condition of the binary element. The feed-fed checks perform this function in this system.

Let it be assumed, for example, that tape drive T3 has been selected as the output drive, and that tape drive T1 has been selected as the input drive. In the normal machine cycle, tape drive T3 will be selected as the writing unit and will start moving tape. The tape drive via an external cable will signal the main frame of the fact that it is running. When the signal enters the main frame it will go through the reversal relay points shown in Fig. 138, and the echo signal will pass through the RR–9 (Fig. 139) points of the reversal relay, normally closed, will enter an inverter 479, input pin 5, and will be transmitted from its output pin 7 to a trigger 483. This signal will cause the trigger 483 to be turned on. When the writing operation is completed, the output tape drive will stop and tape drive T1, the selected input drive, will now be started. In turn it will echo back via the external cables, to the main frame, a signal via the RR–10 (Fig. 139) reversal relay points, to a switch 481, input pin 7. After the machine is loaded, i.e. records placed in memory, the switch 481 will continuously be conditioned to allow the echo signal to pass therethrough, to its output pin 4 and to the input of a trigger 482. At the end of the reading operation, as the commutator (Figs. 133 and 133*a*) is scanned at 1.0 time, the comparators will emit their signals to the control panel.

It has been stated that the input comparators either directly or through selectors are ordinarily wired to control the input and output tape drives. The output comparator now is used either directly or through selectors to impulse the fed hubs. For any given operation, the wiring of the input comparators to control tape drives must be duplicated in every respect by wiring from the output comparators to the fed hubs. It has been noted that the output of the output comparator is identical in every respect to that of the input comparator except that it is delayed one machine cycle. Thus, if on a given machine cycle the input comparator selects a certain combination of tape drives, in the example tape drives T1 and T3, the output comparator must on the following cycle also select the fed T1 and the fed T3 hubs. Thus, at this point the fed T1 and the fed T3 hubs (Fig. 139), should receive an impulse from the control panel to transfer to the switches 360 and 290.

As the commutator advances from 1.0 to A.0 time, the RMI(8.0) signal is transmitted from the commutator, via line 483, to one control element of the switches 290, 362, 360 and 361. This signal will now be able to pass through only the switches 290 and 360, and will provide a second signal to the inputs of triggers 482 and 483, thus causing them to revert to their original status. The output pins 7 of these triggers are connected to the inputs of cathode followers 484 and 485 which feed the input of the And circuit 313, input pin 6.

In parallel with the cathode followers 486 and 487 are the corresponding units associated with the fed T2 and fed T4 hubs. If everything has operated properly, the coincidence unit 313 will indicate no coincidence so that the RMI(A.0) time signal on line 488 will not progress through this coincidence unit to effect the check circuits. If, however, any one of the four tape drives were incorrectly fed, or if any one of the fed hub check circuits for some reason fail, discrepancy will be noted by the trigger associated with that fed hub, and a pulse will be transmitted through its associated cathode follower outputs, and from there will cause a coincidence in the unit in 313. If there is a failure of one of these elements, the coincidence unit, output pin 8, will transmit a signal to an inverter 489, from its output pin 7, to a trigger 490, which will turn this trigger on. The trigger 490 turned on will emit a signal from its output pin 7 to a power unit 491, input pin 6, and from the output of this unit, pin 7, a comparison light 492 at the operator's station will be lit, indicating a machine error.

A signal is also sent to input 4 of a cathode follower 493 from output pin 7 of the trigger 490. The output pin 6 of the cathode follower 493 is connected to the error circuits which connect to the error stop circuits shown in Fig. 144. It will be noted in Fig. 144 that there are a series of cathode followers whose outputs are connected in common. Any one of these cathode followers may, therefore, effect the output line to indicate an error and stop the machine. The error stop circuits have been previously described. Thus, it can be seen that the feed-fed circuits (Fig. 139) will check to see that the tape drives addressed and only the tape drives addressed actually run. If an unaddressed unit should run when it was not supposed to, the error will be detected immediately, and the machine will stop. Conversely, if an addressed unit fails to run when it is called upon to run, this failure will likewise be detected immediately and the machine will stop. Where it is desired for some reason not to check in the aforementioned method, a set of hubs are available on the control panel (see also Fig. 139) called remove check. When these hubs are wired, they will affect the coincidence unit 313 (Fig. 139) so that the coincidence can never occur, and therefore no error indication can take place.

As previously mentioned, only one input drive may ever be addressed in any one machine cycle. If two drives are addressed simultaneously, the machine must sense the fact, stop, and indicate failure. If both tape drives are selected, both the select T1 trigger 270 (Fig. 134) and select T2 trigger 276 will be on. A signal is sent from output pins 7 of these triggers to the cathode followers 493 and 494, respectively, inputs 4 and 7, respectively. Signals are transmitted from the outputs of cathode followers 493 and 494, pins 6 and 7, respectively, to a switch 495 (Fig. 144).

At this point, if the two input drives are selected in the same machine cycle, coincidence is noted by the switch 495, and it will transmit a signal from its output pin 4, turning on a trigger 496. The trigger 496 produces an output pulse at its pin 7 which is transmitted to a cathode follower 497, input pin 9. The output of the cathode follower 497 is connected to the error stop line 390.

Thus, if both input drives are selected in one master cycle the machine will stop and indicate an error. The output of the cathode follower 497 (via line 390) is also connected to the input pin 3 of a power unit 498 which allows the energization of the error relay R20. The error relay will open its R20–3 points. When the relay R20 is energized, the hold circuits for the run-out relay R1 and the start relay R15 are broken, and these relays are deenergized. Moreover, as long as an error condition exists, the start and the run-out keys will be inoperative. Relay R20 energizing will also close a circuit from a power source, through the R20–4 relay points, to turn on the check light. This alerts the operator to the fact that some type of error has been committed.

The relay points associated with the reset of selected control functions at the end of a given sorting pass are shown in Fig. 130. They are the R18–4 and the R18–5 relay points of the final tape mark relay R18 which complete a circuit from a power supply through the closed R19–4 and R19–5 points, through the R18–4 and R18–5 points, to the edge terminal M*b*, where they are distributed to their proper locations within the machine. Thus, when the final tape mark relay R18 is deenergized, its R18–4 and R18–5 points are opened, thus cutting off the circuits associated with their outputs from the power source and causing a reset of these elements.

In addition, a separate power source must be controlled for resetting purposes. When relay R18 is energized, its R18–6 and R18–7 points are closed, completing a circuit from this power source, through the relay R18–6 and R18–7 points, to the appropriate sections of the machine. Once again, when relay R18 is deenergized, the circuit from the power source to the machine control circuits is disrupted and the circuits are reset.

*Tape drive selection and reversal.*—The reversal relays, as mentioned a number of times previously, control selection of which set of tape drives will be readers and which set of tape drives will be writers. In Fig. 131 a circuit is established from the single shot multivibrator 253, which is fired by depression of the start key and the transfer of the start test trigger 252, by means of which the signal from its output pin 8 will be transmitted to a trigger 499, input pin 3 (Fig. 144). When the trigger 499 is turned on, its pin 7 will transmit a signal through a cathode follower 500 to the reversal relay points RR23. During any operation except a sorting operation, the reversal relay will be in the position shown. Therefore, the signal from the cathode follower 500 will be transmitted through the RR23 points of the reversal relay, through the normally closed point, via jumper wires and external cables, to tape drives T1 and T2, via one set of wires, and to tape drives T3 and T4, as a write instruction, on the alternate set of wires. Thus, the wires associated with the normally closed points of reversal relay RR23 will cause tape drives T1 and T2 to become readers and will cause tape drives T3 and T4 to become writers. After the first pass of a sorting operation, the reversal relays are transferred, and as a consequence reversal relay point RR23 is transferred so that when the signal from the cathode follower 500 is made available to this point, it will be transferred through the normally open points RR23 of the reversal relay and will now cause tape drives T1 and T2 to become writers and tape drives T3 and T4 to become readers.

The operations of a tape drive are controlled by circuits contained within the unit. These circuits in turn are largely controlled by signals transmitted by external cable from the main frame of the machine. Many of the functions, however, are self-contained, and the circuits for these functions have been described hereinabove in connection with Figs. 37 and 38. Thus, the tape by itself will attempt to run tapes to ready points which will be described later. After the line switch LS (Fig. 37) in the machine has been closed, power is supplied to all the electrical circuits in the tape drives. When the voltages have stabilized, the operator in starting a new operation may desire to load into the machine a reel of tape containing master information. This is done in the following manner. The reel cover is raised out of the way, and when it is raised it opens the reel cover interlock switch CS (Fig. 37). Opening of this switch will cause the deenergization of the run relays RU1, RU2, RU3 and RU4. Next, the operator will turn the tape thread handle 184 which will operate a thread handle microswitch THC associated therewith, which energizes the heavy duty relay coil HD2. When this relay is energized, it will complete a circuit from a power source through a 25 ohm, 50 watt resistor 359e, in parallel with heavy duty relay HD1, through the now closed heavy duty relay points HD2–1, to energize the head solenoid 222. The energization of this solenoid will cause the read/write head assembly to be retracted. At this point the operator may insert the file reel onto the reel shafts provided, thread the tape through the vacuum columns, through the stop capstan via the guides, through the read/write head assembly, and through the second vacuum column and to the machine reel. When this has been done, tape has been threaded in the machine.

The tape thread handle 184 will be returned to its original position, thus allowing its associated microswitch THC to return to the THC–1 position shown in Fig. 37. The heavy duty relay HD2 will now be deenergized, and this in turn will allow the head solenoid 222 to also be deenergized. The read/write heads assembly will now return to its normal operating position. At this point tape has been fully inserted in the machine. The machine will be inactive until the reel cover is lowered to its normal safety position and its switch CS is closed. This reel cover is provided as a safety device so that the tape reels cannot move as long as it is retracted, thus preventing possible injury to the operator.

When the reel cover is closed, it will close the cover contact CS which will close a circuit from a power source, through the closed tape thread handle microswitch points, and through a safety vacuum switch contact SVS, to energize the run relays RU1, RU2, RU3 and RU4. At this point the machine is ready to run up to the load point. The load point on the tape drive associated with this machine is identified by reflective material attached to the back of the tape. This reflective material causes a photocell circuit to be operated and to stop the machine, indicating that the tape is at the load point. The load point is provided to give a constant starting point on a tape reel. Thus, every time that a given tape is put into a tape drive, it will always run up to this point and operation, either reading or writing on tape, will commence beyond this point. When the run relay RU4 has been energized, a circuit is completed from a power source, through the relay RU4BU points, now closed, through a light bulb L, causing this light bulb (to be described later) to be ignited. Having turned on the light, the machine will now start up, running a tape forward until the photocell (to be described later) senses the reflective spot on tape.

*Load point control.*—An attempt to establish the load point for the tape under control of mechanical sensing devices, such as the thread handle arms resting on the tape coil on the reels, does not always attain the required degree of accuracy. The tape itself is approximately .002 inch thick; sensing a coil thickness change in several reel revolutions is difficult. Improper loading of the reels allows bumps to occur which propogate through the reels, causing the arms to bounce, thereby causing errors corresponding to many revolutions of tape on the reels. By mechanical methods it is, therefore, necessary to have about thirty feet of excess tape at either end of the tape to permit start-stop operations. Much greater accuracy is attained herein in the load point positioning of the tape by using a photocell light control by which a small reflective tape surface at the load point is sensed.

A reflective spot at the load point is formed on the tape by vaporizing aluminum on a nylon base and coating the aluminized surface with an adhesive whereby the aluminum is sandwiched between the adhesive and the nylon so that the reflecting surface is not subject to wear.

A photocell light combination 512 (Figs. 18 and 147) is mounted at the top of one of the vacuum columns adjacent the tape course. The photocell light assembly is mounted in a supporting base X shown in Fig. 151*a* with the cover removed. In Fig. 151*a* a photoelectric cell P and a small lamp L are disposed in angular relation to each other, so that the angle of reflection from tape in respect to the photocell is 60° to 70°.

The spacing of the unit from the tape, for small cell cathode areas (.03 sq. inch and under), omitting an optical system, is approximately ⅜ inch. The size of the reflective strip necessarily depends on response time of the photocell and light sensitive area. For lead sulphide cells and tape speed of 500 inches per second, and area of ¼ inch is sufficient.

A satisfactory design of the photocell lamp assembly consists of a pre-focussed 5.2 volt dental lamp and an end-on lead sulphide cell (see Fig. 151*a*). This arrangement has the advantage of giving a signal output with low noise level, and the low wattage light source prevents damage to tape and other components and also permits it to be installed in the same block as the photocell.

Figure 147:
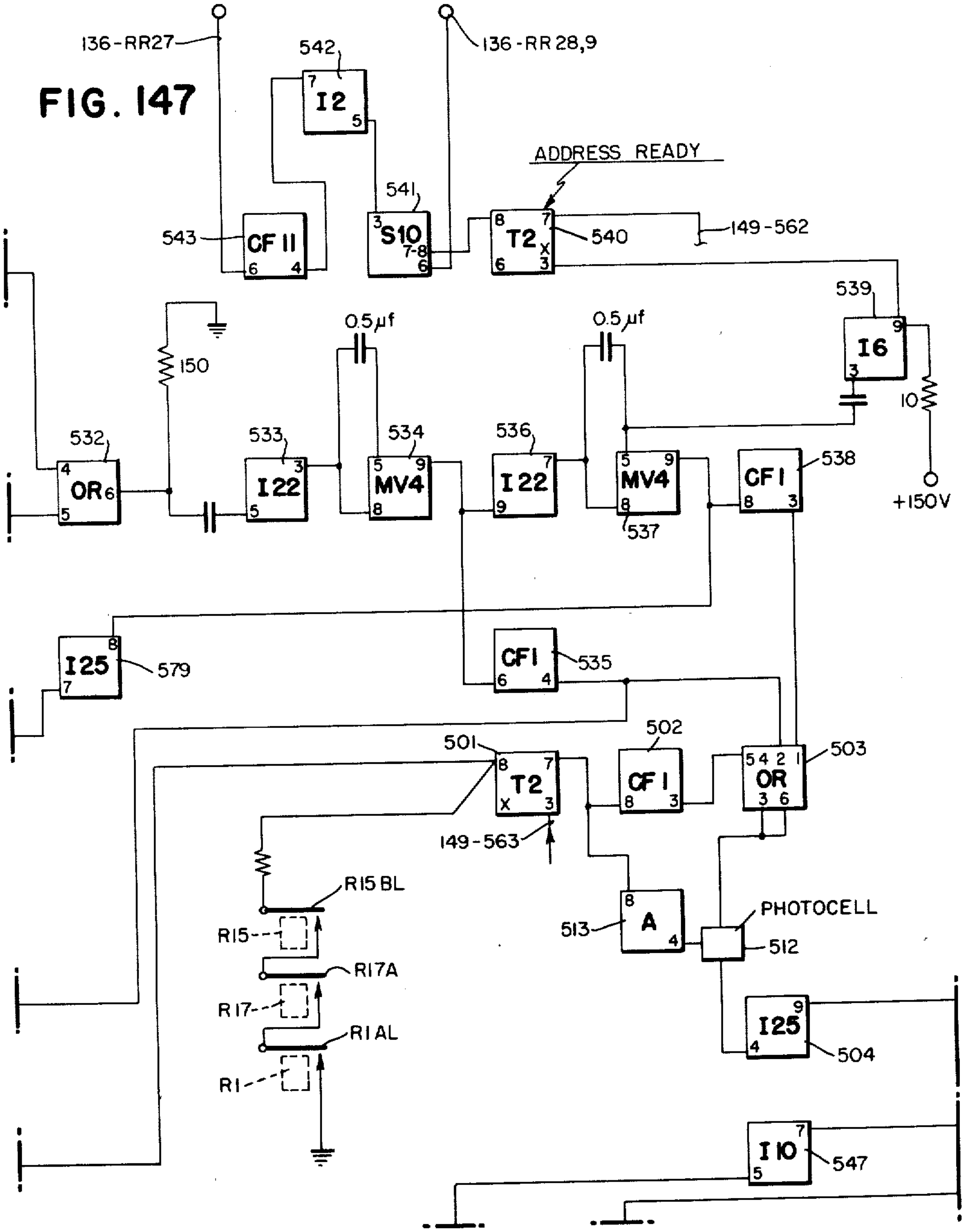

The pulse which is produced from the photocell when the reflection from the aluminized tape spot is sensed is amplified in a network such as that shown in Fig. 151*b*. In Fig. 147 the photocell lamp assembly is denoted by the reference numeral 512, while the amplifying circuit is indicated by the reference numeral 513. Fig. 151*b* is, therefore, in effect the circuits 512 and 513 of Fig. 147 in combination.

In Fig. 151*b* the network is shown as connected to a suitable source of positive voltage +V and to a negative line −V. The voltage divider R1–R2 provides the proper voltage for the photocell P, the load resistance R1 for the photocell being of an average value. The photocell is a lead sulphide type, hermetically sealed. The photocell is coupled to the first stage of an amplifier by means of a capacitor C1. The input grid resistance $R_g$ is adjusted to the A.C. impedance of the input circuit. The input tube has a plate load resistance $R_p$. The plate of the first triode is coupled to the second triode via a capacitor C2. The second triode has a bias divider comprising resistances R3 and R4 in its input network.

When the aluminized spot on the tape passes under the light L (Fig. 151*a*), it causes the photocell P to receive an increase in light. The increase in light is indicated by a decrease in resistance of the photocell. This causes point A to move toward ground, potential-wise. This change in potential is coupled to the grid of the first amplifier tube by the condenser C1, and this pulse is amplified and propagated through the entire amplifier circuit.

This sensing system has proven so sensitive that any point on tape can be determined within 1/16 inch at tape speed of 140 inches per second, and within 1/32 inch at tape speed of 75 inches per second.

*Output tape control circuits.*—Figs. 145 through 149 illustrate the tape control circuits. In Fig. 147 a trigger 501 is provided to allow the tape drives to run until the reflective tape spot is noted. The trigger 501 is reset in the position indicated, and will produce a signal from its output pin 7 to a cathode follower 502, input pin 8, and from this cathode follower to a diode Or circuit 503, input pin 5. The output of the Or circuit 503, pins 3 and 6, is transmitted to an inverter 504, and from its output pin 9 it will energize the tape clutch causing the tape to be driven. The output of the inverter 504 is taken to an inverter 505 (Fig. 148), input pin 5, and causes this inverter to be cut off, which in turn allows inverters 506 and 507, input pins 3 and 5, respectively, to conduct, thereby cutting off the inverters 508 and 514. Thus, no current can pass through these units. The signal from the inverter 504 (Fig. 147) is also transmitted to an inverter 508 (Fig. 148), and from its output pin 6 it generates a signal which energizes a pair of inverters 509 and 510. At this time a circuit will be completed from a power source, through the moving coil 80*a*, through the inverters 509 and 510, to the other side of the power source, causing the coil 80*a* to be energized in one direction (see also Fig. 27). Current flowing in this direction will cause the tape start stop clutch to be driven to the start position, and tape will be fed through the machine at this time.

When eventually the light from the photolight L is reflected by the reflective spot on tape to the photocell in the block 512, a signal is transmitted from the photocell to the amplifier 513, the details of which are shown in Fig. 151*b*, and the pulse from its output pin 8 will turn off the trigger 501. Turning off trigger 501 deconditions the diode Or circuit 503, via tube 502. This in turn deconditions the inverter 504 and allows the inverters 505 and 508 to revert to their original status.

Thus, where previously current was allowed to pass through the inverters 509 and 510 to condition the tape to run, at this time the inverters 508 and 514 will be energized and will allow the current to pass through their own outputs. This then allows current to flow through the moving coil 80*a* in the opposite direction to that in which it flowed while tape was moving. The action of this opposite current is to force the tape drive mechanism to revert to the stop position and thus tape will be stopped.

When the trigger 501 is pulsed from the photo-cell 512 via the amplifier 513, it produces a signal from its output pin 8, through a cathode follower 515 (Fig. 146), to a diode And circuit 516, input pin 4, diode And circuit 517 (Fig. 145), input pin 4 and to an inverter 518, input pin 4. The output of the inverter 518 will cause a ready light 519 on the tape drive panel to be turned on. When the light 519 comes on, it provides an indication to the operator that the tape drive is ready to receive instructions from the main frame.

Figure 145:
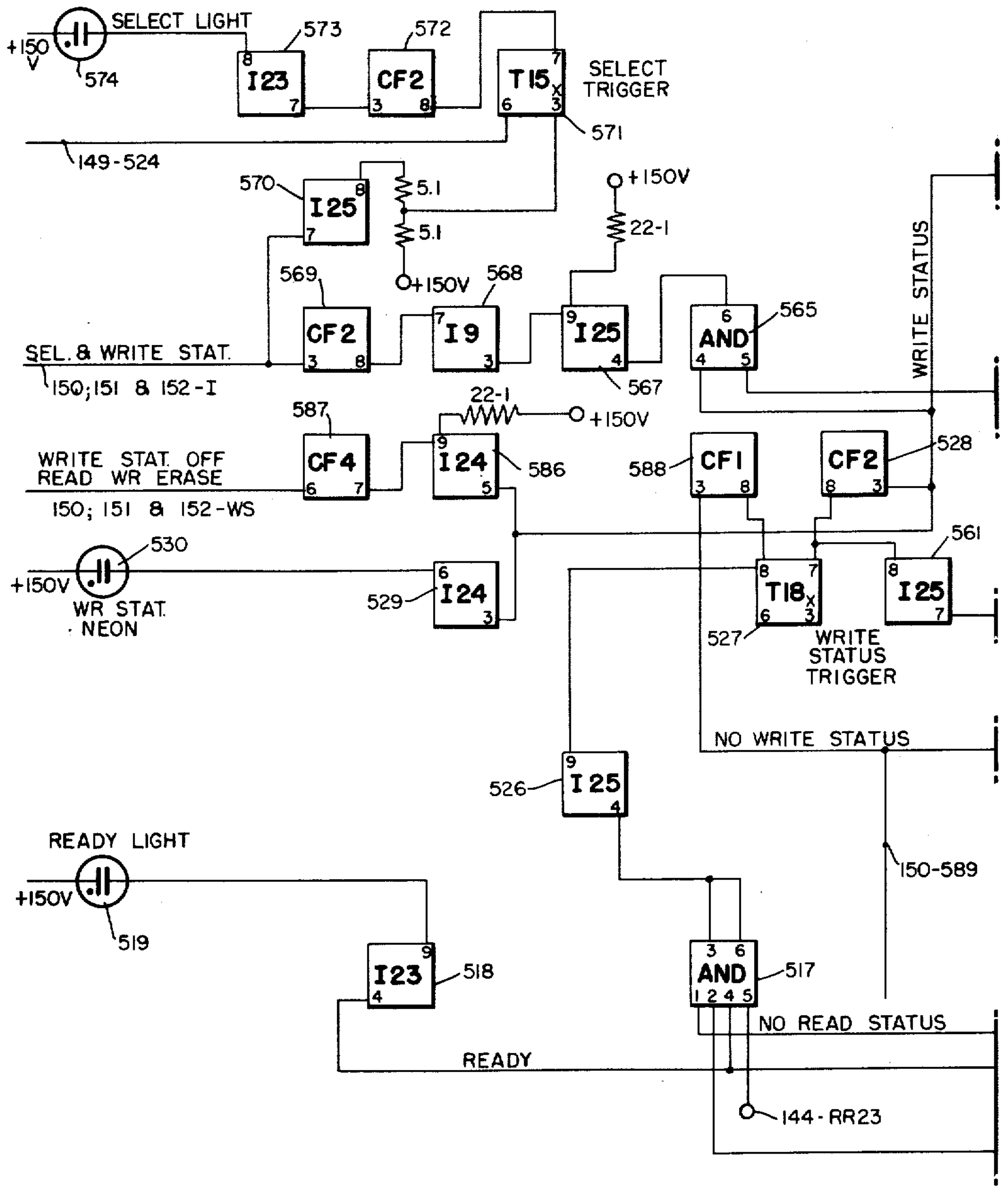
Figure 149:
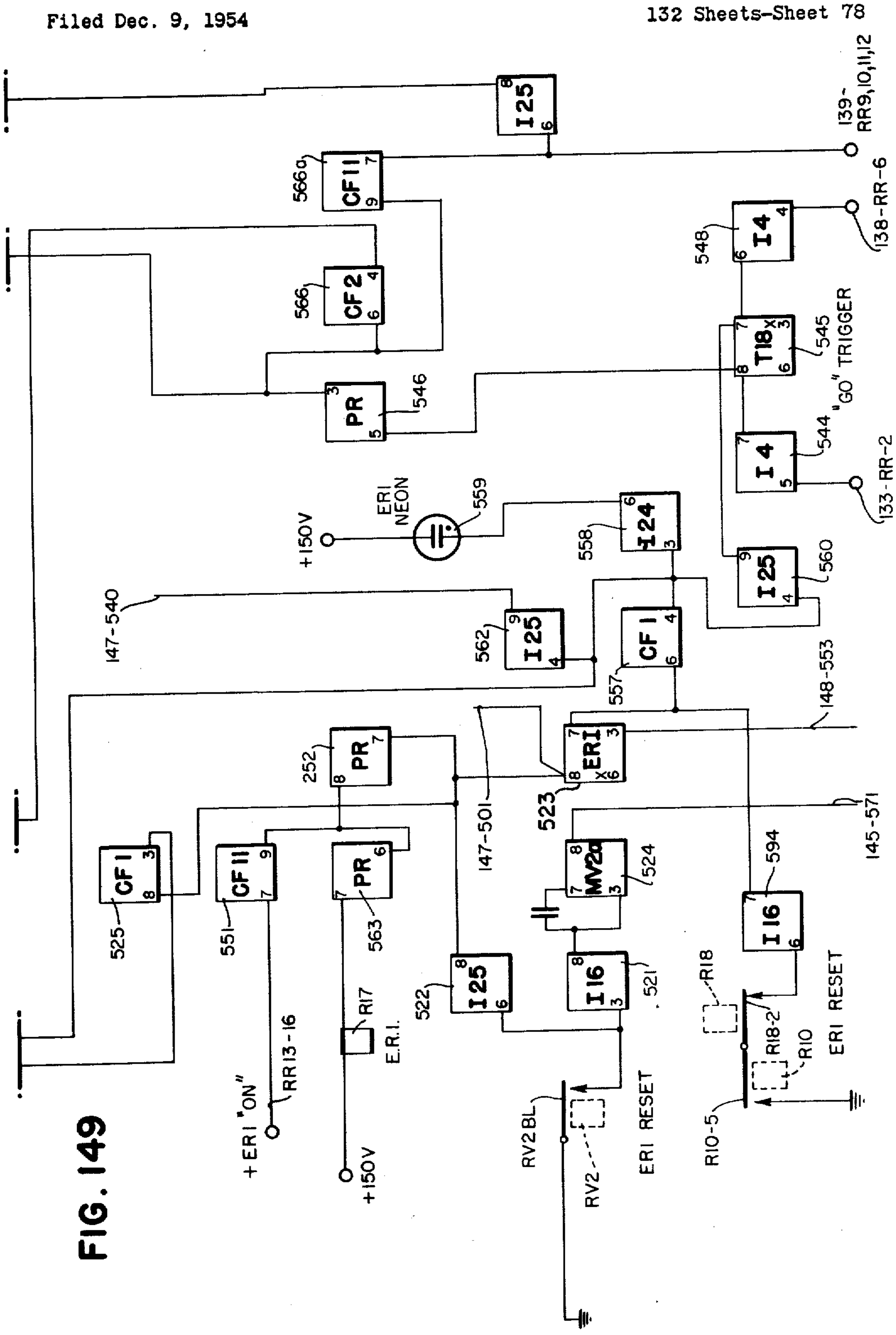

When the start key is depressed on the main frame, a signal is generated by the trigger 499, as previously described in connection with Fig. 144. The signal from the trigger passes through the cathode follower 500, to the reversal relay point RR23, which will be normally closed, through these points and via external cables to terminals J*a* and J*d* (Fig. 149). A pulse at these terminals will be delivered to either And circuit 516 or 517, input pins 5 (Figs. 146 and 145, respectively), depending on which tape drive is to be the reader and which is to be the writer. Let it be assumed that this drive is to be selected as a writing unit. Thus, no signal will be received by the And circuit 516. It has been previously stated that pin 4 receives a signal from the ready circuits. Pin 5 will receive a signal from the main frame as an indication that it is to become a writing unit. Since the read status has not been selected, a read status trigger 519 (Fig. 146) will be in its normal reset position, and a signal is transmitted from its output pin 8 through a cathode follower 520, to one input of the diode And circuit 517 (Fig. 145).

A check must be made to establish that there is no end of reel indication. Run relay RU2 (Fig. 37) was deenergized upon insertion of the reel, and the RU2BL points (Fig. 149) reverted to their normal position as shown. Thus, a circuit will be established from a power source, through the RU2BL points to inverters 521 and 522. The output pulse of the inverter 522 will turn on the end of reel interlock trigger 523 and indicate an end of reel. Thus, during the time that the reel is being loaded into the machine, this tape drive cannot be addressed. When the reel is completely inserted and the reel cover closed, the run relay RU2 is once again energized and the relay points RU2BL are opened.

Upon opening of the relay points RU2BL (Fig. 149), the circuit to the inverter 521, input pin 3, is broken, and its output pin 8 will produce a signal to fire a single shot multivibrator 524. After a time delay, during which relays, etc. may stabilize, the single shot multivibrator 524 will transmit a signal to a trigger 523 to turn it off. Thus, there is no indication at this time of an end of reel in this drive, and from the output pin 8 of the trigger 523, a signal is transmitted to input pin 8 of a cathode follower 525, and from its output pin 3 to the diode And circuit 517 which is properly conditioned thereby. Thus, at this time the four input pins of the And circuit 517 are properly conditioned to allow a signal to pass through the output pins 3 and 6 to an inverter 526, input pin 4, through the inverter 526 to turn on the write status trigger 527. This will cause a number of functions to be performed. The output pin 7 of the write status trigger will produce a signal which is transmitted to the input pin 8 of a cathode follower 528 and a circuit will be established from its output to input pin 3 of an inverter 529, and through the inverter to ignite a write status neon 530 at the operator's station on the tape drive. Thus, the tape drive will at this time indicate that it is ready and that it is in write status.

Precaution is taken at the outset of a writing operation to provide a clean length of tape (no recording thereon) before the recording operation begins, so that during a subsequent reading operation the first authentic recorded character will be read, rather than a character from some old record. This can be done by causing a selected output tape to run through the erasing head for a predetermined length of time before the recording circuits begin to operate, after which time the tape is caused to stop and await further instructions. Thus, if a written reel, so treated, is allowed to go through a shorter time delay while being read at a later time, no stray characters at the beginning of the tape will be read by the reading circuits and thereby transferred to the machine.

*Writing delay and "go"*.—This so-called writing delay is established by the signal transmitted from the write status trigger 527 (Fig. 145), output pin 7, through the cathode follower 528, output pin 3, and to a diode Or circuit 532 (Fig. 147), input pin 4. This pulse will pass through the Or circuit 532 and through the resistor-condenser network associated with the inverter 533, input pin 5, and will pass through the inverter 533 to a single shot multivibrator timing device 534. The single shot multivibrator 534 has a time cycle of approximately 50 milliseconds. During the time that the single shot is energized, its signal is sent through a cathode follower 535, input pin 6, through the output pin 4 of the cathode follower, to the input pin 2 of the diode Or circuit 503. When the output pins 3 and 6 of the Or circuit 503 emit a signal, via the inverter 504, the tape will be caused to run by means of the circuits previously described. When the pulse of the single shot multivibrator 534 (Fig. 147) eventually drops, a signal is emitted to the input pin 9 of an inverter 536, through its output pin 7, to cause a second single shot multivibrator 537 to be energized. This multivibrator likewise has a timing period of approximately 50 milliseconds. During the time that the single shot timing device 537 is energized, it will transmit a signal from its output pin 9, through a cathode follower 538, via its output pin 3, to the input pin 1 of the diode Or circuit 503.

Through this diode Or circuit 503, and circuits previously described, the tape will be kept running for the additional 50 milliseconds provided by the pulse of the single shot multivibrator 537. When the pulse of the timing device 537 drops at the end of its time period, a signal is transmitted from its output pin 5 to an inverter 539, through its output pin 9, to cause an address ready trigger 540 to be turned on.

Until this time the address ready trigger 540 had been in its off position, and as a consequence the circuits fed by it indicate a not ready condition. As previously described in connection with the selection of the tape drives via circuits of Fig. 137, a signal is emitted from the output of the cathode followers 324 and 386, output pins 6 or 7, through the reversal relay points RR28 and RR29, normally closed, via external cables, to the input pin 6 of a switch 541 in Fig. 147. Thus, when an output unit is selected to be written on, a signal is transmitted from the tape unit selection circuits in the main frame to the switch 541, and interrogation is made as to whether this unit is ready to receive information to be written. Up until this point it has not been, and as a consequence the signal entering pin 6 of this switch will pass therethrough via its output pin 3, through an inverter 542, via its output pin 7 to a cathode follower 543, via its output pin 6, through external cables to the reversal relay points RR27 (Fig. 136), to the inverter 326 in the main frame, input pin 5, via the output of the inverter 326, pin 7, to the cathode follower 327, and from its output pin 6 back to the diode And units 325 and **325*a*** (coincidence).

Thus, if any addressed output tape unit is not ready, the coincidence circuits 325 and **325*a* will be deconditioned so that no pulse may pass through them to start any output drive. At this point the machine will stop and wait for the output unit or units, not yet ready, to become ready. If for any reason a tape drive selected cannot become ready, the machine will remain stopped. If, however, the reason that an output tape drive was not ready is due to the fact that it has not yet reached its fully ready position, when it does reach this position the signal emitted from the tape control circuits, indicating not ready, will be discontinued, and upon discontinuation will allow coincidence in the coincidence circuits 325 and 325*a*** (Fig. 136) to permit the start signals to be emitted and thereby cause the output tape drives to be started.

Let it be assumed now that the tape drives have been selected and that at this point they are ready. In Fig. 136 the select signal from the select trigger 223 will then pass through (assuming the selection of tape drive T3) the cathode follower 324, through the And circuit 325, through the inverter 328, through the inverter 329, and via the cathode follower 330 to the reversal relay RR2 points, normally closed. The signal is transmitted through the reversal relay points RR2 and via external cables to the input pin 5 of an inverter 544 (Fig. 149). The start signal then will pass through this inverter via its output pin 7 and cause a Go trigger 545 to be turned on. The Go trigger will produce a signal from its output pin 8, through a power unit 546, via its output pin 3, to an inverter 547 (Fig. 147), via its output pin 7 to cause the moving coil **80*a*** (Fig. 148) to be energized in the run direction as previously described.

Thus, the output tape drive may be selected, it may wait until it reaches the ready point, and at this point it may have started and a record may be emitted from memory and recorded via the normal writing circuits. When a record mark RMO(1.0) is sensed on the output of the inverter 340 (Fig. 131), this signal is transmitted to the inverter switch 341 (Fig. 138), it passes through this switch, as previously described, through the cathode follower 345, through the reversal relay point RR6, normally closed, and via the external cable to the input pin 4 of an inverter 548 (Fig. 149). This signal will pass through the inverter via its output pin 6 and will cause the Go trigger 545 to be turned on. Thus, the circuit controlling the moving coil clutch **80*a* (Fig. 148) will be deconditioned, and will revert to its original condition, stopping the tape. This operation may be repeated for many records until eventually the follower arms 150 associated with the output tape reel sense that the physical end of tape is approaching. When this occurs a circuit will be established from a power source to the file reel switch FRS (Figs. 31 and 37) associated with the follower arm, through the relay point RU8AL (Fig. 37), through the run relay point RU4BU, previously closed, to cause the tape end relay RU6 to be energized. Thus, the RU6AU relay point (Fig. 146) will be transferred and will cause a trigger 549 to be turned on. The output signal at pin 7 of the trigger 549 is transmitted through a cathode follower 550, via the external cable to (assuming tape drive T3) the points RR17** of the reversal relay (Fig. 142), through the normally closed points, and to the circuits previously described which are activated when the end of tape is sensed. The tape drive sensing end of tape is kept in run condition, a tape mark is generated internally within the machine frame, is transmitted to the writing circuits in this tape drive, is written on the tape and thereafter the machine emits from the main frame a signal to the end of reel indicator.

Figure 146:
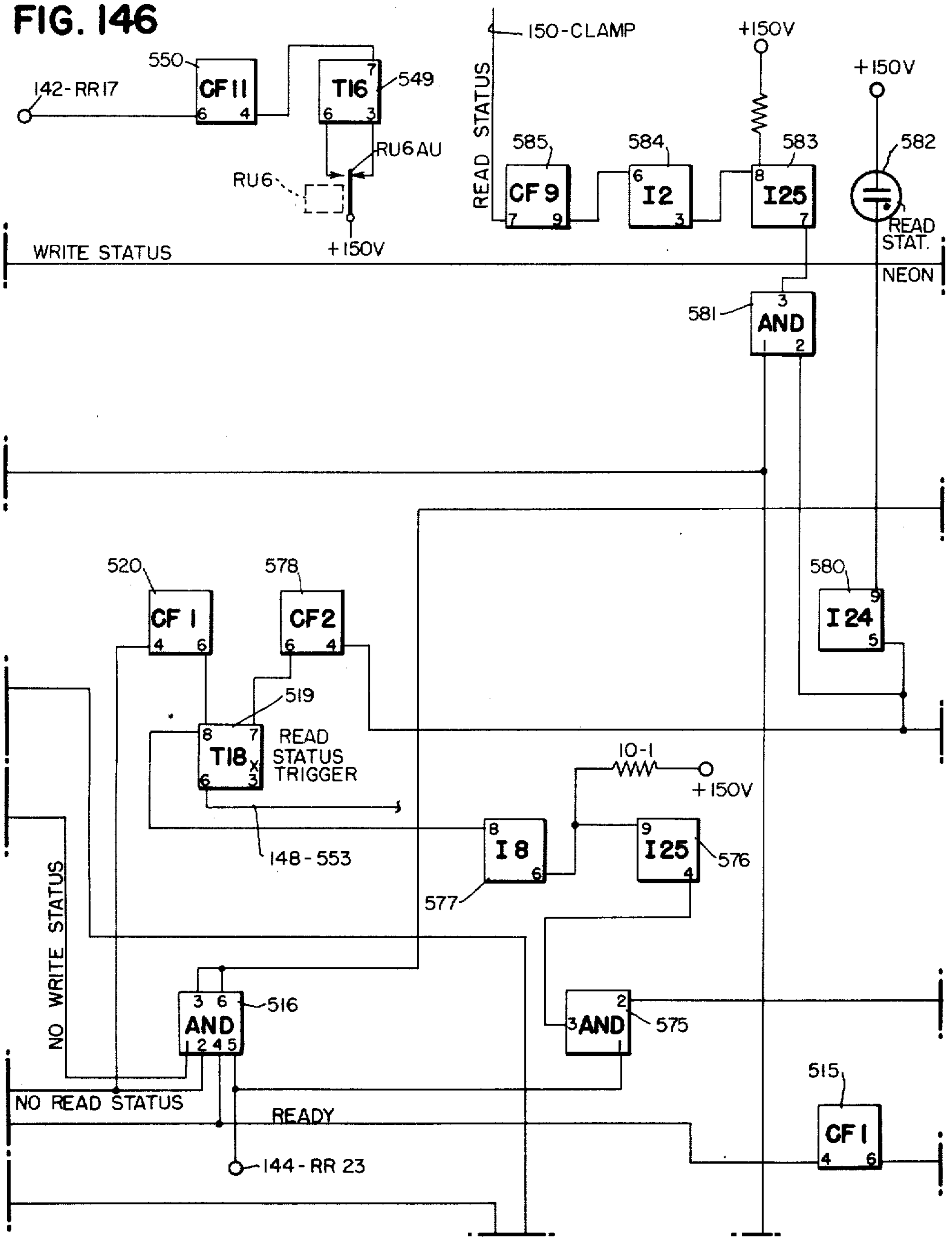
Figure 148:
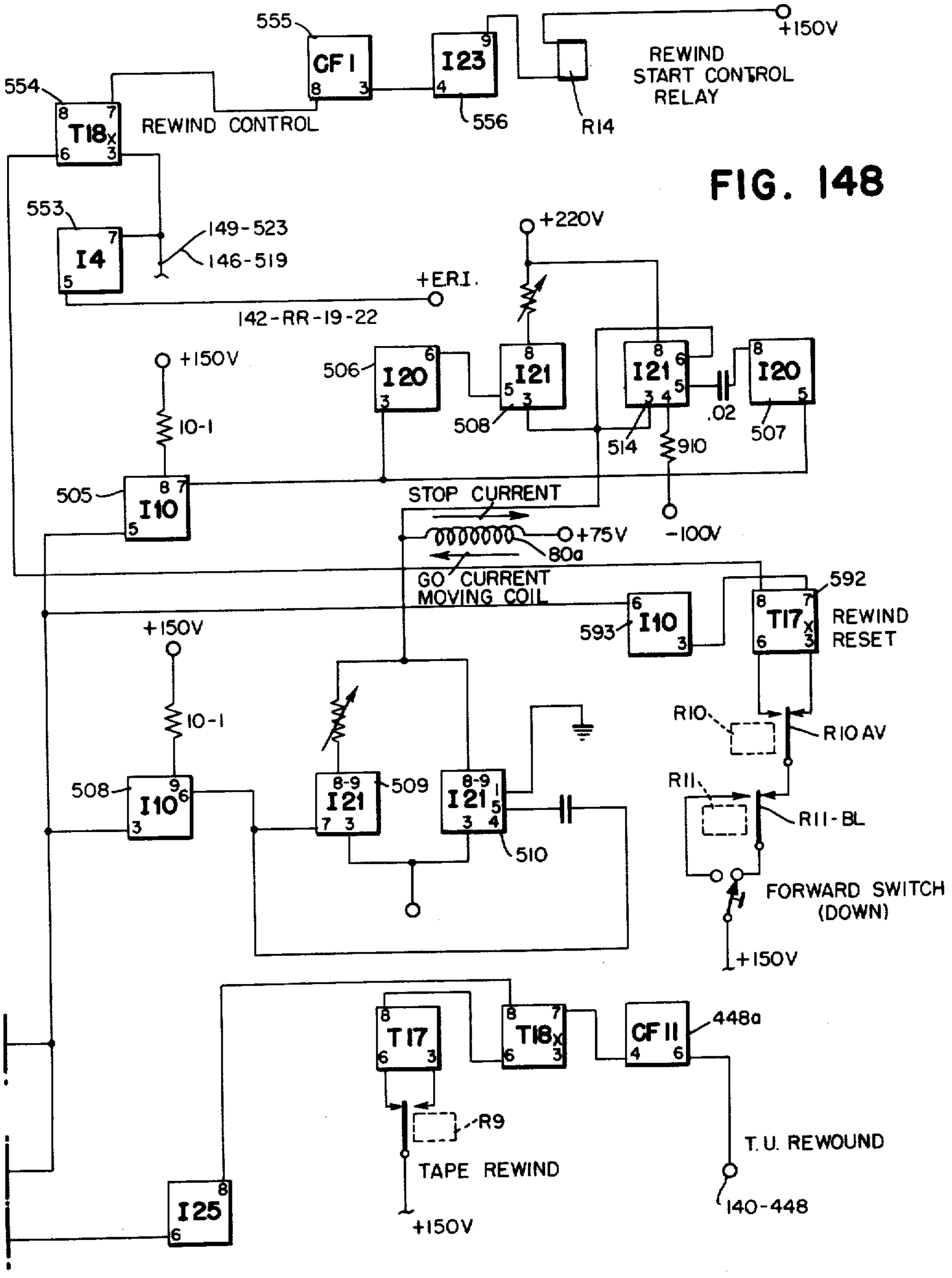

After the tape mark has been written, a signal will be emitted from the switch 375 (Fig. 142), which was previously described, is transmitted through the inverter 377, output pin 6, the cathode follower 379, output pin 6, to the reversal relay RR20 points, normally closed and via external cable to the input pin 5 of an inverter 553 (Fig. 148). A signal is transmitted from the output pin 7 of the inverter 553 to a rewind control trigger 554, and also to an end of reel interlock trigger 523 (Fig. 149) and to the read status trigger 519 (Fig. 146). The rewind control trigger 554 (Fig. 148) is turned on and produces an output from its pin 7, through a cathode follower 555, output pin 3, and to an inverter 556, output pin 9, to energize the rewind start control relay R14.

The end of reel interlock trigger 523 (Fig. 149) is turned on by the signal. Its output pin 7 provides a signal to a cathode follower 557, whose output at pin 4 goes to a number of locations. This pulse will be transmitted to the input pin 3 of an inverter 558, and via this unit will turn on an end of reel indication neon 559 on the operator's control panel. It will also be transmitted through an inverter 560, via its output pin 9, to turn and hold off the Go trigger 545, so that the tape drive can never be restarted as long as an end of reel indication is on. It will also go to the input pin 7 of an inverter 561 (Fig. 145), and via this unit it will turn off the write status trigger 527. Finally, it is also transmitted to an inverter 562, and via its output pin 9, to the address trigger 540 (Fig. 147), to turn it off.

Thus, if after tape drive T3 is completely written on, and an end of reel indication is turned on, if the unit is once again addressed, the circuits associated with the address ready trigger 540 (Fig. 147) will not allow a ready signal to be transmitted to the main frame and the machine will stop.

From the output pin 8 of the end of reel interlock trigger 523 (Fig. 149), the signal is also transmitted to the power amplifier 252, input pin 7, and via this unit, output pin 8, it will energize the input pin 6 of a power amplifier 563, and the input pin 9 of the cathode follower 551. The idle relay R17, which is the end of reel indication relay, is energized by a pulse from output pin 7 of the diode 563. A signal is transmitted via the output pin 7 of the cathode follower 551 and external cable to the reversal relay points RR18 (Fig. 142), and to the circuits inside the machine to be operated on by the end of reel indication for this tape drive. These circuits have previously been described.

From the output pin 8 of the end of reel interlock trigger 523, a signal is also fed to the input pin 8 of the cathode follower 525. The output of the cathode follower 525 is transferred to the diode coincidence circuit 517 (Fig. 145), previously described, and prevents any coincidence from occurring in this unit. Thus, while the end of reel indication is set on, a tape drive may not go into a write status.

As an indication to the operator that an output tape drive has gone into write status and actually has a valuable record written thereon, a circuit is provided so that upon the first selection of such tape drive, an indication will be given at the operator's station that this unit has been selected for writing. Having previously turned on the write status trigger 527 (Fig. 145), whose output pin 7 energizes the cathode follower 528, via its output pin 3, a diode And circuit 556 (Fig. 145) has been partially conditioned via input pin 4.

When the Go trigger 545 (Fig. 149) is turned on, a signal is transmitted from its output pin 8 to the diode 546, via its output pin 3, to the input pin 6 of a cathode follower 566, via its output pin 4, to this diode coincidence unit 565 (Fig. 145), input pin 5, forming a full coincidence and allowing a signal to pass through its output pin 6 to an inverter 567, via its output pin 9, to an inverter 568, via its output to a cathode follower 569, and via its output pin 3 to two locations.

From the output pin 3 of the cathode follower 569, the signal is transmitted through an inverter 570, output pin 8, and through the resistor network associated with it to cause a select trigger 571 to be turned on. Turning on the select trigger 571 will produce an output at its pin 7 which is transmitted through a cathode follower 572, and an inverter 573, to ignite a select light 574 on the operator's panel. Thus, if any record has been written on this tape drive, this light will be lit and will indicate to the operator at the end of the operation that this tape contains valuable data.

The preceding is a full description of the operation of the electronic control circuitry in a tape drive when the unit is selected as an output or writing unit. The operation of the circuitry is largely identical when the unit is selected as a reading unit with the exceptions to be described.

*Input tape control circuits.*—If the unit to be addressed is to be a reader (assume tape T1), a signal emitted from the reversal relay point RR23 (Fig. 144) will be emitted to the input pin 5 of the diode coincidence unit 516 (Fig. 146). At this time there will be no such signal available to the corresponding location of the coincidence unit 517 (Fig. 145), so that this unit may not now be selected as a writer. The selected unit is brought up to the ready point as previously described for a writer, allowing coincidence to occur at pin 4 of the And circuit 516 (Fig. 146). Since this unit does not yet have its read status determined, the read status trigger 519 (Fig. 146) will allow a coincidence to occur at pin 2 of the And circuit 516, via the cathode follower 520. Likewise, since the write status is not indicated in this tape drive, the write status trigger 527 (Fig. 145) will allow a coincidence to occur at the input pin 1 of the And circuit 516 (Fig. 146), via the cathode follower 258 (Fig. 145). Thus, full coincidence is established at this time. The output pulses at pins 3 and 6 of the And circuit 516 are transmitted to the diode Or circuit 532 (Fig. 147). The output pulse of the Or circuit 532, pin 6, is transmitted through the inverter 533, to the 50 millisecond single shot multivibrator 534, as previously described, and causes the tape to run for the time cycle of this device, as previously described. When the single shot multivibrator 534 completes its period, a signal will be transmitted from its output, pin 9, to the cathode follower 535, input pin 6, and through the cathode follower to the input pin 2 of a diode coincidence circuit 575 (Fig. 146).

It has been previously established that the signal entering pin 5 of the And circuit 516 (Fig. 146) indicates a read status selection, so that pin 1 of the coincidence unit 575 will be properly conditioned to allow this signal to pass through its output pin 3, to an inverter 576, via its output pin 9 and associated resistor network to the input of an inverter 577, and via its output pin 8, to turn on the read status trigger 519 (Fig. 146).

The read status trigger 519 (Fig. 146) now being turned on will emit a signal from its output pin 7 which is transmitted via a cathode follower 578, output pin 4, to an inverter 579 (Fig. 147), input pin 7, and via its output pin 8 to the pin 9 of the single shot multivibrator 537.

The function of this described circuit is to stop the operation of the single shot multivibrator 537, so that at this time only one-half of its total time period (i.e. 25 milliseconds) will be available to cause the tape to run.

At this time the read status trigger 519 (Fig. 146) has been turned on, and the machine is in read status. As previously established in respect to Fig. 136, the reversal relay point RR27 is in an open state. Thus, the ready or not ready signal emitted from the cathode follower 543, output pin 6 (Fig. 147), entering the normally open point of the reversal relay point RR27, will have no effect on the machine. At this point, therefore, the status of the address ready circuits in a reader tape drive is unimportant.

The pulse at the output pin 8 of the read status trigger 519 (Fig. 146) is passed through the cathode follower 520, and will now decondition the coincidence circuits 517 and 516 (Figs. 145 and 146, respectively), so that no further signals may be transmitted to cause coincidence in these units and no further selection of these machines will be made. This is permissible since this unit has just previously been selected as a reading unit and will remain in this status until a tape mark is eventually read.

The output pulse of the read status trigger 519 (Fig. 146), pin 7, will pass through the cathode follower 578, output pin 4, to the input of the inverter 580, pin 5, and also to an And circuit 581, pin 2. The signal will pass through the inverter 580, output pin 9, to cause a read status neon 582 at the operator's station to ignite, indicating to the operator that this unit is now a reading unit. The signal which is also transmitted to the diode And circuit 581 will not indicate coincidence except when this tape drive is selected and the Go trigger 545 (Fig. 149) is turned on, establishing a coincidence at pin 1 of the And circuit 581. The pulse at the output pin 3 of the And circuit 581 goes to an inverter 583, and, via its output pin 8, to an inverter 584 (Fig. 146), and via its output pin 6, to the unit 585, and via its output to cathode followers feeding the read/write circuits. Thus, unless this tape drive is selected and in read status, the signal transmitted from the read/write circuits will clamp down a single shot multivibrator associated with the reading circuits and prevent the transmission of any signals from the read amplifiers of this tape drive. The actual controls for the read amplifiers are described in another section.

When the write status neon 530 (Fig. 145) is turned on, the signal will also be transmitted to the input pin 5 of an inverter 586, via its output pin 9 and resistor network to the input pin 7 of a cathode follower 587, through this unit via its output pin 6 to the units WS in the write control circuits (Figs. 150, 151 and 152). As described in another section, the units WS will control the voltages required to write on tape.

In order to selectively write records on tape, a gate is provided in the writing control circuits so that pulses on the output buses associated with all drives will write only on the tape drive selected. A circuit is provided in Fig. 145, via the circuit previously described and consisting of the cathode follower 569, output pin 3, which had previously fed the inverter 570, input pin 7. The output signal Select and Write Status at pin 3 of the cathode follower 569 will also be transmitted to the units marked I in the write control circuits of Figs. 150 through 152. These units act as inverter switches, and will allow the pulse on the write buses transmitted from the main frame to write only on those tape drives that have been selected. Thus, the seven write buses will be common to all tape drives, but only the tape drives selected as writers at any given time will record a record being transmitted on these buses. When a tape drive is selected as a writing unit, the write status trigger 527 (Fig. 145) will emit a signal from its output pin 8, via a cathode follower 588 as the signal No Write Status, and via output pin 3, to the erase circuits in Fig. 150. The No Write Status signal will be transmitted through the inverter 589 (Fig. 150), output pin 8, to the input pin 9 of a cathode follower 590, and via the output pin 3 of this unit to energize the erase head 591. Hereafter, any tape that passes over the erase head will be erased prior to the writing of new data thereon, since the erase head is in front of the write heads.

Trigger 501 (Fig. 147) is used to turn the machine on and off. This trigger is turned into the position shown by the X by the fact that when tape is loaded the machine reel follower arm 152 (Fig. 31) via its MRS–1 points (Fig. 37) allows the energization of relay RU15 (Fig. 37). Since there is no end of reel indication at this time, the points RR17 of the reversal relay (Fig. 142) will be in the normal position, as shown. The run relays RU1—RU4 (Fig. 37) will be energized via points SC when the operator closes the reel cover. When all these conditions exist, the machine will run the tape to the ready point. It is known that when all these conditions are true, the ready signal is not yet available; therefore, the points R15BL, R17A and RU1AL will cause the transfer of the trigger 501 (Fig. 147) to the location required to cause the tape to run to the load point.

When an end of reel is sensed either on a reader or a writer, the end of reel interlock trigger 523 (Fig. 149) will emit a signal from its output pin 8 to cause the trigger 501 (Fig. 147) to once again be turned On to its unloaded condition and remain in this condition until a new reel has been inserted and its load point located by the photocell by virtue of the reflective spot on the tape as previously described.

A rewind reset trigger 592 (Fig. 148), normally reset, as shown, is controlled by different functions. It can be seen by a study of the arrangement of the relay points associated with the trigger 592 that the transfer of any one of these points will cause the trigger 592 to be turned on, and when all the points are in the position shown, the trigger will be turned off.

At the operator's station is a forward switch. When this switch is depressed, its corresponding points will transfer (Fig. 148) to cause the trigger 592 to be transferred. A signal is emitted from output pin 7 of the trigger to an inverter 593, and via its output pin 6, to cause the moving coil clutch **80*a*** to be activated in the direction allowing tape to feed.

When rewinding of tape is inaugurated, relay R11, as described in another section, will transfer. Transferrance of the R11BL points (Fig. 148) will cause the current in the coil **80*a* to once again cause tape to feed. By means of other control circuitry, likewise described elsewhere, the tape will feed in a backward direction at this time. The forward switch has two positions. When depressed down, the forward switch (Fig. 148) will be closed and will allow tape to be run as long as this switch is manually held in its depressed position. If the switch is operated in the opposite direction, tape will run forward until the switch is once again depressed in a downward direction and is then released. The description of this operation is in the relay section. Its net effect, however, is to cause relay R10 to be energized and thus to transfer its R10AU points (Fig. 148), so that the trigger 592** will cause tape to run continuously.

In all operations except a sorting operation, the end of reel indication within a tape drive may be reset only by manual intervention of the operator; thus, if the input tape supply is exhausted, the operator will remove it and insert a new master tape. Insertion of the tape will result in the resetting of the end of reel indication as previously described. The same is true of an output unit. When an output tape is filled, the reel is removed, a clear tape is inserted in its place, and the operation is resumed. In sorting, however, at the end of each successive pass of a tape, it is desirable for the machine to automatically reset the end of reel indication in all tape drives, except at the end of the last pass, when the operation is completed. This is accomplished in the following manner. The sort relay R10 (Fig. 130) is energized via control panel wiring as shown in Fig. 130. The R10–5 relay points (Fig. 149) then will be closed, and will establish a circuit to the R18–2 points of the final tape mark relay. It has been previously explained that during any operation once power is applied to the machine, the final tape mark relay R18 will be energized except when the reset key is depressed or an automatic reset occurs during sorting. Thus, the circuit will not be complete through the R18–2 relay points until the end of a complete pass of information through the machine has been noted, and all tape drives have been rewound. At this time an automatic reset is caused to take place which will allow the final tape mark relay R18 to be deenergized, as previously described. The deenergization of the final tape mark R18 will allow the completion of a circuit from the power source through the R10–5 relay (Fig. 149) points, through the R18–2 relay points, via external cable to the inverters 594 (Fig. 149), input pin 6, in all tape drives. The outputs of the inverters 594, pin 7, produce a signal which causes the end of reel indication triggers 523 of all drives to be reset. The resetting of the end of reel triggers 523 will now allow the tape drives to run to their load points, and the operation will continue in normal fashion. Upon completion of a sorting operation, the final tape mark relay R18 will not be deenergized, and as a consequence, at this time, the circuit just described will not be completed and the end of reel interlock trigger 523 will not be reset.

Fig. 152*a* represents a switch mounted on each tape drive. The system of machine operation calls for a selection, for instance, of tape drive T1 or T2 at any given time. A selection of this nature requires two wires, one for the selection of tape drive T1 and one for the selection of tape drive T2. Since the system embodied herein utilizes one cable from the main frame of the machine to one tape drive, and a second cable from this tape drive to the second tape drive, it would normally necessitate different terminal locations on the two drives identifying them as T1 or T2. The switch of Fig. 152*a* avoids this difficulty and makes all the tape drives interchangeable. The switch is capable of switching all the wires peculiar to either T1 or T2, so that depending on the setting of the switch, any given unit may be made to respond to either address. The circuit of Fig. 152*a* shows two sets of wires entering the two sides thereof. If the wires to the right of the switch are associated with tape drives T1 or T3, and the wires to the left are associated with the functions of tape drives T2 and T4, then the address of these units may be determined by the setting of the switch. In the example, if wires *a'*, *b'*, *c'*, etc. are associated in the main frame with circuits controlling tape drive T1, then these signals will pass through the switch when tape drive T1 is addressed by the main frame and will cause the functions previously described to occur in that tape drive. If the main frame of the machine addresses tape drives T2 or T4, the signals will terminate at the left terminal, and since within this drive these terminals are connected by the switch these signals would perform no operations in this drive. These wires, however, are connected by external cables to the second tape drive which presumably is tape drive T2, in which case these signals will get through the switch on the second drive to cause it to operate. Since there are two cables emanating from the main frame, one for the input drives and one for the output drives, it can be seen that tape drive T1 may be built exactly the same as tape drive T3, and tape drive T2 exactly the same as tape drive T4, since the functional difference between tapes T1 and T3 can be effected within the main frame.

*Electrostatic storage.*—The main frame includes two electrostatic memories, each comprising a pair of cathode ray tubes, as stated. Electrostatic memory is capable of storing information for relatively short periods of time, unless regeneration of the stored signals is employed. This process consists of continuously scanning the information stored in the tubes, identifying this information and then restoring it in the same location at which it was sensed during the interrogation process. Thus, by continuous repetition of interrogation and re-storage, information may be maintained in a given location of electrostatic memory over an extended period of time.

Electrostatic charges are stored on a face plate within the cathode ray tubes which may later be discharged to provide a signal on a pick-up plate provided on the outside of the tube. Such signal may be amplified and may be recognized as the information that was stored in the given location. Each storage system herein employs two I.B.M. type 85 cathode ray tubes.

In the present case data is stored, five characters across the face of the tube, and twenty characters in a vertical direction providing storage for 100 characters per tube or a total of 200 characters per memory unit. This is the storage arrangement indicated in Fig. 10*a*.

Storage and regeneration of information herein proceeds in a serial fashion. The seven bits comprising a character, as mentioned previously, are composed of the –1–, –2–, –4–, –8–, –A–, –B– and –C– bits. The characters are stored in memory and are regenerated in the order stated, first the –1–, then the –2–, etc. Thus, if the electron beam inside the memory tubes is deflected to a certain location and then allowed to interrogate this location, the order of interrogation will be from the –1– bit to the –2– bit, from the –2– bit to the –4– bit, etc., until the character is completely stored and/or regenerated.

After a character has been completely operated on, i.e. stored or regenerated, the machine's internal circuits cause the electron beam to be deflected to the next succeeding storage position in memory where the same process takes place. Thus, it may be seen that three timing devices are required for this operation, the first being the unit which controls the deflection of the electron beam and its interrogation, and consequent regeneration of a bit in a given location. The machine progresses from bit to bit through all seven of them, and as a consequence a counter is required to maintain memory of which bit is to be currently operated on. This counter will keep track of the operation on the seven bits within one character stored in memory. In order to advance the electron beam from character to character, an additional counter will be required to act as memory of which complete character is to be operated on at any given time. These three devices are respectively: the bit ring, the character ring and the column counter.

Figure 153:
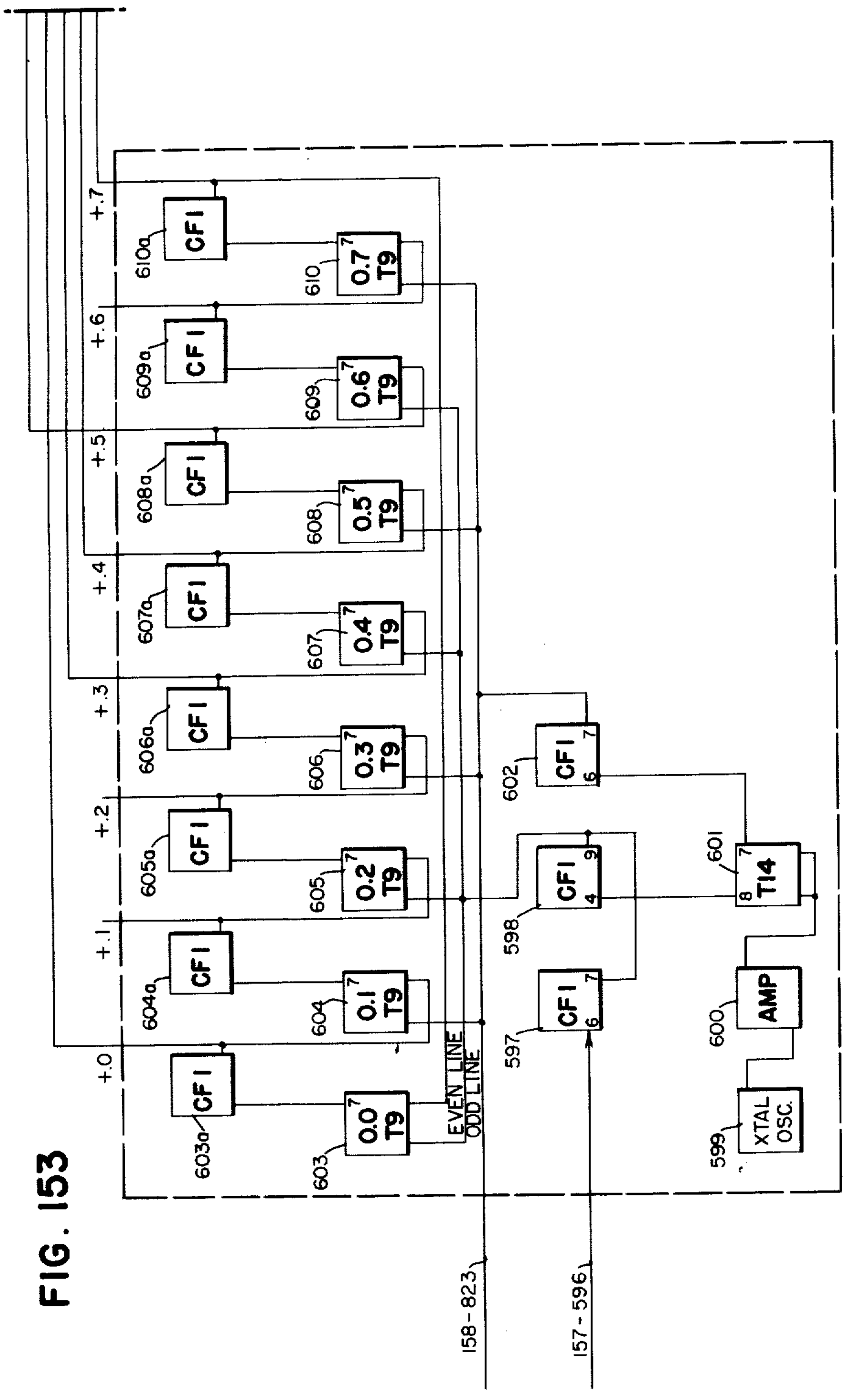

*Bit ring, character ring and column counter.*—The bit ring is comprised of eight stages of triggers (Fig. 153). These triggers are in turn driven by a crystal oscillator with a frequency rate of one megacycle. Thus, one complete sweep of the bit ring requires a total time of eight microseconds. Three microseconds of this time are used for deflection, a fourth microsecond being used to interrogate the information in a given location of memory, and the remaining four microseconds are used to restore either this or new information into the same memory location.

The detailed operation of the bit ring is as follows. Let it be assumed at the moment that a ring control trigger 595 (Fig. 157) is reset in the position indicated. It will produce an output pulse at its pin 7, which pulse is transmitted through a cathode follower 596, and via its output pin 7 to a cathode follower 597 in Fig. 153. The cathode followers 597 and 598 act as a cathode following switch. At this time cathode follower 597, output pin 7, has conditioned this switch to allow any signal entering cathode follower 598, pin 4, to pass through this switch to the bit ring. The crystal oscillator 599 transmits its signals to an amplifier 600 and from the amplifier to a binary trigger 601. As the trigger 601 is turned on and off with every time pulse of one microsecond, it will produce signals from its output pins 7 and 8 which are transmitted through the cathode followers 598 and 602, output pins 9 and 7, respectively, which will cause the bit ring to be advanced with each pulse. Of the outputs of these two units, one of them may be the even output and the other the odd output.

The ring is composed of the eight triggers 603 through 610. Assume that the trigger 603 is on at this time, the first pulse transmitted from the output pin 9 of the cathode follower 598 to the even line will turn the trigger 603 off, which in turn will transmit a signal from its output pin 7, through a cathode follower 603*a*, and through this cathode follower to the trigger 604, which will be turned on. When the trigger 601 receives its next impulse, it in turn will generate and transmit a signal from its output pin 7, through the cathode follower 602, to cause the trigger 604 to be turned off, and via its output pin 7, through a cathode follower 604*a* it will cause the trigger 605 to be turned on. This operation continues until eventually the trigger 609 is turned on. The next impulse available from the cathode follower 603, output pin 7, will turn the trigger 610 off, generating a signal from its output pin 7 which passes through the cathode follower 610*a* to turn the trigger 603 back on.

Thus there is provided a closed loop which will continue to sweep around and around. Each time that the trigger 603 is turned on, a signal will be generated and emitted from its output pin 7. This signal passes through the cathode follower 603*a*, and from thence to a cathode follower 611 (Fig. 154), input pin 4. The cathode follower 611 will in turn emit a signal from its output pin 6 to a power unit 612 (Fig. 155) in the character ring circuit. The power unit 612 in turn will emit a signal from its output pin 4. Thus, any time that the bit ring completes one cycle of operation, a signal will be emitted to the output pin 4 of the power unit 612 from where it is connected by diodes to a series of triggers 613 through 621 constituting the character ring.

Assume for the moment that the trigger 613 (Fig. 155) is on and all remaining triggers of the character ring are off, as is the normal condition. When the power unit 612 produces a signal, the signal will pass through the diode associated with the pin 6 of the trigger 613, to turn the trigger off. Turning the trigger 613 off will cause the emission of a signal from the pin 6 of the trigger and will cause the trigger 614 to be turned on. At this time the bit ring will continue operating and will go through another complete cycle of operation, at which time the cathode follower 603*a*, associated with the trigger 603 of the bit ring will emit a second signal through the circuits previously described, but now this pulse will leave the output pin 4 of the power unit 612 and will cause the trigger 614 to be reset off and will cause the trigger 615 to be turned on. This operation will continue until eventually the trigger 621 of the character ring has been turned on. The next signal available from the output pin 4 of the power unit 612 will cause the trigger 621 to be turned off, and it will also emit a signal causing the trigger 613 to once again be turned on, thus closing the loop forming the ring.

It can be seen, then, that for each complete operation of the bit ring, the character ring is advanced one trigger station until all triggers in the character ring have been operated, and when the last trigger has been operated the first will once again be turned on.

When the first trigger 613 is turned on, it will generate a signal from its output pin 7 which will be transmitted through a cathode follower unit 613*a* outputs 6 and 7, and via these pins to a power unit 622*a* (Fig. 160) of the column counter. Here the pulse is passed through the power unit 622*a*, output pin 4, and is taken to a binary decade counter comprising triggers 622, 623, 624 and 625. Thus, as impulses are received from the output pin 4 of the power unit 622*a*, they will enter the binary trigger 622, causing it to turn on and off alternately. As this trigger is operated off, a signal will be generated and emitted from its output pin, causing the trigger 623 to be turned on. Upon reception of the third pulse, the trigger 622 will once again be turned on.

Upon reception of the fourth signal, trigger 622 will be turned off for the second time and will cause a second pulse to enter the trigger 623, thus causing the trigger 623 also to be turned off. When the trigger 623 is turned off, a signal will be generated and emitted from its output pin 4 which will cause the trigger 624 to be turned on. With the eighth count, the trigger 625 will be turned on. On the count of nine, the trigger 622 will once again be turned on. The next count will cause the first trigger to be turned off, and through block decade operation, the 2 trigger will be prevented from coming on, and the trigger 625 will also be turned off and will emit a count of ten pulses from its output pin 6 to a trigger 626 (Fig. 161).

The trigger 626, together with triggers 627, 628, 629 and 630, constitutes the tens counter of the column counter arrangement. The operation of the triggers 626 through 630 is identical in every respect with the operation of the triggers 622 through 625 (Fig. 160), the only difference being that triggers 622–625 count all the pulses received and emit carry pulses to the second set of triggers 626–630, so that the triggers 626–630 receive only one tenth as many pulses as the first. These two sets of triggers are capable of counting to 100. They are capable, therefore, of selecting any character location in memory.

By way of summary: The bit ring is capable of producing time signals. Upon completion of one complete revolution of the bit ring, it will emit a signal which will cause the character ring to advance to the next position. The character ring in turn is composed of nine trigger elements. When a character cycle is completed, the character ring will have made one complete revolution, and returning to its original position it will emit a carry signal which is used to advance the column counter one position. The column counter in turn is capable of advancing from zero to 99, and is therefore capable of interrogating any of the 100 characters stored in one memory tube.

Figure 154:
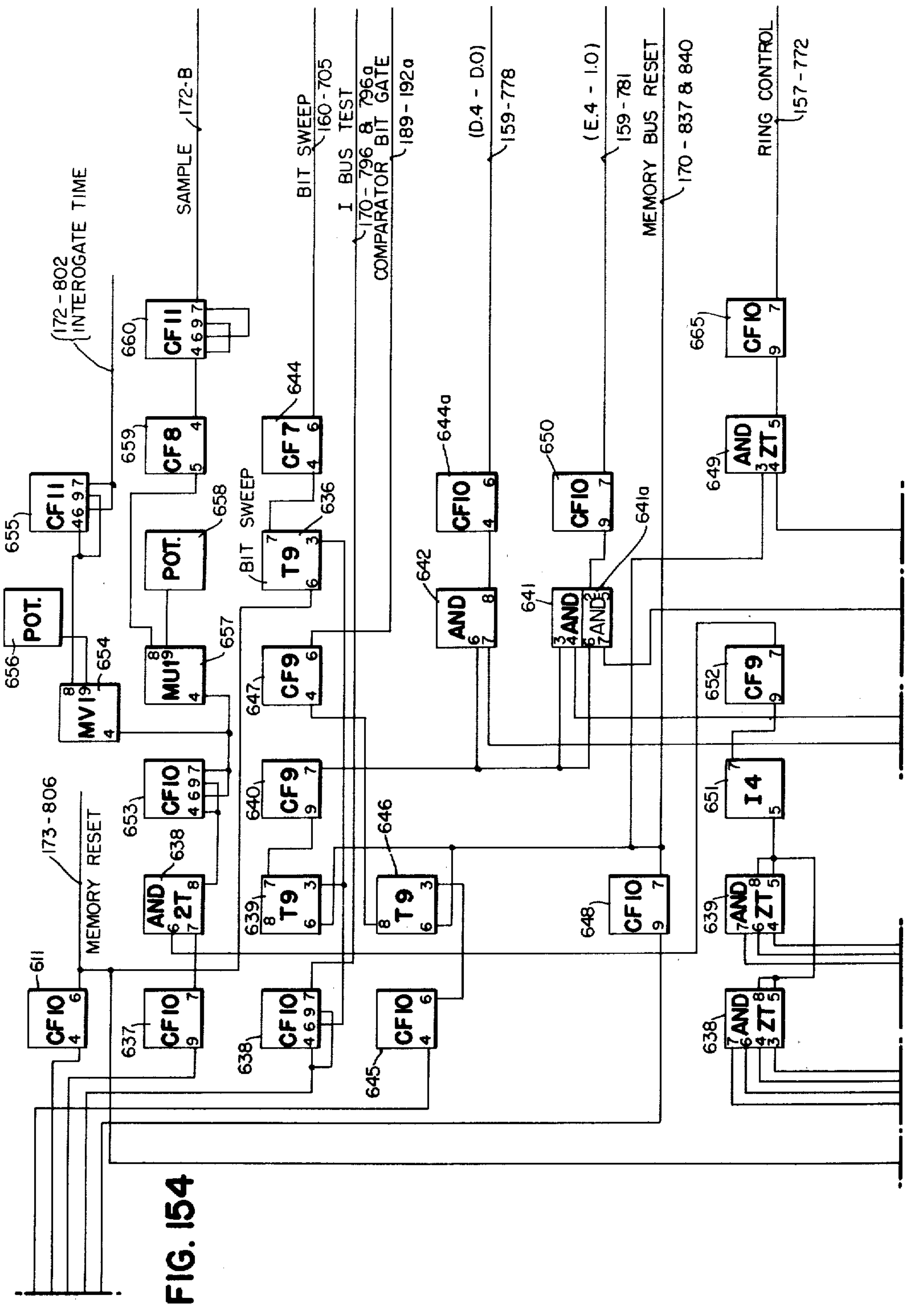

The bit ring must be capable within one complete cycle of allowing time for deflection, interrogation and regeneration. Thus, when the column counter selects a column to be regenerated, the character ring is reset so that the trigger 613 (Fig. 155) is On and all other triggers are Off. When the trigger 603 (Fig. 153) in the bit ring is turned on, a signal is generated and emitted from the output pin 7, through the cathode follower 603*a*, and through the cathode follower 611 (Fig. 154). The output pin 6 of the cathode follower 611, as previously mentioned, is used to drive the character ring. A memory reset signal is generated from the output pin 6 of the cathode follower 611. The output pin 6 also provides a signal to turn off a bit sweep trigger 636 (Fig. 154). The function of the bit sweep trigger 636 will be described later.

Time pulses will now advance the bit ring through triggers 604, 605 and 606. When the trigger 606 is turned on, its output pin 7 will produce a signal through the cathode follower 606*a*, and the signal is transmitted to a cathode follower 637 (Fig. 154), input pin 9. The output pulse of the cathode follower 637, pin 7, is taken to an And circuit 638, input 7. The signal will not pass through this And circuit at this time since no coincidence is established at pin 6 due to the fact that And circuits 638 and 639 do not pass a pulse, since their inputs are connected to the triggers 615, 616, etc., and at this time the character ring is in its first position, i.e. at trigger 613.

The bit ring will progress to trigger 607, at which time a signal is transmitted to a cathode follower 638 (Fig. 154). The output pin 7 of the cathode follower 638 produces an input bus test signal, the use of which will be described in detail at a later time. The pulse at output pin 6 of the cathode follower 638 will turn on a trigger 639 and also the bit sweep trigger 636. The trigger 639 will emit a signal from its output pin 7 which is transmitted to a cathode follower 640, which in turn will, by way of its output pin 7, send a pulse to the diode coincidence And circuits 641 and 642.

Input pin 7 of the diode coincidence unit 642 is now in coincidence, since the trigger 613 (Fig. 155), via its output pin 8, passes a pulse through a cathode follower 643, output pin 7, to this point. Thus, a coincidence is established at this point, passing a D.4–D.0 signal through the output pin 8, through a cathode follower 644 (Fig. 154), output pin 6, and on to other control circuits. The function of the D.4–D.0 signal will be described later.

The coincidence unit 641 (Fig. 154) will not provide coincidence through its output pin 2, since the input pin 4, which is pulsed from the trigger 614 (Fig. 155) via its cathode follower 614*a*, does not provide coincidence. Pins 6 and 7 of the And circuit 641*a* do, however, provide coincidence at this time since the trigger 613 (Fig. 155) is On, therefore providing an output from pin 5.

The bit sweep trigger 636 (Fig. 154) which has been turned on at this time, emits a Bit Sweep signal from its output pin 7, through a cathode follower 644, output pin 6, and out to other parts of the machine, providing a signal which will be dealt with at a later time.

The next impulse available will cause the trigger 608 in the bit ring (Fig. 153) to be turned on, and it will emit a signal from its output pin 7, through the cathode follower 608*a*, and to a cathode follower 645 (Fig. 154), input pin 4. The output pin 6 of the cathode follower 645 will turn on a trigger 646. The output pin 8 of the trigger 646 will pass a pulse through a cathode follower 647, through its output pin 6, to other portions of the machine to provide a signal Comparator Bit Gate.

The next signal to the bit ring will advance the ring to the trigger 609. This trigger provides a one microsecond period to allow the machine circuits to recover. The next pulse available will cause the trigger 610 in the bit ring to be turned on, and this produces an output at pin 7, which is transmitted through the cathode follower 610*a*, and out to a cathode follower 648 (Fig. 154), input pin 9. The output of the cathode follower 648, pin 7, will turn off the trigger 639, which provided the D.4–D.0 gate, previously mentioned. The pulse at output pin 7 of cathode follower 648 will also be taken to a coincidence unit 649, where no coincidence is formed, since the input pin 4 must be conditioned by the trigger 621 (Fig. 156) in the character ring, and this trigger at this time is not turned on. Cathode follower 648, output pin 7, will also emit the Memory Buss Reset signal which is used in memory and will be followed at a later time.

Figure 155:
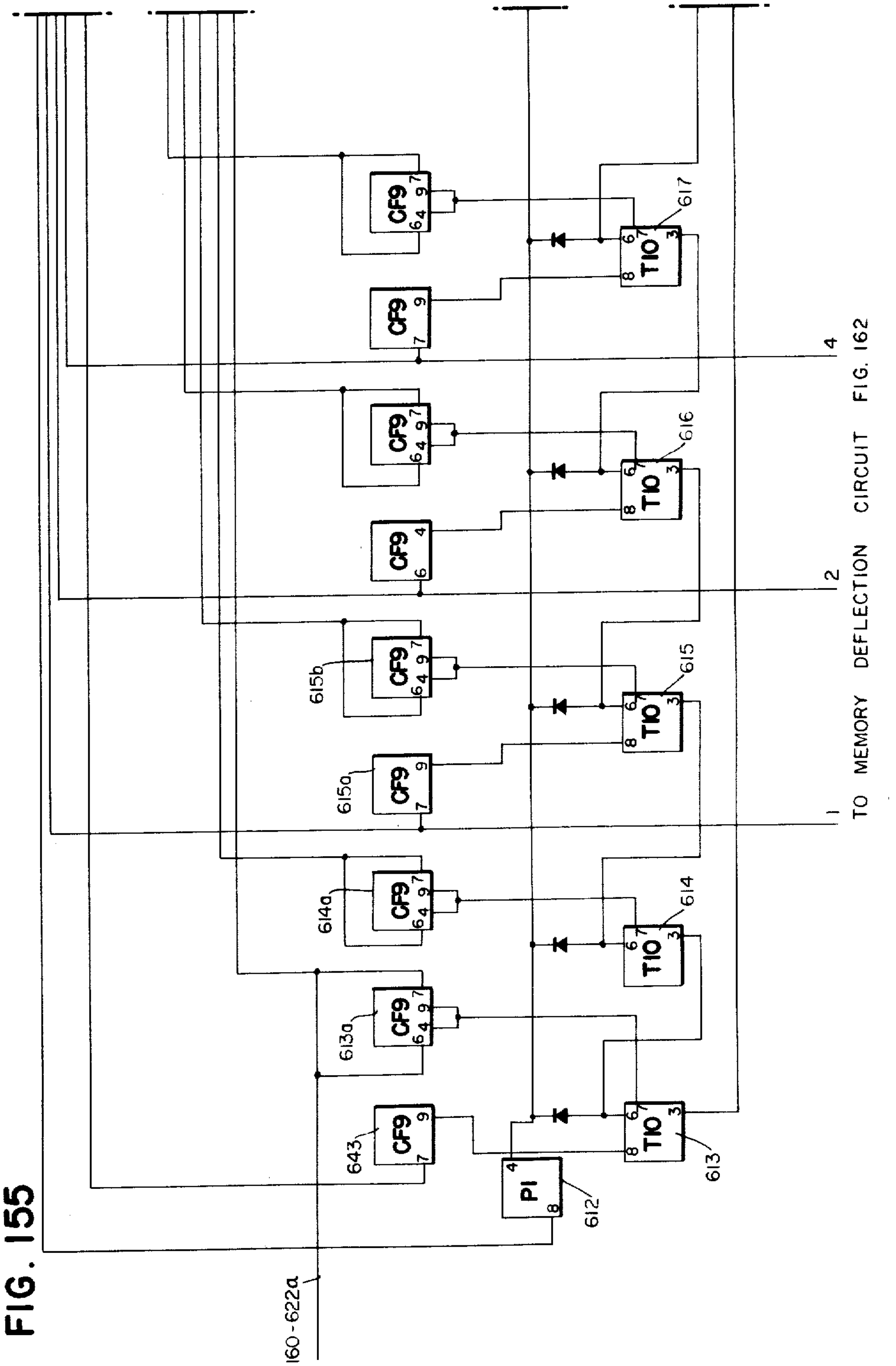

It may be gathered from the nature of the pulses generated by the bit ring that it plays a large part in the memory control system. The bit ring has now gone through one cycle of operation and emits a signal from the trigger 603, which, by way of circuitry previously described, causes the trigger 613 in the character ring (Fig. 155) to be turned off, and the trigger 614 now to be turned on. The bit ring will once again go through its normal complete operation, and will perform all operations previously done except those that were under coincidence from the trigger 613 (Fig. 155). Since the trigger 613 has now been turned off, it will provide no coincidences as it did on the previous cycle.

Since the trigger 614 (Fig. 155) has now been turned on, it will furnish a signal from its output pin 7, through the cathode follower 614*a*, outputs 6 and 7, to the And circuit 641 (Fig. 154). Thus, when the bit ring has once again advanced to its trigger 607, a coincidence will be established at the And circuit 641 (Fig. 154), via the circuits previously described in conjunction with the signal from the cathode follower 614*a* (Fig. 155) to allow a signal to appear at the output pin 2 of the circuit 641 which is transmitted through a cathode follower 650, output pin 7, as the E.4–1.0 signal. The function of the E.4–1.0 signal will be described later. The pulse generated from the cathode follower 614a (Fig. 155) is also transmitted to other portions of the machine, where it is identified as an E.0 signal. The uses of this signal also will be described at a later point.

The bit ring will complete this cycle of operation, once again emitting a signal from the trigger 603, and will cause the character ring now to advance to the trigger 615 and turn off the trigger 614.

During the previous two revolutions of the bit ring, when the character ring was advanced from D (trigger 613) to E (trigger 614), and from the E to 1 (trigger 615), relatively little operation has taken place in the machine. There has been no memory operations performed during this time. As a consequence, no deflection location has had to be noted. At this time the 1 trigger (615) has been turned on. At this time it will be necessary for the memory to be deflected to the location of the –1– bit and to there store or interrogate and regenerate the bit located there. The deflection signal is emitted from pin 8 of the trigger 615, via the cathode follower 615a, output pin 7, to the deflection circuits of the machine which will be described at a later time. The signal from the output pin 7 of the cathode follower 615a is also taken to the And circuit 638 (Fig. 154). The signal will be transmitted through the output pins 5 and 8 of this unit, to the input pin 5 of an inverter 651, where it is transmitted from the output pin 7, through a cathode follower 652, and from the output of this unit, pin 7, to the coincidence unit 638 (Fig. 154).

When the bit ring advances to the trigger 606, the trigger will emit a signal from its output pin 7, which is transmitted through its cathode follower 606a, through the cathode follower 637 (Fig. 154), output pin 7, and to the alternate input of the coincidence unit 638. Thus, at this time a coincidence is established in this unit 638, and an impulse is emitted from its output pin 8 to a cathode follower 653, from its output pins 6 and 7, to generate an Interrogate signal. It will also emit a pulse to a single shot multivibrator 654, input pin 4, which is a timing device used to provide the proper time signal Interrogate Time. Its output pin 8 will transmit the time signal through a cathode follower 655 and out to the rest of the machine. This signal will be enlarged on at a later time. The single shot multivibrator 654 may be adjusted by means of a potentiometer 656, used to control the length of time the pulse of the single shot will span.

The output of the cathode follower 653 (Fig. 154), pins 6 and 7, also is taken to a single shot multivibrator 657, which is likewise controlled by an external potentiometer 658. The output of the single shot 657, pin 8, is the signal Sample which is transmitted to a cathode follower 659, and from its output pin 4, to a cathode follower 660, from which it is sent out to the memory circuits.

The character ring trigger 615 (Fig. 155) will also emit a signal from its output pin 7, through its cathode follower 615b, pins 6 and 7, and to pin 7 of an Or circuit 661 (Fig. 156). A signal will pass through the Or circuit 661 via the output pins 5 and 8, to a cathode follower 662, and via its output pin 6 will provide the Numeric 1.0–A.0 signal indicating that the numeric portion of a character is being stored and compared at this time.

The output of the cathode follower 615b will also furnish a signal known as the 1.0 signal, which is used in other parts of the machine. On completion of this bit ring cycle, one bit in memory had been interrogated and regenerated. The manner in which this is performed can now be described, and this description will apply to all further regeneration cycles.

When the trigger 615 (Fig. 155) was first turned on, the bit ring had just returned to the position where the trigger 603 (Fig. 153) was turned on. The bit ring will advance from trigger 603 to trigger 604, and to trigger 605, during which time nothing occurs except the stabilization of the deflection circuits. When this ring advances from the trigger 605 to the trigger 606, it will emit a signal as described through its cathode follower 606a to the cathode follower 637 (Fig. 154), output pin 7, to the And circuit 638, which is at coincidence at this point, as described, the cathode follower 653, via its outputs 6 and 7, to generate the Interrogate signal, as described, at the output of the cathode follower 655, pins 6 and 7.

The Interrogate signal will cause the electron beam in memory to be unblanked to interrogate the information stored at the addressed spots. Through the single shot multivibrator 657 and its associated cathode followers 659 and 660, the Sample signal is provided from the output of cathode follower 660. This signal is delayed in respect to the Interrogate signal until approximately three-fourths of the Interrogate signal has passed. This is for the reason that when the Interrogate signal unblanks the electron beam in the memory tube, the signal at the face plate is immediately available to the video amplifiers, which will be discussed at a later time.

The video amplifiers have an inherent time delay which will allow the signal generated by the interrogation to be emitted from the amplifier approximately three-fourths of a microsecond after the interrogation is first started. It is at this time that the Sample signal arrives to test the output of the video amplifiers. Let it be sufficient to say here that if a coincidence occurs during this test, the information stored in this location of memory indicates the presence of a bit (a binary –1–). The presence of a bit indicated from the video amplifiers causes a memory trigger in the memory unit to be turned on at this time, and to keep the electron beam unblanked until the memory trigger is turned off.

The bit ring (Fig. 153) will advance from trigger 606 to trigger 607, at which time it will emit a signal through its associated cathode follower 607a, to the cathode follower 638 (Fig. 154), and through this unit to turn on the trigger 639 and bit sweep trigger 636. The bit sweep trigger 636 will emit the Bit Sweep signal which initiates an operation resulting in a short sweeping motion of the cathode ray beam. This action will be described in detail when memory is explained fully. The trigger 639, while it is turned on at this time, will not perform any functions, since all coincidence units wired to the circuits will at this time be inactive.

The bit ring will progress from trigger 607 to trigger 608, during which time a Compare Bit Gate signal will be generated, which has no function at this particular time. The bit ring will advance from trigger 608 to trigger 609, and from trigger 609 to trigger 610. The interval between the time the trigger 607 comes on and the time the trigger 610 goes off is called the "dash write time." The output pin 7 of the trigger 610 provides its output through its associated cathode follower 610a to the cathode follower 648 (Fig. 154), via its output pin 7, to turn off the trigger 639 and also to provide the Memory Bus Reset signal. When the trigger 610 goes off and the trigger 603 comes on, the trigger 603 will provide a signal through its cathode follower 603a, via the cathode follower 611 (Fig. 154), output pin 6, to turn off the bit sweep trigger 636, ending the bit sweep time. The Memory Reset signal from the cathode follower 611, output pin 6, will at this time reset the triggers in memory.

The operation for the succeeding bits –2–, –4– and –8– is identical in every respect with the operation performed on the –1– bit. The only difference between these operations is that the electron beam in the memory tubes will be deflected from the –1– bit position to the –2– bit position, from the –2– bit position to the –4– bit position, and from the –4– bit position to the –8– bit position, under control of the triggers 615, 616, 617 and 618 (Fig. 155).

The operations of the triggers 619, 620 and 621 are also identical to the operations previously described with one exception. Whereas the triggers 615–618 all influenced the Or circuit 661 to emit a Numeric +1.0–A.0 signal through the cathode follower 662, the triggers 619 and 620 will now provide a signal to the Or circuit 663, and through this unit to a cathode follower 664, via its output pin 7, to emit a signal Zone A.0–C.0 to indicate that alphabetic bits are being stored and compared. Since the C bit is not used in comparison, it is wired to neither of the Or circuits 661 or 663.

Moreover, from the output pin 7 of the C trigger 621 (Fig. 156), the C.0 signal is emitted to the cathode follower 665, through its output pins 6 and 7, and is transmitted to the coincidence unit 649 (Fig. 154). Thus, during the time that the bit ring is operating, when the trigger 621 is on, a signal will be transmitted from the trigger 610 (Fig. 153) of the bit ring, through its associated cathode follower 610*a*, via the cathode follower 648 (Fig. 154), output pin 7, to the alternate input of the coincidence unit 649. A signal Ring Control will be transmitted from a cathode follower 665, via its output pin 7, to other portions of the machine where a ring control function is performed.

The discussion of the bit ring started with the assumption that the trigger 595 (Fig. 157) had been in a position allowing its output pin 7 to emit a pulse via the cathode follower 596, output pin 7, to condition the cathode follower 597 (Fig. 153) to allow pulses from the trigger 601 to pass through the cathode follower 598, output pin 9, to drive the bit ring. If, however, this trigger were turned on for some reason, the coincidence then of the cathode follower 598 and 602 (Fig. 153) would have been broken, and no pulses would be able to progress through the cathode follower 598, output pin 9. Pulses can still pass through the cathode follower 602, pin 7, but since none of the triggers connected to this line are On at this time, no effect will be felt from the unit at the bit ring. Thus, it is possible to stop the bit ring at any desired so-called even position. In general, the bit ring is stopped when tape is being written, since it is necessary to synchronize the memory units with the information to be written on the output tapes, since memory is approximately twice as fast as the rate at which characters can be written on tape.

*Deflection circuits.*—A series of seven lines are drawn from the cathode followers associated with the output pins 3 of the character ring triggers 615 through 621 (Fig. 156), and these lines are used to feed the deflection circuits. These circuits are located in Fig. 162, and enter the deflection elements 666 for the –1– bit, 667 and 668 for the –2– bit, 669 and 670 for the –4– bit, 671 and 672 for the –8– bit, 673 and 674 for the –A– bit, 675 and 676 for the –B– bits and 677 for the –C– bit.

At the start of any given character cycle, the electron beam is deflected under control of the column counter to the selected column to be regenerated. This beam will be deflected to the center position of the storage area in which this column is located (the beam will be pointed directly at the –8– bit of the character). When the trigger 615 (Fig. 155) is turned on, it will send a signal via the cathode follower 615*a*, output pin 7, to the unit 666 (Fig. 162) and will cause an additional deflection to the left of the center point which will point the beam at the –1– bits of the character to be regenerated. At this time the remaining deflection increment units previously mentioned will be inoperative. The beam has now been properly positioned, and the interrogation, sampling and regeneration of the bit in this location is performed.

At the end of this time the bit ring will produce a carry signal as previously described, and it will advance the character ring from its –1– position (trigger 615) to its –2– position (trigger 616). Thus the deflection increment unit 666 (Fig. 162) will now be inactivated and the deflection increment units 667 and 668 will be activated from the –2– trigger 616 (Fig. 155). The distribution of deflection voltage between these two units 667 and 668 is such that the beam in the memory tube will be shifted one position to the right, so that when the beam interrogates this position next, the –2– bit of the character now under consideration will be interrogated, sampled and regenerated.

When this operation is complete, the character ring advances to the –4– position (trigger 617, Fig. 155), at which time deflection increment units 669 and 670 (Fig. 162) will once again cause a redistribution of deflection voltages on the deflection plates in the memory tubes and will cause the beam to be pointed at the –4– bit of the character now under consideration. This process continues on a bit-by-bit basis until finally the –C– bit is regenerated, at the end of which time the character under consideration has been fully regenerated.

By directing the beam at the central position of a character location, a minimum deflection is required, and yet all positions of a character in memory will be covered. Thus, since the beam is pointed at the –8– bit originally, it is necessary to swing the beam only three incremental positions to the left and then later to swing it three incremental positions to the right yet completely scan a seven bit character.

A potentiometer 678 (Fig. 162) may be manually controlled to provide a greater or lesser vertical space between the –C– bit of a character (in one column) and a –1– bit of the character next to it (in an adjacent column). Thus, the bits when viewed by the eye will not form a solid pattern on the face of the memory tube, but instead will have four vertical spaces separating the individual columns. The potentiometer 679 (Fig. 162) has an identical function.

The unit 680 (Fig. 160) is a voltage regulator which is capable of filtering out any variations in the power supply. The output of this unit, pin 8, is transmitted through a power cathode follower 681, output pins 6 and 7, and from there it is transmitted to all deflection incremental units including those just described. This circuit is, therefore, used to eliminate any irregularities in the power supply.

In the storage tube are two sets of deflection plates, one set is associated with the vertical deflection function and the other set is associated with the horizontal deflection function. The deflection previously described associated with a character operation controls the charges provided for the two horizontal deflection plates.

The deflection increment units just described, as can be seen in Fig. 162, are all connected to either of two lines which, in turn, are connected to the units 684 and 685 or 686 and 687. This set of units contains summing resistors (see Fig. 128) which are capable of adding up the full charge of deflection as determined by the deflection tubes just described, as well as all remaining deflection tubes not yet described, and taking this sum of voltage charge and inserting it into the units 684 and 685, and 686 and 687. Thus, the charge for the left plate of the horizontal deflection is emitted from the power units 684 and 685, and is taken to the memory decks, where it controls the left plate of all memory tubes. The summing resistor associated with the units 686 and 687 inserts this total charge into these two units and is emitted from these power units, through the output pins 3 to the right deflection plates of all memory tubes in the machine.

When the character ring completely stores a character during any operation, the trigger 613 (Fig. 155), will once again be turned on. A signal is transmitted from the output pin 7 of the trigger 613 to the cathode follower 613*a*, through the output pins 6 and 7 thereof, and into the power unit 622*a* (Fig. 160). Thus, it can be said that when a character is completely stored by one revolution of the character ring, one line of a column of a given record has been stored and the next character to be stored must be stored in the next available line of the memory. This position is made available through the action of the column counter (Figs. 160 and 161).

*Column counter.*—When the signal from the character ring passes through the power unit 622 (Fig. 160), the signal is transmitted to the –1– stage of the column counter which is trigger 622. Upon reception of each signal into the power unit 622, the decade counter comprising triggers 622, 623, 624 and 625 will be advanced one position to produce a count of 10. The nature and action of this counter is as follows. Fig. 163 shows the detailed circuit of one of the two column counter trigger groups as comprising three triggers of the T11 type (Fig. 50), and a single trigger of the T12 type (Fig. 51). Let it be assumed that the counter of Fig. 163 is the units counter consisting of triggers 622–625 (Fig. 160).

Each of the triggers is of the now well known Eccles-Jordan type, comprising a pair of cross-coupled triodes. These are illustrated as being contained within a single envelope and may, for example, comprise a 5965 type tube. In the diagrams of Figs. 50 and 51, exemplary component values are indicated. It is to be understood, however, that these may be varied within the ambits known to those skilled in the art.

In Fig. 163 the plate P1 of the triode 622, for example, is coupled via a line *a* and a resistor *b* and condenser *c* in parallel, to the grid G2 of the triode. The plate P2 is similarly coupled to the grid G1 of the triode. The value of the resistor *b* may, for example, be 68K ohms, while the condenser *c* may, for example, assume a value of 22 micromicrofarads.

The cathodes of the cross-coupled triodes are joined and connected to ground as shown. The grid G1 is coupled to the input, through a condenser *d*, and the grid G2 is coupled to the input, through a condenser *e*, a suitable value for the condensers *d* and *e* being 22 micromicrofarads each. The grids G1 and G2 are connected through resistors to a source of −250 volts bias current, the values of each of these resistors being 180K ohms. The plate P1 is connected to a source of +150 volts by way of a pair of resistors *f* and *g*, in series, a suitable value for these resistors being 5.1K ohms. The plate P2 is similarly connected to the +150 volt source by means of two similar resistors, in series, as shown.

As illustrated in Fig. 163 each of the plates P1 and P2 are provided with a full plate output, while each plate is also provided with a tap in the output. The taps are employed in the interconnections among the triggers, as will be described presently. The full plate outputs are directed to other components in the column counter circuitry, as shown in Fig. 160, for example, and as will be described in detail at a later point.

As is well known in the art, a trigger of the Eccles-Jordan type has two states of stability. In one state, for example, one triode will be conducting while the other triode will be cut-off. This may be produced by applying a negative pulse to the input. In the instant application this state of equilibrium of any trigger, i.e. that in which the left triode is non-conducting and the right triode is conducting, will be referred to as the "off" state of such a trigger. The condition of any trigger in which the right triode is cut off (such as may be produce by a negative pulse applied to the input) and the left triode is conducting, will be referred to in this description as the "on" state of such trigger. These states of equilibrium are so identified in order to simplify the succeeding description of the operation of the device.

A plurality of triggers, shown for example in Fig. 163, has four triggers of the general type indicated, which are interconnected generally in cascade fashion.

A plurality of triggers, shown for example in Fig. 163, has four triggers of the general type indicated, which are interconnected generally in cascade fashion and may constitute a counter. When so connected the four triggers may be referred to as a 1–2–4–8 counter, since one pulse turns on the first trigger (assuming that all triggers are initially reset in their off position, i.e. the right triodes thereof conducting), two pulses will turn off the first trigger, and as it is turned off it turns on the second trigger, etc. Four pulses are required to turn on the third trigger and eight pulses are required to turn on the last trigger of the four connected in cascade. At any one time it is obvious, therefore, that the first trigger may be regarded as indicating the count of 1 when it is on. The second trigger may be regarded as indicating the count of 2 when it is on. The third trigger may be regarded as indicating the count of 4 when it is on, and the fourth trigger may be regarded as indicating the count of 8 when it is on. This follows from the fact that 1, 2, 4 and 8 input pulses are required to turn on the first, second, third and fourth triggers, respectively. Furthermore, if the values 1, 2, 4 and 8 are assigned to the respective triggers in a left to right order, the sum of the indicated count represented by triggers in their on state will represent the total number of input pulses to a counter so constructed.

If a sufficient number of pulses are entered into the first trigger to turn off the fourth trigger after it has first been turned on, it will be seen (a counter of this type is a binary counter operating on the base 2) that sixteen input pulses are required to once again turn off the fourth trigger after the same has first been turned on.

Since the use of the decimal system in day-to-day commercial and scientific transactions is the most common, it is inconvenient to use a pure binary notation as a substitute for the decimal system. Therefore, in order to render a counter composed of binary triggers useful in normal commercial systems of counting, the normal binary operation of four such cascade connected triggers must be altered. Such alteration may change the number of pulses required to initially turn on a trigger of a series, but it must never effect the count notation of any one trigger in a particular counter. Thus, if only the first trigger is on, the count, even in a trigger altered to the decimal notation, is 1. If the first trigger is on and the second trigger is also on, the counter indication will depend on the weight attached to any trigger above the first, which is on. That this varies for different counters will be obvious from the following description, but as previously stated, with any one particular counter arrangement. The weight or value assigned to any particular trigger of a series comprising a counter remains fixed for each trigger which is on.

The counter in Fig. 163 provides means for producing, in an extremely simple manner, the alteration of generally cascade connected triggers (operating in a purely binary notation) to cause them to operate in the decimal system. The triggers of Fig. 163 are generally connected in cascade, whereby in the normal cascade operation the turning off of a preceding trigger will change the status of the succeeding trigger, either on or off, depending on its status at the time the preceding trigger was turned off. Assuming that all of the triggers have been reset off, so that the right-hand triode of each of the triggers is conducting as indicated by the small "*x*" near the right-hand side of each envelope, a negative pulse applied to the counter input is also applied to both of the grids of trigger 622, since the connection constitutes a binary input to the trigger, and will turn trigger 622 on. The plus pulse thus produced on line 631 has no effect on any of the following triggers, because these triggers will operate only upon the application of negative pulses.

The second pulse applied to the input of the counter will turn trigger 622 off. The negative pulse thus produced on line 631 is applied to the grid G2 only of trigger 623 and will thus turn on trigger 623. This in turn produces a plus pulse on line 632 which has no effect on trigger 624. The third pulse applied to the counter input turns trigger 622 on, with no further effect. The fourth pulse applied to the counter input turns trigger 622 off.

The negative pulse produced on line 631 has no effect on trigger 623, since line 631 is connected to the grid G2 only of this trigger and can only turn this trigger on. When trigger 623 was previously turned on, so that its right-hand triode became non-conducting, the voltage level at point 633 in the plate circuit was raised such that, by way of the resistor R and line 632, the voltage level applied to the plate of a diode DI0 is increased. This diode may, for example, comprise a General Electric 1N52 crystal diode.

As stated above, the four negative pulses applied to the counter input turns trigger 622 off, but the negative pulse produced on line 631 is ineffective to turn the trigger 623 on, since this trigger can only be turned on and in its present status it is on. However, since the voltage level on the plate side of the diode DI0 is now raised, this negative pulse applied by way of the line 631 to the cathode of the diode is effective, by way of the circuit comprising the resistor R, the diode DI0 and its A.C. coupling by way of the condenser K2 in trigger 624, to apply a negative pulse to the grid G2 of trigger 624 to turn this trigger on.

Thus, in effect, the diode DI0 compares the voltages on the two sides of the diode and only when such comparison requires it, is the gating action of the diode employed to apply a negative pulse by way of the condenser K2, for example, to the grid G2 of the trigger 624 to turn this trigger on. The diode DI0 always compares the voltages on the two sides thereof and turns its A.C. coupled trigger, when and only when such turning is required, so that no unnecessary turning of its controlled trigger is ever produced.

The fourth counter input pulse results in triggers 623 and 624 both being on. At this point it may be pointed out that the sum of the notation represented by the triggers 623 and 624 is 4. Since by definition 622 represents the count of 1, 623 represents a count of 2, trigger 624 represents a count of 2 and trigger 625 represents a count of 4, the sum of 2 and 2, i.e. 4, is indicative of the number of input pulses applied to the counter up to this point.

The fifth counter input pulse turns trigger 622 on, but has no further effect. The sixth counter input pulse turns trigger 622 off, which action is effective by way of the line 631 and the A.C. coupled diode network, which at this time includes the condenser K1 in trigger 624, to apply a negative pulse to the grid G1 of the trigger 624, to turn this trigger off. As the trigger 624 is turned off, it produces a negative pulse on the line 634, which in turn is effective to turn trigger 625 on. Thus, the sixth counter input pulse results in triggers 623 and 625 being on, the sum of the notation represented by these triggers being 6.

The seventh pulse to the counter input turns trigger 622 on, but has no further effect. The eighth pulse to the counter input turns the trigger 622 off, which in turn, by way of the line 631 and the A.C. coupled diode DI0 and the condenser K2, turns the trigger 624 on. Thus, the eighth counter input pulse results in triggers 623, 624 and 625 being on, thereby representing a total input of 8. The ninth counter input pulse turns the trigger 622 on but has no further effect.

The tenth counter input pulse turns the trigger 622 off. The negative pulse thus produced on line 631, acting by way of the A.C. coupled diode gate DI0 and the condenser K1, turns the trigger 624 off. As the trigger 624 is turned off, it produces a negative pulse on the line 635 which turns the trigger 625 off. As the trigger 625 goes off, a negative pulse produced on line 635 is fed back to the grid G1 of the trigger 623, flipping this trigger off so that this tenth counter input pulse returns all triggers to the off condition which, as stated before, is the normal reset position. The negative pulse produced on line 635 upon turning off the trigger 625 is available as an output on the tenth counter input pulse. This pulse may be used in the form of a carry pulse to control other components.

Figs. 160 and 161 illustrate in block form the counter shown in Fig. 163 and concisely highlight the interconnections among the triggers, as illustrated in detail in Fig. 163.

The operation of the counter shown in detail in Fig. 163 may be easily followed in the following table. In the tabulation a O indicates that a trigger is off, while an *x* indicates that a trigger is on.

| *Trigger* | *T1* | *T2A* | *T2B* | *T4* |
|---|---|---|---|---|
| Reset | O | O | O | O |
| Pulse 1 | *x* | O | O | O |
| Pulse 2 | O | *x* | O | O |
| Pulse 3 | *x* | *x* | O | O |
| Pulse 4 | O | *x* | *x* | O |
| Pulse 5 | *x* | *x* | *x* | O |
| Pulse 6 | O | *x* | O | *x* |
| Pulse 7 | *x* | *x* | O | *x* |
| Pulse 8 | O | *x* | *x* | *x* |
| Pulse 9 | *x* | *x* | *x* | *x* |
| Pulse 10 | O | O | O | O |

Thus it will be seen that the trigger 625 (Fig. 160) emits a signal from its output pin 6 upon the count of 10. This signal is transmitted to the trigger 626 (Fig. 161). The trigger 626 is the –1– position of a second decade counter comprising triggers 626 through 629. The decade in Fig. 160 will count units and the second decade (Fig. 161) will count tens. By means of these two decade counters, a count of 100 is available.

As previous mentioned in a general way, each memory tube is capable of storing 100 columns of information. Thus, by means of these two decades any column up to 100 may be stored in one of the memory tubes. The capacity of the machine is 200 columns per unit record.

Provision for the second 100 columns to be stored is provided by the trigger 630 (Fig. 161) which receives an output from the pin 6 in trigger 629 when the count of 100 is noted. Thus, as in normal binary counters, the two decades previously described at the count of 100 will be both reset to their zero position with the trigger 629 emitting a signal to the trigger 630, turning it on. This trigger controls the switch of deflection between the two cathode ray tubes associated with each memory deck. The function of this trigger will be discussed at a later time.

The pulse at output pins 7 and 8 of the trigger 630 is transmitted to a cathode follower 688 and via pins 7 and 6 produces a signal that is taken to the memory cells and is used therein to control which of the two memory tubes shall receive the next character to be stored. Thus, the maximum record length of 200 records is derived by means of two memory tubes, each capable of storing 100 columns of information. The circuits in the memory decks will be described in detail at a later time.

At different times during machine operation, it is necessary to stop the column counter and to reset it to a zero location, so that a new incoming record may be stored in its proper location. All incoming records always store from the zero position of this counter progressively through to a maximum of 200 columns per record. The reset of the counter to zero position is initiated by circuits yet to be described; however, the reset pulse will pass through the inverters 689 and 690 (Figs. 160 and 161, respectively). The output pulse at pin 6 of the inverter 689 is transmitted through an Or circuit 691, and the pulse from the output pins of the Or circuit 691 resets the four triggers 622–625 in the units position of the counter. The output pin 7 of the inverter 689 sends its signal through the input pins of an Or circuit 692 (Fig. 161), and via its output pins to reset the triggers 626–629 in the tens decade of this counter. The inverter 690 produces a signal from its output pin 6 to reset the trigger 630.

The next character to be stored following this storage cycle will be stored in the zero location of memory (the bottom line of the first column in the first memory cell). The reset just described is of the pull-over type. Thus, when the signal is transmitted via the circuits described, the resistor network associated with the Off side of each trigger in this counter will be pulled down and thus cause the trigger to be reset.

There is a cathode follower unit and two deflection increment units associated with each stage of the column counter. One of these circuits may be described since all the remaining circuits are identical to it except for the amount of deflection voltage generated by the delta units. Each delta unit when properly activated produces a separate, different sized deflection voltage.

The trigger 622 (Fig. 160), for example, of the units decade of the counter is connected from its output pins 6 and 8 to a cathode follower 693, via its input pins 4 and 9. The output pins 6 and 7 of the cathode follower 693, in turn, activate increment units 694 and 695, as well as a column counter matrix which shall be described later.

The unit 694 produces an output from its pin 8, which output is transmitted to the vertical units 696 and 697 (Fig. 162). These units have been previously described as containing summing resistors and as generating from their output pin 3 a deflection voltage which is transmitted to the memory cells to cause a vertical deflection corresponding to the deflection voltage emitted from the delta unit 694 (Fig. 160).

Units 696 and 697 control the top deflection plates within each cathode ray tube which are all tied together. The unit 695 (Fig. 160) produces an output pulse from its pin 8, which is transmitted to summing units 698 and 699, which likewise contain a summing resistor and produce a deflection voltage that is transmitted from the output pins 3 to the bottom, vertical deflection plate within each cathode ray tube. The description just given of the operation of the delta units located in 694 and 695 (Fig. 160) applies to each of the incremental units associated with the remaining stages of this counter. Thus, if a number of triggers are turned on, their corresponding delta increments will also be conditioned and the summing resistors associated with the units 696, 697, 698 and 699 will then produce a corresponding deflection voltage which will result in a controlled deflection of the cathode ray beams.

To arrive at the raster within the memory cells, as has been previously discussed, it is necessary to cause the counter to be split into sections for deflection purposes only in order to produce five vertical columns of 20 characters each, producing a nearly square raster pattern in the memory cells. It can be seen that if the unit 694 (Fig. 160) were to produce a unit charge for deflection, the unit 700 could produce double this charge to cause the beam to move one position away from the first location. If both of these units are activated, then a third location within memory will be located. This operation continues through the first decade of the counter storing 10 characters as it proceeds.

Upon completion of storage of the tenth column, the units decade of the counter will carry to the tens decade (Fig. 161) causing it to be advanced one position. If the –1– trigger 626 of the tens decade (Fig. 161) had not previously been on, then its associated increment units will have been deconditioned so as to not effect the deflection of memory. Upon reception of this count, the trigger 626 will be turned on and via the circuits previously described for the units location of the counter, its increment units 701—702 and 703—704 will cause the deflection now to be eleven unit positions.

The succeeding columns 11 to 20, then, will store once again under control of the units decade, but now starting from the 11th position within the memory to the 20th. Upon completion of twenty columns of storage, the units decade will carry to the –1– trigger 626 of the tens decade again, this time turning it off, and as a consequence turning on the –2– trigger 627 in the tens decade. Since the –1– trigger of the tens decade is now in its reset or normal condition, and since at this time the units position will be standing at zero, the operation may be started up once again, starting at the low order of memory. Thus, provision is made to off-set the deflection so that a second column of twenty characters may be stored.

Thus, the triggers 627, 628 and 629 will control the horizontal deflection of the beam. Their associated increment units operate identically with those previously described, except that they will be connected to the summing units (Fig. 162) 684—685 and 686—687 to control the horizontal deflection plates within the memory tubes.

Electrostatic memory by its nature is a binary element, since either of two conditions may be sensed. If the electron beam is pointed at a specific spot and unblanked when the beam interrogates the target, it will produce a signal on the face of this memory tube which will correspond to the charge of the target area. Thus, if there is no charge on the target area, one signal will be produced. If this area, however, carries a charge when the beam interrogates the location, a different signal will be produced. It is upon this difference in signal that electrostatic memory, as used in this machine, is caused to remember or memorize a single bit of information in any given location.

It has been arbitrarily established in this machine that a charge called a dot (.) will represent a "no" or binary –0– condition, and the alternate charge called a dash (1) will represent a "yes" or binary –1– condition.

When a character is received from tape and is stored in memory, the character is stored serially one bit at a time, as stated. Thus, if a column is to be stored in the first location of memory, the –1– bit will be stored first, the –2– bit following it, the –4– bit, etc. If the –1– bit location of this character does not contain a binary –1–, a dot will be stored in memory. If a binary –1– bit is encountered in the character, a dash will be stored in this location. Thus, it is by a series of dot and dash charges on the target of the cathode ray tube that information is remembered. A dot, as will be described later, is formed by the unblanking of the electron beam in the storage element for a one microsecond time interval. During this time the electron beam is substantially stationary on the target. To generate a dash or binary –1– condition, a dot is first placed on the target for one microsecond and then following this the beam is left unblanked for an additional four microseconds, during which time the beam is caused to move slightly from the dot area in a vertical direction. This is accomplished by the bit sweep drive 705 (Fig. 160).

*Bit sweep circuits.*—As previously described, a signal is generated from the bit ring (Fig. 153), via the trigger 607, output pin 7, through its associated cathode follower 607*a*, through the cathode follower 638 (Fig. 154), output pin 6, to turn on the bit sweep trigger 636. This trigger in turn produces a signal from its output pin 7, through the cathode follower 644, output pin 6, which is transmitted to the bit sweep drive 705 (Fig. 160). As the bit ring advances and completes a full rotation, the trigger 603 (Fig. 153) is again turned on, producing a signal from its output pin 7 which is passed through its associated cathode follower 603*a*, and through the cathode follower 611 (Fig. 154), output pin 6, to turn off the bit sweep trigger 636. Turning off the bit sweep trigger 636 will once again decondition its output pin 7, which is connected via the cathode follower 644, output pin 6, to the bit sweep drive 705 (Fig. 160), thus deconditioning the bit sweep drive 705. During the time that the bit sweep trigger 636 is on, the electron beam is caused to move slightly in a vertical direction by means of the bit sweep drive 705. By means of the phenomena known as secondary emission, the dot signal first put on the face plate of the target will be dissipated by the sweep of the beam, so that upon the next interrogation of this spot a dash, or binary -1- condition will be recognized.

A signal is emitted from the column counter triggers, output pin 7, and via the associated cathode followers, output pins 6 and 7, these signals are transmitted to a pair of column counter matrices 706 and 707 (Figs. 160 and 161, respectively). There are two such units in the machine, one for the units position of the counter and one for the tens position. The column counter matrix is designed to decode the counters, which have the configuration of 1, 2, 2, 4, to a decimal notation from zero through 9, so that these signals may be transmitted to the control panel of the machine in decimal form. The two matrices are shown as blocks in Figs. 160 and 161, and one of them is shown in detail in Fig. 164.

On the left of Fig. 164 are a series of eight lines marked 1, $\bar{1}$, 2, $\bar{2}$, 2, $\bar{2}$, 4 and $\bar{4}$. Signals on these lines are derived from the column counter triggers and their associated cathode followers. A 1 or $\bar{1}$ (and the following is true of the remaining conditions) is derived from the triggers in the column counter. Thus, for example, if -1- trigger 622 (Fig. 160) of a counter is on, the 1 line will be conditioned and the $\bar{1}$ will not be conditioned. Conversely, if the -1- trigger is off, the $\bar{1}$ line will be conditioned and the 1 line will not be conditioned. The same is true of the 2's and the 4's. It is necessary to know the status of each trigger within this counter and not only of those that are turned on, since it is the combination of these triggers that will produce a decimal equivalent of zero to 9. Thus, by the lines shown, the status of all triggers within a decade will be examined for their status. Thus, if the triggers 622 and 623 (Fig. 160) are on, the indication should be a decimal 3. This is derived from a coincidence of a 1, a 2, a $\bar{2}$ and a $\bar{4}$. Thus, when this condition is true, the digit 3 will be recognized and transmitted to the control panel. For every digit a similar combination must be available. Another example is the digit 6. In the digit 6 there is a $\bar{1}$ condition, a 2 condition, a $\bar{2}$ condition and a 4 condition. Thus, the diode associated with the decimal 6 will now indicate a 4, a $\bar{2}$ and a $\bar{1}$. This combination activating the inputs of the cathode followers associated with the digit 6 will emit a signal to the control panel where it may be wired for control purposes.

The arrangement of diodes shown is as economical a system as could be devised for this machine. Thus, upon study of the diode matrix, it will be recognized that only the key characters which may compose a number will be looked at. As an example of this, to recognize a zero condition in the column counter, it is necessary only to inspect to see that there is a $\bar{1}$ and a $\bar{2}$ condition in the counter. If this condition exists, it is not possible to have any character but a zero. It would be redundant then to look for a $\bar{2}$, $\bar{4}$ also. As a consequence these diodes have been left out.

Previous dissertation has set forth how a tape drive is controlled both as an input unit and as an output unit. When a tape drive is started, a tape will be running past the read/write heads, and via the read amplifier circuits and controls in the tape drive, the signals are transmitted via external cable to the input circuits in this machine.

*Read/write circuits.*—The tape read/write circuits have heretofore been referred to in passing in connection with Figs. 150, 151 and 152, wherein a set of seven read/write channels are illustrated. Assuming that the tape unit which has been selected is in a write status, during every write operation, all recording in all seven tracks, which may have been previously recorded on the tape, is erased. This erasing operation is accomplished, as previously explained, by the circuits shown at the bottom of Fig. 150.

While there are seven tracks of information, the circuitry for each track is identical and the explanation of the treatment of any one bit, for example, the "C" bit, will apply to all other tracks. A typical read/write channel, for example, the "C" channel, is shown in detail in Fig. 165 to which reference may be made. At the start of recording, assume all write triggers, for example, trigger 708 (Fig. 165) of the "C" bit track is in a reset or off condition. The outputs of this trigger 708 feed to two inputs of a write inverter 709 and will cause one-half of the latter to conduct and, therefore, current to flow through the one-half of the writing coil 710, that is through either section 711 or section 712, provided the write status (WS) cathode follower 713 is not conducting. The write status cathode follower 713 is conducting when the line 714 Write Status Off is positive, meaning that the particular tape unit is not in writing status. Its cathode output, when positive, feeds to the cathode of the write inverter 709 and applies such a potential to the cathode that neither half of the write inverter may conduct, regardless of the inputs from the trigger 708. However, when the line Write Status Off goes negative, the write status cathode follower 713 is cut off and control of the write inverter 709 is taken over by the write trigger 708. When the write trigger 708 is off, current flow is through the write coil section 712, and when trigger 708 is on current flow is through the coil section 711. Under the assumed conditions, that is the beginning of the record, the write trigger 708 is off, and thus current flows through the coil section 712. (Assuming also that the particular tape unit under discussion is in a write status). Then as this tape unit is selected, the line 715 Sel and Wr Status goes positive signaling, as described above, that the selected tape unit is in a writing status. This positive signal conditions one input of several inverter switch circuits, for example, the inverter switch 716. While inverter switch 716 is conditioned, write signals occurring on the Write Bus C Bit 717 are condenser-coupled to the input of the inverter switch circuit 716. The signal on line 717 for each bit, in this case the "C" bit, remains negative if a binary -0- is being recorded, but a positive pulse occurs if a binary -1- is being recorded. Assume that the tape is moving through the head 710 and that current flow is through the coil section 712 as the Write Bus C Bit receives a positive signal. If the tape unit is in a selected write status, the positive signal Sel and Wr Status is added to the positive signal of the Write Bus C Bit and passes through the inverter switch 716 to shift the trigger 708. As the trigger 708 shifts, it acts via the write inverter 709 so that current flow is shifted from the coil section 712 to the coil section 711 and thereby a binary -1- is recorded in this particular channel, that is the "C" bit channel. Recordation of the binary -1- is indicated by a change in the direction of the flux, as explained hereinbefore.

At the time that the second character is being recorded, assume that the "C" bit is to be a binary -0-. At this interval, even though the inverter switch 716 is conditioned by a signal on line Sel and WR Status, since no pulse occurs on the Write Bus C bit 717, the inverter switch 716 remains cut off and the trigger 708 remains in its condition, in this instance the On condition. Flow of current therefore continues through the coil section 711. At this time there is no reversal of flux so that, in effect, a binary -0- is recorded. The process of recording a binary -1- or binary -0- is repeated a considerable number of times, depending upon the number of characters being recorded until the end of a record is reached. As described above, after a record mark has been recorded, the tape is rewound and, therefore, upon completion of the rewinding operation, the tape is at the load point and the tape unit is in a write status.

During reading operations, the tape is fed past the read/write coil 710, and upon reaching a point where a binary -1- is recorded, the flux changes and signals are thereby generated and fed through three stages of push-pull amplification, i.e. the amplifiers 718, 719 and 720. The output of the amplifier 720 is fed through a cathode follower 721, the output of which is a positive pulse each time that a binary -1- is read. This cathode follower 721 acts as a rectifier to give a single polarity output (the details of this circuit are given below). It should be noted, however, that the grids of all the corresponding cathode followers are returned through cathode resistors to a common power supply, which is variable between −100 volts and ground.

Whenever the cathode follower 721 emits a positive pulse, it signifies that a binary -1- has been read from the tape. This positive signal is fed via an inverter 722 to trip a single shot multivibrator 723. This single shot multivibrator 723 emits a four microsecond positive pulse which is fed via a cathode follower 724 to the "C" bit input bus line 725, which is common to corresponding outputs of other tape units. Signals occurring on the line 725 are fed to the character registers described below.

The single shot multivibrator 723 is clamped against being tripped when the particular tape unit is "not" selected and in a read status. The signal on line 726 No Sel and Read Status is fed to seven clamp circuits, one of which is the illustrated clamp circuit 727 of the "C" bit circuits. When a positive signal is applied to this clamp circuit 727, the single shot multivibrator 723 cannot be tripped, but when the particular unit is selected and is in a read status, the line 726, No Sel and Read Status, is negative and the single shot multivibrator 723 is thus released by the clamp circuit and is free to operate. The "C" bit circuits thus described, together with the "B" bit circuits, are included in block form in Fig. 150. Identical circuitry represented by blocks in Figs. 151 and 152 is for the "A," "8," "2" and "1" bits, respectively. Writing on or reading from the tape is relatively simultaneous in all seven channels.

Referring again to Fig. 165, which shows the details of the circuitry used in the representative "C" bit track, the typical values of the components indicated pertain to all other track circuits. However, it will be apparent to those skilled in the art that various combinations and types may be employed. Wherever shown, unless otherwise indicated in the drawings, the values for the various resistors, inductances and condensers are in thousands of ohms, millihenries, and micromicrofarads, respectively. For example, a resistor labeled 200, indicates a 200K (200 thousand) ohm resistor; a condenser labeled 100 indicates a 100 micromicrofarad condenser. As usual, the terms positive and negative, used in relationship to signals, refer to relative values rather than values with respect to ground.

Referring to the inverter switch 716 (Fig. 165) designated IS, this switch utilizes one-half of a dual triode type 5687 tube with the cathode connected to ground, the grid connected through a 300K resistor to a power supply of −250 volts and through a 68 micromicrofarad condenser to the line 717 and through a 100K resistor to the line 715, Sel and WR status. The plate is connected through two 10K resistors, in series, to a power supply of +150 volts. When the line Sel and WR status is positive, negative bias on the grid is reduced to such a potential that positive pulses now occurring on line 717 will cause conduction in the tube and a consequent conduction through the two 10K resistors. The tapped output from the junction of the two 10K resistors passes to the trigger 708. Thus, when the tape unit is in a select and write status, positive signals occurring on the output buses of the character registers as represented by line 717 pass through the inverter switch 716 to the trigger 708.

The trigger 708, designated T, comprises two cross-coupled triodes (which may be included in one envelope as in a 12AV7 type tube) in which the plate P1 is coupled by a 68K resistor to the grid G2 and the plate P2 is likewise coupled to the grid G1 by a 68K resistor. Each of these 68K resistors is shunted by a 68 micromicrofarad condenser as shown. The grid G1 is connected by a 100K resistor to a power supply of −250 volts and the grid G2 is connected by an identical resistor to the same power supply. The cathodes K1 and K2 are connected to a −100 volt power supply while the plates P1 and P2 are connected to ground through 10K resistors. Trigger 708 may be reset Off, that is with its right side conducting, by any of the well-known methods. A negative signal output from the inverter switch 716 passes through a differentiating circuit comprised of a 47 micromicrofarad condenser and a 47K resistor. The differentiated signal occurring at the junction of the condenser and resistor passes either through a diode D2 or a diode D3 to the grid G1 or the grid G2, respectively, and causes the trigger to be shifted from one condition to the other so that for each negative output of inverter switch 716, the trigger 708 is shifted either from an On to an Off condition or from an Off to an On condition. The outputs at the plates P1 and P2 are fed to the write inverter 712.

The write inverter 712, designated WI, is comprised of a dual triode which may be of the 5687 type tube with the grid G1 connected via a 47K resistor, shunted by a 37 micromicrofarad condenser to the plate P2 of trigger 708, but the grid G2 is connected by identical circuitry to the plate P1 of the trigger 708. The cathodes K1 and K2 are connected to the cathode of the write status (WS) switch 713. The plate P1 of the write inverter 709 is connected through the coil winding 711 to ground while the plate P2 is connected through the winding 712 to ground. If the cathodes K1 and K2 are at a positive potential, there will be no conduction in either side of the write inverter 710, regardless of the condition of the trigger 708. The potential of the cathodes K1 and K2 is controlled by the write status (WS) switch 713. This switch has a cathode connected via a 6.3K resistor and a 10 millihenry inductance to a −100 volt power supply and via the same 6.3K resistor in series with a .01 micro-microfarad condenser to ground. Its plate is connected directly to +150 volts while its grid is connected via a 47K resistor to the line Write Status Off. If this line is negative, which it is when the particular tape unit is in a write status, conduction through the triode of the write switch 713 is stopped and the cathode goes relatively negative. This is the negative potential which conditions the write inverter 709 for conduction. With its cathodes K1 and K2 at a relatively negative potential, if the trigger 708 is On, the potential of its plate P2 is positive and, therefore, drives the grid G1 of the write inverter 709 positive so that current then flows from ground through the coil 711 and the left half of the write inverter 709 to the cathode of the write status switch 713 and thus to the −100 volt source.

As explained above, when current flows through the coil 711, it causes recording on the tape in one direction to saturation. If the condition of the trigger 708 is now reversed, its plate P2 goes negative and thus stops conduction through the left side of the write inverter 709. However, the plate P1 of the trigger is now positive and causes conduction through the right half of the write inverter 709. Current flow will then be from ground, through the coil section 712, the right half of the write inverter, to the cathode of the write status switch 713 to the −100 volt source. Thus, by shifting the condition of the trigger 708, the direction of magnetization of the tape is reversed and, therefore, in this instance, that of the "C" track is reversed.

During reading operations, as the tape is passed by the read/write coil 710 and changes of flux occur, potentials are generated in both halves 710 and 711 of this coil, which potentials are fed to the first stage of push-pull amplification, that is, to the amplifier 718, designated as A1. However, the coils are wound in such a manner that any change of magnetization causes a positive potential signal out of one-half while the other half generates a negative signal.

The first stage push-pull amplifier 718, designated A1, is a dual triode and may be a 12AV7 tube type. The cathodes K1 and K2 are connected through separate 1K resistors in series with a common 22K resistor to a −80 volt power supply. The grid G1 is connected via a 470K resistor to ground and via a .0025 micromicrofarad condenser to the coil 710. The plate P1 is connected through a 51K resistor to a power supply of +190 volts. The grid G2 is connected through a 470K resistor to ground and through a .0025 micromicrofarad condenser to the coil 711. The plate P2 is connected via a 51K ohm resistor to the power supply of +190 volts. Signals generated by the coils 710 and 711 are 180 degrees out of phase with one another and are fed to the respective grids G1 and G2, causing plates P1 and P2 to vary in accordance with the signals received. The outputs from the plates P1 and P2 are fed through a second stage of push-pull amplification, that is, the push-pull amplifier 719, to the third stage comprising amplifier 720.

The amplifiers 719 and 720, designated as A2 and A3 respectively are identical to the first stage A1, except that the input condensers for stage A3 are .01 micromicrofarad as compared to the .0025 micromicrofarad condensers of stages A1 and A2. A 500 ohm volume control is connected between the grids of A3. In this position, the 500 ohm rheostat is as though it were connected between the plates of the amplifier stage A2. Thus, as the 500 ohm resistance is decreased, the resistance between plates P1 and P2 of the amplifier stage A2 is decreased and degenerative feed-back to both plates occurs due to the fact that in push-pull amplification, as one plate goes positive the other plate should, at that time, be going negative. The output of stage A3 feeds to the cathode follower 721, designated CFM.

The cathode follower 721 is designed to deliver only the positive swing output from the stage A3. The output from the plate P1 of stage A3 passes through a .001 micromicrofarad condenser to the grid G1 of this cathode follower 721, the same grid being connected via a 470K resistor to a variable power supply. The output from the plate P2 of stage A3 is fed through a .001 micromicrofarad condenser to the grid G2 of the cathode follower 721, the grid G2 also being connected via a 470K resistor to the variable power supply. The cathodes K1 and K2 are connected through a 10K resistor to a −100 volt power supply and through a diode D6 to ground. The plates P1 and P2 are connected directly to a +150 volt power supply. Without the diode in the cathode circuits, the cathode follower 721 is essentially a cathode follower Or circuit, the cathode following whichever grid is driven positive. Therefore, a positive pulse output occurs whenever either of the plates P1 or P2 of the stage A3 goes positive. The variable bias supply VB in the diode is used to clip out noise that occurs so that all voltage swings below an approximately ground potential are clipped. Thus, the output of the cathode follower 721 develops at its cathodes K1 and K2 a positive signal for each change in magnetization on the tape passing the read/write coils 710. The output from the cathode follower 721 passes via a 10K resistor to the grid of the inverter 722.

The cathode of the inverter 722 is connected through a 1.8K resistor to ground, and its plate is connected through a 51K resistor to a +150 volt power supply. The output from the plate is passed to the single shot multivibrator 723.

The single shot multivibrator 723 is comprised of two triodes (which may be included in one envelope as in a 5687 type tube) in which the grid G1 is connected via a 10K resistor and a 51K resistor to ground and by way of the same 10K resistor and a 150 micromicrofarad condenser to the plate of the inverter 722. The plate P1 is connected through a 2.7K and a 5.6K resistor to a +150 volt power supply and through a 680 micromicrofarad condenser to the grid G2. The cathode K1 is connected through a 6.8K resistor to a −100 volt power supply. The plate P2 is connected through a 2.7K resistor shunted by a .01 micromicrofarad condenser to a +150 volt power supply. The grid G2 is connected through a 2.2 megohm resistor to the −100 volt power supply and through a 470K resistor to ground. The cathode K2 is connected to ground through a 4.7K resistor and through a 1000 micromicrofarad condenser to the cathode K1. The left triode of this single shot multivibrator 723 is normally conducting, but, upon reception of a negative signal from the inverter 722, the grid of the left tube is driven negative, and the ensuing positive output from the plate P1 is coupled through the 680 micromicrofarad condenser to the grid G2, causing conduction in the right tube. As the right triode starts to conduct, the cathode K2 goes positive, which potential is coupled through the 1000 micromicrofarad condenser to the cathode K1 driving the left tube further into cut-off. The cathode K1 is held at the potential of the cathode K2 until the 1000 micromicrofarad condenser starts to charge toward −100 volts through the 6.8K cathode resistor. After a period of time determined by the 6.8K cathode resistor and the 1000 micromicrofarad condenser, the latter becomes charged to a point where the left tube again starts to conduct and a negative signal is then coupled from the plate P1 through the 680 micromicrofarad condenser to the grid G2 cutting the right tube Off.

An output taken from the junction of the 2.7K and 5.6K load resistors of the left triode of the single shot 723 is fed to the cathode follower 724, more specifically via a 130K resistor shunted by a 15 micromicrofarad condenser leading to the grid of the triode. The grid is also connected through a 270K ohm resistor to a power supply of −250 volts, while the plate is connected directly to a +150 volt power supply. The cathode is connected through a 100 ohm resistor and a 4K resistor to a −100 volt power supply. Between the 100 ohm resistor and the 4K resistor a co-axial cable is utilized, if required. The output is taken from the junction of the 100 ohm and the 4K ohm resistors. The input to the cathode follower 724 may be clamped at ground potential by the clamp circuit 727, the cathode of whose triode is connected to ground and whose plate is connected to the input of the cathode follower 724. The grid of the clamp triode is connected by way of a 47K resistor to the line 726, No Select and Read Status, the latter line being positive when the particular tape unit is not in a select and a read status. Therefore, if the tape unit is in a select and read status, a negative potential occurs on the line No Select and Read Status and conduction through the clamp circuit 727 is stopped. When no conduction occurs through this clamp circuit 727, the input line to the cathode follower 724 may follow the output signal of the single shot multivibrator 723.

Figure 166:
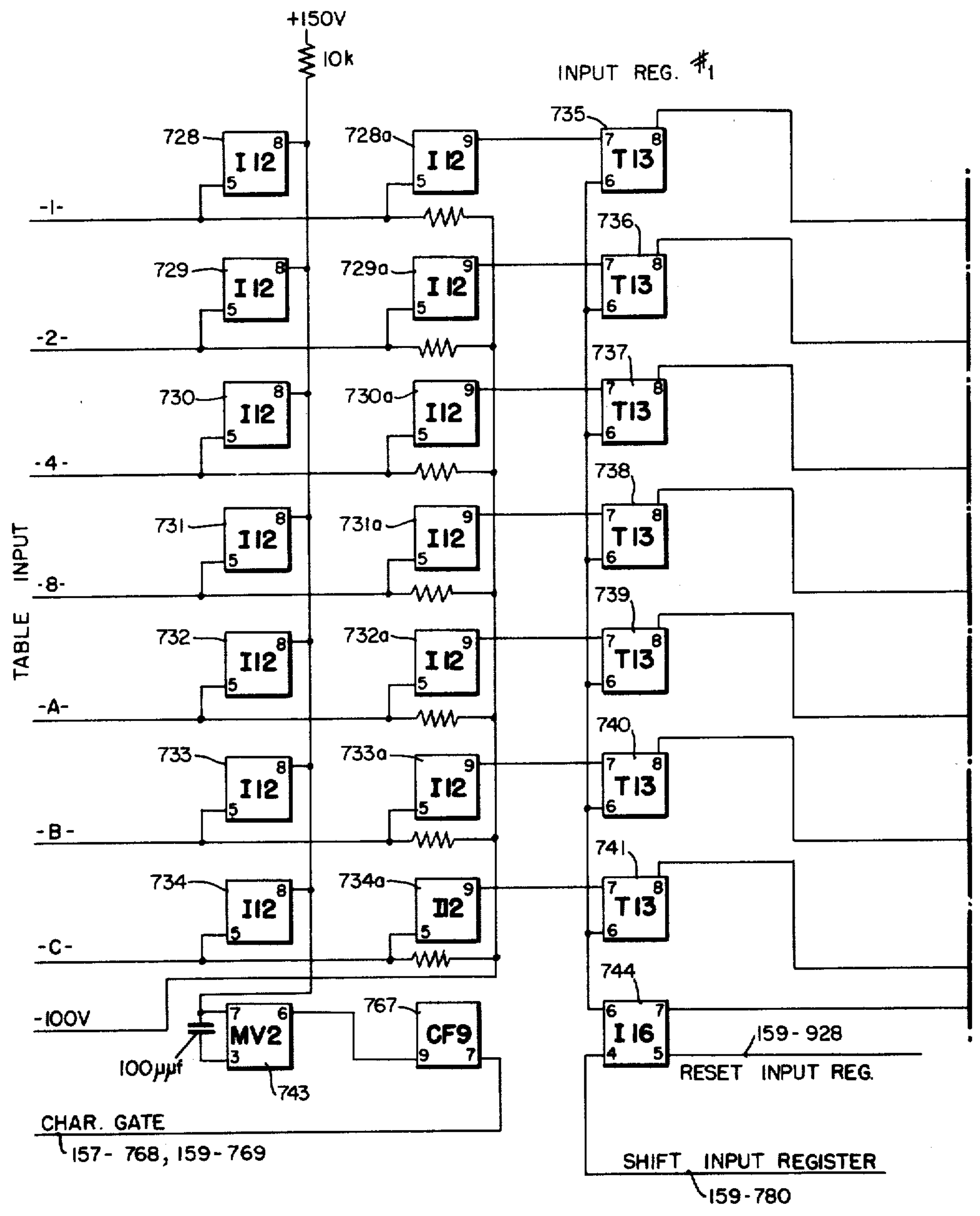

*Input registers*.—The pulses representative of data read from tape are present on the tape input buses shown at the left in Fig. 166, where they enter the input registers. The registers and their control circuits are shown in Figs. 166–169. A pulse present on any one of the seven channels of the tape input bus will be entered into an associated pair of a series of inverter pairs 728—**728*a* through 734—734*a*, input pins 5, and from the outputs of these pairs, pins 9, to associated triggers 735—742**.

The triggers 735—742 will be turned on by the sensing of characters on tape. Pins 8 of the inverters 728—734 are all connected together to produce an Or circuit, permitting any pulse entering the circuit to be transmitted via a common line to a 60 microsecond character gate single shot multivibrator 743.

Figure 167:
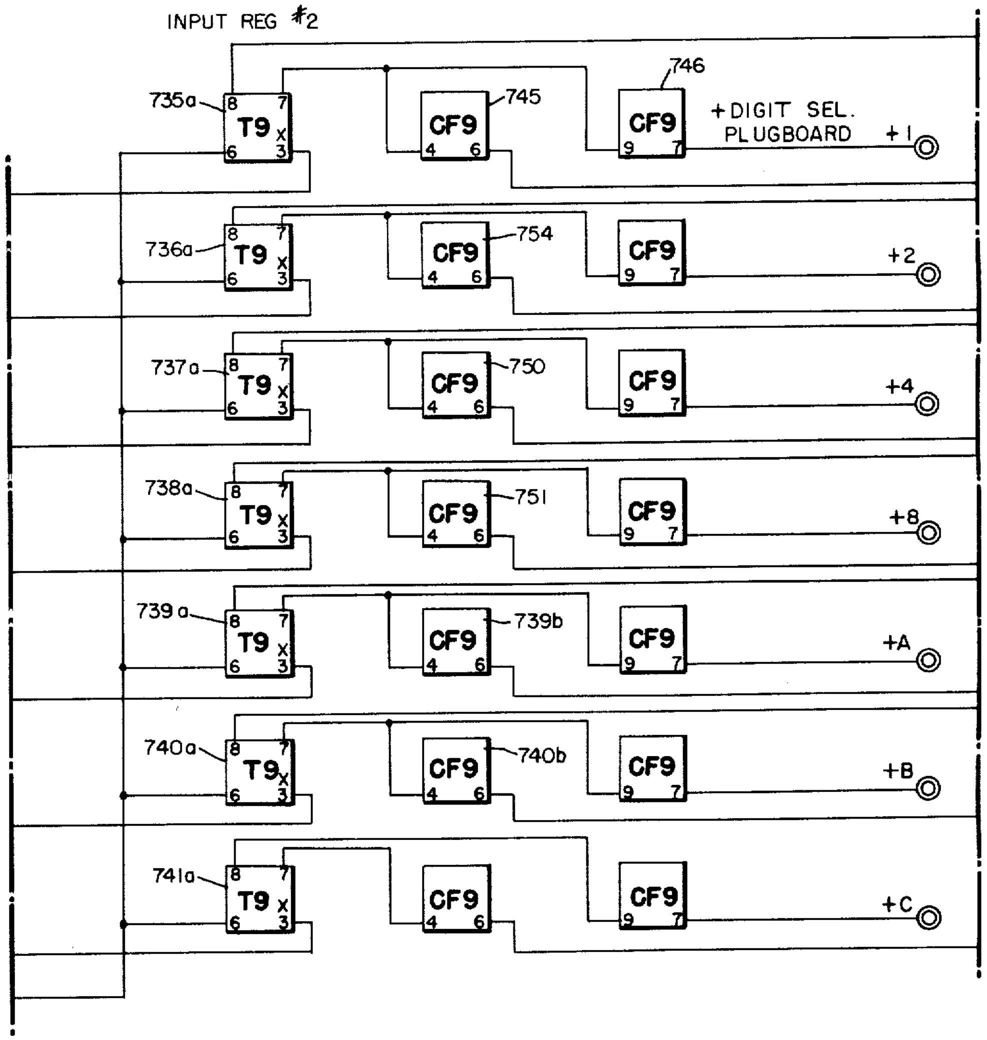

The character gate generating single shot multivibrator 743 produces an output pulse from its pin 6, which is transmitted via a cathode follower 767, output pin 7, to other portions of the machine shortly to be described. The character pulses that enter the triggers 735—741 are held in these triggers until a signal is sent to their input pins 6, causing them all to be reset into their Off state which will cause the transfer of their contents to a second set of triggers **735*a* through 741*a* (Fig. 167). The triggers 735 through 741 constitute input register #1, and the triggers 735*a* through 741*a* constitute input register #2. An Input Shift Register signal is transmitted via an inverter 744 (Fig. 166), output pin 6**. The signal Input Shift Register is generated in another section of the machine which will be described shortly.

When the contents of input register #1 have been transferred to input register #2, input register #2, may transmit the signals representative of bits stored, to be used for memory storage purposes, for checking purposes and for digit selection operations. The output pulses from the triggers comprising register #2 are available via their output pins 7 and 8.

The nature and the operation of each of the several register orders is the same. Therefore, a description of one (that for the –1– bit, for example) will suffice. A signal is transmitted from the output pin 7 of the trigger **735*a*, to a cathode follower 745, input pin 4, and also to a cathode follower 746, input pin 9. From its output pin 7 the cathode follower 746 transmits a signal to the control panel digit selector hub 747. The trigger 735*a* also transmits its signal, via cathode follower 745, to a switch 748 (Fig. 168), input pin 9. The trigger 735*a* delivers a pulse from its output pin 8, which is transmitted to a cathode follower 749 (Fig. 168) which, via its output pin 6**, is connected to its digit selector hub on the control panel.

*Special character recognition*.—A character received in input register #2 (Fig. 167) must be analyzed to determine whether the character is a special character, a blank character, a tape mark or a record mark. Consequently, the pulses from the triggers **735*a* through 740*a*, which are representative of the –1– through –8– bits and the –A– and –B– bits, respectively, are transmitted through their associated cathode followers 745, 754, 750, 751, 739*b* and 740*b*, respectively, to a discriminating circuit in Fig. 169. The triggers 735*a* through 740*a* (Fig. 167) will transmit a pulse from their output pins 7, which enters the input pins 4 of their associated cathode followers and passes through these latter units by way of their output pins 6** to the circuits of Fig. 169.

A special character must be recognized so that its sorting sequence may be determined. By reference to Fig. 4 of the drawings it will be seen that all of the alphabetic and all of the numeric characters have a total numeric binary bit count (straight binary count) which is less than 12, whereas the special characters have a numeric binary bit count exceeding 12. The asterisk (*), for example, includes in its representation an –8– bit, a –4– bit, and a –2– bit, which is a count of 14 and is therefore in excess of 12. This condition exists in all of the other special characters which must be recognized as a class, and serves to distinguish them from the alphabetic and numeric characters as well as from the record mark, the tape mark and the blank mark.

Figure 169:
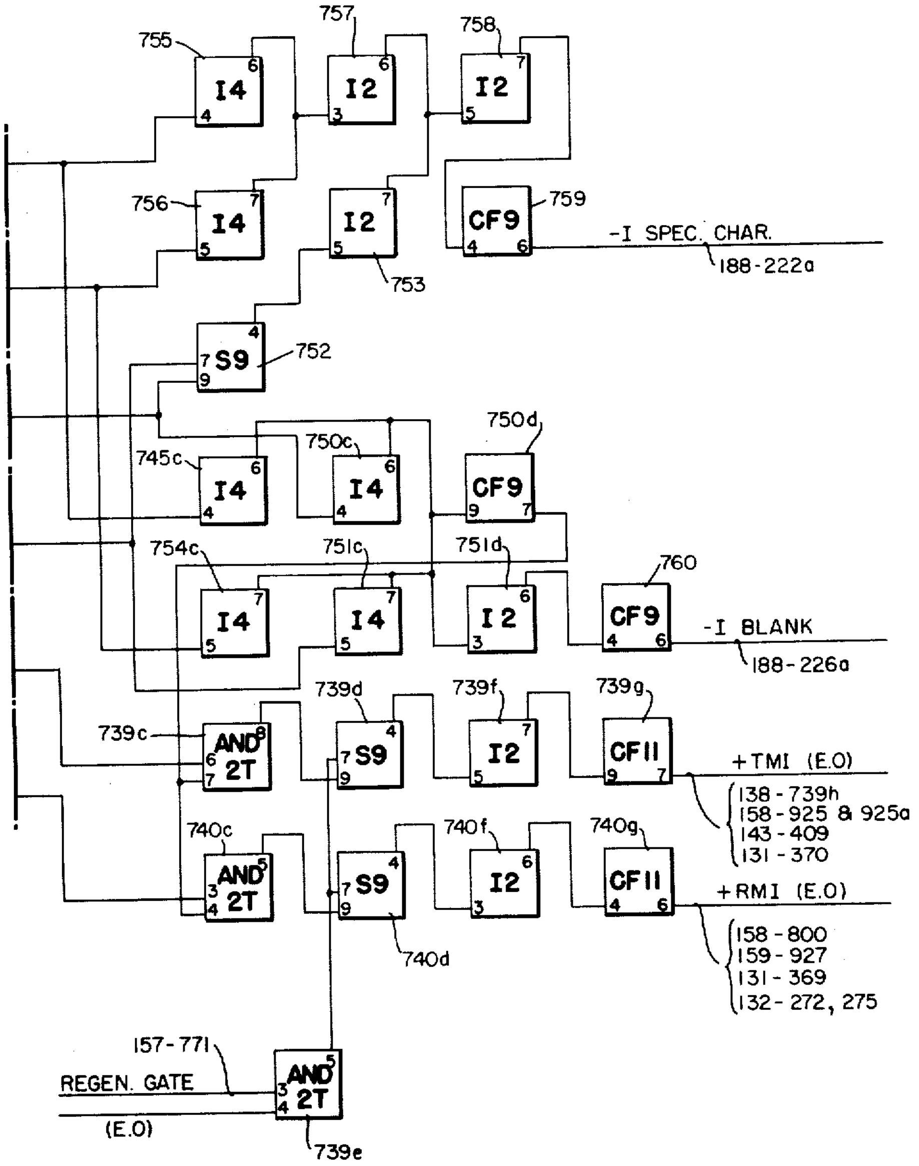

In order to recognize the special characters it is, therefore, merely necessary to sum the numeric bits therein and determine that they exceed a count of 12. Accordingly, the output of the cathode follower 745 (Fig. 167) is transmitted to an inverter 755 (Fig. 169), the output of the cathode follower (Fig. 167) is transmitted to an inverter 756 (Fig. 169), the output of the cathode follower 750 (Fig. 167) is transmitted to a switch 752 (Fig. 169), and the output of the cathode follower 751 (Fig. 167) is also transmitted to the switch 752 (Fig. 169). Upon coincidence of the –4– bit pulse and the –8– bit pulse in the switch 752, an output signal is generated at output pin 4 of the switch, which is transmitted to the input pin 5 of an inverter 753. In the meanwhile, if a –1– bit pulse is present, it will enter the inverter 755 at input pin 4, and if a –2– bit pulse is present it will enter the inverter 756 at input pin 5. These pulses will pass through their respective inverter 755 and/or 756 by way of their output pins 6 and/or 7, respectively, and will be transmitted to an inverter 757 via input pin 3. The inverters 757 and 753 are in effect a coincidence circuit which, if pulses are present in each, will transmit a pulse to input pin 5 of the inverter 758 and by way of its output pin through a cathode follower 759 as the signal Special Character. This signal will, therefore, be present as the output of the cathode follower 759 if an –8– and –4– pulse, together with a –1– and/or –2– pulse, is in the input register #2.

Inasmuch as the blank mark is the lowest possible character in a sorting or collating sequence, it is necessary to recognize a blank mark when it is in the input register #2. A blank mark is one which has neither numeric nor zonal (A or B) bits, but which has a check bit. The fact that the check bit is in the blank character manifestation need not be considered, since the other characters which are being identified have either numeric bits or alphabetic bits or both. Consequently, the C trigger **741*a*** (Fig. 167) is not connected into the discriminating circuit of Fig. 169.

The absence of the –1– bit as indicated by a pulse at the output of the cathode follower 745 (Fig. 167) is indicated to an inverter **745*c* (Fig. 169), and the pulse from the cathode follower 754 (Fig. 167), indicative of the absence of a –2– bit, is transmitted to an inverter 754*c* (Fig. 169). The pulse from the cathode follower 750 (Fig. 167), indicative of the absence of a –4– bit, is transmitted to an inverter 750*c* (Fig. 169) and the pulse emitted from the cathode follower 751, indicative of the absence of an –8– bit, is transmitted to an inverter 751*c* (Fig. 169). If there is coincidence of the –1– bit and the –4– bit on the one hand, and of the –2– bit and the –8– bit on the other hand, a pulse will be transmitted through the inverter 751*d* and through the cathode follower 760** as the signal Blank representative of the fact that the character being examined contains no numeric bits. This signal can be interpreted by the logical circuits of the system that the character so examined contains neither numeric nor alphabetic bits by the fact that the tape mark signal results from the positive identification of the –A– bit in the character, while the record mark signal results from the positive identification of a –B– bit in the character. Therefore, the alphabetic portion of the character for the determination of a blank mark need not be considered.

For tape control purpose, it is also necessary to specifically recognize the tape mark and the record mark when read into the input register #2 of Fig. 167. A tape mark has only an –A– bit therein, all of the other bits being absent. The signal on the common line from the inverters **745*c*, 750*c*, 754*c* and 751*c* (Fig. 169) is transmitted to a cathode follower 750*d*, the output of which at pin 7 is indicative of the fact that the character in input register #2 being examined has no numeric bits therein. If this output pulse is therefore brought into coincidence with a pulse indicative of the presence of an –A– bit, the tape mark can be recognized, and if the pulse from the cathode follower 750*d*** is brought into coincidence with a pulse indicative of the presence of a –B– bit, the record mark can be recognized.

Accordingly, the output at pin 7 of the cathode follower **750*d* is transmitted to the input pin 7 of an And circuit 739*c*. The And circuit 739*c* is also fed from the output pin 6 of the cathode follower 739*b* (Fig. 167) by a pulse which represents the presence of an –A– bit in the trigger 739***a* of input register #2. A coincidence of pulses at inputs 6 and 7 of the And circuit 739*c* (Fig. 169) will produce an output pulse via its pin 8 which is transmitted to a switch 739*d*. The second input at pin 7 of the switch 739*d* is the output at pin 5 of an And circuit 739*e*. The first input to the And circuit 739*e* at pin 3 is the Regeneration Gate signal which is present when the cathode ray tube memory is not in a regeneration cycle. The second input at pin 4 of the And circuit 739*e* is the time signal E.0. When these two signals coincide in the And circuit 739*e*, a pulse will be emitted from the output pin 5 thereof which is transmitted to the input pin 7 of the switch 739*d* as the second input thereof. When both pulses are present in the switch 739*d*, an output pulse will be emitted from its pin 4 which, via an inverter 739*f*, is transmitted through a cathode follower 739*g* as the timed input tape mark signal TMI(E.0).

A record mark in input register #2 (Fig. 167) may be recognized by the presence of an –A– bit therein, and by the absence of all numeric bits. The pulse from the cathode follower 750*d* (Fig. 169), which is indicative of the fact that no numeric bits are present in the character being examined, is also transmitted to input pin 4 of an And circuit 740*c*. The second input to the And circuit 740*c* is the output pulse from the cathode follower 740*b* (Fig. 167), which is indicative of the presence of a –B– bit in input register #2. This pulse enters the And circuit 740*c* (Fig. 169) by way of its input pin 3. When there is a coincidence of pulses entering input pins 3 and 4 of the And circuit 740*c*, there will be an output from its output pin 5 which is transmitted as one input to pin 9 of a switch 740*d*, the second input of which at its pin 7 of the switch 740*d* is the previously described timed signal from the And circuit 739*e*. Therefore, when there is a coincidence of pulses within the switch 740*d* entering pins 7 and 9 thereof, its output pin 4 will transmit a signal through an inverter 740*f* and through a cathode follower 740*g* as the timed record mark signal RMI(E.0).

*Character storage.*—As previously described, a character sensed from tape is stored completely in the input character register (Figs. 166–167), and from the character register it is stored in electrostatic memory one bit at a time. As previously stated, a character is composed of various combinations of seven bits. It has been shown in a previous section that the character ring produces pulses called the D.0, E.0, 1.0, 2.0, 4.0, 8.0, A.0, B.0 and C.0 signals. The D.0 and E.0 signals, timed as previously described, are used as timing elements for controlling circuitry within the machine. The succeeding pulses 1.0 through C.0 are used to cause the associated bits of a character in input register #2 to be stored. Thus, as shown in Fig. 167, the trigger 735*a* of the input register #2 is connected via its output pin 7, and through the cathode follower 745, output pin 6, to the switch 748 (Fig. 168), input pin 9 to which the bit pulse is delivered. The second control pulse supplied to the switch 748 is derived from the character ring trigger producing the 1.0 signal on line 761 (see character ring output lines, Fig. 156). Thus, when the character ring is in its first position, the signal at this switch will test for the content of the trigger 735*a* (Fig. 167) to determine whether a –1– bit or a –0– bit is present at this position of the character. The resulting pulse from the output pin 4 of the switch 748 is connected to an inverter 762, input pin 5. The pulse passes through the inverter 762 to cathode followers 763 and 763*a*, input pins 4 and 9, respectively, and from their output pins 6 and 7, respectively, to the input bus 764.

As the character ring advances to its second stage, the switch 748 will now be deconditioned and the switch 765 now will test for the presence of the –2– bit of the character in the register, trigger 763*a* (Fig. 167). The result of this test will be transmitted to the inverter 762 (Fig. 168), as just described. This process continues from bit to bit of any character under control of the character ring. When the character ring has interrogated switch 766 and the bit ring has stored this character in memory, the character in input register #2 will have been completely stored.

*Input register and character storage controls.*—It is possible to have tape characters coming from tape in such fashion that parts of a following character may be stored in input register #1 before the preceding character has been completely stored in memory from input register #2.

To insure that a character entering input register #1 is completely stored in this register from tape before any operations take place on it, the single shot timing device 743 (Fig. 167), previously described, will produce a 60 microsecond timing pulse which will allow a definite time to pass before the character entering the register #1 will be transferred to register #2. This timing device produces a signal from its output pin 6, via a cathode follower 767, output pin 7, to input 5 of an inverter 768 (Fig. 157), and also to the input pin 3 of the character gate trigger 769 (Fig. 159). The character gate trigger 769 will not respond to the polarity of the signal entering it when the timing device 743 (Fig. 166) is first initiated, but it will be triggered upon the fall of the timing pulse. The signal entering the pin 5 of the inverter 768 (Fig. 157) will produce a signal from its output pin 7 to turn on a regeneration control trigger 770. This trigger emits a signal from its output pin 7, via a cathode follower 771, output pin 6, which is transmitted to a switch 772, input pin 7.

Until this time the machine had been performing a normal regeneration operation where any characters stored in memory are maintained there by resort to the regeneration process for long periods of time. Upon completion of the regeneration cycle being performed, when the signal arrives at input pin 7 of the switch 772, the signal Ring Control will be transmitted from the cathode follower 665 (Fig. 154), output pin 7. This signal, as previously described, is derived from the bit ring at 0.7 time of the cycle (Fig. 153), and from the –C– trigger of the character ring (Fig. 156) when the pulses are in coincidence in the And circuit 649 (Fig. 154). This time indicates the end of a complete character regeneration, and it is at this time that regeneration may be stopped to allow the character now in the input register to be stored in memory. The C.0–7.0 pulse entering the switch 772 (Fig. 157), pin 9, will be transmitted through its output pin 4, and will cause the ring control trigger 595 to be turned on. The output at pin 7 of the ring control trigger 595, which is transmitted via the cathode follower 596, output pin 7, is used to control the cathode follower switch 597—598 (Fig. 153), to cause the bit ring to stop in the zero position. At this time, then, the bit ring will be stopped at the zero position, and the character ring (Fig. 155) will also be stopped with the trigger 613 on. No further operation will take place within the machine until the timing signal generated by the single shot multivibrator 743 (Fig. 166) ends. Upon the end of this time delay, the character gate trigger 769 (Fig. 159) will be turned on to produce an output from its pin 7, which via a cathode follower 773, output pin 7, is fed to various circuits.

One of the circuits fed by the cathode follower 773 is a switch 774, pin 9, and since, as previously established, the character ring is in the D.0 position, the signal passes through the switch 774, output pin 4, to turn on a trigger 775. This trigger being turned on will produce an output from its pin 7, which is the signal Column Counter Reset which, via a cathode follower 776, output pin 6, is transmitted to the inverters 689 and 690 (Figs. 160 and 161, respectively). It is via these units, as previously described, that the column counter is reset to zero. Since this is the first character coming from tape, this step is necessary at this time in order to locate the first column in a definite location of memory.

The character gate trigger output is also transmitted from pin 7 of the cathode follower 773 (Fig. 159) to an inverter 777 (Fig. 157), and via its output pin 6 it is used to restore the ring control trigger 595 to its normal location. Resetting the ring control trigger 595 to its normal position will allow the bit ring once again to go into operation.

As the bit ring starts to operate, a signal is generated in conjunction with the setting of the triggers in the character ring which will generate a series of signals, previously described, to be used in the circuits controlling storage. Thus, the And circuit 642 (Fig. 154) will receive and emit a signal when the -D- trigger of the character ring (Fig. 155) is On and combine it with a series of signals from the bit ring to produce, in essence, one signal that may be called the D.4–D.0 signal. The D.4–D.0 signal is transmitted from the cathode follower 644a (Fig. 154), output pin 6, to a switch 778 (Fig. 159), and through this switch, output pin 4, to turn on a register trigger 779. The register trigger 779 will produce a signal at its output pin 7, which signal is transmitted via a cathode follower 780, output pin 6, as the signal Input Register Shift. The signal Input Register Shift is effective to shift register #1 (Fig. 166), the signal being transmitted via the inverter 744, input pin 4, through its output pin 6, to turn off all the triggers in input register #1. By this time it is known that the entire character has been read from tape and has been stored in the register. By impulsing all the triggers 735–741 with a pulse tending to turn them off, those that are on when this pulse arrives will be turned off and will generate a signal from their output pin 8 to turn On their corresponding triggers 735a–741a (Fig. 167), thus in effect shifting the character from input register #1 to input register #2.

Prior to the Input Register Shift pulse there has been no data in input register #2. The first character coming from tape, moreover, has not yet been stored in character register #2, but is still being held in input register #1.

When the bit ring performs one complete revolution, the character ring advances from D to E (trigger 613 to trigger 614, Fig. 155), and at this time the E.4–1.0 signal is generated in the coincidence unit 641 (Fig. 154), and via its output pin 2 is transmitted through the cathode follower 650, output pin 7, as the signal E.4–1.0 which is transmitted to a switch 781 (Fig. 159). The signal will be emitted from the output pin 6 of the switch 781, and will cause a store gate trigger 781a to be turned on. The output 7 of the store gate trigger 781a is transmitted via a cathode follower 782, output pin 7, to a switch 783, input pin 9. Since the character ring is now no longer standing at D.0 time, no signal will be transmitted through the switch 783 at this time.

The output pin 7 of the cathode follower 782 energizes an inverter 784, causing its output pin 7 to hold the column counter reset trigger 775 off. Thus, the column counter reset trigger 775 will be held off for the remainder of this complete record operation. This must be done in order to prevent the reset trigger 775 from generating more than one column counter reset pulse per record operation.

The cathode follower 782, output pin 7, also emits the signal Store Gate (Reset) which will be used in various other places associated with memory storing and with the comparison operation, to be described at a later time.

A signal is emitted from the output pin 8 of the store gate trigger 781a, and is transmitted through a cathode follower 785, via its output pin 6, to an And circuit 786 which provides a signal from its output pins 5, through a cathode follower 787, output pin 6, to provide a Store Scan Gate signal indicating a storing operation is occurring.

At this time the signal is transmitted from the output pin 6 of the cathode follower 787, to an RM (record mark) trigger 788 (Fig. 158), input pin 6, which causes this trigger to be turned off if it is not already off.

As described previously, an input tape drive is associated with a particular memory. This is true in all cases for all practical purposes. When a selection of a given input tape drive is made, one of the tape selection triggers 270 or 294 (Fig. 134) is turned on and it will generate a signal from its output pin 7 to the cathode followers 493, or 494, respectively (Fig. 134), input pins 4 or 9, respectively, through their output pins 6 or 7, respectively, to the switch 790 (Fig. 170) upon selection of tape drive T1, and to the switch 791 (Fig. 170), upon selection of tape drive T2, respectively. The selection of an input unit results in the selection of an output unit, since the record in the memory associated with the input units must be written on tape at the operator's option, before it is replaced in memory by a succeeding record from the tape drive. Thus, at this time, since characters are being read from tape, it may be supposed that the characters being read into memory replace characters of the previous record stored within the same memory. Depending on the selection of input tape drive, either the switch 790 or the switch 791 will be allowed to pass a signal to control storage operations.

A Store Gate signal is generated from switch 781a (Fig. 159) upon the reception of the first character from tape, as previously described, and is transmitted from its output pin 4 to an inverter 789 (Fig. 170), and via its output pin 6, to test a pair of switches 790 or 791. The result of this test turns on a trigger 792 or 793, which in turn selects the memory cell into which the incoming record is to be stored. Thus, if selection of tape drive T1 as the input is assumed, the signal from the inverter 789 will pass through the switch 790 to turn on the trigger 793. This trigger will generate an M1 Store signal from its output pin 8 which is transmitted via a cathode follower 794, output pin 7. From the output pin 7 of the trigger 793, the M1 Store signal is also transmitted through a cathode follower 795, output pin 7, and to an And circuit 796. If input tape drive T2 had been selected, the switch 791, the trigger 792, the cathode followers 797, 795a and the And circuit 796a would provide an identical circuit. The M1 Store signal emitted from the output pin 7 of the cathode follower 798 is transmitted to the memory cell and into a switch C1, Fig. 173, where it is used to decondition the regeneration loop within the memory system. This switch, if tape drive T1 had been selected as an input unit, would then be deconditioned, not allowing any pulses to pass therethrough.

As previously described, the series of switches 748, etc. (Fig. 168), provide for the serial recognition of the seven bits comprising a character, and the cathode followers 763 and 763a (Fig. 168) transmit a signal via the input bus to the And circuits 796 and 796a (Fig. 170). The And circuit 796a must be properly conditioned to allow any signals to pass. Pin 6 of the unit 796a is conditioned by selection of the trigger 792, pin 4 is conditioned by the in bus via cathode followers 763 and 763a (Fig. 168) as just described, and pin 7 is conditioned by the Store Gate (Reset) signal which is the output of the cathode follower 782 (Fig. 159), output pin 7, to allow the And circuit 796a to be conditioned only during storing operations of the machine. The pin 3 of the And circuit 796a is conditioned by an I Bus Test signal at 0.4 time, generated by the bit ring via the cathode follower 638 (Fig. 154), which is controlled by the bit ring which has previously been described. The And circuit 796 is conditioned in the same manner, except under control of the M2 Store signal. Thus, at 0.4 time of the bit ring during a cycle in which a character is to be stored (one bit at a time) a coincidence will be established in either the unit 796 or 796*a*, depending on the selected input tape drive. The pulse passed will be transmitted through the output pins of these units, and through the associated cathode followers 799 or 799*a*, respectively, output pins 6 or 7, respectively, as the signals M2 In Bus and M1 In Bus, respectively, to control the in bus to an inverter 800 (Fig. 173).

In summary it can be said then that the coincidence units 796 or 796*a* will pass a signal when the following four conditions are satisfied.

(1) The memory cell has been selected, (2) The character to be stored in the particular memory cell location is a dash, as determined by the bit in the input character register.

(3) The system is in a storing cycle of operation, and (4) The test time has arrived.

If a signal is emitted from the cathode followers 799 or 799*a* (Fig. 170), respectively, output pins 6 or 7, it will be transmitted to the inverter 800 (Fig. 173). If a dash is to be stored, the signal will pass through the inverter 800 (Fig. 173), and cause a trigger 801 to be turned on.

Resetting of the column counter to its zero position establishes the memory location in which the character in input register #2 will be stored. The bit ring will progress, completing a revolution, advancing the character ring from D to E time, revolve again, advancing the character ring to its first position. At this time the bit ring will once again start through its cycle. Since the crystal oscillator 599 (Fig. 153) is a one megacycle oscillator, it produces signals at a repetition rate of one microsecond. Thus, the bit passes along it at a one microsecond time rate. During the time that the first three triggers of the bit ring are on, time is provided for the deflection circuits to stabilize. At the end of this three microsecond period a signal Interrogate Time will be emitted from the single shot multivibrator 654 via the output of the cathode follower 655 (Fig. 154), as previously described. The signal Interrogate Time is transmitted from the cathode follower 655, output pins 6 and 7, to a cathode follower 802 (Fig. 172). This unit will transmit the same signal from its cathode to the diodes 803. Since it has been previously established that the column counter is standing in the zero position, the left hand tube has been selected for storage. This is done by means of the trigger 630 (Fig. 161), which transmits a pulse through the cathode follower 688, to the lines marked R and L and to the diode And circuits 803 and 803*a*, respectively, in Fig. 172. Thus, when the interrogate signal is transmitted from the cathode follower 802 (Fig. 172), it will pass through the diode unit in which the pulses meet in coincidence, through a shaping circuit 804, and from there cause the control grid in the selected cathode ray tube to be unblanked. Thus, at this time a stream of electrons will bombard the target area selected by the deflection circuits.

In bombarding a spot on the target of the cathode ray tube, as determined by the deflection circuits, a signal will be generated on the face plate of the storage tube which will be transmitted into the video amplifier and clipper circuits of Fig. 174. This amplifier is a six-stage amplifier, the output of the sixth stage being driven by a cathode follower whose output is connected to point A, Fig. 173. This signal will now be available to the second control element of the switch C1, but cannot pass through this unit since one of its three control elements has been previously deconditioned. The signal from input A (Fig. 173) is also available at the diode And circuit 805, at which point it is entered with the Sample signal.

The Sample signal is generated in the single shot multivibrator 657 (Fig. 154), and it is transmitted through the cathode followers 659 and 660, as previously described, to the input B in Fig. 173. If the beam, when it interrogates the area selected by the deflection circuits detects a stored charge indicating a dash, the signal will be amplified via the amplifiers (Fig. 174) and will be transmitted to the And circuit 805 (Fig. 173). The sample pulse entering the second half of the coincidence unit 805 will then pass through and cause the cathode follower 806 to produce an output from its cathode, indicating that the character sensed is a dash. If the spot interrogated contains a dot instead of a dash, however, the sample signal to the coincidence unit 805 will not be permitted to pass through the diode circuit, and consequently will produce no output at the cathode follower 806. Thus, even during a storage cycle, it is possible to interrogate any information previously stored in the same location before such previously stored data is destroyed by the insertion of new information. Herein this feature is unique and of prime importance since, in the comparing operations to be described later, the sample signal just described will represent the output character to be compared.

Prior to the discussion of the interrogation signal, it was pointed out how a bit of a character is taken from an input register, and is transmitted via the coincidence units 796 or 796*a* (Fig. 170), and from one of them to the inverter 800 (Fig. 173), to cause the trigger 801 to turn on if the information to be stored is a dash or a binary –1–. The cathode follower 802 is in effect an Or circuit. Where the Interrogate Time signal is transmitted to one input of the cathode follower 802, this signal is emitted from the cathode follower to cause the electron beam to be unblanked by the circuitry described. At this time the trigger 801 will have been turned on to indicate that a dash is to be stored in the location to which the cathode ray beam is deflected. A signal is transmitted from the output of the trigger 801 to the alternate input of the cathode follower 802, which will hold the cathode potential at the proper voltage to maintain the electron beam unblanked for an additional four microseconds.

As previously described in connection with the deflection circuits, an increment is added to the deflection circuits upon every complete operation of the bit ring which causes the electron beam to be shifted vertically slightly to write a dash. This is an uncontrolled function which will occur on every operation of the bit ring. In order to store dashes selectively, the trigger 801 is provided to either allow the electron beam to be unblanked for only one microsecond via the interrogation circuits, or to allow the electron beam to be left unblanked for four additional microseconds under control of the information to be stored. Thus, if the character to be stored is a dash, the trigger 801 will be pulled on to allow the beam to be unblanked to write a dash in memory, and if the character to be stored is a dot, the trigger 801 is left in its normal reset position, and at the end of the interrogation signal the electron beam in the memory tube will be cut-off and no further operation will take place on this spot in memory at this time.

At the end of the four microsecond bit sweep time, the trigger 801 will be reset by an inverter 806 which receives a signal Memory Bus Reset from the cathode follower 648, output pin 7 (Fig. 154), which is in turn controlled by the bit ring. Thus, at the end of the one complete cycle of the bit ring operation, a signal will be generated from the bit ring and will be sent via the cathode follower 648, output pin 7, to the inverter 866 (Fig. 173) to reset the dash control trigger 801 and to once again blank the electron beam in the memory itself. At this time the operation of the bit ring will again allow two microseconds for deflection stabilization. The operation just described is identical for each bit of a character stored, and for every succeeding character following the first character.

The end of a record is sensed by the recognition of a record mark in the second input register. This recognition is emitted from a cathode follower 740*g*, output pin 6, through circuits previously described, and is transmitted to an Or circuit 808 (Fig. 158), input pin 4. The signal will pass through the Or circuit 808 to an inverter 809, input pin 5, and through the inverter 809, output pin 7, to turn on the record mark trigger 788. The record mark trigger 788 will emit a signal from its output pin 7 which is transmitted via a cathode follower 810, output pin 6, to an inverter 811, output pin 8, to turn off the scan control trigger 812 (Fig. 157) and the regeneration control trigger 770 (Fig. 157). The scan control trigger 812 has not yet been activated. The regeneration control trigger 770, however, has been turned on by the first character gate sensed at the beginning of the record operation. The regeneration control trigger 770 will, therefore, be turned off by the record mark signal. The output pin 7 from the regeneration control trigger 770 will emit a pulse which will be transmitted through the cathode follower 771, output pin 6, and will condition one input of the switch 772. Upon completion of the storage cycle now in operation, i.e. storing of the record mark, the Ring Control signal will be generated, as previously described, and will be transmitted to the alternate control of the switch 772, through its output pin 4, to turn on the ring control trigger 595. Turning the ring control trigger 595 on will allow the machine to resume normal regeneration. Should the machine, for any reason, stop at this time, the regeneration process will maintain the information just stored in memory for extended periods of time.

The signal emitted from output pin 6 of the cathode follower 810 (Fig. 158) is also transmitted to a switch 813, input pin 9. The input pin 7 of the switch 813 is conditioned from a time signal generated by the coincidence unit 641 (Fig. 154). A signal RMI(D.4) will pass through the switch 813 during the cycle following that in which the record mark is stored, and will try to reset the scan gate trigger 814 (Fig. 159), (not now turned on) and will reset the store gate trigger 781 (Fig. 159), which has been turned on to generate the store control signal. A RM Reset signal is also emitted from the output pin 4 of the switch 813 (Fig. 158), and this signal is transmitted to the triggers 792 and 793 (Fig. 170), to turn off either trigger which was previously turned on to control storage into memory, and by turning this trigger off it will re-establish the regeneration loop for the memory cells. At this time the record has been completely stored in memory. An operation identical to the one immediately described will cause the alternate tape drive to feed a record into its associated memory at the end of which time two complete records will be stored in memory.

During the time that the first records are stored in the machine, other portions of the system under control of the operator's station have made comparisons of control fields, and as a result of these comparisons have made a decision as to which record in memory is the low record and, therefore, which record is to be written on a tape in an output tape drive. Since this machine does not read and write simultaneously, it is necessary now for the machine to start a writing operation, since two records have been now read into memory.

*Write out.*—The writing operation is initiated by the ready condition of the selected output units. The selected output unit will generate a Write Start signal from the inverter 332 (Fig. 136), output pin 7. The circuitry that produces this signal has been previously described. The Write Start signal is transmitted to a scan delay single shot multivibrator 814 (Fig. 157). The scan delay single shot 814 generates a signal at its output pin 6 when it is first fired and transmits a signal via a cathode follower 815, output pin 7, through an inverter 816, output pin 6 which will once again turn On the regeneration control trigger 770. This will cause regeneration to stop upon completion of the next complete cycle. When the time delay initiated by the scan delay single shot 814 is completed, its output pin 6 will transmit a signal to the cathode follower 815, and via its output pin 7, to cause the scan control trigger 812 to be turned on. The delay provided by the scan delay single shot multivibrator 814 allows the output tape drives that have been selected to start operation and to come up to speed. Once this time has passed, the scan delay single shot 814 will produce a signal which will turn on the scan control trigger 812 by which the actual writing circuits associated with memory are controlled. The output pin 7 of the scan control trigger 812 will emit a signal which passes through a cathode follower 817, output pin 6, to a switch 818, and also to an inverter 819 (Fig. 159), and through its output pin 6, to turn on the column counter reset trigger 775. This trigger, as previously described, controls the resetting of the column counter. Thus, at this time the column counter will once again be reset to its zero location. Since the character and bit rings will be standing still at this time, no signal will be transplated through the switch 818 (Fig. 157). The scan control trigger 812 will also generate a signal, via its output pin 8, which is transmitted through a cathode follower 820 (Fig. 159), output pin 6, through an inverter 821 (Fig. 157), output pin 7, and to a switch 831 (Fig. 159), conditioning one of the control grids thereof.

As previously described, the one megacycle crystal oscillator 599 (Fig. 153) of the bit ring, generates signals which are transmitted through the amplifier 600 and the binary trigger 601, through the cathode follower 598 and to the bit ring, and also via the cathode follower 602, to a line connected to an inverter 823 (Fig. 158). By means of the binary trigger 601 of the bit ring (Fig. 153), only every other signal from the oscillator 599 will be transmitted to the inverter 823 (Fig. 158). These signals, therefore, have a time frequency of two microseconds. The inverter 823 feeds the first of a series of triggers 824 through 829 which form a counter constituting the scan timer. The counter is capable of counting 64 pulses from the bit ring trigger 601. Since the trigger 601 produces its output pulses at a repetition rate of two microseconds, the scan timer is capable of counting 128 microseconds.

The information written on an output tape is written at a repetition rate of 128 microseconds per character to allow for proper spacing of information on tape (character density of 100 characters per inch). For clarity, let it be said that from the time a character is written on tape until the time a succeeding character is written on tape is a total time of 128 microseconds. When the 128 microseconds scan timer (triggers 824—829) produces a carry pulse from the output pin 6 of the trigger 829, 128 microseconds have gone by and this pulse is transmitted through a cathode follower 830, output pin 7, to the switch 831 (Fig. 159), input pin 7.

The alternate control of the switch 831 has been previously conditioned, and as a consequence the signal will pass through the output pin 4 of the switch to once again turn off the ring control trigger 595 (Fig. 157). Turning off the ring control trigger 595 will allow the bit ring to restart and to go through at least one character cycle.

The column counter was previously reset to zero location, so when the bit ring is again allowed to start, the character in the zero location will be interrogated, and through circuits about to be described will be stored in an output register.

The signal from pin 4 of the switch 831 (Fig. 159) also is passed through an inverter 832 (Fig. 159), output pin 7, to a cathode follower 833, which emits the the W*w* signal at its output pin 7, and provides the timed pulses required to test the output register to write on the tape of the selected tape drive any data standing in the output register.

Once again one of the tape selecting triggers 270 or 276 (Fig. 134) will be selected with its associated input tape drive. The output signal of the selected trigger is transmitted (Store Control) through cathode followers 493 and 494, to switches 833, 834, 835, 836 (Fig. 170), as previously described. The trigger 270 or 276 (Fig. 134), on at this time, will select one of the two memory units as the output unit and the alternate memory unit as the remaining unit. This is done by controling the input pins 7 of the four switches 833–836.

As the bit ring progresses through its cycle and arrives at the first position of the character ring, the bit stored in the zero location of the counter and in the #1 position will be interrogated and regenerated in memory and it will also be transmitted, via the outbus shown in Fig. 173, and via the cathode follower 806 in this figure, to the set of switches 833 and 835 (from memory M1) or to the switches 834 and 836 (from memory M2).

Assume that memory M1 has been selected, the signal will then pass through the switch 833, through the output pin 4, to turn on a trigger 837, if the bit stored in this location is a dash. If the bit to be stored is, however, a dot the trigger 837 will remain in its normal reset position. The trigger 837 produces an output from its pin 7 which is transmitted through cathode followers 838—838*a*, output pins 6 and 7, respectively, to an inverter 839 (Fig. 171), input pin 5, and from where it is taken to checking circuits. The impulse emitted from the cathode follows 838—838*a* will indicate whether the bit in the given location is a binary –1– or a binary –0–, and this pulse will be transmitted on the line marked O bus (output bus).

The character in memory M2 at this time is also interrogated and is transmitted through to the switch 836, and through its output pin 4, to turn on a trigger 840. This trigger will emit a signal from its output pin, input 9, and from the inverter 842 to the checking circuits. The cathode followers 841—841*a* will also emit a signal on the line marked R bus (remainder bus), indicating whether the bit located in this position is a binary –1– or a binary –0–.

The signal generated from the cathode followers 838—838*a* is transmitted via the line O bus to a series of switches 845—851 (Fig. 175), comprising the inlets to the output register. The second control elements of all these switches are connected to the character ring triggers with which the bits under scrutiny are connected. Thus, if the one bit in memory is being interrogated, the one trigger in the character ring will be on and will condition the second control grid of the switch 845 to allow the dash signal, if any, to pass through the switch 845 via its output pin 4 to turn on a trigger 845*a*. Upon completion of the interrogation of the –1– bit, the character ring will advance to its second location, and the operation will be repeated. This time, however, the dash from the second location, if any, will pass through the switch 846 to turn on the trigger 846*a*. This operation is repeated progressively in respect to all bits of a character until the complete character is in the output register, triggers 845*a* through 851*a*.

Upon completion of a character operation, when a character is stored in the output register, the C.7 pulse will be allowed to pass through the switch 772 (Fig. 157), to once again turn On the ring control trigger 595 and to stop the bit ring operation. When the character is completely stored in the output register and the ring control trigger 595 is turned on by the C.7 pulse, through the switch 772, the character ring will return to its D position (trigger 613, Fig. 155), where it will remain until a new character operation is started.

Figure 175:
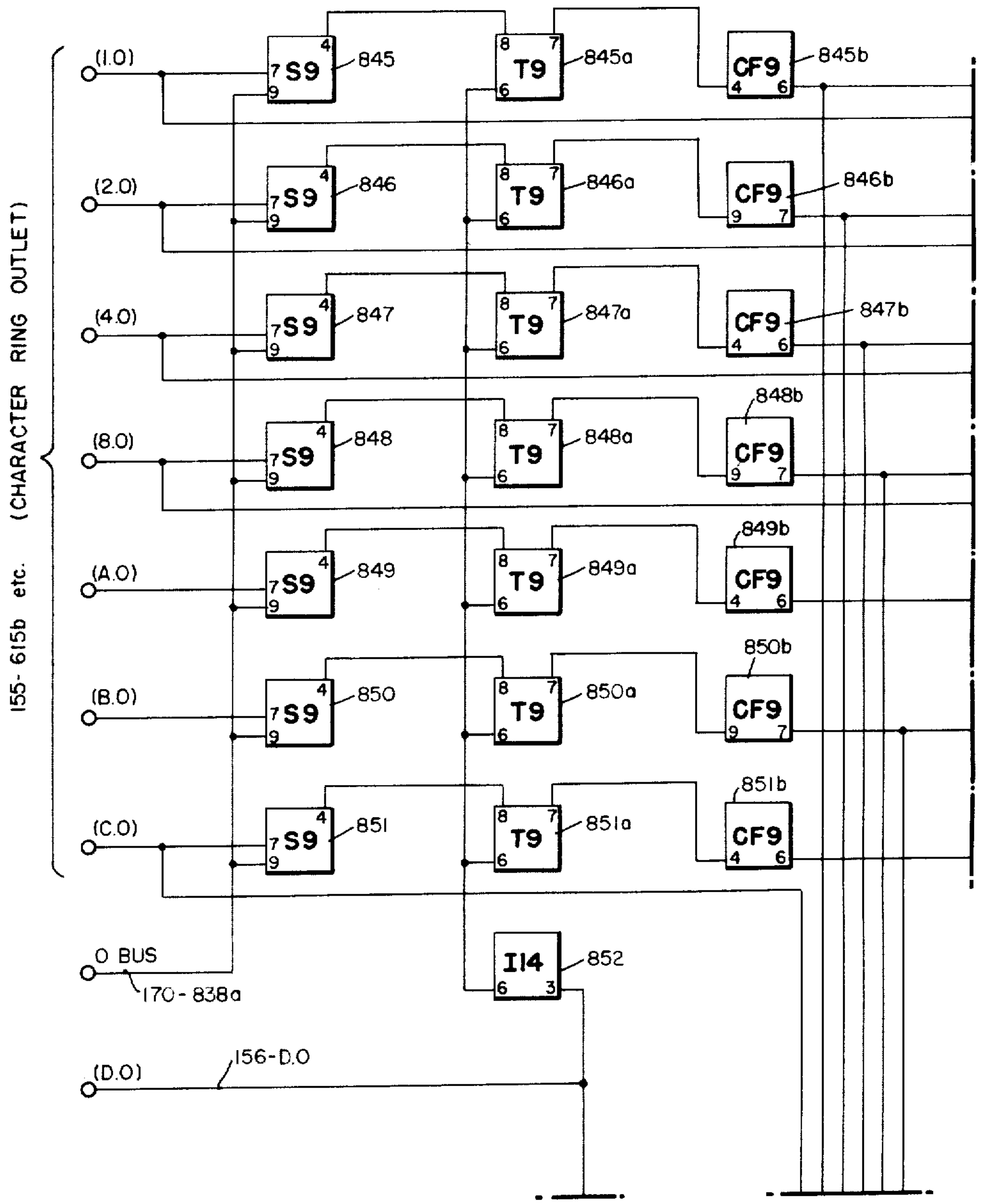
Figure 176:
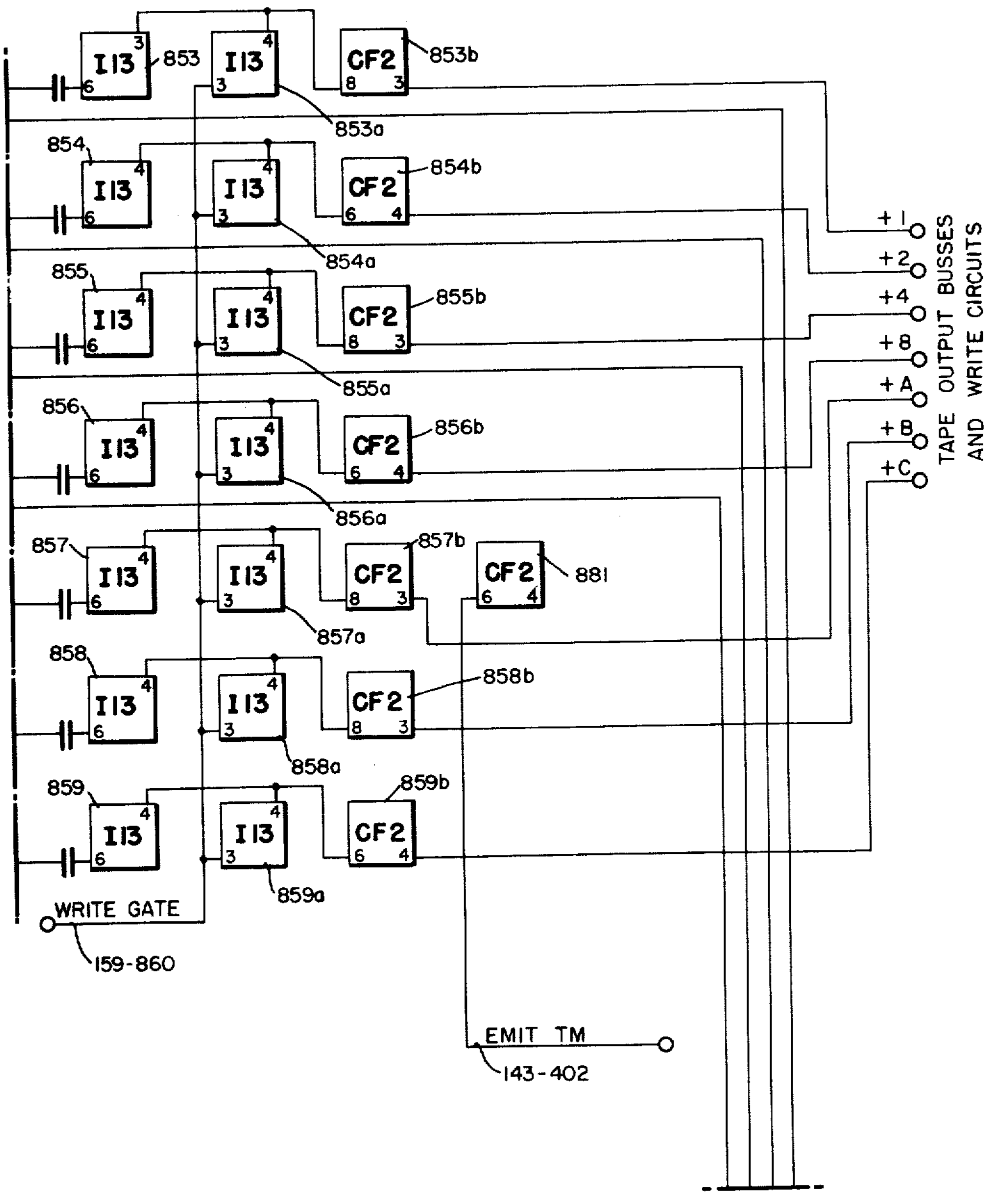

When the character ring arrives at its D position, the D.0 signal is generated and is emitted through the cathode follower 613*a* (Fig. 155) to an inverter 852, input pin 3, Fig. 175. This signal will pass through the inverter 852, output pin 6, to turn off all the triggers 845*a*–851*a* of the character register that were previously turned On.

Any of the triggers 845*a*–851*a*, previously turned on, and now turned off will generate a pulse through their associated cathode followers 845*b* through 851*b*. Pulses so generated will also pass through the respective inverter pairs 853—853*a* through 859—859*a* (Fig. 176), through the respective associated cathode followers 853*b*–859*b* and via the external cable to the write circuits in the tape drives themselves, where the character is written.

The inverters 853*a*–859*a*, input pins 3 are conditioned by the circuit now to be described. When the first character operation is begun, the character ring (Fig. 155) will advance to the E position (trigger 614), and via the coincidence unit 641 (Fig. 154), output pin 2, it will emit the E.4–1.0 signal which is transmitted through the cathode follower 650 (Fig. 154) and to switch 818 (Fig. 157) which turns On the scan gate trigger 814 (Fig. 159). From the output pin 7 of the scan gate trigger, a signal Write Gate is transmitted via a cathode follower 860 to the input pins 3 of the inverters 853*a*–859*a* (Fig. 176), thus conditioning this signal to allow the data to be written on tape.

The Write Gate signal from the cathode follower 860 (Fig. 159), output pin 7, will also be transmitted to a switch 861 (Fig. 158), conditioning one control element therein to allow passage of a record mark signal when a record mark is finally recognized.

The scan gate trigger 814 (Fig. 159) will also generate a signal which will be emitted from its output pin 8 and via a cathode follower 862, output pin 6, to the And circuit 787, and through a cathode follower 786, output pin 6, to reset the record mark trigger 788 (Fig. 158).

To summarize, the writing circuits in the machine are set up for the reception of the Write Start signal which turns on the scan control trigger 812 (Fig. 157) and the scan gate trigger 814 (Fig. 159) which provide the proper signals to allow writing to occur. This signal is available after the tape drives have started to run. The scan timer (triggers 824–829, Fig. 158) produces a time signal which is transmitted through the switch 831 (Fig. 159) and allows the ring control trigger 595 (Fig. 157) to make single character cycles.

These circuits have all been set up, the ring control trigger 595 has been turned on and a single character cycle has been allowed to take place. During this cycle, under control of the character and bit ring, and with the column counter reset to zero, the first character of a given record was taken from memory and was transmitted to the output character register comprising triggers 845*a*–851*a* (Fig. 175), from which it was emitted by a timing pulse, to circuits described, to the output buses, and from the output buses to the tape drives, where the character is written on tape. Upon each carry of the scan timer (triggers 824–829, Fig. 158), an additional character will be taken from memory to the output registers and from there it is written on tape.

It was previously established that when the character ring completes one cycle of operation the column counter will advance one position, so that the record will come out of memory in exactly the same fashion as it went in. This operation continues throughout the record.

*Character recognition in output register.*—For comparing purposes and control purposes, it is necessary to recognize various types of characters that may be emitted to the output register. Among these are record marks, and the blank and special characters. These recognition circuits are similar to those previously described in connection with the input character register #2. Thus, if there is no –1–, –2–, –4– or –8– bits, the absence of these bits will be recognized (Fig. 178) by inverters 864, 865, 866 and 867, respectively, and the output of these units will indicate a blank mark by way of an inverter 868 and a cathode follower 869. Special characters are recognized by the presence of both an –8– bit and a –4– bit in a switch 870 (Fig. 178), and the presence of either or both the –1– bit and the –2– bit in inverters 871 and 872, respectively. The coincidence of these conditions via inverters 873 and 874 will produce a signal by way of an inverter 875 and a cathode follower 876 that will be recognized as a special character. These two recognition operations are necessary for comparing purposes. In addition, it is necessary for control purposes, to recognize a record mark which indicates the end of the record being written. The absence of a –1–, –2–, –4– and –8– bit is recognized via the inverters 864, 865, 866 and 867, respectively, and a signal is emitted to one control element of an And circuit 877. The presence of a –B– bit in the output register with no –1–, –2–, –4– or –8– bits will be recognized in the And circuit 877 and transmitted through its output to one input of a switch 878. At C.0 time of the character ring, the switch 878 will be tested by a C.0 pulse from the switch to see if all the previously described conditions are true, and if they are it will transmit a signal via its output pin 4, through an inverter 879, output pin 6, and through a cathode follower 880, output pin 6, to produce the RMO(C.0) signal.

As previously described in connection with Fig. 143, a signal Emit TM is transmitted from the inverter 401, output pins 6 and 7, under control of the single shot multivibrator 398 and by way of the cathode follower 402, to write a tape mark on the tape of any output drives that may be running at this time. This signal is transmitted from a cathode follower 881 (Fig. 176), and passes through this unit via its output pin 4, to cause a bit to be written in the A track of all output tapes that are running.

It has been previously mentioned that the cathode followers 841—841*a* (Fig. 170) will simultaneously emit an R Bus signal via the output pins 6 and 7. At the same time the cathode followers 838—838*a* will transmit an O Bus signal via the output pins 6 and 7. It has been mentioned also that both of these signals are available to the comparator for control purposes.

Figure 177:
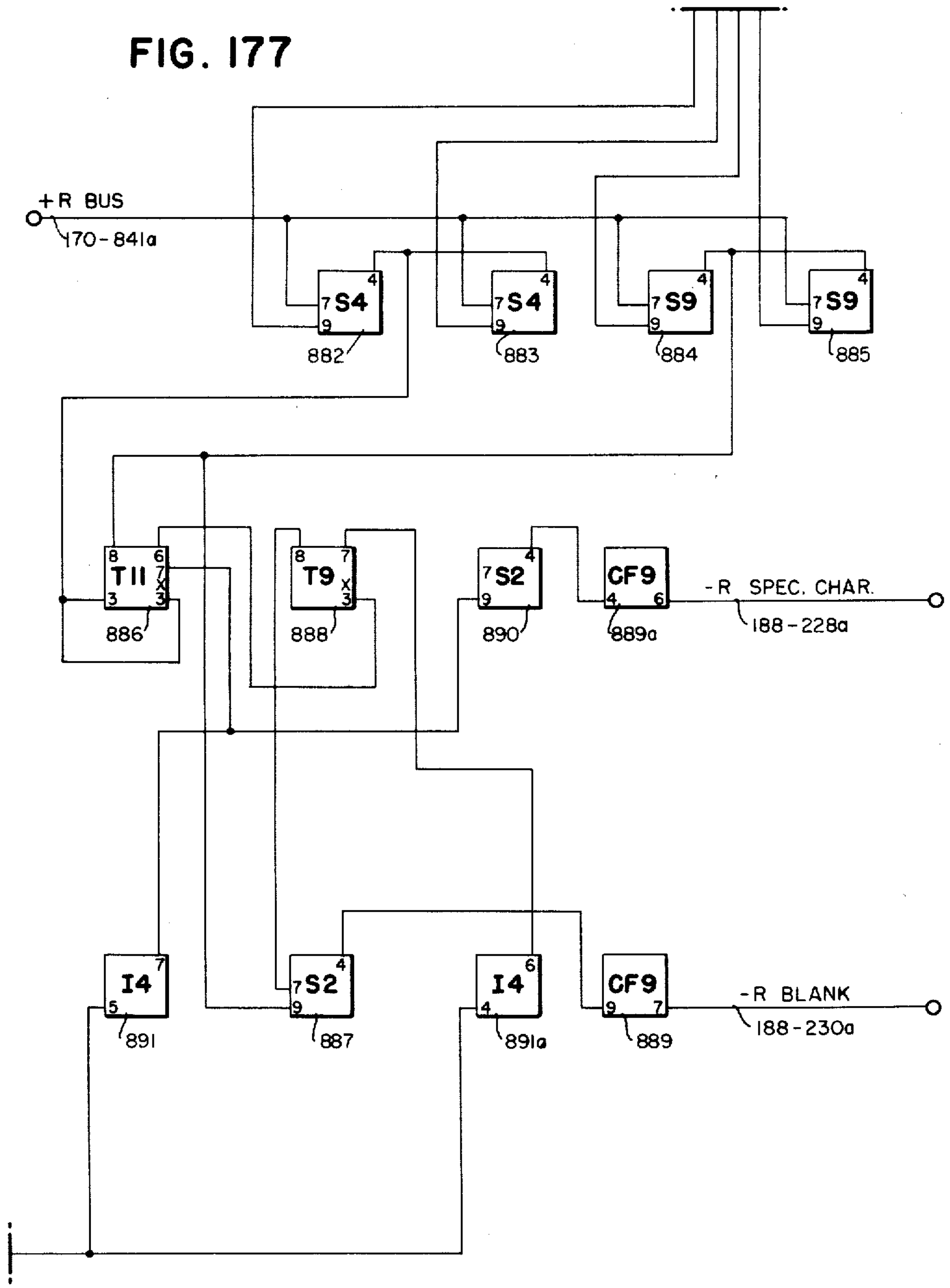

In order to recognize any special character that may occur from the R bus and thus from the remaining record in memory, a circuit has been provided from the output of the cathode followers 841—841*a* (Fig. 170) to a series of switches 882, 883, 884 and 885 (Fig. 177). It is via these units and additional circuitry that blank marks and special characters will be recognized as existing in a specified column of memory. The R bus will contain, at timed intervals, the seven bits required to indicate a character. To recognize special characters or blank marks, it is necessary only to interrogate or inspect the numeric portion of the character. This is done at these four switches by connecting to them the 1.0, 2.0, 4.0 and 8.0 signals (Fig. 156) generated by the character ring (Fig. 155). Thus, when the –1– bit is interrogated in memory and is produced on the R bus, the 1.0 signal entering the second control element with the switch 885 (Fig. 177) will be transmitted through this switch if there is a binary –1– in memory, and via its output to cause a trigger 886 to be turned on. Likewise, the –2– bit that will be inspected via the switch 884 may also turn on the same trigger. Thus, if either of these bits are present, the trigger 886 will be turned on.

The character ring advances to the –4– bit location, at which time coincidence may be provided in the switch 883 if there is a binary –1– from memory, and a pulse will be transmitted via the output pin 4 to cause the trigger 886 to reverse itself so that regardless of its previous condition it will end up in the opposite condition (binary action). The character ring advances to the –8– position, at which time coincidence may be formed in the switch 882, and a pulse may be transmitted via its output pin once again to cause the trigger 886 to reverse itself. If there is an odd number of bits from these four switches just described, the trigger 886 will be in the On position. A signal will be transmitted from the output pin 8 of the trigger 886 to the input pin 9 of a switch 887. This signal by itself is sufficient to suppress the recognition of a blank mark. If there had been an even number of bits from the four switches discussed, the trigger 886 would have reverted to its original position, thus once again conditioning this trigger for the switch 887. However, when the trigger 886 is turned off, the output from its pin 6 will turn On a trigger 888. A pulse at output pin 8 of the trigger 888 will be emitted to the second control element of the switch 887 and prevent recognition of a blank mark.

If no pulses are available from the four switches 882 through 885, then the triggers 886 and 888 will remain in their normal positions, thus conditioning the switch 887 to allow a signal to pass via its output pin 4 through a cathode follower 889, output pin 7, and to the R blank line, which produces a recognition signal indicating a blank character. The indication on the R blank line is not an absolute indication of a blank since there are other characters without numeric bits, but it is known that when such other characters occur no control purpose will be served by the R blank line. Therefore, an inspection of the numeric portion of the blank character will suffice.

Depending on the settings of the triggers 886 and 888, two pulses are derived from their output pins 7 which are transmitted to the input pins 7 and 9 of a switch 890, which if properly conditioned will transmit a signal via its output pin 4, through a cathode follower 891, output pin 6, which is in recognition of a special character.

Logically, this is known to be true since a special character of any type is composed of an –8– and a –4– bit, as well as either a –1– bit, a –2– bit, or both. Thus, when the trigger 886 is turned on by either a –1– bit or by a –2– bit, and then later is turned off by the –4– bit, the trigger 888 will be turned on. Upon reception of an –8– bit, the trigger 886 will again be turned on, thus at this time leaving both the triggers 888 and 886 on, which is an indication of a special character. Since this operation must be performed on every character cycle, the triggers 886 and 888 will be reset at the end of every character cycle. Thus, when the character ring produces the D.0 signal, it is transmitted to inverters 891 and 892, pins 5 and 4, respectively, and via the output pins 7 and 6, respectively, to reset the triggers 886 and 888.

*Output checking.*—A check is performed on the information leaving memory via the O and R buses (Fig. 171). All characters are composed of an odd number of bits per character. Thus, if a bit is either picked up or lost, an even number of bits will result. The machine is, therefore, organized to recognize the presence of an even number of bits and stop. The bit check circuits are as follows. For the O bus, the signals leave the cathode followers 838—838*a* (Fig. 170), output pins 6 and 7, respectively, and enter an inverter 839 (Fig. 171) which transmits them to a trigger 893. This is a binary element. At the start of any character cycle, the trigger 893 is reset in its off position, and since any character must always be composed of an odd number of bits, the trigger 893 should be On upon completion of one character cycle. The output pin 8 of the trigger 893 will transmit a signal to the input pin 9 of a switch 894. The input pin 7 of the switch 894 is controlled by an And circuit 895, which is controlled by the Write Gate signals generated from the scan gate trigger 814, via the cathode follower 860 (Fig. 159). The second half of the coincidence unit 895 (Fig. 171) is conditioned when the character is completely in the character register at D.0 time. Thus, at D.0 time during writing, the coincidence unit 895 will transmit a signal via its output pin 5, to test the setting of the trigger 893, via the switch 894. If the trigger 893 has counted an odd number of bits, the test pulse will not be transmitted through the switch 894, and it will have no further effect. If, however, an error had occurred, the switch 894 will pass the signal via its output pin 4 to turn on a trigger 896. The trigger 896 will transmit a signal from its output pin 7, which, via a cathode follower 897, output pin 7, is the Redundancy Error signal which is effective to stop the machine.

The redundancy check circuits for the R (remainder) bus are identical in every respect to those just described for the O (output) bus, and in Fig. 171 the circuit components for the R bus check having identity with those associated with the O bus (and being not otherwise identified) bear the same reference numerals with the exception that an *a* has been added to each thereof.

The redundancy check is also performed on the characters on the input bus powered from the switches 748, etc. (Fig. 168), via the inverter 762 and the cathode followers 763 and 763*a*. The pulses on the input bus are fed to the input pin 7 of a switch 898 (Fig. 171). When the store gate trigger 781 (Fig. 159) is turned on, as previously described, its output pin 7 will transmit a Store Gate (Reset) signal through the cathode follower 782, output pin 7, to the input pin 9 of the switch 898 (Fig. 171). Hereafter, no –1– bits stored from the input character register will pass through this switch to cause the binary trigger 899 to be operated. A coincidence circuit 900 will allow a signal to pass through this unit hereafter at every D.0 time to test a switch 901. Thus, if an even count of bits is noted in the binary trigger 899, the Redundancy Error signal will be passed from the switch 901 by its output pin 4 to operate trigger 902. The trigger 902 in turn is connected via its output pin 7 to a cathode follower 903, and via output pin 7 of the cathode follower 903 to the error stop circuits where a signal transmitted thereto will stop the machine.

Since all characters must have an odd count to be correct, the triggers 893, 893*a* and 899 must be reset to their off positions prior to the test of a succeeding character. This is done by taking the E.0 signal from the character ring via an inverter 904 (Fig. 171), and via its output pin 6 transmitting it to an Or circuit 905, inputs 5 and 8. The Or circuit 905 will transmit a signal from its output pins 4, 6 and 7 to reset the three triggers 893, 893*a* and 899 to their normal Off position.

Figure 168:
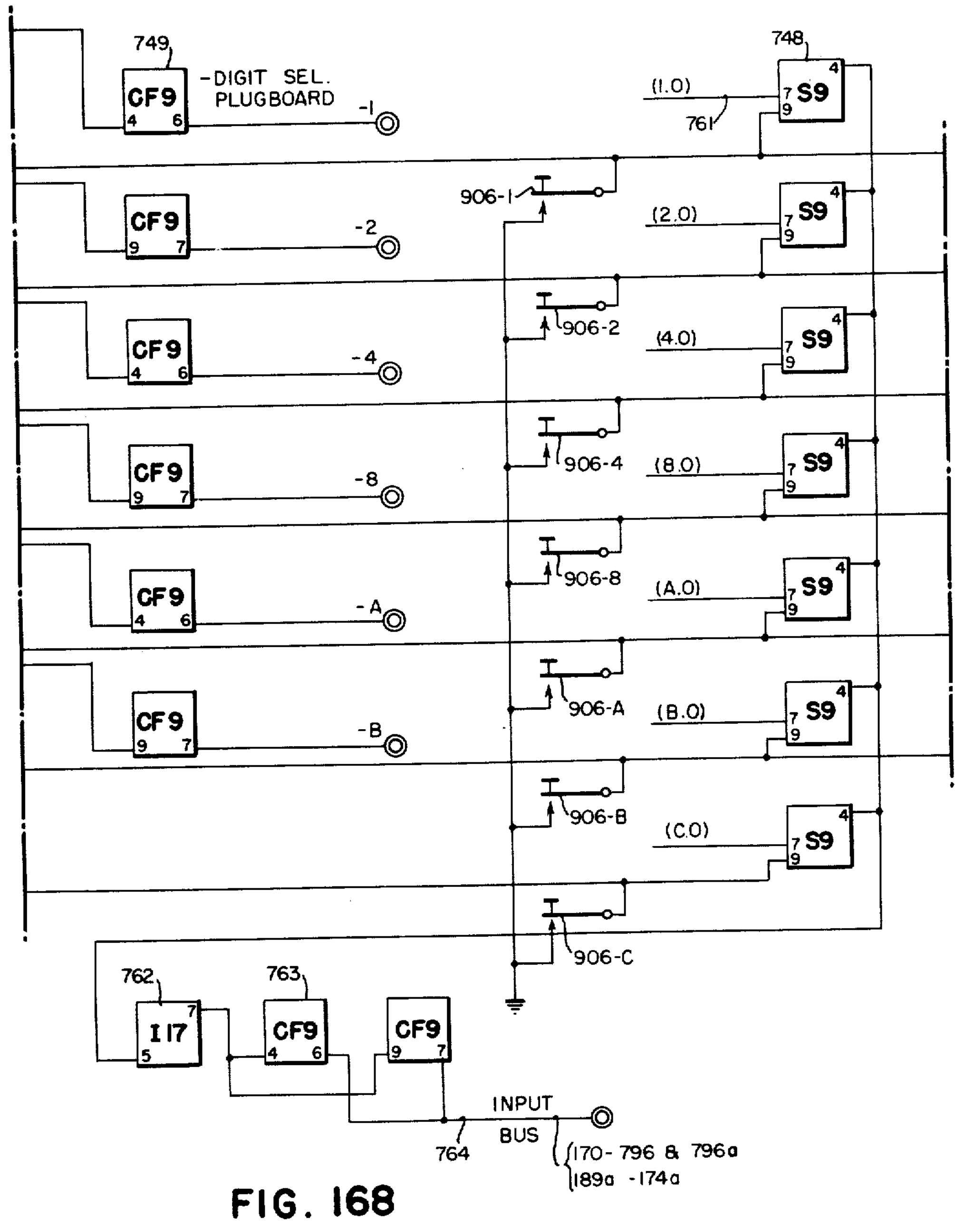

*Manual character insertion and error correction.*—It is desirable to provide means for correcting errors stored in memory. When a record is stored in memory column-by-column, the input character redundancy counter may indicate an error coming from tape, in which case the machine will stop. With no means for the correction of errors, the record is essentially of no use in any further processing. For this reason there has been provided circuitry capable of addressing any given location within memory and of storing in that location any substitute character generated by a setting of manual switches. These switches are shown in Fig. 168, and are marked 906–1, 906–2, 906–4, 906–8, 906–A, 906–B and 906–C. It can be seen that they control the lines that come from the second input tape register (register #2, Fig. 167), through the serializing switches 748, etc. (Fig. 168), and thence to the I bus. Thus, an operator may set these switches to any configuration, therefore inserting any character desired. If after a complete record is stored and an error is detected, the machine will stop. Upon examination of the raster in each memory tube, it can be determined in which column of memory the error exists, and also any other pertinent information. The column in error may be set up on a set of switches USS, TSS and HSS (Figs. 160 and 161) on the control panel corresponding to the column of memory in which the error lies. Upon ascertaining the proper character for this column, the manual entry switches (Fig. 168) may be set up to the proper configuration. Upon depression of the entry key, the character set up in the manual entry switches will be stored in the column designated by the selector switches. Thus, if in Fig. 168 the operator sets up a figure represented by bits –1–, –2– and –*C*– (indicating zero), and in Figs. 160 and 161 the selector switches USS, TSS and HSS are set up to the proper column, when this column is encountered during regeneration coincidence will be noted in a switch 907 (Fig. 171), and a pulse will be transmitted via its output pin 8 to an inverter 906, and via output pin 6 of the inverter through a switch 909. During all this time the machine will perform a normal regeneration operation. When the character ring turns on the E trigger (trigger 614, Fig. 155), a coincidence is established in the switch 909, and a pulse is transmitted via its output pin 4 to an entry key 910. Until the entry key 910 is depressed, the machine will remain in normal regeneration. Upon depression of the entry key 910, the next coincidence in the switch 909 will pass through the entry key to a switch 911 marked "drawer selector." The position of the switch 911 will in turn determine which of the two memories will receive the correction. If memory M2 is selected as the memory to receive the correction, a circuit will be completed to turn on the trigger 792 (Fig. 170). This trigger, as previously described, will break the regeneration loop in memory, and will allow storage of any character contained in the input register #2. In this particular instance, no character is contained in input register #2 and the manual entry switches which are effectively a third register condition the switches 748, etc. (Fig. 168), to allow the substitute character to be stored in this location of memory.

There are three selector switches (Fig. 171) associated with any given address in memory, the units selector switch USS, the tens selector switch TSS and the hundreds selector switch HSS. The selective setting of these three switches will determine the column in memory in which a change is to be effected.

For test purposes an additional location G (ground) has been added to all three switches. When the switches are set to the ground location, any character set up by the manual switches will be stored in all positions of memory when the entry key is depressed. In this mannar it is possible to insert any character into every position of memory at will. The manual entry key may be automatic or manual. That is, it may enter information only while held down, or it may be set to continuously insert into the specified memory location the information set up on the input switches. Thus, for testing purposes, it is possible to insert any character into memory via the normal circuits, thus facilitating error detection and correction of machine failure.

*Dot-dash circuits.*—It has been previously mentioned that the shapers 904 and 904*a* (Fig. 172) transmit signals to cause the control grids of the cathode ray tubes to be unblanked. It is important that the size and shape of the signals sent to unblank these grids be of a certain nature. To insure that the signal is of the proper amplitude and shape, clamp units 912 and 912*a* have been provided to clamp the size of these unblanked signals. Thus, the clamp 912*a* will not allow the signal to rise above ground potential when the shaper 804 or 804*a* is cut off. This clamps these lines to ground.

When the shapers 804 and 804*a* are conditioned to conduct, the points between the 10K and 470 ohm resistors will tend to fall below a given potential. This point will not be allowed to fall beyond the point established by the 82K and 120K resistors connected between ground and a power source. The voltage at their center point is the minimum voltage to which these unblanked lines will be allowed to fall, since if they attempt to fall below this voltage the cathode of the unit 912*a* will become negative in respect to their controlling grids, and will allow current to flow through the clamp, thus effectively clamping the cathodes at the potential of the grids associated therewith. Thus, if the lines used for unblank attempted to go beyond this potential, the current flow through the clamp 912 will hold these lines at a predetermined potential. The unblanked signals are, therefore, of a square shape with a predetermined voltage value. A left dot-dash line 913 (Fig. 172) is connected to the cathode ray tube at the left in Fig. 179. A right dot-dash line 914 is likewise connected thereto at the right in Fig. 179.

Thus, if a dash is to be written at any given time, the signal is transmitted through the condensers **913*a* and 914*a* (Fig. 179) to the control grids 915—915*a* of the associated cathode ray tube. This signal will allow the electron beam generated within this tube to strike the respective targets 916—916*a*. The cathodes, due to thermionic emission in cathode ray tubes, will emit uncontrolled electrons which will be controlled by the control grids 915—915*a*. Thus, while the control grids 915—915*a* are cut off, no electrons will flow past them. When the control grids are conditioned by the signal entering the dot-dash lines to allow electrons to pass, electrons will flow therethrough, through the focus and astigmatism control grids 917—917*a* and 918—918*a*, respectively, which pass the electron beam into a very fine stream. The beams then pass between the vertical and horizontal deflection plates 919—919*a* and 920—920*a*, respectively, and strike the target areas 916—916*a***, respectively.

As previously described, the vertical and horizontal deflection plates are controlled by voltages generated from the deflection circuits, and there are effective to cause the beam to strike a preselected spot on the face of the cathode ray tube.

The astigmatism control is a set potential generated from a voltage line. Since the astigmatism control potential is not critical, it is derived herein from a resistor network bridging the potential across the vertical deflection plates, and it is transmitted from there through another resistor and to the astigmatism control grids. Any variations in this voltage will be filtered, through the condenser shown, to ground.

The focus control voltage must be variable since the focus control will vary between various tubes of the same kind. The focus control is usually adjusted by the use of an oscilloscope to produce the best possible signal from the target area face plate and thence to the video amplifiers. Herein the focus is adjusted through the 500K potentiometers shown, which are connected from one side of a power source through the potentiometer, and from thence through an additional series of resistors to the other side of the power source. Thus, there is a constant voltage across the potentiometer. The center tap of the potentiometer may be moved to provide any adjustment required to achieve a sharp focus. Since the size of the signals on the dot-dash lines are fixed, it is possible to vary the intensity with which the electron beam strikes the target by controlling the bias put on the grid of these tubes through the potentiometers provided for this purpose.

The cathodes of the cathode ray tubes are commoned together, and through a 150 ohm resistor are connected to a power source. A second power source, somewhat more negative than the first, is provided. This power source is connected through a 2.2K–1 w. resistor, a potentiometer, and a 25K resistor to the first power source. Thus, across the potentiometer there may be selected some voltage to be used as bias for the control grid, since the potentiometer will be more negative than the cathode at all times. When a signal arrives at the condensers **913*a*—914*a*, the input signal is a square, regulated pulse. The signal passes through these condensers to the junction of resistors 913*b*—914*b***, respectively, and to the cathodes of a 6AL5 tube and also to the control grid of the cathode ray tubes. Since this signal is positive in nature, and is larger than the bias voltage applied to the control grid, the cathode ray tube will now allow current to pass from the cathode through the control grid, and the remaining elements of the tube to bombard the target.

The duration of the input signal is either one microsecond or five microseconds, depending on whether a dot (–0–) or a dash (–1–) is to be written on the target. At the end of the signal, the pulse entering condensers **913*a*—914*a* drops very sharply to its normal voltage level. The signal, however, on the other side of these condensers will not recover to its normal voltage immediately, since by normal condenser action the condensers will tend to over-shoot and to produce a voltage that is more negative than the normal potential applied to the control grids. When this condition occurs, the center point of the connection between the resistors 913*b*—914*b* and the cathode of the 6AL5 tube will become negative, and therefore current will now flow through the 6AL5 tube, via its plate and back through the resistors 913*b*—914*b*** to the center tap point.

Electrons will also discharge the current stored in condensers **913*c*—914*c*. The net effect of these circuits is to clip off the negative excursion of the condensers 913*a*—914*a* and cause the control voltage applied to the grids of the cathode ray tubes to recover to its normal point very quickly. Thus, when the next signal is transmitted into a dot-dash line, it will effect the normal control bias voltage applied to the grid of the cathode ray tube, instead of an R.C. voltage that may have been generated by the condensers 913*a*—914*a***.

The intensity of the cathode ray beam is controlled by the potentiometer shown which sets the bias level at which the cathode ray tube operates. For example, if the signal entering condenser **913*a* was of 40 volt amplitude and the bias at which the grid 915** of the left cathode ray tube is stationed was –30 volts, the input signal would cause the grid to become approximately 10 volts positive in respect to the cathode. By varying the –30 volts bias, the 10 volts point will also vary, since it rides 40 volts above the selected bias. Thus, by allowing the input signal to cause the control grid to become more or less negative with respect to the cathode of the cathode ray tube, a variable stream of electrons may be released to bombard the target, and as such to control the intensity. The circuitry for both of the memory tubes in a memory cell is identical.

When eventually a character is inserted into the output registers (Fig. 175) and is recognized as a record mark, this signal is emitted from the cathode follower 880 (Fig. 178) via output pin 6. This signal is transmitted to the tape drive control circuitry previously explained, and also to the Or circuit 808 (Fig. 158), input pin 6. This signal will pass through the Or circuit 808 via its output pins 5 and 8, and through the switch 809, output pin 7, to turn on the record mark trigger 788. As previously described, the output pin 7 of the record mark trigger 788 is connected via the cathode follower 810, output pin 6, to the inverter 811, and from it, output pin 8, to turn off the scan control trigger 812 and the regeneration control trigger 770 (both Fig. 157). The scan control trigger 812 now being turned off will decondition circuits previously conditioned to allow writing.

The signal from the cathode follower 810 (Fig. 158), output pin 6, is also transmitted to the switch 813, previously described, where the time signal D.4–E.0 is transmitted through this switch via its output pin 4, to turn off the scan gate trigger 814 and the store gate trigger 781 (both in Fig. 159). Turning off the scan gate trigger at this time deconditions the write gate. The switch unit 861 (Fig. 158) that received the RMO(C.0) signal is conditioned to allow this signal to pass through, since the scan gate trigger 814 had been previously turned on to indicate a writing operation. During the time that writing was occurring, the signal previously described as generated from the switch 813 (Fig. 159), is transmitted via the inverter 832 and is emitted from the cathode follower 883 (both in Fig. 159) as the Ww pulse, which is transmitted from the tape drive control circuitry to the inverter 472 (Fig. 134), input pin 5. The functions of this signal were described in a previous section. Thus, a writing operation has been completed.

*Output record grouping.*—It is desirable under certain conditions to take a record of sime given size and to break it down on the output tapes in such fashion that there will be a one inch gap between one column and a succeeding column of the same record, thereby adapting a record tape so written to control the punching of such subdivided records into punched cards. An operator may wire the control panel spacer hubs from a given column of a record following which a space is to be inserted. When the machine is in a writing cycle, and this column is sensed, a coincidence is set up in a switch 917 (Fig. 157), and a signal is transmitted from its output pin to an inverter 918, and via its output pin 7 to a switch 919, input pin 9. At a set test time, the setting of this switch is interrogated, and if the tape column is now available a signal is transmitted from the output pin 4 of the switch 919 to initiate a single shot multivibrator 920. The test pulse (E.0) for the switch 919 is generated at the E position of the character ring, so that the single shot multivibrator 920 is fired at E.0 time of the cycle.

The single shot multivibrator 920 will transmit a signal from its output pin 6, through an inverter 921, through its output pin 6, and via the cathode follower 820 (Fig. 159), and also via the inverter 921 to decondition the switch 831.

During the time that the single shot multivibrator 920 is fired then, the switch 831 will not allow any of the timing pulses from the scan timer (triggers 824–829, Fig. 158) to pass through the switch 831 to initiate a new interrogation of memory for further writing. Effectively then, it stops writing of information from memory to tape. The timing device is organized in such manner as to allow one inch of tape on the tape drives then being fed to pass the writing head, during which time no writing will occur. After this time the single shot multivibrator 920 will have fired, and upon receipt in the switch 831 of a new pulse from the write timer, the next character from memory will be interrogated and written.

*Record mark check.*—Provision is made to stop the tape, throw the machine into normal regeneration and to indicate an error in case of failure of the record mark recognition circuits or if an error exists in the record mark on tape. The record mark trigger 788 (Fig. 158) as previously described is turned off at the start of either a reading or writing operation, and is turned back on upon completion of each of these operations. If, during a reading cycle, a record is stored in a memory that is less than 200 columns in length, but due to failure of record mark recognition, a second record is also stored with it, the column counter will advance with the second record just as though it were a continuation of the first record. This is an error. Since a record can never exceed a length of 200 columns, if the column counter carries during any storing operation, the counter carry pulse generated in the trigger 630 (Fig. 161) and emitted from the cathode follower 688, output pin 7, will control a switch 920, input pin 7 (Fig. 158).

Since a reading operation has been initiated, the record mark trigger 788 will be Off, and it will, therefore, allow the counter carry signal to pass through the switch 920, output pin 4, through an inverter 921, output pin 7, and through a cathode follower 922, output pin 7, as the signal RM Error which is transmitted to the error circuits via the inverter 922*a* (Fig. 144), trigger 922*b* and cathode follower 922*c* to the line 390, previously described, to stop the machine.

The record mark error signal is also transmitted via an inverter 823 (Fig. 157), and through its output pin 6, to turn off the ring control trigger 595, to cause the machine to go into a normal regeneration cycle. In addition, the signal from the cathode follower 922 (Fig. 158), output pin 7, is transmitted to the Or circuit 808, input pin 3, and via its output pins 5 and 8 to the inverter 809, output pin 7, to turn on the record mark trigger 788. When this trigger is turned on, the storing operation is ended, thus completing the circuits required to regenerate what is in memory.

When a tape mark is recognized in the input character register #2 (Fig. 167), the signal is transmitted through circuitry previously described, via the cathode follower 739*g* (Fig. 169), output pin 7, and to inverters 925—925*a* (Fig. 158), input pins 5 and 4, respectively. Upon recognition of a tape mark, the reading operation then being performed must be stopped, since there is no further valuable data on that input tape. The circuitry required to stop the tape drive was previously described in the section herein relating to the tape drive controls. In addition, the machine circuitry must be set up so that once again normal regeneration will occur and all storing functions will end. It is also desirable to prevent storage of this tape mark character in memory.

Since it is conceivable that the input reel may be replaced with a new reel of tape and the new reel of tape may have to be compared again, this particular location of memory is for comparing purposes. The character cycle which was started upon reception of a character in the input character register #2 proceeds to the E.0 time at which the character is recognized, and a signal is transmitted through the inverters 925—925*a* (Fig. 158), to turn off the scan control trigger 812 (Fig. 157) and the regeneration trigger 770. Turning off the regeneration control trigger 770 will allow the machine to go into a regeneration cycle, via circuitry from its output pin 7, which has been previously described.

A signal will be available at output pin 6 of the inverter 925*a* to turn off the trigger 769 (Fig. 159). When the character gate trigger 769 is turned off, it will prevent the E.4 pulse from passing through the switch 781, and therefore it will not allow the store gate trigger 781 to be activated. Thus, the machine regeneration circuits will not be deactivated when a tape mark is sensed from tape.

The normal resetting of the character gate trigger 769 occurs upon a pulse from an inverter 926 at 1.0 time (Fig. 158), output pin 9. Since this does occur at 1.0 time, the E.4 pulse at the switch 781 (Fig. 159) will pass therethrough to set up storing operations at times other than at the sensing of a tape mark.

Te register trigger 779 (Fig. 159) will be allowed to turn on under control of the switch 778 at D.4 time, since this time is prior to the recognition of a tape mark in the input registers. The operation of the register trigger 779 will cause the transfer of the tape mark from one register to the second. Upon recognition of the fact that this character is a tape mark, a signal will be received at the input pin 5 of an inverter 927 (Fig. 159), which will pass through its output pin 7, to turn off the register trigger 779. When the register trigger 779 is turned off, a signal is generated at its output pin 8, which, via a cathode follower 928, output pin 7, is transmitted to the input pin 5 of the inverter 744 (Fig. 166). This signal will be emitted from the output pin 7 of the inverter 744 to reset all the triggers in input register #2.

At D.0 time during operations other than those involving the tape mark, a pulse will be passed through the switch 778 (Fig. 159), which, via its output pin 4, turns off the register trigger 779. Thus, it can be seen that when the trigger 779 is turned on, the input register #1 will be reset and its contents will be transferred to input register #2. When it is turned off again, the contents of input register #2 will be transmitted to memory.

*Digit selector.*—The digit selector (Fig. 180) is in effect a large And and Or circuit. It is desired to sense the character representing pulse for coincidence that may be wired on the control panel by the operator. It may be necessary to look for a special configuration representing a specific character, to look for this character from a given tape drive or drives and to look for it in a specified column. If this digit is located under these conditions, it is desirable to transfer a selector associated with the digit selector, so that any signal wired into the common hub will be emitted from the transfer hubs. If a coincidence of all these given conditions is not noted, then it is desirable to transfer the selector into what may be called its normal location where any signal entering its common hubs will be emitted from the normal hubs. The hubs on the control panel marked T1 and T2 are exit hubs which are energized by impulses generated by the select T1 and select T2 triggers 207 and 276, respectively (Fig. 134). The signals are transmitted through cathode followers 929 and 930, respectively. These circuits have been previously described, it having been shown that when tape drive T1 is selected, a signal will be emitted from the T1 hub (Fig. 180) into any of the common hubs to which the T1 hub is wired.

Either or both tape drives may be wired to the common hubs. The signal is received by the digit selector circuitry (Fig. 180) and by a switch 931, input pin 7. Thus, if tape drive T1, for example, is wired as shown, but in tape drive T2, when tape drive T1 is selected, the switch 931 will be properly conditioned. When the machine is in reading status and the signal On Read is present, a signal will be provided at the input pin 9 of the switch 931. This signal will pass through the switch 931 to its output pin 4 and to an inverter 932, input pin 3. The output pin 6 of the inverter 932 is connected to the input pins 9 of the switches 933 and 934, and to the output pin 7 of an inverter 935. Thus, if tape drive T1 is selected and is wired on the control panel, the inverter 932 will provide one conditioning pulse for the switches 933 and 934. Depending on the configuration of signals wired on the control panel to the center hubs (those above the hubs marked blank on the control panel), a coincidence will occur when the character in input register #2 provides signals to the hubs wired on the control panel. The hubs in the digit selector are energized from the output hubs shown in Figs. 167 and 168.

The wiring shown in Fig. 11 is that required to identify the digit zero, the digit zero being composed of a –1– bit, a –2– bit, no –4– bit, no –8– bit, no –A– bit, no –B– bit but a check bit –C– which is not used in digit selection. Thus the wiring shown on Fig. 11 entering the center hubs will provide pulses that will enter the circuitry of the digit selector (Fig. 180) in the following manner. The pulse from the –1– hub will enter an inverter 936, input pin 5, that from the –2– hub will enter an inverter 937, input pin 3, that from the –4– hub will enter an inverter 938, input pin 3, that from the –8– hub will enter an inverter 939, input pin 5, that from the –A– hub will enter an inverter 940, input pin 5, and that from the –B– hub will enter an inverter 941, input pin 3.

If the character standing in input register #2 is the character set up on the control panel digit selector, the exit hubs on the digit selector will emit signals via the wiring shown to the input inverters of the digit selector. The output pins 6 and 7 of these inverters are all connected together, and are connected to the switch 934, input pin 7 and to an inverter 942. The inverter 942 provides an output opposite to that of its input. Thus, if the output of the inverters 936–941 indicate no coincidence to the switch 934, the inverter 942 will indicate coincidence to the switch 933.

The control panel hubs shown in Fig. 11 show the column counter wiring from column 014 to the hundreds, tens and units hubs in the digit selector. When this column is in input register #2, pulses from these three hubs will form a coincidence in a switch 943, inputs 3, 5 and 6. The signal will pass from output pin 8 of the switch 943 to an inverter 944, input pin 5.

When the character is stored in memory, the character ring will advance from the D position to position E, etc., until it arrives at its C position, at which time a test pulse will be generated from the C position which is transmitted to the inverter 935, input pin 5. At this time, if the character in the register is correct, as it is in this example, the C.0 signal will pass through the inverter 935, and out its output pin 7. At this point the inverters 944, 935 and 932 form a three-way coincidence circuit which allows a signal to pass through the switch 934. The signal is emitted from the output pin 4 of the switch 934 to turn on a trigger 944 and conditions one control element of a switch 945. This operation occurs at C.0 time of the cycle during which this character is stored in memory.

At 2.0 time of the following cycle (store or regenerate), the 2.0 pulse will test the second control of the switch 945 together with that of a switch 946. The signal will not pass the switch 945 because of the conditioning previously mentioned. The output pin 7 of the trigger 944, however, conditions the switch 946 to allow the 2.0 pulse to pass through the output pin 4 thereof and from there to turn on a trigger 947. This completes the operation of the digit selector when coincidence is noted in respect to the proper digit, the proper column and the proper tape drive.

At a later time a signal may be emitted into the hub marked C on the control panel from, for example, the plug to C hub, as shown, and the signal will enter an inverter 948, input pin 4, and will transfer through this unit, via output pin 6, and to inverters 949 and 950, inputs 3 and 5, respectively. The trigger 947 having been previously turned on will transmit a deconditioning pulse from its output pin 7 to the input pin 3 of an inverter 951 so that the signal entering input pin 3 of the inverter 949 cannot proceed through the circuit.

The trigger 947, output pin 8, conditions an inverter 952, input pin 5, in such manner as to allow this test signal to pass through the inverter 950, output pin 6, and from there by way of a cathode follower 953 to the transfer hubs marked T on the control panel. This impulse may be wired, at the operator's option, to control further operations via the control panel.

If, however, for any reason the coincidence of the selected tape drive or digit in the character register does not match this operation, the switch 934, previously mentioned as passing a signal to control the digit selector, will not be conditioned to allow this signal to pass. Instead, the pulse passed to the switch 933 will be allowed to pass through its output pin 4. This signal will be transmitted to turn off the trigger 944. Turning off of trigger 944 deconditions the switch 946 previously used.

The 2.0 signal previously passed through the switch 946 will now pass through a switch 945, output pin 4, to turn off the trigger 947. Turning off trigger 947 will decondition the inverter 952, pin 5, so that the signal entering the common hubs to input pin 5 will not pass through the inverter 950, but will now pass through the inverter 949, input pin 3, through a cathode follower 954, output pin 7, and to the normal hubs marked N on the control panel. In this application (Fig. 11), these hubs are not wired.

This digit selector is so designed that no test is performed on the digit in the character register until the proper column has been located by the coincidence unit 943. Until this time then the digits will not be inspected for values. Likewise, these digits will not be inspected if the tape drive selected for inspection is not addressed, nor will the digit be sampled during any writing operation. Thus, the selector associated with the digit selector will be transferred only upon coincidence of the proper tape drive, the proper column, and the proper character wired, and will remain transferred until at a later time the same tape drive and the same column will be inspected and be found not to contain the desired digit. At such time the selector will be transferred back to its normal condition.

*Selectors.*—On the control panel (see also Fig. 181) are four units labeled selectors. These selectors have a series of hubs marked On, Off, D Off (delayed off), C (common), Normal and T (transfer). The operation of the selector may be likened to the operation of a double-throw switch, in that any impulse entering a common point will be emitted from either of two other points. In these selectors, any signal entering the common hubs will be emitted either from the normal or the transfer hubs depending on the selector. The hubs marked On, upon reception of a signal, will turn this selector on, completing the circuit from common to the transfer points. The hubs marked Off, upon reception of a signal, will turn the selector off, completing a circuit from the common to the normal point of the selector. The hubs marked Delayed Off will likewise complete a circuit from the common to the normal hubs, but will not perform this function until one machine cycle later.

The circuitry required for one selector is shown in Fig. 181. There are four such selectors within the machine, and since they are duplicates of each other a description of the one shown in Fig. 181 will serve as a description of all four. In the description of the circuitry there will be mentioned, therefore, the locations of the units associated with only the first selector. When the On hub receives a signal on the control panel, the signal will enter the On hub (Fig. 181) and pass into the input pin 4 of an inverter 954. The signal will be transmitted from the output of the inverter 954, pin 6, and will turn on a trigger 955. Hereafter, any hub wired into the hubs marked C on the control panel (common hub, Fig. 181) will enter the input 4 of an inverter 956 (Fig. 181) and will be emitted from its output pin 6 to the two inverters 957 and 958, input pins 3. The output pin 8 of the trigger 955, now On, will condition an inverter 959, input pin 5, in such fashion as to allow the signal entering the input pin 3 of the inverter 957 to exit from the output pin 6 thereof to a cathode follower 960, through output pin 6, and to the transfer hub (marked T on the control panel). Thus, a circuit is completed from the common hub to the transfer hub when this selector is turned on.

The circuit through the normal hubs will not be complete, since the output pin 7 of the trigger 955 will decondition an inverter 961 and prevent the passage of this signal through the inverter 958. At a later time, the signal may be transmitted to the selector Off hubs on the control panel. The signal will enter the circuit of Fig. 181 via an inverter 962, input pin 4, and pass through this inverter, output pin 6, to turn off the trigger 955. Since the trigger 955 has now been reset to its original location, any signal entering the common hub on the control panel will now pass through the inverter 958, instead of the inverter 957, as previously, to be emitted through the cathode follower 961, output pin 7, to the normal hub on the control panel.

If the selector has been previously turned On and is not to receive a delayed off signal at the hubs marked D Off on the control panel (Delayed Off Hub, Fig. 181), a signal will be sent to an inverter 963, input pin 5, and via the output pin 7 of the inverter 963 to turn on a trigger 964. This action in itself has not yet turned off the selector, so that any signal in this machine cycle entering the common hub will still be emitted through the transferred hubs.

In operation of the system, the next function to be performed will be a writing operation. Thus, after the next selection of input and output drives is made via the control panel, a writing cycle is performed at the end of which is sensed a record mark at C.0 time, RMO(C.0), as previously described. This signal is transmitted from the cathode follower 880 (Fig. 178) to the trigger 965 (Fig. 181), input pin 6, to turn off this trigger. When the trigger 965 is turned off, its output pin 8 will generate a signal which will turn off the trigger 955. When the trigger 955 is turned off, it will reset the selector to its normal off position. The operation of the selector may, therefore, be delayed for a one machine cycle by means of the circuitry just described.

*Cycle delay.*—There are two identical cycle delay units in the system; one of these units is shown in Fig. 182. Each cycle delay unit has two sets of hubs in the control panel, one marked In and one marked Out. The circuitry including these hubs is shown in Fig. 182. When a signal is entered into the In hubs of the cycle delay unit, it will enter an inverter 966, input pin 4, and will pass through the inverter 966 via its output pin 6, to turn a trigger 967 On. Turning on of trigger 967 influences no operations at this particular time. The RMO(1.0) signal emitted from the inverter 260 (Fig. 131), as previously described, also enters an inverter 969 (Fig. 182), input pins 4 and 5, and passes through this inverter and through its output pins 6 and 7, to turn off the trigger 967. When the trigger 967 is turned off, it will generate a signal from its output pin 8 to turn On a trigger 970. When the trigger 970 is turned on, a signal will be generated at its output pin 8 which enters an inverter 971, input pin 5, and conditions the inverter which is one-half of a two-way And circuit. An inverter 972 (Fig. 182), input pin 3, receives a minus signal on compare time transmitted from the cathode follower 306, output pin 7 (Fig. 133). Because of the coincidence of pulses in the inverters 971 and 972, previously described, this signal will pass through the inverter 972, and through a cathode follower 973, via output pin 7, to the out hub in the control panel section of the cycle delay unit.

Once again the same operation takes place here as took place in the operation of the delayed Off hubs of the selectors. During the selection time on the control panel (selection of tape drives, etc.), a signal may have been entered into the In hubs of the cycle delay unit and may have been stored within the system. The next operation of the machine will be to perform a writing cycle at the end of which the record mark at 1.0 time, via inverter 969, is used to transfer the In signal pulse to a second storage element which, on the following selection cycle (tape drives, etc.) will emit a signal from the Out hub of the cycle delay.

*Odd-even hubs.*—There are a set of hubs on the control panel called odd-even units #1 and #2. Essentially their operation allows all the odd numbered signals, in a time scale, that are entered into the In hubs to pass from the odd hubs and the even count signals from the even hubs. Thus, the first signal entering the In hub will be immediately available at the odd hub. The next signal sent into the In hub will be emitted from the even hub. The third signal into the In hub will be emitted from the odd hubs again, etc. In most operations, these two units are identical in every respect.

During a sorting operation it is necessary to cause the #1 unit to operate differently. In wiring a sorting operation it is necessary, upon the reception of the last bit of information from one of the two input tapes, to hold the #1 odd-even unit in the even position until all remaining information has been transmitted from the unfinished input tape. Circuitry involved in these particular units is shown in Fig. 183.

When a signal is entered into the #1 odd-even input hub (Fig. 183), the signal is transmitted to inverters 973—973*a*, input pins 4 and 5, respectively. This signal will be transmitted from the output pin 7 of the inverter 973*a*, and will pass to inverters 974—974*a*, input pins 5 and 9, respectively. Since, presumably, this is the first signal to enter the input hub, it is desired that it be emitted from the #1 odd output hub immediately. A pair of triggers 975 and 976 until now have been in their reset position and will remain so for a short time. The output pin 7 of the trigger 976 will condition an inverter 977 via input pin 5, so that the And circuit which it forms with the inverter 974, input pin 5, will be conditioned to allow the pulse from the In hub to pass through the inverter 974, via its output pin 7, and through a cathode follower 977, output pin 7, to the #1 odd output hub (marked Odd on control panel).

At the time this is taking place, the inverter 973, via its output pin 6, will turn on the trigger 975. At this time no further operation takes place in the odd-even units.

Upon completion of the next writing operation, the inverter 969 in the cycle delay units (Fig. 182), transmits a record mark signal RMO(1.0) from its output pins 6 and 7, to turn off the triggers 975 (Fig. 183), generating a signal from its output pin 8 to operate a binary trigger 976. This trigger will now be turned on. Since the trigger 976 is turned on, the coincidence circuit formed by the inverters 977 and 974 will not be deconditioned, while the coincidence unit formed by inverters **977*a* and 974*a* fed by trigger 976** will now be conditioned. Since no pulse is available at this time at the In hub of the odd-even unit, no pulse will be transmitted from its Out hub at this time.

Upon completion of this entire machine cycle, another impulse may be available at the #1 odd-even input hub of the odd-even unit. If so, once again it will be transmitted through the inverter 973, input pin 4, to turn on the trigger 975, as previously described. It will also be available at the inverter **973*a*, input pin 5, and via its output pin 7 to the inverters 974–974*a*, input pins 5 and 9, respectively. It has been stated that the trigger 976, output pin 8, has conditioned the inverter 977*a*, input pin 5, to form coincidence of pulses in the switch 974*a*. Since a trigger 978 is in its reset position, never having been operated, its output pin 7 deconditions a switch 979, so that its output pin 6 will provide a coincidence pulse in the switch 974*a*. Therefore, the signal available at the In hub of the odd-even unit will pass through the coincidence units 977*a* and 974*a*, through the output pin 6 of the switch 974*a*, and through a cathode follower 980, output pin 6**, and from there to the #1 even-output hub on the control panel.

At the end of the next writing cycle, the record mark signal RMI(1.0), previously described (Fig. 182), will again operate the trigger 975, resetting it and generating a pulse from its output pin 8 to flip the trigger 975, so that it reverts to its original position. Thus, the next signal entering the In hub will be emitted from the even hub again. The #2 odd-even unit up until this time has operated in identical fashion.

The odd-even unit #1, in addition to the operations previously described, must be capable of being locked in the even position as a requirement of the sorting operation. When eventually a tape mark is sensed and the run-out key is depressed, a signal will be generated from the trigger 417 (Fig. 132), output pin 7, as previously described. This signal is used to turn on the trigger 978 (Fig. 183), input pin 3. The signal will be transmitted from the output pin 7 of the trigger 978 to condition one control element of a switch 979. When the cathode follower 349 (Fig. 133), output pin 6, emits a test gate signal, as previously described, the signal will be transmitted through an inverter 981 (Fig. 183), input pin 5, through its output pin 7, and to the second control element of the switch 979, thereby allowing the signal to pass through its output pin 6, and to the input pin 7 of the switch **974*a*. The signal will pass through the switch 974*a*, output pin 6, and through the cathode follower 980, output pin 6**, to produce an output to the control panel, via the #1 even-output hub, even though no signal has entered the In hub. This is the signal used in the control of sorting operations.

Upon completion of the next writing cycle the signal generated in the inverter 969 (Fig. 182) will turn off the trigger 978 (Fig. 183), generating an impulse from its output pin 8 which will turn on a trigger 982. The pulse at output pin 7 of the trigger 982 will be transmitted to an inverter 983, and via its output pin 6, to hold the trigger 976 in the On position, regardless of the pulses sent into the In hub of the #1 odd-even counter. Hereafter, all signals sent into the #1 odd-even unit will be emitted from the Odd hub.

*Comparison sequence and control.*—Information is brought into the system from input tape drives, one complete character at a time. This information is taken from the input registers and stored into memory one bit at a time on seven successive operations, at which time the character is fully stored in memory. As information coming from tape is stored in memory, the several bits comprising a character are available for comparison. As one bit is taken from the input register and is prepared for storage in the memory device just prior to its storage, the information now stored in the memory location about to be used for the incoming bit is interrogated and is stored in a trigger outside of memory. The bit taken from memory and placed into trigger storage corresponds positionally to the bit about to be stored, and therefore is in the same column and the same bit location as the unit to be stored. Since this bit is being written on tape and is about to be destroyed in memory, it is called the output bit of the output character. At the same time that the output bit is being interrogated and stored outside of memory, the second memory cell, the beam of which has been deflected to the corresponding memory location by the common deflection circuits, will also interrogate the bit stored in this cell at the corresponding bit location. This character is also regenerated in this memory. The character from the second memory cell is stored in a trigger outside of memory as the remainder bit of the remainder character, since it is the one of the two compared records that is to remain in memory.

Thus, at this time there will be available for comparison purposes, three single corresponding bits of corresponding characters, namely that of the input character, that of the output character and that of the remainder character. Any comparisons of these bits to be made must be performed within the memory cycle in which they are being interrogated or stored, since in the next bit ring cycle the next succeeding bit of the same character or the next character will be interrogated, and likewise compared.

The control panel may be selectively wired to designate any part of a record as the control field for various comparing operations. Thus, Fig. 12 shows column 035 wired as the start of a minor control field and column 069 wired as the end of the same field. The intermediate and major control hubs may also be wired to different column locations within the record to indicate intermediate and major control fields. By this means it is possible to designate three isolated or three separated control fields (major, intermediate and minor) selected within a record in any sequence and yet to effect a comparison of complete records in these selected fields under control of the major fields if they are dominant. If the major fields contain no sequence difference, i.e. if they are equal, then the intermediate field will control the operation. If the intermediate fields are also equal, the minor field will be the basis for the decision utilized to control the operation.

The results of comparison will be available at the HIT1, EQ and LOT1 input hubs, the HIT1, EQ, and LOT1 output hubs, and HIIN, EQ and LOIN sequence hubs in the upper left corner of the control panel. Several of the control panel arrangements show possible wiring whereby the comparators are adapted to control further operations of the machine. All comparisons are performed as information is transmitted into or out of the machine. No provision is made to store and then select or re-sort the control fields which are to be compared against each other. In other words, the data must be compared while in flight. Therefore, since no provision has been made for programming a static comparison, it is necessary to provide at least three comparators with outlets to the control panel with which, by proper wiring, any fields within a record can be compared in their proper sequence despite the fact that the sequence of the fields, as read from tape, may not be in a fixed order. Three comparators are therefore provided which are adapted to process minor, intermediate and major control fields, respectively. Thus, when a record is read in and a comparison is made on the first field, the field being a minor field, for example, and a decision is arrived at on the basis of this field, such decision must be maintained in a memory until an intermediate or a major field of the same record is sensed at a later time. Later, another comparing operation on a field of higher rank (the intermediate, for example) may take place in the comparators, and the results of the intermediate field comparisons may override the comparison effected on the minor field if they show an intermediate field to be greater, or the previous comparison result may remain unaltered if the now compared field (intermediate) is equal. Within the same record it is possible to approach, at a later time, the third control field which may be the major field. In turn, the results of the comparison of the major fields will be used to override any decisions of the other two comparators if the major field comparison shows the fields to be other than equal.

Conversely, if the major field is first read from a record and a decision other than equal is sensed, no further comparison on this record will take place. If the major field is sensed first and the comparison indicates the compared fields to be equal, then upon reception of the intermediate field a second comparison will be made and the results thereof are stored in a memory. If unequal, no further comparing will take place. If the comparison of the intermediate fields indicates an equality, then when the minor field is approached, a third comparison operation is performed and the results of final comparison will be stored in the machine to control the output hubs previously mentioned (the high, equal, low).

The control hubs marked minor, intermediate and major may be wired at the operator's option. They may all be wired, or any one of them, or any combination of them, the only requirement being that the operator wire the control panel so that the fields will be properly assorted by their minor, intermediate and major rank. When a comparison operation is started internally, three different comparisons will result. The input record from the input registers will be compared against the output record (I/O) that it displaces, forming a sequence checking operation, the results of which are emitted from the sequence hubs in the control panel. The input record from the tape register will also be compared against the remaining record (I/R) to form what is called the input decisions which are emitted from the input hubs on the control panel, and whose purpose is to indicate which of the two records in memory at the end of this reading cycle is the larger or the smaller. The third comparison is made between the output record and the remaining record (O/R). The results of this comparison are emitted from the output hubs in the control panel. The pulses at the output hubs will be identical in every respect with those emitted from the input hubs one cycle earlier. The pulses at the output hubs are used to check on the machine operation.

If the input hubs are wired to control further operations, and the output hubs are wired identically to control the feed hubs, and the remove check hubs are unwired, then the signals received by the feed hubs must be exactly the same as those received by the fed hubs one cycle later. If the result of these comparisons is not identical, the machine will stop and indicate a comparison error.

The organization of the start stop hubs associated with the fields is such that the column wired to start comparison will be the first column to be compared and the column wired to the stop hubs will be the last column to be compared. Schematically, the position of the comparators is shown on Fig. 2. The input-output comparison and the input-remainder comparison are made at the same time during a reading cycle. The output-remainder comparison is made later during a writing cycle.

Figure 184:
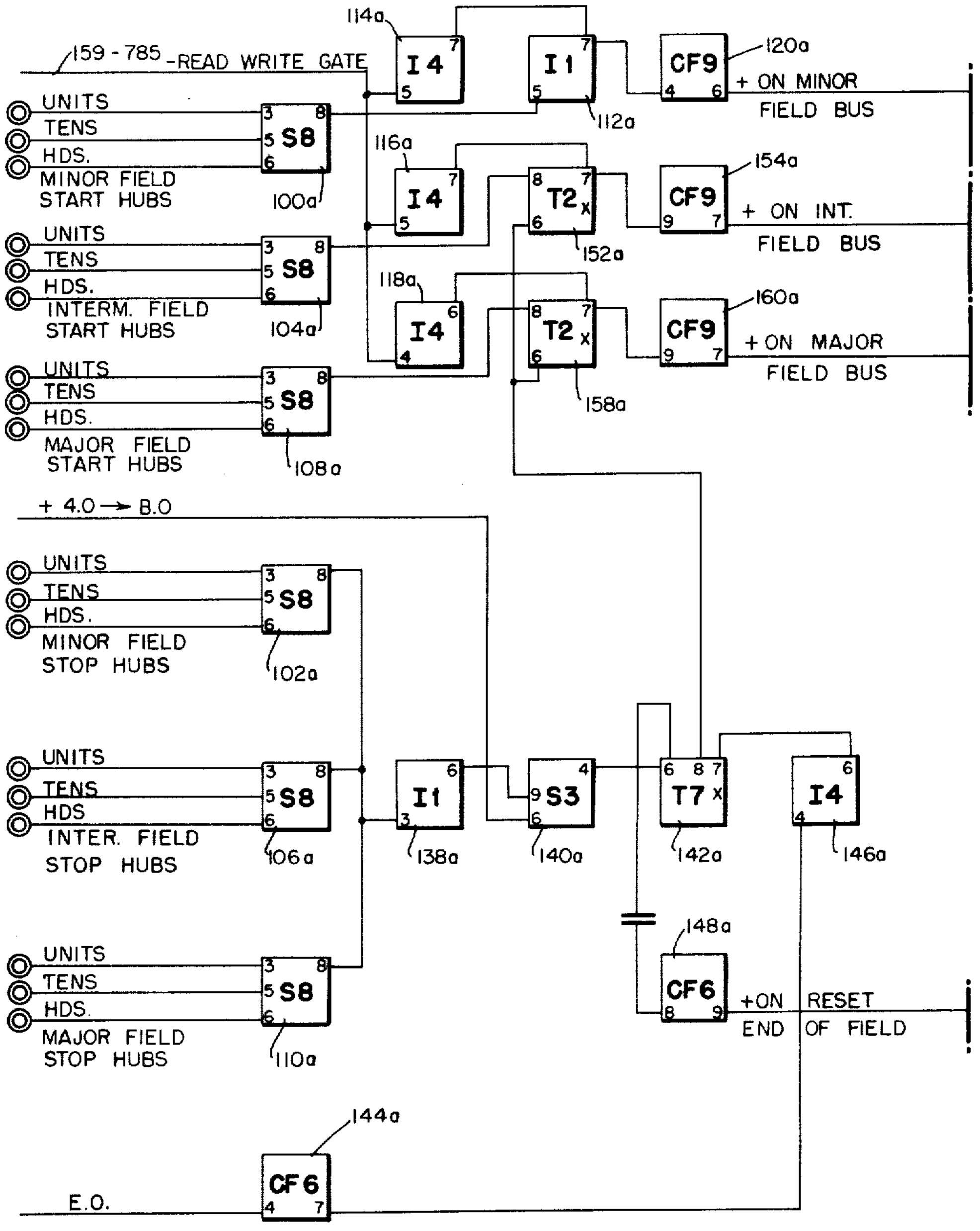

The start minor field hubs marked H, T and U (hundreds, tens and units) are internally wired to a switch 100*a*, inputs 3, 5 and 6 (Fig. 184). The corresponding stop hubs of the minor field are wired to a switch 102*a*, input pins 3, 5 and 6. The intermediate start hubs are wired to a switch 104*a*, inputs 3, 5 and 6, and the stop hubs of the intermediate field are wired to a switch 106*a*, pins 3, 5 and 6. The major field start hubs are wired to a switch 108*a*, input pins 3, 5 and 6, and the corresponding major field stop hubs are wired to a switch 110*a*, input pins 3, 5 and 6.

Figure 186:
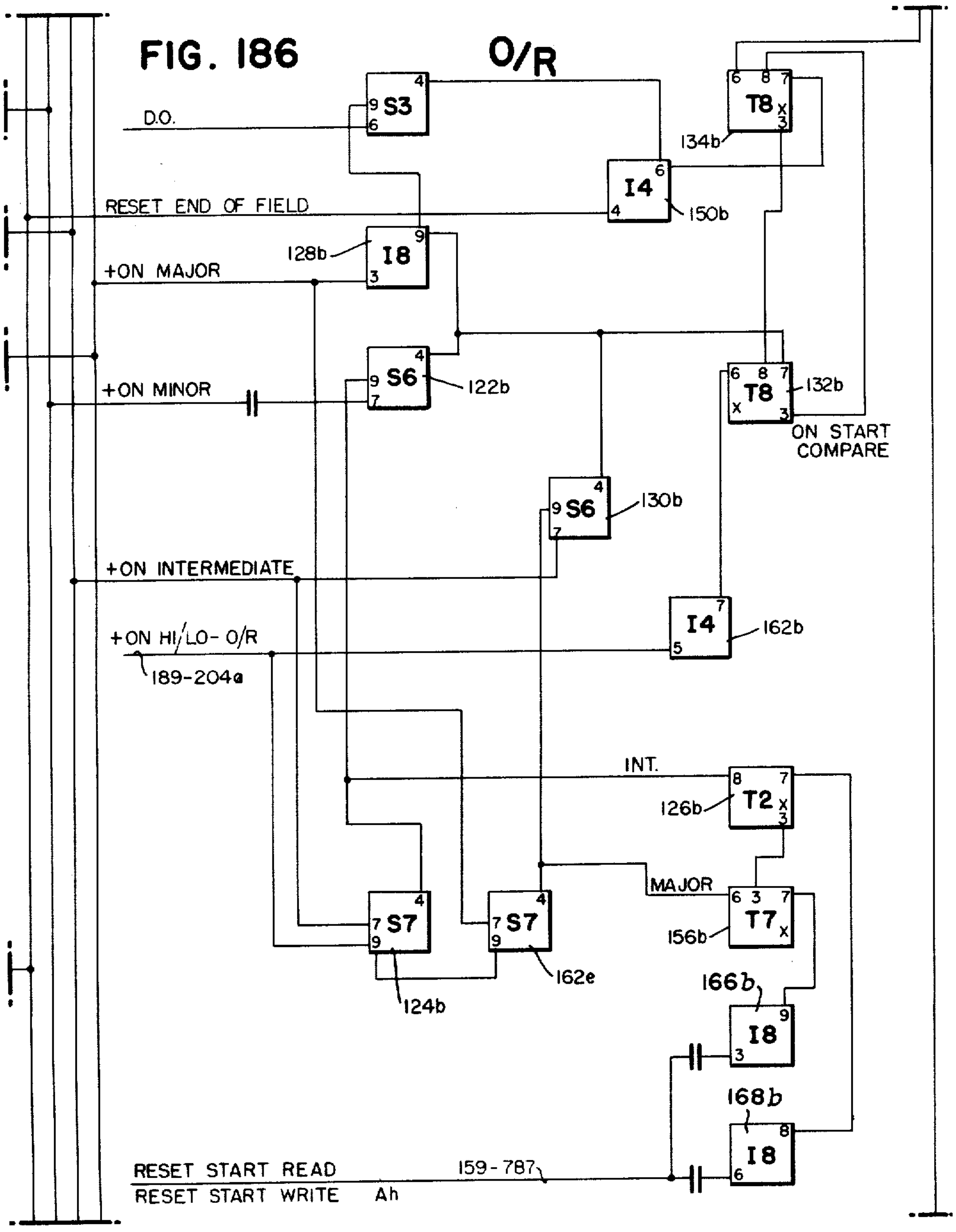
Figure 187:
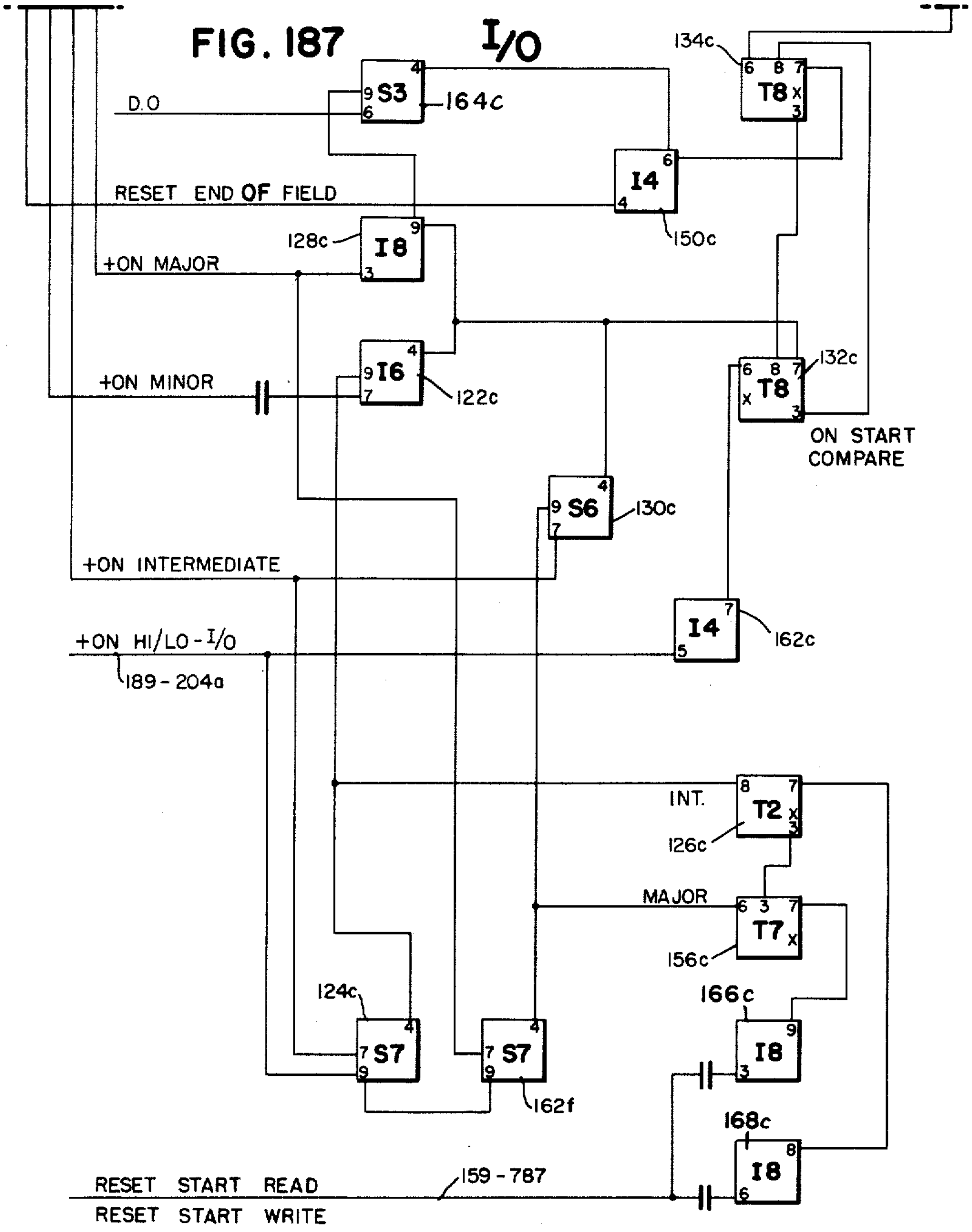

If the switch 100*a* receives coincidence pulses, a signal will be transmitted from its output pin 8 to an inverter 112*a*, input pin 5. The inverter 112*a* and an inverter 114*a* together comprise a coincidence circuit. The signal emitted by the cathode follower 787 (Fig. 159), output pin 6, previously described, is transmitted to the input pin 5 of the inverter 114*a* and also to the input pin 5 of an inverter 116*a*, and the input pin 4 of an inverter 118*a* (Fig. 184). The inverter 114*a*, input pin 5, now provides a pulse in coincidence with the output pulse generated from the switch 100*a*, and a pulse is, therefore, passed through the inverter 112*a*, via its output pin 7, through a cathode follower 120*a*, output pin 6, to switch 122*a* in the I/R comparator (Fig. 185), to switch 122*b* in the O/R comparator (Fig. 186), and to switch 122*c* in the I/O comparator (Fig. 187). The second control element in the switches 122*a*, 122*b* and 122*c*, at their input pins 9, is controlled by switches 124*a*, 124*b* and 124*c*, respectively of Figs. 185, 186 and 187, respectively, and by triggers 126*a*, 126*b* and 126*c*, respectively of the same figures.

The switches 122*a*, 122*b* and 122*c* are controlled by the intermediate comparing operation which is not being performed at the moment and has not yet been initiated. Therefore, the triggers 126*a*, 126*b* and 126*c* are in their normal reset position, and the pins 9 of the switches 122*a*, 122*b* and 122*c* allow the signal from their input pins 7 to pass through their output pins 4 if inverters 128*a*, 128*b* and 128*c* and switches 130*a*, 130*b* and 130*c* will allow it. The inverters 128*a*, 128*b* and 128*c* are controlled by the major comparison which is not at this time being performed and, therefore, these inverters are deconditioned. The switches 130*a*, 130*b* and 130*c* are controlled by the intermediate comparisons which are not being made at this time, and therefore they do not affect the circuit. The signal, therefore, from the switches 122*a*, 122*b* and 122*c* will now turn on triggers 132*a*, 132*b* and 132*c*, respectively, via their control pins 7. These triggers in turn transmit a signal from their output pins 8, which turns on triggers 134*a*, 134*b* and 134*c*, respectively, via their input pins 3.

Figure 185:
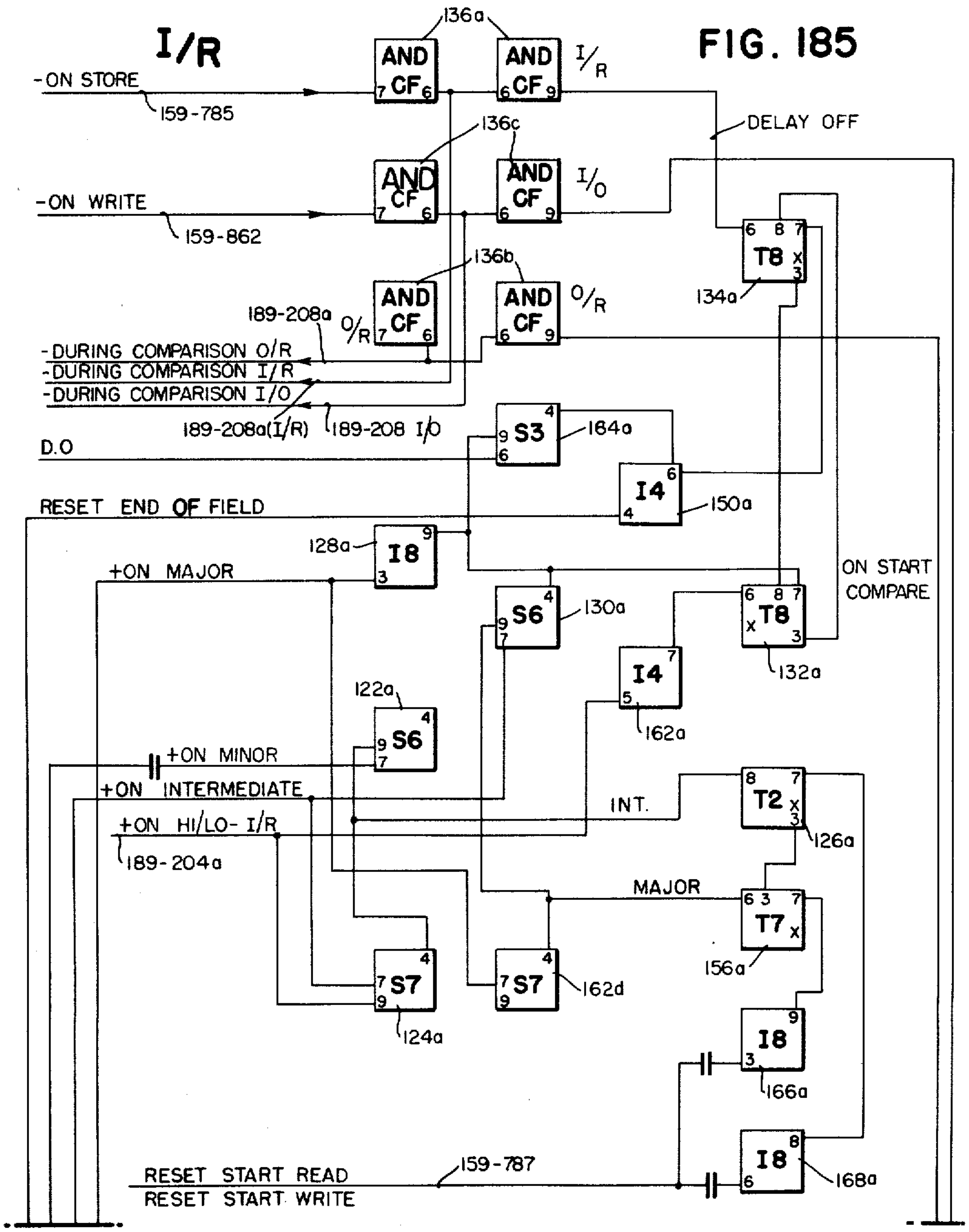

A signal is transmitted from the output pin 6 of trigger 134*a* to input pin 9 of a coincidence circuit 136*a* (Fig. 185). The input pulses at pins 9 and 7 of the circuit 136*a* form a coincidence that will allow a signal entering pin 9 of this unit to pass through only during a reading operation. The input pin 7 of the unit 136*a* is impulsed from the cathode follower 785 (Fig. 159), output pin 6, as previously described. Thus, during a storing operation, when the column selected as the start of the minor control field is located, a signal will be transmitted from the output pin 6 of the unit 136*a* (Fig. 185), and will be transmitted to the comparator for control purposes in the input-remainder comparator.

The input-output comparator is activated through circuits which are a duplicate of those just described, the comparator being initiated by the signal available from the inverter 112a (Fig. 184). The input-output trigger 134c (Fig. 187) provides a pulse for the coincidence circuit 136a (Fig. 185) which is also conditioned by the —On store signal.

The output-remainder comparator trigger 134b (Fig. 186) will also be turned on at this time, but it will not produce an output pulse from its coincidence unit 136b (Fig. 185), output pin 6, since input pin 7 of the unit 136b is conditioned during writing only. Thus, the O/R comparator will not operate at this time. The discussion of the comparing circuits themselves will follow at a slightly later time. At this time it will be sufficient to discuss the turning On and Off of the comparator controls.

Let it be assumed that the field selected by the operator in Fig. 12, column 35, has proceeded until column 69 is now being stored and compared. As previously mentioned, the stop hubs of the minor field comparator are wired to the inputs of the coincidence unit 102a (Fig. 184), which transmits a pulse via its output pin 8, to an inverter 138a, and via output pin 6 of the inverter 138a to a switch 140a. The input pin 6 of the switch 140a is conditioned by the time pulse generated by the character ring at 4.0 time, which now provides a gate through the switch 140a, thereby turning on a trigger 142a. The machine will continue through this cycle, and upon receiving the succeeding character (column 070), a new storing cycle is initiated, during which time the E.0 pulse is generated by the character ring and transferred through a cathode follower 144a, via its output pin 7 to an inverter 146a, and via output pin 6 of the inverter 146a to turn off the trigger 142a. When the trigger 142a is turned off, it will emit a signal from its output pin 6 which passes through a cathode follower 148a, via its output pin 9, to the inverters 150a, 150b and 150c (Figs. 185, 186 and 187, respectively), input pins 4, and via their output pins 6, to turn off triggers 134a, 134b and 134c, respectively, input pins 7 thereof. Triggers 134a, 134b and 134c being turned off at this time will decondition the cathode follower Or circuits 136a, 136b and 136c (Fig. 185) so that there will be no comparison controlling outputs therefrom.

If the intermediate start hubs sense coincidence via control panel wiring at a later time, a signal will be transmitted through the switch 104a (Fig. 184), and via its output pin 8, to turn on a trigger 152a. It has been previously established that the inverter 116a has been inactivated. The output pin 7 of the trigger 152a produces an output pulse which is transmitted to a cathode follower 154a, and via its output pin 7 to switches 124a, 124b and 124c (Figs. 185, 186 and 187, respectively), input pins 7, and also to the switches 130a, 130b and 130c of the same respective figures, input pins 7. Since the triggers 156a, 156b and 156c (Figs. 185–187) have not yet been turned on, the output pins 6 thereof will allow a coincidence of pulses to occur in the switches 130a, 130b and 130c. The signal transmitted to the input pins 7 of these units will pass through these units via their output pins 4, to turn on the triggers 132a, 132b and 132c. These triggers in turn will transmit a signal from their output pins 8, to turn on the triggers 134a, 134b and 134c, respectively.

As previously described, the output pins 6 of the triggers 134a, 134b and 134c will allow coincidence to occur from the output pins 6 of the coincidence circuits 136a and 136c to produce a gate to allow comparison at this time.

If the major field hubs on the control panel are wired, coincidence will be noted from the control panel to the switch 108a (Fig. 184), and via its output pin 8 to turn on a trigger 158a. The output pin 7 of the trigger 158a transmits a signal through a cathode follower 160a, output pin 7, to the triggers 128a, 128b and 128c (Figs. 185, 186 and 187, respectively), and also to switches 162a, 162b and 162c of these same figures. The trigger 156a (Fig. 185) has not yet been operated, and it is, therefore, in its reset position. The inverters 128a, 128b and 128c, output pins 9, then transmit a signal to once again turn On the triggers 132a, 132b and 132c, respectively. These triggers, as previously described, control other elements which produce the comparison gates.

It has been established, therefore, that the triggers 134a, 134b and 134c determine the columns at which comparison will take place. Through the three sets of circuits just described, these triggers may be turned On to establish comparison timers. If during any comparison no decision is reached other than equal, the triggers 134a, 134b and 134c must be turned off at the end of the comparison field.

The three sets of stop hubs in the minor, intermediate and major comparators are wired by the operator to the ends of the several respective control fields within a given record. Via the control panel wiring, a coincidence is set up through the switch 102a (Fig. 184) for minor field comparison, through the switch 106a for intermediate field comparison and through the switch 110a for major field comparison. A pulse is transmitted via the output pins 8 of the switches 102a, 106a and 110a to the inverter 138a, and through its output pin 6, to condition one control element of the switch 140a. When the character ring advances to 4.0 time in the cycle now being executed, the 4.0 signal will be transmitted to the input pin 6 of the switch 140a, forming a coincidence and allowing this signal to pass through the output pin 4 to cause the trigger 142a to be turned on.

When the character ring has advanced to D.0 time of this cycle, it will stop and wait for the next character cycle to be started. At E.0 time of the next character cycle, the character ring will emit an E.0 signal to the cathode follower 144a, and this signal will be transmitted through its output pin 7 and to the input pin 4 of the inverter 146a. The E.0 signal will leave the inverter 146a via its output pin 6 to turn off the trigger 142a. When the trigger 142a is turned off, its output pin 6 will emit and transmit a signal through the cathode follower 148a, output pin 9, to the inverters 150a, 150b and 150c (Figs. 185, 186 and 187, respectively). Also the trigger 142a (Fig. 184) will transmit a signal from its output pin 8 to reset the triggers 152a and 158a. Thus, if either an intermediate or a major field has been under comparison, as selected by the operator's control panel wiring, the triggers 152a and 158a will be reset Off at this time.

The circuits just described for resetting the triggers 134a, 134b and 134c (Figs. 185, 186 and 187, respectively) are used only when the results of the comparison operation show the compared fields to be equal. A different procedure will be initiated should an unequal condition be indicated. The records are laid out in such fashion that the high order position of any field is sensed first from tape. Thus column #1 will contain the highest order of the first field. In comparing any two quantities, it is necessary only to compare from the high order toward the low until such time that an inequality is discovered. Such inequality will determine which of the two quantities is the greater or lesser. Comparison of lower orders, after an inequality has been noted, is of no consequence. Since these records do present the high order first, it is necessary to provide a circuit in the machine that will stop further comparisons after the first inequality has been noted.

Since a character from tape is stored in serial fashion one bit at a time, and since the bits of a character are stored in –1– bit, –2– bit, –4– bit and –8– bit order (for numeric data), any indication of an unequal condition in the low order bits in a character may not be the final decision of a comparison operation. Only the final comparison result at the end of a character cycle during which inequalities have been sensed is useful in this machine. The method by which the comparisons are made has been described in great detail, and the circuits for effecting the comparisons will be discussed shortly. Let it suffice for the present to assume that a high or low decision is rendered by the comparator units and transmitted to the switches **124*a*, 124*b* and 124*c*; and the inverters 162*a*, 162*b* and 162*c*. As previously noted, a gate is provided to allow comparison to occur when the triggers 134*a*—134*c* are turned on. When this trigger is turned off, further comparisons shall not be allowed to effect the comparators. It has been pointed out how the triggers 134*a*—134*c*** are turned off in the case where two quantities compared were equal. It remains to be seen how this is turned off when an inequality is sensed during comparison of any of the three possible control fields.

Consider the minor field comparator first. The inequality indication is transmitted through the inverters **162*a*, 162*b* and 162*c*, and via their output pins 7, to once again turn off the triggers 132*a*, 132*b* and 132*c*. These triggers being turned off will allow their output pins 7 to condition one of the control elements of switches 164*a*, 164*b* and 164*c*, so that upon completion of the next character cycle when D.0 time is sensed, a signal will be transmitted through these units via their output pins 4 to inverters 150*a*, 150*b* and 150*c*. Thus, any inequality will cause the immediate turn-off of the triggers 132*a*, 132*b* and 132*c*, which act as the intermediate memory of the fact that an inequality has been sensed, and at the end of which character cycle a decision will be rendered by the entire unit. At the end of the cycle, the triggers 134*a*,** etc, will be turned off to halt further comparing at this time.

When an intermediate control field is being compared, the circuits described above will turn off the triggers **132*a*, etc. and 134*a*, etc. However, the unequal indication will also be transmitted through switches 124*a*, etc., and via their output pins 4, to turn on the triggers 126*a*, etc. The output pins 8 of these triggers then will decondition the switches 122*a*,** etc., so that if the minor field comparison has not yet been made when the intermediate field comparison is started from the control panel, no comparison will actually be made, since in the order of sequence, the intermediate field comparison results will over-ride the minor field results.

The circuit required for major field comparison operations is identical to that described in respect to the minor field comparison operations, with the distinction that the unequal indication signal is transmitted through the switches **162*a*, etc., and via their output pins 4, to turn on the triggers 156*a*, etc. These triggers will emit a signal from their output pins 3 to cause the triggers 126*a*, etc., to be turned on. The triggers 126*a*,** etc., it has just been stated, will stop the comparison of a succeeding minor field in case the fields are wired in this order on the control panel.

The triggers **156*a*, etc., output pins 6, also generate a signal which will decondition the switches 130*a*,** etc., which normally allow the start of a comparison operation on intermediate fields. It can be seen by a study of the foregoing that comparison of the minor and intermediate fields may be suppressed by an unequal comparison indication from the major field, wired on the control panel. This function is necessary, since in the comparison of any two quantities, the first difference noted when comparing from the high order toward the low order determines the order of the quantities. If these quantities comprised one continuous field, it would be necessary to wire only one control field. However, since fields may occur in random sequence within a given record, there are many combinations of comparison orders. As an example, the first field sensed in a record may be the minor field. Perhaps the second field in a record to be compared may be the major field and lastly a third field may be the intermediate field.

Since this machine processes the information as it is read from tape and stored in memory, it is necessary to make the comparisons on the columns to be compared as they are read. It would be most desirable to compare the major field first, since it is the highest order in any comparing operation, but this is not always possible as indicated in the example. Since it cannot be known at the start of a minor field comparison whether or not the major or intermediate fields will be equal, it is necessary to make a comparison of the minor fields so that if an unequal condition is indicated therein, but if the intermediate and major fields are equal, the result of the minor field comparison will determine which of the two quantities is the greater. The same considerations are true of the intermediate field. Since the intermediate field may occur in any part of a given record, it must also be compared if a major field has not preceded it or if preceding major fields are equal.

The comparison of the input-remainder and input-output records is made during the reading portions of the machine cycle. The comparison of output-remainder records is made during the writing portion of the cycle. Thus, during either half of a machine cycle, some comparisons are being made as wired on the control panel.

The triggers **126*a*—126*c* and 156*a*—156*c*, which remember during a given record operation that a decision has been made in respect to some sorting field, must be reset before the next comparison operation, so that a new comparison may be performed from which a different setting of these triggers may result. A signal is emitted from the cathode follower 787 (Fig. 159), output pin 6, previously described, and is transmitted to the inverters 166*a*, 166*b* and 166*c* (Figs. 186, 186 and 187, respectively), input pins 3, to inverters 168*a*, 168*b* and 168*c*, input pins 6, in the same figures, respectively. Thus, a signal is transmitted to the inverters 166*a*, etc., and 168*a*, etc., at the start of either a reading or a writing operation, and via their respective output pins 8 and 9, to reset the triggers 126*a*, etc., and 156*a*, etc., preparatory to making a new comparison. Input pins 7 of the coincidence circuits 136*a* and 136*c* are pulsed by a signal generated by the store gate trigger 781 (Fig. 159), the pulse being transmitted via the cathode follower 782. Thus, during a storing or reading operation, one input of the coincidence units 136*a* and 136*c* will be conditioned to allow the signal entered into the other half of these respective units to pass therethrough to provide the compare gates. The signal entering the coincidence unit 136*b*, input pin 7, is generated by the scan gate trigger 814 (Fig. 159), during the time that a writing operation is being performed, and it is transmitted via the cathode follower 862, output pin 6.** As previously mentioned, this is the time that the output comparison O/R is made.

The value order assigned to characters is from low to high, a blank, all the special characters in their proper sequence succeeded by the alphabetic characters in order, followed by the digit zero, and lastly the digits 1 through 9. The 9, therefore, is the highest possible character available. In the discussion of the comparing function that is to follow, collating or sorting numeric values only will be considered first.

As previously mentioned, a character is stored from tape starting with the –1– bit and progressing through to the check bit (–C– bit). As each bit is stored, there is available the corresponding bit of two other characters in two different records, as previously explained, one being the remainder record and one being the previous output record. These characters will be made available in the following manner. The output bit will be transmitted from the memory deck, as previously described, through the trigger 837 (Fig. 170), via its output pin 7, to the cathode followers **838—838*a*, outputs 6 and 7, respectively, and to an inverter 171*a*** (Fig. 189*a*). The remainder bit is available from memory to the trigger 840 (Fig. 170), as previously described, via its output pin 7, cathode followers 841—841a, output pins 6 and 7, respectively, and to an inverter 172a (Fig. 189*a*), input pin 4. The input bit will be made available to the comparators from the input register #2 (Fig. 167), via the cathode followers 763—763a, output pins 6 and 7, respectively (Fig. 168). This input bit is transmitted from the cathode followers 763—763a (Fig. 168) to an inverter 174a (Fig. 189*a*).

The operation of the compare units is identical for all numeric bits. For comparing two bits from different characters, it is necessary to have the voltage value representing the bits of these characters in both positive and negative potential. The presence of a "yes" bit (–1– bit) is determined by a positive voltage, "no" bits (–0– bits) being indicated by a negative. In the comparing circuits, however, it is necessary to take a –1– bit and indicate it by a positive indication in some circuits and by a negative indication in others. Conversely, it is necessary to take a –0– indication and indicate it also in these voltages. The three characters hereafter called I, O and R (input, output and remainder) will be available in both voltages hereafter, one being available directly from the previously described circuits and the opposite voltage being available via cathode followers 176a, 178a and 180a (Fig. 189*a*).

It may be inferred from what has been said immediately hereinabove that the system includes three comparators, namely the I/R comparator, the O/R comparator and the I/O comparator. These comparators are identical in every respect with the exception that they are adapted to process different sets of characters during their respective comparing operations.

The comparator shown in Figs. 188 and 189 represents the circuit of the I/R comparator which, as stated, is the same as the circuit employed in the O/R comparator and the I/O comparator. Since these comparators are identical, it will be sufficient to illustrate and describe only the one, i.e. the I/R comparator.

The signals –R–Blank, –R–Blank and –O–Blank, etc. feeding the switch 230a, etc. in Fig. 188, are representative of the signals entered into the three comparators. Thus, it must be assumed that the –R–Blank signal is directed to the I/R comparators, the –R–Blank signal is directed to the O/R comparators, and the –O–Blank signal is directed to the I/O comparators. The representation in Fig. 188 will, therefore, be clear if this fact be kept in mind. By the same token, it must be remembered that the outputs of the respective I/R comparators and O/R comparators in Fig. 186 (wherein only the I/R comparator is shown) are all fed to the relay gate of Fig. 190. Where the output lines from the respective cathode followers 268a, 254a and 272a of the I/R comparator are connected to certain points of the relay gate of Fig. 190, the corresponding lines from the corresponding cathode followers of the O/R comparator are also connected to these same points. (The exception of the I/O connections will be stated at a later point herein.) With the foregoing explanation in mind, there should be no difficulty in comprehending the operation of the O/R comparators and the I/O comparators after the following explanation of the I/R comparators.

The voltages obtained from the circuits of Fig. 189*a* will be transmitted into two input pins 3 and 4 of a coincidence circuit 182a, which will allow a signal to pass through this unit only if there is an R bit (R) and no I bit ($\bar{I}$). An And circuit 184a, input pins 6 and 7, receives the opposite bit indication when there is an I bit (I) and no R bit ($\bar{R}$). Thus, in the comparison of one bit of two characters, if there is a difference, that is one-half has a –1– bit and the other does not, this signal will pass through one of these coincidence units. If there is an equality, that is both having –1– bits or both have –0– bits, neither unit will sense a coincidence, and no pulse will be emitted from the output pins. This is so since either unit will pass a signal only if one of the two bits is a –1– and the other is a –0–.

Let it be assumed for the moment that there is an R bit (R) but no I bit ($\bar{I}$). Then the signal will pass through the And circuit 182a, output pin 5, and will be transmitted to switches 186a and 188a. A signal Numeric (1.0→A.0) is emitted from the cathode follower 662 (Fig. 156) that produces a gate pulse from its output pin 6 which is transmitted to the input pin 7 of the switch 186a (Fig. 188). The signal that is emitted from the output pin 5 of the And circuit 182a (Fig. 188) will now pass through the switch 186a, and via its output pin 4 to an inverter 190a, input pin 3.

A signal is generated in the trigger 646 (Fig. 154) which, via pin 6 of the cathode follower 647, is transmitted to an inverter 192a (Fig. 189). The pulse at output pin 6 of the inverter 192a forms a coincidence with the pulse at output pin 6 of the inverter 190a, so that the comparison signal emitted from the switch 186a (Fig. 188) can now pass through the inverter 190a, output pin 6, and be transmitted to an inverter 194a, input pin 5, and also to a —And circuit 196a, input pin 9. The signal will pass through the —And circuit 196a via its output pin 6, to an inverter 198a, input pin 5, and through the inverter 198a to turn on a trigger 200a.

The trigger 200a when reset in its formal position indicates that all comparisons to this time have been equal. As will be shown, whenever a high or low comparison is indicated by the comparator, the trigger 200a will be turned on indicating an unequal condition. The signal entering the inverter 194a, input pin 5, is transmitted through the inverter to cause a trigger 202a to be turned off. However, since the trigger 202a had not been previously operated, it is in its off position, so that no change in its status takes place.

The circuits in the machine are built in such manner that the decisions rendered by the comparator will be interpreted in reference to memory M1. This is true of the I/R and O/R comparators. In the case just described, the decision rendered will be interpreted as a low decision. This interpretation indicates that memory M1 contains the lower of the two records at this point of the comparison. At the first difference, a comparison difference signal will be generated, and this signal is transmitted through the —And circuits 196a, as described, to the inverter 198a, input pin 5, and it is also transmitted to the output of a —And circuit 204a, output pin 6, to the inverters 162a, 162b and 162c, to the switches 124a, 124b and 124c, and to the switches 162d, 162e and 162f, all respectively in Figs. 185, 186 and 187.

It has been shown how a low condition will be sensed. In order to control the times during which comparisons shall be made effective, the circuits described in connection with Figs. 184–187 generate comparison gate signals from the outputs of the coincidence circuits 136a, 136b and 136c, Fig. 185. Since an I/R comparison is being made at this time as an example, the —And circuit 136a will provide a gate pulse indicating that comparisons are to be made, and it will transmit the gate signal —During Comparison I/R from its output pins 6 to an inverter 206a, input pin 4, and to an inverter 208a, input pin 5, Fig. 189.

This gate has not been available prior to this time, and therefore the units just mentioned will decondition the output of the inverters 190a and 210a. Deconditioning these outputs will prevent any comparison indications from being made available to the comparator triggers 200a and 202a, and also will prevent their being available from the outputs of the units 196a and 204a, pins 6. Thus, when the column wired by the operator on the control panel is sensed, a gate will be transmitted through the circuitry previously described to the inverters 206a and 208a, which, as part of the coincidence units, allow pulses indicative of comparison differences to pass through to effect the compare memory triggers.

In the previous example it was assumed that there was an R bit but no I bit. If the reverse were true, and there was an I bit but no R bit, no coincidence would occur at the inputs, pins 3 and 4, of the And circuit 182*a* (Fig. 188). Coincidence would now be sensed at the input pins 6 and 7 of the And circuit 184*a*, and a pulse would pass through this unit via its output pin 8, to switches 212*a* and 214*a*, input pins 9. As previously described, the numeric gate (in the example selected) conditions the second control element of the switch 214*a* to allow signals to pass through it during the numeric portion of a cycle, via its output pin 4 to an inverter 216*a* (Fig. 189), via output pin 7 of the inverter 216*a*, during comparison time as established, to an inverter 218*a*, input pin 3, and also to the —And circuit 204*a*, input pin 4. Once again the comparator gate is still established and will condition the output of the inverter 216*a* to effect the comparison memory circuits. The signal is, therefore, transmitted through the inverter 218*a*, via its output pin 6, and will turn on the trigger 202*a*. It will also pass through the unit 204*a*, output pin 6, to the inverter 198*a*, and via its output pin 7, to turn on the equal trigger 200*a* if this trigger at the time is in its Off position.

In the original example the trigger 200*a* was turned on, and therefore there will be no change in the status of this trigger at this time. In the previous example, the trigger 202*a* was not turned on; now, therefore, it will be turned on. It is by analyzing the condition of the triggers 200*a* and 202*a* that the comparison result indication is obtained. This will be explained in detail shortly.

For the comparison of the –1–, –2–, –4– and –8– bits of numeric characters, the operation is identical to the one just described. It is merely the comparison of each bit, one at a time, in the sequence named, which will cause the triggers 200*a* and 202*a* to be manipulated to correspond with the results of the comparison of these bits in the units 182*a* and 184*a*.

Since the sorting sequence assigns to the alphabetic characters a lower sorting sequence than that assigned to numeric characters, special provision is made herein to force alphabetic characters to indicate as low when compared to numeric characters. This may be done by effectively reversing the significance of the –A– and –B– bits of different characters. This is done circuit-wise by reversing the path of the comparison indicating leads from the comparator units 182*a* and 184*a* to the triggers 200*a* and 202*a*. By reversing the comparison indications emitted from the And circuit 182*a* so that the output from pin 5, which normally indicates low, will indicate high, and so that the output pin 8 of the And circuit 184*a* which normally indicates high will now indicate low, effectively results in the interpreation of –A– and –B– bits of a numeric character as –1– –1– instead of –0– –0–, and the interpretation of the –A– and –B– bits of an alphabetic character as –0– –0– instead of –1– –1–.

Since it is known that all alphabetic characters have the presence of a –1– bit in the A or B positions, then by definition it can be known that they will compare lower than numeric characters if the numeric characters, in the same positions, contain two –0– bits, which are made to look like –1– bits. This is arranged not by reversing the bit recognition itself, but by reversing the path by which the decisions rendered by the And circuits 182*a* and 184*a* (Fig. 188) may flow through their associated switches to high and low lines which control the comparison decision triggers 200*a* and 202*a*. Until now the decision pulses have passed through the switches 186*a* and 214*a* (Fig. 188). At this point the –8– bits have been operated on and the comparison operation with regard to the –A– bits has started.

A signal is emitted from the cathode follower 664, output pin 7, by circuitry previously described, which produces a signal that stays in existence during the storage time of the –A– and –B– bits. Thus, during the comparison and storage of the –A– and –B– bits, a signal will be available to the switches 188*a* and 212*a* (Fig. 188). A circuit will no longer be completed through the switches 186*a* and 214*a* as previously described. Upon comparison of the –A– bit, the proper decision will be emitted from the And circuits 182*a*—184*a*, output pin 5 or 8, as the case may be, to their respective switches, and from the outputs of these switches to high-low control lines previously described. By means of these switches 182*a*—184*a* there is accomplished a reversal of the decision in respect to that emitted during the time the numeric bits were being compared.

Since this machine may sort or collate on any legitimate character which may be written on tape, it is possible then to compare special characters and blank marks as well. Any combination of characters may be compared at any one time. For example, it is possible to compare a numeric character from one record against a blank mark from another record, one bit at a time. A blank mark is a character in a column of a record which is put there to indicate the lack of any other valid character. It is also possible to compare any character with a special character. Thus, the machine must be capable of recognizing different characters as belonging to specific groups. These groups comprise the blank mark by itself, any special character of which there are a number, and the alphabetic characters. The recognition of alphabetic characters is inherent in the switch circuit, previously described, controlled by the And circuits 182*a*—184*a*, and the switches 188*a*—212*a*. Thus, the problem of comparing alphabetic and numeric characters has been accounted for.

Upon examination of the code employed (Fig. 4), it can be seen that the numeric representation of all special characters exceed in sum those of any alphabetic or numeric character. Certain of these special characters have no –A– or –B– bits, while others have various combinations of these bits. Thus, when comparing a special character with no –A– bit or –B– bit with a numeric character, the logical indication is that the numeric character is low. Since the collating sequence of rank requires that special characters must be recognized as low than numeric characters or alphabetic characters, special treatment must be given to the special characters when recognized as such.

In order to assign the blank mark and special characters to their proper sequence for collating purposes, recognition networks are provided for each of the three characters under scrutiny, the I, O and R. The recognition circuits for an I (input) character are shown in Fig. 169 in which the control pulse is emitted from the cathode follower 759, output pin 6. The circuitry feeding the cathode follower 759 has been previously described as being endowed with the ability to recognize within special characters a numeric value of 13 or more. The numeric content of 13 or more is present in all the special characters except the hyphen (-) and the ampersand (&), the values of which happen to coincide with the special sequence, and as such do not have to be recognized as special characters. A signal is transmitted from the cathode follower 760 (Fig. 169), output pin 6, indicating that a blank mark is being stored from the input registers. The I-Special Character signal is transmitted to Or circuit 222*a* (Fig. 188), input pin 4, and to a switch 224*a*, input pin 9, whenever a special input character is recognized. The signal I-Blank is transmitted to an Or circuit 226*a*, pin 9 (Fig. 188), to the switch 224*a*, pin 7, and to an inverter 228*a*, input pin 5, whenever a blank character is recognized.

Figure 178:
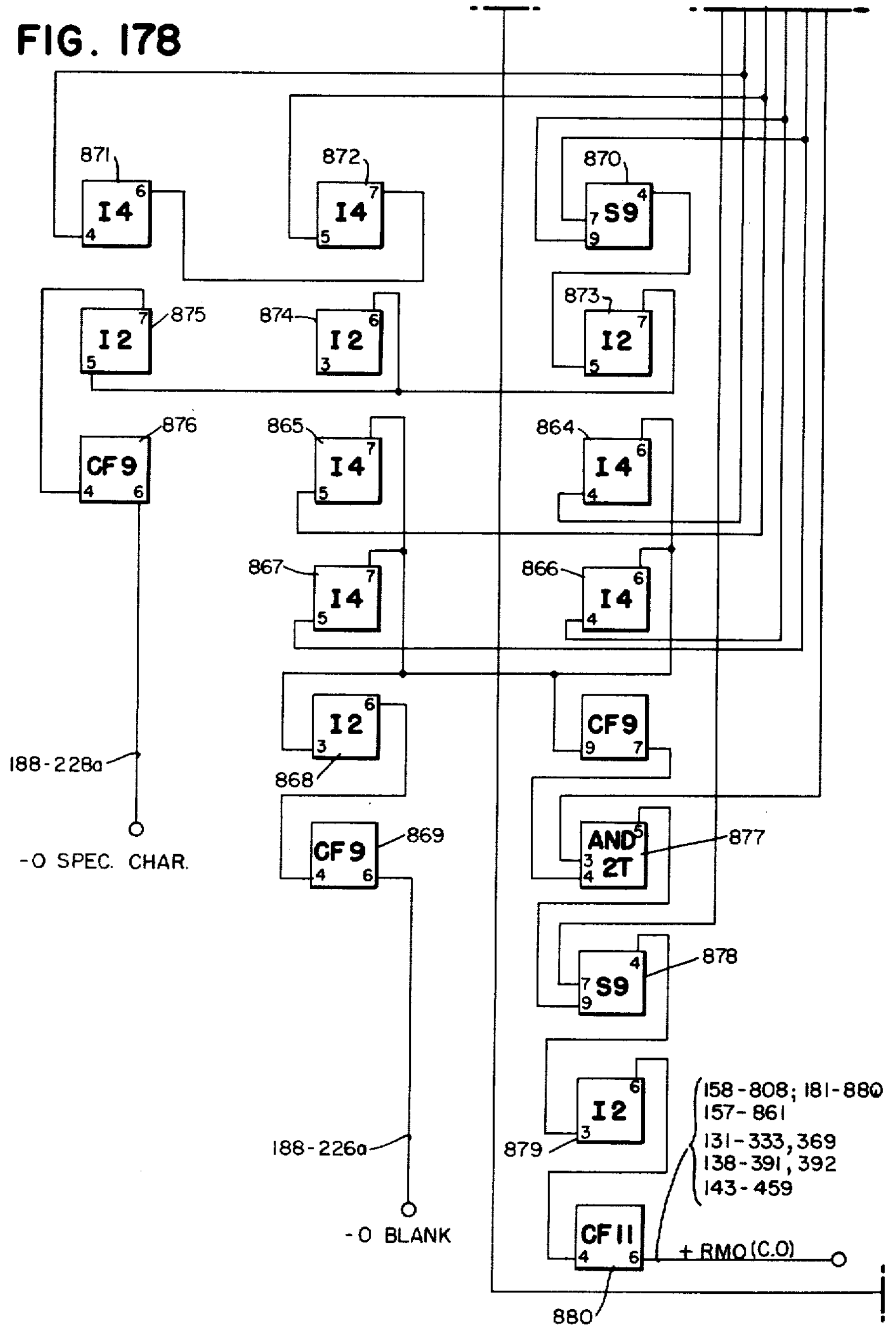

The special characters and blank character recognition signals for the output record originate in the circuits of Fig. 178 which are fed by the output register. The cathode follower 876, output pin 6, will indicate that the output character likewise has a numeric value of 13 or more. The O-blank mark for the output character is indicated by the output of the cathode follower 869 (Fig. 178), output pin 6. The circuitry generating these pulses has been previously described.

The signal O blank and O Special Character for the output record are transmitted to the circuits of Fig. 188, where the output special character is transmitted to an Or circuit 228*a*, input pin 4, and a switch 230*a*, input pin 9. The output blank character is transmitted to the Or circuit 226*a*, input pin 9, switch 224*a*, input pin 7, and the inverter 228*a*, input pin 5.

The special character and blank mark signals for the remainder character are generated in the circuits of Fig. 177 which are fed by the output register. The recognition signal R Special Character for the remainder special character is transmitted from the cathode follower 889*a*, output pin 6. The recognition signal R blank for the blank character is emitted from the cathode follower 889, output pin 7. These two recognition signals are transmitted to the circuits of Fig. 188. The remainder special character signal R Special Character is fed to the Or circuit 228*a*, input 4, and to the switch 230*a*, input pin 9. The blank recognition signal R blank for remainder character is also transmitted to the switch 230*a*, input pin 7, to an inverter 232*a*, input pin 4, and to an Or circuit 234*a*, input pin 9.

The comparison of a blank mark and special character and all details resultant from these comparisons are identical for the three comparators. It will be sufficient, therefore, to describe the operation of only the input-remainder operation by way of example.

As just previously described, special characters and blank marks are recognized in both the input and the remainder characters, and recognition signals are transmitted from their respective recognition circuits to the units described. It is possible to have numerous combinations of character groups comprising the input, output and remainder characters, respectively. As an example:

(1) Input: blank character,
Output: special character.
(2) Input: special character,
Output: blank character.
(3) Input: blank character or special character.
(4) Output: numeric character or alphabetic character.
(5) Input: numeric character or alphabetic character.
(6) Output: special charatcer or blank character.
(7) Input: blank character,
Output: blank character.
(8) Input: special character.
Output: special character.
(These special characters may or may not be identical.)

When comparing two special characters one against another, the normal comparing circuits as previously described will compare these two characters and render a decision as to which character is the high or low character. When sorting or collating special characters one against the other, the fact that they are both special characters balances out and the comparisons made through the normal comparison circuits are valid. When a special character is compared against any character but a special character, the comparison indications obtained from the normal comparison circuits are invalidated. In this case the comparison must be conditioned by what the special character is compared against, i.e. special character against numeric, special character is lower. Another example is the comparison of a special character against a blank character, in which case the special character will be indicated as high. The assignment of the value to the special characters and their treatment in a sorting sequence is as follows.

When a blank mark is recognized in the remainder character, the signal enters the switch 230*a*, input pin 7, also the inverter 232*a*, input pin 4, and the Or circuit 234*a* (Fig. 188), input pin 9. The character in the input register will be recognized, perhaps, as either a special character or a blank character. If it is recognized as a blank character, the fact that both characters are blank renders the characters equal.

If the input character is also a blank character, a signal will be transmitted to the Or circuit 226*a*, input pin 9, and also to the inverter 228*a*, input pin 5. Since there are two blank characters, the blank character circuits will be neutralized, so that no signal will be transmitted to indicate either a high or a low. The blank character signal entering the inverter 232*a*, input pin 4, is transmitted from its output pin 6, to the input pin 8 of the Or circuit 226*a*. The I-blank signal is entered into input pin 9 of the Or circuit 226*a*. The Or circuit 226*a* is so designed that upon reception of both of these signals, there will be no pulse from the output pin 7 thereof, and as a consequence no signal will be transmitted from a switch 236*a*, thus eliminating one of the two high-low conditions.

The I-blank signal also enters the inverted 228*a*, input pin 5, and passes therethrough via its output pin 7, and to the input pin 8 of the Or circuit 234*a*. The remainder blank signal enters this Or circuit at pin 9. The Or circuit 234*a* is identical to the Or circuit 226*a*, and upon reception of both these signals will neutralize them so that no signal is emitted from its output pin 7 and no signal is, therefore, transmitted from a switch 238*a*. Thus, a blank mark compared against a blank mark results in an equal notation.

If the remainder character is a blank character, the low indicating circuit must be inactivated and the high indicating circuit must be activated. The remainder blank character signal entering the switch unit 230*a*, input pin 7, will pass through the switch 230*a* via its output pin 4, and to the input pin 3 of the Or circuit 222*a*. Since there may be a special character in the input register, the input pin 4 neutralizes the recognition signal of the blank character and no signal is transmitted from the output pin 6 of the Or circuit 222*a*. However, the input special character signal is transmitted to the input pin 9 of the switch 224*a*, passes through this switch via its output pin 4, and to the input pin 3 of the Or circuit 228*a*.

The remainder character is not a special character, since it has been recognized as a blank character, and as a consequence the signal entering pin 3 of the Or circuit 228*a* will pass through this unit via its output pin 6 to the switch 238*a*, and via output pin 4 of the switch 238*a* to the input pin 9 of a switch 240*a*. At C.0 time of the character ring, the switch 240*a* is tested, and upon sensing the presence of the blank character signal and the special character signal, as described, the test pulse will be allowed to pass through output pin 4 of the switch 240*a*, to the inverter 216*a* and from there to the high control circuits previously described.

Prior hereto during the time that the special character was being stored in memory, the comparators 182*a*—184*a* will have performed a comparison, and in this case will have indicated the special character to be higher than the blank character. As a consequence, the comparator triggers 200*a* and 202*a* (Fig. 189) would have been set to indicate the high condition, so that no change will occur as a result of the subsequent special character comparison. However, if instead of the comparison with a blank character, a comparison had been performed with a numeric character, the signal resulting from recognition of the special character would be used to reset the triggers 200*a* and 202*a* to indicate the special character as the low character.

If the remainder character is not a blank or a special character, and the input character is a special character, then a circuit will be completed as follows. The remainder comparator will recognize the remainder character as neither a special character nor a blank character. Recognition of the input character as a special character will cause a pulse to enter the Or circuit 222*a*, input pin 4. Since there is no recognition of a remainder blank character or remainder special character, the switch 230a (Fig. 188), output pin 4, will allow the signal entering pin 4 of the Or circuit 222*a*, to pass through this unit via its output pin 6, through the switch 236*a*, via its output pin 4 and to a switch 242*a*, input pin 9. At C.0 test time this signal will pass through the switch 242*a*, via output pin 4, to the inverter 190*a*, output pin 6, and to the high-low circuits.

If a comparison had been made between a special character and a numeric character in all probability the special character recognition pulse would have set the trigger 202*a* (Fig. 189) to indicate a high condition for a special character. Via the circuit just described, the trigger 202*a* would be set again, at C.0 time, to indicate the special character as a low character. The Or circuit 222*a*, input pin 4, the switch 230*a*, input pin 9, the inverter 232*a*, input pin 4, and the Or circuit 226*a*, input pin 9, connected to the switch 236*a*, will emit a signal indicating that the special remainder character or the blank remainder character is low. The switch 224*a*, input 9, the Or circuit 228*a*, input 4, the inverter 228*a*, input 5, and the Or circuit 234*a*, input 9, via the switch 238*a* and the switch 240*a* will cause a special character or a blank character in the input or remainder registers to indicate as high. The lack of a signal on either of these two lines in either of the switches 242*a*, or 240*a*, will indicate that, regardless of the types of characters being compared at this time, the characters are in the same class, i.e. both blank or both special characters.

It can be seen by studying the configuration of these various units that any combination of different classes of characters will result in a comparison indicating that the character of the lowest order will be indicated as low. Or conversely, the special character of a higher order will indicate as high. It can also be seen that the indications of the comparators 182*a* and 184*a* will remain valid as long as the class of characters being compared is identical. Upon comparison of different classes of characters, the previously described circuits must override any comparison decision made on the basis of a bit-by-bit comparison of these two different classes of characters.

A signal is emitted from the output of the cathode follower 782, output pin 7 (Fig. 159), and is transmitted to inverters 244*a* and 246*a*, input pins 6 and 3, respectively (Fig. 189). Thus, at the start of a reading operation, this signal will be transmitted through these two inverters via output pins 8 and 9, respectively, and will turn off the triggers 200*a* and 202*a*, respectively. By resetting the triggers 200*a* and 202*a* at the start of every reading operation, they will resume their normal equal position. It has been previously established that until some decision is made by the comparison circuits these triggers will indicate equal.

The O/R (output) comparator operates during writing time. The signal Write Gate is emitted from the cathode follower 860 (Fig. 159), output pin 7, and is transmitted to the O/R units corresponding to the units 244*a* and 246*a*, and will reset the O/R triggers, which correspond to the triggers 200*a* and 202*a* of the I/R comparator. Thus, prior to the start of any machine cycle during which a comparison is to be performed in a comparator, that comparator will be reset to its equal condition.

Prior to this time any decisions rendered by the comparators may have been wired on the control panel for control purposes by the operator. Since it is possible to compare on the first column of a record, provision must be made to reset the I/O comparator to its equal condition upon reception of a tape mark from tape. When a tape mark is sensed in the input character register, and if the run-out key is not depressed, the machine will stop, as previously described. At this point the operator may insert a new reel of information in the associated tape unit, depress the machine start key and resume operations. The tape mark read as the last character from the previous tape may have set the I/O comparison memory triggers (corresponding to the triggers 200*a* and 202*a*) to some position other than equal. In the case where a new tape is loaded into the machine, this is of no consequence, since the next operation will automatically reset these triggers to their equal position. If, however, upon sensing of the tape mark the machine is stopped and there is no further information to be inserted into the machine, the run-out key may be depressed, and due to the method of operation, the sequence triggers will not be normally reset at this time. It is possible that the machine might stop and indicate error in sequence if so wired on the control panel, since the comparison of the tape mark with any other character is not a valid comparison. To eliminate this remote possibility, a signal is emitted from a cathode follower 248*a* (Fig. 132), output pin 6, to the reset controls for the triggers in the I/O comparator memory triggers (corresponding to triggers 200*a* and 202*a*, Fig. 189). Thus, these triggers will be automatically reset to equal when the run-out key is depressed after one of the two input tapes have been exhausted.

The circuitry associated with each of the three sets of comparator memory triggers in the I/R, the O/R and the I/O units is identical, each being like the triggers 200*a* and 202*a* and their associated circuits as shown in Fig. 189. A description of the deconditioning arrangement for the I/R units will, therefore, suffice, the remaining deconditioning circuits being identical thereto.

It has been previously shown that when the triggers 200*a* and 202*a* are in their normal reset position, they will indicate an equal condition. This is established in the following manner. The output pin 8 of the trigger 200*a* is at a low potential and will condition the input pin 5 of an inverter 250*a*, thereby allowing a signal entering the input pin 5 of an inverter 252*a* to pass through its output pin 7, to a cathode follower 254*a*, via its output pin 6, to the relay R5–5 points (Fig. 190), through these normally closed points to the input pins 5 and 8 of an And circuit 256*a*. This unit is an isolation unit that will accept this signal and pass it through three isolating, self-contained units and via three wires will transmit the signal to the control panel to the three hubs marked equal in the input comparator section.

The high hub will not indicate at this time, since the output pin 7 of the trigger 202*a* (Fig. 189) has the proper voltage to decondition an inverter 258*a*, input pin 3, so as not to allow the signal entering the input pin 3 of an inverter 260*a* to pass through the coincidence unit formed by these inverters. The low hubs will not indicate on the control panel since the output pin 7 of the trigger 200*a* (Fig. 189) will decondition the coincidence circuit formed by the inverters 262*a* and 264*a*, input pins 5 and 3, respectively, and an inverter 266*a*, input pin 4. If the decision in the comparator had been low, then the high would remain deconditioned as previously described, the equal would now be deconditioned because the output pin 8 of the trigger 200*a* now deconditions the inverter 250*a* and the inverter 252*a* will not allow any pulse to pass through the control panel. The output pin 7 of the trigger 200*a* will transmit a signal to the input pin 5 of the inverter 262*a*. Since the trigger 202*a* is in its normal reset position at this time, the output pin 8 conditions the inverter 264*a*, input pin 3, so as to allow the signal entering the inverter 266*a*, input pin 4, to pass through this three-way coincidence unit, through a cathode follower 268*a*, output pin 6, through the normally closed relay R25–3 points, to the normally closed R5–6 relay points to the unit 270a, and through this unit via three wires to the control panel hubs marked low in the input comparator section.

If the indication from the memory triggers is that the record is high, then the equal condition indicating circuit will be deconditioned as previously described, the low condition indication will be deconditioned by the pulse at the output pin 8 of the trigger 202a (Fig. 189), the inverter 264a, input pin 3, thus deconditioning the low indicating circuit. The output pin 7 of the trigger 202a will condition the inverter 258a, input pin 3, so as to allow the signal entering the inverter 260a, input pin 3, to pass through the inverter 260a, output pin 7, through a cathode follower 272a, and via its output pin 7, to the normally closed R25–2 relay points (Fig. 190), through the normally closed R5–4 relay points to the unit 274a, input pins 5 and 8. The unit 174a, via the three wires, emits signals to the hubs marked high in the input comparator section of the control panel.

It should be noted that during the time that a record is being stored and compared, a multiplicity of intermediate decisions may be made prior to the final decision on a given record. Since this is true and also since the control fields may be in any portion of an incoming record, it was found desirable not to allow the results of comparison to be made available at the control panel until a given test time, at which time it is known that all comparison for any given record is complete.

The circuits of Fig. 133 are effective to generate a pair of signals Gate Test I/O; O/R and Gate Test I/R, as described hereinbefore.

In Fig. 133 the Gate Test I/O; O/R signal is emitted from the cathode follower 349, output pin 6, and in the same figure the cathode follower 307, output pin 7, emits the signal Gate Test I/R. Thus, the three coincidence units (Fig. 189) formed by the inverter 262a, input pin 5, inverter 264a, input pin 3 and inverter 266a, input 4, for low I/R (Fig. 190); the inverters 250a and 252a (Fig. 189), input pins 5 for the equal I/R; and the inverters 258a and 260a, input pins 3, for high I/R, are tested by the I/R gate pulse. The corresponding sets of coincidence units associated with the output comparator (O/R) and the sequence comparator (I/O) are tested by the Gate Test I/O; O/R signal.

Prior to the running out of information from one tape drive, the R5 and R6 relay points remain in the position shown in Fig. 190. The relay points R2–3 and R3–8 are also in their normally open positions. Therefore, during the time that information is being read from both drives, these points are in the position shown in Fig. 190. Upon reception of a tape mark from either of the input drives, the circuitry previously described will cause relay R5 (Fig. 141) to be energized through the power unit 416. The machine may stop at this time, and the operator may remove the reel just previously completely read and insert a new reel of tape. If this is done, relay R5 is once again deenergized and the R5 points shown in Fig. 190 will resume the position shown therein. The operation may now continue as normal. If, however, no further information is to be inserted into the machine and the run-out key is depressed, relay R5 will remain energized and the points thereof in Fig. 190 will be transferred. In addition to this, either relay R2 or relay R3 (Fig. 141) will, at this time, be energized, depending on which input-drive has sensed a tape mark. If tape drive T1 has sensed a tape mark, then relay R2 will be energized and its R2–8 points (Fig. 190) will at this time be closed.

A circuit then from the unit 274a (Fig. 190) is now completed through the normally open, but now closed, R5–4 relay points, through the normally open, but now closed, R2–8 points, and to the cathode follower 306, output pin 7 (Fig. 133). Hereafter, any time that the end of a record operation is sensed and coincidence units associated with the comparator memory triggers are scanned by the test I/R and test O/R gates, the signal will not be transmitted to the input high, equal, low hubs, since the circuit from the comparator is broken by the R5–4, R5–5 and R5–6 points (Fig. 190). In place of the decision rendered by these comparisons, the signal from the cathode follower 306 (Fig. 133), output pin 7, will pass through the R2–8 relay points, through the R5–4 relay points, to the high hubs on the control panel in the input comparator section.

The normal wiring on the control panel is that by which a high indicates memory M1 to be high, and as a consequence tape drive T2 will normally be wired to read at this time. Thus, by forcing a continuous high from the input comparator hubs, tape drive T2 will be constantly addressed thereafter until all information on the tape in tape drive T2 is transmitted through the machine and the end of the operation is sensed.

The output high, equal and low hubs, as previously described, emit comparison signals identical to those emitted by the input high, equal and low hubs in every respect, except that they are delayed in time for one machine cycle. Thus, the writing operation following the sensing of a tape mark will perform a normal O/R comparison, which will be transmitted through the R25–4 and the R25–5 relay points, to the R6–2, R6–3 and R6–4 relay points (Fig. 190), normally closed, to the high, equal and low units associated with the output hubs on the control panel. Thus, the pulses normally emitted from the output hubs one cycle after the pulses emitted from the input hubs will be made available at the control panel at this time. Since in this machine cycle the input hubs are forced to indicate a high through the circuitry previously explained, it will be necessary to transfer the relay R6 (Fig. 143) so that following the first cycle after sensing a tape mark the points of relay R6 will transfer to indicate the same high from the output comparator. The relay R6 (Fig. 143), as previously explained, is picked up upon the completion of the first writing cycle after a tape mark is sensed and the run-out key is depressed. Thus, after this time the R6–2, R6–3 and R6–4 relay points will transfer and will allow the signal that passes through the R2–8 relay points, normally open but now closed, to pass through the R6–2 points, normally open but now closed, to the high hubs associated with the output comparator. Hereafter, until the completion of the operation, then both the input high and ouput high hubs will emit signals.

This relay network is not associated with the sequence comparator (I/O comparator). The reason for this is that as long as records pass through the machine, a continuous check is maintained on their sequence so that at the completion of any given operation it is definitely known that all records on the output tape unit are in sequence or if they are not that some indication is made of the sequence being incomplete.

In the machine the comparisons available at the control panel use memory M1 as the reference. All comparisons then available at the control panel from the input and output comparators are in reference to memory M1. Thus, if a high signal is emitted from the input comparator, this indicates that the record in memory M1 is higher than the record in memory M2. Conversely, if the indication is low, then the record in memory M1 is lower than the record in memory M2. Exactly the same thing is true of the output comparator. The comparator as described to this point will compare two characters that come from effectively two different registers to the comparator, and comparison is made between them. These characters do not have a real assignment as to which memory or which tape they came from at this time. Thus, when the input record is compared against a remaining record, it is not yet determined which memory contains the remainder record and which is to receive the input record for comparison purposes.

The results of a comparison stored in the triggers 200a and 202a (Fig. 189) for the input comparison are transmitted through their associated network to the R25–2 and R25–3 relay points. It is by means of these relay points that a decision set in the compare memory triggers is given a reference to memory M1. The relay R25 is deenergized whenever tape drive T1 is selected as the next input unit. As previously described, when the feed T1 hubs (Fig. 134) are energized from the control panel, a signal is emitted from the output pin 4 of the switch 319 to the select T1 trigger and also to the trigger 294, turning the trigger 294 off. The output pin 7 of the trigger 294 deconditions a diode 276a (Fig. 134), input pin 6, so that the relay R25 connected to its output 7 is deenergized.

Thus, it can be said that when the relay R25 is in its normal deenergized state, tape drive T1 will feed and will store its record in memory M1. Therefore, at this time the input character compared to, for example, the remainder character shall make the input character the reference point as far as the comparator memory triggers are concerned. The decision is still made in normal fashion as previously described. The result of the decision is made available to the control panel through the normally closed R25–2 and R25–3 relay points in Fig. 190, through the previously described circuitry to the control panel.

When tape drive T2 is selected as the input unit, a signal will be generated from the output pin 4 of the switch 292 (Fig. 134) to select tape drive T2, via the select T2 trigger, and it will also turn on the trigger 294, output pin 7 of which will energize the diode 276a to allow relay R25 to be energized. Energization of the relay R25 will cause the transfer of the R25–2, R25–3, R25–4 and R25–5 relay points in Fig. 190. Thus, now T2 is the input. The decision rendered in reference to characters coming from T2, and as stored in the comparator memory triggers, will be transmitted through the normal circuits associated with these triggers, but now through the transferred points of relay R25, so that if the input character from tape T2 is higher than the remaining character in memory M1, the high decision emitted from the cathode follower 272a (Fig. 189), output pin 7, will now pass through the normally open R25–2 relay points, now closed, to the R5–6 relay points, normally closed, to the unit 270a, and from there to the control panel hubs marked low under the input comparator. Thus, while the decision in the machine, as to the input record against the remaining record, indicates the input to be high, the decision in reference to memory M1 is actually low. The converse of this is true if the result of the comparison at this time had indicated low. The O/R comparator unit operates in identical fashion to the unit just described. The sequence unit does not require to know from which memory the comparison data is obtained. From this comparator it is only required to know whether records flowing from the machine, either memory or tape, are in sequence. No effort has therefore been made to cause the sequence unit to emit signals in reference to either memory.

What is claimed is:

1. In a record processing machine, a first and a second pair of record reading and reproducing devices, a pair of data storage means, each said storage means being operable to receive and retain records selectively from a selected one of said first pair of record reading and reproducing devices or from a selected one of said second pair of record reading and reproducing devices, input and output lines between each of said record storage means and each of said pair of record reading and reproducing devices, means for switching said input and output lines to connect selectively said record reading and reproducing devices to said pair of storage means as input or output devices, means for transmitting records from one of said pairs of record reading and reproducing devices to said pair of storage means, means for comparing the sequence of records entered into said pair of storage means, means for transmitting records from said storage means to said comparing means, means responsive to said comparing means for selecting one of the record reading and reproducing devices of the other pair for reproducing therein compared sequential records, means responsive also to said comparing means for selecting the other one of said last named pair of record reading and reproducing devices for reproducing therein compared records of a different sequence, means for sensing the end of input records, and means responsive to said sensing means for activating said switching means and thereby alternating the input and output functions of said first and second pair of record reading and reproducing devices.

2. In a record processing machine, a first and a second pair of record reading and reproducing devices, a pair of data storage means, each said storage means being operable to receive and retain records selectively from a selected one of said first pair of record reading and reproducing devices or from a selected one of said second pair of record reading and reproducing devices, input and output lines between each of said record storage means and each of said pair of record reading and reproducing devices, means for switching said input and output lines to connect selectively said record reading and reproducing devices to said pair of storage means as input or output devices, means for transmitting records from one of said pairs of record reading and reproducing devices to said pair of storage means, means for comparing the sequence of records entered into said pair of storage means, means for transmitting records from said storage means to said comparing means, means responsive to said comparing means for selecting one of the record reading and reproducing devices of the other pair for reproducing therein compared sequential records, means responsive also to said comparing means for selecting the other one of said last named pair of record reading and reproducing devices for reproducing therein compared records of a different sequence, means for sensing the end of input records, means responsive to said comparing means for selecting one of said first named pair of record reading and reproducing means for transmitting subsequent records to said data storage means, and means responsive to said sensing means for activating said switching means and thereby alternating the input and output functions of said first and second pair of record reading and reproducing devices.

3. In a record processing machine, a first and a second pair of magnetic tape record reading and reproducing devices, a pair of electrostatic data storage means, each said storage means being operable to receive and retain records selectively from a selected one of said first pair of magnetic tape record reading and reproducing devices or from a selected one of said second pair of magnetic tape record reading and reproducing devices, input and output lines between each of said electrostatic storage means and each of said pair of magnetic tape record reading and reproducing devices, means for switching said input and output lines to connect selectively said magnetic tape record reading and reproducing devices to said pair of electrostatic storage means as input or output devices, means for transmitting records from one of said pairs of magnetic tape record reading and reproducing devices to said pair of electrostatic storage means, means for comparing the sequence of records entered into said pair of electrostatic storage means, means for transmitting records from said electrostatic storage means to said comparing means, means responsive to said comparing means for selecting one of the magnetic tape record reading and reproducing devices of the other pair for reproducing on a magnetic tape therein compared sequential records, means responsive also to said comparing means for selecting the other one of said last named pair of magnetic tape record reading and reproducing devices for reproducing on a magnetic tape therein compared records of a different sequence, means for sensing the end of input records, and means responsive to said sensing means for activating said switching means and thereby alternating the input and output functions of said first and second pair of magnetic tape record reading and reproducing devices.

4. In a data processing machine, a record input device adapted to read input records arranged in random on a record medium, a pair of data storage devices associated with said input record reading device, means for transmitting to said storage devices records read in said input record reading device, means for comparing a pair of records transmitted to said respective storage devices, a pair of record reproducing devices, and means under control of said record comparing means for selecting one of said record reproducing devices for the reproduction of one of said records being compared in said comparing means.

5. In a data processing machine, a record input device adapted to read input records arranged in random on a record medium, a pair of data storage devices associated with said input record reading device, means for transmitting to said storage devices records read in said associated input record reading device, a column counter having an output for each character of a record entered into said storage devices, means for successively comparing minor and major fields of pairs of records transmitted to said respective storage devices, means for selectively connecting outputs of said column counter to said comparing means for initiating and terminating the operation thereof, means for retaining memory of minor field comparisons until altered by a major field comparison, said last named means comprising a pair of bistable elements having an on position and a normal off position for manifesting an equality between two records being compared in said comparing means when both elements of said pair are either in their on position or in their off position and for manifesting a difference between two records being compared in said comparing means when either of said elements is in its on position while the other of said elements is in its off position, a pair of record reproducing devices, and means under control of said record comparing means for selecting one of said record reproducing devices for the reproduction of one of said records being compared in said comparing means.

6. In a data processing machine, a record input device adapted to read input records arranged in random on a record tape, a pair of data storage devices associated with said input record reading device, means for transmitting to said storage devices records read in said associated input record reading device, means for comparing successive minor and major fields of pairs of records transmitted to said respective storage devices, means for transmitting records to said comparing means, means for retaining memory of minor field comparisons until altered by a major field comparison, said last named means comprising a pair of bistable elements having an on position and a normal off position for manifesting an equality between two records being compared in said comparing means when both elements of said pair are either in their on position or in their off position and for manifesting a difference between two records being compared in said comparing means when either of said elements is in its on position while the other of said elements is in its off position, a pair of record reproducing devices, and means under control of the results of a major field comparison in said record comparing means for selecting one of said record reproducing devices for the reproduction of one of said records being compared in said comparing means.

7. In a data processing machine, a record input device adapted to read input records arranged in random on a record medium, a pair of data storage devices associated with said input record reading device, a first character register operatively connected with said input reading device for transmitting to said storage devices records read in said associated input record reading device, means for transmitting records from said input device to said first character register, means for comparing a pair of records transmitted to said respective storage devices, a pair of record reproducing devices, means under control of said record comparing means for selecting one of said record reproducing devices for reproducing as an output record one of said records being compared in said comparing means, a second character register for transmitting said output record to the selected one of said record reproducing devices, a connection between said comparing means and said second character register for transmitting data from said comparing means to said second character register, means for sensing the end of a record in said second character register, and means responsive to said sensing means for disabling said selected reproducing device.

8. In a data processing machine, a record input device adapted to read input records arranged in random on a record medium, a pair of data storage devices associated with said input record reading device, means for transmitting to said storage devices records read in said associated input record reading device, means for comparing a pair of records transmitted to said respective storage devices, a pair of record reproducing devices, means under control of said record comparing means for selecting one of said record reproducing devices for the reproduction of one of said records being compared in said comparing means, a character register for output records, means for transmitting records from said storage devices to said character register, means associated with said character register adapted to recognize the end of a record in said character register, and means responsive to said recognizing means for disabling said record reproducing device.

9. In a data processing machine, a record input device adapted to read input records arranged in random on a record medium, a pair of data storage devices associated with said input record reading device, means for transmitting to said storage devices records read in said associated input record reading device, means for comparing a pair of records transmitted to said respective storage devices, a pair of record reproducing devices, means under control of said record comparing means for selecting one of said record reproducing devices for the reproduction of one of said records being compared in said comparing means, means for transmitting records from said storage devices to said character register, means also under control of said comparing means for selecting one of said pair of record input devices to read the next record into its associated data storage device, a character register for output records, and means under control of said character register for causing a selected input record reading device to read an input record therein.

10. In a data processing machine, a pair of record input devices adapted to read input records arranged in random on a record medium, a data storage device associated with each of said input record reading devices, means for individually selecting said input devices for reading input records, a first character register for transmitting to said storage devices records read in said associated input record reading devices, means for comparing a pair of records transmitted to said respective storage devices, a pair of record reproducing devices, means under control of said record comparing means for selecting one of said record reproducing devices for reproducing as an output record one of said records being compared in said comparing means, a second character register for transmitting said output record to the selected one of said record reproducing devices, means for sensing the end of a file of records in said first character register, and means responsive to said sensing means for disabling a selected input device.

11. In a data processing machine, a pair of tape record input devices adapted to read input records arranged in random on a record tape, a data storage device associated with each of said input record reading devices, means for individually selecting said input devices for reading input records, a first character register for transmitting to said storage devices records read in said associated input record reading devices, means for transmitting records from said input devices to said first character register, means for comparing a pair of records transmitted to said respective storage devices, a pair of record reproducing devices, means under control of said record comparing means for selecting one of said record reproducing devices for the reproducing as an output record of one of said records being compared in said comparing means, a second character register for transmitting said output record to the selected one of said record reproducing devices, a connection between said comparing means and said second character register for transmitting records from said comparing means to said second character register, means for sensing the end of a file of records in said first character register, and means responsive to said sensing means for rewinding a record tape in a selected input device.

12. In a data sorting machine, a record input device adapted to read input records arranged in random on a record medium, a pair of data storage devices associated with said input record reading device, means for transmitting to said storage devices records read in said associated input record reading device, means for comparing a pair of records transmitted to said respective storage devices, a pair of record reproducing devices, means under control of said record comparing means for selecting one of said record reproducing devices for the reproduction of one of said records being compared in said comparing means, means for sensing the end of input records entered into each of said data storage devices, and means responsive to the sensing of the end of input records in both of said data storage devices for terminating said input-output operation.

13. In a data processing machine, a first and second record input device adapted to read input records, a data storage device associated with each of said input record reading devices, means for entering a control character from said first record input device into its associated data storage device, means for entering a succession of records having control characters into the other of said storage devices from the second of said record input devices, means for comparing said control character with the control characters of said succession of records, a record reproducing device, and means under control of said comparing means for transmitting to said reproducing device for reproduction therein all of said records of which the control character is equal to the control character of said first record input device.

14. In a data processing machine, a tape record input device adapted to read input records arranged in random on a record tape, a pair of data storage devices associated with said input record reading device, means for transmitting to said storage devices records read in said associated input record reading device, means for comparing a pair of records transmitted to said respective storage devices, a pair of record tape reproducing devices, and means under control of said record comparing means for selecting one of said record tape reproducing devices for the reproduction on a record tape of one of said records being compared in said comparing means.

15. In a data processing machine, a tape record device adapted to read input records arranged in random on a record tape, a pair of data storage devices associated with said input record reading device, means for transmitting to said storage devices records read in said associated input record reading device, a column counter having an output for each character of a record entered into said storage devices, means for comparing minor and major fields of pairs of records transmitted to said respective storage devices, means for selectively connecting outputs of said column counter to said comparing means for initiating and terminating the operation thereof, means for retaining memory of minor field comparisons until altered by a major field comparison, said last named means comprising a pair of bistable elements having an on position and a normal off position for manifesting an equality between two records being compared in said comparing means when both elements of said pair are either in their on position or in their off position and for manifesting a difference between two records being compared in said comparing means when either of said elements is in its on position while the other of its elements is in its off position, a pair of record tape reproducing devices, and means under control of said record comparing means for selecting one of said tape record reproducing devices for the reproduction on a record tape of one of said records being compared in said comparing means.

16. In a data processing machine, a tape record input device adapted to read input records arranged in random on a record tape, a pair of data storage devices associated with said input records reading device, means for transmitting to said storage devices records read in said associated input record reading device, means for successively comparing minor and major fields of pairs of records transmitted to said respective storage devices, means for transmitting records to said comparing means, means for retaining memory of minor fields comparisons until altered by a major field comparison, said last named means comprising a pair of bistable elements having an on position and a normal off position manifesting an equality between two records being compared in said comparing means when both elements of said pair are either in their on position or in their off position and for manifesting a difference between two records being compared in said comparing means when either of said elements is in its on position while the other of said elements is in its off position, a pair of record tape reproducing devices, and means under control of a major field comparison in said record comparing means for selecting one of said tape record reproducing devices for the reproduction on a record tape of one of said records being compared in said comparing means.

17. In a data processing machine, a tape record input device adapted to read input records arranged in random on a record tape, a pair of data storage devices associated with said input record reading device, a first character register operatively connected to said tape record input device for transmitting to said storage devices records read in said associated input record reading device, means for transmitting records from said input device to said first character register, means for comparing a pair of records transmitted to said respective storage devices, a pair of record tape reproducing devices, means under control of said record comparing means for selecting one of said record tape reproducing devices for reproducing on a record tape as an output record one of said records being compared in said comparing means, a second character register for transmitting said output records to the selected one of said record tape reproducing devices, a connection between said comparing means and said second character register for transmitting records from said comparing means to said second character register, means for sensing the end of a record in said second character register, and means responsive to said sensing means for disabling said selected record tape reproducing device.

18. In a data processing machine, a tape record input device adapted to read input records arranged in random on a record tape, a pair of data storage devices associated with said input record reading device, means for transmitting to said storage devices records read in said associated input record reading device, means for comparing a pair of records transmitted to said respective storage devices, a pair of record tape reproducing devices, means under control of said record comparing means for selecting one of said record tape reproducing devices for the reproduction on a record tape of one of said records being compared in said comparing means, a character register for output records, a connection between said comparing means and said character register for transmitting records from said comparing means to said character register, means associated with said character register adapted to recognize the end of a record in said character register, and means responsive to said recognizing means for disabling said record tape reproducing device.

19. In a data processing machine, a pair of record tape input devices adapted to read input records arranged in random on a record tape, a data storage device associated with each of said input record reading devices, means for transmitting to said storage devices records read in said associated input record reading devices, means for comparing a pair of records transmitted to said respective storage devices, a pair of record tape reproducing devices, means under control of said record comparing means for selecting one of said record tape reproducing devices for the reproduction on a record tape of one of said records being compared in said comparing means, means also under control of said comparing means for selecting one of said pair of record input devices to read the next record from tape into its associated data storage device, a character register for output records, a connection between said comparing means and said character register for transmitting records from said comparing means to said character register, and means under control of said character register for causing a selected input record tape reading device to read an input record from a record tape therein.

20. In a data processing machine, a pair of record tape input devices adapted to read input records arranged in random on a record tape, a data storage device associated with each of said input record reading devices, means for individually selecting said input devices for reading input records, a first character register for transmitting to said storage devices records read in said associated input record reading devices, means for transmitting records from said input devices to said first character register, means for comparing a pair of records transmitted to said respective storage devices, a pair of record tape reproducing devices, means under control of said record comparing means for selecting one of said record tape reproducing devices for the reproducing on a record tape as an output record one of said records being compared in said comparing means, a second character register for transmitting said output record to the selected one of said record tape reproducing devices, a connection between said comparing means and said second character register for transmitting records from said comparing means to said second character register, means for sensing the end of a file of records in said first character register, and means responsive to said sensing means for disabling a selected input device.

21. In a data sorting machine, a record tape input device adapted to read input records arranged in random on a record tape, a pair of data storage devices associated with said input record reading device, means for transmitting to said storage devices records read from tape in said associated input record reading device, means for comparing a pair of records transmitted to said respective storage devices, a pair of record tape reproducing devices, means under control of said record comparing means for selecting one of said record tape reproducing devices for the reproduction on tape therein of one of said records being compared in said comparing means, means for sensing the end of input records entered into each of said data storage devices, and means responsive to the sensing of the end of input records in both of said data storage devices for terminating said input-output operation.

22. In a data processing machine, a first and second record tape input device adapted to read input records from tape, a data storage device associated with each of said input record reading devices, means for entering a control character read from tape in said first record input device into its associated data storage device, means for entering a succession of records from tape having control characters into the other of said storage devices from the second of said record tape input device, means for comparing said control character with the control characters of said succession of records, a record tape reproducing device, and means under control of said comparing means for transmitting to said reproducing device for reproduction on a record tape therein all of said records of which the control character is equal to the control character of said first record input device.

23. In a data processing machine, a magnetic tape record reading and input device adapted to read input records arranged in random on a magnetic record tape, a pair of electrostatic data storage devices associated with said record reading and input device, means for transmitting to said electrostatic storage devices records read from magnetic tape in said associated record reading and input device, means for comparing a pair of records transmitted to said respective electrostatic storage devices, a pair of magnetic tape record reproducing devices, and means under control of said record comparing means for selecting one of said magnetic tape record reproducing devices for the reproduction on a magnetic tape of one of said records being compared in said comparing means.

24. In a data processing machine, a magnetic tape record reading and input device adapted to read input records arranged in random on a magnetic record tape, a pair of electrostatic storage devices associated with said record reading and input device, means for transmitting to said electrostatic storage devices records read from magnetic tape in said associated record reading and input device, a column counter having an output for each character of a record entered into said electrostatic storage devices, means for successively comparing minor and major fields of pairs of records transmitted to said respective storage devices, means for selectively connecting outputs of said column counter to said comparing means for initiating and terminating the operation thereof, means for retaining memory of minor field comparisons until altered by a major field comparison, said last named means comprising a pair of bistable elements having an on position and a normal off position for manifesting an equality between two records being compared in said comparing means when both elements of said pair are either in their on position or in their off position and for manifesting a difference between two records being compared in said comparing means when either of said elements is in its on position while the other of its said elements is in its off position, a pair of magnetic tape record reproducing devices, and means under control of said record comparing means for selecting one of said magnetic tape reproducing devices for the reproduction of magnetic tape of one of said records being compared in said comparing means.

25. In a data processing machine, a magnetic tape reading and record input device adapted to read input records arranged in random on a magnetic record tape, a pair of electrostatic data storage devices associated with said record reading and input device, means for transmitting to said electrostatic storage devices records read from magnetic tape in said associated record reading and input device, means for successively comparing minor and major fields of pairs of records transmitted to said respective electrostatic storage devices, means for transmitting records to said comparing means, means for retaining memory of a minor field comparison until altered by a major field comparison, said last named means comprising a pair of bistable elements having an on position and a normal off position for manifesting an equality between two records being compared in said comparing means when both elements of said pair are either in their on position or in their off position and for manifesting a difference between two records being compared in said comparing means when either of said elements is in its on position while the other of said elements is in its off position, a pair of magnetic tape reproducing devices, and means under control of a major field comparison in said record comparing means for selecting one of said magnetic tape record reproducing devices for reproduction on magnetic tape of one of said records being compared in said comparing means.

26. In a data processing machine, a magnetic tape record reading and input device adapted to read input records arranged in random on a magnetic record tape, a pair of electrostatic data storage devices associated with said record reading and input device, a first character register operatively connected to said tape record reading and input device for transmitting to said electrostatic storage devices records read from magnetic tape in said associated record reading and input device, means for transmitting records from said input device to said character register, means for comparing a pair of records transmitted to said respective storage devices, a pair of magnetic tape record reproducing devices, means under control of said record comparing means for selecting one of said magnetic tape record reproducing devices for reproducing on magnetic tape as an output record one of said records being compared in said comparing means, a second character register for transmitting said output record to the selected one of said magnetic tape record reproducing devices, a connection between said comparing means and said second character register for transmitting records from said comparing means to said second character register, means for sensing the end of a record in said second character register, and means responsive to said sensing means for disabling said selected magnetic tape record reproducing device.

27. In a data processing machine, a magnetic tape record reading and input device adapted to read input records arranged in random on a magnetic record tape, a pair of electrostatic data storage devices associated with said record reading and input device, means for transmitting to said electrostatic storage devices records read from magnetic tape in said associated record reading and input device, means for comparing a pair of records transmitted to said respective storage devices, a pair of magnetic tape record reproducing devices, means under control of said record comparing means for selecting one of said magnetic tape record reproducing devices for the reproduction of one of said records being compared in said comparing means, a character register for output records, a connection between said comparing means and said character register for transmitting records from said comparing means to said character register, means associated with said character register adapted to recognize the end of a record in said character register, and means responsive to said recognizing means for disabling said magnetic tape record reproducing device.

28. In a data processing machine, a pair of magnetic tape record reading and input devices adapted to read input records arranged in random on a magnetic record tape, an electrostatic data storage device associated with each of said record reading and input devices, means for transmitting to said electrostatic storage devices records read from magnetic tape in said associated record reading and input devices, means for comparing a pair of records transmitted to said respective storage devices, a pair of magnetic tape record reproducing devices, means under control of said record comparing means for selecting one of said magnetic tape record reproducing devices for the reproduction of one of said records being compared in said comparing means, means also under control of said comparing means for selecting one of said pair of magnetic tape record reading and input devices to read the next record into its associated data storage device, a character register for output records, a connection between said comparing means and said character register for transmitting records from said comparing means to said character register, and means under control of said character register for causing a selected magnetic tape record reading and input device to read an input record from magnetic tape therein.

29. In a data processing machine, a pair of magnetic tape record reading and input devices adapted to read input records arranged in random on a magnetic record tape, an electrostatic data storage device associated with each of said record reading and input devices, means for individually selecting said magnetic tape record reading and input devices for reading input records from magnetic tape, means for transmitting records from said input devices to said first character register, a first character register for transmitting to said electrostatic storage devices records read from magnetic tape in said associated input record reading devices, means for comparing a pair of records transmitted to said respective storage devices, a pair of magnetic tape record reproducing devices, means under control of said record comparing means for selecting one of said magnetic tape record reproducing devices for the reproducing on magnetic tape as an output record one of said records being compared in said comparing means, a second character register for transmitting said output record to the selected one of said magnetic tape record reproducing devices, a connection between said comparing means and said second character register for transmitting records from said comparing means to said second character register, means for sensing the end of a file of records in said first character register, and means responsive to said sensing means for disabling a selected magnetic tape record reading and input device.

30. In a data processing machine, a pair of magnetic tape reading and input devices adapted to read input records arranged in random on a magnetic record tape, an electrostatic data storage device associated with each of said record reading and input devices, means for individually selecting said magnetic tape record reading and input devices for reading input records from magnetic tape, a first character register for transmitting to said electrostatic storage devices records read from magnetic tape in said associated input record reading devices, means for comparing a pair of records transmitted to said respective storage devices, a pair of magnetic tape record reproducing devices, means under control of said record comparing means for selecting one of said magnetic tape record reproducing devices for the reproducing on magnetic tape as an output record one of said records being compared in said comparing means, a second character register for transmitting said output record to the selected one of said magnetic tape record reproducing devices, means for sensing the end of a file of records in said first character register, and means responsive to said sensing means for rewinding a magnetic record tape in a selected input device.

31. In a data sorting machine a pair of magnetic tape record input devices adapted to read input records arranged in random on a magnetic tape, an electrostatic data storage device associated with each of said magnetic tape record reading devices, means for transmitting to said electrostatic storage devices records read from magnetic tape in said associated magnetic tape record reading devices, means for comparing a pair of records transmitted to said respective electrostatic storage devices, a pair of magnetic tape recording devices, means under control of said record comparing means for selecting one of said magnetic tape recording devices for the reproduction on magnetic tape of one of said records being compared in said comparing means, means for sensing the end of input records entered into each of said data storage devices, and means responsive to the sensing of the end of input records in both of said data storage devices for terminating said input-output operation.

32. In a data processing machine, a first and second magnetic tape record input device adapted to read input records from magnetic tape, an electrostatic data storage device associated with each of said magnetic tape record reading devices, means for entering a control character from said first magnetic tape record input device into its associated electrostatic data storage device, means for entering a succession of records having control characters into the other of said electrostatic storage devices from the second of said magnetic tape record input devices, means for comparing said control character with the control characters of said succession of records, a magnetic tape record reproducing device, and means under control of said comparing means for transmitting to said magnetic tape record reproducing device for reproduction on magnetic tape therein all of said records of which the control character is equal to the control character of said first record input device.

33. In a data processing machine, a first and second record tape input device adapted to read input records from tape, a data storage device associated with each of said input record reading devices, means for entering a control character read from tape in said first record input device into its associated data storage device, means for entering a succession of records from tape having control characters into the other of said storage devices from the second of said record tape input devices, means for comparing said control character with the control characters of said succession of records, a record tape reproducing device, means under control of said comparing means for transmitting to said reproducing device for reproduction on a record tape therein all of said records of which the control character is equal to the control character of said first record input device, and a second record tape reproducing device adapted to reproduce on a record tape said succession of records from the second of said record tape input devices.

34. In a data processing machine, a first and second magnetic tape record input device adapted to read input records from magnetic tape, an electrostatic data storage device associated with each of said magnetic tape record reading devices, means for entering a control character read from said first magnetic tape in said first record input device into its associated electrostatic data storage device, means for entering a succession of records from tape having control characters into the other of said electrostatic storage devices from the second of said magnetic tape record input devices, means for comparing said control character with the control characters of said succession of records, a magnetic tape record reproducing device, means under the control of said comparing means for transmitting to said magnetic tape record reproducing device for reproduction on a magnetic tape record therein all of said records of which the control character is equal to the control character of said first record input device, and a second magnetic tape record reproducing device adapted to reproduce on a magnetic tape therein said succession of records from the second of said magnetic tape record input devices.

35. In a data processing machine, a record input device adapted to read input records arranged in random on a record medium, a pair of data storage devices associated with said input record reading device, means for transmitting to said storage devices records read in said associated input record reading device, a column counter having an output for each character of a record entered into said storage devices, means for successively comparing minor and major fields of pairs of records transmitted to said respective storage devices, means for selectively connecting outputs of said column counter to said comparing means for initiating and terminating the operation thereof, means for retaining memory of minor field comparisons until altered by a major field comparison, said last named means comprising a pair of bistable elements having an on position and a normal off position for manifesting an equality between two records being compared in said comparing means when both elements of said pair are either in their on position or in their off position and for manifesting a difference between two records being compared in said comparing means when either of said elements is in its on position while the other of said elements is in its off position, a pair of record reproducing devices, means for detecting the beginning of a major comparison field, a connection between said detecting means and said bistable elements for transmitting a pulse effective to set said elements to their off position, and means under control of said record comparing means following comparison of a major comparison field therein for selecting one of said record reproducing devices for the reproduction of one of said records being compared in said comparing means.

36. In a data processing machine, a record input device adapted to read input records arranged in random on a record tape, a pair of data storage devices ssociated with said input record reading devices, means for transmitting to said storage devices records read in said associated input record reading device, means for camparing successive minor and major fields of pairs of records transmitted to said respective storage devices, means for retaining memory of minor field comparisons until altered by a major field comparison, said last named means comprising a pair of bistable elements having an on position and a normal off position for manifesting an equality between two records being compared in said comparing means when both elements of said pair are either in their on position or in their off position, and for manifesting a difference between two records being compared in said comparing means when either of said elements is in its on position while the other of said elements is in its off position, means for detecting the beginning of a major comparison field, a connection between said detecting means and said bistable elements for transmitting a pulse to set said elements to their off position, a pair of record reproducing devices, and means under control of the results of a major field comparison in said record comparing means for selecting one of said record reproducing devices for the reproduction of one of said records being compared in said comparing means.

37. In a data processing machine, a tape record device adapted to read input records arranged in random on a record tape, a pair of data storage devices associated with said input record reading device, means for transmitting to said storage devices records read in said associated input record reading device, a column counter having an output for each character of a record entered into said storage devices, means for comparing minor and major fields of pairs of records transmitted to said respective storage devices, means for selectively connecting outputs of said column counter to said comparing means for initiating and terminating the operation thereof, means for retaining memory of minor field comparisons until altered by a major field comparison, said last named means comprising a pair of bistable elements having an on position and a normal off position for manifesting an equality between two records being compared in said comparing means when both elements of said pair are either in their on position or in their off position and for manifesting a difference between two records being compared in said comparing means when either of said elements is in its on position while the other of its elements is in its off position, means for detecting the beginning of a major comparison field, a connection between said detecting means and said bistable elements for transmitting a pulse effective to set said elements to their off position, a pair of record tape reproducing devices, and means under control of said record comparing means following comparison of a major comparison field therein for selecting one of said tape record reproducing devices for the reproduction on a record tape of one of said records being compared in said comparing means.

38. In a data processing machine, a tape record input device adapted to read input records arranged in random on a record tape, a pair of data storage devices associated with said input records reading device, means for transmitting to said storage devices records read in said associated input record reading device, means for successively comparing minor and major fields of pairs of records transmitted to said respective storage devices, means for transmitting records to said comparing means, means for retaining memory of minor field comparisons until altered by a major field comparison, said last named means comprising a pair of bistable elements having an on position and a normal off position manifesting an equality between two records being compared in said comparing means when both elements of said pair are either in their on position or in their off position and for manifesting a difference between two records being compared in said comparing means when either of said elements is in its on position while the other of said elements is in its off position, means for detecting the beginning of a major comparison field, a connection between said detecting means and said bistable elements for transmitting a pulse effective to set said elements to their off position, a pair of record tape reproducing devices, and means under control of a major field comparison in said record comparing means for selecting one of said tape record reproducing devices for the reproduction on a record tape of one of said records being compared in said comparing means.

39. In a data processing machine, a magnetic tape record reading and input device adapted to read input records arranged in random on a magnetic record tape, a pair of electrostatic storage devices associated with said record reading and input device, means for transmitting to said electrostatic storage devices records read from magnetic tape in said associated record reading and input device, a column counter having an output for each character of a record entered into said electrostatic storage devices, means for successively comparing minor and major fields of pairs of records transmitted to said respective storage devices, means for selectively connecting outputs of said column counter to said comparing means for initiating and terminating operation thereof, means for retaining memory of minor field comparisons until altered by a major field comparison, said last named means comprising a pair of bistable elements having an on position and a normal off position for manifesting an equality between two records being compared in said comparing means when both elements of said pair are either in their on position or in their off position and for manifesting a difference between two records being compared in said comparing means when either of said elements is in its on position while the other of its said elements it in its off position, means for detecting the beginning of a major comparison field, a connection between said detecting means and said bistable elements for transmitting a pulse effective to set said bistable elements to their off position, a pair of magnetic tape record reproducing devices, and means under control of said record comparing means following comparison of a major comparison field therein for selecting one of said magnetic tape reproducing devices for the reproduction of magnetic tape of one of said records being compared in said comparing means.

40. In a data processing machine, a magnetic tape reading and record input device adapted to read input records arranged in random on a magnetic record tape, a pair of electrostatic data storage devices associated with said record reading and input device, means for transmitting to said electrostatic storage devices records read from magnetic tape in said associated record reading and input device, means for successively comparing minor and major fields of pairs of records transmitted to said respective electrostatic storage devices, means for transmitting records to said comparing means, means for retaining memory of a minor field comparison until altered by a major field comparison, said last named means comprising a pair of bistable elements having an on position and a normal off position for manifesting an equality between two records being compared in said comparing means when both elements of said pair are either in their on position or in their off position and for manifesting a difference between two records being compared in said comparing means when either of said elements is in its on position while the other of said elements is in its off position, a pair of magnetic tape reproducing devices, means for detecting the beginning of a major comparison field, a connection between said detecting means and said bistable elements for transmitting a pulse effective to set said elements to their off position, and means under control of a major field comparison in said record comparing means for selecting one of said magnetic tape record reproducing devices for reproduction on magnetic tape of one of said records being compared in said comparing means.

41. In a data processing machine, a record input device adapted to read input records arranged in random on a record medium, a record storage device connected to said input device for storing a pair of input records, a first record reproducing device and a second record reproducing device, means for comparing a pair of input records transmitted to said storage device from said record input device to designate which of such pair of records shall be the output record and which shall be the remainder record, means under control of said record comparing means for selecting said first record reproducing device for the reproduction of an output record designated by said comparing means, a memory device for retaining said memory of an output record, means for actuating said record input device to read successive input records into said record storage device, means for comparing input records in said record storage device with a last output record and a last output record with the remainder record, and means under control of said last named comparing means for selecting either said first record reproducing device or said second reproducing device for the reproduction therein of either an input record or a remainder record.

42. In a data processing machine, a magnetic tape record reading device adapted to read records arranged in random on a magnetic tape, a record storage device connected to said magnetic tape reading device for storing a pair of input records, a first magnetic tape record reproducing device and a second magnetic tape record reproducing device, means for comparing a pair of input records transmitted to said storage device from said magnetic tape record reading device to designate which of such pair of records shall be the output record and which shall be the remainder record, means under control of said record comparing means for selecting said first magnetic tape record reproducing device for the reproduction of an output record designated by said comparing means, a memory device for retaining memory of an output record, means for actuating said magnetic tape record reading device to read successive input records into said record storage device, means for comparing input records in said record storage device with a last output record and a last output record with the remainder record, and means under control of said last named comparing means for selecting either said first magnetic tape record reproducing device or said second magnetic tape record reproducing device for the reproduction therein of either an input record or a remainder record.

43. In a data processing machine, a record input device adapted to read input records arranged in random on a record medium, a record storage device connected to said input device for storing a pair of input records, a first record reproducing device and a second record reproducing device, means for comparing a pair of input records transmitted to said storage device from said record input device to designate which of such pair of records shall be the output record and which shall be the remainder record, means under control of said record comparing means for selecting said first record reproducing device for the reproduction of an output record designated by said comparing means, a memory device for retaining memory of an output record, means for actuating said record input device to read successive input records into said record storage device, means for comparing input records in said record storage device with a last output record and a last output record with the remainder record to determine whether both an input record and a remainder record therein are lower than a last output record, and means under control of said last named comparing means when both an input record and a remainder record are lower than a last output record for selecting said second reproducing device for the reproduction therein of the next output record.

44. In a data processing machine, a magnetic tape record input reading device adapted to read input records arranged in random on a magnetic tape, a record storage device connected to said magnetic tape reading device for storing a pair of input records, a first magnetic tape record reproducing device and a second magnetic tape record reproducing device, means for comparing a pair of input records transmitted to said storage device from said magnetic tape record reading device to designate which of such pair of records shall be the output record and which shall be the remainder record, means under control of said record comparing means for selecting said first magnetic tape record reproducing device for the reproduction of an output record designated by said comparing means, a memory device for retaining memory of an output record, means for actuating said magnetic tape record reading device to read successive input records into said record storage device, means for comparing input records in said record storage device with a last output record and a last output record with the remainder record to determine whether both an input record and a remainder record therein are lower than a last output record, and means under control of said last named comparing means when both an output record and a remainder record are lower than a last output record for selecting said second magnetic tape record reproducing device for the reproduction therein of the next output record.

45. In a data processing machine, a pair of record input devices adapted to read input records arranged in random on a record medium, a record storage device connected to each of said input devices for storing a pair of input records from said respectively connected record input devices, a first record reproducing device and a second record reproducing device, means for comparing a pair of input records transmitted to said storage devices from said respectively connected record input devices to designate which of such records shall be the output record and which shall be the remainder record, means under control of said record comparing means for selecting said first record reproducing device for the reproduction of an output record designated by said comparing means, a memory device for retaining memory of an output record, means under control of said record comparing means for selecting one of said record input devices to read the next input record into its connected record storage device, means for comparing input records in said record storage device with a last output record and a last output record with the remainder record in its storage device, and means under control of said last named comparing means for selecting either said first record reproducing device or said second reproducing device for the reproduction therein of either an input record or a remainder record.

46. In a data processing machine, a pair of magnetic record input reading devices adapted to read input records arranged in random on a magnetic tape, a record storage device connected to each of said magnetic tape reading devices for storing a pair of input records from said respectively connected magnetic tape record input devices, a first magnetic tape record reproducing device and a second magnetic tape record reproducing device, means for comparing a pair of input records transmitted to said storage devices from said respectively connected magnetic tape record input devices to designate which of such records shall be the output record and which shall be the remainder record, means under control of said record comparing means for selecting said first magnetic tape record reproducing device for the reproduction of an output record designated by said comparing means, a memory device for retaining memory of an output record, means under control of said record comparing means for selecting one of said magnetic tape record input devices to read the next input record into its connected record storage device, means for comparing input records in said record storage device with a last output record and a last output record with the remainder record in its storage device, and means under control of said last named comparing means for selecting either said first magnetic tape record reproducing device or said second magnetic tape record reproducing device for the reproduction on magnetic tape therein of either an input record or a remainder record.

References Cited in the file of this patent

UNITED STATES PATENTS

| | | |
|---|---|---|
| 2,189,046 | Smith | Feb. 6, 1940 |
| 2,558,476 | Carpenter | June 26, 1951 |
| 2,580,768 | Hamilton | Jan. 1, 1952 |
| 2,602,545 | Luhn | July 8, 1952 |
| 2,617,704 | Mallina | Nov. 11, 1952 |
| 2,636,672 | Hamilton | Apr. 28, 1953 |
| 2,642,550 | Williams | June 16, 1953 |
| 2,674,733 | Robbins | Apr. 6, 1954 |
| 2,679,638 | Bensky | May 25, 1954 |
| 2,698,875 | Greenwood | Jan. 4, 1955 |
| 2,702,380 | Brustman | Feb. 15, 1955 |
| 2,702,629 | Schutt | Feb. 22, 1955 |
| 2,721,990 | McNaney | Oct. 25, 1955 |
| 2,735,082 | Goldberg | Feb. 14, 1956 |
| 2,755,994 | Williams | July 24, 1956 |
| 2,782,398 | West | Feb. 19, 1957 |
| 2,784,049 | Mitchell | Mar. 5, 1957 |
| 2,798,216 | Goldberg | July 2, 1957 |

FOREIGN PATENTS

| | | |
|---|---|---|
| 1,014,373 | France | June 11, 1952 |

OTHER REFERENCES

Mauchly "Sorting and Collating," lecture #22 in vol. III of Theory and Techniques for Design of Electronic Digital Computers, Moore School, June 30, 1948, pp. 22-1 to 22-20.

NBS Report 1519, March 1952, "Analysis of the Application of Large-Scale Digital Computers to a Sorting Process," Part I.

Stevens: "Engineering Organization of Input and Output for the IBM 701," Joint AIEE—IRE—ACM Computer Conference, March 1953, pp. 81-85.

Greenwald: "SEAC," Proc. IRE, October 1953, pp. 1300-1312.

Buchholz: "The System Design of the IBM 701 Computer," Proc. IRE October 1953, pp. 1262-1275.

NBS Report 3155, March 1954, "Preliminary Report on a Combined Sorting-File Merging Method for Eelectronic Data Processing."

UNITED STATES PATENT OFFICE
Certificate of Correction

Patent No. 2,913,171 November 17, 1959

Byron E. Phelps et al.

It is hereby certified that error appears in the printed specification of the above numbered patent requiring correction and that the said Letters Patent should read as corrected below.

Column 4, line 8, for "illustration" read —illustrating—; column 5, line 65, for "symools" read —symbols—; column 8, line 25, for "to" (first occurrence) read —and—; column 12, line 6, for "secondary" read — second—; column 13, line 66, for "position" read —positions—; column 16, line 10, for "righ" read —right—; column 22, line 62, for "rives" read —drives—; column 27, lines 29 and 32, each occurrence, for "sequencies" read —sequences—; column 28, line 18, for "described" read —describe—; column 31, line 14, for "deta" read —data—; column 32, line 12, for "writing" read —wiring—; column 33, line 56, for "operation" read —operations—; line 71, for "*Odd-event*" read —*Odd-even*—; column 36, line 32, for "designated" read —designed—; column 46, line 39, for "MHS-2" read —MRS-2—; column 49, line 11, for "which" read —switch—; line 26, after "vacuum" insert —column—; column 58, line 72, after "may" insert —be—; column 65, line 26, for "133*a*" read —133—; line 27, for "133" read —133*a*—; column 66, line 18, for "sence" read —sense—; column 73, line 26, for "nexa" read —next—; column 81, line 64, for "slot" read —shot—; column 85, line 55, for "acts" read —act—; column 90, line 12, for "and" read —an—; column 100, line 73, after "pin" and before the comma insert —6—; column 107, line 65, for "produce" read —produced—; line 71, beginning with "A plurality of triggers," strike out all to and including "in cascade fashion." in line 73, same column; column 110, line 37, for "previous" read —previously—; column 113, line 6, for "of" read —or—; column 114, lines 36, 50 and 51, each occurrence, for "Sel and Wr Status" read —Sel & Wr Status—; line 63, for "Sel and WR Status" read —Sel & Wr Status—; column 115, lines 29, 34 and 35, for "No Sel and Read Status", each occurrence, read —No Sel & Read Status—; lines 64 and 66, for "Sel and WR status", each occurrence, read —Sel & Wr Status—; column 117, line 57, for "Or" read —OR—; col. 118, line 35, for "Off" read —OFF—; lines 54 and 58, for "No Select and Read Status", each occurrence, read —No Select & Read Status—; line 74, for "Or" read —OR—; column 119, line 9, for "Off" read —OFF—; line 19, after "#2", second occurrence, strike out the comma; column 120, line 56, for "purpose" read —purposes—; column 124, line 1, for "Store Scan Gate" read —Store/Scan Gate—; column 128, line 18, for "transplated" read —transmitted—; column 134, line 52, for "904 and 904*a*" read —804 and 804*a*—; column 137, line 7, for "sime" read —some—; line 73, for "823" read —923—; column 138, line 48, for "Te" read —The—; line 72, for "selector", first occurrence, read —selection—; line 74, for "coincidence" read —coincidences—; column 150, line 35, for "186", first occurrence, read —185—; column 154, line 44, for "low" read —lower—; column 159, line 17, for "174*a*" read —274*a*—; column 161, line 54, for "or" read —to—; column 164, lines 49 and 50, strike out "means for transmitting records from said storage devices to said character register," and insert the same after "records," in line 54, same column; column 173, line 59, for "it" read —is—.

Signed and sealed this 24th day of May 1960.

[SEAL]

Attest:

KARL H. AXLINE, ROBERT C. WATSON,

*Attesting Officer.* *Commissioner of Patents.*